US005341463A

United States Patent [19]

Wescott et al.

[11] Patent Number: 5,341,463

[45] Date of Patent: Aug. 23, 1994

[54] SELECTIVE POLYGON MAP DISPLAY METHOD

[75] Inventors: Thomas F. Wescott; Lawrence E. McCleary, both of San Diego, Calif.; David A. Nation, Hanover, Md.

[73] Assignee: The United States of America as represented by the Secretary of the Navy, Washington, D.C.

[21] Appl. No.: 473,258

[22] Filed: Jan. 31, 1990

[51] Int. Cl.[5] .................. G06F 3/14

[52] U.S. Cl. .................. 395/129; 395/123

[58] Field of Search .................. 395/123, 133, 134, 135, 395/138

[56] References Cited

U.S. PATENT DOCUMENTS

| | | | |
|---|---|---|---|
| 3,866,229 | 2/1975 | Hammack | 343/112 R |
| 4,646,076 | 2/1987 | Wiedenman et al. | 340/747 |
| 4,791,582 | 12/1988 | Ueda et al. | 340/729 |
| 4,807,157 | 2/1989 | Fukushima et al. | 340/701 |
| 4,807,158 | 2/1989 | Blanton et al. | 343/43 |
| 4,899,293 | 2/1990 | Dawson et al. | 395/123 |

OTHER PUBLICATIONS

Douglas et al, "Algorithms for the Reduction of the Number of Points Required to Represent a Digitized Line or Its Caricature", vol. 10, No. 2, 1973.

Robinson et al, "Elements of Cartography", pp. 217–248, 1969.

Richardus et al, "Map Projections", 1972, pp. 163–167.

Gerald et al, "Applied Numerical Analysis", 1972, pp. 143–158.

Pavlidis, "Algorithms for Graphics and Image Processing", 1982, pp. 347–349.

CIA, "CAM Cartographic Automatic Mapping Program Documentation", 1986, 7th Edition, pp. 111–125.

*Primary Examiner*—Gary V. Harkcom

*Assistant Examiner*—Mike Smith

*Attorney, Agent, or Firm*—Harvey Fendelman; Thomas Glenn Keough

[57] ABSTRACT

Signal transformations of inputted data brought about by 58 new subroutines in combination with other subroutines to display world maps or other display items with the unique capability of performing the following functions in complete generality. (1) Arbitrary selection of map center and coverage, including global displays, (2) filling of all land and lake areas defined by polygons composed of an arbitrary number of vertices, (3) clipping of map features and overlays at map boundaries and poles, (4) selection from any of nineteen currently implemented map projections with provision to install any other projection topologically similar to an oblique conic, (5) calculation of latitude/longitude for any point on a map without the need for inverse mapping equations, and (6) an efficient method of plotting polyline segments along great circles. These are a number of feature functions provided by this inventive concept. The software could potentially be used with any digital global geographic data base, such as World Data Bank II (WDBII), a geographic information system or other data base where polylines are used to depict linear and/or areal features. Polygon (region filled) maps and other display items can be constructed from any data base from which closed polygons can be extracted directly, or constructed via additional processing.

21 Claims, 39 Drawing Sheets

(A)

CONVERSION OF GEOGRAPHIC (L,L) POLYLINES TO MAP (X,Y) BY EVALUATING MAP EQUATIONS (B)

CONVERSION OF A MAP LOCATION TO (L,L) BY ITERATIVE SOLUTION OF MAP EQUATIONS

SELECTIVE POLYGON MAP DISPLAY METHOD

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The ability to generate special purpose maps easily by computer from geographic data bases is having a profound effect on cartography. Computer generated maps offer many advantages over using traditional paper maps, such as being able to customize the area, scale, projection, features shown, etc. Users can rid displays of the incidental features (clutter) usually present on printed maps. They have a new found freedom to select the most suitable from a wide variety of projections without being concerned with custom drafting and reproduction costs.

The earliest computer generated maps resembled line drawings, where regions are depicted by their outline. With the use of line maps, however, there is sometimes confusion about which side of a shoreline is land or water, particularly at large scales. A polygon based map provides the option of portraying regions by shading or color. Although more difficult to produce, polygon maps are much easier to interpret, and are generally more pleasing to work with. Another limitation of early soft copy map portrayals was the controlling means lacked a total flexibility for selecting regions of the world, local or global. Most early mapping systems included only a limited number of familiar projections and did not provide correct clipping of features and overlays.

Thus, a continuing need exists in the state of the art for a versatile and reliable apparatus and method to display world maps from digital data, as well as to present user specific overlay data that are totally adaptable with regard to center point and area coverage. The need exists in the state of the art for a versatile and reliable apparatus and method that may be adapted to any one of a large number of map projections and have the capability to display land, water, or other areal features as color filled regions with lakes, rivers, roads, railroads, and other boundaries and to enable a user to pick any point on the currently displayed map and retrieve its geographic location.

SUMMARY OF THE INVENTION

The present invention is directed to providing a method and means for producing arbitrary displays of data such as world maps and other displays from a source of data from which closed polygons can be extracted to give a generalized display of, for example, world features. The data is received by a computer operated on by subroutines to effect geometric signal transformations that provide the capabilities for arbitrary selection of map center and coverage, filling of all land and lake areas defined by polygons, clipping of map features and overlays at map boundaries and singularities, e.g., poles, selection from any of a number of available data sources having the provision to install other projections topologically similar to an oblique conic, and the calculation of latitude and longitude for any point on a map without the need for inverse mapping equations, to provide an efficient method of plotting polyline segments along great circles.

An object of the invention is to provide a method and apparatus to effect geometric signal transformations for displaying information with complete generality capabilities.

Another object is to provide a method and apparatus to effect signal transformations for displaying information having an arbitrary selection of center and coverage.

Another object is to provide a method and apparatus to effect signal transformations for displaying information that fills all designated areas defined by polygons composed of an arbitrary number of vertices.

Another object is to provide a method and apparatus to effect signal transformations for displaying information having the capability for clipping designated features and overlays at boundaries and singularities, e.g., poles.

Another object is to provide a method and apparatus to effect signal transformations for displaying information from a selection from existing projections with a provision to install any other projection topologically similar to a general oblique conic.

Another object is to provide a method and apparatus to effect signal transformations for displaying information which avoid the need for inverse mapping equations in the arriving at latitude/longitude designations for any point on a map.

Another object is to provide a method and apparatus to effect signal transformations for displaying information which provide an efficient method of plotting polyline segments along great circles.

An object of the invention is to provide a method and apparatus to effect signal transformations for displaying maps with complete generality capabilities.

Another object is to provide a method and apparatus to effect signal transformations for displaying maps having an arbitrary selection of map center and coverage, including global displays.

Another object is to provide a method and apparatus to effect signal transformations for displaying maps filling all land and lake areas defined by polygons composed of an arbitrary number of vertices.

Another object is to provide a method and apparatus to effect signal transformations for displaying maps in which polygon (region filled) maps can be constructed from any data base where closed polygons can be extracted directly, or constructed via additional processing.

Another object is to provide a method and apparatus to effect signal transformations for displaying maps having the capability for clipping map features and overlays at map boundaries and singularities, e.g., poles.

Another object is to provide a method and apparatus to effect signal transformations for displaying maps from a selection from any of nineteen currently implemented map projections with a provision to install any other projection topologically similar to a general oblique conic.

Another object is to provide a method and apparatus to effect signal transformations for displaying maps using any digital global geographic data base or geographic information system where polylines are used to depict linear and/or areal features.

Another object is to provide a method and apparatus to effect signal transformations for displaying maps which avoid the need for inverse mapping equations in the arriving at latitude/longitude designations for any point on a map.

Another object is to provide a method and apparatus to effect signal transformations for displaying maps which provide an efficient method of plotting polyline segments along great circles.

Another object is to provide a method and apparatus to effect signal transformations for displaying maps having software written in a standard computer language which can be easily transported to different computer systems.

These and other objects of the invention will become more readily apparent from the ensuing specification and claims when taken in conjunction with the appended drawings.

FIG. **36*a* and 36*b*** show clipping features of map boundaries and poles.

FIG. **37*a* and 37*b*** show a keyhole-shaped area cut from a polygon to exclude a singularity.

Figure 38:
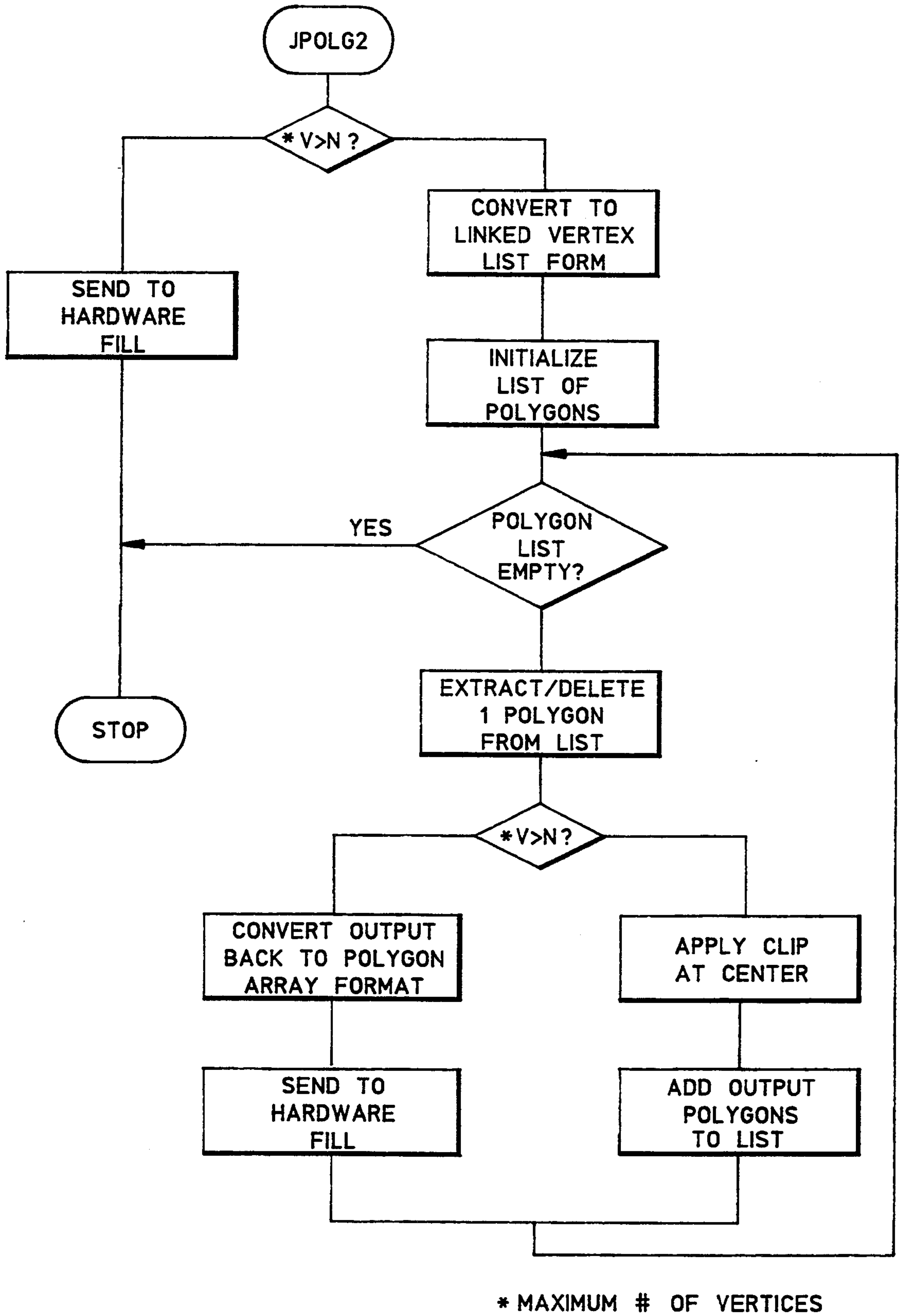

FIG. 38 represents the using of hardware fill on polygons of any size.

Figure 39:
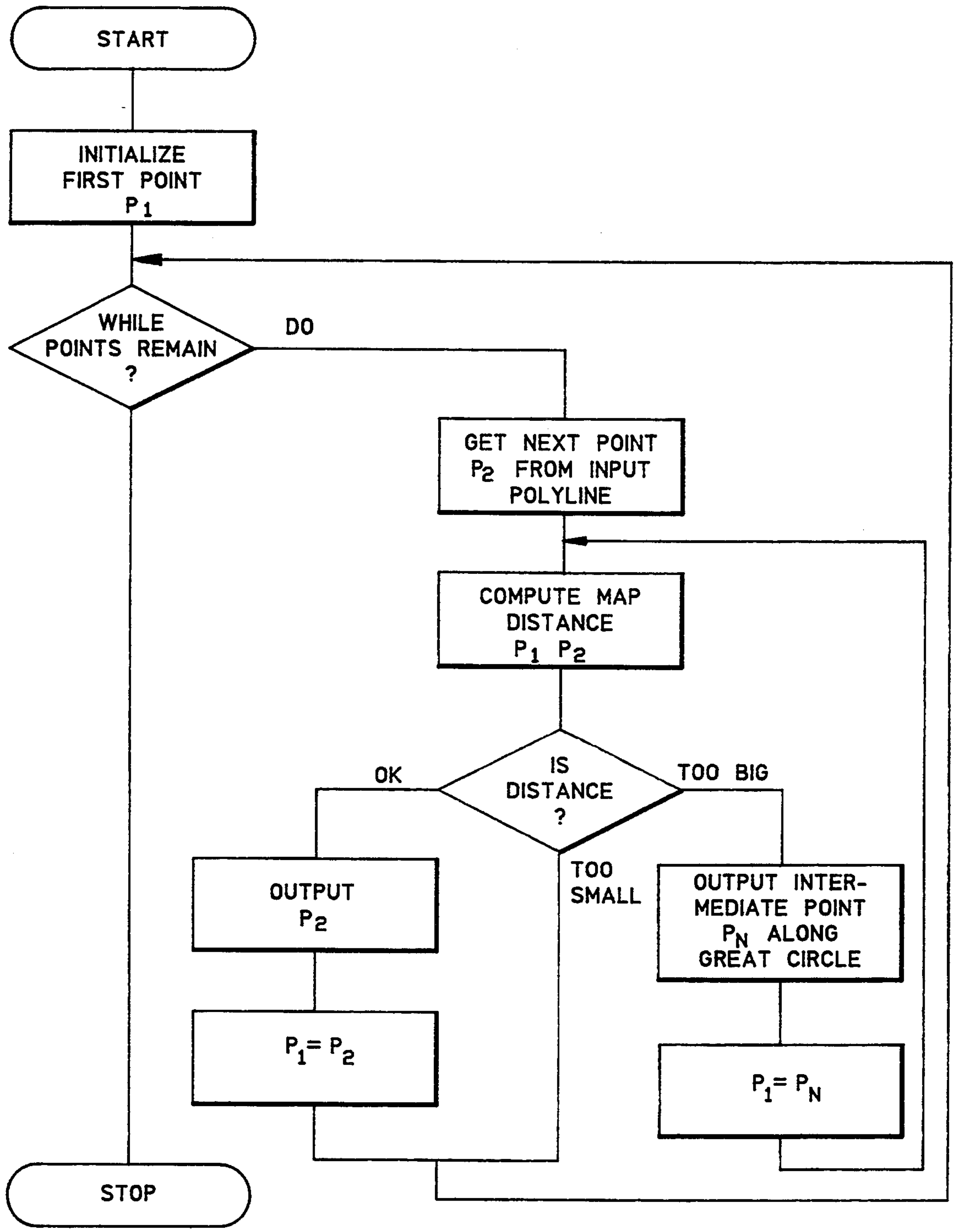

FIG. 39 shows projection independent plotting of great circle polylines.

DESCRIPTION OF THE PREFERRED EMBODIMENT

The advancement to the state of the art herein described has a unique capability to effect signal transformations for constructing displays such as maps that present to viewers a heretofore unrealizable portrayal of features. Digital data is used to represent polylines that depict linear and areal features or, in other words, polygon (region filled) maps are constructable from any data base from which closed polygons can be extracted directly, or constructed via additional processing. It is apparent to those versed in this art that this apparatus and method can accommodate other data sources with the constraints to be elaborated on below, to effect signal transformations and thereby provide a variety of displays.

Figure 1:
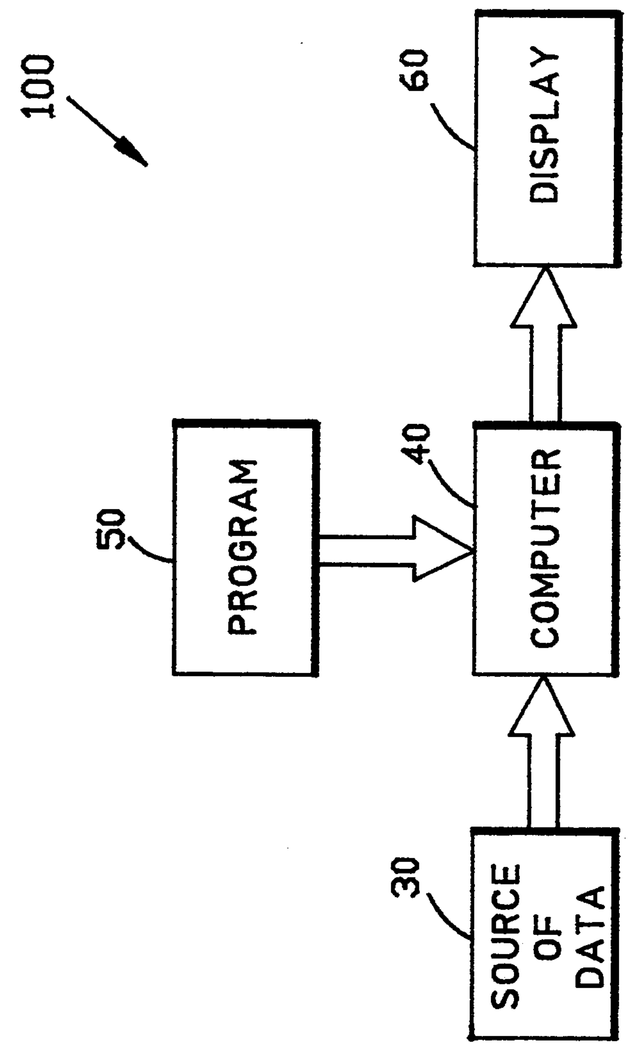
FIG. 1 is a schematic representation of the display system.

Referring to FIG. 1 a display system 100 draws data from a data source 30 in which digital data represents polylines that are used to depict linear and/or areas features. For example, this source of data could be what is commonly known as the World Data Bank II, a 1:3,000,000 to 1:4,000,000 scale world-wide vector data base which includes coastlines, islands, lakes, rivers, international boundaries, internal boundaries, roads, and railroads. Five additional levels of resolution have been produced by applying a thinning algorithm to the data base in order to minimize the time required to generate maps at smaller scales. Any digital global geographic data base or geographic information system could be used where polylines are used to depict linear and/or areal features. Polygon (region filled) maps or other displays of interest could be constructed from any data base where closed polygons can be extracted directly, or constructed via additional processing.

This data is fed to a computer 40, for example, a Digital Equipment Corporation VAX computer under the VMS operating system using the Precision Visuals Incorporated DI-3000 graphics package. This computer is operated on by the operating instruction of an appropriate software program 50 written in ANSI standard Fortran 77 using graphic primitives based on Core.

The Digital Equipment Corporation's VAX has been identified as the operating unit. It is within the capabilities of this concept to utilize Sun3 and Sun4 work stations running under UNIX using either DI-3000 or a DI-3000 interface based on SunCore. In addition, since it has been discovered that the software also can be run on other systems using Fortran and a Core graphics interface, it is apparent to one skilled in the art to which this invention pertains, that the subroutines to be discussed in detail below could be adapted to any scientific computer language and any versatile graphic interface.

In other words, special versions of the World Data Bank II which have been modified to accommodate the efficient display of arbitrary world areas could be accommodated. In such a case, the computer program is compiled and linked on a particular system. Upon program execution, menus and help files are accessed as the user selects the various options required to define a map display.

The operating instruction of program 50 consists of 58 software subroutines which allow unique new capabilities in the display of world maps. These subroutines reside in a large program which includes approximately 400 additional subroutines which provide the normal capabilities required for interaction between the user and a display 60 which may be a part of the computer screen, remote terminals or may be associated with hard copy readouts for the display of the desired information.

Program 50 is contained in its entirety in the Appendix, in which the files are listed in alphabetical order and within each file the subroutines are listed in alphabetical order. The file CARMAPTH contains the new 58 subroutines that functionally cooperate with the other subroutines of the complete program. Here, it must be pointed out that all of the subroutines are loaded together and must functionally cooperate together to realize the capabilities of this inventive concept. The CAR34APTH file subroutines are the subroutines referred to in the ensuing description to provide a sufficient insight of the salient features of the invention.

Display 60 is a computer display which is needed to show all the menus including, feature menus, for appropriate actuation of the computer so that the desired displays are presented. A hard copy display device optionally may be used and perhaps is preferred where permanent records, handouts and the like are to be used by an interested audience or when, for example, it is desired to disseminate the displays to an expanded audience.

Before getting into the details of the operative interrelationship of the constituents of this inventive concept, a brief look at the capabilities and versatilities of this concept is in order.

Figure 2:
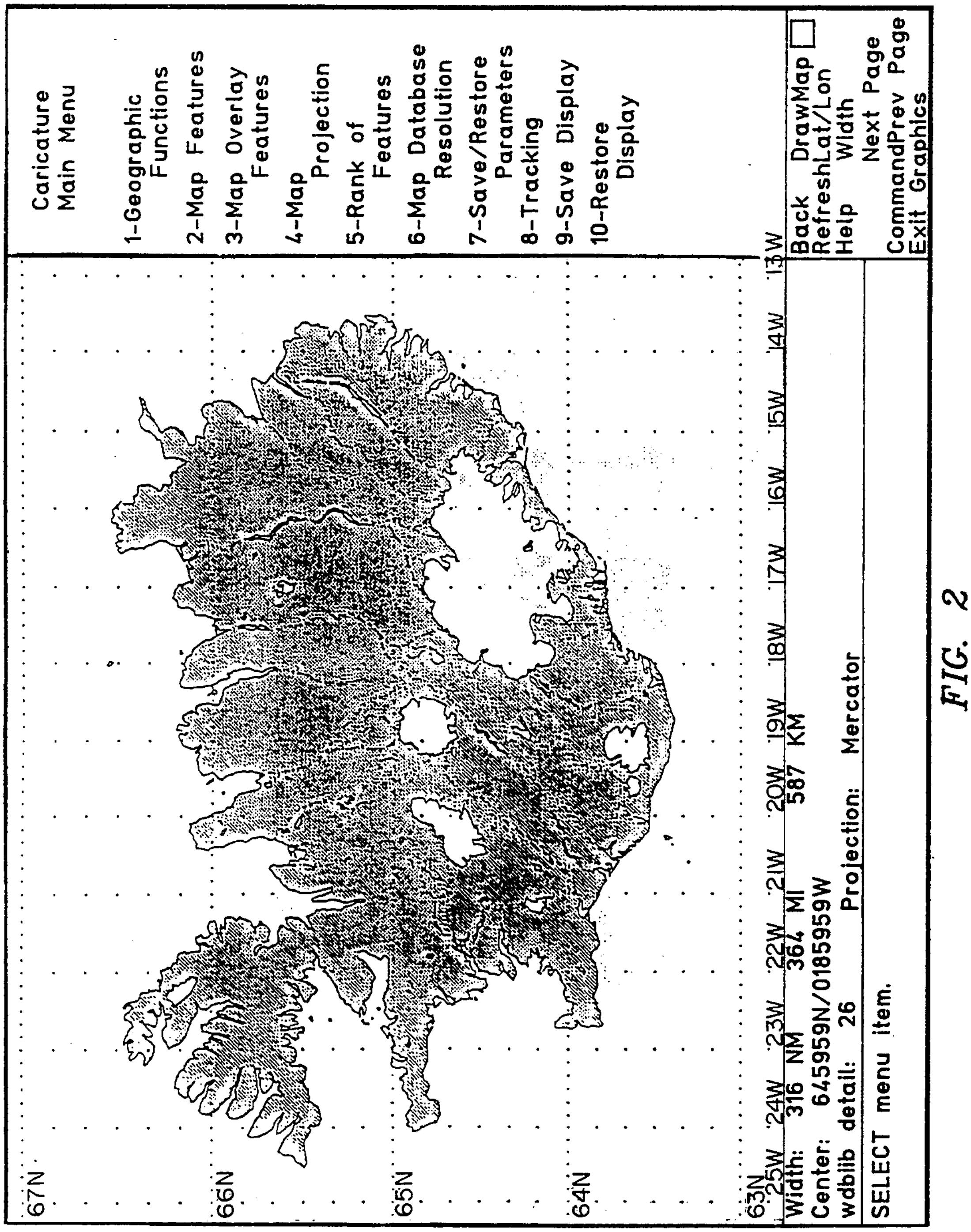
FIG. 2 illustrates a display status when the program has been executed.

FIG. 2 shows the display status when the program has been executed and the subroutine INITIA is brought into operation. The figure illustrates a full screen display subdivided into windows for the map display, map parameters, keyboard input and control items to be selected by a pick device such as a mouse that has selected the "DrawMap" item near the lower right. In the map area shown is a Mercator projection of Iceland with land in one color, while open ocean, lakes, and glaciers are another, and rivers shown in a third color. It is to be understood that this drawing and the other drawings do not show these colors but represent the different colors by differently tertured appearences. The 10 other items about the "DrawMap" item refer to additional menus which can be selected, for example, the "Back" item refers to a method for returning to the previous menu and the "Lat/Lon" item provides the capability to determine the latitude and longitude of any location selected on the screen from the map area.

Figure 3:
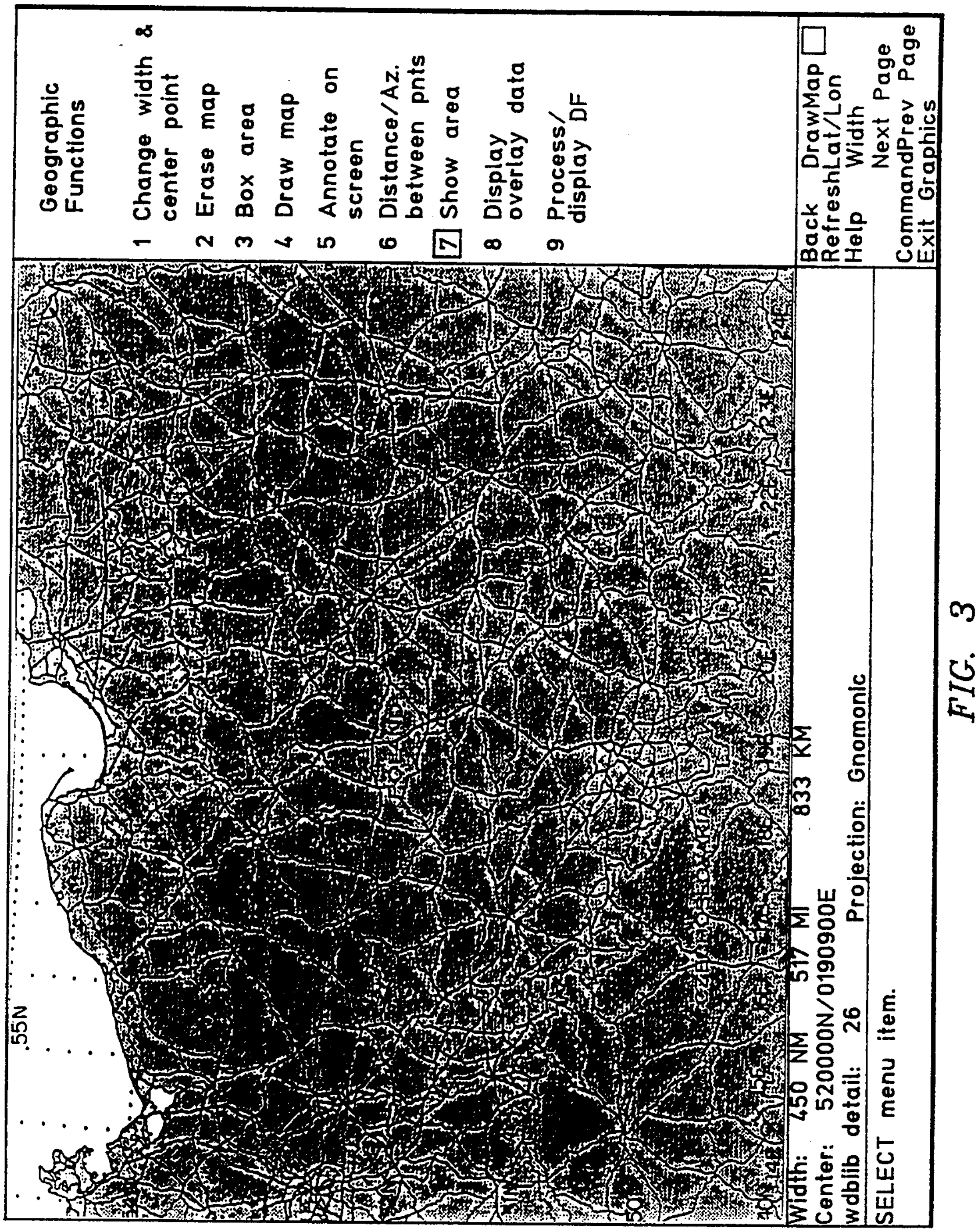
FIG. 3 is an example of a display of the Show Command Feature menu.

FIG. 3 provides an example of the display when the "Show area" command within the Geographic Functions menu is initiated. This feature accesses a file defining geographical areas for oceans, seas, countries, etc. In this instance Poland is the requested area. The map projection is Gnomonic and the features selected include, land fill in orange, international boundaries in red and roads in blue. Other options include the capability to redefine the map area, annotate, compute distance and azimuth between two points, and load a particular file of track data.

Figure 4:
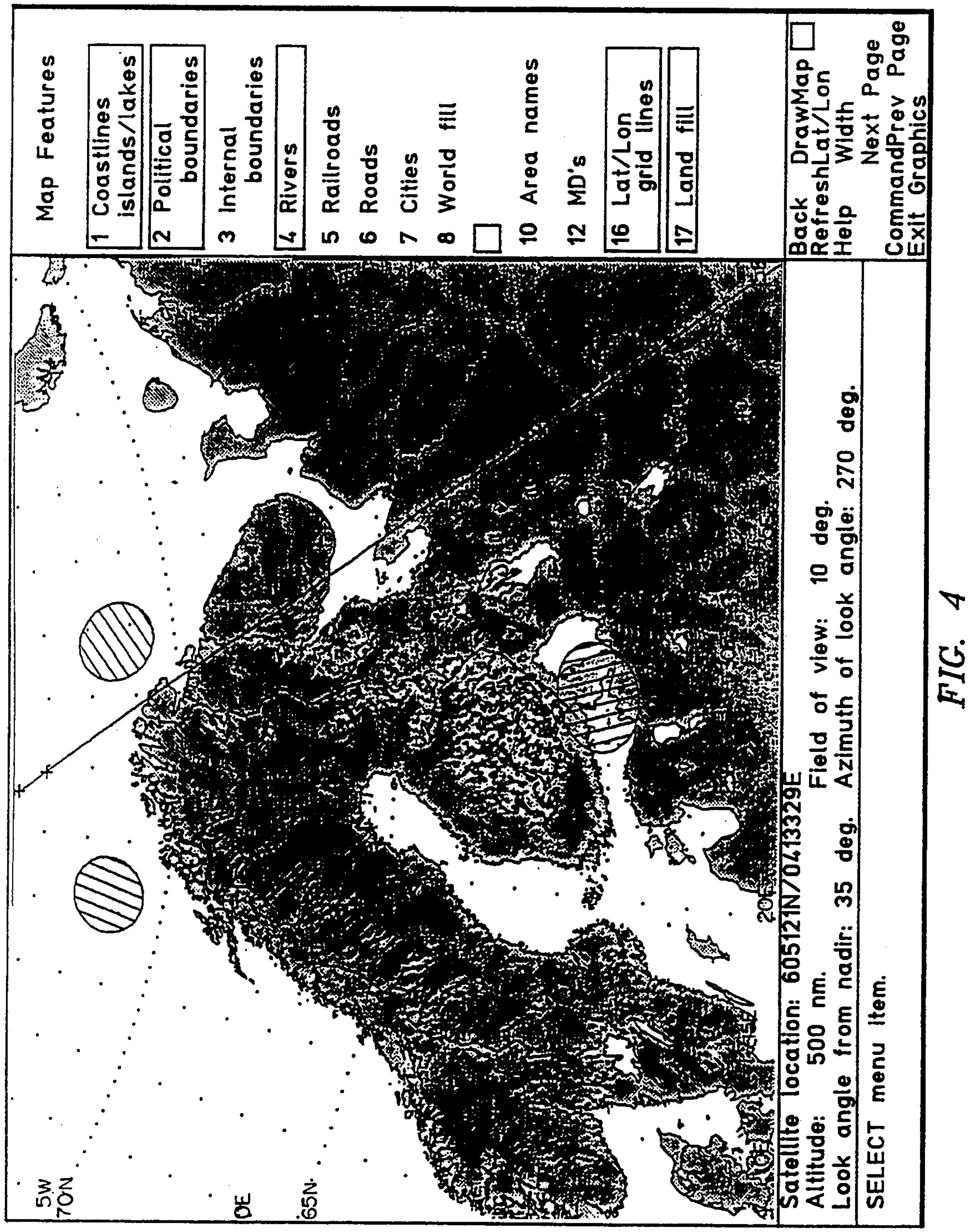
FIG. 4 depicts a stereographic projection covering area between two seas.

Another feature of display system 100 provided by program 50 is that the Map Features menu has individual items that can be toggled on and off. FIG. 4 shows a stereographic projection covering an area from the Baltic Sea to the Barents Sea. As in most of the figures, both the feature designated as category 1 (coastlines, islands and lakes) as well as the item designated category 17 (land fill) are turned on, although they can be set individually. In other words, if 1 is on and 17 is off, the land areas would be shown only as outlines. Political boundaries are on, rivers are shown in green, and Latitude/Longitude grid lines are shown in black. Also shown here is the capability to display the great circle path of an object such as a satellite as well as the footprint on the earth from various locations. In this case, three hypothetical cross-hatched areas are displayed where each is a function of the altitude, field of view, look angle from nadir and the azimuth of the look angle. These parameters are set from the Map Overlay Features menu.

Figure 5:
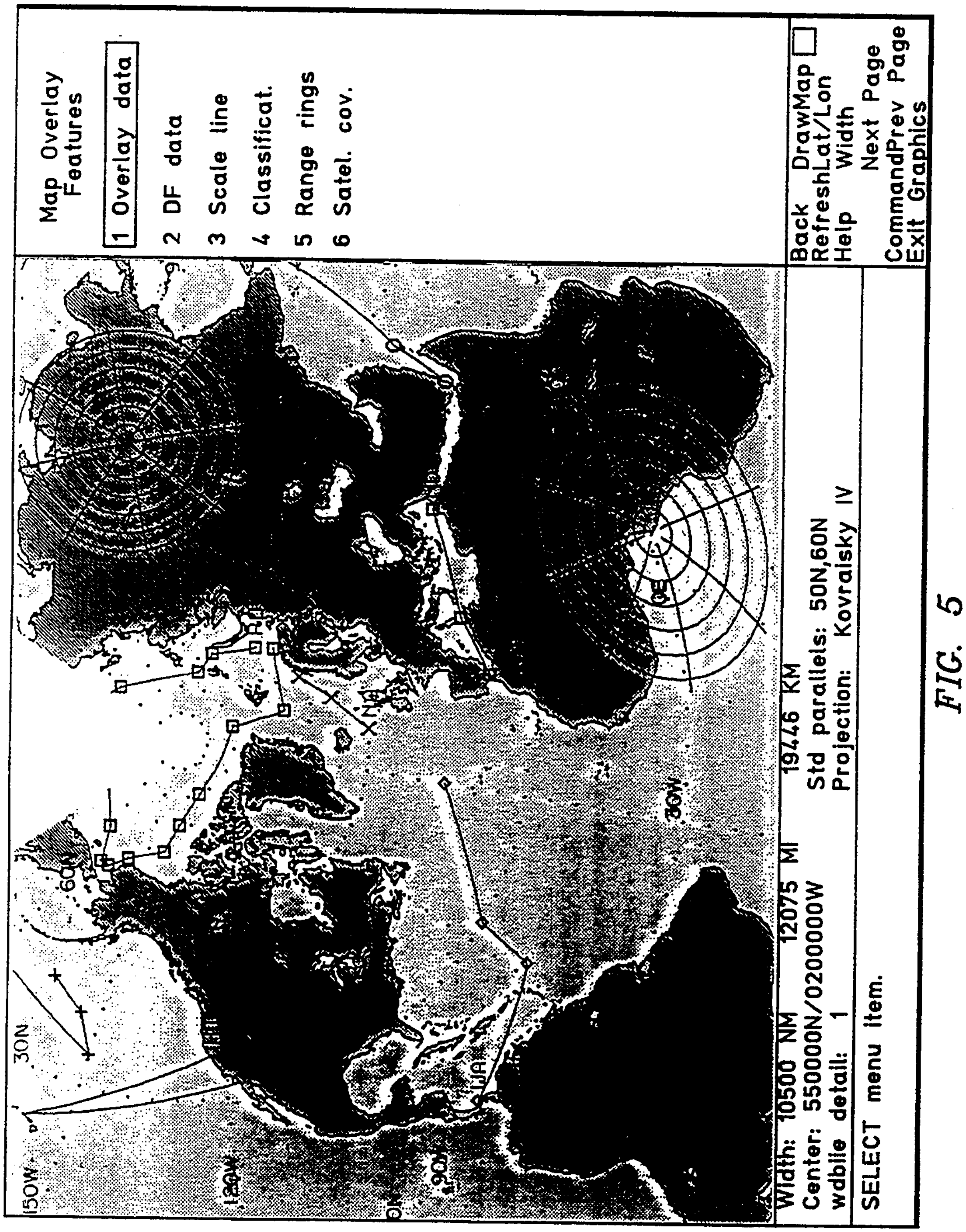
FIG. 5 displays hypothetical tracks as overlay data with range rings.
Figure 6:
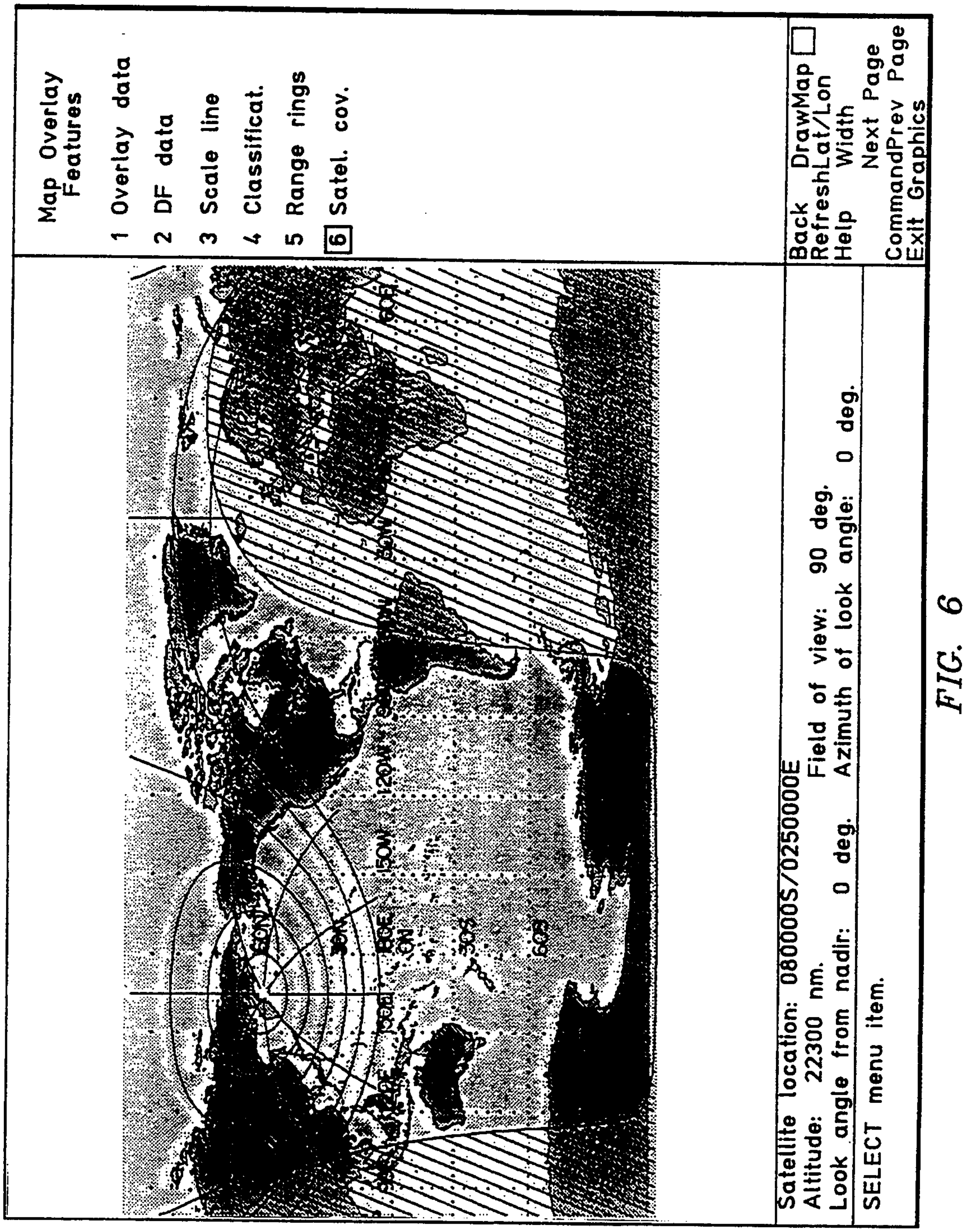
FIG. 6 provides a Miller projection of the world with polyline and polygon clipping at the poles.

Hypothetical tracks are displayed as overlay data in FIG. 5. Range rings also are displayed to illustrate distortion present in this equidistant conic projection, the Kavraisky IV. Normally, the projection would be used to map a smaller region. However, this extreme scale is selected to show the location of a straight interruption line and the mapping of a pole to an arc. Both the interruption and the pole combine to form a keyhole shaped boundary which graphically describes the conic method of rendering the entire world map onto a flat piece of paper. FIG. 6 is a Miller projection of the world which demonstrates polyline and polygon clipping at the poles as well the interruption line. This capability is provided by turning on category 6, Satel. Cov. in the Map Overlay Features menu.

Figure 7:
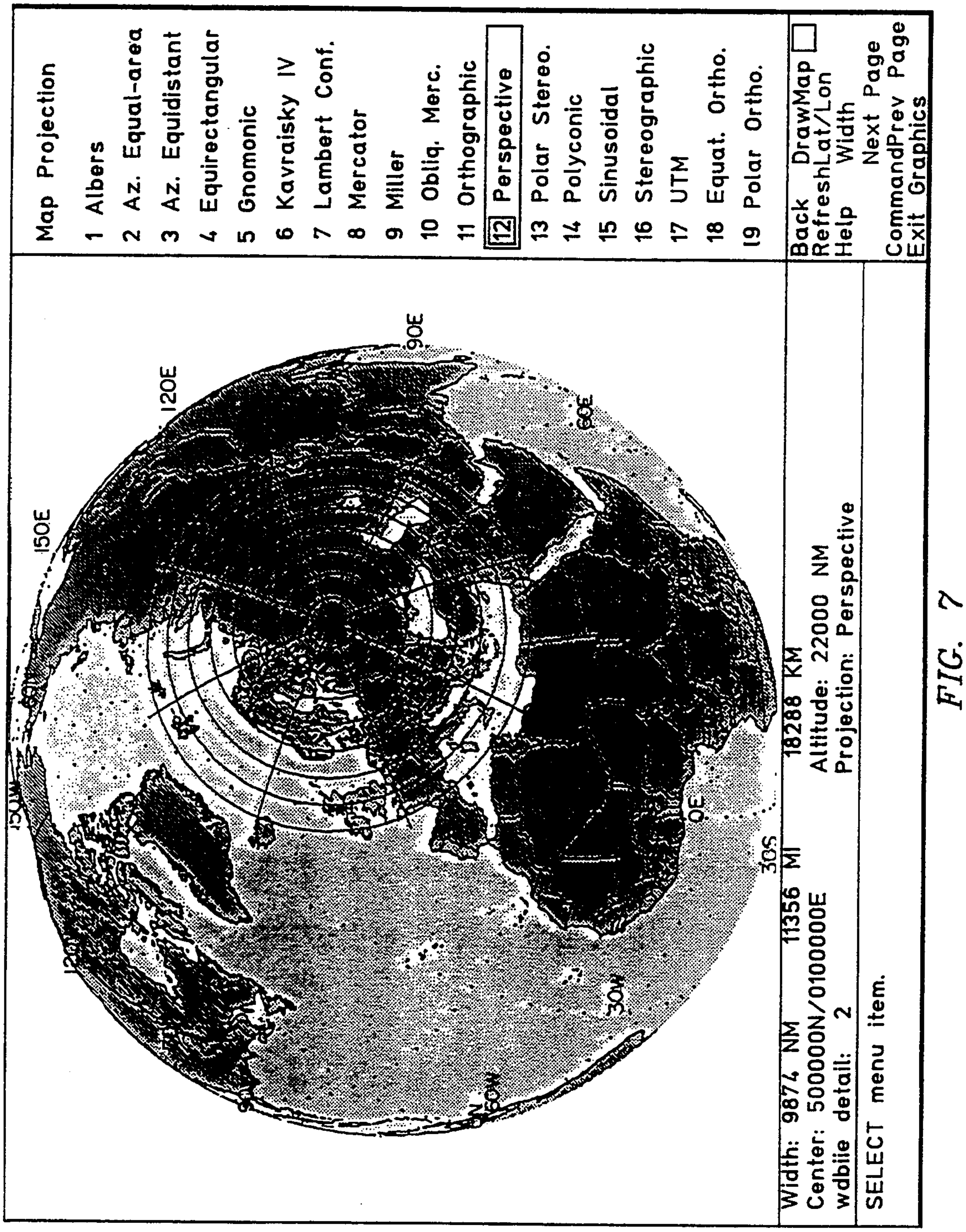
FIG. 7 shows a perspective view of the world with range rings.

FIG. 7 gives an observer a more recognizable view of the earth, that is, a perspective view which has been calculated from a distance of 22,000 nautical miles. Range rings are shown in increments of 200 nautical miles. This capability is at a viewer's fingertips when the category 12 Perspective is turned on in the Map Projection Features menu. With this inventive concept any of the 19 available map projections may be selected by a user and presented for any chosen center point and scale on the earth.

Figure 8:
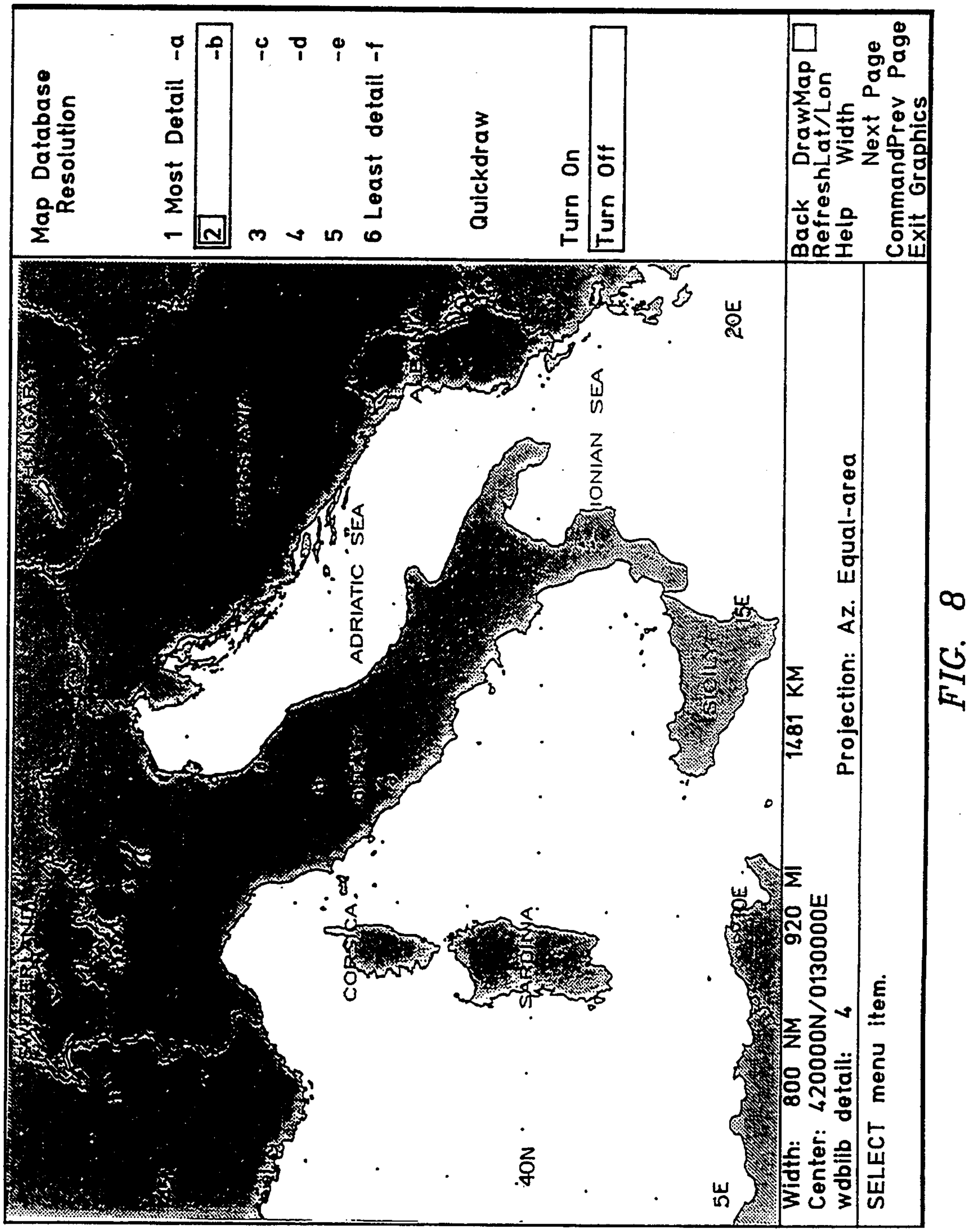
FIG. 8 depicts a selectable resolution level for improved display speed.

The Map Data Base Resolution Feature menu, shown in FIG. 8, allows the selection of various levels of resolution of data extracted from the World Data Bank II. In this particular example of the capabilities of display system 100, item 1 (level a) is the original resolution, while levels b through f have been thinned to provide lower resolution versions. Level b (an 85% data reduction from level a), shown here for Italy, is adequate to display the region at this scale.

Figure 9:
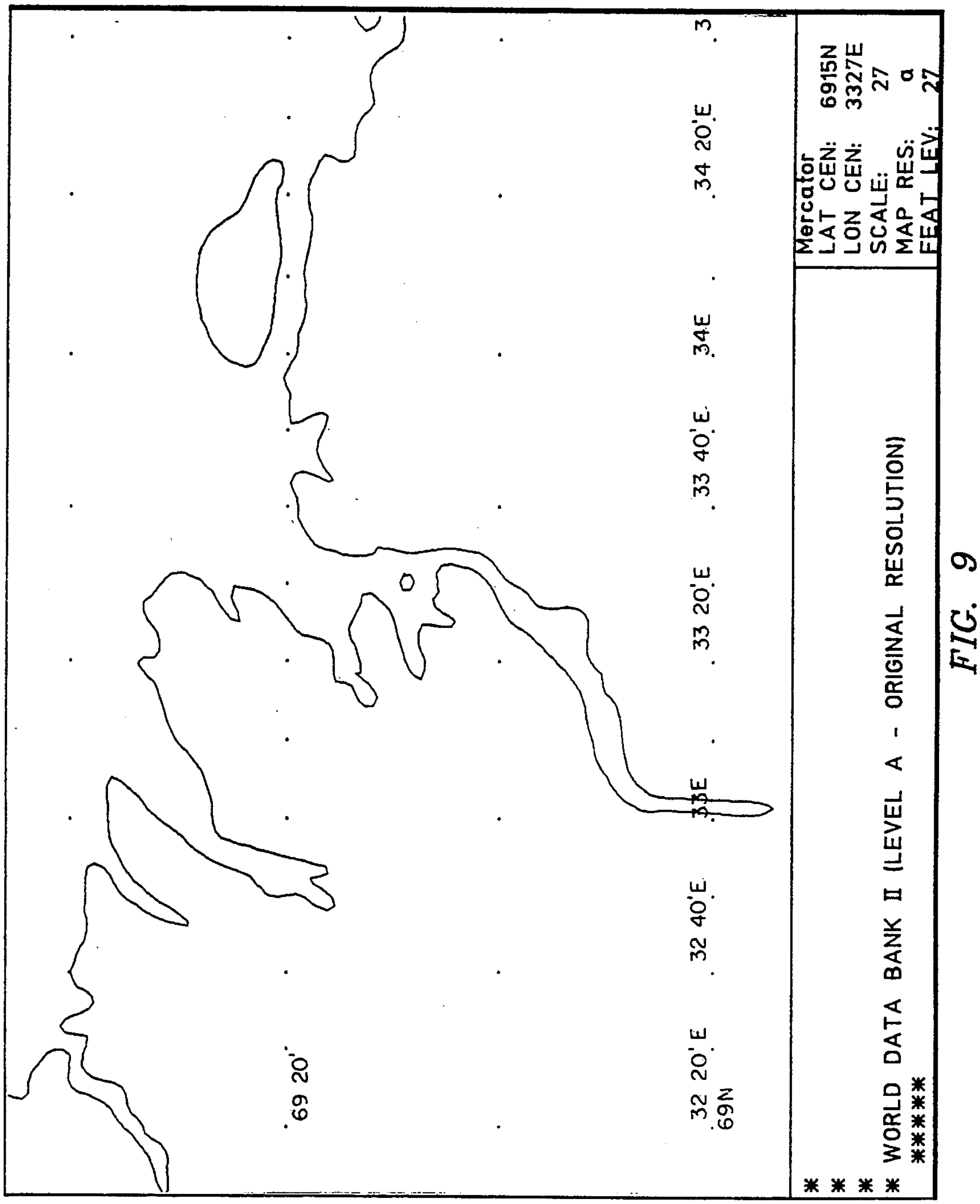
FIG. 9 shows another level of resolution that could be selected for a different display speed.
Figure 10:
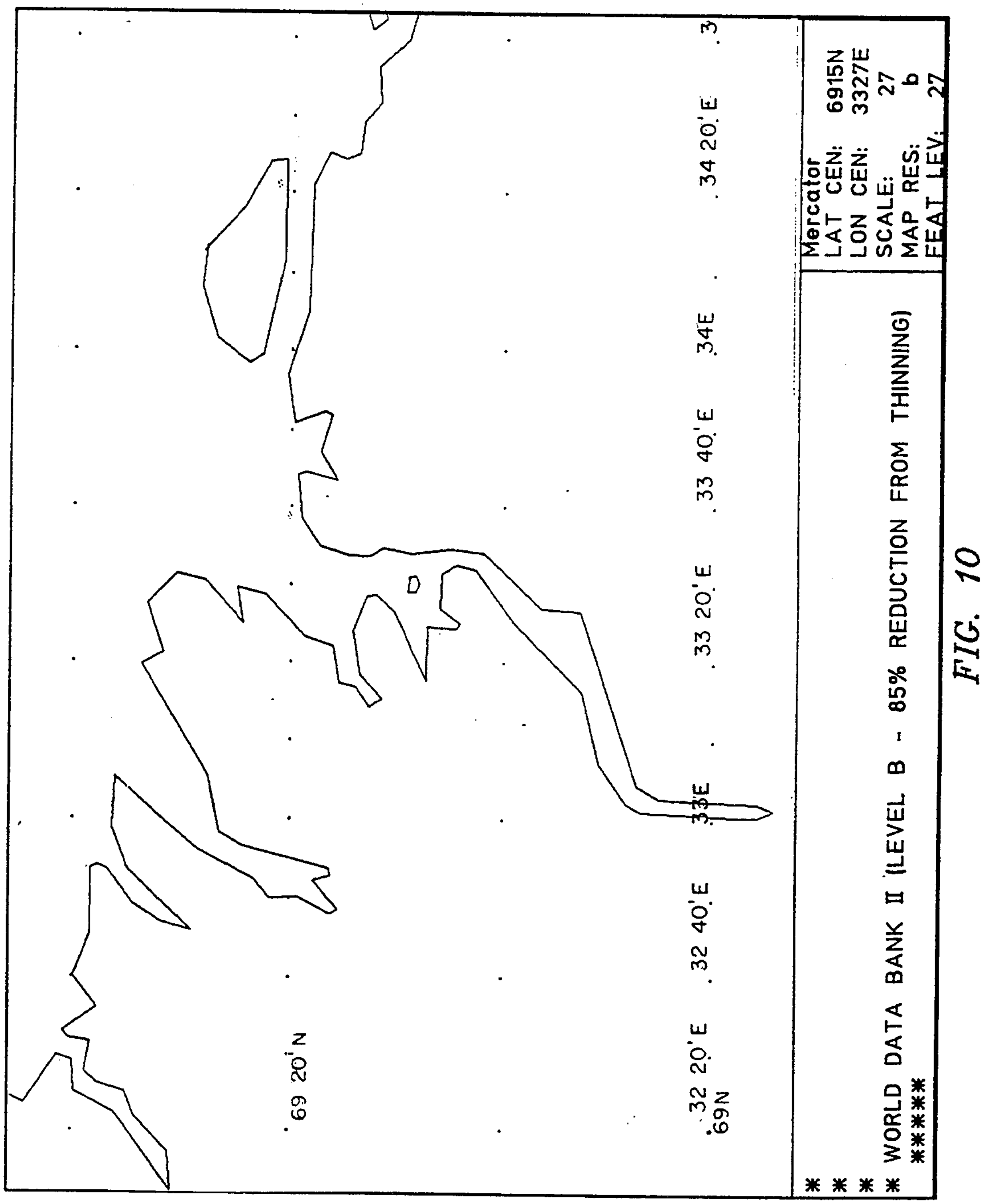
FIG. 10 is yet another level of resolution for comparison to the level of FIG. 8.

The thinned data results in a corresponding improvement in display speed. When the Quickdraw toggle of computer 40 is turned on, the resolution drops two levels, resulting in a faster draw. A limitation of displaying at the lower level is that the map falls short of standard accuracy specifications. Level f is adequate for a 360-degree Mercator map of the world, while the other levels fall into use at intermediate map scales. The Douglas-Peucker algorithm has proven very effective for producing these thinned versions of the data base. The graphic portrayals of FIGS. 9 and 10 are included to demonstrate the effectiveness of varying the resolution level by comparing levels a and b for a particular area of interest. Particularly in the case of the display of FIG. 10, such a resolution level may be entirely adequate for some display purposes whereas that of FIG. 9 or higher might be preferred for other data presentations.

Figure 11:
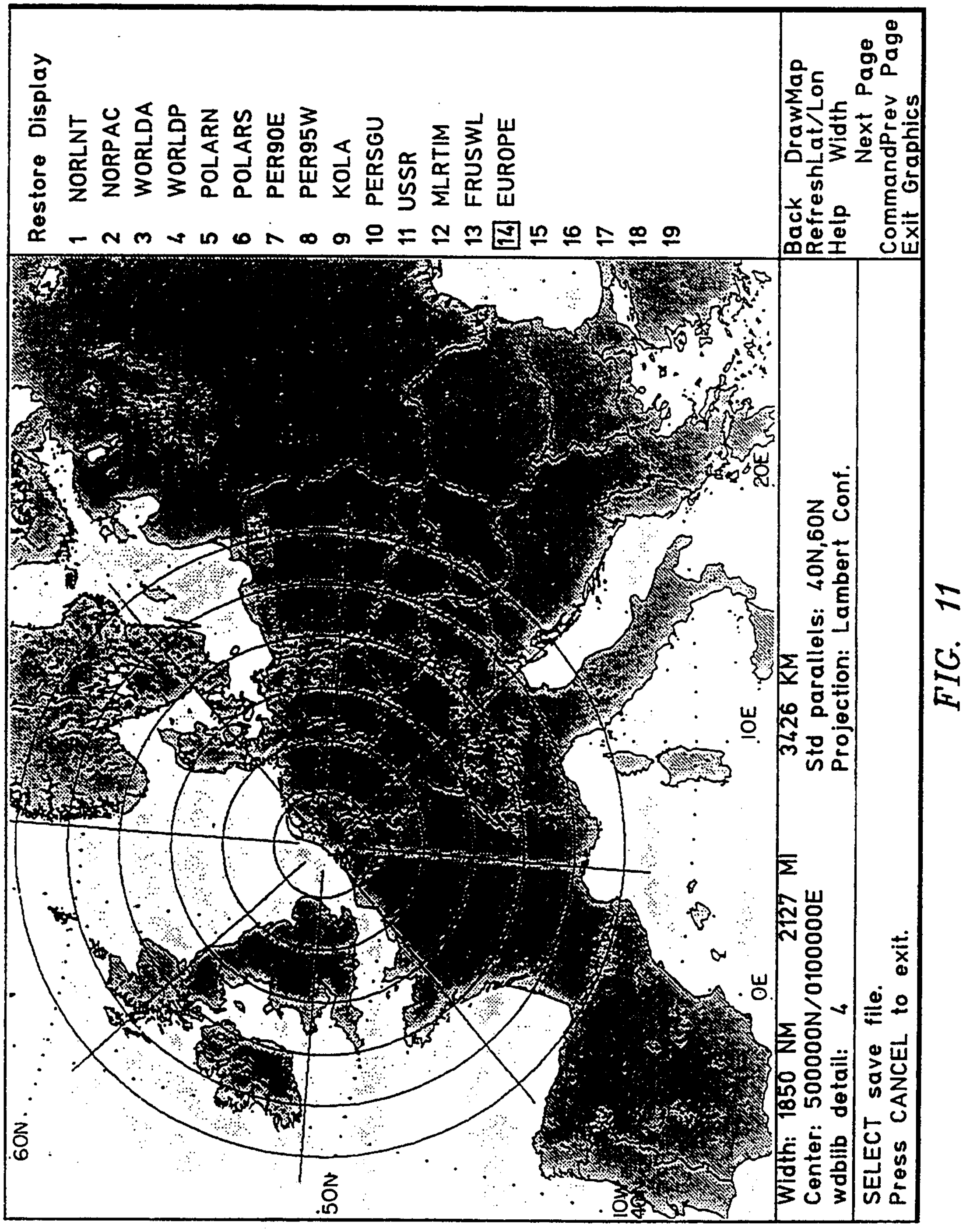
FIG. 11 shows the Restore Display Feature menu that can be used to recall previously defined maps.
Figure 12:
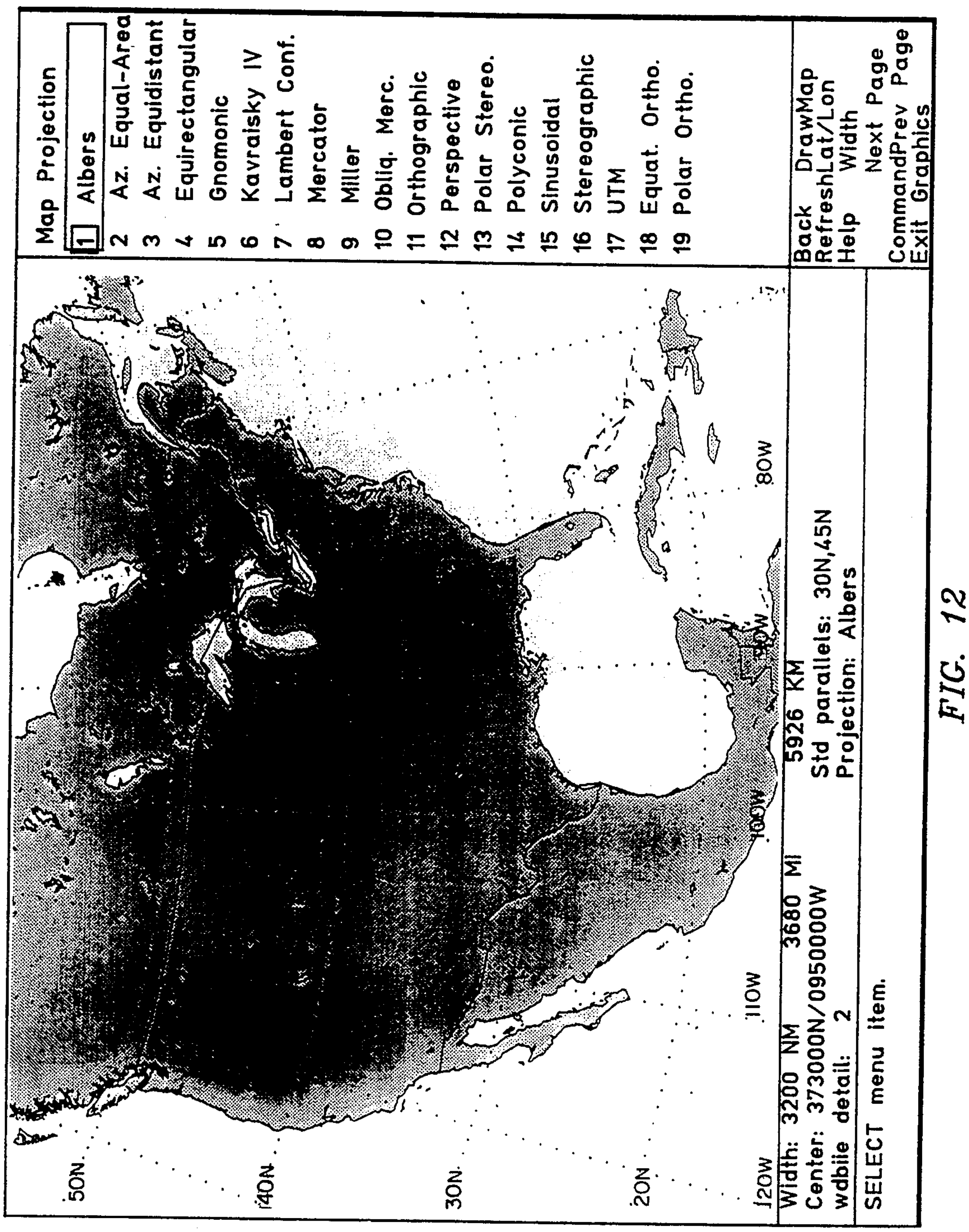
FIG. 12 shows a Map Projection Feature menu with map using Albers projection.
Figure 13:
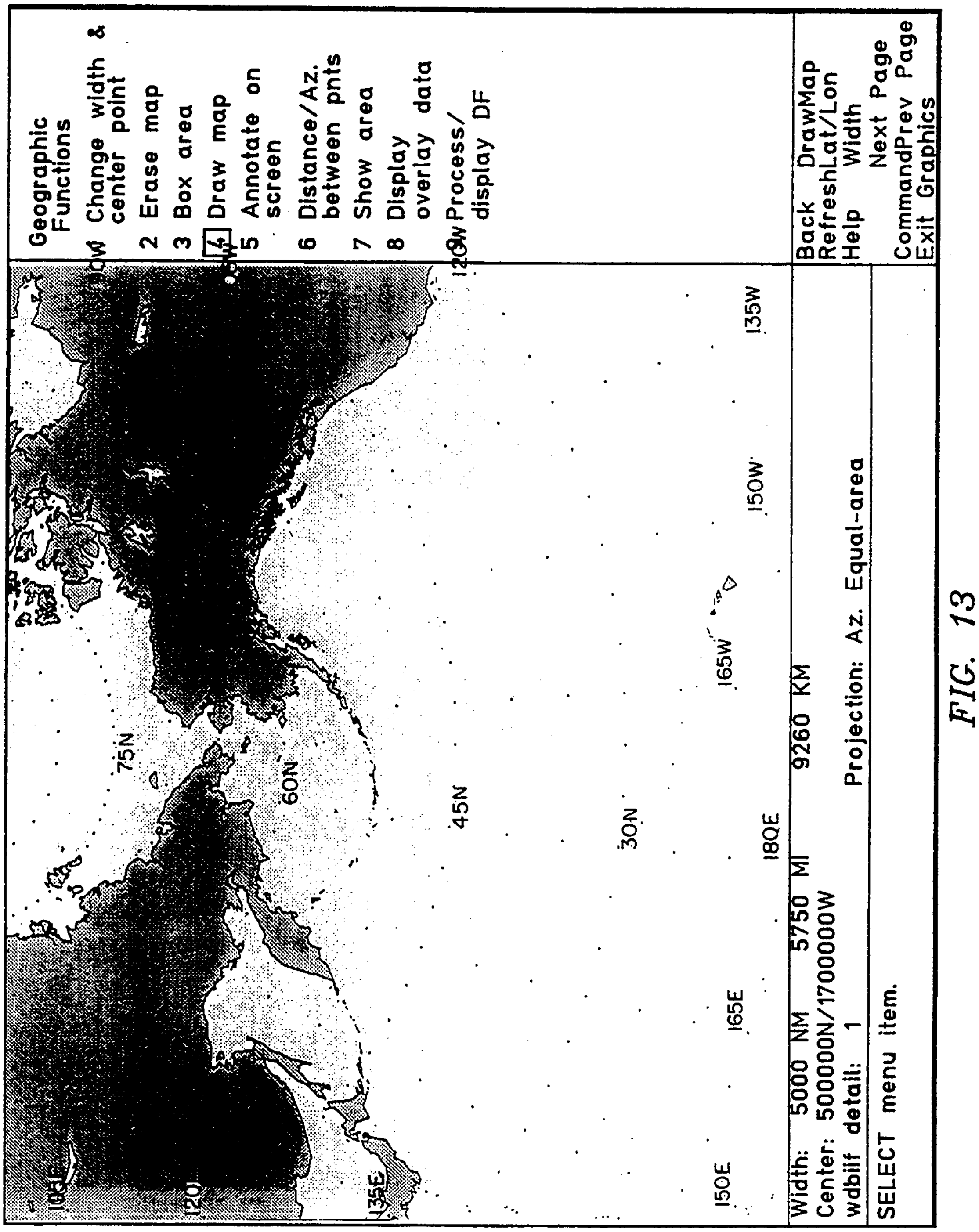
FIG. 13 shows a Geographic Functions Feature menu with Azimuthal Equal-area projection.
Figure 14:
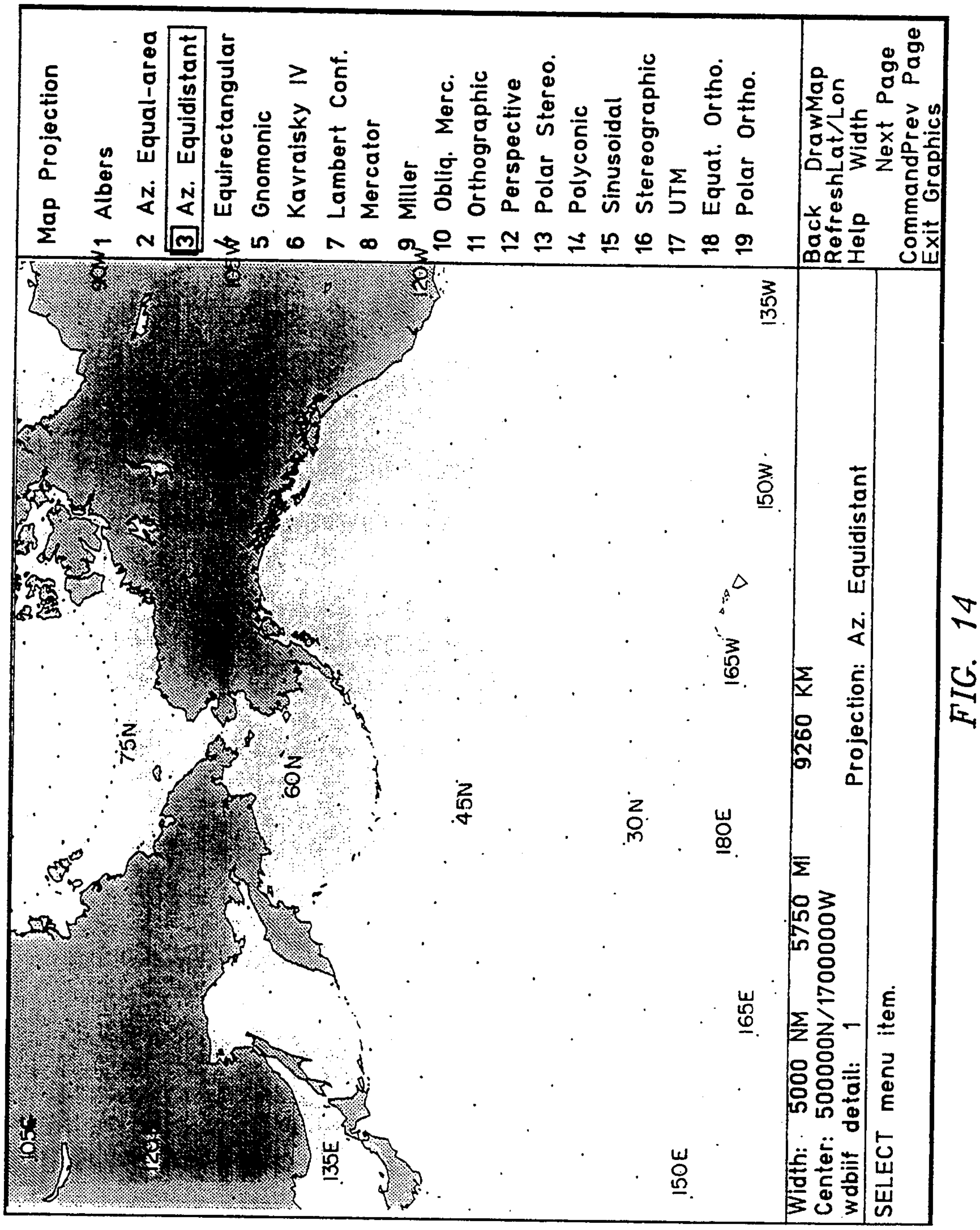
FIG. 14 shows an Azimuthal Equidistant projection.
Figure 15:
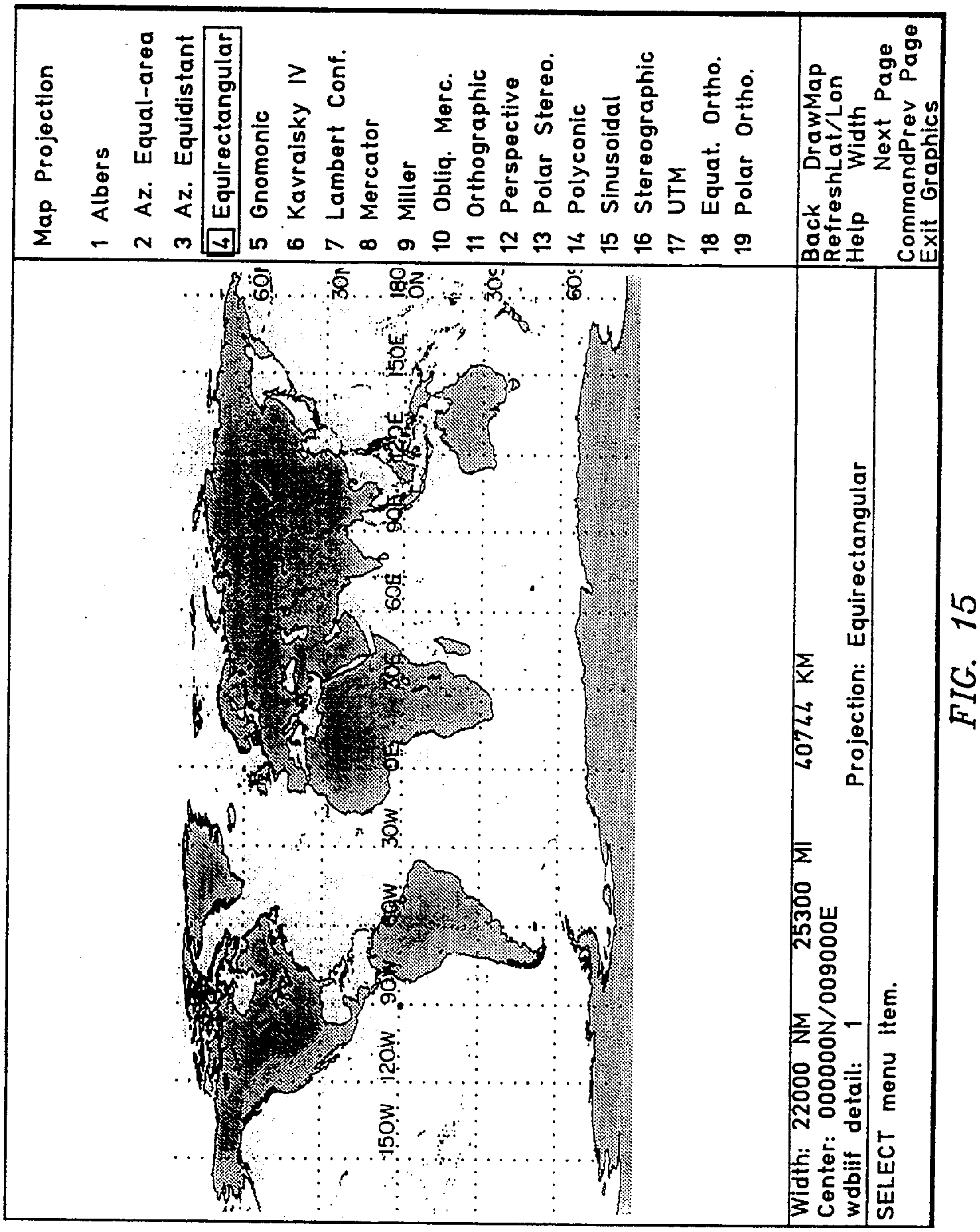
FIG. 15 shows an equirectangular map of the world.
Figure 16:
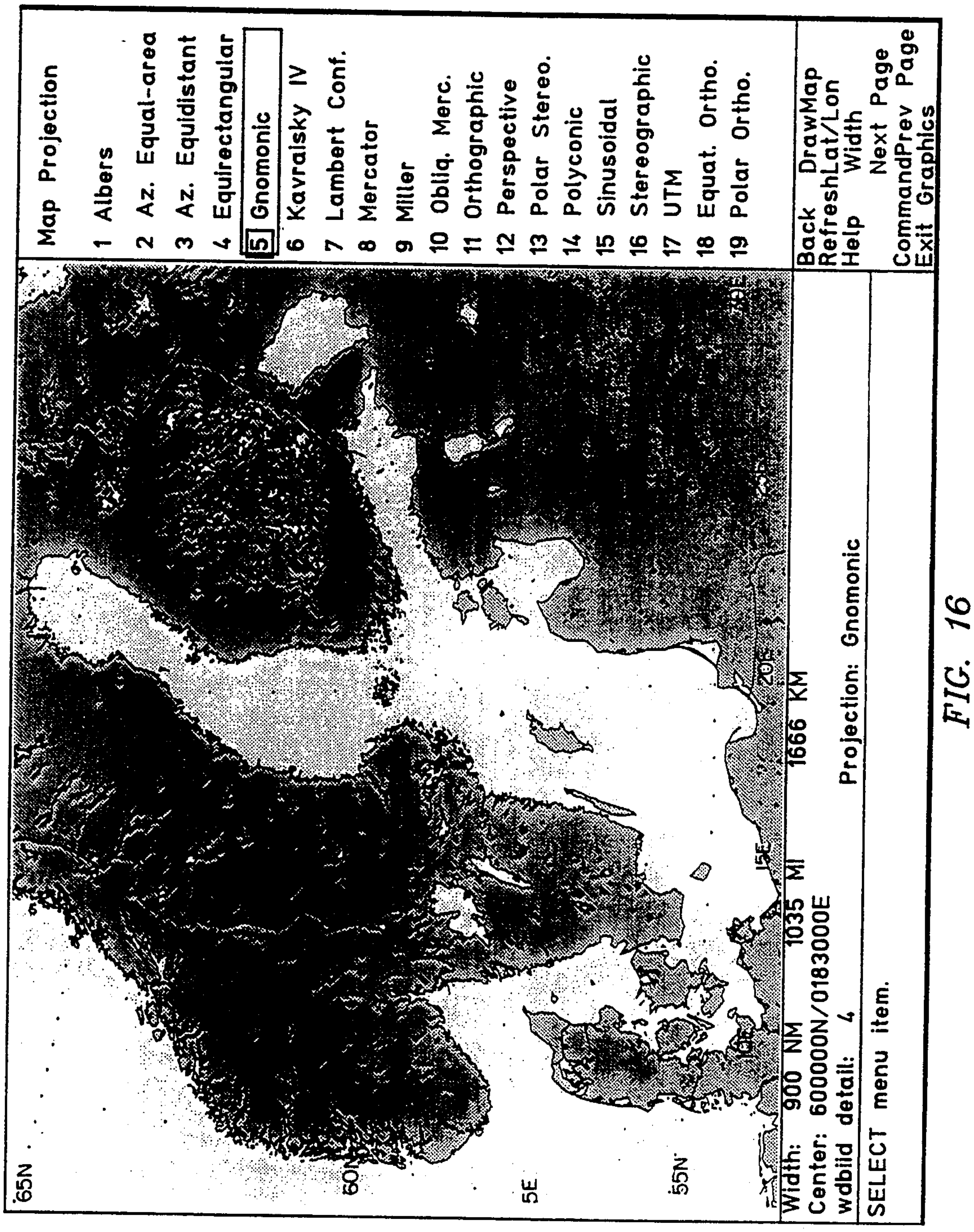
FIG. 16 shows a Gnomonic projection of Baltic Sea region.
Figure 17:
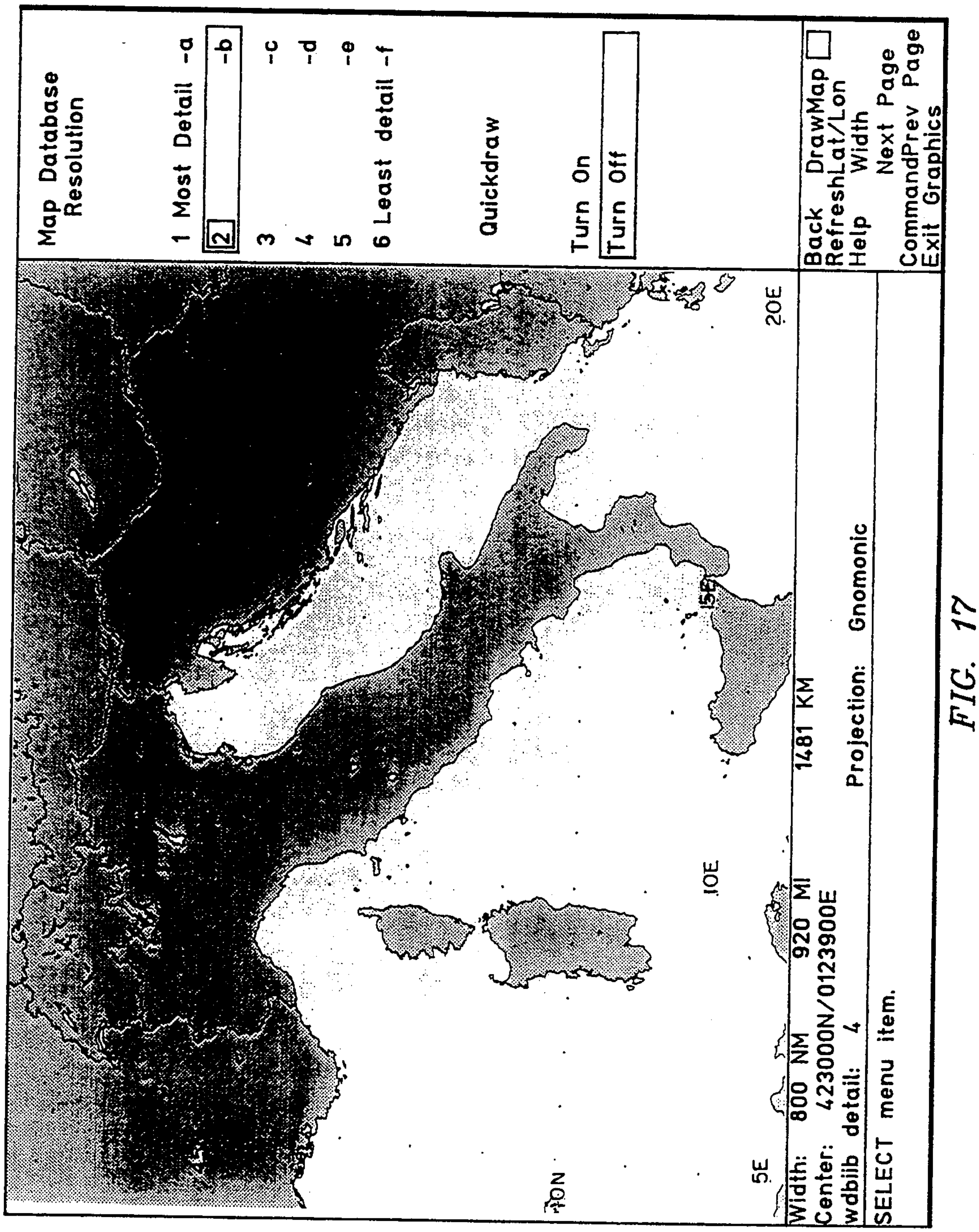
FIG. 17 shows a Map Database Resolution menu using level b with Quickdraw option turned off.
Figure 18:
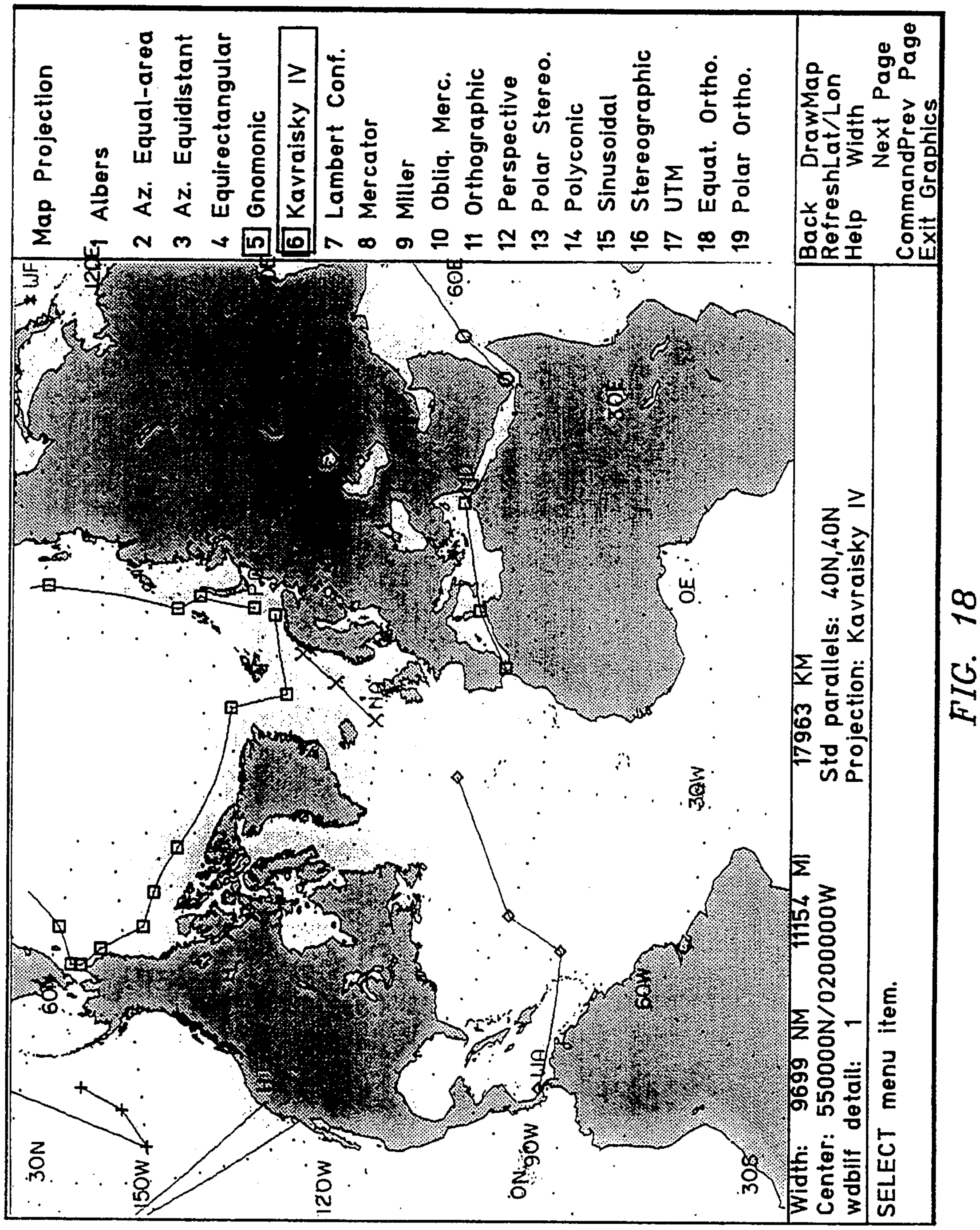
FIG. 18 shows a Kavraisky IV projection with sample tracks illustrating breakline clipping.
Figure 19:
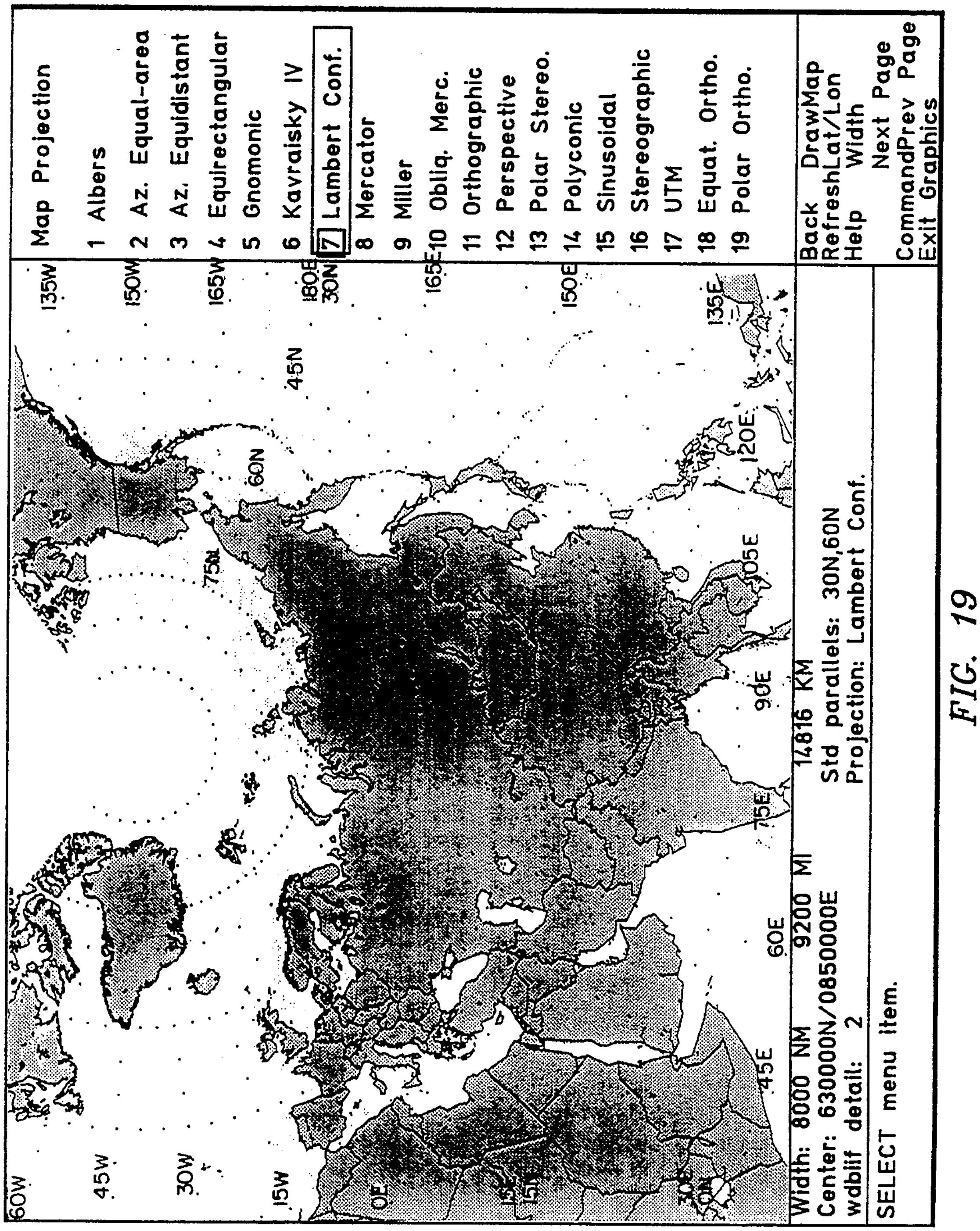
FIG. 19 shows a Lambert Conformal projection of Asia using selected standard parallels.
Figure 20:
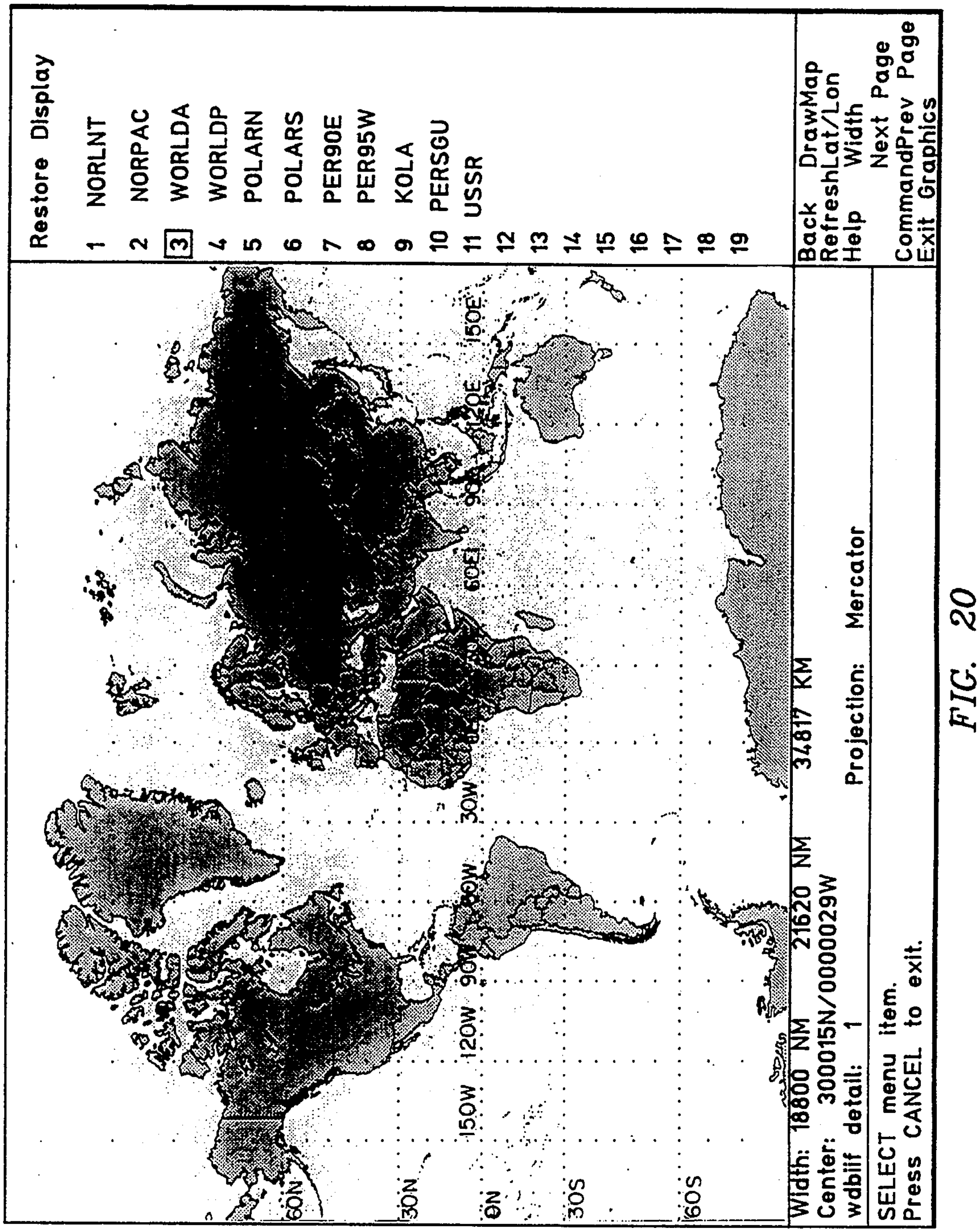
FIG. 20 shows a Restore Display menu using Mercator projection centered near the Meridian of Greenwich.
Figure 21:
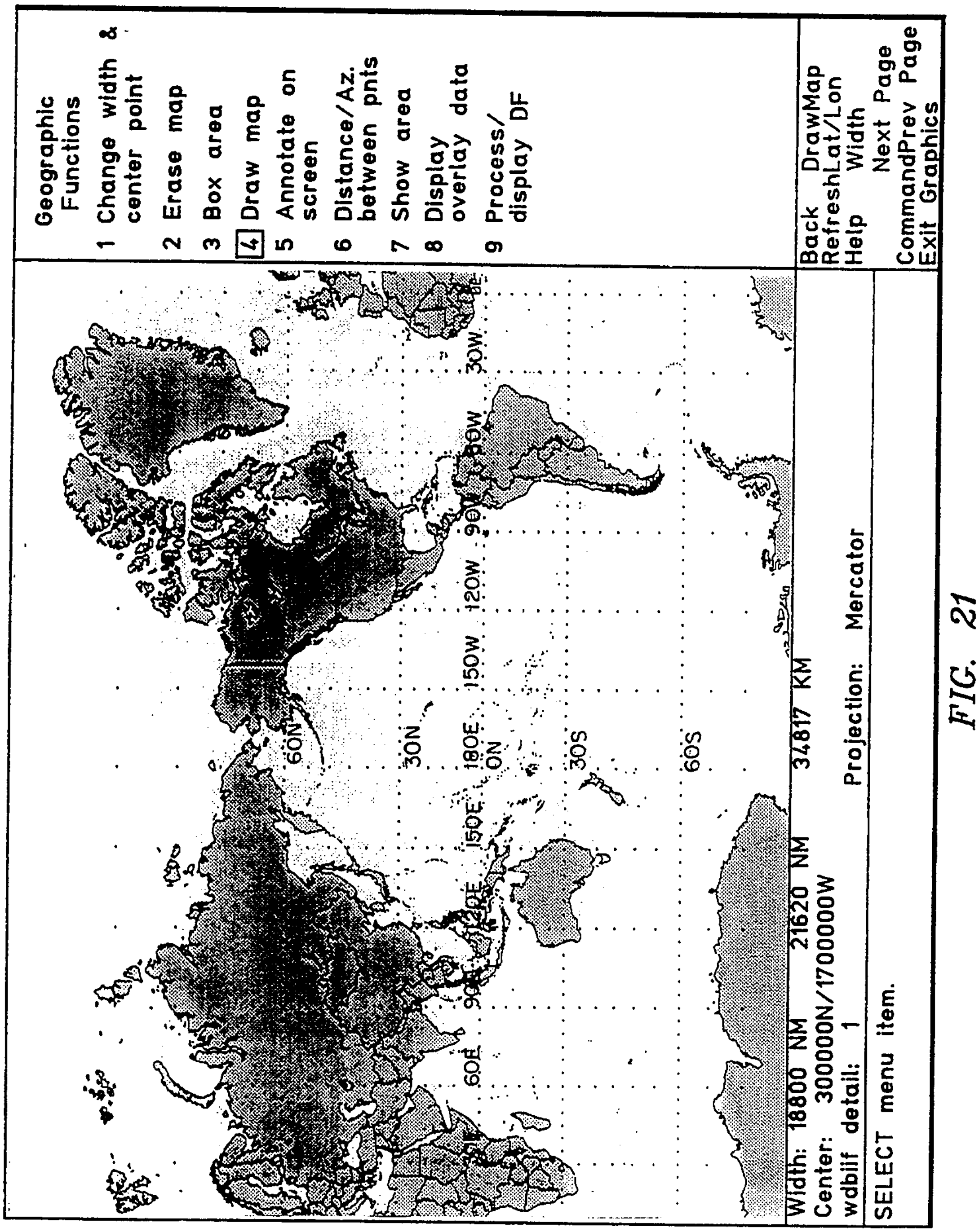
FIG. 21 shows a Mercator projection centered near the International Date Line.
Figure 22:
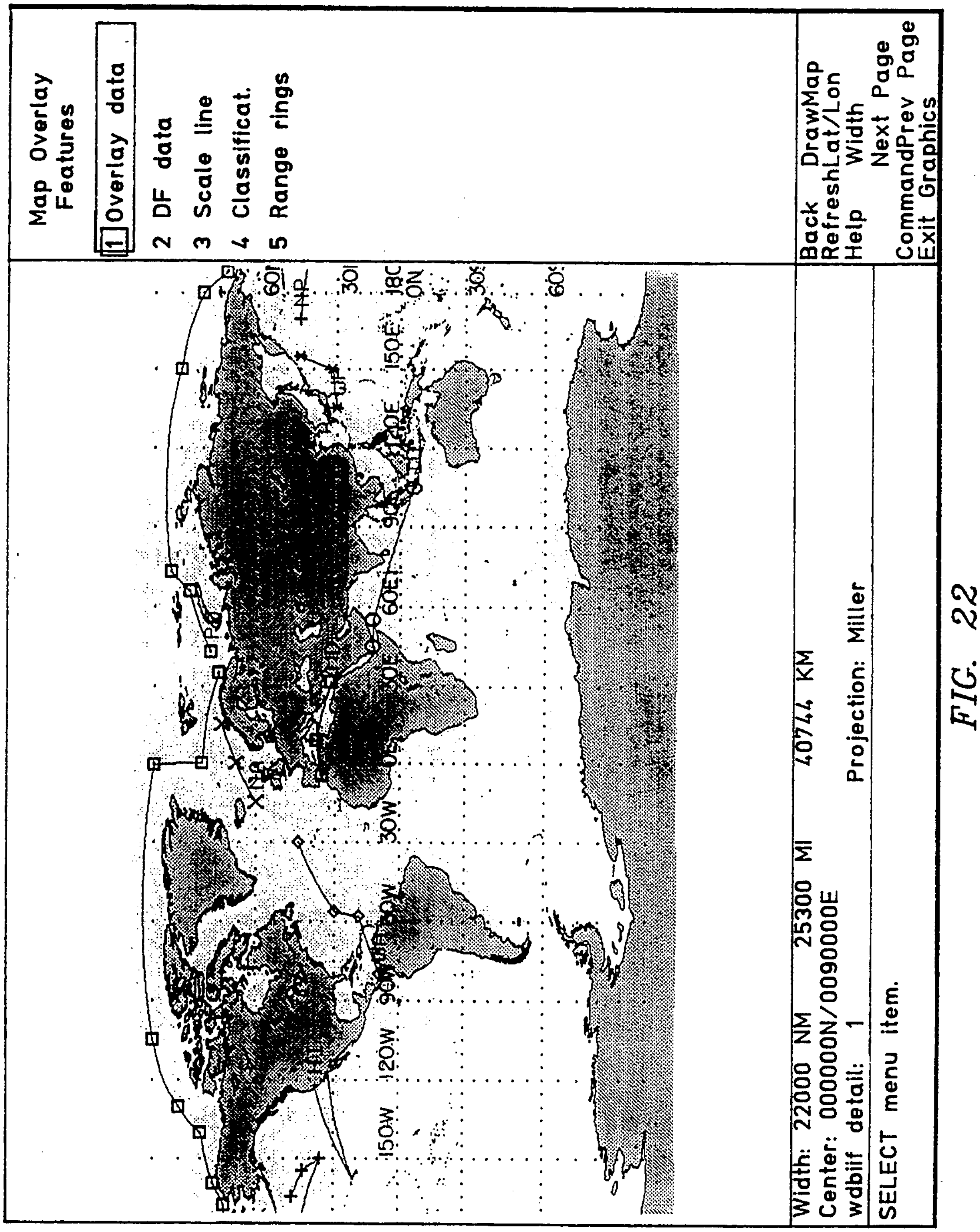
FIG. 22 shows a Map Overlay Features menu with overlay data using Miller projection.
Figure 23:
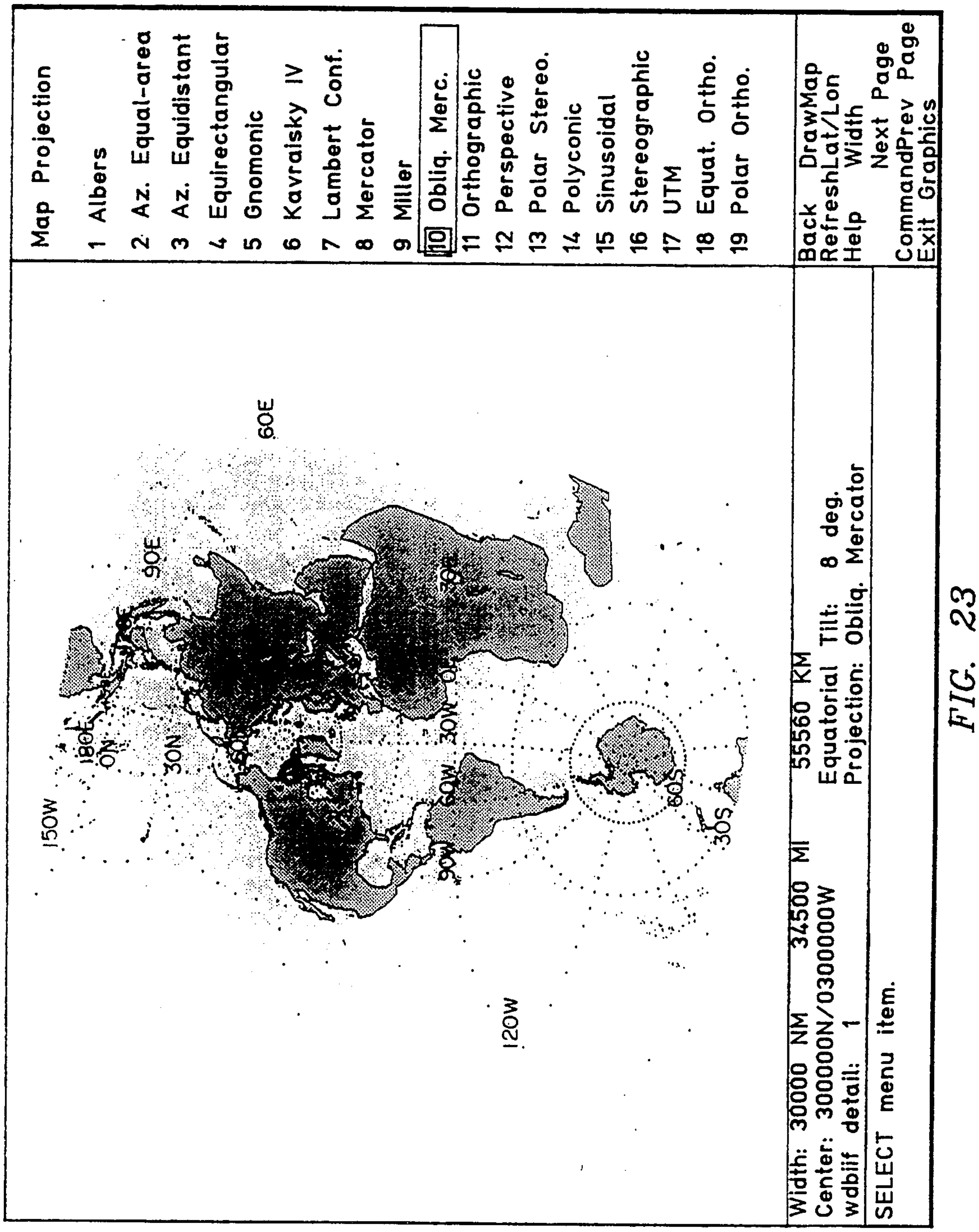
FIG. 23 shows an oblique Mercator projection with an arbitrary equatorial tilt angle.
Figure 24:
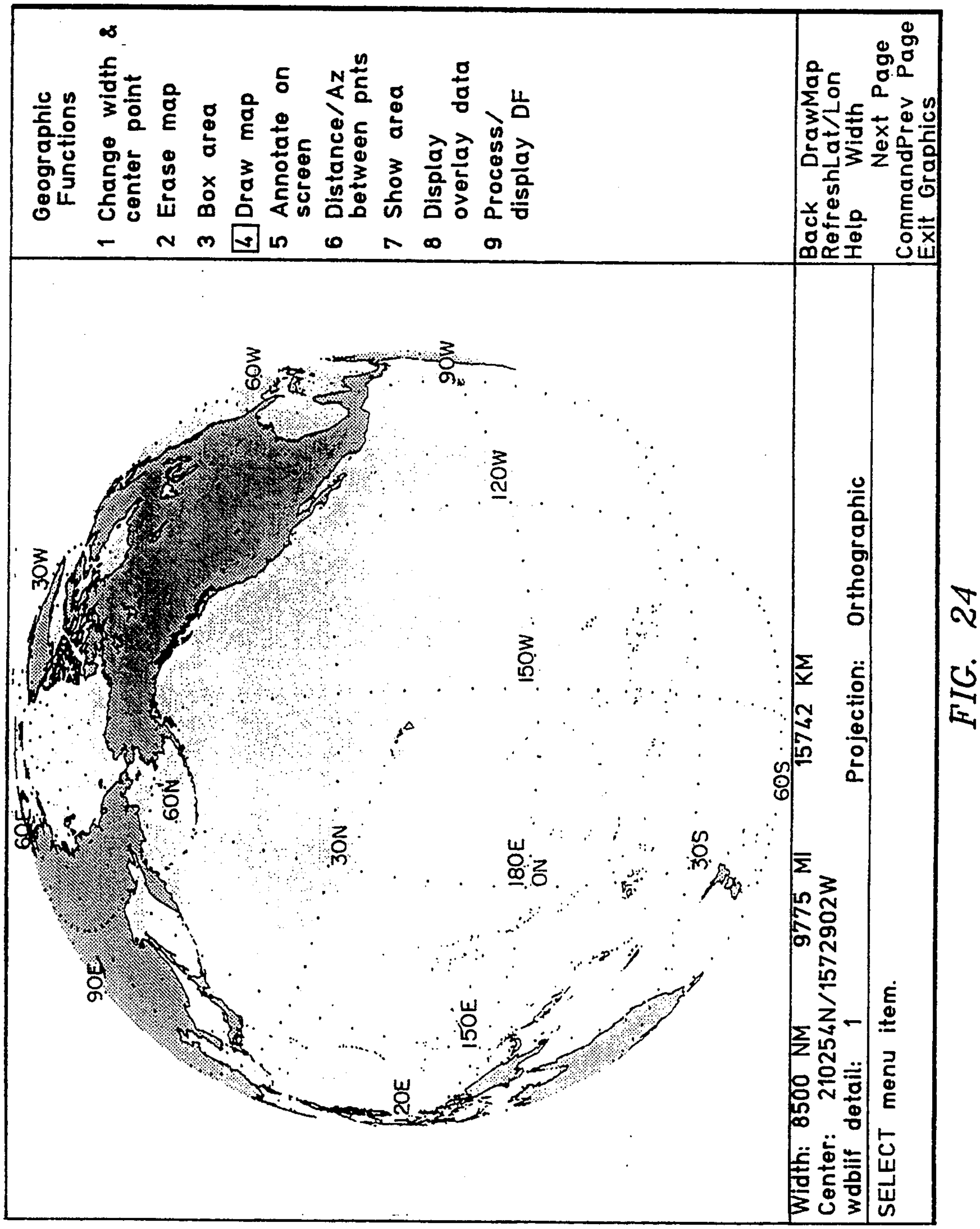
FIG. 24 shows an orthographic projection centered on the Hawaiian Islands.
Figure 25:
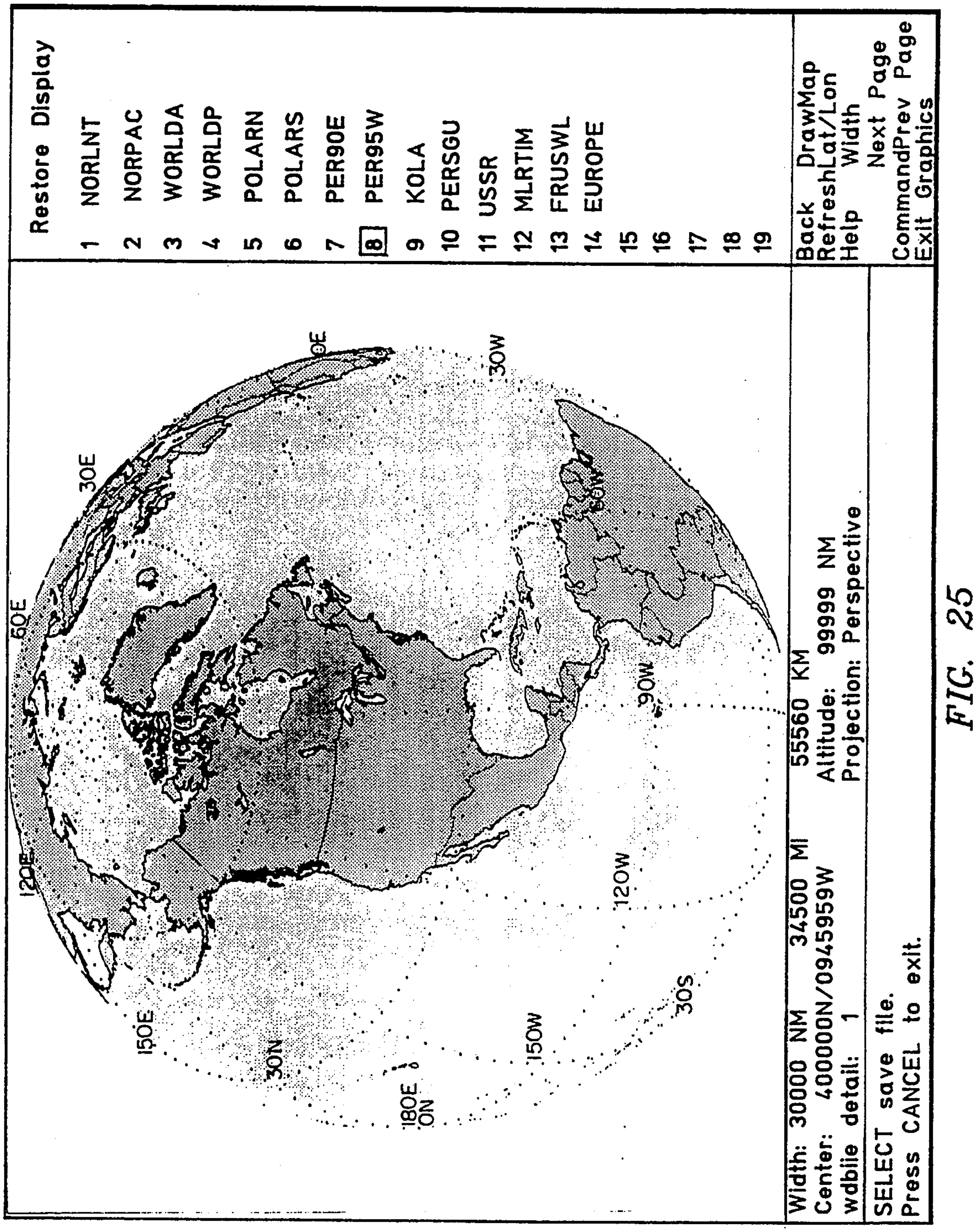
FIG. 25 shows a very high altitude perspective view above the United States.
Figure 26:
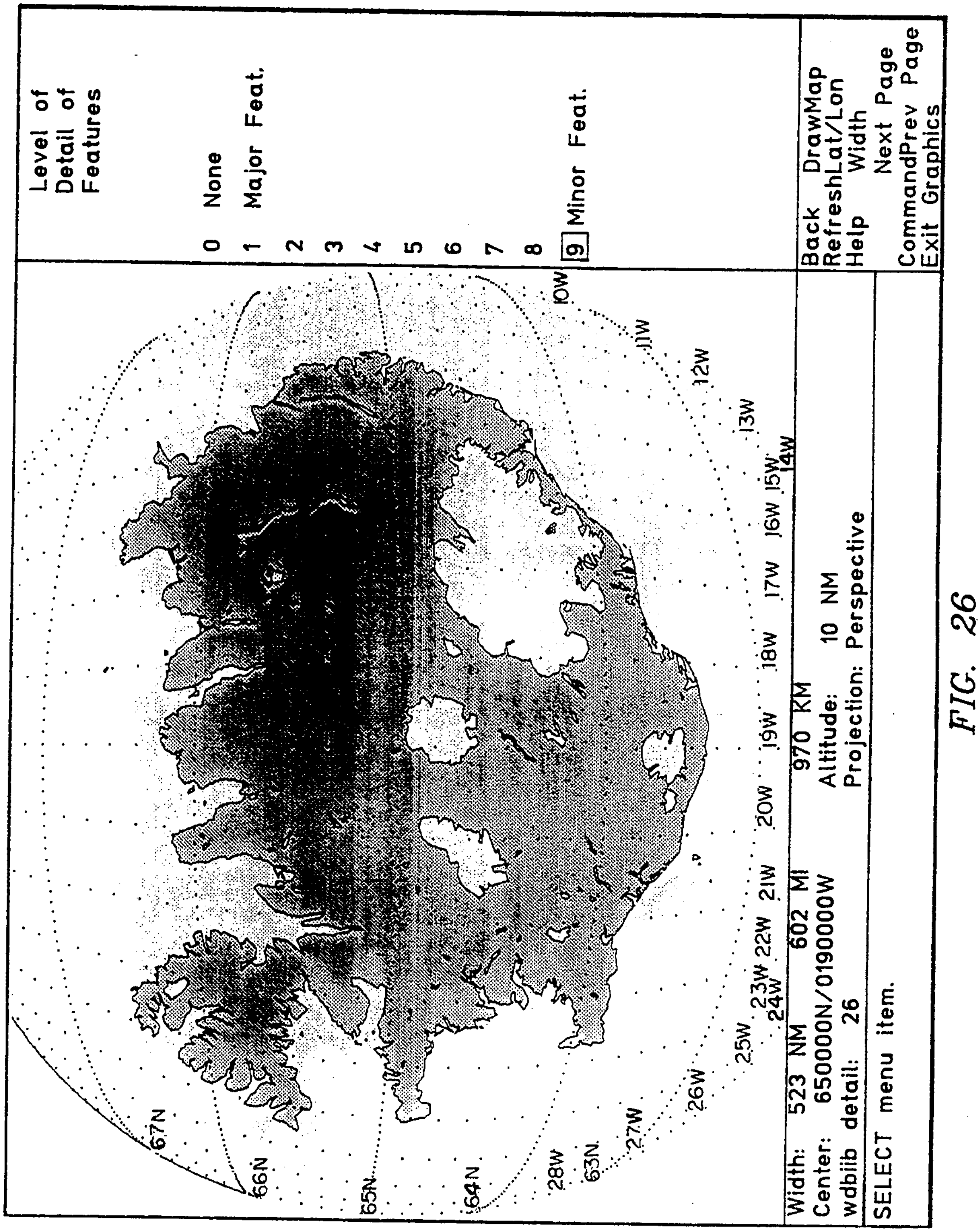
FIG. 26 shows a Level of Detail of Features menu with low altitude perspective view of Iceland.
Figure 27:
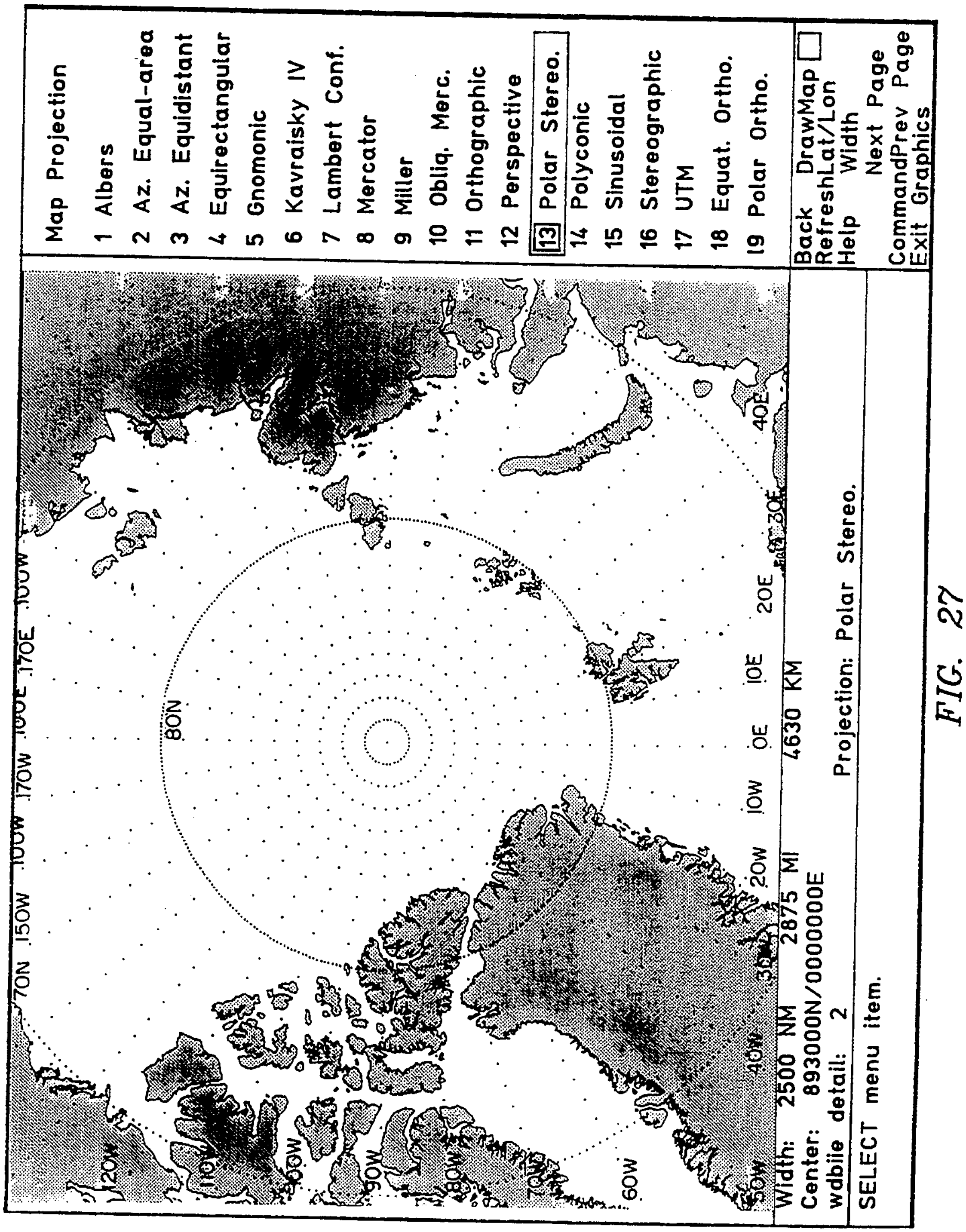
FIG. 27 shows a polar stereographic display centered near the North Pole.
Figure 28:
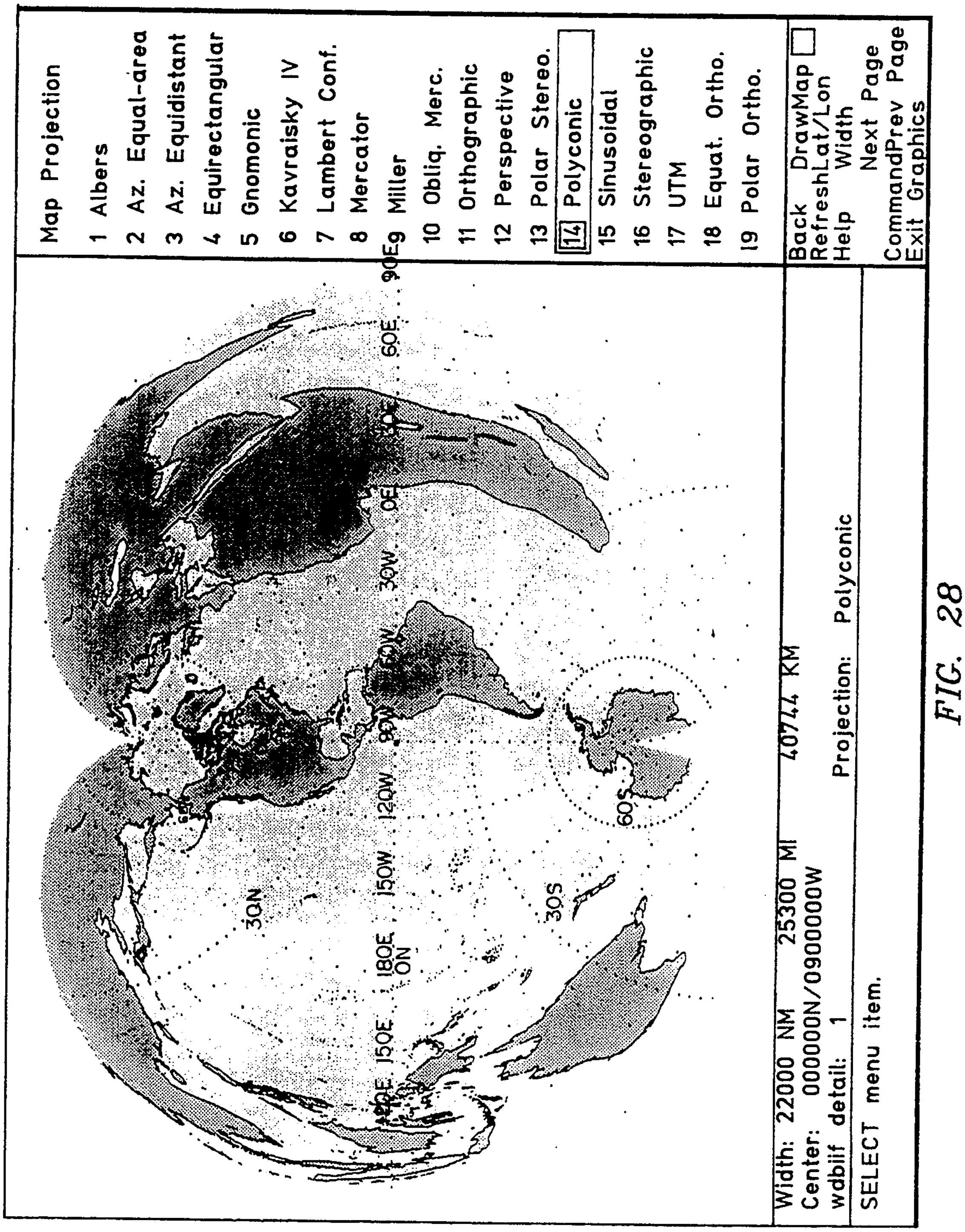
FIG. 28 shows a polyconic projection of entire world.
Figure 29:
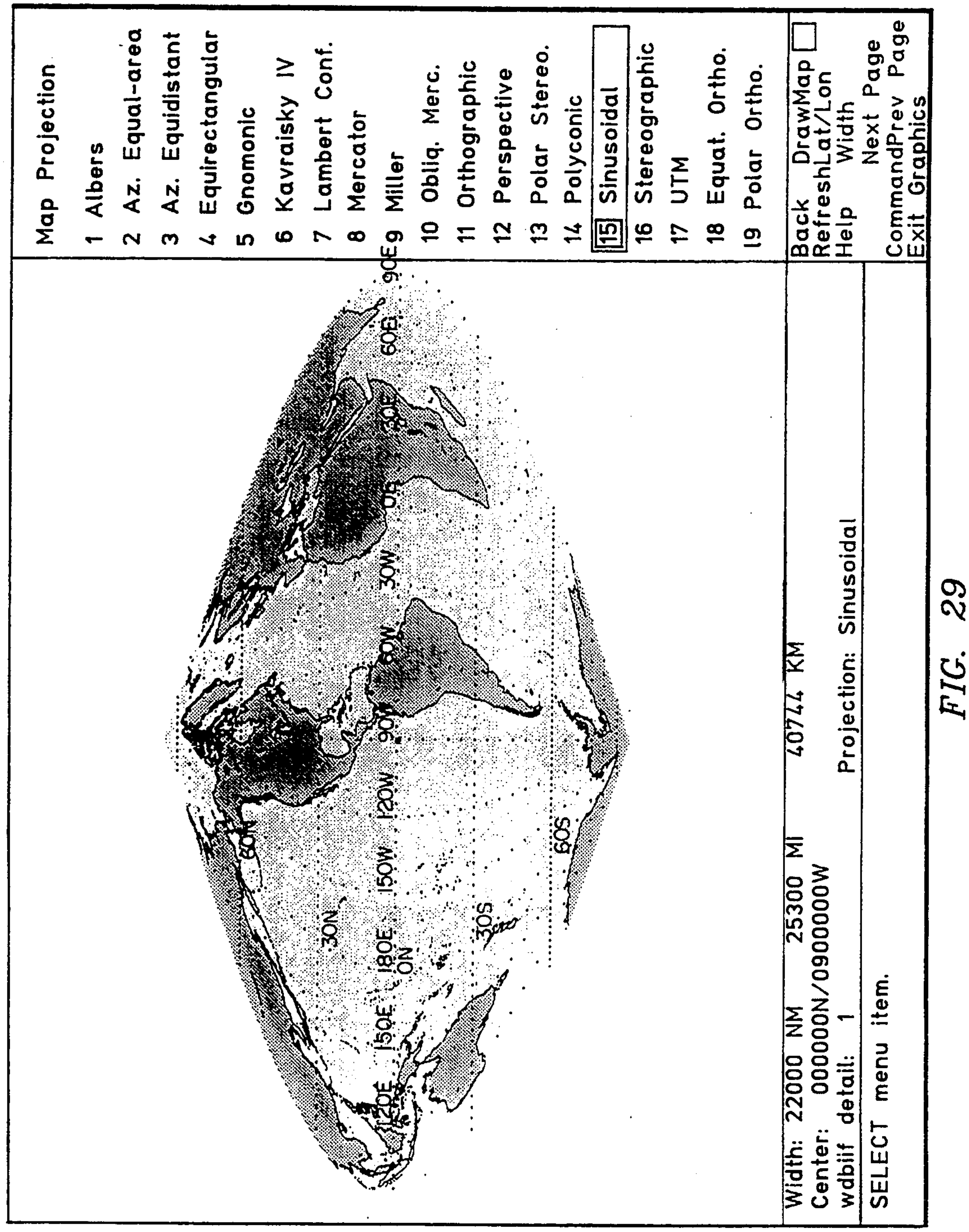
FIG. 29 shows a sinusoidal projection of entire world.
Figure 30:
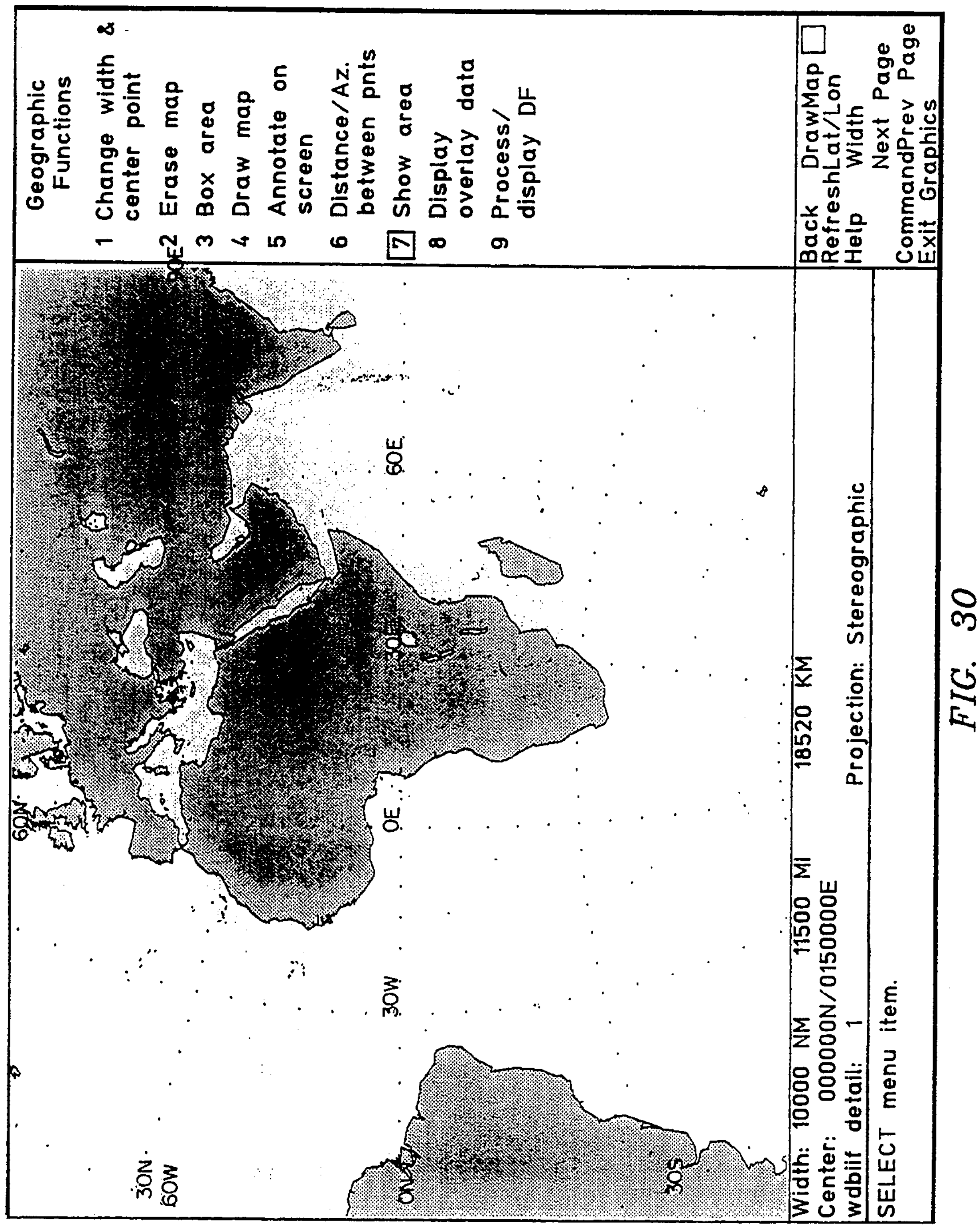
FIG. 30 shows a stereographic projection centered on Africa.
Figure 31:
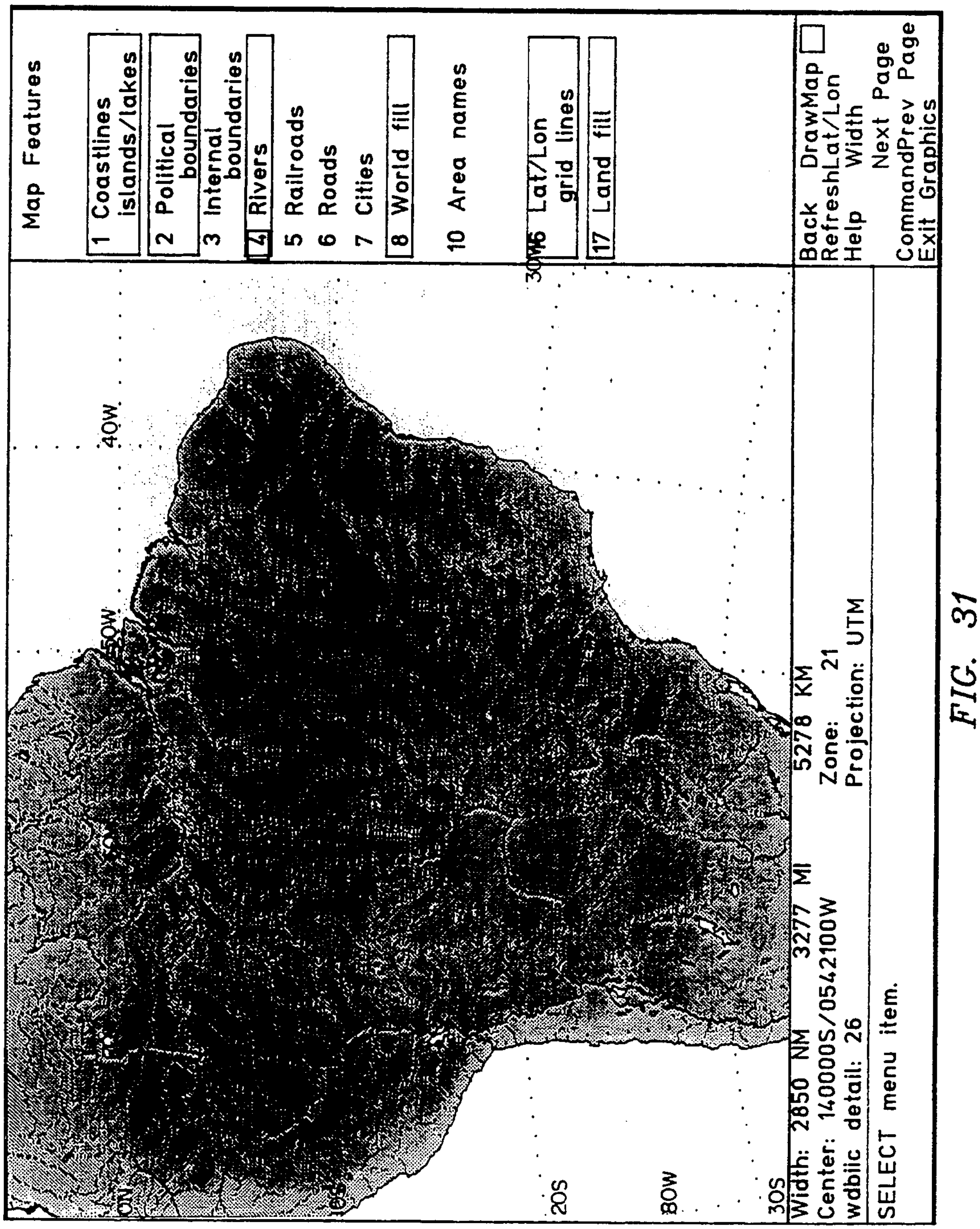
FIG. 31 shows a Map Features menu with Universal Transverse Mercator (UTM) projection showing a portion of South America with political boundaries and rivers.
Figure 32:
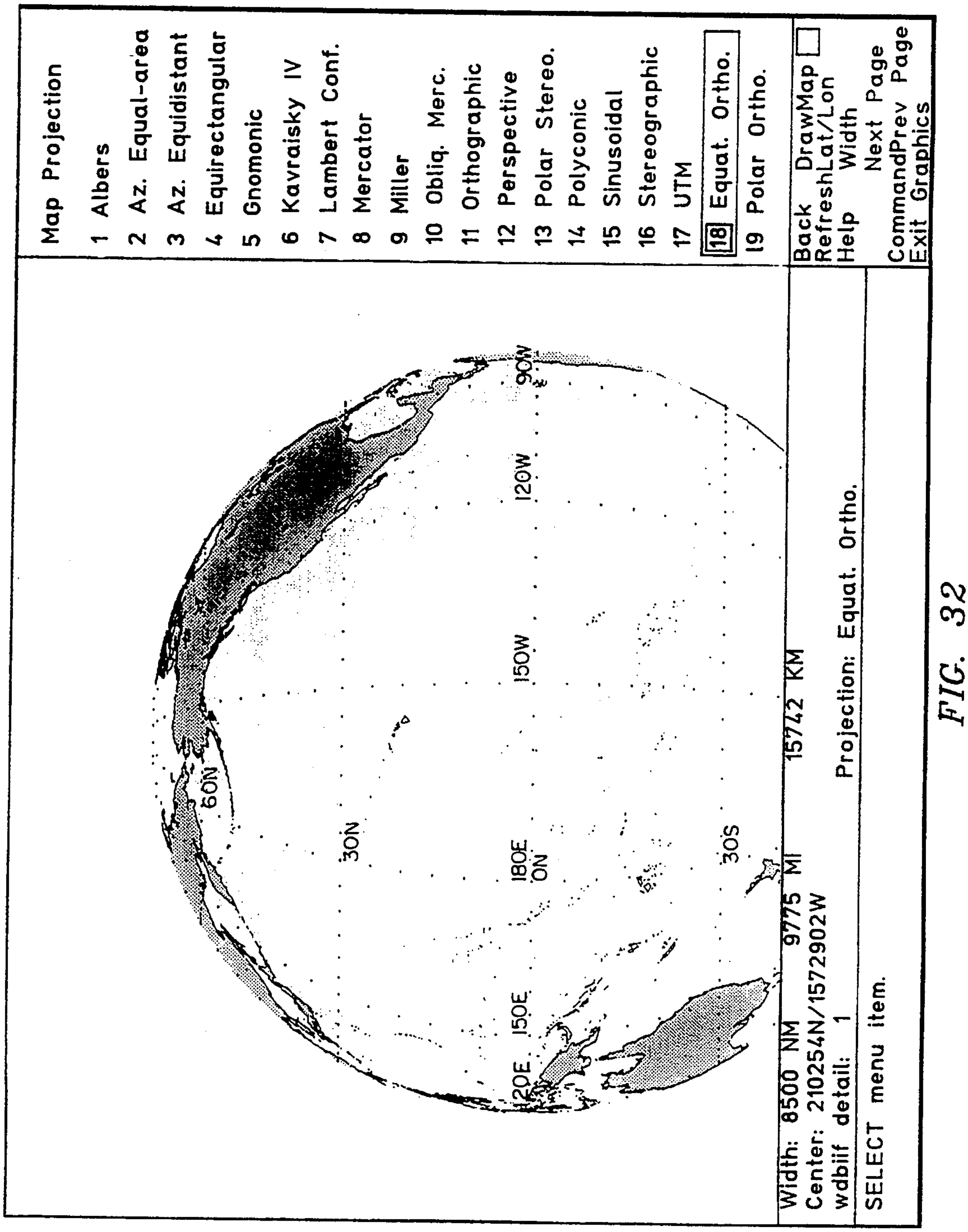
FIG. 32 shows an equatorial orthographic projection centered on Hawaii.
Figure 33:
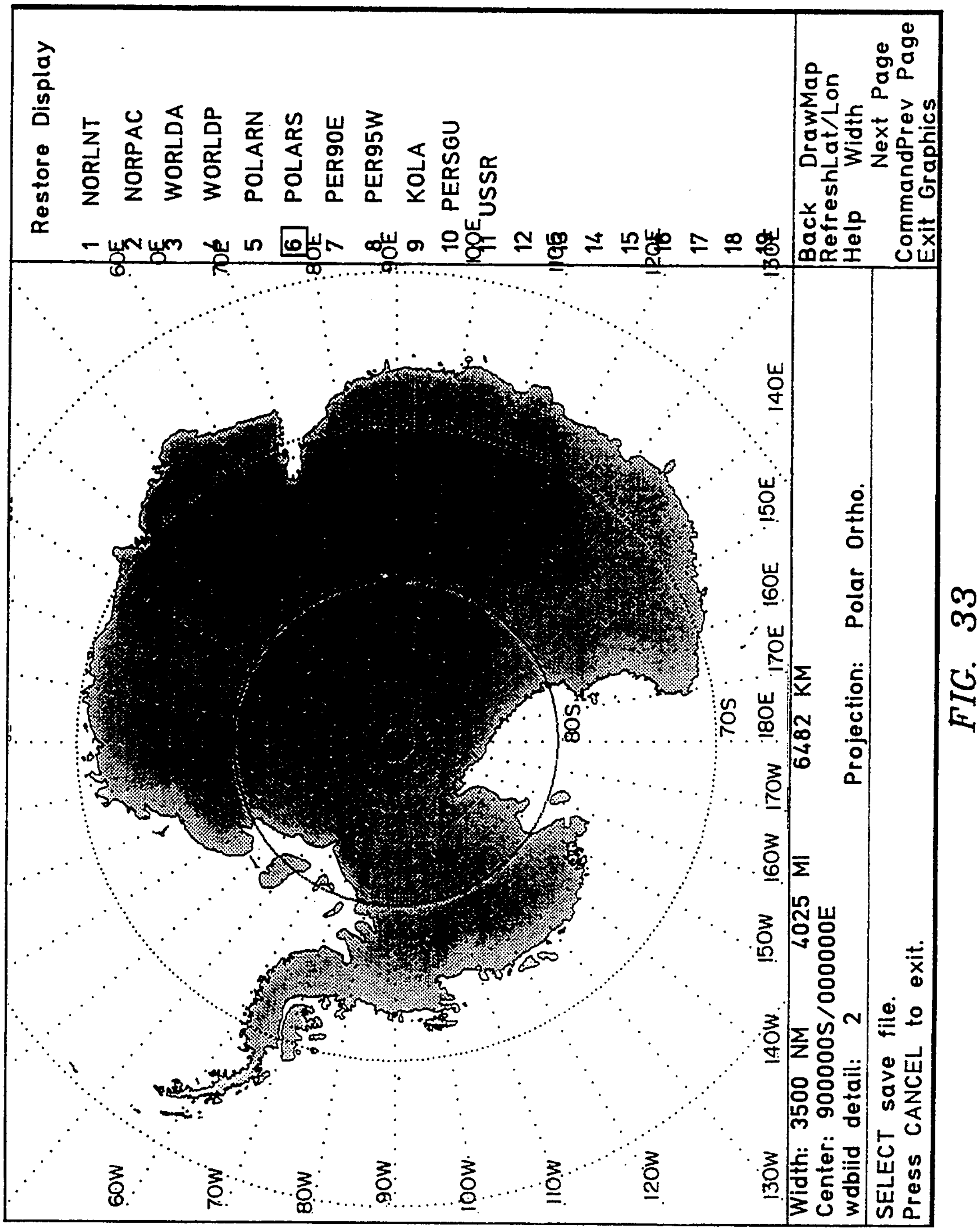
FIG. 33 shows a polar orthographic projection centered at the South Pole.

The Restore Display Feature menu is shown in FIG. 11. This feature allows the user to recall maps which previously have been defined and saved in the Save Display Feature menu. In the example, a Lambert Conformal map of Europe with preselected center point and standard parallels has been drawn. The range ring overlay has 100 nautical mile increments and is centered at The Hague.

The foregoing examples are only illustrative of some of the capabilities of display system 100. Some other possible capabilities are shown in FIGS. 12 through 33. These enumerated examples are not to be interpreted as being limiting, however. Polygon (region filled) maps or other desired displays can be constructed from any data base where closed polygons can be constructed directly, or constructed via additional processing. In other words, the concept of this invention could be applied wherever polylines are used to depict linear and/or areal features. Furthermore, its use is not limited solely to geographical data bases or geographical information. Other data banks, including celestial but not limited thereto, also could be portrayed in a variety of formats, as will be apparent to one skilled in the art to which this invention pertains in accordance with the teachings of this invention.

Displaying world maps requires graphic routines more complex than those commonly used in Cartesian geometry. For example, testing a point for inclusion in a polygonal area is fairly straightforward in plane geometry. However, on a sphere an analogous question comes up which asks, is the point within the smaller of the two regions defined by a spherical polygon? Techniques which allow a visualization on the surface of a sphere versus a plane often require significantly more calculation. If applications covering more than a small geographic region is considered or if tracking objects which have a global range is involved, virtually all geometric manipulation and testing must be done with spherical geometry. Heretofore, conventional soft copy mapping systems have not completely provided this capability since they have been developed from less than a global perspective.

The library of subroutines to be elaborated on below are associated with spherical geometry and polygons. They provide spherical graphic subroutines that are analogous to the familiar two-dimensional drawing and clipping algorithms for both polylines and polygons. The drawing subroutines gracefully handle the singularities, discontinuities, and distortions that are found to occur when mapping the world onto a plane. These subroutines combine to provide projection independent graphics (with some reasonable constraints).

Figure 34:
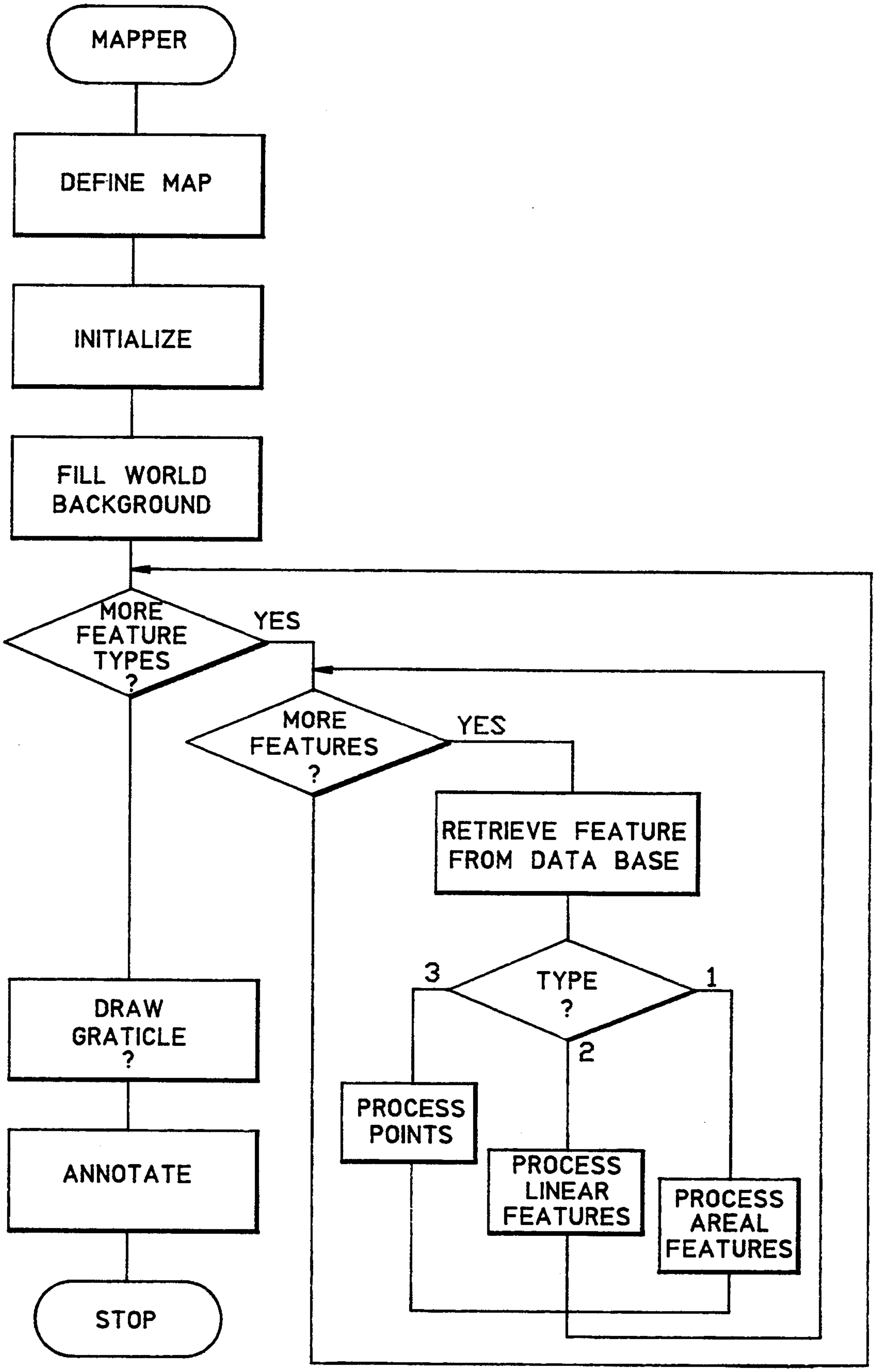
FIG. 34 is a representation of the map drawing process.

Referring now to FIG. 34, the process of generating a map display is set forth in a schematical representation. Specific maps to be displayed are defined by a set of parameters including projection, geographic location of viewport center, geographic location of projection center, scale at center, categories of features displayed, minimum feature size, and vector resolution. Changes in the definition are made by menu item selection and toggling, or by interactive area selection from another map. Coordinates can also be inputted numerically. Once defined, parameter sets can be stored to facilitate future use of the map.

As mentioned before, the CARMAPTH file subroutines in the program listings of the Appendix are the identified subroutines that effect discrete signal transformations of the data in the following description. By these signal transformations the salient features of the invention provide a heretofore unattainable capability.

The entire program is loaded and, after definition of the specific maps by the desired parameters, an initialization is performed by subroutine BLSET which sets up clipping conditions for the map edges. The subroutine INITIA computes any constants and offsets associated with the currently designated projection. The subroutine LIMIT2 calculates the geographic limits of the display. If the "world fill" option has been selected, a fill color, generally blue for water, is used to display a background for the viewable geographical region and is created by subroutine D2OUTL. This geographical region may be bounded by viewport limits, the map geographic limits, or in some projections, a horizon.

Feature categories such as islands, roads, etc., are toggled on and off by the user and the data are accessed by index tables to display them in a proper overwrite sequence with lakes containing islands, and with linear or point features after areal ones. Point features are written directly by placing a point or other marker directly on the display. Linear features are subjected to clipping at the map edges in accordance with the subroutine BLPLIN and plotted in great circle line segments by the coaction of the subroutine LL2GC. Areal features are drawn by converting data base polylines into closed polygonal areas and is accomplished by subroutine DMAPII, removing any projection singularities that may lie inside the areas is accomplished by the operation of subroutine BLSING, and clipping at the map edges is attributed to subroutine BLPLGN.

Upon completion of all the selected features, a map graticle is superimposed and a legend box is displayed such as, for example, those shown next to the map display area on each of the preceding figures.

The conversion of geographic and display coordinates is performed by the subroutines which contain a basic set of polyline mapping routines, one for each of the projections which apply specific map transformations in accordance with the subroutines PXALBR, PXAZED, PXAZEA, PXEQRE, PXGNOM, PXKAVR, PXLAMC, PXMERC, PXMILL, PXOBLM, PXORTH, PXOREQ, PXORPO, PXPERS, PXPOLY, PXPOST, PXSINU, PXSTER, PXUTMZ AND PXVDGN depending on what map projection is desired. It is to be noted that the subroutine PXVDGN is unused presently to allow capability expansion. All of these subroutines have a similar structure facilitating projection additions or modifications. A typical subroutine maps latitude/longitude from a unit spheroid onto a plane of projection, then applies a two-dimensional viewing transformation so that the area displayed can be scaled, offset and rotated with respect to the projection center. Data such as center location, geographic span, standard parallels and reasonable default values for unspecified parameters are placed in storage common to all the projection routines. These data are used when the user switches between any of the projections, resulting in a presentation of approximately the same geographic area. In the event an input point cannot be mapped uniquely onto the plane of projection or if it lies over a perspective viewing horizon, an invalid flag is set to allow exception processing.

Subroutine LLPLXY allows projection independent conversion of geographic polylines to display coordinates for the currently specified projection. It is simply a case statement which selects the coordinate conversion subroutine containing the mapping equations for the specific projection. The basic idea is to isolate projection specific mathematics to this subroutine level, allowing higher level graphic routines to call it in a projection independent manner. This makes installation of a new projection very simple since all that is required is to add a new case statement along with its associated conversion subroutine, such as, PXALBR et seq.

The calculation of the geographic coordinates which correspond to any point on the display is performed by an iterative method that is independent of projection. This capability by the operation of subroutine XY2LL is of major importance in soft-copy mapping and can be troublesome to achieve since not all projections have simple inverse transformations. A two-dimensional iterative (Newton-Raphson) method is used to avoid the complexity of maintaining a complete set of inverse mapping equations. The iterative technique is essential to convert from screen coordinates to latitude/longitude coordinates. The Newton-Raphson method is accomplished by subroutine XPGENR and makes use of the mapping equations that are invoked for latitude and longitude to display conversion. For many projections there is no closed solution form.

Figure 35:
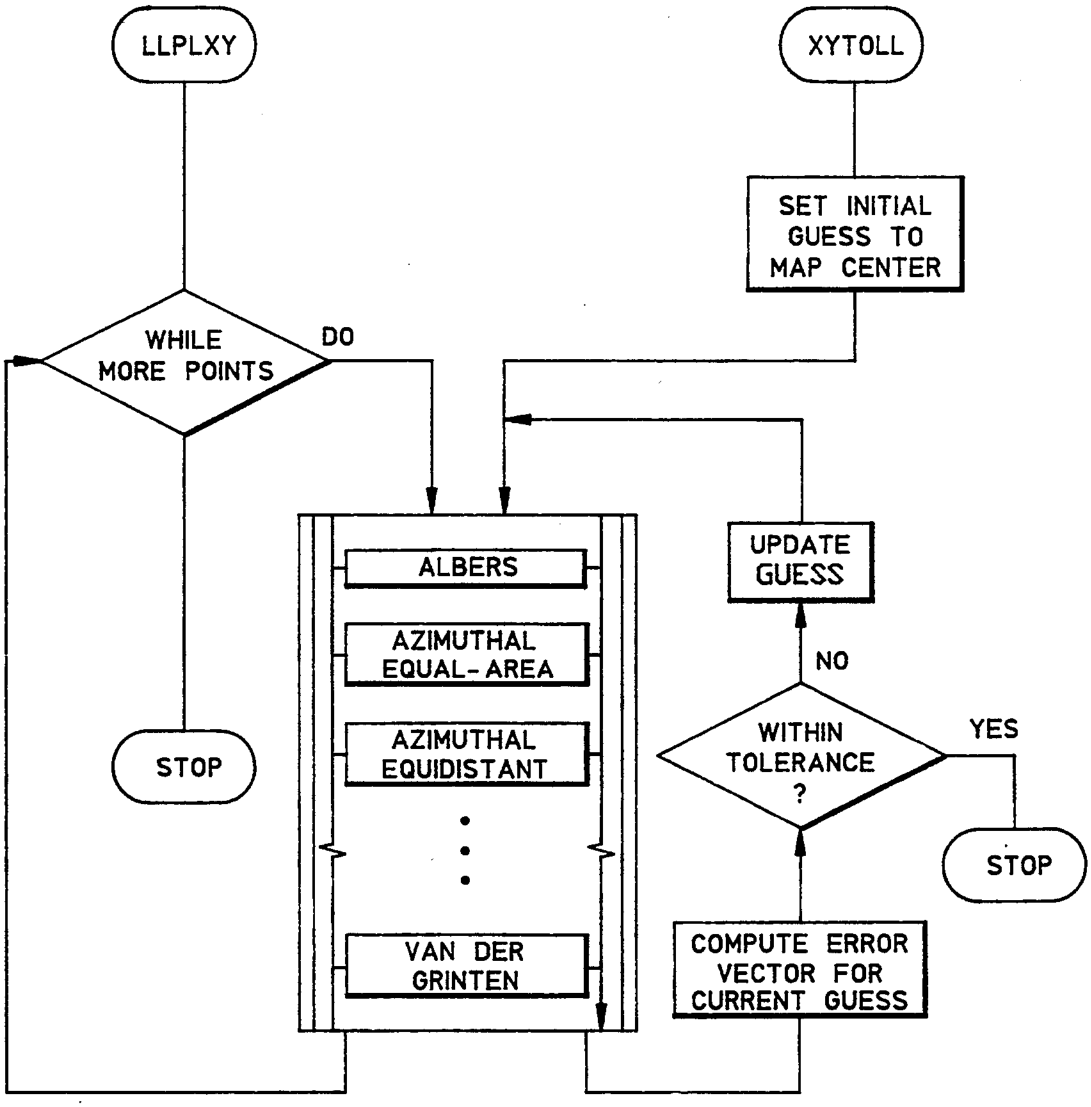
FIG. 35 represents the use of a common library of mapping equations to provide projection independent conversion to and from map locations.

The following special boundary conditions are set up to ensure that the iteration does not wander outside of the valid map domain and to increase the probability of convergence. First, perturbation direction for calculating partial derivatives is set up so that it is always away from the nearest pole. Secondly, iteration is not allowed to wander all the way to a pole, but can get close enough to return a satisfactory solution should one lie near or at a pole. Thirdly, the maximum arc distance for any single iteration is 10 degrees. In practice an average of 12 iterations is required to locate points. However, efficiency is not important since the routine mainly is used for single point measurements. This method works well on all projections tested except for azimuthal equidistant and azimuthal equal-area, both of which have extreme angular distortion near their singular antipodal points and require either additional constraints or a closed solution form which is provided by the subroutines XPAZEA and XPAZED. The coordinate conversions are illustrated schematically in FIG. 35.

Projection independent, feature plotting on a generalized map is accomplished as a consequence of robust graphic algorithms. These algorithms result from considering the various boundary conditions of a generalized conic projection. Map projections historically have been divided into three major categories with each having distinctive appearances.

These are, first, azimuthal, where any position is plotted radially from a central point; second, cylindrical, where points are projected from a central axis onto the cylinder which is then developed onto a plane and, third, conic, where points are projected from a central axis onto a cone and similarly developed onto a plane.

Actually, oblique conic projections, where the central axis can be positioned on any diameter of the spheroid, are sufficiently general to include all three of the categories named in the preceding paragraph. When the central angle of the cone reaches 90 degrees, azimuthal projections centered at the apex are generated. At the other extreme where the cone angle is 0 degrees, the cylindrical projections are generated.

Figure 36A:
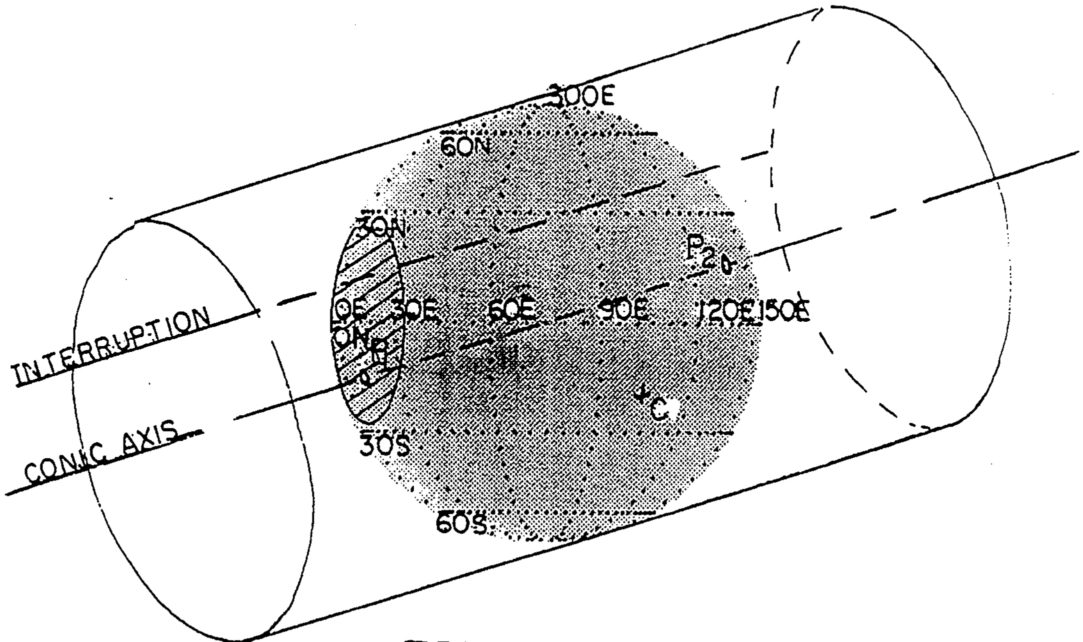
Figure 36B:
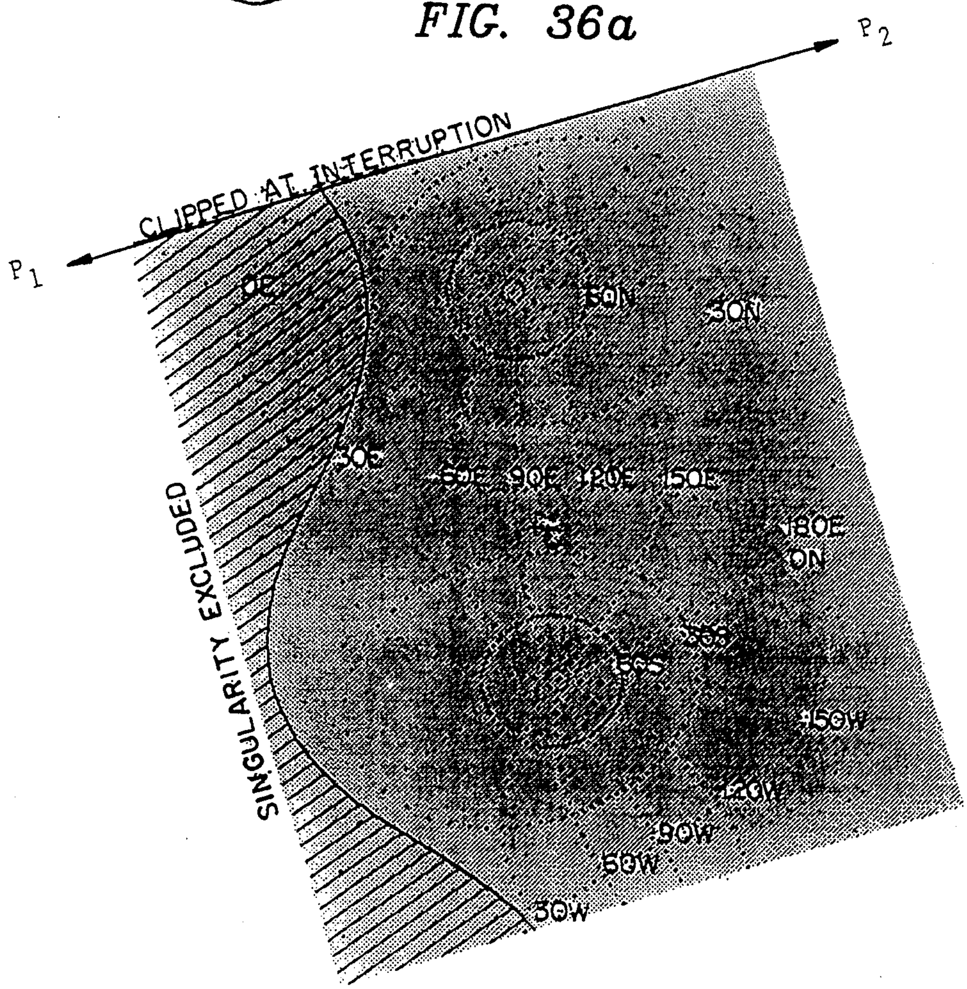
Figure 37A:
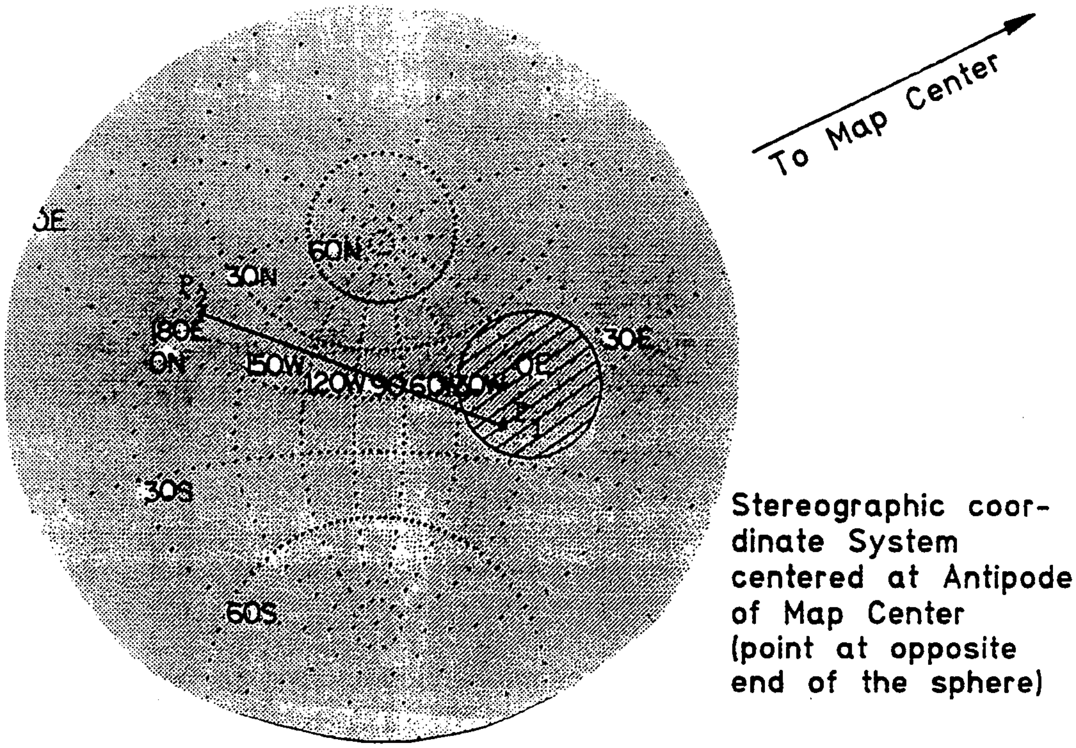
Figure 37B:
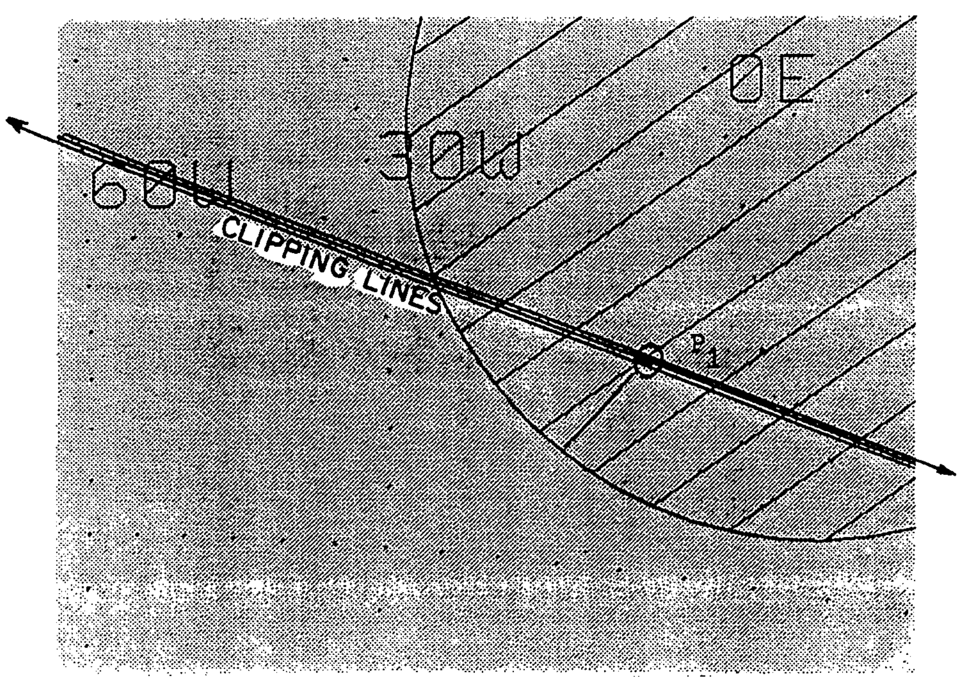

When generating graphic displays for an oblique conic, there are boundary cases which must be handled with special processing. These boundary cases are: first, the line along which the cone is separated (the interruption line) to allow development of the conic surface onto the mapping plane and where all areal and lineal features must be clipped, and second, the points on the great circle of the interruption where the axis of the cone intersects the earth spheroid (the oblique poles). The oblique poles may or may not be mapped in a one-to-one fashion, and polar singularities are common. Other points along the interruption usually are mapped one-to-two defining two of the map boundaries. Having the immediately foregoing in mind, plotting techniques have been developed for a generalized map which includes, but is not limited to, oblique conics. Also included are mappings where the great circle of the interruption is reproduced as a curve. The map projections handled by this inventive concept are all those where discontinuities may occur only along a single great circle interruption, and where singularities, or one-to-many mappings, may only occur at two diametrically opposed points on that interruption. FIGS. 36*a* and 37*a* display the interruption line and singularities of an Oblique Mercator map.

The clipping of features on the generalized map is performed in accordance with the following. During the initialization of a new map, points defining the interruption line are set up in accordance with the specified subroutine BLSET. The interruption is always passed through the point 90 degrees from an oblique pole and on the opposite side of the spheroid to the mathematical map center. The line is oriented along the great circle which lies in the same plane as the axis of the cone (tilt angle). The points at the end of the clip line are not placed exactly at the poles, but are displaced a very small distance toward the midpoint allowing calculation in projections where the poles are singular.

For mathematical simplicity, all analyses involving the interruption are done in rectangular plane coordinates superpositioned on a stereographic projection of the spheroid centered on the interruption line, midway between the two oblique poles. This stereographic projection has several well-known and attractive properties. These are, all points on the spheroid except the one diametrically opposed to the projection center have a one-to-one mapping. Another property is that the map contains no discontinuities and there are no angular distortions. Any great circle passing through the projection center, hence the great circle on the interruption is mapped to a straight line. In order to clip features to both boundaries of the developed cone, two separate clip lines are used. They are set up in the interruption centered stereographic projection and area parallel to the interruption, but displaced a small distance to each side of it. Map features which intersect the interruption are clipped at each of these straight lines.

With respect to polygon clipping, any polygon which has the possibility of intersecting the interruption must be clipped and the resulting polygon segments plotted individually- Clipping at the interruption involves three steps: first, any areal features are transformed into the interruption centered stereographic projection by operation of the subroutine BL2XY, next, conventional planar polygon clipping is applied to each of the straightened clip lines as a consequence of the subroutine BLPLGN, and finally, the transformation is inverted, taking the resulting multiple feature segments back to spherical coordinates via the subroutine BL2LL. Each segment finally is converted to display coordinates by the operation of subroutine LLPLXY and plotted.

Areal features have the additional problem of possibly containing unplottable points. Region filling or hatching of a polygon containing an oblique pole or antipole is accomplished by excluding the possible singularity or singularities from the interior region. This is done by appending polyline segments, tracing a path inside the polygon along the interruption to the proximity of the included pole, circling around the pole at a radial distance just large enough to allow point calculation, and then retracing the interruption back to the original polygon edge (by the operation of subroutine BLSING). The total geographic area cut from the feature by this process is negligible. All points remaining inside the modified polygonal area are insured a one-to-one mapping to a large number of common map projections. When the outline of the appended region is mapped into the final projection, it coincides with the exterior map boundary, both at the interruption and at the poles. FIGS. 36*a* and *b* and 37*a* and *b* are representative depictions of the steps performed in polygon clipping.

With respect to polyline clipping, linear features such as platform tracks are always clipped at the interruption. Again, the method is to perform clipping in a coordinate system where the interruption is a straight line. Should the output polyline pass close by a singularity, a very small gap is inserted to avoid it by the subroutine BLPLIN.

The display system also possesses the capability for circumventing polygon vertex limits. High resolution geographic data bases also pose a problem associated with polygon length. While most of the polylines in any data base will be quite short, fractal-like shorelines can sometimes have thousands of vertices. Most modern graphic display terminals have special purpose hardware for rapid filling of polygons, but they also have a relatively low limit on the maximum number of vertices in any individual polygon. In at least one popular display system, the limit is only 66 vertices, totally unsuitable for map accuracy depiction of natural geographic features. In order to exploit the very desirable hardware filling capability of this inventive concept, a binary polygon dissector subrouting JPOLG2 is included which is transparently invoked whenever an attempt is made to fill polygons exceeding a system specific limit. Large polygons are clipped in an iterative manner on the display plane until all resulting subsections are sufficiently reduced- The subroutine associated with this operation is characterized in FIG. 38.

Another feature of the display system is its great circle polyline plotting capability. Polyline is a well established graphics term that refers to a connected sequence of line segments. Very detailed and high density data, such as a shoreline, can be transformed into map coordinates and directly plotted using straight line segments. On the other hand, it is necessary to display polyline segments as great circles with features, such as country boundaries or graphic overlays, where there is a significant distance between sequential points. Great circle plotting becomes particularly important when the polyline passes through a map region possessing high geometric distortion.

Polylines can be conditioned so as to accurately map with great circular segments by adding intermediate points at regular map intervals along the bearing between adjacent input vertices. Subroutine LL2GC of program 50 in computer 40 performs this task, transforming the character of the data from source 30 by recomputing geographic polyline vertices based on differential map distances in the currently selected projection. Thus, this signal transformation ensures smoothly plotted great circle segments. It also eliminates any segments which project to lengths below map resolution that would otherwise add nothing to the display quality. The output polyline may contain fewer or more vertices than the input, but for any projection, the number will approximate the minimum required to exceed specified map accuracy, see FIG. 39.

One of the problems associated with working any mapping data base is to reconstruct or aggregate polylines into closed polygonal regions. Modern geographic information systems are designed with this sort of retrieval in mind so reconstruction should be fairly easy. World Data Bank II, on the other hand, was digitized many years ago and was designed for use with pen plotters to produce line maps. Closed areas were not a consideration. Coastal shorelines were stored as fragments having no particular direction, and with end points that do not exactly coincide with those of matching fragments. In a few rare instances, the shoreline even crosses itself. With this lack of constraints on digitization, devising a signal transformation algorithm that constructs closed polygons would be very difficult. The solution chosen was to make an auxiliary file having the same format as WDBII and in it, store point sets which, when appended to the original shoreline polylines, result in closed polygons. These polygons overlap geographically, fully covering the land masses of the world. A transformation in subroutine DMAPII has been included to control the WDBII reconstruction process, retrieving data from both files. It can generate either outlined, color filled or filled and outlined land areas. When displaying filled areas the appended point file was used, and when outlining areas, only the original data are plotted.

The signal transformations of data provided by subroutines which are set forth in the Appendix and referred to above, are herebelow grouped together by functionality. These subroutines all are found in the CARMAPTH file. An Index at the end of the Appendix is included to aid a reader in finding the location of the details of the subroutines in the Appendix. The Polyline is a well established graphics term that refers to a connected sequence of lines segments. The subroutines which are associated with geographic coordinate comparisons are LIMIT2, EAST1, CK4ALL, and CK4ANY and assure the establishing of geographic coordinate relationships. The subroutines for great circle calculations are DA2LL, LL2DA, and LL2GC and assure the transforming to a great circle polyline format. The subroutines for background and overlays are D2OUTL, FTPRNT and RNGRIN and assure the selecting of background and overlay features. The subroutines for spatial tests on great circle polygons are SPGTST, SPGINT, SPGRAD, PINSPG, and SPGCVX and assure the determining from the inputted data, spatial relationships between spherical polygons. The subroutines for interruption line processing are BL2LL, BL2XY, BLPLGN, BLHATC, HATCH, BLPLIN, BLSET, BLCHK, and BLSING and assure the processing to provide clipping and singularity removal at the map interruption lines to allow the display of curved surface features in a flat plane. The polygon clipping subroutines are CLIPLG and JPOLG2 and assure the clipping of polygons by lines so that portions can be displayed as separate areas. The subroutines for projecting geographic coordinates onto maps are LLTOXY, LLPLXY, and PXALBR, PXAZED, PXAZEA, PXEQRE, PXGNOM, PXKAVR, PXLAMC, PXMERC, PXMILL, PXOBLM, PXORTH, PXOREQ, PXORPO, PXPERS, PXPOLY, PXPOST, PXSINU, PXSTER, PXUTMZ AND PXVDGN and assure the projecting of geographical coordinates onto a defined map display. The subroutines for calculating inverse of projections are XYTOLL, XPSTER, XPAZED, XPAZEA, XPGNOM, XPGENR, NRSYST, and NRFCN and assure the providing of the inverse transformations to latitude/longitude which is the inverse of geographic to display coordinates.

Obviously, many modifications and variations of the present invention are possible in the light of the above teachings. It is therefore to be understood that within the scope of the appended claims, the invention may be practiced otherwise than as specifically described.

```
C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        ADCLOS
C
C FUNCTIONAL DESCRIPTION:           .
C
C CALLED BY:                        OPENIN
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE adclos

      INTEGER   sunit,lunit,punit
      PARAMETER (punit = 67)
      PARAMETER (lunit = 68)
      PARAMETER (sunit = 69)

      CLOSE(sunit,IOSTAT=ierr)
      CLOSE(lunit,IOSTAT=ierr)
      CLOSE(punit,IOSTAT=ierr)

      RETURN
      END

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        ADDTRK
C
C FUNCTIONAL DESCRIPTION:           .
C
C CALLED BY:                        DATPOL
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine addtrk (datrec)

c this routine adds a data record to the on-line array of data records
c programmer: avw

        integer           arrpos
        integer           bgnpos
        integer           endpos
        integer           holdsg
        integer           lctrak
        integer           ltypov (16)
        integer           newloc
```

```
      integer          numrcs
      integer          segnam
      integer          srchdx
      integer          tfaddx
      integer          tfadtm
      integer          tkoset
      integer          tnewst
      integer          toldst
      integer          trkndx (1000)

      character*5      alert
      character*2      pddg
      character*2      repnum
      character*2      series
      character*9      newdtg
      character*9      tfddtg
      character*9      tnewtm
      character*9      toldtm

      character*160    datrec
      character*160    trkrec (1000)

      logical  trackn
      logical  alflag
      logical          ltonov (16)
      logical          rankt (26, 16)
      logical          segact (1000)
      logical          spprsd (1000)
      logical          timflg
      logical          visibl

      common /trkdbc/  trackn
      common /maptoo/  ltypov, ltonov, rankt
      common /numrcs/  numrcs
      common /segact/  segact
      common /spprsd/  spprsd
      common /tarbou/  tnewst, toldst
      common /tfadez/  tfaddx, tfadtm
      common /tfddtg/  tfddtg
      common /timpos/  bgnpos, endpos
      common /tkoset/  tkoset
      common /trcbou/  tnewtm, toldtm
      common /trkndx/  trkndx
      common /trkrec/  trkrec

      data lctrak      /3/

      if (trackn) then
         print *, 'enter addtrk:'
         print *, '   tfaddx = ', tfaddx
      end if

      newdtg = datrec(bgnpos:endpos)

c check that new data record is not older than oldest on-line record

      call cmptim (newdtg, toldtm, timflg)

      if (timflg) then

c increment index number

         tnewst = mod (tnewst, numrcs) + 1
c if segment currently exists, delete segment
c otherwise, take next number in sequence and add offset

         if (trkndx(tnewst) .ne. 0) then
            segnam = trkndx(tnewst) + tkoset
            if (segact(trkndx(tnewst))) then
               call jpurge (segnam)
               segact(trkndx(tnewst)) = .false.
            end if
         else
            segnam = tnewst + tkoset
            trkndx(tnewst) = tnewst
         end if
```

```
c add data to data record array

           trkrec(trkndx(tnewst)) = datrec

c search backwards from newest data to place record by time

           srchdx = tnewst - 1
           if (srchdx .eq. 0) then
              srchdx = numrcs
           end if
   10      continue
           if (trkndx(srchdx) .eq. 0) then
              timflg = .true.
           else
              call cmptim (newdtg,
     +              trkrec(trkndx(srchdx))(bgnpos:endpos), timflg)
           end if
           if (timflg) then
              newloc = mod (srchdx, numrcs) + 1
              if (newloc .ne. tnewst) then
                 holdsg = trkndx(tnewst)
                 arrpos = tnewst
   20            continue
                 arrpos = arrpos - 1
                 if (arrpos .eq. 0) then
                    arrpos = numrcs
                 end if
                 trkndx(mod(arrpos,numrcs)+1) = trkndx(arrpos)
                 if (arrpos .ne. newloc) then
                    go to 20
                 else
                    trkndx(arrpos) = holdsg
                 end if
              end if
           else
              srchdx = srchdx - 1
              if (srchdx .eq. 0) then
                 srchdx = numrcs
              end if
              go to 10
           end if
c
c          compare time in new record with fade time to see if
c          this plot should be plotted
c
           call cmptim (newdtg, tfddtg, visibl)
c
c          if so, and if tracking is turned on, create a new retained
c          segment for this plot and display it on current map.
c
           if (visibl) then
              if (ltonov(lctrak)) then
c
c***             plot the data on the screen
c
                 call seghnd (segnam, datrec)
c
c               check for alert field being active, if so, display warning
c               window on screen
c
                read (datrec, 50, err=200) alert,pddg,series,repnum
   50           format (30x, a5, a2,a2,a2)

                alflag = .false.
                do 60 i = 1,5
                   if (alert(i:i) .ne. ' ') then
                      alflag = .true.
                   endif
   60           continue
c
c                  freeze tracking without warning messages.
c
cas                if (alflag) then
cas                   call warning(alert, pddg, series, repnum)
cas                 endif
```

```
                    segact(trkndx(newloc)) = .true.

                 else
c
c                   if tracking not on, then mark this entry in the
c                   segact (segment active) array as false.
c
                    segact(trkndx(newloc)) = .false.

                 end if

                 if (tfaddx .eq. 0) then
                    tfaddx = newloc
                 else if ((newloc .eq. tfaddx-1) .or. (newloc .eq. numrcs
     +                 .and. tfaddx .eq. 1)) then
                    tfaddx = newloc
                 end if

              else
                 segact(trkndx(newloc)) = .false.
                 if (newloc .eq. tnewst) then
                    tfaddx = 0
                 else
     +              if (tfaddx .ne. 0) then
                      tfaddx = mod (tfaddx, numrcs) + 1
                 end if

              end if

              spprsd(trkndx(newloc)) = .false.

           end if

c set new values for tnewtm, toldtm

           tnewtm = trkrec(trkndx(tnewst))(bgnpos:endpos)

           if (trkndx(mod(tnewst,numrcs)+1) .ne. 0) then
              toldtm = trkrec(trkndx(mod(tnewst,numrcs)+1))(bgnpos:endpos)
              toldst = mod (tnewst, numrcs) + 1
           else
              toldst = 1
           end if

           if (trackn) then
              print *, 'exit addtrk:'
              print *, '   tfaddx = ', tfaddx
           end if
           goto 300

 200       print*,'error in reading tracking data from input buffer'
 300       continue
           return
           end


C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:    ampvpt
c
c  Functional Description:
c       this subroutines sets the amplification area viewport
c
c  Input Files/Parameters:
c       xllavp,yllavp                   The lower left X,Y point
c       xuravp,yuravp                   The upper right X,Y point
c
c  Output Files/Parameters:
c
c  Subroutines/Functions Called:
c       Note: Subroutines preceded by a "j" are explained in the DI-3000 manual.
c
c  Called By:                    DRWAMP, MAKAMP
c
c  Local Variables:              N/A
c
```

```
c  Restrictions:              N/A
c
c  Abnormal Return Conditions: N/A
c
c  Location:
c
c  Programmer         Date of Last Change       Reason for Change
C  L. McCleary        Jan 1988              separate amp & sys - ampvpt
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine ampvpt
c
c       this subroutines sets the amplification area viewport
c
        common /comavp/ xllavp,yllavp,xuravp,yuravp
c
        call jvport (xllavp,xuravp,yllavp,yuravp)
c
        return
        end


C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:  ampwin
c
c  Functional Description:
c       this subroutines sets the amplification area window
c
c  Input Files/Parameters:
C       qaxmn,qaymn                 The amplification min x,y point
c       qaxmx,qaymx                 The amplification max x,y point
c
c  Output Files/Parameters:
c
c  Subroutines/Functions Called:
c       Note: Subroutines preceded by a "j" are explained in the DI-3000 manual.
c
c  Called By:                 DRWAMP
c
c  Local Variables:           N/A
c
c  Restrictions:              N/A
c
c  Abnormal Return Conditions: N/A
c
c  Location:
c
c  Programmer         Date of Last Change       Reason for Change
C  L. McCleary        Jan 1988              separate amp & sys - ampwin
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine ampwin
c
c       this subroutines sets the amplification area window
c
        common/ampwdo/qaxmn,qaymn,qaxmx,qaymx
        real qaxmn,qaymn,qaxmx,qaymx
c
        call jwindo (qaxmn,qaxmx,qaymn,qaymx)
c
        return
        end


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                 ANNOTA
C
C FUNCTIONAL DESCRIPTION:    .
C
C CALLED BY:                 FANNOT
C
C PROGRAMMER:                DATE OF LAST CHANGE    REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-
```

```
      subroutine annota (string,len)

c     this subroutine does the annotate function

      INTEGER QFB(26),QMB(4)
      COMMON /BUTONS/ QFB,QMB
      LOGICAL VALID,ERROR,RFLAG
      COMMON /B1/ QCANCL,QEXT2M,QRETRN,QSTMNU,QNEXTM
      INTEGER QNEXTM
      LOGICAL QCANCL,QEXT2M,QRETRN,QSTMNU
      INTEGER QCRMNU
      COMMON /B6/ QCRMNU
      integer button
      logical outonce, outwice
      integer segno
      character*(*) string
      common /comgvp/ xllgvp,yllgvp,xurgvp,yurgvp
      common /comgra/ xllgra,yllgra,xurgra,yurgra,ibcgra,iocgra
      common /ctext/ igrtxt,isytxt,iantxt
      data cursax,cursay / 0.,0. /

      ERROR = .FALSE.
      RFLAG = .FALSE.
      MYSEGN = QCRMNU
c     --flags for annotation output
      outonce = .false.
      outwice = .false.
      call gravpt
      call geowin
      call getseg(segno)

100   call jconwv (cursax,cursay,0.,vx,vy)
      call jpecho (1,2,1,vx,vy)
      call locgeo(button,x,y,valid)
      cursax = x
      cursay = y

      IF (BUTTON.NE.QMB(1)) THEN
          CALL CHECK(BUTTON,MYSEGN,ERROR,RFLAG)
          IF (ERROR) THEN
              CALL MESG(2)
              CALL PAWS
          ENDIF
      ENDIF
      if (button.eq.qmb(1) .or. button.eq.qmb(3)) THEN
           if (outonce) then
              call jpurge(segno)
              outwice = .true.
           endif
           outonce = .true.
           call jropen(segno)
           CALL XCOLOR (iantxt)
           call jsize (7.,7.)
           call jjust (2,1)
           CALL JFONT(1)
           CALL JGAP(0.)
           CALL JPATH(1)
           CALL JBASE(1.,0.,0.)
           CALL JPLANE(0.,1.,0.)
           call jmove (x,y)
           CALL jhstrg (string(1:len))
           call jrclos
      ENDIF
      if (button .eq. qmb(1)) goto 100

c     -- refresh screen if "ghosts" present due to repositioning string
      if (outwice) call redraw
c        1.7 call to store the text in hldf
      call stotxt( segno,x,y,iantxt,string )

      return
      end
```

```
C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    APARCS
C
C FUNCTIONAL DESCRIPTION:       .
C
C CALLED BY:                    DRWICN
C
C PROGRAMMER:                   DATE OF LAST CHANGE    REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine aparcs(iarray,writef)

c     This routine redraws arcs or writes the changed points to
c       the .conv file.  The routine getarc is called to restore
c       the arc arrays.  Chgpts applies the previously set
c       scalefactor and offsets to the points.  If the write flag
c       is false, the three points along the arc are loaded into
c       arrays and calarc is called to calculate the parameters
c       needed to draw the arc.  Putarc is then called to draw
c       the arc. This drawing is done in the redraw for the Icon
c       Editor and the drawing of icons by the prototype (geticn
c       and drwicn routines).
c       If the write flag is set, the routine is being called by the
c       conversion routines of the Icon Editor and the changed
c       points are writted to the .conv file for use by the Icon
c       Editor.
c   VARIABLES:
c       writef- flag set when .conv file being written to
c       common block ifls- logical unit numbers for files being accessed
c       iarray- array passed from calling routine
c       numarc- number of arcs to be drawn
c       xsaveX/ysaveX- arrays to hold points for redrawing arcs
c   CALLS:     getarc chgpts calarc putarc savarc
c   PROGRAMMER:  Nancy Detrich, A215, March, 1984
C------  MODIFIED BY A692 FOR COMPLETION


      logical writef
      common/ifls/newifl,oldifl
      integer newifl,oldifl
      integer iarray(*),numarc
      real xsave1(12),ysave1(12),xsave2(12),ysave2(12)
      real xsave3(12),ysave3(12)
      real xsave(3),ysave(3)
       common /chgit/mirflg,xscale,yscale,xoffst,yoffst,rotang
       real xscale,yscale,rotang
       integer xoffst,yoffst,mirflg

c     this routine calls getarc to have the arrays restored and then
c     redraws the arcs that were stored in the savefile

      call getarc(iarray,xsave1,ysave1,xsave2,ysave2,xsave3,ysave3,
     +     numarc)
c     apply scalefactor/offsets to points of arrays
c      call chgpts(xsave1,numarc,0)
c      call chgpts(ysave1,numarc,1)
c      call chgpts(xsave2,numarc,0)
c      call chgpts(ysave2,numarc,1)
c      call chgpts(xsave3,numarc,0)
c      call chgpts(ysave3,numarc,1)

      if (.not.writef) then
        do 100 i = 1,numarc
c         load the xsave and ysave arrays to use calarc rtn
c           to calculate arc parameters and then draw the arcs
          xsave(1) = xsave1(i)
          ysave(1) = ysave1(i)
          xsave(2) = xsave2(i)
          ysave(2) = ysave2(i)
          xsave(3) = xsave3(i)
          ysave(3) = ysave3(i)
```

```
            call rotpts(xsave,ysave,3)
            call calarc(xsave,ysave,a0,a1,a2,centrx,centry,rad)
c --- changed by Dirk
c --- find center first, change center and outer points, and
c     find angles
            call chgpts(centrx,1,0)
            call chgpts(centry,1,1)
            call chgpts(xsave,1,0)
            call chgpts(ysave,1,1)
            if (mirflg .eq. 0) then
                 a0 = - a0 + sign(180.0,a0)
                 a1 = - a1 + sign(180.0,a1)
                 a2 = - a2 + sign(180.0,a2)
            else if (mirflg .eq. 1) then
                 a0 = -a0
                 a1 = -a1
                 a2 = -a2
            endif

            rad=sqrt((xsave(1)-centrx)**2+(ysave(1)-centry)**2)
            call putarc(a0,a1,a2,centrx,centry,rad)
 100      continue

        else
c          call routine to write changed arc points to new file
c ----- changed by Dirk Butson
c ----- changing points before calling calarc was
c       creating problems
          call rotpts(xsave1,ysave1,numarc)
          call chgpts(xsave1,numarc,0)
          call chgpts(ysave1,numarc,1)
          call rotpts(xsave2,ysave2,numarc)
          call chgpts(xsave2,numarc,0)
          call chgpts(ysave2,numarc,1)
          call rotpts(xsave3,ysave3,numarc)
          call chgpts(xsave3,numarc,0)
          call chgpts(ysave3,numarc,1)
          call savarc(xsave1,ysave1,xsave2,ysave2,
     +        xsave3,ysave3,numarc,newifl)
        endif
        return
        end


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    APCIRC
C
C FUNCTIONAL DESCRIPTION:
C
C CALLED BY:                    DRWICN
C
C PROGRAMMER:                   DATE OF LAST CHANGE    REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine apcirc(iarray,writef)
c       This routine either redraws the circles that have been
c         saved in a file or writes out the changed coordinates
c         to a new file (Icon Editor conversion routines).
c         Getcir is called to load the center points and the
c         radius of the circles into the respective arrays.
c         Chgpts is then called to change the points using the
c         scalefactors and offsets set by a previous routine.
c         If the write flag is not set, the circles are drawn.
c         If the write flag is set, the savcir routine is called
c         to write the points to the .conv file (newifl).
c     VARIABLES:
c        writef- flag to control writing to the .conv file
c        iarray- holds first line read in by calling routine
c        numcir- number of circles to be drawn
c        radius/xcentr/ycentr- arrays to hold radius and center points
c        common block ifls- logical unit numbers for files being accessed
c   CALLS:     getcir chgpts savcir
c   PROGRAMMER:  Nancy Detrich, A215, March, 1984
```

```
      logical writef
      integer iarray(*),numcir
      real radius(24),xcentr(24),ycentr(24)
      common/ifls/newifl,oldifl
      integer newifl,oldifl

c     this routine calls getcir to have the arrays restored and then
c     redraws the circles that were stored in the savefile
      numcir = iarray(2)

      call getcir(iarray,radius,xcentr,ycentr)
      call rotpts(xcentr,ycentr,1)
      call chgpts(xcentr,numcir,0)
      call chgpts(ycentr,numcir,1)
c     scale the radius--no offsets
      call chgpts(radius,numcir,2)
      if (.not.writef) then
        do 100 i = 1,numcir
          call jpintr(0)
c         draw circle--(x center,y center,z center,radius,nsegs(0=default))
          call jcircl(xcentr(i),ycentr(i),0.,radius(i),0)
 100    continue
      else
c       write the changed points to the .conv file
        call savcir(2,numcir,radius,xcentr,ycentr,newifl)
      endif
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      APFILL
C
C FUNCTIONAL DESCRIPTION:         .
C
C CALLED BY:                      DRWICN
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine apfill(iarray,writef,protcl)

c     This routine calls jfills to do a seed fill at the points
c      loaded into the x and y arrays.
c      Getpts is called to load the x and y arrays with the
c      points to be used.  The chgpts routine is called to
c      apply the scalefactors and offsets to the points as
c      necessary based on the values previously set in the
c      chgit common area.
c      This routine may be called from multiple places in the
c      Icon Editor and the prototype.
c      If the write flag is false, it may be a call from either
c      the fill routine for the Icon Editor or the icon fill
c      for the prototype.  A value of 0 is passed in the prototype
c      color parameter if the Icon Editor is calling this routine
c      and the index in the icncol array is passed to the jfills
c      routine.  If there is a non-zero value in the protcl
c      parameter, that value is passed as the color index value
c      for jfills.  If the write flag is true, the routine is
c      being called by the conversion routines of the Icon Editor
c      and the changed points are to be written to the savefile
c      with an op-code of 4 or 10, based on the value read in
c      array position 1.
c      If the op-code is a 4, it is a regular fill point.
c      If the op-code is 10, it is an icon fill point being
c      assigned via the getfil routine or to be drawn
c      during the drawing of an icon.
c   VARIABLES:
c      protcl- index value to be used for prototype color
c      saveop- the op-code read in and saved if writing is required
c      writef- write flag to control writing to the .conv file
c      iarray- array passed from calling routine (first record)
```

```
c        xarray,yarray- arrays holding x and y values of fill points
c        common block ifls- logical unit numbers for files being accessed
c        common block icccol- holds current color
c        common block inccol- array of colors
c   CALLS:     chgpts save getpts jfills
c   PROGRAMMER:  Nancy Detrich, A215, March, 1984


        integer protcl,saveop
        logical writef
        integer iarray(*)
        real xarray(34),yarray(34)
        common/ifls/newifl,oldifl
        integer newifl,oldifl
        dimension icncol (10)
        common /icncol/icncol
        common /icccol/icccol


c       save off the 'op code' in the first position to be used
c         if it needs to be written out -- op code will be 4
c         if it is a regular fill point, and 10 if it is an
c         icon fill point
        saveop = iarray(1)

c       call to routine to return number of points and the restored
c         x and y arrays with the coordinates
        call getpts(iarray,numpts,xarray,yarray)
        call rotpts(xarray,yarray,numpts)
        call chgpts(xarray,numpts,0)
        call chgpts(yarray,numpts,1)

        if (.not.writef) then
c        check that the icon is allowed to be filled
c          (even though user may have requested it)
         if (numpts .ne. 0) then
c         fill the areas around the seed point
          do 100 i = 1,numpts
            if (protcl .eq. 0) then
c             being called from icon editor routines, use current
c                 color
              call jfills (icncol(icccol),xarray(i),yarray(i),
     +         .true.)
            else
c             being filled by prototype routine, use color
c                requested by prototype
              call jfills (protcl,xarray(i),yarray(i),.true.)
            endif
 100      continue
         endif
        else
c         call routine to write changed points to new file
          call save(saveop,numpts,xarray,yarray,newifl)
        endif

        return
        end


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       APLINE
C
C FUNCTIONAL DESCRIPTION:          .
C
C CALLED BY:                       DRWICN
C
C PROGRAMMER:                      DATE OF LAST CHANGE    REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine apline(iarray,writef)

c       This routine is used by the Icon Editor redraw and convert
c        routines and the prototype. This routine draws a connected
c        line which has been saved in a file.
```

```
c        Getpts is called to load the points in the x and y arrays.
c        The arrays are passed to the chgpts routine to change the
c        points by the scalefactors and offsets previously set.
c        The redraw line routine is then called to draw the line if
c        a redraw is to occur for the Icon Editor or the prototype,
c        or the changed points are written to another file (.conv)
c        if the writef has been set by an Icon Editor conversion
c        routine.
c     VARIABLES:
c        writef- flag set if the changed points are to be written
c            to a file
c        iarray- array passed from calling routine-- holds number
c            of points in the line and the first 12 coordinates
c        npts- number of points in the connected line
c        xarray/yarray- hold x and y coordinates for all the points
c            of the line
c        common block ifls- logical unit numbers for files being accessed
c     CALLS:     getpts chgpts redrln save
c     PROGRAMMER:  Nancy Detrich, A215, March, 1984


        logical writef
        integer iarray(*)
        integer npts
        real xarray(38),yarray(38)
        common/ifls/newifl,oldifl
        integer newifl,oldifl

c       fill the x and y arrays with the coordinates in
c         a REAL format (for DI-3000)
        call getpts(iarray,npts,xarray,yarray)

c       call routine to change the values in the array by
c          the correct offset value indicated by the last
c          parameter
        call rotpts(xarray,yarray,npts)
        call chgpts(xarray,npts,0)
        call chgpts(yarray,npts,1)
        if (.not.writef) then
          call redrln(xarray,yarray,npts)
        else
c         write out the arrays of points to the new file
          call save(1,npts,xarray,yarray,newifl)
        endif

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                          APMARK
C
C FUNCTIONAL DESCRIPTION:             .
C
C CALLED BY:                          DRWICN
C


C PROGRAMMER:                         DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine apmark(iarray,writef)

c       This routine draws markers at the points loaded in the
c        x and y arrays by the getpts routine.  The marker type
c        is in the last position of the x array.
c        The chgpts routine is called to apply the scalefactor
c        and offset, if necessary to the points in the x and
c        y arrays before the markers are drawn by the redrmk routine.
c        If the write flag is set, the routine is being called
c        by the conversion routines of the Icon Editor and
c        the changed points are written to the .conv file for
c        use by the prototype.
```

```
c     VARIABLES:
c        iarray- array passed from calling routine
c        xarray/yarray- coordinates for markers
c        count- number of points loaded in the x and y arrays
c           (xarray(count) has the marker type in it, and yarray(count)
c           is meaningless)
c        writef- flag set if .conv file is to be written to
c        common block ifls- logical unit numbers for files being accessed
c   CALLS:     getpts chgpts redrmk save
c   PROGRAMMER:  Nancy Detrich, A215, March, 1984


      logical writef
      integer iarray(*),count
      real xarray(38),yarray(38)
      common/ifls/newifl,oldifl
      integer newifl,oldifl

      call getpts(iarray,count,xarray,yarray)
      call rotpts(xarray,yarray,count-1)
      call chgpts(xarray,count-1,0)
      call chgpts(yarray,count-1,1)

      if(.not.writef) then
c       marker type is stored in the last position of the x array
        mkrtyp = xarray(count)
c       draws specified marker at array of points given
        call redrmk(mkrtyp,count-1,xarray,yarray)
      else
c       call routine to write changed points to .conv file
        call save(5,count,xarray,yarray,newifl)

      endif
      return
      end

C+*+*+*+*+*+*+*+*+*+*+*+*+*+*+*+*+*+*+*+*+*+*+*+*+*+*+*+*+*+*+*+*+*|*+*+*+*+
C UNIT NAME:                       APRECT
C
C FUNCTIONAL DESCRIPTION:
C
C CALLED BY:                       DRWICN
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*|*-*-*-*-

      subroutine aprect(iarray,writef)

c      This routine redraws a rectangle that was stored in a file.
c       The getpts routine loads the x and yarrays and the
c       chgpts routine is called to change the points using
c       the scalefactors and offsets previously set.
c       If the write flag has not been set, the rectangle is drawn.
c       If it has been set, the changed points are written
c       to the .conv file.
c     VARIABLES:
c        writef- set to have changed points written to a file (.conv)
c        iarray- holds points of record previously read in
c        numpts- number of points to be loaded
c        xarray/yarray- points to be used for drawing rectangle
c        common block ifls- logical unit numbers for files being accessed
c        start- point number to start at when redrawing (not implemented)
c   CALLS:     getpts chgpts redrct save
c   PROGRAMMER:  Nancy Detrich, A215, March, 1984


      common/ifls/newifl,oldifl
      integer newifl,oldifl
      logical writef
      integer iarray(*),numpts,i,start
      real xarray(4),yarray(4)
```

```
        numpts = iarray(2)
        call getpts(iarray,numpts,xarray,yarray)
        call rotpts(xarray,yarray,numpts)
        call chgpts(xarray,numpts,0)
        call chgpts(yarray,numpts,1)
        if (.not.writef) then
          start=1
          do 100 i = 1,numpts/4
            call redrct(xarray,yarray,start)
            start = start + 4
 100      continue
        else
c         call routine to write the changed points to a file
          call save(3,4,xarray,yarray,newifl)
        endif

        return
        end

C+*+*+*+*+*+*+*+*+*+*+*+*+*+*+*+*+*+*+*+*+*+*+*+*+*+*+*+*+*+*+*+*+*+*|*+*+*+*+
C UNIT NAME:                       APSMOO
C
C FUNCTIONAL DESCRIPTION:          .
C
C CALLED BY:                       DRWICN
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        subroutine apsmoo(iarray,writef)

c       This routine redraws the smoothed lines stored in the
c         savefile or converts the points and writes the converted
c         points to a .conv file, as indicated by the write flag.
c         Getpts is called to load the x and y arrays with the
c         points to be used to recreate the smoothed line.  Chgpts
c         is then called to apply the scalefactor and offset
c         previously set.
c         If the write flag is false, the icbez routine is called
c         to convert the points into coordinates for the curve.
c         The redraw line routine is the called to draw the curve.
c         If the write flag is set, the changed points are written
c         to the .conv file for use by the prototype.
c     VARIABLES:
c         iarray- array passed from calling routine
c         xc/yc- calculated points returned from icbez
c         npts- number of points returned from icbez
c         xp/yp- input points gotten from the savefile
c         npol- number of points on the line given by the user
c         writef- flag set to have the points written to the .conv file
c         common block ifls- logical unit numbers for files being accessed
c   CALLS:     getpts chgpts icbez redrln save
c   PROGRAMMER:  Nancy Detrich, A215, March, 1984


        logical writef
        common/ifls/newifl,oldifl
        integer newifl,oldifl
        integer iarray(*)
        integer npts,npol
        real xp(34),yp(34),xc(34),yc(34)

        call getpts(iarray,npol,xp,yp)
        call rotpts(xp,yp,npol)
        call chgpts(xp,npol,0)
        call chgpts(yp,npol,1)

        if(.not.writef) then
c         calculate the points for the curve and draw it
          call icbez(npol,xp,yp,xc,yc,npts)
          call redrln(xc,yc,npts)
        else
```

```
c          write out the changed points to the <filename>.conv file
           call save(6,npol,xp,yp,newifl)
         endif
         return
         end


C+*+*+*+*+*+*+*+*+*+*+*+*+*+*+*+*+*+*+*+*+*+*+*+*+*+*+*+*+*+*+*+*+*+*|*+*+*+*+
C UNIT NAME:                        APTEXT
C
C FUNCTIONAL DESCRIPTION:           .
C
C CALLED BY:                        DRWICN
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        subroutine aptext(iarray,writef,retstr,nchars)

c       this routine is used to read in the necessary parameters
c          and either display the text when called by the
c          icon editor (drawic) or write out records to the
c          converted file if the file is being converted
c          (also called by drawic).  This routine is also
c          called by drwicn in the prototype routines to
c          draw the text when symbols are being created.
c    VARIABLES:
c         iarray- array passed from calling routine
c         writef- flag set when .conv file being written to
c         common block ifls- logical unit numbers for files being accessed
c         x/y- coordinate for text placement--will be sent to chgtxt
c         height- height of text--will be scaled by chgtxt
c         size- size selection made by user (icsize)
c         style- font selection made by user (icfont)
c         retstr- text string to be displayed
c         nchars- number of characters in retstr
c   CALLS:        chgtxt readch dwtext savtxt
c   PROGRAMMER:  Nancy Detrich, A215, March, 1984


        common/ifls/newifl,oldifl
        integer newifl,oldifl
        logical writef
        integer iarray(*)
        integer x,y ,height,size,style,nchars
        character*(*) retstr

c       get text parameters
        size = iarray(2)
        height = (iarray(3))
        style = iarray(4)
        nchars = iarray(5)
        x = (iarray(6))
        y = (iarray(7))

c        print*,'size,height,style,nchars,x,y,retstr'
c        print*,size,height,style,nchars,x,y,retstr(1:nchars)

c       apply scalefactor to height and scale and offsets to x and y
        call chgtxt(height,x,y)

c        print*,'after chgtxt',height,x,y,writef

        if (.not.writef) then
c         display the text
          call jjust(2,1)
          call jmove(REAL(x),REAL(y))
          call jsize(REAL(height)/2.0,REAL(height))
          call dwtext(style,nchars,retstr)
        else
```

```
c        write parameters out to '.conv' file (newifl)
         call savtxt(size,height,style,nchars,retstr,
     +        x,y,newifl)
        endif
        return
        end


C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                      arc
c
c  Functional Description:
c       this subroutines draws an arc
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:
c
c  Local Variables: N/A
c
c  Restrictions: N/A
c
c  Abnormal Return Conditions:  N/A
c
c  Location:      /a21/dave
c
c  Programmer         Date of Last Change        Reason for Change
c
C-*-*-*-*-*-*-*-*-*-*-*-*-*-*-*-*-*-*-*-*-*-*-*-*-*-*-*-*-*-*-*-*-*-*-*-*|*-*-*-*-
c
       subroutine arc (x0,y0,radius,nseg,a0,a1)
c
c      draw arc
c
       data pi/3.1415927/
c      arb is an arbitrary factor limiting the size of default vectors
c      llimit is the lower limit of nnseg
c      max is the upper limit of nnseg
       data llimit,max /10,1000/
       data arb /100./
c
c      print*,'arc -- enter',x0,y0,radius,nseg
       dtor = pi/180.
       curang = a0
       nnseg = nseg

c      if # segments is < 2 then set to default.
       if (nnseg .lt. 2) then
           nnseg = ( a1 - a0 ) * radius / arb
           if (nnseg .lt. llimit) nnseg = llimit
           if (nnseg .gt. max) nnseg = max
       endif

c      size of angle increment is inscribed angle divided by # segments.
       rincr = ( a1 - a0 ) / float( nnseg )

c      radius used is absolute value of radius passed.
       rad = abs( radius )

c      move to the first point.
       call jmove( x0 + rad * cos( a0*dtor ),
     +             y0 + rad * sin( a0*dtor ))
c
       do 100 i = 1, nnseg-1
           curang = curang + rincr
           x = x0 + rad * cos( curang*dtor )
           y = y0 + rad * sin( curang*dtor )
           call jdraw( x, y )
 100   continue
       call jdraw( x0 + rad * cos( a1*dtor ),
     +             y0 + rad * sin( a1*dtor ))
```

```
c       print*,'arc -- exit ',x,y,radius,curang,nnseg

        return
        end

C+*+*+*+*+*+*+*+*+*+*+*+*+*+*+*+*+*+*+*+*+*+*+*+*+*+*+*+*+*+*+*+*+*+*|*+*+*+*+
C UNIT NAME: areafl
C
C FUNCTIONAL DESCRIPTION:  fill areas on a map with different colors
C
C INPUT FILES/PARAMETERS:
C
C GLOBAL VARIABLES :
C
C OUTPUT FILES/PARAMETERS:  NONE.
C
C SUBROUTINES/FUNCTIONS CALLED : NONE.
C
C CALLED BY:                          DMAPII
C
C LOCAL VARIABLES:
C
C RESTRICTIONS: NONE.
C
C ABNORMAL RETURN CONDITIONS:   NONE.
C
C LOCATION:
C
C PROGRAMMER:                         DATE OF LAST CHANGE    REASON FOR CHANGE
C
C     JERRY FENERTY                                          DOCUMENT AND MODIFY
C                                                            FOR A21 PROTOTYPE.
C      MODIFIED BY JERRY FENERTY 8/13/85 -- FINAL COMPLETION
C
C-*-*-*-*-*-*-*-*-*-*-*-*-*-*-*-*-*-*-*-*-*-*-*-*-*-*-*-*-*-*-*-*-*-*|*-*-*-*-

        subroutine areafl

c       fill areas on a map with different colors

        logical renew

        INTEGER QNMPTS,QSHADE(60)
        REAL QLATT(60),QLONN(60)
        COMMON /FILLS/ QNMPTS,QLATT,QLONN,QSHADE

        INTEGER SEGNO,FIRSEG
        COMMON /SEGNO/ SEGNO,FIRSEG

        LOGICAL INTERR
        COMMON /INTERR/INTERR

        LOGICAL map
        common /mapdbc/ map

        IF (map) PRINT*,'IN DMAPII QNMPTS IS ',QNMPTS

clj --- renew keeps track of whether or not the screen
clj --- must be saved before doing the next fill
        renew = .true.

        DO 230 I=1,QNMPTS

           CALL GETSEG(ISEG)
           SEGNO = ISEG
           CALL GLTYPE(QSHADE(I),0)
           INTERR = .FALSE.
           CALL FILLPT(QSHADE(I),QLATT(I),QLONN(I),renew)

  230   CONTINUE

        return
        end
```

```
C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    AREANF
C
C FUNCTIONAL DESCRIPTION:
C
C CALLED BY:                    STATEC
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine areanf
c
c       this subroutine is the area not found state interpreter (20)
c
        common /states/ nextst
        logical eol,eoc
        common /comnds/ lenl,indxw,lenw,eol,eoc
        character * 80 comlin
        common /comlin/ comlin
        character * 105 errlin
c
        errlin = 'Area name not found : ' //
     +  comlin(indxw:indxw + lenw - 1)
        lenlin = 22 + lenw
        call cerror(lenlin,errlin)
        nextst = 1
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    ARRW
C
C FUNCTIONAL DESCRIPTION:       .
C
C CALLED BY:                    SETCOL
C
c Author: Ellen Jenkins, R531, September 30, 1982
C
C PROGRAMMER:                   DATE OF LAST CHANGE     REASON FOR CHANGE
c L McCleary    Jan 1988             fix value annotate - arrw
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine arrw (xcor,ycor,intcol,xsrang,yrange,value)
c
c Purpose: draw small arrows indicating where on scale current choice is
c          located, and print integer value of current choice under arrow
c
c Access: call arrw
c
c Algorithm: draw arrow at x,y coordinates returned by positioning cursor
c            and convert integer value to ascii character(s) and print value
c            under arrow,with characters centered under arrow
c
c Calls: dbitoa
c
        character *3 xname
        tval = value + 0.5
        ivalue = tval
        inum = ivalue
        call jopen
        call xcolor (intcol)
        call jmove(xcor-.01*xsrang,ycor-.035*yrange)
        call jdraw(xcor,ycor-.015*yrange)
        call jdraw(xcor+.01*xsrang,ycor-.035*yrange)
        call jjust (2,1)
        if (xcor.ge.xsrang) call jjust (3,1)
        call jmove (xcor,ycor-.055*yrange)
c        read (inum,1500,err=190) xname
        write (xname,1500,err=190) inum
```

```
 1500   format(i3)
        call jsize (5.0,2.5)
        if (ivalue.lt.10) then
c           call jlstrg (xname(1:1))
          call jlstrg (xname(3:3))
        else
          if (ivalue.lt.100) then
c               call jlstrg (xname(1:2))
              call jlstrg (xname(2:3))
          else
              call jlstrg (xname(1:3))
          endif
        endif
  190   continue
        call jclose
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                      ascint
c
c  Functional Description:
c       this subroutine converts an ascii string to integer (+ or -)
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                      CREATM, FCHSCA, REPLAY
c
c  Local Variables: N/A
c
c  Restrictions: N/A
c
c  Abnormal Return Conditions:  N/A
c
c  Location:      /a21/dave
c
c  Programmer        Date of Last Change       Reason for Change
C  L. MCCLEARY       JUL 1988                  NEGATIVE INTS - ASCINT
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine ascint (ch,int,len,ierror)
c
        character*(*) ch
C       character c
c
c       print*,'ASCINT -- enter ch,len = ',ch,len
        ierror = 0
C       c = ch(1:1)
C       if (c.ne.'1'.and.c.ne.'2'.and.c.ne.'3'.and.c.ne.'4'.and.
C    +      c.ne.'5'.and.c.ne.'6'.and.c.ne.'7'.and.c.ne.'8'.and.c.ne.'9'
C    +      .and.c.ne.'0') then
C           ierror = 3
C       endif
C       read(ch(1:len),10100,err=181,end=182) int
C10100  format(i80)
        M=INDEX(CH(1:LEN),'-')
        I=1
        DO 100 J=M+1,LEN
                IF(INDEX('0123456789',CH(J:J)).EQ.0) I=0
 100    CONTINUE
        IF(M.EQ.LEN) I=0
        IF(I.EQ.0) THEN
                IERROR=3
C               PRINT *,'NON-NUMERIC VALUE ENTERED'
        ELSE
                READ(CH(M+1:LEN),10100,ERR=181,END=182) INT
```

```
10100         FORMAT(I80)
              IF(M.GT.0) INT=-INT
        ENDIF
        go to 190
  181       continue
c            print*,'Error in conversion to integer'
            ierror = 1
            go to 190
  182       continue
c            print*,'End of file on conversion to integer'
            ierror = 2
  190   continue
c       print*,'ASCINT -- exit int,ierror = ',int,ierror
c
        return
        end

C+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    asclog
c
c  Functional Description:
c       convert t's and f's in a character string to a logical array
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                    RBOUND, RPARAM
c
c  Local Variables: N/A
c
c  Restrictions: N/A
c
c  Abnormal Return Conditions:  N/A
c
c  Location:      /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*|*-*-*-*-
c
        subroutine asclog (logarr,len,chastr)

c       convert t's and f's in a character string to a logical array
c
        logical logarr(*)
        character*(*) chastr
c
        do 110 i=1,len
            if (chastr(i:i).eq.'t') then
                logarr(i) = .true.
            else
                logarr(i) = .false.
            endif
  110   continue
c
        return
        end

C+*+*+*+*+*+*+*+*+*+*+*+*+*+*+*+*+*+*+*+*+*+*+*+*+*+*+*+*+*+*+*+*+*+*|*+*+*+*+
C UNIT NAME:                    BOXCLR
C
C FUNCTIONAL DESCRIPTION:       .
C
C CALLED BY:                    INIPIC, RESCON
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-
```

```
        subroutine boxclr

c       draw a filled rectangle to erase the bitmap

        common/scratr/qbox,qbkgrd
        integer qbox,qbkgrd
        data xlow,xhigh,ylow,yhigh/0.,1.,0.,1./

        call jwindo (xlow,xhigh,ylow,yhigh)
        call jopen
        call xcolor (qbox)
        call xpidex (qbkgrd,0)
        call jpintr (1)
        call jrect (xlow,ylow,xhigh,yhigh)
        call jclose

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                   BOXVPT
c
c  Functional Description:
c       this subroutines sets the construction box area viewport
c
c  Input Files/Parameters:
C       xllbvp
C         lbvp
C       xurbvp
C       yurbvp
c
c  Output Files/Parameters: N/A
c
c  Subroutines/Functions Called:
c      Note: Subroutines preceded by a "j" are explained in the DI-3000 manual.
c
c  Called By:    MAKBOX
c
c  Local Variables: N/A
c
c  Restrictions: N/A
c
c  Abnormal Return Conditions:  N/A
c
c  Location:      Apollo       /a21/dave
c
c  Programmer         Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine boxvpt
c
c       this subroutines sets the construction box area viewport
c
        common /combvp/ xllbvp,yllbvp,xurbvp,yurbvp
c
        call jvport (xllbvp,xurbvp,yllbvp,yurbvp)
c       print*,'boxvpt -- ',xllbvp,yllbvp,xurbvp,yurbvp
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    BSTMAP
C
C FUNCTIONAL DESCRIPTION:       .
C
C CALLED BY:                    READML
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-
```

```
      subroutine bstmap(flatlon,blatlon,numb,mapcho,mflen)
c
c  this subroutine checks each saved map to determine which is the best fit
c  for the given fixlat/fixlon to be displayed closest to the center point.
c
      logical sys
      common /sysdbc/ sys
      character*16 flatlon,blatlon(30)
      character*(*) mapcho
      integer mflen
      integer*2 i,numb,sitmax,notsit
      integer*2 idummy
      character*50 filenm
      character*60 desfile
      integer*4 ierror
      integer*4 len
      real rarray(4)
      integer iarray(7)
      real rlat,rlon,blat,blon
      real x,y,bx,by
      real smalrad
      logical onmap,siton
      logical novali
      integer savecnt
      character*1 choice
      character*1 lowcase(10)
      character*50 defpth
      common /defpth/ defpth
      common /lendef/ lendef
c     map parameters
      logical lton(16),dotem
      integer ipgrid(4),ltyptb(16)
      common /map/ XRNM,XC,YC,LEVEL,CLAT,CLON,XRAD,YRAD,ITPROJ,
     +       IRES,LTYPTB,LUNDAT,LUNIND,LUNLIN,LTON,IPGRID,DOTEM,
     +       ORHALT

      data ifl /9/
      data irdwr /1/
      data filenm /' '/
      data lowcase/'a','b','c','d','e','f','g','h','i','j'/

      savecnt = 0
      choice = '0'
      mapcho = ' '
      if (sys) then
           print*,'bstmap -- enter-lat/lon ',flatlon
      endif
      filenm(1:lendef+4) = defpth(1:lendef) // 'save'
      filenm(lendef+6:lendef+9) = '.prm'
c
c-----convert lat/lon to radians
c
      len = 16
      call lltord(flatlon,len,rlat,rlon,ierror)
      if (sys) then
          print*,'bstmap -- rlat/rlon ',rlat,rlon
      endif
      novali = .true.

c-----read in the # of files saved on this system

      desfile = defpth(1:lendef) // 'default.des'
      len = lendef + 11
      call openit(desfile,len,ifl,irdwr,ierror)
      if(ierror .eq. 0) then
          read(ifl,30) savecnt
 30       format(i3)
          call closit(ifl)
      endif
c
c-----loop to find which center pt is min distance from fixlat/fixlon in radians
c
      do 100 i= 1,savecnt
          if(i .lt. 10) then
              filenm(lendef+5:lendef+5) = char(i+48)
          else
```

```
            filenm(lendef+5:lendef+5) = lowcase(i-9)
         endif
         len = lendef + 9
c
c   open .prm file for the saved map and read in map info
c
         call openit(filenm,len,ifl,irdwr,ierror)
         if(ierror .eq. 0) then
            read(ifl,*) idummy
            len = 4
            call readre(ifl, rarray, len, ierror)
            XC = rarray(1)
            YC = rarray(2)
            XRAD = rarray(3)
            YRAD = rarray(4)
            call readre(ifl, rarray, len, ierror)
            XRNM = rarray(1)
            CLAT = rarray(2)
            CLON = rarray(3)

        ORHALT = rarray(4)
            len = 7
            call readin(ifl,iarray,len,ierror)
            ITPROJ = iarray(6)
            IRES = iarray(7)
c
c  initialize this saved map for lltoxy calculations
c
            call initia(XC,YC,CLAT,CLON,XRAD,YRAD,ITPROJ,IRES,XRNM,
     +                ORHALT)
            if (sys) then
                 print*,'bstmap -- before lltoxy rlat/rlon ',rlat,rlon
            endif
            call lltoxy(rlat,rlon,x,y)
            if (sys) then
                 print*,'bstmap -- x,y before clipxy ',x,y
            endif
            call clipxy(x,y,onmap)
            if (sys) then
                 print*,'bstmap -- x= ',x,' y= ',y,' VALID= ',onmap
            endif
            if(onmap)then
              if(numb .gt.0)then
                siton = .true.
                sitmax = numb * .25
                notsit = 0
                do 50 j=1,numb
                       len = 16
                       call lltord(blatlon(j),len,blat,blon,ierror)
                       call lltoxy(blat,blon,bx,by)
                       call clipxy(bx,by,siton)
                       if(.not. siton)then
                               notsit = notsit + 1
                               if(notsit .gt. sitmax)goto 60
                       else
c                               print*,'bstmap -- site on map'
                       endif
 50             continue
              endif
              if(novali) then
                     smalrad = xrnm
                     choice = filenm(lendef+5:lendef+5)
              else
                     if(xrnm .lt. smalrad)then
                           smalrad=xrnm
                           choice = filenm(lendef+5:lendef+5)
                     endif
              endif
              if (sys) then
                    print*,'bstmap -- in onmap loop choice ',choice
              endif
              novali = .false.
            endif
```

```
 60          continue
             call closit(ifl)
         endif
 100  continue
c
c  if no map had this fixlat/fixlon on its display area, default to world map
c
      if(novali) then
          print*,'bstmap -- in not valid'
          mflen = 7
          mapcho(1:mflen) = 'default'
      else
c          print*,'bstmap -- in valid'
          mflen = 5
          mapcho(1:mflen) = filenm(lendef+1:lendef+4) // choice
      endif
c      print*,'bstmap is ',mapcho
c      print*,'bstmap -- exit'
      return
      end

C+*+*+*+*+*+*+*+*+*+*+*+*+*+*+*+*+*+*+*+*+*+*+*+*+*+*+*+*+*+*+*+*+*+*+*+*+*+*+*+|*+*+*+*+
c  UNIT NAME:                    buttn
c
c  Functional Description:       Subroutine to get button input
c
c  Input Files/Parameters:
c      General Gobals
c        qdsdev        device        integer   DI-3000 variable
c        qpydev        device        integer   DI-3000 variable
c        qecho         device        integer   DI-3000 variable
c
c  Output Files/Parameters:      N/A
c
c  Subroutines/Functions Called:
c      Note: Subroutines preceded by a "j" are explained in the DI-3000 manual.
c
c  Called By:                    DISP5, HELP, PAWS, TKINFO
c
c  Local Variables:
c
c  Restrictions:
c
c  Abnormal Return Conditions:   N/A
c
c  Location:      /a21/dave
c
c  Programmer          Date of Last Change          Reason for Change
c     bam               October 27, 1983
c
c  Work still to be done:
c
C-*-*-*-*-*-*-*-*-*-*-*-*-*-*-*-*-*-*-*-*-*-*-*-*-*-*-*-*-*-*-*-*-*-*-*-*-*-*-*-|*-*-*-*-

        subroutine buttn(button)

c       calls jbuttn function

        integer qdsdev,qpydev,qecho,qlecho
        common /device/ qdsdev,qpydev,qecho,qlecho
        integer button
        logical sys,rdkey,savkey
        common /sysdbc/ sys
        common /rkdbc/ rdkey
        common /svkdbc/ savkey
        logical eofkey
        integer keylun,newlun
        common /keylun/ keylun,newlun,eofkey
        character*6 commnd
        logical timout
        integer*2 time
        common /timout/ timout,time

        if (sys) print*,'buttn -- enter'
```

```
c       call enall
  100   continue
        if ((rdkey).and.(.not.eofkey)) then
            call kpause (eofkey)
            read (keylun,*,end=192,err=191) commnd,button
            if (commnd(1:6).ne.'jbuttn') then
                print*,'buttn -- incompatible commnd in ',
     +          'read_keys file  ',commnd,button
c               *** exit on error
                go to 199
            endif
        else

  125      continue

c       check for new data coming in or a click (1 min) occuring
c       since last poll.
c
           call datpol
c
c          check for keyboard interrupt
c
           call jbuttn(qdsdev,qpydev,qecho,button)
           if (timout) then
              go to 125
           end if
        endif

        go to 199
  191   continue
            print*,'buttn -- error on read of save key file',
     +      '  ',keylun,button
            go to 199
  192   continue
            print*,'buttn -- premature end of read key file.'
            eofkey = .true.
            go to 100
c           **** go back and get the function interactively on end of file
  199   continue
        if (savkey) then
            write (newlun,*,err=135) '''jbuttn''',button
        endif
        go to 140
  135   continue
            print*,'buttn -- error on write to save key file',
     +      '  ',newlun,button
  140   continue
c       call soverl
        if (sys) print*,'buttn -- exit',button

        return
        end


C+*+*+*+*+*+*+*+*+*+*+*+*+*+*+*+*+*+*+*+*+*+*+*+*+*+*+*+*+*+*+*+*+*|*+*+*+*+
C UNIT NAME:                   CALARC
C
C FUNCTIONAL DESCRIPTION:      .
C
C CALLED BY:                   APARCS
C
C PROGRAMMER:                  DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*|*-*-*-*-

        subroutine calarc(xsave,ysave,a0,a1,a2,centrx,centry,rad)

c       This routine calculates the parameters needed for
c         drawing an arc based on three points along the arc.
c     VARIABLES:
c       xsave/ysave- points on the arcs
c       a0,a1,a2- angles used in drawing arcs
c       centrx,centry- center points of arc
c       rad- radius of arc
```

```
c   PROGRAMMER:  Nancy Detrich, A215, March, 1984
C------   MODIFIED BY A692 FOR COMPLETION


        real xsave(*),ysave(*)
        real a1,a0,a2,centrx,centry,slope1,slope2
        real xend1,yend1,xmid,ymid,xend2,yend2
        real mid2x,mid2y,num2,rad
        real mid1x,mid1y,num1



c       setting passed parameters to the names used in previously
c        written code
        xend1 = xsave(1)
        yend1 = ysave(1)
        xmid  = xsave(2)
        ymid  = ysave(2)
        xend2 = xsave(3)
        yend2 = ysave(3)

c       COMPUTATIONS
c       slope of line perpendicular to line between first end point and
c       intermediate point

        i = 0
        n = 0
        m = 0

        if(ymid .ne. yend1) then
          slope1 = (xend1-xmid)/(ymid-yend1)
          mid1x = (xend1+xmid)/2.
          mid1y = (yend1+ymid)/2.
          num1 = mid1y-(mid1x*slope1)
          m = 1
        else
          centrx = (xend1+xmid)/2.
        endif

c       slope of line perpendicular to line between second end point and
c       intermediate point

        if (ymid .ne. yend2) then
          slope2 = (xend2-xmid)/(ymid-yend2)
          mid2x = (xend2+xmid)/2.
          mid2y = (yend2+ymid)/2.
          num2 = mid2y-(mid2x*slope2)
          n = 1
        else
          centrx = (xend2+xmid)/2.
        endif

c       have constructed two perpendicular bisectors which intersect at
c       the center of the circle on whose circumference lie the three
c       selected points

c       find center of circle
        if (n .eq. m) then
          if (slope1 .ne. slope2) then
            centrx = (num2-num1)/(slope1-slope2)
            centry = slope2*centrx+num2
          else
            i = 1
          endif
        else
          if (n .eq. 1) then
            centry = slope2 * centrx + num2
          else
            centry = slope1 * centrx + num1
          endif
        endif

        if (i .eq. 1) goto 60
```

```
c       compute radius
        rad = sqrt((xend1-centrx)**2+(yend1-centry)**2)

c       compute the angles
        a0 = (180./3.1415927)*atan2(yend1-centry,xend1-centrx)
        a1 = (180./3.1415927)*atan2(yend2-centry,xend2-centrx)
        a2 = (180./3.1415927)*atan2(ymid-centry,xmid-centrx)

 60     continue
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                      calavp
c
c  Functional Description:
c       calculate amplification area viewport parameters
c
c  Input Files/Parameters:
c
c  Output Files/Parameters: N/A
c
c  Subroutines/Functions Called:
c
c  Called By:                      FMAIN
c
c  Local Variables: N/A
c
c  Restrictions: N/A
c
c  Abnormal Return Conditions:  N/A
c
c  Location:
c
c  Programmer        Date of Last Change       Reason for Change
C  L. McCleary       Jan 1988              separate amp & sys - calavp
c
C-*-*-*-*-*-*-*-*-*-*-*-*-*-*-*-*-*-*-*-*-*-*-*-*-*-*-*-*-*-*-*-*-*-*-*-*|*-*-*-*-
c
        subroutine calavp
c
c       calculate amplification area viewport parameters
c
        common /comscr/ xllscr,yllscr,xurscr,yurscr
        common /comamp/xllamp,yllamp,xuramp,yuramp,ibcamp,iocamp,incamp
        common /comavp/ xllavp,yllavp,xuravp,yuravp
        common /aspect/ xaspec,yaspec,xvlow,xvhigh,yvlow,yvhigh
c
        xllavp = xvlow+(xvhigh-xvlow)*(xllamp-xllscr)/(xurscr-xllscr)
        xuravp = xvlow+(xvhigh-xvlow)*(xuramp-xllscr)/(xurscr-xllscr)
        yllavp = yvlow+(yvhigh-yvlow)*(yllamp-yllscr)/(yurscr-yllscr)
        yuravp = yvlow+(yvhigh-yvlow)*(yuramp-yllscr)/(yurscr-yllscr)
c        print*,'Amplification viewport',xllavp,xuravp,yllavp,yuravp
c         print*,'XLLAMP,XURAMP,..',xllAMP,xurAMP,yllAMP,yurAMP
c         print*,'XLLAVP,XURAVP,..',xllavp,xuravp,yllavp,yuravp
c
        return
        end
C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                      calbvp
c
c  Functional Description:
c       calculate construction box area viewport parameters
c
c  Input Files/Parameters:
c
c  Output Files/Parameters: N/A
c
c  Subroutines/Functions Called:
c
c  Called By:                      FMAIN
c
c  Local Variables: N/A
```

```
c
c  Restrictions: N/A
c
c  Abnormal Return Conditions:  N/A
c
c  Location:      Apollo      /a21/dave
c
c  Programmer         Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*|*-*-*-*-
c
      subroutine calbvp
c
c     calculate construction box area viewport parameters
c
      common /comscr/ xllscr,yllscr,xurscr,yurscr
      common /combox/xllbox,yllbox,xurbox,yurbox,ibcbox,iocbox,incbox
      common /combvp/ xllbvp,yllbvp,xurbvp,yurbvp
      common /aspect/ xaspec,yaspec,xvlow,xvhigh,yvlow,yvhigh
c
c     print*,' comgra,comscr : ',xllscr,yllscr,xurscr,yurscr
      xllbvp = xvlow+(xvhigh-xvlow)*(xllbox-xllscr)/(xurscr-xllscr)
      xurbvp = xvlow+(xvhigh-xvlow)*(xurbox-xllscr)/(xurscr-xllscr)
      yllbvp = yvlow+(yvhigh-yvlow)*(yllbox-yllscr)/(yurscr-yllscr)
      yurbvp = yvlow+(yvhigh-yvlow)*(yurbox-yllscr)/(yurscr-yllscr)
c     print*,'Box viewport',xllbvp,xurbvp,yllbvp,yurbvp
c     print*,'    ',xllbox,xurbox,yllbox,yurbox
c
      return
      end

C++++++++++++++++++++++++++++++++++++++++++++++++++++++++++++++++++++++++|+++++++
C UNIT NAME:                      CALCPR
C
C FUNCTIONAL DESCRIPTION:
C
C CALLED BY:                      STATEC
C
C PROGRAMMER:                     DATE OF LAST CHANGE     REASON FOR CHANGE
C  S. LAMB                        FEB 88                  COMMAND FIX - CALCPR
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine calcpr
c
c     this subroutine is the calculate area parameters state interpreter (11)
c
      common /states/ nextst
      logical isarea
      logical wordis,iseoc
      real sparms(4)
      real mparms(4)
      common /mparms/ mparms
c
      do 90 i=1,4
           sparms(i) = mparms(i)
   90 continue
      initls = nextst
c     do until nextst not = initial state
  100 continue
         call getwrd
         if (wordis('AND')) then
c * ** *** **** ***** ****** ******* not understood
            nextst = 15
         else if (iseoc()) then
            nextst = 3
         else if (isarea()) then
            if (mparms(1).lt.sparms(1)) sparms(1) = mparms(1)
            if (mparms(2).gt.sparms(2)) sparms(2) = mparms(2)
            if (mparms(3).lt.sparms(3)) sparms(3) = mparms(3)
            if (mparms(4).gt.sparms(4)) sparms(4) = mparms(4)
```

```
            else
                call putwrd
                nextst = 3
            endif
        if (nextst.eq.initls) go to 100
c       *** this assumes the next state is 3 or you want to change map params.
        call calmap (sparms)
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                   calcvp
c
c  Functional Description:
c       calculate system message area viewport parameters
c
c  Input Files/Parameters:
c
c  Output Files/Parameters: N/A
c
c  Subroutines/Functions Called:
c
c  Called By:                   FMAIN
c
c  Local Variables: N/A
c
c  Restrictions: N/A
c
c  Abnormal Return Conditions:  N/A
c
c  Location:     Apollo      /a21/dave
c
c  Programmer       Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*|*-*-*-*-
c
        subroutine calcvp
c
c       calculate system message area viewport parameters
c
        common /comscr/ xllscr,yllscr,xurscr,yurscr
        common /comsys/xllsys,yllsys,xursys,yursys,ibcsys,iocsys,incsys
        common /comcvp/ xllcvp,yllcvp,xurcvp,yurcvp
        common /aspect/ xaspec,yaspec,xvlow,xvhigh,yvlow,yvhigh
c
        xllcvp = xvlow+(xvhigh-xvlow)*(xllsys-xllscr)/(xurscr-xllscr)
        xurcvp = xvlow+(xvhigh-xvlow)*(xursys-xllscr)/(xurscr-xllscr)
        yllcvp = yvlow+(yvhigh-yvlow)*(yllsys-yllscr)/(yurscr-yllscr)
        yurcvp = yvlow+(yvhigh-yvlow)*(yursys-yllscr)/(yurscr-yllscr)
c        print*,'System viewport',xllcvp,xurcvp,yllcvp,yurcvp
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                   calgvp
c
c  Functional Description:
c       calculate graphics viewport parameters
c
c  Input Files/Parameters:
c
c  Output Files/Parameters: N/A
c
c  Subroutines/Functions Called:
c
c  Called By:                   FMAIN, RBOUND
c
c  Local Variables: N/A
c
c  Restrictions: N/A
```

```
c
c  Abnormal Return Conditions:  N/A
c
c  Location:      Apollo       /a21/dave
c
c  Programmer         Date of Last Change        Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine calgvp
c
c     calculate graphics viewport parameters
c
      common /comscr/ xllscr,yllscr,xurscr,yurscr
      common /comgra/xllgra,yllgra,xurgra,yurgra,ibcgra,iocgra
      common /comgvp/ xllgvp,yllgvp,xurgvp,yurgvp
      common /gphwdo/xllgeo,yllgeo,xurgeo,yurgeo
      common /aspect/ xaspec,yaspec,xvlow,xvhigh,yvlow,yvhigh
      logical lton(16),dotem
      integer ipgrid(4),ltyptb(16)
      common /map/ XRNM,XC,YC,LEVEL,CLAT,CLON,XRAD,YRAD,ITPROJ,
     +    IRES,LTYPTB,LUNDAT,LUNIND,LUNLIN,LTON,IPGRID,DOTEM,
     +    ORHALT
c
c     print*,' comgra,comscr : ',xllscr,yllscr,xurscr,yurscr,
c    + xllgra,yllgra,xurgra,yurgra
c     print*,'Graphics viewport',xllgvp,xurgvp,yllgvp,yurgvp
      xllgvp = xvlow+(xvhigh-xvlow)*(xllgra-xllscr)/(xurscr-xllscr)
      xurgvp = xvlow+(xvhigh-xvlow)*(xurgra-xllscr)/(xurscr-xllscr)
      yllgvp = yvlow+(yvhigh-yvlow)*(yllgra-yllscr)/(yurscr-yllscr)
      yurgvp = yvlow+(yvhigh-yvlow)*(yurgra-yllscr)/(yurscr-yllscr)
c     print*,'Graphics viewport',xllgvp,xurgvp,yllgvp,yurgvp
      yrad = xrad * (yurgvp - yllgvp) / (xurgvp - xllgvp)
      yc = yrad
      xllgeo = -xrad
      xurgeo = xrad
      yllgeo = -yrad
      yurgeo = yrad
c     print*,'Calgvp -- New yrad = ',yrad,xllgvp,xurgvp,yllgvp,yurgvp
c
      return
      end


C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                     calkvp
c
c  Functional Description:
c       calculate key area viewport parameters
c
c  Input Files/Parameters:
c
c  Output Files/Parameters: N/A
c
c  Subroutines/Functions Called:
c
c  Called By:                     FMAIN
c
c  Local Variables: N/A
c
c  Restrictions: N/A
c
c  Abnormal Return Conditions:  N/A
c
c  Location:      Apollo       /a21/dave
c
c  Programmer         Date of Last Change        Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine calkvp
c
c     calculate key area viewport parameters
c
```

```
      common /comscr/ xllscr,yllscr,xurscr,yurscr
      common /comkey/xllkey,yllkey,xurkey,yurkey,ibckey,iockey,inckey
      common /comkvp/ xllkvp,yllkvp,xurkvp,yurkvp
      common /aspect/ xaspec,yaspec,xvlow,xvhigh,yvlow,yvhigh
c
      xllkvp = xvlow+(xvhigh-xvlow)*(xllkey-xllscr)/(xurscr-xllscr)
      xurkvp = xvlow+(xvhigh-xvlow)*(xurkey-xllscr)/(xurscr-xllscr)
      yllkvp = yvlow+(yvhigh-yvlow)*(yllkey-yllscr)/(yurscr-yllscr)
      yurkvp = yvlow+(yvhigh-yvlow)*(yurkey-yllscr)/(yurscr-yllscr)
c     print*,'key viewport',xllkvp,xurkvp,yllkvp,yurkvp
c
      return
      end


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: CALMAP
C
C FUNCTIONAL DESCRIPTION:  CALCULATES MAP PARAMETERS
C
C INPUT FILES/PARAMETERS:
C
C       MPARMS                   REAL(4)     MIN LAT,MAX LAT,MIN LON, MAX LON.
C
C GLOBAL VARIABLES :
C
C       QITPRO                   INTEGER     CURRENT PROJECTION.
C       QCLAT                    REAL        LATITUDE AT CENTER OF MAP.
C       QCLON                    REAL        LONGITUDE AT CENTER OF MAP.
C
C OUTPUT FILES/PARAMETERS:  NONE.
C
C SUBROUTINES/FUNCTIONS CALLED : NONE.
C
C CALLED BY:                      CALCPR, FSHOWA, FDFPRO
C
C LOCAL VARIABLES:
C
C       RMINLA                   REAL        MINIMUM LATITUDE.
C       RMAXLA                   REAL        MAXIMUM LATITUDE.
C       RMINLO                   REAL        MINIMUM LONGITUDE.
C       RMAXLO                   REAL        MAXIMUM LONGITUDE.
C       CM2RAD                   REAL        CONVERTS MINUTES TO RADIANS.
C       RADLAT                   REAL        LATITUDE DIFFERENCE.
C       RADLON                   REAL        LONGITUDE DIFFERENCE.
C       R1                       REAL        COSINE MINLAT.
C       R2                       REAL        COSINE MINLON.
C       RRAD                     REAL        RADIUS OF MAP.
C
C RESTRICTIONS: NONE.
C
C ABNORMAL RETURN CONDITIONS:   NONE.
C
C LOCATION:                       /a21/gjf/MAPADD.FTN
C
C PROGRAMMER:                     DATE OF LAST CHANGE     REASON FOR CHANGE
C
C    DAVE NATION                                          ORIGINAL CODE.
C    JERRY FENERTY                                        DOCUMENT AND MODIFY
C                                                         FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE CALMAP (MPARMS)

C     CALCULATES A MAP CENTER POINT AND SCALE FROM GEOGRAPHIC LIMITS

      REAL MPARMS(4)

      COMMON /PIE/ PIE,TPIE,PIO2,PIO4
      LOGICAL QLTON(16),QDOTEM
      INTEGER QPGRID(4),QTYPTB(16)
      INTEGER QLEVEL,QITPRO,QIRES,QLUNDA,QLUNIN,QLUNLI
      COMMON /MAP/ QXRNM,QXC,QYC,QLEVEL,QCLAT,QCLON,QXRAD,QYRAD,
```

```
     +      QITPRO,
     +      QIRES,QTYPTB,QLUNDA,QLUNIN,QLUNLI,QLTON,QPGRID,QDOTEM,
     +      QORHAL

        logical olhldf
        common /ohfdbc/ olhldf

C       CONVERT MINUTES TO RADIANS BY MULTIPLYING BY CM2RAD

        DATA CM2RAD/2.908882087E-4/

        RMINLA = MPARMS(1)
        RMAXLA = MPARMS(2)
        RMINLO = MPARMS(3)
        RMAXLO = MPARMS(4)

        RADLON = (RMAXLO-RMINLO)/2.
        RADLAT = (RMAXLA-RMINLA)/2.

        QCLAT = RMINLA + RADLAT
        QCLON = RMINLO + RADLON


C       COMPENSATE FOR SHORTER DISTANCES BETWEEN MERIDIANS AT HIGHER LATS

        RADLON = RADLON * COS (QCLAT)
C           COMPENSATE FOR MERCATOR STRETCHING IN Y DIRECTION
c           PRINT*,'RADLAT,RADLON : ',RADLAT,RADLON

        IF (olhldf) THEN
            R1 = COS(RMAXLA)
            R2 = COS(RMINLA)
            IF(R2.LT.R1) R1 = R2
            IF (R1.LT..3) R1 = .3
            R2 = RADLAT / R1
            RADLAT = RADLAT + (R2 - RADLAT)/2
            PRINT*,'RADLAT,R2,R1 = ',RADLAT,R2,R1
        endif

c           corrects for windows wrapped around the date line
            if (rminlo.gt.rmaxlo) then
              if (qclon.ge.0.) then
                qclon = qclon - pie
              else
                qclon = qclon + pie
              endif
            endif


        RRAD = RADLON

        IF (RADLAT.GT.RADLON) RRAD = RADLAT

        XRNMNW = (RRAD*1.25)/CM2RAD

        CALL CHSCAL (XRNMNW)

        RETURN
        END

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                   calmvp
c
c  Functional Description:
c       calculate menu area viewport parameters
c
c  Input Files/Parameters:
c
c  Output Files/Parameters: N/A
c
c  Subroutines/Functions Called:
```

```
c
c  Called By:                    FMAIN
c
c  Local Variables: N/A
c
c  Restrictions: N/A
c
c  Abnormal Return Conditions:  N/A
c
c  Location:      Apollo      /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine calmvp
c
c     calculate menu area viewport parameters
c
      common /comscr/ xllscr,yllscr,xurscr,yurscr
      common /commen/xllmen,yllmen,xurmen,yurmen,ibcmen,iocmen,incmen
      common /commvp/ xllmvp,yllmvp,xurmvp,yurmvp
      common /aspect/ xaspec,yaspec,xvlow,xvhigh,yvlow,yvhigh
c
      xllmvp = xvlow+(xvhigh-xvlow)*(xllmen-xllscr)/(xurscr-xllscr)
      xurmvp = xvlow+(xvhigh-xvlow)*(xurmen-xllscr)/(xurscr-xllscr)
      yllmvp = yvlow+(yvhigh-yvlow)*(yllmen-yllscr)/(yurscr-yllscr)
      yurmvp = yvlow+(yvhigh-yvlow)*(yurmen-yllscr)/(yurscr-yllscr)
c     print*,'Menu viewport',xllmvp,xurmvp,yllmvp,yurmvp
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    CERROR
C
C FUNCTIONAL DESCRIPTION:       .
C
C CALLED BY:                    AREANF, DISCEN, DISPRO, DISSCA, NOTUND
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine cerror (len,msg)
c
c     this subroutine puts an error message to the system area for commands
c
      call drwamp (msg,1)
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: CHAWDB
C
C FUNCTIONAL DESCRIPTION:  CHANGES WORLD DATA BANK.
C
C INPUT FILES/PARAMETERS:
C
C       LENWDB              INTEGER      LENGTH OF WDB STRING.
C       WDB                 CHAR*(*)     NEW WDBII.
C
C GLOBAL VARIABLES :
C
C       QLUNDA              INTEGER      LOGICAL UNIT NUMBER FOR WDBII DATA
C                                        FILE.
C       QLUNIN              INTEGER      LOGICAL UNIT NUMBER FOR WDBII
C                                        INDEX FILE.
C       QLUNLI              INTEGER      LOGICAL UNIT NUMBER FOR WDBII LINE
C                                        INDEX FILE.
C       LENMAP              INTEGER      LENGTH OF MAP PATHNAME.
```

```
C        MAPATH                CHAR*50     WDBII FILE PATHNAMES.
C        IERWDB                INTEGER     WDBIIx OPEN ERROR FLAG
C
C OUTPUT FILES/PARAMETERS:  NONE.
C
C SUBROUTINES/FUNCTIONS CALLED :
C
C        OPENIN                OPENS WDBII FILES.
C        CLOSEI                CLOSES WDBII FILES.
C
C CALLED BY:                    CHSCAL, DECDET, INCDET, RPARAM, RSLCON
C
C LOCAL VARIABLES:
C
C        FIRSTM                LOGICAL     INDICATES FIRST TIME FILES ARE OPENED.
C        WDBFUL                CHAR*50     WDBII FILE FULL PATHNAME.
C        IERROR                INTEGER     ERROR CONDITION.
C
C RESTRICTIONS: NONE.
C
C ABNORMAL RETURN CONDITIONS:   NONE.
C
C LOCATION:                     /a21/gjf/MAPSRC.FTN
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE CHAWDB (LENWDB,WDB)

C     THIS SUBROUTINE CHANGES THE VERSION OF THE WDBII FILE

      character*50 mapath
      common /mapath/ mapath
      common /lenmap/ lenmap
      LOGICAL FIRSTM
      CHARACTER*(*) WDB
      CHARACTER*100 WDBFUL
      COMMON /CERWDB/ IERWDB
      LOGICAL map
      common /mapdbc/ map
      LOGICAL QLTON(16),QDOTEM
      INTEGER QPGRID(4),QTYPTB(16)
      INTEGER QLEVEL,QITPRO,QIRES,QLUNDA,QLUNIN,QLUNLI

        COMMON /MAP/ QXRNM,QXC,QYC,QLEVEL,QCLAT,QCLON,QXRAD,QYRAD,
     +      QITPRO,
     +      QIRES,QTYPTB,QLUNDA,QLUNIN,QLUNLI,QLTON,QPGRID,QDOTEM,
     +      QORHAL
        DATA FIRSTM/.TRUE./

        IF (FIRSTM) THEN
            FIRSTM = .FALSE.
        ELSE
            CALL CLOSEI (QLUNDA,QLUNIN,QLUNLI)
        ENDIF
        IF (LENMAP.GT.0) THEN
            WDBFUL = MAPATH(1:LENMAP) // WDB(1:LENWDB)
            LENFUL = LENWDB + LENMAP
        else
            wdbful = wdb(1:lenwdb)
            lenful = lenwdb
        ENDIF
        IF (map) then
            print*,'mapath = ',mapath(1:lenmap),lenmap
            print*,'CHAWDB OPENING ',wdbful(1:lenful),lenful
        endif
        CALL OPENIN (QLUNDA,QLUNIN,QLUNLI,LENFUL,WDBFUL,IERROR)
        IERWDB = IERROR

        RETURN
        END
```

```
C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    CHDATE
C
C FUNCTIONAL DESCRIPTION:       .
C
C CALLED BY:                    DIFTIM, FADCHG, FADTIM
C
C PROGRAMMER:                   DATE OF LAST CHANGE    REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine chdate(year,day,hour,min,dtg)

c
c  this subroutine takes a julian dtg in integer and converts
c  it to a character*9 string in format yydddhhmm
c
      integer year
      integer day
      integer hour
      integer min
      character*9 dtg

      dtg(1:1) = char (mod ((year/10), 10) + 48)
      dtg(2:2) = char ((year - (year/10) * 10) + 48)
      dtg(3:3) = char ((day / 100) + 48)
      dtg(4:4) = char (mod ((day/10), 10) + 48)
      dtg(5:5) = char ((day - (day/10) * 10) + 48)
      dtg(6:6) = char (mod ((hour/10), 10) + 48)
      dtg(7:7) = char ((hour - (hour/10) * 10) + 48)
      dtg(8:8) = char (mod ((min/10), 10) + 48)
      dtg(9:9) = char ((min - (min/10)*10)+48)
c     print*,'in chdate: ',dtg
      return
      end


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    check
C
C FUNCTIONAL DESCRIPTION:       check which function button has been hit
C
C INPUT FILES/PARAMETERS:
C     Menu control globals
C       qcancl      bl        logical  cancel flag
C       qext2m      bl        logical  exit to main menu flag
C       qretrn      bl        logical  return to previous action/menu
C
C     General globals
C       qfb         butons    integer  array of values for function buttons
C       qmb         butons    integer  array of values for the mouse buttons
C
C
C
C OUTPUT FILES/PARAMETERS:
C
C     error                   logical  true if an error is detected by
C                                      check
C     rflag                   logical  true if exiting the calling menu
C
C SUBROUTINES/FUNCTIONS CALLED
C
C     helper                  display the appropriate help file
C     llshow                  display the lat/long of a point on the screen
C     printr                  prints current screen image
C     prompt                  displays a message on the screen and
C                             gets input from the user
C     redraw                  clear the screen and redraw it from segment
C                             storage
C     scrdia                  display the diameter of the current map
C     tmpstr                  temporary store the graphic
C
C
C CALLED BY:                    BOXARE, COLBAK, DETCON, LLSHOW, MMCON,
C                               OFFST,  PROCON, PRTMEN, RECDIS,
```

```
C                              RESCON, RSLCON, SAVDIS, TRKCON, TXWRIT,
C                              CLASS,  FTRCON, GEOCON, OVRCON
C
C LOCAL VARIABLES:
C
C     button                 integer  button passed to check
C     cmenu                  integer  menu id of routine calling check
C
C RESTRICTIONS:
C
C
C ABNORMAL RETURN CONDITIONS:   n/a
C
C LOCATION:                     /u2/say/TEXT/source/check.f
C
C PROGRAMMER:                   DATE OF LAST CHANGE     REASON FOR CHANGE
C
C     SAYates                   10/27/83         initial entry
C     RPSmith                   11/20/87         add dist/az arc to mrkseg
C     L. McCleary               Jan 1988         sep amp & sys - check
C
C-*-*-*-*-*-*-*-*-*-*-*-*-*-*-*-*-*-*-*-*-*-*-*-*-*-*-*-*-*-*-*-*-*-*-*|*-*-*-*-

      subroutine check(button,cmenu,error,rflag)
c
c*****routine to determine which function button was used
c
c*****definition and declaration of common blocks
c
      common/bl/qcancl,qext2m,qretrn,qstmnu,qnextm
      integer     qnextm
      logical     qcancl,qext2m,qretrn,qstmnu
c
      common/butons/qfb,qmb
      integer     qfb(26),qmb(4)

        common /msgold/ msgold,msgonm

        common/ampprm/ampseg,ampsgb
        integer ampseg,ampsgb
c ----- updated 7/31/87 CSL
        common /amfrst/ amfrst
        logical amfrst

        integer dstsg1,dstsg2,dstsg3
        logical dstfst
        common/mrkseg/dstsg1,dstsg2,dstsg3,dstfst

        common/llseg/llsgmt,llfrst
        integer llsgmt
        logical llfrst

      common/picks/qsegid,qpick,qmodfl
      integer     qsegid,qpick
      logical     qmodfl
      logical sys
      common /sysdbc/ sys
c
c*****declaration of local variables

      integer     cmenu,button
      logical     rflag,error
      logical     found

      if (sys) print*,'check -- enter ',button,cmenu

      qretrn = .false.
      rflag = .false.
      error = .false.

         call subchk (button,cmenu,error,rflag)
         if (error) then
             error = .false.
c*****       help
c             if(button .eq. qfb(23) .or. button .eq. qmb(3)) then
```

```
            if(button .eq. qfb(23) .or. button .eq. qmb(2)) then
               call helper (cmenu)
c*****      print
            else if(button .eq. qfb(24)) then
                call prtmen
c*****      display latitude and longitude
            else if(button .eq. qfb(17)) then
                call llshow
c*****      display diameter of map
            else if(button .eq. qfb(18)) then
                call scrdia
c*****      Command Mode
            else if(button .eq. 85) then
                call commnd
c*****      Draw Current Map
            else if(button .eq. 86) then
                call drwmap
c*****      Delete the amplification segment
            else if(button.eq.ampseg.and.button.ne.0) then
                call jpurge(ampseg)
                call jvisbl(ampsgb,0)
                call jvisbl(ampsgb,1)
                amfrst = .true.
                if(.not. llfrst) then
                   call jpurge(llsgmt)
c ----- updated 7/31/87 CSL
                   llfrst = .true.
                endif
                if(.not. dstfst)then
                   call jpurge(dstsg1)
                   call jpurge(dstsg2)
                   call jpurge(dstsg3)
c ----- updated 7/31/87 CSL
                   dstfst = .true.
                end if
            else
c*****          tracking data plot interrogation
                call findtk(button,found)
                if (.not. found) then
                     error = .true.
                endif
            endif
            call mesg(1)
            if (qcancl.or.qext2m) rflag = .true.
            if (sys) print*,'check -- exit ', error, rflag
        endif

      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: checka
C
C FUNCTIONAL DESCRIPTION:  CHECKS A RECTANGULAR GEOGRAPHIC AREA FOR
C      INTERSECTION WITH VIEWPORT DISPLAY AREA
C
C INPUT FILES/PARAMETERS:
C
C GLOBAL VARIABLES : NONE.
C
C OUTPUT FILES/PARAMETERS:  NONE.
C
C SUBROUTINES/FUNCTIONS CALLED :
C
C CALLED BY:                    NO LONGER USED BY CARICATURE
C
C LOCAL VARIABLES: NONE.
C
C RESTRICTIONS: NONE.
C
C ABNORMAL RETURN CONDITIONS:   NONE.
C
C LOCATION:
C
```

```
C PROGRAMMER:                       DATE OF LAST CHANGE     REASON FOR CHANGE
C
C     DAVE NATION                                           ORIGINAL CODE.
C     JERRY FENERTY                                         DOCUMENT AND MODIFY
C                                                           FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE CHECKA (CHINV,ALLINV,SOMEON,ALIMIT)

C CHECKS A RECTANGULAR GEOGRAPHIC AREA FOR
C      INTERSECTION WITH VIEWPORT DISPLAY AREA

      LOGICAL CHINV,ALLINV,SOMEON,ISON,ISINV
      DIMENSION ALIMIT(4),RLA(4),RLO(4),X(4)
      COMMON /VIEWP/ XRAD,YRAD,IXNP,IYNP,XC,YC
      RLA(1)=ALIMIT(1)
      RLA(2)=ALIMIT(2)
      RLA(3)=ALIMIT(1)
      RLA(4)=ALIMIT(2)
      RLO(1)=ALIMIT(3)
      RLO(2)=ALIMIT(3)
      RLO(3)=ALIMIT(4)
      RLO(4)=ALIMIT(4)

      IXT=0
      IYT=0
      VCNT=0
      SOMEON=.FALSE.

      DO 620 K=1,4

          ISINV=.FALSE.

          IF (CHINV) THEN
              CALL INVTES (RLA(K),RLO(K),ISINV)
          ENDIF

          IF (.NOT.ISINV) THEN
              VCNT=VCNT+1
              CALL LLTOXY(RLA(K),RLO(K),X(K),Y)
              CALL CLIPXY(X(K),Y,ISON)
c     ******************
c     the following statement is necessary to get this subroutine
c     to work on the apollo for some reason (any dummy statement
c     would do)
C      i = i                          Apollo fix - checka
c     ******************
              IF(ISON) THEN
                  SOMEON=.TRUE.
              ELSE
                  IXT=IXT+IXNP
                  IYT=IYT+IYNP
              ENDIF
          ENDIF
 620  CONTINUE

C     THIS STATEMENT NECESSARY FOR RECTANGULAR PROJECTIONS AT BREAK POINT
C     IF(X(1).GT.X(3)) SOMEON=.FALSE.
C                           THIS STATEMENT CAN BE TAKEN OUT FOR INSURANCE
C                           THAT INVISIBILITY IS CHECKED ALL THE TIME

      IF(VCNT.EQ.4) CHINV=.FALSE.
      IF(VCNT.EQ.0) THEN
          ALLINV=.TRUE.
      ELSE
          IF (.NOT.SOMEON.and.x(1).le.(x(3)+xrad*2)) THEN
              IF (ABS(IXT).LT.VCNT.AND.ABS(IYT).LT.VCNT)
     +        THEN
                  SOMEON=.TRUE.
              ENDIF
          ENDIF
      ENDIF
```

```
 690   CONTINUE

       RETURN
       END

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     CHECKB
C
C FUNCTIONAL DESCRIPTION:        .
c -   Description: Checks whether any portion of a segment lies within the
c -                viewport for a LAMBERT Conformal map projection.
C
C CALLED BY:                     NO LONGER USED BY CARICATURE
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

       SUBROUTINE checkb(someon,alimit)

       LOGICAL   someon,ison
       DIMENSION alimit(4),rla(4),rlo(4)

       rla(1) = alimit(1)
       rla(2) = alimit(2)
       rla(3) = alimit(1)
       rla(4) = alimit(2)
       rlo(1) = alimit(3)
       rlo(2) = alimit(3)
       rlo(3) = alimit(4)
       rlo(4) = alimit(4)

       someon=.FALSE.
       DO 620 k=1,4
          CALL lltoxy(rla(k),rlo(k),x,y)
          CALL clipxy(x,y,ison)
          IF (ison) someon = .TRUE.
 620   CONTINUE

       RETURN
       END

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     CHECKM
C
C FUNCTIONAL DESCRIPTION:        .
C -          CHECKS RECTANGULAR AREA FOR INTERSECTION
C -          WITH VIEWPORT (MERCATOR & EQUIRECTANGULAR).
C
C CALLED BY:                     NO LONGER USED BY CARICATURE
C
C PROGRAMMER:                    DATE OF LAST CHANGE     REASON FOR CHANGE
c -   L MCCLEARY                                         ORIGINAL CODE
C
C-*-*-*-*-*-*-*-*-*-*-*-*-*-*-*-*-*-*-*-*-*-*-*-*-*-*-*-*-*-*-*-*-*-*-*-*-*|*-*-*-*-
      SUBROUTINE CHECKM(PRLAT,PRLON,RLAT,RLON,ISGOOD,isinv)
      LOGICAL ISGOOD
      LOGICAL INVALI
      LOGICAL ISINV
      REAL PRLAT,PRLON,RLAT,RLON
      COMMON/INVALI/INVALI
      COMMON/PIE/PIE,TPIE,PIO2,PIO4
C
      IF (ABS(PRLON).GT.PIE) PRLON = PRLON - SIGN(TPIE,PRLON)
      CALL INVTES(PRLAT,PRLON,ISINV)
      CALL LLTOXY(PRLAT,PRLON,PX,PY)
      IF (ABS(RLON).GT.PIE)  RLON = RLON - SIGN(TPIE,RLON)
      CALL INVTES(RLAT,RLON,ISINV)
      CALL LLTOXY(RLAT,RLON,X,Y)
C
      ISGOOD=.FALSE.
      IF(.NOT.INVALI.AND..NOT.ISINV) ISGOOD=.TRUE.
      CALL INVTS2(RLAT,RLON,X,Y,PRLON,PX,ISGOOD)
C
      RETURN
      END
```

```
C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      CHGIND
C
C FUNCTIONAL DESCRIPTION:         .
C
C CALLED BY:                      SETFAD
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine chgind(faddtg,longer,indx)
c
c     this subroutine will add or delete tracks from the
c     current display list and the screen based upon the
c     new fade time input by the user in faddtg.
c
      logical done
      logical longer

      character*9 faddtg
      character*9 olddtg

      integer chkind
      integer indx
      integer lctrak

      integer tnewst
      integer toldst
      common /tarbou/ tnewst, toldst
      integer bgnpos
      integer endpos
      common /timpos/ bgnpos,endpos
      character*160  trkrec (1000)
      common /trkrec/ trkrec
      integer trkndx (1000)
      common /trkndx/ trkndx
      integer tfaddx
      integer tfadtm
      common /tfadez/ tfaddx, tfadtm
      integer numrcs
      common /numrcs/ numrcs
      integer ltypov(16)
      logical ltonov(16),rankt(26,16)
      common /maptoo/ ltypov,ltonov,rankt
      integer tkoset
      common /tkoset/ tkoset
      logical segact (1000)
      common /segact/ segact
      logical spprsd (1000)
      common /spprsd/ spprsd
      logical trackn
      common /trkdbc/ trackn

      data lctrak /3/
c
c     when longer is true then the fade time has been increased and therefore
c     the fade index (pointing to earliest displayed track) will decrease
c     to possibly include more tracks on the display

      if (trackn) then
         print *, 'enter chgind'
         print *, '   longer = ', longer
         print *, '   faddtg = ', faddtg
      end if

      done = .false.


      if (longer) then
c
c         Increasing the fade time...
c         when index is 0, nothing is visible;
c         start at tnewst (newest time on list)  and check up
c         the list for a track to become visible.
```

```
c
          if (trackn) then
             print *, '   indx = ', indx
          end if

          if ( indx .ne. 0) then
              chkind = indx
          else
              chkind = tnewst
          endif
c
c         check each time on list until end of list
c
 10       if (done) go to 20
c
c            get the dtg for this track
c
             olddtg(1:9) = trkrec(trkndx(chkind))(bgnpos:endpos)

c            compare it against the new faddtg
c
c            done is true if fade dtg is later than dtg of this record

             if (faddtg .ne. olddtg) then
                 call cmptim(faddtg, olddtg, done)
             endif
             if (.not. done) then
c
c                 if not yet done, then add this record to current display
c                 check to see if this record is suppressed
c
                  if (.not. spprsd(trkndx(chkind))) then
c
c                    if not suppressed, see if this segment
c                    is already active.  If so, make this
c                    segment(track) visible if tracking is on; else
c                    create a new segment.
c
                     if (segact(trkndx(chkind))) then
                        if (ltonov(lctrak)) then
                           call jvisbl (trkndx(chkind)+tkoset, 1)
                        endif
                     else
                        call seghnd (trkndx(chkind)+tkoset,
     +                        trkrec(trkndx(chkind)))
                        segact(trkndx(chkind)) = .true.
                     end if
                  end if
c
c                 when we get to end of current active
c                 tracks, we are done searching.c
c
                  if(chkind .eq. toldst) then
                      done = .true.
                  endif
c
c                 go to next oldest track
c
                  chkind = chkind - 1
                  if (chkind .eq. 0) then
                      if (trkndx(numrcs) .ne. 0) then
                          chkind = numrcs
                      else
                          chkind = 1
                          done = .true.
                      endif
                  endif
             endif
          go to 10
 20       continue
          indx = chkind
c
c     decreasing the fade time...
c     see if there are any tracks to be deleted from list and display
c
      else
```

```
         if (indx .ne. 0) then
 30           if(done) go to 40

                olddtg(1:9) = trkrec(trkndx(indx))(bgnpos:endpos)

c               done is true if this tracks dtg is later than
c               current fade dtg.

                call cmptim(olddtg, faddtg, done)
c
c               if not yet done, and this track is an
c               active segment, make the segment invisible
c
                if (.not. done) then
                     if (segact(trkndx(indx))) then
                         if (trackn) then
                            print *, 'indx = ', indx
                            print *, 'segment = ', trkndx(indx)+tkoset
                         end if
                         call jvisbl (trkndx(indx)+tkoset, 0)
                     end if
c
c                    if this is top of list, then we are done
c
                     if(indx .eq. tnewst) then
                         done = .true.
                         indx = 0
                     else
c
c                        else, get next position on list
c
                         indx = mod(indx,numrcs) + 1
                     endif
                endif
             go to 30
 40          continue
         endif
     endif

     if (trackn) then
        print *, 'exit chgind'
        print *, '   indx = ', indx
     end if

     return
     end
```

```
C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      CHGPTS
C
C FUNCTIONAL DESCRIPTION:         .
C
C CALLED BY:                      APARCS, APCIRC, APFILL, APLINE, APMARK,
C                                 APRECT, APSMOO
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine chgpts(array,npts,type)

c       this routine changes the array of points passed to
c          it by multiplying the point by a scalefactor
c          which has been set by a previous routine and
c          subtracting an offset value which has also
c          been preset and is set based on the 'type'
c          of array which has been passed-- 0 = x array,
c          1 = yarray, and 2 = neither, so an offset is
c          not applied to the passed array (ie, the radius of
c          a circle).
c          The points are "mirrored" about the 0-axis if the
c          mirror flag is set--0 = x points are to be mirrored,
c          1= y points are to be mirrored, 2 = points are not mirrored
c    VARIABLES:
```

```
c        array-points to be converted
c        npts- number of points in the array
c        type- type of array being passed-- 0=xarray, 1=yarray,
c            2= neither x or y
c        offset- the offset which will be set and applied to the
c            array
c        scale- the scale factor which will be set and applied
c            to the array
c        mirflg- integer flag to control the mirroring
c        xscale- the scalefactor to be applied to an x array
c        yscale- the scalefactor to be applied to a y array
c        xoffst- the offset to be applied to an x array
c        yoffst- the offset to be applied to a y array
c   CALLS:     mirrit mrcntr
c   PROGRAMMER:  Nancy Detrich, A215, March, 1984
C------ MODIFIED BY A692 FOR COMPLETION
c   Modified by David W. Swim, T3333, 5 AUG 1986


      real offset,scale,array(*)
      integer npts,type
      common /icon/ qicnum,qicseg,qiconx,qicony,qicszx,
     + qicszy,qicrot,qicmir,qictyp,qconnx,qconny,qiconn
      integer qicnum(6),qicseg,qicmir,qictyp,qiconn
      real qiconx,qicony,qicszx,qicszy,qicrot
      real qconnx,qconny
      common /chgit/ mirflg,xscale,yscale,xoffst,yoffst,rotang
      real xscale,yscale,rotang
      integer xoffst,yoffst,mirflg

c     IF TYPE = 0, PASSED ARRAY IS X ARRAY; IF 1, THEN Y ARRAY;
c      IF 2, THEN NEITHER (OFFSET SET TO ZERO)

      if(type .eq. 0)then
          scale = xscale
          offset = real(xoffst) - 1.2
      else if(type .eq. 1) then
          scale = yscale
          offset = real(yoffst) - 1.3
      else if (type.eq.2) then
          scale = xscale
          offset = 0.0
      endif

c     MULTIPLY ARRAY POINTS BY SCALE FACTOR & ADD OFFSET

      do 10 i=1,npts
          array(i) = array(i) * (scale) - offset
10    continue

c     ROTATE AN ICON
      if ((mirflg.eq.0).and.(type.eq.0)) then
c         mirror the X ARRAY
          if(qicnum(1).eq.22) goto 250
          if(qicnum(1).eq.143) goto 250
          if(qicnum(1).eq.144) goto 250
          if((qicnum(1).ge.152).and.(qicnum(1).le.195)) goto 250
          if((qicnum(1).ge.260).and.(qicnum(1).le.270)) goto 250
          call mirrit(array,npts,scale)
          goto 270
250       continue

c    Mrcntr is called when the icon is not a military symbol.
c    Military symbols are positioned by lower left while
c    other icons are positioned by center point.

          call mrcntr(array,npts,scale)

270       continue
      else if ((mirflg.eq.1).and.(type.eq.1)) then
c         mirror the Y ARRAY
          if(qicnum(1).eq.22) goto 260
          if(qicnum(1).eq.143) goto 260
          if(qicnum(1).eq.144) goto 260
          if((qicnum(1).ge.152).and.(qicnum(1).le.195)) goto 260
```

```
          if((qicnum(1).ge.260).and.(qicnum(1).le.270)) goto 260
          call mirrit(array,npts,scale)
          goto 280
260       continue
          call mrcntr(array,npts,scale)
280       continue
      endif
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    CHGTXT
C
C FUNCTIONAL DESCRIPTION:       .
C
C CALLED BY:                    APTEXT
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine chgtxt(height,x,y)

c        this routine is similar to the chgpts routine used
c          by all the other 'ap' routines, but is used for
c          the special case of text.  The points are converted
c          by the offset and scalefactor, and the height
c          is adjusted proportional to the scalefactor.
c          The common block variables were  set by the
c          routine calling either drawic or drwicn which
c          call this routine for redrawing all text.
c      VARIABLES:
c         height- height of the text to be displayed
c         x/y- coordinate for placement of the text--is processed
c           the same way chgpts handles all other coordinates
c         common block chgit- parameters set for changing points
c             in a file (mirror,scalefactors and offsets)
c      ***only one scale factor is needed for this routine, and
c             it is passed in the xscale
c    CALLS:     none
c    PROGRAMMER:  Nancy Detrich, A215, March, 1984


        integer height,x,y
        common /chgit/mirflg,xscale,yscale,xoffst,yoffst,rotang
        real xscale,yscale,rotang
        integer xoffst,yoffst,mirflg

c       multiply the height by the scalefactor
        height = height * xscale
C ***   INSERTED BY GJF, CAN'T IMAGE WHY A HEIGHT OF ZERO WOULD EVER
C ***                   BE DESIRED -- FOR ECHELON MENU.
        if (height.lt.1) height = 1
c       change the coordinates the same way coordinates are
c          changed in chgpts
        x = (REAL(x)) * xscale - xoffst
        y = (REAL(y)) * xscale - yoffst
c
        if (mirflg.eq.0) then
           x=INT((REAL(-x))+(190./(2.6/xscale))+.05)
        else if (mirflg.eq.1) then
           y=INT((REAL(-y))+(190./(2.6/xscale))+.05)
        endif
c

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    CHKCLK
C
C FUNCTIONAL DESCRIPTION:
C
```

```
C CALLED BY:                    TIMCHK
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine chkclk(click,curdtg)
c
c determine if a minute or more has gone by on the system clock
c
      logical click
      character*9 curdtg
c
c
      integer*2 oldtim(6)
      integer*2 newtim(6)
      common /ctimes/ oldtim, newtim
      data oldtim(1) /0/
      data oldtim(2) /0/
      data oldtim(3) /0/
      data oldtim(4) /0/
      data oldtim(5) /0/
      data oldtim(6) /0/

c     check click and get current time in yydddhhmm format

      call diftim(click, curdtg)

      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    CHKSIZ
C
C FUNCTIONAL DESCRIPTION:
C
C CALLED BY:
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine chksiz

c       check the size of the current retained segment and create a
c       new one if necessary

        COMMON /COUNTS/ ICNTGP,ICNTDV,icntpl
        COMMON /LTYPE/ LTYPE

        logical vax,map
        common /vaxdbc/ vax
        common /mapdbc/ map

        logical bitmod
        common /bitmod/ bitmod

        if (.not.bitmod) then
c           *** Apollo core has problems if icntdv gets in the range of 5700
            if (vax) then
                maxicn = 50000
            else
                maxicn = 5000
            endif
            if (icntdv.gt.maxicn) then
                icntdv = 0
                CALL FLUSHB
                CALL JRCLOS
ccc             CALL MESG(268)
                CALL GEOWIN
                CALL GRAVPT
                call getseg(newseg)
                IF (map) PRINT*,'IN chksiz OPENING SEGMENT # ',newseg
                CALL JROPEN(newseg)
                CALL XCOLOR (LTYPE)
            endif
```

```
      endif

      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                  CHLEVL
C
C FUNCTIONAL DESCRIPTION:      .
C
C CALLED BY:                   CHSCAL, DETCON, RPARAM
C
C PROGRAMMER:                  DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine chlevl (lev)
c
c     change level of detail variable and rank table
c
c     map parameters
      logical lton(16),dotem
      integer ipgrid(4),ltyptb(16)
      common /map/ XRNM,XC,YC,LEVEL,CLAT,CLON,XRAD,YRAD,ITPROJ,
     +    IRES,LTYPTB,LUNDAT,LUNIND,LUNLIN,LTON,IPGRID,DOTEM,
     +    ORHALT
      dimension ltypov(16)
      logical ltonov(16),rankt(26,16)
      common /maptoo/ ltypov,ltonov,rankt
c
      if (lev.eq.0) lev = 1
      level = lev
      do 305 j=1,16
          do 303 i=1,26
c             set sub-rank values for railroads and roads
              if ((j.eq.5.or.j.eq.6).and.i.gt.10) then
                  rankt(i,j) = rankt(i-10,j)
              else
                  if (level.ge.i) then
                      rankt(i,j) = .true.
                  else
                      rankt(i,j) = .false.
                  endif
              endif
  303     continue
c
c         when setlev is true then that
  305 continue
c     make sure standard guage railroads are turned on
      rankt(12,5) = .true.
c     turn on double line rivers
      rankt(5,4) = .true.
c     turn on lines of separation on land
      rankt(3,2) = .true.
c     turn on indefinite political boundaries
      rankt(2,2) = .true.
c
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: CHRLEN
C
C FUNCTIONAL DESCRIPTION:  NAMLIM OPENS NAME LIMITS FILE AND CALLS PLTNAM.
C
C INPUT FILES/PARAMETERS:
C
C       STRING              CHAR*(*)    CHARACTER STRING.
C
C GLOBAL VARIABLES : NONE.
C
C OUTPUT FILES/PARAMETERS:
C
```

```
C        CHRLEN               INTEGER     NON-BLANK LENGTH OF STRING.
C
C SUBROUTINES/FUNCTIONS CALLED :
C
C        LEN                  RETURNS DECLARED LENGTH OF STRING.
C
C CALLED BY: PLTNAM.
C
C LOCAL VARIABLES:
C
C        LN                   INTEGER     DECLARED LENGTH OF STRING.
C        IL                   INTEGER     NON-BLANK LENGTH OF STRING.
C
C RESTRICTIONS: NONE.
C
C ABNORMAL RETURN CONDITIONS:   NONE.
C
C LOCATION:                    /a21/gjf/MAPSRC.FTN
C
C PROGRAMMER:                  DATE OF LAST CHANGE     REASON FOR CHANGE
C
C     DAVE NATION                                      ORIGINAL CODE.
C     JERRY FENERTY                                    DOCUMENT AND MODIFY
C                                                      FOR A21 PROTOTYPE.
C
C-*-*-*-*-*-*-*-*-*-*-*-*-*-*-*-*-*-*-*-*-*-*-*-*-*-*-*-*-*-*-*-*-*-*-*|*-*-*-*-

      FUNCTION CHRLEN (STRING)

C     THIS FUNCTION FINDS THE NON-BLANK LENGTH OF STRING

      INTEGER CHRLEN
      CHARACTER*(*) STRING

      LN=LEN(STRING)
      IL=0

      DO 110 I=1,LN

          IF(STRING(I:I).NE.' ') IL=I

  110 CONTINUE

      CHRLEN=IL

      RETURN
      END

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME: CHSCAL
C
C FUNCTIONAL DESCRIPTION:  CHANGES MAP SCALE.
C
C INPUT FILES/PARAMETERS:
C
C        XRNMNW               REAL        NAUTICAL MILE RADIUS.
C
C GLOBAL VARIABLES :
C
C        QFNTAB               INTEGER(17) INDEX TO WHICH WDBII TO BE USED.
C        QCURWD               CHAR*6      CURRENT WDBII.
C        QLEVL                INTEGER(16) MAP FEATURE LEVELS.
C        QXRNM                REAL        NAUTICAL MILE RADIUS.
C        QLEVEL               INTEGER     OVERALL LEVEL OF FEATURES.
C        QPGRID               INTEGER(4)  DISTANCE BETWEEN GRID LINES AND
C                                         RESOLUTION OF GRID LINES.
C        QLTON                LOGICAL(16) INDICATES WHETHER FEATURE IS
C                                         TURNED ON.
C
C OUTPUT FILES/PARAMETERS:  NONE.
C
C SUBROUTINES/FUNCTIONS CALLED :
C
C        CHAWDB               CHANGES WDBII VERSION.
C
```

```
C CALLED BY:                      BOXARE, CALMAP, DECSCA, FCHSCA, INCSCA
C
C LOCAL VARIABLES:
C
C        FNLTR                   INTEGER(9)  WDBII DATA BASES.
C        SCALE                   INTEGER(17) MAP SCALE LEVEL TABLE.
C        LEVTAB                  INTEGER(17) DETAIL LEVELS TABLE.
C        ISTPTB                  INTEGER(17) DISTANCE BETWEEN LAT/LONG VALUES.
C        INCTAB                  INTEGER(17) RESOLUTION OF LINES.
C        MAXSCT                  INTEGER     LENGTH OF SCALE VALUE TABLE.
C        NAML                    INTEGER     LENGTH OF WDBII NAME.
C        SCPNTR                  INTEGER     INDEX INTO SCALE TABLE.
C        INDDB                   INTEGER     INDEX INTO WDBII LETTER TABLE.
C
C RESTRICTIONS: NONE.
C
C ABNORMAL RETURN CONDITIONS:   NONE.
C
C LOCATION:                       /a21/gjf/MAPADD.FTN
C
C PROGRAMMER:                     DATE OF LAST CHANGE     REASON FOR CHANGE
C
C     DAVE NATION                                         ORIGINAL CODE.
C     JERRY FENERTY                                       DOCUMENT AND MODIFY
C                                                         FOR A21 PROTOTYPE.
C     David Nation                86-12-4                 Move tables to
C                                                         common and init in
C                                                         inicom
C
C-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE CHSCAL (XRNMNW)

C       THIS SUBROUTINE ALLOWS THE CHANGING OF MAP SCALE

        CHARACTER FNLTR(9),B
        COMMON /chscle/ scale,levtab,istptb,inctab
        DIMENSION SCALE(17)
        INTEGER LEVTAB(17),ISTPTB(17),INCTAB(17)
        INTEGER QFNTAB(17),SCPNTR
        COMMON /FNTAB/ QFNTAB
        CHARACTER*6 QCURWD
        COMMON /CURWDB/ QCURWD
C       MAP PARAMETERS

        logical map
        common /mapdbc/ map

        logical quickd
        common /quickd/ quickd
        INTEGER QLEVL(16)
        COMMON /LEVLS/ QLEVL
        dimension ltypov(16)
        logical ltonov(16),rankt(26,16)
        common /maptoo/ ltypov,ltonov,rankt

        LOGICAL QLTON(16),QDOTEM
        INTEGER QPGRID(4),QTYPTB(16)
        INTEGER QLEVEL,QITPRO,QIRES,QLUNDA,QLUNIN,QLUNLI
        COMMON /MAP/ QXRNM,QXC,QYC,QLEVEL,QCLAT,QCLON,QXRAD,QYRAD,
     +      QITPRO,
     +      QIRES,QTYPTB,QLUNDA,QLUNIN,QLUNLI,QLTON,QPGRID,QDOTEM,
     +      QORHAL

        DATA FNLTR/'a','b','c','d','e','f','g','h','x'/
        DATA MAXSCT/17/
        DATA NAML/6/

        IF (map) then
            print*,'chscal -- enter ',xrnmnw,qlevl,qpgrid,'  ',
     +      qcurwd,'  ',qlton
        endif
        QXRNM = XRNMNW
        J=0
```

```
C        LOOP

  525        J=J+1

             IF (J.GE.MAXSCT.OR.QXRNM.LE.SCALE(J)) GO TO 527

             GO TO 525

C        ENDLOOP

  527    SCPNTR=J

C        SCALE CHANGE PARAMETER PROCESSING
C          TO REDUCE CLUTTER

  300    CONTINUE

         QLEVEL=LEVTAB(SCPNTR)
         IF (map) print*,'in chscal setting level to',qlevel
              DO 110 I=1,16

                 IF (QLTON(I)) THEN
                     QLEVL(I) = QLEVEL

                 ELSE

                     QLEVL(I) = 0

                 ENDIF

 110            CONTINUE

c
c        set the new ranks for each feature
c
         call chlevl(LEVTAB(SCPNTR))

         QPGRID(1)=ISTPTB(SCPNTR)
         QPGRID(2)=ISTPTB(SCPNTR)
         QPGRID(3)=INCTAB(SCPNTR)
         QPGRID(4)=INCTAB(SCPNTR)

         INDDB=QFNTAB(SCPNTR)

         IF (quickd) THEN
            INDDB = INDDB + 2
            IF (INDDB .GT. 6) INDDB = 6
         ENDIF

C        THIS SUBROUTINE SETS THE WDBII LEVEL

         B=FNLTR(INDDB)

         IF (B.NE.QCURWD(6:6)) THEN
            IF (map) PRINT*,'CHANGING WDB FROM ',QCURWD,'TO ',B
            QCURWD(6:6) = B
            CALL CHAWDB (NAML,QCURWD)
         ENDIF

         IF (QXRNM.GE.2900) THEN
              DO 312 I=2,6
                 QLTON(I)=.FALSE.
  312    CONTINUE

         QLTON(11) = .FALSE.
         QLTON(12) = .FALSE.

         ENDIF

         IF (map) then
             print*,'chscal -- exit ',xrnmnw,qlevl,qpgrid,'  ',
     +       qcurwd,'  ',qlton
         endif

         RETURN
         END
```

```
C+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                   circle
c
c  Functional Description:
c       this subroutines draws a circle
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:
c
c  Local Variables: N/A
c
c  Restrictions: N/A
c
c  Abnormal Return Conditions:  N/A
c
c  Location:      /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine circle (x0,y0,radius,nseg)
c
c      draw circle
c
       real cxarra (101), cyarra(101),angle,delta

       logical map
       common /mapdbc/ map

       data pi/3.1415927/
c      arb is an arbitrary factor limiting the size of default vectors
c      llimit is the lower limit of nnseg
c      max is the upper limit of nnseg
       data llimit,max /10,100/
       data arb /100./
c
       if (map) print*,'circle -- enter',x0,y0,radius,nseg
       numseg = nseg
       IF (numseg .LT. 3) THEN
           numseg = 360. * radius / arb
       ENDIF
       if (numseg .lt. llimit) numseg = llimit
       if (numseg .gt. max) numseg = max
C
c    define increment of angle
c
       delta = 2. * 3.141596 / float(numseg)
c    determine points around the circle using formula
c    x = xc + r*cos(angle)
c    y = yc + r*sin(angle)
c
       do 10 i = 1,numseg
           angle = FLOAT(i-1)*delta
           cxarra(i) = x0 + radius * cos( angle )
           cyarra(i) = y0 + radius * sin( angle )
  10   continue
c
c      make sure polygon is closed on Apollo
       cxarra(numseg+1) = cxarra(1)
       cyarra(numseg+1) = cyarra(1)
C
       call jmove (cxarra(1),cyarra(1))
       call jpolgn (cxarra,cyarra,numseg+1)
       call jpoly (cxarra,cyarra,numseg+1)
       if (map)
    +      print*,'circle -- exit ',i,temp,x,y,aseg,curang,
    +      radius,numseg
       RETURN
       END
```

```
C+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    clenup
c
c  Functional Description:
c       this subroutine cleans up any system dependent things
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                    FMAIN
c
c  Local Variables: N/A
c
c  Restrictions: N/A
c
c  Abnormal Return Conditions:  N/A
c
c  Location:      /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*|*-*-*-*-
c
        subroutine clenup

c       this subroutine cleans up any system dependent things

        integer qdsdev,qpydev,qecho,qlecho
        common /device/ qdsdev,qpydev,qecho,qlecho
        logical rdkey,savkey
        common /rkdbc/ rdkey
        common /svkdbc/ savkey
        logical eofkey
        integer keylun,newlun
        common /keylun/ keylun,newlun,eofkey
        character*6 commnd

        CALL JDEVOF (qdsdev)
        CALL JDEND  (qdsdev)
        CALL JEND
        if (rdkey) then
            if (.not.eofkey) then
                call kpause (eofkey)
                read (keylun,*,end=192,err=191) commnd
                if (commnd(1:4).ne.'jend') then
                    print*,'clenup -- incompatible command in',
     +              ' read_keys file  ',commnd
                endif
            endif
            close (keylun)
        endif
        go to 199
 191    continue
            print*,'clenup -- error on read of save key file',
     +      '  ',keylun
            go to 199
 192    continue
            print*,'clenup -- premature end of read key file.'
            eofkey = .true.
 199    continue
        if (savkey) then
            write (newlun,*,err=135) '''jend'''
            close (newlun)
        endif
        go to 140
 135    continue
            print*,'clenup -- error on write to save key file',
     +      '  ',newlun
 140    continue

        return
        end
```

```
C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: CLOSEI
C
C FUNCTIONAL DESCRIPTION:  CLOSEES CURRENT WDBII FILES.
C
C INPUT FILES/PARAMETERS:
C
C       LUNDAT                  INTEGER     LOGICAL UNIT NUMBER FOR WDBII DATA
C                                           FILE.
C       LUNIND                  INTEGER     LOGICAL UNIT NUMBER FOR WDBII INDE
C                                           FILE.
C       LUNLIN                  INTEGER     LOGICAL UNIT NUMBER FOR WDBII LINE
C                                           INDEX FILE.
C
C GLOBAL VARIABLES : NONE.
C
C OUTPUT FILES/PARAMETERS:  NONE.
C
C SUBROUTINES/FUNCTIONS CALLED : NONE.
C
C CALLED BY: CHAWDB.
C
C LOCAL VARIABLES: NONE.
C
C RESTRICTIONS: NONE.
C
C ABNORMAL RETURN CONDITIONS:   NONE.
C
C LOCATION:                       /a21/gjf/L3REA.FTN
C
C PROGRAMMER:                     DATE OF LAST CHANGE     REASON FOR CHANGE
C
C     DAVE NATION                                         ORIGINAL CODE.
C     JERRY FENERTY                                       DOCUMENTATION AND MO
C                                                         FOR A21 PROTOTYPE.
C     DANIEL BERKICH (SAIC) NOSC                          Read both forms of
C                                                         Data base.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE closei(lundat,lunind,lunlin)

      CLOSE (UNIT=lundat)
      CLOSE (UNIT=lunind)
      CLOSE (UNIT=lunlin)

      RETURN
      END


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:        .             CLOSES
C
C FUNCTIONAL DESCRIPTION:         .
C
C CALLED BY:                      STATEC
C
C PROGRAMMER:                     DATE OF LAST CHANGE     REASON FOR CHANGE
c  S. Lamb                      Feb 1988                  command fix - closes
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine closes
c
c       this subroutine is the close state interpreter (29)
c
        common /states/ nextst
c
c * ** *** **** ***** ****** ******* not understood for now; to exit,
c * ** *** **** ***** ****** ******* set nextst to 0 and qexitg to true.
c        print*,'closes -- enter'
        nextst = 15
c
        return
        end
```

```
C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                   closit

c  Functional Description:
c       this subroutine closes a file
c
c  Input Files/Parameters:

c  Output Files/Parameters: N/A

c  Subroutines/Functions Called:

c  Called By:                   BSTMAP, CRMESG, HELPSG, LOADIC, MESGJF,
C                               RCOLOR, RCONFG, RPARAM, RPATHS,
C                               RSAVPR, SPARAM, WSAVPR, PROCDF, WRITER

c  Local Variables: N/A

c  Restrictions: N/A

c  Abnormal Return Conditions:  N/A

c  Location:      /a21/dave

c  Programmer        Date of Last Change        Reason for Change

C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine closit (ifl)

c       this subroutine closes a file

        close (ifl)

        return
        end


C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:   CLRBVP
c
c  Functional Description:
c       this subroutine can be used to initialize the constr. box.
c       The veiwport is assumed to have been set previously
c
c  Input Files/Parameters:
c       xllbvp,yllbvp,xurbvp,yurbvp
c       nsg,ioc,ibc
c
c  Output Files/Parameters:
c
c  Subroutines/Functions Called:
c       Note: Subroutines preceded by a "j" are explained in the DI-3000 manual.
c       enall
c
c  Called By:                   MAKBOX
c
c  Local Variables:
c
c  Restrictions:     n/a
c
c  Abnormal Return Conditions: n/a
c
c  Location:    /a21/dave
c
c  Programmer        Date of Last Change        Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine clrbvp (nsg,ioc,ibc)
c
c       this subroutine can be used to initialize the constr. box.
c       The viewport is assumed to have been set previously
c
```

```
      logical aed
      common /aeddbc/ aed
c
      common /combvp/ xllbvp,yllbvp,xurbvp,yurbvp
c
      xinc = xurbvp - xllbvp
      yinc = yurbvp - yllbvp
      if (xinc.ge.yinc) then
          xur = xllbvp + yinc
          yur = yurbvp
      else
          xur = xurbvp
          yur = yllbvp + xinc
      endif
c      print*,'clrbvp -- ',xllbvp,xurbvp,yllbvp,yurbvp,xur,yur
c      print*,'clrbvp -- ',ioc
      call enall
      call jwindo (xllbvp,xurbvp,yllbvp,yurbvp)
      call jdvisb (0)
      call jropen (nsg)
      call xcolor (ioc)
      call xpidex (ibc,0)
c     added by gre to take into account an AED 512
      if (aed) then
           call jpintr (1)
      else
           call jpintr (0)
      endif
      call jrect (xllbvp,yllbvp,xurbvp,yurbvp)
      call jmove (xllbvp,yur)
      call jdraw (xur,yur)
      call jdraw (xur,yllbvp)

      call jrclos
      call jdetec(nsg,0)
      call jsgpri(nsg,1)
      call jdvisb (1)
c      call soverl
c
      return
      end

C+*+*+*+*+*+*+*+*+*+*+*+*+*+*+*+*+*+*+*+*+*+*+*+*+*+*+*+*+*+*+*+*+*|*+*+*+*+
c  UNIT NAME:   CLRCOM
c
c  Functional Description:
c       this subroutine clears the communications area
c
c  Input Files/Parameters:
C       nsgsys                        communications area segment number
c
c  Output Files/Parameters:
c
c  Subroutines/Functions Called:
c       Note: Subroutines preceded by a "j" are explained in the DI-3000 manual.
c       enall
c       comwin
c       comvpt
c       soverl
c
c  Called By:                    CRMESG, DISP5, DISTAN, HELP,
C                                MESG, MESSAG, SCRDIA, GMCLOS
c
c  Local Variables:       n/a
c
c  Restrictions:                 n/a
c
c  Abnormal Return Conditions: n/a
c
c  Location:    /a21/dave
c
c  Programmer        Date of Last Change       Reason for Change
c
```

```
C-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine clrcom
c
c     this subroutine clears the communications area
c
      common /arsegs/ nsgmen,nsggra,nsgsys,nsgmsg,nsgmap,nsgful
c
      call enall
      call jvisbl (nsgsys,0)
      call jvisbl (nsgsys,1)
      call soverl
      call comvpt
      call comwin
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:   CLRFUL
c
c  Functional Description:
c
c  Input Files/Parameters:
C       nsgful                         full screen segment number
c       xllscr,yllscr                  lower left x,y point
c       xurscr,yurscr                  upper right x,y point
c       xvlow,yvlow                    veiwport lower x,y point
c       xvhigh,yvhigh                  veiwport upper x,y point
c
c  Output Files/Parameters:
c
c  Subroutines/Functions Called:
c       Note: Subroutines preceded by a "j" are explained in the DI-3000 manual.
c       enall
c       soverl
c
c  Called By:               INTSCN
c
c  Local Variables:          n/a
c
c  Restrictions:            n/a
c
c  Abnormal Return Conditions: n/a
c
c  Location:    /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine clrful
c
c     this subroutine clears the full screen area and puts it in a
c     retained segment
c
      common /aspect/ xaspec,yaspec,xvlow,xvhigh,yvlow,yvhigh
      common /comscr/ xllscr,yllscr,xurscr,yurscr
      common /arsegs/ nsgmen,nsggra,nsgsys,nsgmsg,nsgmap,nsgful
c
      call enall
c                              {added by dabutson}
      call jvisbl (nsgful,0)
      call jvisbl (nsgful,1)
c     call jvisbl (nsgful,0)
      call soverl
      call jvport (xvlow,xvhigh,yvlow,yvhigh)
      call jwindo (xllscr,xurscr,yllscr,yurscr)
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
```

```
c  UNIT NAME:  CLRGRA
c
c  Functional Description:
c  this subroutine clears the graphics area and puts it in a retained segment
c
c  Input Files/Parameters:
C       nsggra
c
c  Output Files/Parameters:
c
c  Subroutines/Functions Called:
c       Note: Subroutines preceded by a "j" are explained in the DI-3000 manual.
c       enall
c       soverl
c       gravpt
c       geowin
c
c  Called By:                    DRAWIT, INIPIC
c
c  Local Variables:     n/a
c
c  Restrictions:                 n/a
c
c  Abnormal Return Conditions: n/a
c
c  Location:     /a21/dave
c
c  Programmer         Date of Last Change       Reason for Change
c  L. McCleary        Jan 1988               sep amp & sys - clrgra
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine clrgra
c
c      this subroutine clears the graphics area and puts it in a retained segme
c
       logical batch
       common /batdbc/ batch
       common /arsegs/ nsgmen,nsggra,nsgsys,nsgmsg,nsgmap,nsgful
       common /logseg/ nsglog
c
       call enall
c       if (batch) then
c                                    {added by dabutson}
           call jvisbl (nsggra,0)
           call jvisbl (nsggra,1)
c          call jvisbl (nsggra,0)
c                                    {added by dabutson}
c          call jvisbl (nsglog,0)
c          call jvisbl (nsglog,1)
c       end if
       call soverl
       call gravpt
       call geowin
c
       return
       end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    Clrhil
c
c  Functional Description:       Clears all hilites
c                                from menu
c
c  Input Files/Parameters:
c
c  Output Files/Parameters:
c
c
c  Subroutines/Functions Called:
c
c        jxxxxx  - di3000 subroutines
c
c  Called By:
```

```
c        drawm   - draws new menus
c
c  Local Variables:
c
c    seg   - integer       -  possible segment numbers for hilited menu items
c    array - integer(19)   -  array return from jisgmt.  first element,
c                             0 - no segment by given name
c                             1 - a segment exist with given name
c
c  Restrictions:                N/A
c
c  Abnormal Return Conditions:  N/A
c
c  Location:
c
c  Programmer        Date of Last Change      Reason for Change
c
c    Dirk Butson         1/7/85
c
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine clrhil

c     clears all hilights from menu area

      integer seg,array(19)
      logical sys
      common /sysdbc/ sys
      if (sys)  print*,' In Clrhil '

c --- purge all segments which are on
      do 10 i = 1,43
         seg = i + 1019
         call jisgmt(seg,array)
         if(array(1) .eq. 1) call jpurge(seg)
         seg = i + 31100
         call jisgmt(seg,array)
         if(array(1) .eq. 1) call jpurge(seg)
   10 continue
      if (sys) print*,' Leaving Clrhil '
      return
      end


C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:   CLRMEN
c
c  Functional Description:
c       this subroutine clears the menu area
c
c  Input Files/Parameters:
C       nsgbox,nsgsho,nsgcrm
C       nsgmen,nsggra,nsgsys,nsgmsg,nsgmap,nsgful,nsgkey
c       nsgcrm -- segment number of current menu background box
c       inewmn -- new menu backgound box : 0 -- use full menu box
c                                          1 -- use short menu box
c
c  Output Files/Parameters:
c
c  Subroutines/Functions Called:
c       Note: Subroutines preceded by a "j" are explained in the DI-3000 manual.
c       enall
c       soverl
c       menvpt
c       menwin
c
c  Called By:                   DRAWM
c
c  Local Variables:
c       nsg
c
c  Restrictions:                n/a
c
c  Abnormal Return Conditions:    n/a
```

```
c
c  Location:     /a21/dave
c
c  Programmer          Date of Last Change        Reason for Change
c  L. McCleary         Jan 1988                 sep amp & sys - clrmen
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine clrmen
c
c       this subroutine clears the menu area
c
        logical batch
        common /batdbc/ batch

        common /arsegs/ nsgmen,nsggra,nsgsys,nsgmsg,nsgmap,nsgful
        common /boxseg/ nsgbox,nsgsho,nsgcrm
        common /inewmn/ inewmn
c
c       nsgcrm -- segment number of current menu background box
c       inewmn -- new menu backgound box : 0 -- use full menu box
c                                          1 -- use short menu box
c
        if (inewmn.eq.0) then
           nsg = nsgmen
        else
           nsg = nsgsho
        endif
c        call enall
c        if (batch) then
c                                         {added by dabutson}
           call jvisbl (nsg,0)
           call jvisbl (nsg,1)
c          call jvisbl (nsg,0)
c        end if
c        call soverl
        nsgcrm = nsg
        call menvpt
        call menwin
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                         clrmsg
c
c  Functional Description:
c       clear message area (make current message invisible)
c
c  Input Files/Parameters:
c
c  Output Files/Parameters: N/A
c
c  Subroutines/Functions Called:
c       Note: Subroutines preceded by a "j" are explained in the DI-3000 manual.
c
c  Called By:                         HELP, MESSAG, TKINFO, TXWRIT
c
c  Local Variables: N/A
c
c  Restrictions: N/A
c
c  Abnormal Return Conditions:  N/A
c
c  Location:      Apollo       /a21/dave
c
c  Programmer          Date of Last Change        Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine clrmsg
c
c       clear message area (make current message invisible)
```

```
c
        logical sys
        common /sysdbc/ sys
        common /msgold/ msgold,msgonm
        common /msgoff/ msgoff
c
        if (sys) print*,'clrmsg -- enter ',msgno,msgold
        if (msgonm .gt. 0) then
           call jvisbl(msgonm + msgoff,0)
        else if (msgonm .eq. 0) then
           call jpurge (msgoff)
        endif
        msgold = -1
        msgonm = -1
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        CLRSTR
C
C FUNCTIONAL DESCRIPTION:           MODULE TO CLEAR THE TEXT ARRAY
C
C INPUT FILES/PARAMETERS:           NONE
C
C OUTPUT FILES/PARAMETERS:
C
C                      COMMON
C     VARIABLE         BLOCK        TYPE        DESCRIPTION
C
C       QSTRNG       TXTSTR     CHAR      CHARACTER ARRAY, 4 LONG
C       QACTUL       MAXCHR     INTEGER   LENGTH OF CORRESPONDING QSTRNG
C       QTXPOS       TXTPOS     REAL      THE WORLD X POSITION OF TEXT STRING
C       QTYPOS       TXTPOS     REAL      THE WORLD Y POSITION OF TEXT STRING
C       QHLAT        HLDPRM     REAL      THE LATITUDE POSITION OF TEXT STRING
C       QHLONG       HLDPRM     REAL      THE LONGITUDE POSITION OF TEXT STRING
C       QXPOS        CHRATR     INTEGER   THE VIRTUAL X POSITION OF TEXT STRING
C       QYPOS        CHRATR     INTEGER   THE VIRTUAL Y POSITION OF TEXT STRING
C
C SUBROUTINES/FUNCTIONS CALLED  NONE
C
C CALLED BY:                      INIPIC
C
C LOCAL VARIABLES:
C
C       I       INTEGER           INDEX OF QSTRNG (FROM 1 TO 4)
C
C RESTRICTIONS:                   NONE
C
C
C ABNORMAL RETURN CONDITIONS:    N/A
C
C LOCATION:                         /U2/SAY/TEXT/SOURCE/CLRSTR.F
C
C PROGRAMMER:                       DATE OF LAST CHANGE     REASON FOR CHANGE
C
C     SAYATES                              1/17/84          INITIAL ENTRY
C
C-*-*-*-*-*-*-*-*-*-*-*-*-*-*-*-*-*-*-*-*-*-*-*-*-*-*-*-*-*-*-*-*-*-*-*-*|*-*-*-*-
C
      SUBROUTINE CLRSTR
C
C  CLEARS OUT A TEXT STRING AND ALL VALUES ASSOCIATED WITH IT (ie POSITIONS)
C
C*****ROUTINE TO CLEAR THE TEXT ARRAY
C
C*****DEFINITION AND DECLARATION OF COMMON BLOCKS
C
      COMMON/CHRATR/QVERT,QXBASE,QYBASE,QXPLAN,QYPLAN,
     +              QHJUST,QVJUST,QCRPTH,QXSIZE,QYSIZE,
     +              QXPOS,QYPOS,QFNUM,QSDIAM
      INTEGER     QVERT,QHJUST,QVJUST,QCRPTH,
     +            QFNUM,QXPOS(4),QYPOS(4)
      REAL        QXBASE,QYBASE,QXPLAN,QYPLAN,
```

```
     +              QXSIZE,QYSIZE,QSDIAM
C
      COMMON/HLDPRM/QHXSIZ,QHYSIZ,QHLAT,QHLONG
      INTEGER       QHXSIZ,QHYSIZ
      REAL          QHLAT(4),QHLONG(4)
C
      COMMON/TXTPOS/QTXPOS,QTYPOS
      REAL      QTXPOS(4),QTYPOS(4)
C
      COMMON/TXTSTR/QSTRNG
      CHARACTER*50 QSTRNG(4)
C
      COMMON/MAXCHR/QMXCHR,QACTUL
      INTEGER     QMXCHR,QACTUL(4)
C
      logical sys
      common /sysdbc/ sys
C
C*****DECLARATION OF LOCAL VARIABLES
      INTEGER I
C
C****BLANK OUT QSTRNG AND SET THEIR LENGTHS TO 0
C
      if (sys) print*,'enter clrstr'

      DO 100 I = 1,4
         QSTRNG(I) = ' '
         QACTUL(I) = 0
         QTXPOS(I) = -99.
         QTYPOS(I) = -99.
         QHLAT(I) = -99.
         QHLONG(I) = -99.
         QXPOS(I) = -99
         QYPOS(I) = -99
 100  CONTINUE

      if (sys) print*,'leave clrstr'
C
      RETURN
      END


C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:   clrvpt
c
c  Functional Description:
c       this subroutine can be used to initialize an area to a certain
c       color.  The veiwport is assumed to have been set previously
c
c  Input Files/Parameters:
c       nsg,ioc,ibc
c
c  Output Files/Parameters:
c
c  Subroutines/Functions Called:
c       Note: Subroutines preceded by a "j" are explained in the DI-3000 manual.
c       enall
c       dvisb
c
c  Called By: makful,makcom,makgra,makkey,makmen,maksho
c
c  Local Variables:
c       xlow,xhigh,ylow,yhigh
c
c  Restrictions:              N/A
c
c  Abnormal Return Conditions: N/A
c
c  Location:    /a21/dave
c
c  Programmer          Date of Last Change        Reason for Change
c  L McCleary          Jan 1988                  sep amp & sys - clrvpt
c
C-*-*-*-*-*-*-*-*-*-*-*-*-*-*-*-*-*-*-*-*-*-*-*-*-*-*-*-*-*-*-*-*-*-*-*-*-*|*-*-*-*-
```

```
c
        subroutine clrvpt (nsg,ioc,ibc)
c
c       this subroutine can be used to initialize an area to a certain color.
c       The veiwport is assumed to have been set previously
c
        logical aed
        common /aeddbc/ aed
c
        data xlow,xhigh,ylow,yhigh/0.,1.,0.,1./
c
c       print*,'clrvpt -- ',nsg,ioc,ibc
        call enall
        call jwindo (xlow,xhigh,ylow,yhigh)
        call jdvisb (0)
        call jropen (nsg)
        call xcolor (ioc)
        call xpidex (ibc,0)
c       added by gre to take into account an AED 512
        if (aed) then
            call jpintr (1)
        else
c             call jpintr (0)
            call jpintr (1)
        endif
        call jrect (xlow,ylow,xhigh,yhigh)
        call jrclos
        call jdetec (nsg,0)
c        call jsgpri(nsg,1)
        call jsgpri(nsg,0)
        call jdvisb (1)
        call soverl
c
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                         CMDMAI
C
C FUNCTIONAL DESCRIPTION:            .
C
C CALLED BY:                         STATEC
C
C PROGRAMMER:                        DATE OF LAST CHANGE     REASON FOR CHANGE
c  S. Lamb                          Feb 1988                 command fix - cmdmai
C
C-*-*-*-*-*-*-*-*-*-*-*-*-*-*-*-*-*-*-*-*-*-*-*-*-*-*-*-*-*-*-*-*-*-*-*-*|*-*-*-*-
c
        subroutine cmdmai
c
c       this subroutine is the initial command mode interpreter (1)
c
        common /states/ nextst
        logical sketch,majorf,minorf
        common /statel/ sketch,majorf,minorf
        logical firstm
        logical wordis,iseoc
        logical isfeat,isproj,isincr,isdecr,iscoor
        logical isblan
c
c       print*,'cmdmai -- enter'
        firstm = .true.
        sketch = .false.
        majorf = .false.
        minorf = .false.
        initls = nextst
c       do until nextst not = initial state
  100   continue
            call getwrd
            if (iseoc()) then
                if (isblan()) then
                    nextst = 0
                else
```

```
                call getcmd
             endif
          else if (wordis('DRAW').or.wordis('DISPLAY')
     +           .or.wordis('SHOW')) then
             nextst = 2
          else if (wordis('SET').or.wordis('POINT').or.
     +           wordis('AND').or.wordis('THEN').or.wordis('CHANGE'))
     +           then
c * ** *** **** ***** ****** not understood / implem.
             nextst = 15
          else if (wordis('SKETCH')) then
             sketch = .true.
             nextst = 2
          else if (wordis('MAJOR').or.wordis('LARGE')) then
             majorf = .true.
             nextst = 9
          else if (wordis('MINOR').or.wordis('SMALL')) then
             minorf = .true.
             nextst = 10
          else if (wordis('WHAT').or.wordis('CURRENT')) then
             nextst = 4
          else if (wordis('PROJECTION')) then
             nextst = 12
          else if (wordis('SCALE')) then
             nextst = 16
          else if (wordis('CENTER')) then
             nextst = 18
          else if (wordis('MORE')) then
             nextst = 21
          else if (wordis('LESS')) then
             nextst = 22
          else if (wordis('ERASE').or.wordis('CLEAR')) then
             nextst = 25
          else if (wordis('TURN')) then
             nextst = 26
          else if (wordis('EXIT').or.wordis('QUIT').or.
     +           wordis('RETURN').or.wordis('X')) then
             nextst = 0
          else if (wordis('EXECUTE'):or.wordis('INTERPRET').or.
     +           wordis('COMMAND').or.wordis('FILE')) then
             nextst = 27
          else if (wordis('SAVE').or.wordis('STORE')) then
             nextst = 28
          else if (wordis('CLOSE').or.wordis('STOP').or.
     +           wordis('END')) then
             nextst = 29
          else if (wordis('REMOVE')) then
             nextst = 30
          else if (iscoor()) then
             nextst = 19
          else if (isproj()) then
             nextst = 13
          else if (isfeat()) then
             nextst = 8
          else if (isincr()) then
             nextst = 23
          else if (isdecr()) then
             nextst = 24
          else
             nextst = 15
          endif
          firstm = .false.
      if (nextst.eq.initls) go to 100
c     print*,'cmdmai -- exit'
c
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    CMPTIM
C
C FUNCTIONAL DESCRIPTION:
C
C CALLED BY:                    ADDTRK, CHGIND, TIMCHK
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine cmptim (dtg1, dtg2, flag)

c this routine checks whether the first dtg is subsequent in time to or
c the same time as the second dtg
```

```
c    if so, return true
c    otherwise, return false
c programmer: avw

        integer            day1
        integer            day2
        integer            hr1
        integer            hr2
        integer            mn1
        integer            mn2
        integer            yr1
        integer            yr2

        character*9        dtg1
        character*9        dtg2

        logical            flag

        flag = .false.

        read (dtg1, 10, err=900) yr1, day1, hr1, mn1
        read (dtg2, 10, err=900) yr2, day2, hr2, mn2
   10   format (i2, i3, i2, i2)

        if ((yr1 .gt. yr2) .or. ((yr1 .lt. yr2) .and.
     +        (yr2-yr1 .ge. 99))) then
           flag = .true.
        else
     +  if (yr1 .eq. yr2) then
           if (day1 .gt. day2) then
              flag = .true.
           else
     +     if (day1 .eq. day2) then
              if (hr1 .gt. hr2) then
                 flag = .true.
              else
     +        if (hr1 .eq. hr2) then
                 if (mn1 .ge. mn2) then
                    flag = .true.
                 end if
              end if
           end if
        end if

        go to 1000

  900   continue
c error reading data - exit routine after setting flag
        flag = .false.

 1000   continue

        return
        end

C+*+*+*+*+*+*+*+*+*+*+*+*+*+*+*+*+*+*+*+*+*+*+*+*+*+*+*+*+*+*+*+*+*+*+*+*+*+*+|*+*+*+*+
C UNIT NAME:                          CNSTNT
C
C FUNCTIONAL DESCRIPTION:
C
C CALLED BY:                          NO LONGER USED BY CARICATURE
C
C PROGRAMMER:                         DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine cnstnt(azi,lat,lon)
c
c     This subroutine calculates constants for regular bearings.
c
      real LAT,LON,L0,LNP,LNM

      common/constx/sazi,slat,cosazi,scazi,coslat,sinazi,cosi,
     1              sini,cosl0,cosf0,L0,lnp,lnm,f,f0

C --- Calculate constants for regular bearing
      SAZI = SIGN(1.0,AZI)
      SLAT = SIGN(1.0,LAT)
      COSAZI = COS(AZI)
      SCAZI = SIGN(1.0,COSAZI)
      COSLAT = COS(LAT)
      SINAZI = SQRT(1-COSAZI**2)
C --- I is inclination of great circle to equator
```

```
      COSI = SINAZI*COSLAT
      SINI = SQRT(1-COSI**2)
C --- L0 is difference in longitude from intersection of great circle
C --- with equator to DF station
      IF (ABS(SINI).LT.0.001) THEN
C ------- If track along equator, say intersection occurs at station
          COSL0 = 1.0
      ELSE
          COSL0 = COSAZI/SINI
      END IF
C --- F0 is distance in radians from intersection of great circle
C --- with equator to DF station
      COSF0 = COSL0*COSLAT
      L0 = SAZI*ACOS(COSL0)
C --- Longitude of intersection of great circle with equator (depending
C --- on direction of bearing)
      LNP = LON + L0
      LNM = LON - L0
      F0 = SLAT*ACOS(COSF0)
C --- Initialize distance along great circle from equator to next point
C --- in bearing
      F = F0

      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    CNVTVW
c
c  Functional Description:       CNVTVW converts virtual coordinates to world
c                                coordinates without checking that points are
c                                in the current viewport set.
c
c  Input Files/Parameters:
c    numpts   integer    number of points in arrays virtx and virty.
c    virtx    real       array of virtual x points.
c    virty    real       array of virtual y points.
c
c  Output Files/Parameters:
c    wrldx    real       array of world x points.
c    wrldy    real       array of world y points.
c
c  Local Variables:
c   cntr       integer    loop counter.
c   vxpt1      real       virtual x point inside viewport.
c   vxpt2      real       virtual x point displaced 0.01 x units
c                         from vxpt1.
c   vypt1      real       virtual y point inside viewport.
c   vypt2      real       virtual y point displaced 0.01 y units
c                         from vypt1.
c   wxdist     real       x distance between wxpt1 and wxpt2.
c   wydist     real       y distance between wypt1 and wypt2.
c   wxpt1      real       world coordinate equivalent of virtual
c                         point vx1pt.
c   wxpt2      real       world coordinate equivalent of virtual
c                         point vx2pt.
c   wypt1      real       world coordinate equivalent of virtual
c                         point vy1pt.
c   wypt2      real       world coordinate equivalent of virtual
c                         point vy2pt.
c   zeroz      real       unused world z coordinate.
c
c  Subroutines/Functions Called:
c       All subroutine names preceeded by a "j" are DI3000 subroutines.
c       For more information see the DI3000 Users Guide.
c
C CALLED BY:                     NO LONGER USED BY CARICATURE
c
c  Restrictions: The current viewport must contain the point (1.0, 1.0, 1.0)
c                and a world coordinate point (0.1, 0.1) virtual units
c                larger than the original world point.
c
c  Abnormal Return Conditions:  N/A
c
c  Location:  //dsp80/a21/bap/linlib.ftn
c
c  Programmer: Brian A. Pelletier
c
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE CNVTVW(virtx, virty, wrldx, wrldy, numpts)

        real virtx(*), wrldx(*), virty(*), wrldy(*)
```

```
      real vxpt1, vypt1, vxpt2, vypt2, zeroz
      real wxpt1, wypt1, wxpt2, wypt2, wxdist, wydist
      integer numpts, cntr

c     print *, 'enter cnvtvw'

      zeroz = 1.0
c
c Assuming the viewport contains the point (1.0, 1.0, 1.0)
c convert this world point to a virtual point.  Adding a small
c virtual amount to this point and converting back to world
c coordinates gives a conversion factor in both the x and y
c directions to work with.
c
      call jconwv(1.0, 1.0, 1.0, vxpt1, vypt1)
      vxpt2 = vxpt1 + 0.01
      vypt2 = vypt1 + 0.01
      call jconvw(vxpt1, vypt1, wxpt1, wypt1, zeroz)
      call jconvw(vxpt2, vypt2, wxpt2, wypt2, zeroz)
c
c The ratio of one virtual unit to one world unit is compute by
c taking the difference of the two world coordinates divided
c by th difference of the virtual coordinates.'
c
      wxdist = (wxpt2 - wxpt1) / (vxpt2 - vxpt1)
      wydist = (wypt2 - wypt1) / (vypt2 - vypt1)
c
c In computing a world coordinte given a virtual subtract the
c original virtual coordinate from the point, multiply by the
c world conversion fatcor and add the original world coordinate.
c
      do 10 cntr = 1,numpts
        wrldx(cntr) = (virtx(cntr) - vxpt1) * wxdist + wxpt1
        wrldy(cntr) = (virty(cntr) - vypt1) * wydist + wypt1
c         print *, 'wrldx, wrldy, virtx, virty [', cntr, ' ]'
c         print *, wrldx(cntr), wrldy(cntr), virtx(cntr), virty(cntr)
10    continue

c     print *, 'exit cnvtvw'

     return
     end

C+*+*+*+*+*+*+*+*+*+*+*+*+*+*+*+*+*+*+*+*+*+*+*+*+*+*+*+*+*+*+*+*+*+*+*+*+|*+*+*+*+
c  UNIT NAME:               colbak
c
c  FUNCTIONAL DESCRIPTION:    This subroutine provides a means of
c                             selecting the background color for
c                             the display area.  There are 8
c                             background colors from which to
c                             choose, all of which fit nicely in
c                             one menu area.
c
c  INPUT FILES/PARAMETERS:
c
c      Menu Control Globals
c
c      qcrmnu        b6        integer   value of the current menu
c      xllmvp        commvp    real      menu viewport parameter
c      yllmvp        commvp    real      menu viewport parameter
c      xurmvp        commvp    real      menu viewport parameter
c      yurmvp        commvp    real      menu viewport parameter
c
c
c  OUTPUT FILES/PARAMETERS:
c
c      Screen Attributes Globals
c
c      qbkgrd        scratr    integer   value for background color
c
c
c  SUBROUTINES/FUNCTIONS CALLED:
c
c      check                   checks the value of the button re-
c                              turned from a pick or locate
c      hilite                  highlights menu choices by drawing
c                              a box around them
c      mesg                    displays messages in the communica-
c                              tions area
c      mpick                   routine to pick from the menu
c
c      Note: Any subroutines preceded by a "j" are explained in the DI-3000
c            manual.
c
c
```

```
c  CALLED BY:                 FCFILL
c
c      Any routine needing to change the background color.
c
c  LOCAL VARIABLES:
c
c      ibuttn      integer   value of button pressed
c      ichoic      integer   pickid of menu item selected
c      error       logical   indicates error during menu selection
c      rflag       logical   set if 'cancel', 'exit' or 'return' picked
c      table       integer   table of positions of menu items in the menu
c      mysegn      integer   my menu segment number
c      pos         integer   relative position in the menu of the color
c                            box to be highlighted
c      index       integer   8 long array to hold color indexes
c      found       logical   used in searching for color indexes to
c                            indicate when found
c
c
c  RESTRICTIONS:
c
c      Depending upon the code which surrounds the call to this routine,
c      it can be used to change the background color immediately (as the
c      color is selected) or to change the background color only upon
c      returning from this routine.
c
c  LOCATION:      YODA         /ul/a21/clj/colbak.f
c
c  PROGRAMMER   DATE OF LAST CHANGE       REASON FOR CHANGE
c     CLJ            11/21/83               initial entry
c     CLJ            12/12/83               real colors chosen
c     CLJ             1/23/84               change to common "scratr"
c     CLJ             2/03/84               automatic/delayed modes
c  David W. Swim     07/14/86               Fuss with prgm...
c  L McCleary        Jan 1988            bkgrd investigation - colbak
c
C-*-*-*-*-*-*-*-*-*-*-*-*-*-*-*-*-*-*-*-*-*-*-*-*-*-*-*-*-*-*-*-*-*-*-*-*|*-*-*-*-

      subroutine colbak

c     select a background color

      integer mysegn,ibuttn,ichoic
      integer pos,table(37),index(8)
      logical error,rflag,found
      common /b6/ qcrmnu
      integer qcrmnu
      common /commvp/ xllmvp,yllmvp,xurmvp,yurmvp
      common /scratr/ qbox,qbkgrd
      integer qbox,qbkgrd
      data table /0,0,0,0,0,0,1,1,1,0,2,2,2,0,3,3,3,0,4,4,4,0,
     +            5,5,5,0,6,6,6,0,7,7,7,0,8,8,8/
      data index /0,1,2,3,4,5,6,7/

      rflag = .false.

c --- "mysegn" is my menu segment number.  We will always be at
c --- the background  color menu (i.e. "qcrmnu = 29")

      mysegn = qcrmnu
      call jvport (xllmvp,xurmvp,yllmvp,yurmvp)
      call jwindo (0.,17.,1.,43.)

c --- Put up a message saying "Select color box.".
      call mesg (70)

c --- "qbkgrd" is the background color
c --- Highlight the current background color (i.e. draw a yellow box
c --- around the color).
c --- "pos" is the relative position in the menu of the current
c --- background color.  That is, if the color to be highlighted is
c --- the third one in the color index array, then "pos" is set to 3.
c --- NOTE: The 8 background color indexes are in the array "index".

      found = .false.
      pos = 0
   50 continue
      if (pos.lt.8) then
       if (found) go to 80
         pos = pos + 1
         if (qbkgrd.eq.index(pos)) then
            found = .true.
         endif
         go to 50
```

```
      endif
   80  continue

c --- The first parameter to the hilite routine is a toggle
c --- (.true. = highlight & .false. = remove highlight).
c --- The third parameter to the hilite routine is the box width.
c --- For the width parameter, 1 = whole, 2 = left quarter,
c --- 3 = right quarter, 4 = left half, & 5 = right half.
c --- The color boxes are given in the "left quarter" column.
c --- The fourth parameter is the length of the highlight table
c --- and the fifth parameter is the table itself.
      call hilite (.true.,pos,2,37,table)

  100 continue
         call mpick (ichoic,mysegn,ibuttn)
         call jvport (xllmvp,xurmvp,yllmvp,yurmvp)
         call jwindo (0.,17.,1.,43.)
c ------ The pickid of the color box selected is stored in "ichoic".
c ------ The pickids of the 8 color boxes range from 101 to 108.
         if (ichoic.gt.100) then
c --------- The relative "position" of the color box to be
c --------- blacked out is "pos" (i.e. we want
c --------- to remove the highlighting from the
c --------- former current color box)
            call hilite (.false.,pos,2,37,table)
c --------- The new "qbkgrd" must now be taken from the array of
c --------- background color indexes.  Subtracting 100 from "ichoic"
c --------- gives the position in the "index" array where the new
c --------- "qbkgrd" can be found.
            pos = ichoic - 100
c             qbkgrd = index(pos)
            if (found) qbkgrd = index(pos)
c --------- Hilite new backgrd color & set rflag for ret to call.
            call hilite (.true.,pos,2,37,table)
            rflag = .true.
         else
c --------- Check for function buttons.
            call check (ibuttn,mysegn,error,rflag)
            if(error) then
                call mesg(2)
                call paws
            endif
         endif
      if (.not.(rflag)) go to 100
      return
      end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      COMMND
C
C FUNCTIONAL DESCRIPTION:
C
C CALLED BY:                      CHECK
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        subroutine commnd
c
c       this subroutine initiates the command function
c       called from menust
c
        call statec
c
        return
        end


C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:    COMVPT
c
c  Functional Description:
c       this subroutines sets the communications area viewport
c
c  Input Files/Parameters:
c       xllcvp,yllcvp               The lower left X,Y point
c       xurcvp,yurcvp               The upper right X,Y point
c
c  Output Files/Parameters:
c
c  Subroutines/Functions Called:
c       Note: Subroutines preceded by a "j" are explained in the DI-3000 manual.
```

```
c
c  Called By:                    CLRCOM, DRWAMP, MAKCOM, MESGJF
C                                PROMPT, SETFAD, TKINFO
c
c  Local Variables:             N/A
c
c  Restrictions:                N/A
c
c  Abnormal Return Conditions: N/A
c
c  Location:    /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine comvpt
c
c     this subroutines sets the communications area viewport
c
      common /comcvp/ xllcvp,yllcvp,xurcvp,yurcvp
c
      call jvport (xllcvp,xurcvp,yllcvp,yurcvp)
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:  COMWIN
c
c  Functional Description:
c       this subroutines sets the communications area window
c
c  Input Files/Parameters:
C       qcxmn,qcymn                  The communications min x,y point
c       qcxmx,qcymx                  The communications max x,y point
c
c  Output Files/Parameters:
c
c  Subroutines/Functions Called:
c       Note: Subroutines preceded by a "j" are explained in the DI-3000 manual.
c
c  Called By:                   CLRCOM, DRWAMP, PROMPT, SETFAD, TKINFO
c
c  Local Variables:             N/A
c
c  Restrictions:                N/A
c
c  Abnormal Return Conditions: N/A
c
c  Location:   /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine comwin
c
c     this subroutines sets the communications area window
c
      common/comwdo/qcxmn,qcymn,qcxmx,qcymx
      real qcxmn,qcymn,qcxmx,qcymx
c
      call jwindo (qcxmn,qcxmx,qcymn,qcymx)
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    CONVFAD
C
C FUNCTIONAL DESCRIPTION:       .
C
C CALLED BY:                    SETFAD
C
C PROGRAMMER:                   DATE OF LAST CHANGE    REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

     subroutine convfad(newfad,temptm,ilen,error)

     integer*4 colndx
     integer*4 error
     integer*4 hours
```

```
      integer*4 ilen
      integer*4 minute
      integer*4 MAXHRS
      integer*4 MAXMIN
      integer*4 temptm

      character   colon
      character*5 newfad
c
c
c     if a new fade time is input, reset fade dtg and fade index (tfaddx)
c
      if(ilen .gt. 0) then
c
c         read the new fade time.  If an error occurs, it is due to either
c         bad user input or a time out return from jkeybs.  In either case
c         we want to exit routine and pop back to menu controller.
c
          hours = 0
          minute = 0
          if (ilen .lt. 5) then
               colndx = index(newfad,':')
c
c***           pick up the what is hoped to be the correct meaning of the fade
c***
c***           if a colon is found, all to left of colon is hours, right is min.
c
               if (colndx .gt. 0) then
                    if (colndx-1 .ge. 1) then
                        read(newfad(1:colndx-1),10,err=100,end=35) hours
 10                     format(i2)
                    endif
                    read(newfad(colndx+1:ilen),10,err=100,end=35) minute
c
c***           if no colon, if len is 3, 1 slot for hours, 2 for minutes
c***                        if len is 2, 0 slots for hours, 2 for minutes
c***                        if len is 1, 0 slots for hours, 1 for minutes
c
               else if (ilen .eq. 3) then
                     read(newfad(1:1),10,err=100) hours
                     read(newfad(2:3),10,err=100) minute
               else if (ilen .eq. 2) then
                     hours = 0
                     read(newfad(1:2),10,err=100) minute
               else
                     hours = 0
                     read(newfad(1:1),10,err=100) minute
               endif
          else
               read(newfad,30,err=100,end=35) hours,colon,minute
 30            format(i2,a1,i2)
               if (colon .ne. ':') then
                   read(newfad,40,err=100) minute
 40                format(2x,i2)
               endif
          endif

 35       continue
c
c         if the 3rd character in the user input fade time is not a color
c         then assume that he forgot to put the colon between the hours
c         and minutes
c
c
c         check for maximum inputs exceeded, and adjust if necessary
c
          if (hours .gt. MAXHRS) then
                hours = MAXHRS
          endif
          if (minute .gt. MAXMIN) then
                minute = MAXMIN
          endif
          temptm = hours * 60 + minute
          goto 200
```

```
100       error = 1
          call mesg(1242)
          call paws
      else
          error = 1
          call mesg(1242)
          call paws
      endif
200   return
      end

C++++++++++++++++++++++++++++++++++++++++++++++++++++++++++++++++++++++|+++++++
c  UNIT NAME:                     CONVHW
c
c  Functional Description:        Utility subroutine to convert integer points
c                                 in hldf to real (x,y) points in the previous
c                                 window defined.
c
c  Input Files/Parameters:
c    intx        integer          array of x points
c    inty        integer          array of y points
c    num         integer          number of points in x and y array
c
c  Output Files/Parameters:
c    posx        real             array of x points
c    posy        real             array of y points
c
C CALLED BY:                      NO LONGER USED BY CARICATURE
c
c  Local Variables:
c
c  Restrictions: Previous window and viewport set should be the graphics
c                display area.
c
c  Subroutine/Functions Called: N/A
c
c  Abnormal Return Conditions: N/A
c
c Programmer: Brian A. Pelletier   (old algorithm version 12)
c             Dirk Butson
c
c This subroutine takes integer points (from hldf) and converts
c them to world coordinates relative to the window
c
c Should map position on screen to 00000-65535
c
C-*-*-*-*-*-*-*-*-*-*-*-*-*-*-*-*-*-*-*-*-*-*-*-*-*-*-*-*-*-*-*-*-*-*-*|*-*-*-*-

      subroutine convhw(intx,inty,posx,posy,num)

c ------ convert virtual integers to real position
      common/gphwdo/qgxmin,qgymin,qgxmax,qgymax
      real        qgxmin,qgymin,qgxmax,qgymax
c
      integer num
      integer intx(num),inty(num)
      real posx(num),posy(num)

c ----- map 00000-65535  ==> dimension of window

        do 10 i = 1,num
         posx(i) = qgxmin + intx(i)*(qgxmax-qgxmin)/65535
         posy(i) = qgymin + inty(i)*(qgymax-qgymin)/65535
 10    continue

      return
      end

C++++++++++++++++++++++++++++++++++++++++++++++++++++++++++++++++++++++|+++++++
c  UNIT NAME:                     CONVWH
c
c  Functional Description:        Utility subroutine to convert (x,y) points in
```

```
c                               the display area to hldf integer points in
c                               the range of 65535 X 65535.
c
c  Input Files/Parameters:
c    posx       real            array of x points
c    posy       real            array of y points
c    num        integer         number of points in x and y array
c
c  Output Files/Parameters:
c    intx       integer         array of x points
c    inty       integer         array of y points
c
c  Called By:                   INIONE, STORCL
c
c  Local Variables:
c
c  Restrictions: All points must be in graphics display area and will be
c                converted to last window coordinates and viewport set.
c
c  Subroutine/Functions Called: N/A
c
c  Abnormal Return Conditions: N/A
c
c Programmer: Brian A. Pelletier   (old algorithm version 12)
c             Dirk Butson
c
c This subroutine converts world x and y coordinates to integer
c virtuals 65535 X 65535.
c
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine convwh(posx,posy,intx,inty,num)

c ------ convert virtual integers to real position
      common/gphwdo/qgxmin,qgymin,qgxmax,qgymax
      real          qgxmin,qgymin,qgxmax,qgymax
c
      integer num
      integer intx(num),inty(num)
      real posx(num),posy(num)

c -----  map world coordinates ===> 00000-65535

        do 10 i = 1,num
         intx(i) = 65535 * (posx(i)-qgxmin) / (qgxmax-qgxmin)
         inty(i) = 65535 * (posy(i)-qgymin) / (qgymax-qgymin)
 10    continue

      return
      end


C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                           copyfl
c
c  Functional Description:  Copies contents of one file to another.
c
c  Input Files/Parameters:
c     Parameters:
c        Name     Type    Description
c        ----     ----    -----------
c        old      ch*50   Name of file to be copied from.
c        new      ch*50   Name of file to be copied to.
c        oldsta   ch*6    Indicates what to do with file copied from.
c
c  Output Files/Parameters:     N/A
c
c  Subroutines/Functions Called:
c        Name     Description
c        ----     -----------
c        mesg     Outputs message to commmunications area of the screen.
c        paws     Halts program to allow message to be viewed.
c
c  Called By:
```

```
c       Name    Description
c       ----    -----------
c       rename  Renames a file.
c
c
c  Local Variables:
c       Name    Type    Description
c       ----    ----    -----------
c       lunhld  integer Logical unit # to assign to file to be copied from.
c       lunbck  integer Logical unit # to assign to file to copy to.
c       dskerr  logical Flag to indicate that disk error has occured.
c       field1  ch*50   String var. for name field of current line of file.
c       field2  ch*60   String var. for description field of current file line.
c
c  Restrictions:                N/A
c
c  Abnormal Return Conditions:  N/A
c
c  Location:
c
c       Programmer      Date of Last Change     Reason for Change
c       ----------      -------------------     -----------------
c       sfw             8-Nov-1984              Restructuring and documentation.
c      L. McCleary      Jan 1988        fix VAX compile diag - copyfl
c                                       not used by Caricature-copyfl
c
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine copyfl(old, new, oldsta, ierr )

        integer ierr
        character *50 old, new, field1
        character *60 field2
        character *6 oldsta

        logical dskerr

        data lunhld,lunbck/18,16/

c       Set disk error flag to false.
        dskerr = .false.
        ierr = 0

c       Open old and new files. Jump to error handling section on disk
c       access error

        open (lunhld,file=old,status='old',err=200)
        rewind(lunhld)

        open (lunbck,file=new,status='new',err=300)
        rewind(lunbck)

c       Jump to read/write section.
        goto 10

c       Error on attempt to open existing file.
200     continue

c       "System error on attempt to open existing file.  Consult system
c        administrator.  Press any key to continue."
c         Write out error message and exit routine.
          call mesg(44)
          call paws
          dskerr = .true.

c         Output error message to program monitor window for system
c         adminsitrator to analyze.
          print*,'Disk access error in routine COPYIT.'
          print*,'Trying to open file ',old,' .'
          print*,'Logical unit number was ',lunhld,' .'
          print*,'IERROR number returned was ',ierror,' .'
          ierr =  1
          goto 100
```

```
c       Error on attempt to open new file.
300     continue

c       "System error on attempt to open new file.  Consult system
c        administrator.  Press any key to continue."
c         Write out error message and exit routine.
          call mesg(45)
          call paws
          dskerr = .true.

c         Output error message to program monitor window for system
c         adminsitrator to analyze.
          print*,'Disk access error in routine COPYIT.'
          print*,'Trying to open file ',new,' .'
          print*,'Logical unit number was ',lunbck,' .'
          print*,'IERROR number returned was ',ierror,' .'
          ierr = 1

          goto 100


c       Read/write section. Jump to routine exit if End Of File.
10      continue

            read(lunhld,50,end=100) field1, field2
            write(lunbck,50) field1, field2
50          format(A50, A60)

c       Reiterate if not End Of File.
        goto 10

100     continue

c       Close new file.
        close (lunbck)

c       Close old file. If parameter 'oldsta' = 'delete' then copy was a rename
c       so we delete the old file.
        if ( oldsta.eq.'delete'.and.(.not.( dskerr ))) then
           close( lunhld,status='DELETE' )
        else
           close( lunhld )
        endif


        return
        end

C+*+*+*+*+*+*+*+*+*+*+*+*+*+*+*+*+*+*+*+*+*+*+*+*+*+*+*+*+*+*+*+*+*+*+*+*+*+*+|*+*+*+*+
c  UNIT NAME:                     creatm
c
c  Functional Description:
c       this subroutine displays a menu from a data file
c
c  Input Files/Parameters:
c
c  Output Files/Parameters: N/A
c
c  Subroutines/Functions Called:
c       Note: Subroutines preceded by a "j" are explained in the DI-3000 manual.
c
c  Called By:                     DRAWM, KEYS
c
c  Local Variables: N/A
c
c  Restrictions: N/A
c
c  Abnormal Return Conditions:  N/A
c
c  Location:      Apollo       /a21/dave
c
c  Programmer          Date of Last Change        Reason for Change
c  avw                 30 May 1985                Handle linestyle menu as
```

```
c                                                   special case
c  L McCleary        Jan 1988                       sep amp & sys - creatm
c  S. Lamb           Feb 1988                       detec chg - creatm
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine creatm (menun,ierror)
c
c       this subroutine displays a menu from a data file
c
        common /commen/xllmen,yllmen,xurmen,yurmen,ibcmen,iocmen,incmen
        character*40 textst
        character*50 filenm
        character*30 fname
        character*50 menpth
        common /menpth/ menpth
        common /lenmen/ lenmen
        logical opensg
        character cchar
        character*80 msg
        character*26 flettr
        data flettr /'abcdefghijklmnopqrstuvwxyz'/
c       numinc is range of menu numbers in each file
c       maxnum is number of menu files
        data numinc,maxnum /25,15/
        data lunmen/9/
        data fname/'file'/,lname/4/

        call seticn(xconv,yconv)
c       print*,'creatm -- enter ',menun
        opensg = .false.
        ierror = 0
        indlet = menun / numinc + 1
        if (indlet.lt.1) indlet = 1
        if (indlet.gt.maxnum) indlet = maxnum
        filenm = menpth(1:lenmen) // fname(1:lname) //
     +  flettr(indlet:indlet) // '.men'
        lennam = lenmen + lname + 5
c       print*,'  before open ',filenm(1:lennam)
        call openit(filenm,lennam,lunmen,0,ierror)
        if (ierror.ne.0) go to 191
        call jdvisb (1)
        call jropen (menun)
        call xcolor (iocmen)
        call xpidex (ibcmen,0)
        call jpintr (1)
c        call jrect (xllmen,yllmen,xurmen,yurmen)
        opensg = .true.
        call jjust (1,1)
C        call xsize (1.1,1.1)
Cc         call xsize (.75,1.)
        call xsize (.75,1.)
c       loop until the correct menu records are located
  100   continue
            read (lunmen,10110,end=193,err=192) cchar,msg
10110       format (a1,a80)
c           print*,'line read - cchar: ',cchar,msg
c           *** skip comment lines
            if (cchar.eq.'C'.or.cchar.eq.'c') go to 100
            if (cchar.eq.'M'.or.cchar.eq.'m') then
                read (msg,1150,end=193,err=192) msgnum
 1150           format (i5)
                if (msgnum.eq.menun) go to 115
            endif
        go to 100
  115   continue
c       print*,'menu found ',menun
        i=0
c       loop until no more data lines (blank first char)
  120   continue
            read (lunmen,10110,end=130,err=192) cchar,msg
c           *** skip comment lines
            if (cchar.eq.'C'.or.cchar.eq.'c')
     +      go to 120
```

```
            if (cchar.eq.' ') then
                read (msg,10120,err=192) idpick,icolor,
     +          icol2,itype,row,col,scalef,len,textst
10120           format (4i4,3f7.0,i4,2x,a40)
c               print*,'creatm -- ',idpick,icolor,icol2,itype,row,
c    +          col,scalef,len,textst(1:14),yrow
                call fudgex (col)
                call jpkid (idpick)
                yrow = yurmen - row
                if (itype.eq.1) then
                    call xcolor (icolor)
                    call jmove (col,yrow)
                    call mytext (len,textst)
c ------------- for color menus (21-29), call specialized routine
c ------------- 'dricon' to draw color boxes
                elseif ((menun .gt. 20) .and. (menun .lt. 30)) then
                    call xcolor (icolor)
                    call jmove (col,yrow)
                    call dricon (len,textst,icol2,scalef)
c ------------- for linestyle menu (186), call specialized routine
c ------------- 'drlnmn' to draw actual linestyles
                else
     +          if (menun .eq. 186) then
                    call xcolor (icolor)
                    call jmove (col, yrow)
                    call drlnmn (icol2)
                elseif (itype.eq.2) then
                    scalex=(scalef * xconv)
                    scaley=(scalef * yconv)
                    call ascint(textst(1:len),icon,len,ierror)
c        print*,'before geticn scalex =',scalex,'scaley=',scaley
                    call geticn(icolor,icol2,scalex,scaley,col,yrow,
     +                          icon,2,0.0)
c        print*,'after geticn textst(1:len)=',textst(1:len)

                else
                    print*,'Creatm -- Unknown menu item type',itype
                endif
            else
                go to 130
            endif
        go to 120
  130   continue
        go to 200
  190       continue
            print*,' Menu number conversion error ',menun
            ierror = 211
            go to 200
  191       continue
            print*,' Couldn''t open file ',filenm
            ierror = 212
            go to 200
  192       continue
            print*,' Error in menu file read ',filenm
            ierror = 213
            go to 200
  193       continue
            print*,' Premature end of menu file ',filenm,menun
            ierror = 214
            go to 200
  200   continue
c        if (opensg) call jrclos
        if (opensg)  then
           call jrclos
           call jdetec(menun, 1)
        endif
        call closit (lunmen)
c
c       print*,'MENU -- exit'
c
        return
        end
C+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    crmesg
```

```
c
c  Functional Description:
c       create message retained segment from message file
c
c  Input Files/Parameters:
c
c  Output Files/Parameters: N/A
c
c  Subroutines/Functions Called:
c       Note: Subroutines preceded by a "j" are explained in the DI-3000 manual.
c
c  Called By:                    MESG
c
c  Local Variables: N/A
c
c  Restrictions: N/A
c
c  Abnormal Return Conditions:  N/A
c
c  Location:      Apollo       /a21/dave
c
c  Programmer         Date of Last Change        Reason for Change
c  L. McCleary        Jan 1988                   sep amp & sys - crmesg
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine crmesg(msgno)
c
c       create message retained segment from message file
c
        logical needmv

        character*50 menpth
        common /menpth/ menpth
        common /lenmen/ lenmen
        common/comwdo/qcxmn,qcymn,qcxmx,qcymx
        real qcxmn,qcymn,qcxmx,qcymx
        common /arsegs/ nsgmen,nsggra,nsgsys,nsgmsg,nsgmap,nsgful
        common /comsys/xllsys,yllsys,xursys,yursys,ibcsys,iocsys,incsys
        character cchar
        common /msgoff/ msgoff
        logical aed
        common /aeddbc/ aed
        character *80 msg
        integer msgno,lenmsg
        character*80 filenm
        character*30 fname
        character*26 flettr
        data flettr /'abcdefghijklmnopqrstuvwxyz'/
c       numinc is range of message numbers in each file
c       maxnum is number of message files
        data numinc,maxnum /50,26/
        data fname/'file'/,lname/4/
        data icolcm/16/
        data ifl/9/
c
C        PRINT *,'CRMESG ---ENTER',MSGNO
clj ------- "needmv" (need move) is set to true if a
clj ------- message really is being displayed.
            needmv = .false.

c           set file name default depending on system

            filenm = ' '

            call jdvisb (1)
            call clrcom
            call jwindo(qcxmn,qcxmx,qcymn,qcymx)
            call jropen (msgno + msgoff)
            call xcolor (iocsys)
            call xpidex (ibcsys,0)
            call jpintr (1)
            call jrect (qcxmn,qcymn,qcxmx,qcymx)
            call jjust (1,1)
```

```
          call xsize (1.,1.)
          call xcolor (icolcm)
c
          indlet = msgno / numinc + 1
          if (indlet.lt.1) indlet = 1
          if (indlet.gt.maxnum) indlet = maxnum
          filenm = menpth(1:lenmen) // fname(1:lname) //
     +    flettr(indlet:indlet) // '.msg'
          lennam = lenmen + lname + 5
          call openit(filenm,lennam,ifl,0,ierror)
          if (ierror.ne.0) go to 181
c         Loop though message file looking for message
  100     continue
              read (ifl,1100,end=183,err=182) cchar,msg
 1100         format (a1,a80)
c             print*,'line read - cchar: ',cchar,msg
c             *** skip comment lines
              if (cchar.eq.'C'.or.cchar.eq.'c') go to 100
              if (cchar.eq.'M'.or.cchar.eq.'m') then
                  read (msg,1150,end=183,err=182) msgnum
 1150             format (i5)
                  if (msgnum.eq.msgno) then
                      i=0
c                     loop until no more data lines (blank first char)
  120                 continue
                          read (ifl,1100,end=183,err=182) cchar,msg
c                         *** skip comment lines
                          if (cchar.eq.'C'.or.cchar.eq.'c')
     +                    go to 120
                          if (cchar.eq.'m'.or.cchar.eq.'M') go to 130
                          call length (msg,80,lenmsg)
                          i = i + 1
                          if (lenmsg.gt.0) then
                              call displ(msg, lenmsg, i)
clj --------------------------- "needmv" (need move) means that we
clj --------------------------- must move to the lower right corner
clj --------------------------- of the communications area.
                              needmv = .true.
                          endif
                      go to 120
  130                 continue

clj ------------------- The following if-then was added so that the whole
clj ------------------- communication area is cleared out after displaying
clj ------------------- a message.  This was needed to eliminate typed-in
clj ------------------- text which used to hang around too long.
                      if (needmv) then
                         call jmove(qcxmx - 1.,qcymn + 1.)
                         call j1strg(' ')
                         needmv = .false.
                      endif

c                     position after last line for prompt subroutine
c                      ypos = qcymx - i - 1.3
                      ypos = qcymx - i - 1.0
                      if (ypos.lt.qcymn) ypos = qcymn
                      call jconwv(qcxmn+1.,ypos,z,vx,vy)
c                     added by gre to take into account problems with AED's
                      if (aed) call jmove(qcxmn+1,ypos)
                      call jpecho(1,4,1,vx,vy)
c                     exit after message found
                      go to 180
                  endif
              endif
          go to 100
  180     continue
          go to 190
  181     continue
              print*,'open error on message file ',msgno,ierror
              call jmove(qcxmn+1.,qcymx-1.)
              call j1strg('open error on message file - '//
     +                 'press any key to continue')
              go to 190
  182     continue
```

```
              print*,'read error on message file ',msgno
              go to 190
  183     continue
              print*,'end of file - message not found :',msgno
              call jmove(qcxmn+1.,qcymx-1.)
              call j1strg('message not found - '//
     +                'press any key to continue')
  190     continue
          call jrclos
          call closit (ifl)
c
        return
        end


C+*+*+*+*+*+*+*+*+*+*+*+*+*+*+*+*+*+*+*+*+*+*+*+*+*+*+*+*+*+*+*+*+*+*+*+*+*+*+*+|*+*+*+*+
C UNIT NAME:                       CURBOX
C
C FUNCTIONAL DESCRIPTION:          .
C
C CALLED BY:                       PLTDAT
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine curbox(lat,lon,posit,exist,timbuf)

c this routine draws a box aroud the most recent position
c for a given track.  (programmer: jit)

        logical exist
        character ewi
        character nsi
        character*7 lat
        character*8 lon
        character*9 timbuf
        integer posit
        integer segnum
        integer*4 exlat
        integer*4 exlon
        integer trkcol
        real dx
        real dy
        real plat
        real plon
        real x
        real y

c posit- element position of track in actmrk table
c trklst- list of all current track numbers in the system
c mrkcnt- count of number of tracks in the system currently.
c actmrk- list of markers that are currently active on the system.
c exist- logical value is true if track previously existed,
c        and false if it is a new track.

        character*2 actmrk(260)
        integer mrkcnt
        integer trklst(260)
        integer curseg(260)
        character*9 boxdtg(260)
        logical boxvis(260)
        common /actmrk/ trklst,mrkcnt,actmrk,curseg,
     +                boxdtg,boxvis

        data trkcol /224/

c         seperate lat/lon from nsi/ewi indicators

          read(lat,10) exlat,nsi
 10       format(i6,a1)
          read(lon,20) exlon,ewi
 20       format(i7,a1)
          call lltor(exlat,exlon,nsi,ewi,plat,plon)
```

```
c***        if dtg from this plot is greater than plot that
c***        is currently plotted for that track, erase
c***        current box and draw new box.

c jit          print *, 'timbuf is ', timbuf
c jit          print *, 'boxdtg(posit) is ', boxdtg(posit)

          if (timbuf .ge. boxdtg(posit)) then

             if (.not.exist) then
               boxvis(posit) = .true.
               call getseg(segnum)
               curseg(posit) = segnum
             else
               segnum = curseg(posit)
               call jpurge(segnum)
               boxvis(posit) = .true.
             endif
c
c   only draw the box if that segment is visible at
c   the current time.
c
             if (boxvis(posit)) then
                call jropen(segnum)
                call lltoxy(plat,plon,x,y)
                call jmove(x,y)
                call jrmove(-4.,-3.)
                dx = 8.
                dy = 9.
                call jpintr(0)
                call xcolor(trkcol)
                call jrrect(dx,dy)
                call jrclos
             endif

          endif


          return
          end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     CVITOC
C
C FUNCTIONAL DESCRIPTION:        .
C
C CALLED BY:                     SETFAD
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-
        subroutine cvitoc(ival,cstr)

c       convert integer value to character string
c       char_str must be sufficiently long to hold the integer value

        character*(*) cstr

        integer digits
        integer i
        integer itmp1
        integer itmp2
        integer ival
        integer lngth

        lngth = len(cstr)
        cstr = '00000'
        itmp1 = ival

        digits = 1
        if (ival .gt. 9) digits = 2
        if (ival .gt. 99) digits = 3
        if (ival .gt. 999) digits = 4
```

```
      if (ival .gt. 9999) digits = 5

      if (digits .eq. 1) then
         cstr(lngth:lngth) = char(ival+48)
         return
      else
         if (lngth .lt. digits) then
            digits = lngth
         end if
         itmp2 = itmp1
         do 100 i = 1, digits
            itmp2 = itmp1 / 10
            cstr(lngth-i+1:lngth-i+1) = char(itmp1 - itmp2 * 10
     +            + 48)
            itmp1 = itmp2
100      continue
      end if

      return
      end

C+++++++++++++++++++++++++++++++++++++++++++++++++++++++++++++++|+++++++
C UNIT NAME:                    ADDOPN
C
C FUNCTIONAL DESCRIPTION:
c -   Description: open up the change file
C
C CALLED BY:                    OPENIN
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*|*-*-*-*-
c
      SUBROUTINE addopn(cnamel,cname,ios)

      INTEGER   sunit,lunit,punit
      PARAMETER (punit = 67)
      PARAMETER (lunit = 68)
      PARAMETER (sunit = 69)

      LOGICAL         filply,opnply
      COMMON /polycb/ filply,opnply

      INTEGER  cnamel
      CHARACTER*(*) cname
      CHARACTER*100 datafi,indexf,lindex

      INTEGER   ios

      INTEGER nlinde,lenlin
      COMMON /LWDBII/ NLINDE,LENLIN,icntli
      INTEGER nindex,lenind
      COMMON /IWDBII/ NINDEX,LENIND
      INTEGER ndatar,lendat
      COMMON /DWDBII/ NDATAR,LENDAT
      integer lenmap
      common /lenmap/lenmap


      IF (lenmap.GT.0) THEN
         datafi = cname(1:cnamel - 1) // 'p.da3'
         indexf = cname(1:cnamel - 1) // 'p.in3'
         lindex = cname(1:cnamel - 1) // 'p.li3'
      ENDIF
C
C       VAX OPEN STATEMENTS
c
c      OPEN(UNIT=punit,FILE=datafi,FORM='unformatted',STATUS='old',
c     +     RECORDTYPE='fixed',RECL=lendat*ndatar,
c     +     ORGANIZATION='sequential',ACCESS='direct',
c     +     ERR=190,IOSTAT=ios,READONLY)
c      OPEN(UNIT=lunit,FILE=indexf,FORM='unformatted',STATUS='old',
c     +     RECORDTYPE='fixed',RECL=lenind*nindex/2,
c     +     ORGANIZATION='sequential',ACCESS='direct',
```

```
c     +      ERR=190,IOSTAT=ios,READONLY)
c      OPEN(UNIT=sunit,FILE=lindex,FORM='unformatted',STATUS='old',
c     +      RECORDTYPE='fixed',RECL=lenlin*nlinde/2,
c     +     ORGANIZATION='sequential',ACCESS='direct',
c     +      ERR=190,IOSTAT=ios,READONLY)

c
c          Apollo open statements
c
      OPEN(UNIT=punit,FILE=datafi,FORM='UNFORMATTED',
     +     STATUS='OLD',RECL=lendat*ndatar*4,
     +     ACCESS='DIRECT',
     +     ERR=190,IOSTAT=ios)
      OPEN(UNIT=lunit,FILE=indexf,FORM='UNFORMATTED',
     +     STATUS='OLD',RECL=lenind*nindex*2,
     +     ACCESS='DIRECT',
     +     ERR=190,IOSTAT=ios)
      OPEN(UNIT=sunit,FILE=lindex,FORM='UNFORMATTED',
     +     STATUS='OLD',RECL=lenlin*nlinde*2,
     +     ACCESS='DIRECT',
     +     ERR=190,IOSTAT=ios)

      opnply = .TRUE.
      RETURN
  190 CONTINUE
      opnply = .FALSE.
C      if (index(idebug,'polygon').ne.0)
C     +  PRINT *,'Polygon Fill not available for resolution ... ',
C     +          cname(cnamel:cnamel),ios


      RETURN
      END

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       CHEKML
C
C FUNCTIONAL DESCRIPTION:          .
C
C CALLED BY:                       INMAIL, OPMAIL
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine chekml(respon)
c
c this subroutine gets a record from the mailbox and copies it into a ch. string
c

      return
      end

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                      chint
c
c  Functional Description:
c       this subroutine checks whether a key has been pressed on the keyboard
c       If it has, an interrupt flag is set and the
c       key is returned
c
c  Input Files/Parameters:
c
c  Output Files/Parameters: N/A
c
c  Subroutines/Functions Called:
c     Note: Subroutines preceded by a "j" are explained in the DI-3000 manual.
c
c  Called By:                     DMAPII, FILLIT, LLGRID, PLTCIT,
C                                 PLTNAM, PROCOV
c
c  Local Variables: N/A
```

```
c
c  Restrictions: N/A
c
c  Abnormal Return Conditions:  N/A
c
c  Location:      /gl
c
c  Programmer          Date of Last Change       Reason for Change
c
c  Ed Swing               05/20/1987             fix for OS 9.5
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine chint (interr,key)
c
c      this subroutine checks whether a key has been pressed on the keyboard
c      If it has, an interrupt flag is set and the
c      key is returned
c
c      this is an Apollo specific subroutine, a similiar subroutine must
c      be written for other systems
c
c      Apollo Operating System 9.5 required we use a gpr call instead
c      of a smd call.
c
       logical interr
       character*1 key
       integer qdsdev,qpydev,qecho,qlecho
       common /device/ qdsdev,qpydev,qecho,qlecho
c
       call jchint(qpydev,interr)

       return
       end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      CHKDAT
C
C FUNCTIONAL DESCRIPTION:         .
C
C CALLED BY:                      DATPOL
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine chkdat(datain, newdat)
c
c  check for data on the line to be read by mapgrf for traking
c

      character*160 datain
      logical newdat

           newdat = .false.

           return
           end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      EXECOM
C
C FUNCTIONAL DESCRIPTION:         EXECUTES A DM COMMND
C
C INPUT FILES/PARAMETERS:
C
C    VARIABLE            TYPE          DESCRIPTION
C
C     COMMND           CHAR*(*)     DISPLAY MANAGER COMMND TO EXECUTE
C     ERRFIL           CHAR*(*)     FILE TO DISPLAY ERROR MESSAGES
C     STDFIL           CHAR*(*)     FILE TO DISPLAY STANDARD MESSAGES
C     FILE             CHAR*(*)     FILE TO PUT COMMND IN TO BE EXECUTED
```

```
C     STREAM_$STDIN   INTEGER     STANDARD INPUT STREAM ID
C
C OUTPUT FILES/PARAMETERS:      NONE
C
C SUBROUTINES/FUNCTIONS CALLED
C
C     PAD_$XX           APOLLO SUBROUTINE
C     ERROR_SUB         PRINTS ERROR STATUS
C
C CALLED BY:                  PRINTR
C
C LOCAL VARIABLES:
C
C    VARIABLE             TYPE      DESCRIPTION
C
C    BUFFER             CHAR*128    HOLDS THE PRINT COMMND
C    CMDNAM             CHAR*128    HOLDS THE DM COMMND
C    FORM               CHAR*3      CHARACTER REPRESENTATION OF LENGTH
C                                   OF BUFFER COMMND
C    FULFRM             CHAR*6      FORMAT USED TO WRITE COMMND TO
C                                   FILE
C    MAXCOM             INTEGER     MAX LENGTH OF COMMND LINE
C    LENBUF             INTEGER     ACTUAL LENGTH OF BUFFER LINE
C    LENCMD             INTEGER     LENGTH OF DM COMMND
C    LUNAME             INTEGER     LOGICAL UNIT NUMBER
C    STATUS             INTEGER*4   RETURNS STATUS CODE OF GMF CALL
C
C RESTRICTIONS:         APOLLO  DEPENDENT SUBROUTINE
C
C
C ABNORMAL RETURN CONDITIONS:   N/A
C
C
C PROGRAMMER:                   DATE OF LAST CHANGE     REASON FOR CHANGE
C
C     DIRK BUTSON
C
C-*-*-*-*-*-*-*-*-*-*-*-*-*-*-*-*-*-*-*-*-*-*-*-*-*-*-*-*-*-*-*-*-*-*-*-*-*|*-*-*-*-
C
      SUBROUTINE EXECOM(COMMND,FILNAM,OPTIONS
     +                 ,ERRFIL,STDFIL,FILNM)
C
C EXECUTES A DM COMMND (EX. PRFC, PRF, OR DATE)
C

      CHARACTER*(*) COMMND
      CHARACTER*(*) FILNAM
      CHARACTER*(*) OPTIONS
      CHARACTER*(*) ERRFIL
      CHARACTER*(*) STDFIL
      CHARACTER*(*) FILNM
      INTEGER*2 MAXCOM, LUNAME

      DATA MAXCOM /256/
      DATA MAXBUF /256/
      DATA LUNAME /20/


200   CONTINUE
      RETURN
      END

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    GETARG
C
C FUNCTIONAL DESCRIPTION:       .
C
C CALLED BY:                    GETFNM
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-
```

```
        subroutine getarg (lenarg,argume)

c       get a file name from the command line (or default) for read_keys

        character*80 argume,argument

        data argument/'                                                    '/

        lenarg = 0

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                         GETTIM
C
C FUNCTIONAL DESCRIPTION:            .
C
C CALLED BY:                         DIFTIM, FADCHG
C
C PROGRAMMER:                        DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine gettim(newtim)

c     this subroutine gets local time and puts it in a yyddmmhhmmss format

      integer*2  newtim(6)


      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                         GMCIRC
C
C FUNCTIONAL DESCRIPTION:            .
C
C CALLED BY:
C
C PROGRAMMER:                        DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine gmcirc (x,y,radius)

c       write graphics metafile circle

        logical gmactv
        common /gmactv/ gmactv
        logical fill
        data fill/.false./

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                         GMCLOS
C
C FUNCTIONAL DESCRIPTION:            .
C
C CALLED BY:
C
C PROGRAMMER:                        DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine gmclos
```

```
c       close graphics metafile

        integer*4 npoly,maxpnt,nptot
        common /gmstat/ npoly,maxpnt,nptot
        character*72 line
        data line/'Metafile number of output lines is      '/

        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       GMOPEN
C
C FUNCTIONAL DESCRIPTION:          .
C
C CALLED BY:
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine gmopen (filen,len,ierror)

c       Open Graphics Metafile Resource metafile

        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       GMPOLY
C
C FUNCTIONAL DESCRIPTION:          .
C
C CALLED BY:
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine gmpoly (x,y,n)

c       write graphics metafile polyline

        common /gmpos/ gmxpos,gmypos
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       INIGM
C
C FUNCTIONAL DESCRIPTION:          .
C
C CALLED BY:                       FMAIN
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine inigm

c       initializat graphics metafile resource

        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       INITBW
C
C FUNCTIONAL DESCRIPTION:          INITIALIZES THE LINE PRINTER
C                                  FOR HARDCOPY PRINT OF B/W SCREEN
```

```
C
C INPUT FILES/PARAMETERS:
C                         SIZEX,SIZEY,NOPLNE,FILE)
C  SIZEX               INTEGER*2   SIZE OF SCREEN IN X-DIRECTION (PIXELS)
C  SIZEY               INTEGER*2   SIZE OF SCREEN IN Y-DIRECTION (PIXELS)
C  FILNM                CHAR*(*)

C OUTPUT FILES/PARAMETERS:      NONE
C
C SUBROUTINES/FUNCTIONS CALLED
C
C     GMF_$XX            APOLLO GRAPHIC METAFILE SUBROUTINES
C     ERROR_SUB          PRINTS ERROR STATUS
C
C CALLED BY:                  PRINTR
C
C LOCAL VARIABLES:
C
C    VARIABLE              TYPE      DESCRIPTION
C
C    LNWID              INTEGER      OFFSET BETWEEN ROWS OF BITMAP
C    MSTRID             INTEGER      NAME OF BITMAP PICTURE IS BEING COPIED TO
C    MAPDSC             INTEGER*4    NAME OF BITMAP CONTAINING PICTURE
C    SIZE               INTEGER(2)   SIZE OF SCREEN IN PIXELS
C    STATUS             INTEGER*4    RETURNS STATUS CODE OF GMF CALL
C    STRPTR             INTEGER*4    BEGINNING LOCATION OF PICTURE
C
C RESTRICTIONS:         APOLLO  DEPENDENT SUBROUTINE
C
C
C ABNORMAL RETURN CONDITIONS:   N/A
C
C
C PROGRAMMER:                   DATE OF LAST CHANGE    REASON FOR CHANGE
C
C    DANATION                                          NSAGRF
C    DABUTSON                        12/12/84          IMPLEMENTED IN
C                                                      A21PROTOTYPE
C
C-*-*-*-*-*-*-*-*-*-*-*-*-*-*-*-*-*-*-*-*-*-*-*-*-*-*-*-*-*-*-*-*-*-*-*|*-*-*-*-
C
      SUBROUTINE INITBW(SIZEX,SIZEY,FILNM)
C
C THIS SUBROUTINE INITIALIZES THE LINE PRINTER FOR HARDCOPY PRINT OF SCREEN
C
      RETURN
      END


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    INTCOL
C
C FUNCTIONAL DESCRIPTION:       COPIES N PLANES OF SCREEN
C                               INTO A SUPPLIED FILE
C
C INPUT FILES/PARAMETERS:
C
C  SIZEX      LENGTH OF PICTURE IN PIXELS
C  SIZEY      HEIGHT OF PICTURE IN PIXELS
C  NOPLNE     NUMBER OF PLANES TO STORE IN BITMAP FILE
C  FILNM       PATHNAME OF BITMAP FILE TO BE STORED
C
C OUTPUT FILES/PARAMETERS:      NONE
C
C SUBROUTINES/FUNCTIONS CALLED
C
C    GPR_$XXXX     APOLLO GRAPHIC PRIMITIVE SUBROUTINES
C    ERROR_$XX     APOLLO ERROR SUBROUTINES
C
C CALLED BY:
C
C    APOLLO        DETERMINES TYPE OF APOLLO DISPLAY
C
C LOCAL VARIABLES:
```

```
C
C    STATUS    INT4       STATUS OF LAST APOLLO SUBROUTINE CALL
C    MAPDSC    INT4       DISPLAY BITMAP
C    SIZE      INT2(2)    DIMENSIONS OF DISPLAY BITMAP IN PIXELS
C    VRSION    INT2(2)    NEEDED ARRAY FOR APOLLO CALL
C    WINDOW    INT2(2)    DESIRED WINDOW SIZE OF DISPLAY BITMAP TO STORE
C    SCREEN    INT2(2,2)  DESIRED WINDOW COORDINATES
C    START     INT2(2)    UPPER RIGHT CORNER OF WINDOW
C    HDRS      INT4(4)    NEEDED VARIABLE FOR APOLLO CALL
C    ATRIBS    INT4       ATTRIBUTES OF CURRENT BITMAP
C    FILEBM    INT4       BITMAP FILE INDENTIFIER
C    CREATD    LOGICAL    FLAG TO FILE WAS OPENED O'KAY
C
C RESTRICTIONS:         APOLLO  DEPENDENT SUBROUTINE
C
C
C ABNORMAL RETURN CONDITIONS:   N/A
C
C
C PROGRAMMER:                   DATE OF LAST CHANGE     REASON FOR CHANGE
C
C     DABUTSON                       12/12/84             IMPLEMENTED IN
C                                                         A21PROTOTYPE
C
C     G. N. LEO                      24 JUN '85           TO UNLOCK BITMAP
C                                                         SO THAT IT WILL
C                                                         PRINT WITHOUT
C                                                         HAVING TO EXIT
C                                                         CELEBRATION.
C
C-*-*-*-*-*-*-*-*-*-*-*-*-*-*-*-*-*-*-*-*-*-*-*-*-*-*-*-*-*-*-*-*-*-*-*-*-*|*-*-*-*-
C
      SUBROUTINE INTCOL(SIZEX,SIZEY,NOPLNE,FILNM)
C
C INITIALIZES THE LINE PRINTER FOR HARDCOPY PRINT OF COLOR NODE
C
      RETURN
      END


C+++++++++++++++++++++++++++++++++++++++++++++++++++++++++++++++++++++++++|+++++++
C UNIT NAME:                   KPAUSE
C
C FUNCTIONAL DESCRIPTION:      .
C
C CALLED BY:                   BUTTN, CLENUP, INIGRA, KEYBD, KEYBS
C                              LOCAT, PICK
C
C PROGRAMMER:                  DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine kpause (eofkey)

c       pause during save_keys file playback and potentially read a key
c       this routine is very Apollo dependent, a user on another
c       hardware type may have to rework this logic
c       however, it should compile the way that it is
c
c       Change to gpr call for keyboard input due to 9.5 Operating system


        return
        end


C+++++++++++++++++++++++++++++++++++++++++++++++++++++++++++++++++++++++++|+++++++
C UNIT NAME: OPENIN
C
C FUNCTIONAL DESCRIPTION:  OPENS WDBII DATA FILES.
C
C INPUT FILES/PARAMETERS:
C
C       LUNDAT                 INTEGER     LOGICAL UNIT NUMBER FOR WDBII DATA
```

```
C                                          FILE.
C       LUNIND              INTEGER        LOGICAL UNIT NUMBER FOR WDBII INDE
C                                          FILE.
C       LUNLIN              INTEGER        LOGICAL UNIT NUMBER FOR WDBII LINE
C                                          INDEX FILE.
C       NAML                INTEGER        LENGTH OF WDBII DEFAULT FILE.
C       INB                 CHAR*6         WDBII DEFAULT FILE.
C
C GLOBAL VARIABLES :
C
C       ISECS               INTEGER*4      SECONDS IN 180 MINUTES.
C       IMINS               INTEGER        MINUTES IN 180 DEGREES.
C       C                   REAL           CONVERTS MINUTES TO RADIANS.
C       CS                  REAL           CONVERTS SECONDS TO RADIANS.
C       ICNTLI              INTEGER        CURRENT LINE INDEX RECORD.
C
C OUTPUT FILES/PARAMETERS:  NONE.
C
C SUBROUTINES/FUNCTIONS CALLED : NONE.
C
C CALLED BY: CHAWDB.
C
C LOCAL VARIABLES:
C
C       DATAFI              CHAR*30        WDBII DAT FILE NAME.
C       INDEXF              CHAR*30        WDBII INDEX FILE NAME.
C       LINDEX              CHAR*30        WDBII LINE INDEX FILE NAME.
C
C RESTRICTIONS: NONE.
C
C ABNORMAL RETURN CONDITIONS:   NONE.
C
C LOCATION:                         /a21/gjf/L3REA.FTN
C
C PROGRAMMER:                        DATE OF LAST CHANGE     REASON FOR CHANGE
C
C     DAVE NATION                                            ORIGINAL CODE.
C     JERRY FENERTY                                          DOCUMENTATION AND MO
C                                                            FOR A21 PROTOTYPE.
C     DANIEL BERKICH (SAIC) NOSC                             Read both forms of
C                                                            Data base.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE openin(lundat,lunind,lunlin,naml,inb,ios)
      INTEGER   nlinde,lenlin,icntli
      COMMON    /lwdbii/ nlinde,lenlin,icntli
      INTEGER   nindex,lenind
      COMMON    /iwdbii/ nindex,lenind
      INTEGER   ndatar,lendat
      COMMON    /dwdbii/ ndatar,lendat
      INTEGER   isecs,imins
      REAL      c,cs
      COMMON    /c/ c,isecs,cs,imins
      INTEGER   lundat,lunind,lunlin,naml,ios
      CHARACTER inb*(*)
      INTEGER   csblk,clblk,cpblk
      LOGICAL   va
      common /inopen/ csblk,clblk,cpblk,va
      INTEGER*2 i2(2)
      INTEGER   i4
      EQUIVALENCE (i2,i4)
      INTEGER     two8
      PARAMETER (two8 = 2**8)

      LOGICAL   filply,opnply
      COMMON    /polycb/ filply,opnply
      logical   forma
      common /fmadbc/ forma

      CHARACTER*100 pfile,lfile,sfile
      CHARACTER ptyp*4,ltyp*4,styp*4
      PARAMETER (ptyp='.da3')
      PARAMETER (ltyp='.in3')
      PARAMETER (styp='.li3')
```

```
      DATA      filply /.TRUE./
      DATA nlinde/32/,lenlin/8/
      DATA nindex/32/,lenind/8/,icurlb/-1/
      DATA lendat/2/,ndatar/64/,icurpb/-1/

      cs = c/60.
      ICNTLI=0
      csblk = 0
      clblk = 0
      cpblk = 0
      pfile = inb(1:naml) // ptyp
      lfile = inb(1:naml) // ltyp
      sfile = inb(1:naml) // styp

      va = .FALSE.
      CALL adclos
      CALL addopn(naml,inb,ios)
      if ((inb(naml:naml).eq.'a').and. (forma)) then
        va = .true.
        opnply = .false.
      endif

c         OPEN(UNIT=lundat,FILE=pfile
c     +      ,FORM='UNFORMATTED',STATUS='OLD'
c     +      ,ACCESS='DIRECT',IOSTAT=ios,ERR=181
c     +      ,RECORDTYPE='fixed',RECL=lendat*ndatar,READONLY)
c         OPEN(UNIT=lunind,FILE=lfile
c     +      ,FORM='UNFORMATTED',STATUS='OLD'
c     +      ,ACCESS='DIRECT',IOSTAT=ios,ERR=182
c     +      ,RECORDTYPE='fixed',RECL=lenind*nindex/2,READONLY)
c         OPEN(UNIT=lunlin,FILE=sfile
c     +      ,FORM='UNFORMATTED',STATUS='OLD'
c     +      ,ACCESS='direct',IOSTAT=ios,ERR=183
c     +      ,RECORDTYPE='fixed',RECL=lenlin*nlinde/2,READONLY)

        OPEN(UNIT=lundat,FILE=pfile
     +      ,FORM='UNFORMATTED',STATUS='OLD'
     +      ,ACCESS='DIRECT',IOSTAT=ios,ERR=181
     +      ,RECL=lendat*ndatar*4)
        OPEN(UNIT=lunind,FILE=lfile
     +      ,FORM='UNFORMATTED',STATUS='OLD'
     +      ,ACCESS='DIRECT',IOSTAT=ios,ERR=182
     +      ,RECL=lenind*nindex*2)
        OPEN(UNIT=lunlin,FILE=sfile
     +      ,FORM='UNFORMATTED',STATUS='OLD'
     +      ,ACCESS='direct',IOSTAT=ios,ERR=183
     +      ,RECL=lenlin*nlinde*2)

      RETURN
  900 FORMAT(x,'Open Error ',i3,' on - ',/,x,a)
  181 CONTINUE
      PRINT 900,ios,pfile
      RETURN
  182 CONTINUE
      PRINT 900,ios,lfile
      RETURN
  183 CONTINUE
      PRINT 900,ios,sfile
      RETURN
      END

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    OPMAIL
C
C FUNCTIONAL DESCRIPTION:       .
C
C CALLED BY:                    INMAIL
C
C PROGRAMMER:                   DATE OF LAST CHANGE    REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine opmail(respon)
```

```
c
c this subroutine opens a mailbox as a client for ten channels
c
      return
      end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     PLOTGC
C
C FUNCTIONAL DESCRIPTION:
C
C CALLED BY:
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine plotgc
        return
        end


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     PRINT
C
C FUNCTIONAL DESCRIPTION:        DETERMINES TYPE OF APOLLO DISPLAY
C                                AND WHICH PRINTER TO PRINT TO
C
C INPUT FILES/PARAMETERS:
C
C       GPR_$               APOLLO VARIABLES CAN BE FOUND IN THE
C                           /SYS/INS/GPR.INS.FTN FILE
C
C OUTPUT FILES/PARAMETERS:       NONE
C
C SUBROUTINES/FUNCTIONS CALLED
C       GPR_$INQ_CONFIG     APOLLO SUPPLIED ROUTINE TO DETERMINE
C                           CONFIGURATION OF DISPLAY
C       INT2                DOMAIN FORTRAN FUNCTION TO CONVERT NUMBER
C                           TO INTEGER*2 FORMAT
C       INTCOL              COPIES THREE PLANES OF A COLOR
C                           NODE INTO A BITMAP FILE
C       INITBW              COPIES ONE PLANE INTO A GMF FILE
C       MAPPTR              EXECUTES THE COMMAND TO PRINT
C                           THE FILE CREATED BY EITHER OF THE TWO
C                           INITIALIZATION ROUTINES
C
C CALLED BY:                   PRINTR
C
C LOCAL VARIABLES:
C
C        CONFIG             RETURNED FROM GPR ROUTINE INDICATING TYPE
C                           OF NODE
C        STATUS             RETURNED FROM GPR ROUTINE TO INDICATE ERROR
C                           IN CALL
C
C RESTRICTIONS:         APOLLO  DEPENDENT SUBROUTINE
C
C     WRITTEN FOR THE CURRENT DEVICE DRIVER OF THE ACT II PRINTER
C     IF CHANGES TO DEVICE DRIVER WILL NEED TO CHANGE SOME PARAMETERS
C     BEING PASSED TO INTCOL AND/OR EXECOM
C
C ABNORMAL RETURN CONDITIONS:   N/A
C
C
C PROGRAMMER:                    DATE OF LAST CHANGE     REASON FOR CHANGE
C
C     DABUTSON                       12/12/84              INITIAL ENTRY
C     RKDISBR                        14/04/87              adapted for print menu
C
C-*-*-*-*-*-*-*-*-*-*-*-*-*-*-*-*-*-*-*-*-*-*-*-*-*-*-*-*-*-*-*-*-*-*-*-*|*-*-*-*-
C
      SUBROUTINE PRINT
      END
```

```
C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PRINTR
C
C FUNCTIONAL DESCRIPTION:       PRINTS THE CONTENTS OF THE SCREEN
C                               ON THE GRAPHIC DEVICE OR ALLOWS USER
C                               TO TAKE A PICTURE OF FULL SCREEN
C                               WITH MATRIX CAMERA
C
C INPUT FILES/PARAMETERS:
C
C      QCHANG          CHANGE          LOGICAL  FLAG TO INIDICATE A CHANGE HAS
C                                               BEEN MADE TO THE PICTURE
C      QNAME           FLNAME          CHAR*50  NAME OF CURRENT PICTURE
C
C OUTPUT FILES/PARAMETERS:      NONE
C
C
C SUBROUTINES/FUNCTIONS CALLED
C
C     INIPIC         INITIALIZE VARIABLES FOR DRAWING NEW PICTURE
C     INTCOL         INITIALIZES B/W PRINTER
C     INTSCN         INITIALIZES SCREEN
C     HLDF           RETRIEVES FILE FOR DISPLAY (CURRENT PICTURE)
C     MAPCOL         PRINTS SCREEN IMAGE OF COLOR NODE
C     MESG           DISPLAYS MESG
C     RPLSCN         REPLACES SCREEN TO ORIGINAL SIZE
c     CALCMP         REDRAWS MAP WHILE CREATING CALCOMP PLOTTER FILE
C
C CALLED BY:         FMAIN, PRTMEN
C
C LOCAL VARIABLES:
C
C     VARIABLE                TYPE        DESCRIPTION
C
C      OCHANG               LOGICAL       SAVE QCHANG
C      SVNAM               CHAR*50      SAVE CURRENT FILE NAME
C
C RESTRICTIONS:
C
C
C ABNORMAL RETURN CONDITIONS:   N/A
C
C
C PROGRAMMER:                    DATE OF LAST CHANGE     REASON FOR CHANGE
C
C     DABUTSON                      11/13/84              INITIAL ENTRY
C     RKDISBR                       14/04/87              adapted for print menu
C                                                         and calcomp plots
C
C-*-*-*-*-*-*-*-*-*-*-*-*-*-*-*-*-*-*-*-*-*-*-*-*-*-*-*-*-*-*-*-*-*-*-*-*-*|*-*-*-*-
C
       SUBROUTINE PRINTR

       return
       end


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    RECDAT
C
C FUNCTIONAL DESCRIPTION:       .
C
C CALLED BY:                    FMAIN, RECDIS, RESCON
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

       subroutine recdat (savnam,lennam)

c      this subroutine restores the named screen
       return
       end
```

```
C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    REPLAY
C
C FUNCTIONAL DESCRIPTION:       .
C
C CALLED BY:                    TRKCON
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine replay (delay)

c this routine blanks out the currently visible tracks and 'replays'
c them in time sequence
c programmer: avw
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    SAVDAT
C
C FUNCTIONAL DESCRIPTION:       .
C
C CALLED BY:                    RESCON, SAVDIS
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine savdat (savnam,lennam)

c       this subroutine saves the current screen in save_name.image
        character*100 savnam
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    SNDMAIL
C
C FUNCTIONAL DESCRIPTION:       .
C
C CALLED BY:
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine sndmail
c
      return
      END

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    TERMGM
C
C FUNCTIONAL DESCRIPTION:       .
C
C CALLED BY:                    FMAIN
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine termgm

c       terminate graphics metafile system
      return
      END
```

```
C+*+*+*+*+*+*+*+*+*+*+*+*+*+*+*+*+*+*+*+*+*+*+*+*+*+*+*+*+*+*+*+*+*+*|*+*+*+*+
C UNIT NAME:                    TRKINI
C
C FUNCTIONAL DESCRIPTION:       .
C
C CALLED BY:                    CHKDAT
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

      subroutine trkini
c
c this subroutine opens the apollo mailbox for 10 channels fore
c incoming tracking data from a line.
c
      return
      end

C+*+*+*+*+*+*+*+*+*+*+*+*+*+*+*+*+*+*+*+*+*+*+*+*+*+*+*+*+*+*+*+*+*+*|*+*+*+*+
C UNIT NAME: darcos
C
C FUNCTIONAL DESCRIPTION:  Substitute for dacos function
C
C INPUT FILES/PARAMETERS:
C
C GLOBAL VARIABLES : NONE.
C
C OUTPUT FILES/PARAMETERS:  NONE.
C
C SUBROUTINES/FUNCTIONS CALLED :
C
C CALLED BY:
C
C LOCAL VARIABLES: NONE.
C
C RESTRICTIONS: NONE.
C
C ABNORMAL RETURN CONDITIONS:   NONE.
C
C LOCATION:
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C
C-*-*-*-*-*-*-*-*-*-*-*-*-*-*-*-*-*-*-*-*-*-*-*-*-*-*-*-*-*-*-*-*-*-*-*|*-*-*-*-

        REAL*8 FUNCTION DARCOS(X)

c       Substitute for dacos function

        COMMON /PIE/ PIE,TPIE,PIO2,PIO4
        REAL*8 X,Y,q,a,b
        IF(DABS(X) .GT. 1.0D+0) then
            X=DSIGN(1.0D+0,X)
        endif
        a = 1.0D+0
        b = x*x
        q = a - b
        Y=DSQRT(DABS(q))
        DARCOS=DATAN2(Y,X)
        IF (DARCOS .LT. 0.) DARCOS = DARCOS + PIE
        RETURN
        END

C+*+*+*+*+*+*+*+*+*+*+*+*+*+*+*+*+*+*+*+*+*+*+*+*+*+*+*+*+*+*+*+*+*+*|*+*+*+*+
C UNIT NAME: darsin
C
C FUNCTIONAL DESCRIPTION:  perform the double prec. arcsin w/ this routine
```

```
C
C INPUT FILES/PARAMETERS:
C
C GLOBAL VARIABLES : NONE.
C
C OUTPUT FILES/PARAMETERS:  NONE.
C
C SUBROUTINES/FUNCTIONS CALLED :
C
C CALLED BY:
C
C LOCAL VARIABLES: NONE.
C
C RESTRICTIONS: NONE.
C
C ABNORMAL RETURN CONDITIONS:   NONE.
C
C LOCATION:
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

        REAL*8 FUNCTION DARSIN (X)

c --- perform the double prec. arcsin w/ this routine
c --- the system routine doesn't work on the dn300.

        real*8 x,y,z,x2

        IF(DABS(X) .GT. 1.0D+0) then
           X=DSIGN(1.0D+0,X)
        endif

        x2 = x * x
        y = DABS(1.0D+0 - x2)
        z = DSQRT(y)
        DARSIN = DATAN2(x,z)
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: datoll
C
C FUNCTIONAL DESCRIPTION:  CONVERTS DISTANCE/AZIMUTH FROM THE CENTER OF
C       PROJECTION TO LAT/LON
C
C INPUT FILES/PARAMETERS:
C
C GLOBAL VARIABLES : NONE.
C
C OUTPUT FILES/PARAMETERS:  NONE.
C
C SUBROUTINES/FUNCTIONS CALLED :
C
C CALLED BY:                    NO LONGER USED BY CARICATURE
C
C LOCAL VARIABLES: NONE.
C
C RESTRICTIONS: NONE.
C
C ABNORMAL RETURN CONDITIONS:   NONE.
C
C LOCATION:
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
```

```
C                                                   FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE DATOLL(CLAT,CLON,ER,AZ,PLAT,PLON)

C       CONVERTS DISTANCE/AZIMUTH FROM THE CENTER OF PROJECTION TO LAT/LON

        COMMON /PIE/ PIE,TPIE,PIO2,PIO4
        COMMON /CONST/ MAXVAL,RMPV,C,R,ERNM

C         SET CONSTANTS

          SIN1 = SIN(CLAT)
          COS1 = COS(CLAT)

C         DETERMINE SIN OF PLAT

          SIN2 = COS(AZ)*COS1*SIN(ER)+SIN1*COS(ER)

C         COMPUTE PLAT

          PLAT = ASIN(SIN2)
C
          COS2 = COS(PLAT)

C         COMPUTE DELTA LON

          IF(ABS(COS1) .LT. RMPV) THEN
                 DLON = PIE - AZ
                 GO TO 100
          ENDIF

          IF(ABS(COS2) .LT. RMPV) THEN
                 DLON = 0.
                 GO TO 100
          ENDIF
          COSDLO = (COS(ER)-SIN1*SIN2)/(COS1*COS2)
          IF(ABS(COSDLO) .GT. 1.0) THEN
                 DLON = 0.
          ELSE
                 DLON = ACOS(COSDLO)*SIGN(1.0,AZ)
          ENDIF

C         COMPUTE PLON

100       CONTINUE
          PLON = DLON+CLON
          IF(ABS(PLON) .GT. PIE) PLON = PLON - SIGN(TPIE,PLON)

          RETURN
          END


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   DATPOL
C
C FUNCTIONAL DESCRIPTION:      .
C
C CALLED BY:                   BUTTN, KEYBD, KEYBS, LOCAT, PICK
C
C PROGRAMMER:                  DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine datpol
c
c
c     this subroutine 1st checks the comm line for
c     new data coming in.  If data is present in the
c     queue, ADDTRK adds this new track to the display
c     list and displays it.
c     2nd, the system clock is checked to see if 1 min.
c     has gone by since last check.  If so, a fade
```

```
c     routine is called to delete any tracks that are
c     no longer within the fade time.
c
        logical newdat
        character*160 datain
        integer latbeg
        integer latend
        integer lonbeg
        integer lonend
        character*7 lablnk
        character*8 loblnk
        data latbeg,latend /3,9/
        data lonbeg,lonend /10,17/
        data lablnk /'       '/
        data loblnk /'        '/


c
c          check for data line interrupt
c
  125      continue
           newdat = .false.
           call CHKDAT(datain,newdat)
           if(newdat) then
c
c              don't call ADDTRK if lat or lon are blank
c
               if (datain(latbeg:latend) .ne. lablnk .and.
     +             datain(lonbeg:lonend) .ne. loblnk) then
                   call ADDTRK(datain)
               endif
               goto 125
           endif

c          check for time clock interrupt and turn off visibility
c          on any tracks that are pass fade time
c          (click true on each minute elapsed)
c
           call TIMCHK
c
           return
           end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                      ddcval
c
c  Functional Description:
c       this function converts produces a single rgb value from hls
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:     hlsrgb
c
c  Local Variables: N/A
c
c  Restrictions: N/A
c
c  Abnormal Return Conditions:  N/A
c
c  Location:      /a21/dave
c
c  Programmer         Date of Last Change       Reason for Change
c
C-*-*-*-*-*-*-*-*-*-*-*-*-*-*-*-*-*-*-*-*-*-*-*-*-*-*-*-*-*-*-*-*-*-*-*|*-*-*-*-
c
       real function ddcval (val1, val2, rhue)
c
c      this function converts produces a single rgb value from hls
```

```
c
        hue = rhue
        if (hue .lt. 0.0) hue = hue + 360.
        if (hue .lt. 60.) then
            ddcval = val1 + (val2 - val1) * hue / 60.
        else if (hue .lt. 180.) then
            ddcval = val2
        else if (hue .lt. 240.) then
            ddcval = val1 + (val2 - val1) * (240. - hue) / 60.
        else
            ddcval = val1
        endif
c
        return
        end


C+*+*+*+*+*+*+*+*+*+*+*+*+*+*+*+*+*+*+*+*+*+*+*+*+*+*+*+*+*+*+*+*+*+*|*+*+*+*+
C UNIT NAME:                    DECDET
C
C FUNCTIONAL DESCRIPTION:       .
C
C CALLED BY:                    STATEC
C
C PROGRAMMER:                   DATE OF LAST CHANGE     REASON FOR CHANGE
c  S. Lamb                Feb 1988                   command fix - decdet
C
C-*-*-*-*-*-*-*-*-*-*-*-*-*-*-*-*-*-*-*-*-*-*-*-*-*-*-*-*-*-*-*-*-*-*|*-*-*-*-
c
        subroutine decdet
c
c       this subroutine is the decrease detail state interpreter (22)
c
        common /states/ nextst
        character*6 curwdb
        common /curwdb/ curwdb
        integer detail(6)
        common /detail/detail
        character postfix(6)
        integer current
        integer i
        integer next
        logical wordis,iseoc

        data postfix/'a','b','c','d','e','f'/
c
        initls = nextst
c       do until nextst not = initial state
  100   continue
            call getwrd
c * ** *** **** ***** ****** ******* change check order, etc.
            if (wordis('SCALE')) then
                nextst = 24
            else if (wordis('DETAIL').or.wordis('MAP') .or.
     +               iseoc()) then
c  ***          decrease detail
                do 110 i=1,6
                    if(curwdb(6:6).eq.postfix(i)) then
                        current = i
                    endif
  110           continue
                next = current + 1
  120           continue
                if(next .lt. 7 .and. detail(next) .ne. 1) then
                        next = next + 1
                        goto 120
                else
                        continue
                endif
                if(next.lt.7) then
                        curwdb(6:6) = postfix(next)
                        call chawdb(6,curwdb)
                        nextst = 3
                else
```

```
c                        call drwamp(' ',1)                    - decdet
c ----- updated 7/31/87 CSL                                    - decdet
                        call drwamp('Least detail already in use ',1)
                        nextst = 1
                endif
            else
c  ***          decrease detail
                do 130 i=1,6
                    if(curwdb(6:6).eq.postfix(i)) then
                        current = i
                    endif
  130           continue
                next = current + 1
  140           continue
                if(next .lt. 7 .and. detail(next) .ne. 1) then
                        next = next + 1
                        goto 140
                else
                        continue
                endif
                if(next.lt.7) then
                        curwdb(6:6) = postfix(next)
                        call chawdb(6,curwdb)
                        nextst = 3
                else
c                        call drwamp(' ',1)                    - decdet
c ----- updated 7/31/87 CSL                                    - decdet
                        call drwamp('Least detail already in use ',1)
                        nextst = 1
                endif
                call putwrd
            endif
        if (nextst.eq.initls) go to 100
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     DECSCA
C
C FUNCTIONAL DESCRIPTION:        .
C
C CALLED BY:                     STATEC
C
C PROGRAMMER:                    DATE OF LAST CHANGE     REASON FOR CHANGE
c  S. Lamb                Feb 1988                   command fix - decsca
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine decsca
c
c       this subroutine is the decrease scale state interpreter (24)
c
        common /states/ nextst
        logical wordis,iseoc
c       map parameters
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
c
        initls = nextst
c       do until nextst not = initial state
  100   continue
            call getwrd
c * ** *** **** ***** ****** ******* change check order, etc.
            if (wordis('DETAIL')) then
                nextst = 22
            else if (wordis('SCALE').or.wordis('MAP')
     +              .or. iseoc()) then
c               decrease scale
                xrnmn = xrnm * 2. / 3.
```

```
              call chscal (xrnmn)
              nextst = 3
          else
c             decrease scale
              xrnmn = xrnm * 2. / 3.
              call chscal (xrnmn)
              call putwrd
              nextst = 3
          endif
      if (nextst.eq.initls) go to 100
c
      return
      end

C+*+*+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    defkeys
c
c  Functional Description:
c       define default keys
c
c  Input Files/Parameters:
c
c  Output Files/Parameters: N/A
c
c  Subroutines/Functions Called:
c
c  Called By:                    FMAIN
c
c  Local Variables: N/A
c
c  Restrictions: N/A
c
c  Abnormal Return Conditions:  N/A
c
c  Location:
c
c  Programmer       Date of Last Change      Reason for Change
C  L. McCleary      Jan 1988                 vax keys fix - defkeys
c
C-*-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine defkeys

      logical vax
      common /vaxdbc/ vax
      integer qfb(26),qmb(4),vaxqfb(26),vaxqmb(4),apqfb(26),apqmb(4)
      common /butons/ qfb,qmb
c*******VAX function key definitions
c       data vaxqfb/2,7,51,52,5,6,55,56,57,65,66,67,68,69,70,71,
c     +  76,83,4,75,81,77,3,80,84,8/
      data vaxqfb/2,7,51,52,5,6,55,56,57,65,66,67,68,69,70,71,
     +  76,83,4,75,81,77,2,80,84,8/
C     PICK,LEAVE(R),HELP,___
c       data vaxqmb/32,82,72,90/
C     PICK,HELP,LEAVE(R)___
      data vaxqmb/32,72,82,90/
c*******
c*******Apollo function key definitions
c       data apqfb/2,7,51,52,5,6,55,56,57,65,66,67,68,69,70,71,
c     +  76,83,4,75,81,77,3,80,84,8/
      data apqfb/1,7,51,52,5,6,55,56,57,65,66,67,68,69,70,71,
     +  76,83,4,75,81,77,2,80,84,8/
      data apqmb/1,2,3,4/
c*******


       if(vax) then
         do 20 i = 1,26
           qfb(i) = vaxqfb(i)
 20      continue
         do 30 i = 1,4
           qmb(i) = vaxqmb(i)
 30      continue
```

```
         else
           do 40 i = 1,26
             qfb(i)= apqfb(i)
 40        continue
           do 50 i = 1,4
             qmb(i) = apqmb(i)
 50        continue
         endif

         return
         end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     DGRID
C
C FUNCTIONAL DESCRIPTION:        .
C
C CALLED BY:                     DMAPII
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

         subroutine dgrid (ipgrid,vmaxla,vminla,vmaxlo,vminlo,dotem,
     +   itproj)

c        call CARICATURE grid display subroutine

         call llgrid (ipgrid,vmaxla,vminla,vmaxlo,vminlo,dotem,itproj)

         return
         end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     DIFTIM
C
C FUNCTIONAL DESCRIPTION:        .
C
C CALLED BY:                     CHKCLK
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

      subroutine diftim(click,curdtg)
c
c this subroutines determines if a minute has gone off
c of the system clock since last call to getime.
c%include '/sys/ins/time.ins.ftn'

      logical click
c
c     curdtg is in yydddhhmm format- w/ ddd being julian date
c
      character*9 curdtg
      integer arsize
      integer yr
      integer mon
      integer day
      integer hour
      integer min
      integer juldat
      integer*2 oldtim(6)
      integer*2 newtim(6)
      common /ctimes/ oldtim,newtim
      integer yrsub
      integer monsub
      integer daysub
      integer hrsub
      integer minsub
      logical trackn
      common /trkdbc/ trackn
```

```
      data arsize /6/
      data yrsub  /1/
      data monsub /2/
      data daysub /3/
      data hrsub  /4/
      data minsub /5/

c
c get local time, then convert to yymmddhhmmss format
c dcode(5) is the minute slot.  check for a minute gone by
c if so, put new dcoded time into current decoded time.
c
c     print*,'diftim enter'

c     get current local time

      call gettim(newtim)

      click = .false.

      if (trackn) then
         print*,'oldtim/newtim= ',oldtim,newtim
      end if
      if ((newtim(yrsub) .gt. oldtim(yrsub)) .or.
     +         ((newtim(yrsub) .lt. oldtim(yrsub)) .and.
     +         (newtim(yrsub)-oldtim(yrsub) .ge. 99))) then
           click = .true.
           do 10 i=1,arsize
                 oldtim(i) = newtim(i)
 10        continue
      else if (newtim(yrsub) .eq. newtim(yrsub)) then
           if (newtim(monsub) .gt. oldtim(monsub)) then
              click = .true.
              do 20 i=1,arsize
                    oldtim(i) = newtim(i)
 20           continue
           else if (newtim(monsub) .eq. oldtim(monsub)) then
              if (newtim(daysub) .gt. oldtim(daysub)) then
                 click = .true.
                 do 30 i=1,arsize
                       oldtim(i) = newtim(i)
 30              continue
              else if (newtim(daysub) .eq. oldtim(daysub)) then
                 if (newtim(hrsub) .gt. oldtim(hrsub)) then
                    click = .true.
                    do 40 i=1,arsize
                          oldtim(i) = newtim(i)
 40                 continue
                 else if (newtim(hrsub) .eq. oldtim(hrsub)) then
                    if (newtim(minsub) .gt. oldtim(minsub)) then
                       click = .true.
                       do 50 i=1,arsize
                             oldtim(i) = newtim(i)
 50                    continue
                    endif
                 endif
              endif
           endif
      endif
c
c     get julian date in integer format from yr/mon/day
c

      yr =   oldtim(yrsub)
      mon =  oldtim(monsub)
      day =  oldtim(daysub)
      hour = oldtim(hrsub)
      min  = oldtim(minsub)
      call julian(yr,mon,day,juldat)
c
c     express curdtg in character format as yydddhhmm
c
      call chdate (yr,juldat,hour,min,curdtg)
      if (trackn) then
```

```
          print*,'curdtg= ',curdtg
       end if

       return
       end


C+*+*+*+*+*+*+*+*+*+*+*+*+*+*+*+*+*+*+*+*+*+*+*+*+*+*+*+*+*+*+*+*+*|*+*+*+*+
C UNIT NAME:                     DISCEN
C
C FUNCTIONAL DESCRIPTION:        .
C
C CALLED BY:                     STATEC
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*|*-*-*-*-

        subroutine discen
c
c       this subroutine is the display center point state interpreter (7)
c
        common /states/ nextst
c       map parameters
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        character * 105 errlin
        character*20 geostr
c
c       print*,'discen -- display current center point ',clat,clon
        call fmtgeo (clat,clon,geostr)
        errlin = 'Current center point is : ' // geostr
        call cerror(46,errlin)
        nextst = 1
c
        return
        end


C+*+*+*+*+*+*+*+*+*+*+*+*+*+*+*+*+*+*+*+*+*+*+*+*+*+*+*+*+*+*+*+*+*|*+*+*+*+
C UNIT NAME:                     DISP1
C
C FUNCTIONAL DESCRIPTION:        .
C
C CALLED BY:
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*|*-*-*-*-

        subroutine displ(msg, lenmsg, lineno)
c
c       display a single line in the communications area
c
        integer lenmsg, lineno
        character*(*) msg
        real qcxmn,qcymn,qcxmx,qcymx
        common/comwdo/qcxmn,qcymn,qcxmx,qcymx
        logical vax
        common /vaxdbc/ vax

        if (lenmsg .gt. 0) then
          if (vax) then
             call jmove(qcxmn+1,(qcymx-lineno+.1))
          else
             call jmove(qcxmn+1,(qcymx-lineno+.4))
          endif
          call jlstrg (msg(1:lenmsg))
        endif
        return
        end
```

```
C+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    disp5
c
c  Functional Description:
c       display maxlin lines in sys area
c
c  Input Files/Parameters:
c
c  Output Files/Parameters: N/A
c
c  Subroutines/Functions Called:
c
c  Called By: help
c
c  Local Variables: N/A
c
c  Restrictions: N/A
c
c  Abnormal Return Conditions:  N/A
c
c  Location:
c
c  Programmer      Date of Last Change     Reason for Change
C  L. McCleary     Jan 1988                separate amp & sys - disp5
c
C-*-*-*-*-*-*-*-*-*-*-*-*-*-*-*-*-*-*-*-*-*-*-*-*-*-*-*-*-*-*-*-*-*-*|*-*-*-*-
c
        subroutine disp5(ifl,eof,eom)
c
c       subroutine to display requested maxlin lines of help msg
c
        logical frame
        common /frmdbc/ frame
        common /comwdo/ qcxmn,qcymn,qcxmx,qcymx
        logical eof,eom
        real qcxmn,qcymn,qcxmx,qcymx
        character cchar
        character*80 msg
        integer lenmsg
        integer qfb(26),qmb(4)
        common /butons/ qfb,qmb
        common /cmxlin/maxlin
c        data max/5/
        data icolcm/16/

c       set window and retained segment
c       print*,'in disp5'
c       if end of file, give error message
        if (eof) then
c           no msg for given #
            eom=.true.
            call mesg (195)
            call BUTTN(IBUT)
C   THE CALL TO PAWS WAS COMMENTED OUT DUE TO THE FACT THAT
C   A USER HITTING THE HELP KEY IN RESPONSE TO PAWS WOULD
C   CAUSE RECURSION SINCE PAWS WILL CALL HELP AGAIN.  -- GJF
c            call paws
            if (ibut.eq.qfb(23)) then
                call clrcom
                call mesg(47)
                call BUTTN(IBUT)
            endif
        else
            i=0
            call clrcom
            if (frame) then
c*******         temporarily do a jframe to make sure the area is clear
                call jframe
            endif
            call jwindo(qcxmn,qcxmx,qcymn,qcymx)
            call jopen
            call xsize(1.,1.)
            call xcolor(icolcm)
c           display up to maxlin lines of msg
```

```
100          continue
                 read(ifl,1000,end=125,err=120)cchar,msg
1000             format(a1,a80)
                 if (cchar.eq.'C'.or.cchar.eq.'c') go to 100
                 if (cchar.eq.'M'.or.cchar.eq.'m') then
                     eom = .true.
                     go to 110
                 endif
                 i=i+1
c                print*,'disp=',msg
                 call length(msg,80,lenmsg)
                 call displ(msg, lenmsg, i)
c             if (i.ne.max) go to 100
             if (i.ne.maxlin) go to 100
110          continue
             go to 130
120          continue
                 print*,'read error on message file'
                 go to 130
125          continue
                 eof=.true.
130          continue
             call jclose
         endif
c        print*,'end disp5'
         return
         end


C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      DISPRO
C
C FUNCTIONAL DESCRIPTION:         .
C
C CALLED BY:                      STATEC
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

         subroutine dispro
c
c        this subroutine is the display projection state interpreter (5)
c
         common /states/ nextst
c        map parameters
         logical lton(16),dotem
         integer ipgrid(4),ltyptb(16)
         common /map/ XRNM,XC,YC,LEVEL,CLAT,CLON,XRAD,YRAD,ITPROJ,
     +       IRES,LTYPTB,LUNDAT,LUNIND,LUNLIN,LTON,IPGRID,DOTEM,
     +       ORHALT
         character * 105 errlin
         character*23 proj(7)
         integer lenpro(7)
         data lenpro/8,23,18,12,11,15,8/
         data proj/'Gnomonic',
     +             'Orthographic Equatorial',
     +             'Orthographic Polar',
     +             'Orthographic',
     +             'Perspective',
     +             'Equirectangular',
     +             'Mercator'/
c
c        print*,'dispro -- display current projection ',itproj
         errlin = 'Current projection is : ' // proj(itproj)
         lenlin = 24 + lenpro(itproj)
         call cerror(lenlin,errlin)
         nextst = 1
c
         return
         end

C+*+*+*+*+*+*+*+*+*+*+*+*+*+*+*+*+*+*+*+*+*+*+*+*+*+*+*+*+*+*+*+*+*+*+*+*+*+*|*+*+*+*+
```

```
C UNIT NAME:                       DISSCA
C
C FUNCTIONAL DESCRIPTION:          .
C
C CALLED BY:                       STATEC
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine dissca
c
c       this subroutine is the display scale state interpreter (6)
c
        common /states/ nextst
c       map parameters
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        character * 105 errlin
        character * 7 chasca
c
c       print*,'dissca -- display current scale ',xrnm
        write (chasca,1100,err=190) xrnm
 1100   format (f7.0)
            errlin = 'Current scale is : ' // chasca
            lenlin = 26
            if (itproj.eq.6.or.itproj.eq.7) then
                errlin = errlin(1:lenlin) // ' minutes.'
                lenlin = lenlin + 9
            else if (itproj.eq.5) then
                errlin = errlin(1:lenlin) //
     +          ' nautical miles altitude.'
                lenlin = lenlin + 25
            else
                errlin = errlin(1:lenlin) //
     +          ' nautical miles at center.'
                lenlin = lenlin + 26
            endif
            call cerror(lenlin,errlin)
  190   continue
        nextst = 1
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       DISTXT
C
C FUNCTIONAL DESCRIPTION:          .
C
C CALLED BY:                       TXWRIT
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine distxt(txtseg,txline,page,lpp,lcnt)
c
c       this subroutine displays the textual data
c       for one page of data in the txline array
c
        integer txtseg
        integer lpp
        integer lcnt
        integer page
        character*80 blanks
        character*80 txline(*),line
        real y
        integer frstln
        integer lstlin
```

```
        integer*4 nchars

        blanks = ' '
        nchars = 80

c       First line # is set equal to first line in current page.

        frstln = (page - 1) * lpp + 1

c       Last line # is set to frstln + lpp - 1 or qlast, whichever is less.

        if(( frstln + lpp - 1).lt.lcnt ) then
             lstlin = frstln + lpp - 1
        else
             lstlin = lcnt
        endif

        y = 160.
        call jropen(txtseg)
        call jsize(5.,5.)
c
c       this is gold text on a color node
c
        call xcolor(16)
        do 100 i= frstln, lstlin
             line = txline(i)
             call jmove(-180.,y)
             call jlstrg(line(1:nchars))
             y = y - 10.
 100    continue
        call jrclos
        return
        end

C+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                        doverl
c
c  Functional Description:
c       draw overlay features on map background
c
c  Input Files/Parameters:
c
c  Output Files/Parameters: N/A
c
c  Subroutines/Functions Called:
c
c  Called By: mapper
c
c  Local Variables: N/A
c
c  Restrictions: N/A
c
c  Abnormal Return Conditions:  N/A
c
c  Location:
c
c  Programmer       Date of Last Change     Reason for Change
C  L. McCleary      Jan 1988               separate amp & sys - doverl
c
C-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine doverl (ltypov,ltonov)
c       draw overlay features on map background
c
c       ltypov  This is a table of 16 variables containing an integer
c               value representing line type for overlay features.
c               The categories are as follows:
c                    1    Overlay data feature
c                    2    Direction finding feature
c                    3    Tracking data feature
c                    4    Gazeteer
c                    5
c                    6
```

```
c       ltonov  Table of 16 logical values.  Determines whether the
c               line types referenced by ltypov are to be displayed
c
        integer secnds
        logical ltonov(16)
        dimension ltypov(16)
        character*80 ovfnam
        common /ovfnam/ ovfnam
        common /lenovf/ lenovf

c**   seg numbers for overlay and df
        integer ovseg, dfseg
        common /OVSEGS/ ovseg, dfseg
        logical BEGTRK
        integer trakfd
        common /TRACK/ trakfd,BEGTRK
        INTEGER SEGNO,FIRSEG
        COMMON /SEGNO/ SEGNO,FIRSEG
        common /gphwdo/xllgeo,yllgeo,xurgeo,yurgeo
c       map parameters
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        common /vmaxmn/ VMAXLA,VMINLA,VMAXLO,VMINLO


        data lcover/1/,lcdf/2/,lctrak/3/,lcgaz/4/
        DATA LSCALE/15/
        data secnds /0/

        IF (LTON(LSCALE)) THEN
            LTYPE=LTYPTB(LSCALE)
            call mesg(265)
            call gravpt
            call geowin
            call xcolor(ltype)
            CALL SCLRET
        ENDIF
        if (ltonov(lcover)) then
            ltype=ltypov(lcover)
            call mesg(250)
            call gravpt
            call geowin
            call getseg(ovseg)
            call jropen(ovseg)
            call xcolor(ltype)
            call pltovp(xrnm,ovfnam,lenovf)
            call jrclos
        endif
        if (ltonov(lcdf)) then
            ltype=ltypov(lcdf)
            call mesg(1210)
            call gravpt
            call geowin
            call getseg(dfseg)
            call jropen(dfseg)
            call xcolor(ltype)
            call pltovp (xrnm,'df.dat',6)
c             call jrclos
        endif

c       print*,'doverl -- ',xllgeo,yllgeo,xurgeo,yurgeo

        if (ltonov(lctrak)) then
            call jrclos
            call gravpt
            call geowin
            call replay (secnds)
        endif
c       if (ltonov(lcgaz)) then
c           LTYPE=ltypov(lcgaz)
c           call gltype(ltype,lcgaz)
```

```
c           call pltgaz (xrnm,.true.,.false.)
c       endif
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: drawel
C
C FUNCTIONAL DESCRIPTION:  THIS SUBROUTINE DRAWS THE ELLIPSE OF 95% CONFIDENCE.
C
C INPUT FILES/PARAMETERS:
C
C GLOBAL VARIABLES :             noelpl  - draw ellipse plus flag
C
C OUTPUT FILES/PARAMETERS:  NONE.
C
C SUBROUTINES/FUNCTIONS CALLED :
C
C CALLED BY:                     PLOTOV
C
C LOCAL VARIABLES: NONE.
C
C RESTRICTIONS: NONE.
C
C ABNORMAL RETURN CONDITIONS:   NONE.
C
C LOCATION:
C
C PROGRAMMER:                    DATE OF LAST CHANGE     REASON FOR CHANGE
C
C     DAVE NATION                                        ORIGINAL CODE.
C     JERRY FENERTY                                      DOCUMENT AND MODIFY
C                                                        FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE DRAWEL(BPELAT,BPELON,SMA,SMI,AZIMTH)

C ----- THIS SUBROUTINE DRAWS THE ELLIPSE OF 95% CONFIDENCE.

        LOGICAL INVAL,INVIS,NEWONS,NEWSEQ

        REAL MAXANG

        logical noelpl
        common /noelpl/ noelpl

        DATA DTR/.01745329/
        DATA EARTHR/3443.922/
        DATA PI/3.14159/

        MAXANG = MIN(PI/6.,PI/6.*25.*SMI/SMA)

        AZ = AZIMTH*DTR

        NEWSEQ = .TRUE.

        SINLAT = SIN(BPELAT)
        COSLAT = COS(BPELAT)
        AB = SMA*SMI
        A2 = SMA*SMA
        B2 = SMI*SMI

        DELTA = AB*2.0*PI/60

        O = 0.0
   10   CONTINUE

        SINO = SIN(O)
        COSO = COS(O)

        RNM = AB / SQRT(A2*SINO*SINO + B2*COSO*COSO)
        R = RNM / EARTHR
```

```
      SINR = SIN(R)
      COSR = COS(R)

      V = ASIN(COSR*SINLAT + SINR*COSLAT*COS(AZ+O))
      U = BPELON + ASIN(SIN(AZ+O)*SINR/COS(V))

      INVAL = .FALSE.
      CALL LLINXY (V,U,X,Y,INVAL,INVIS,NEWONS)
      IF (INVIS) THEN
         NEWSEQ = .TRUE.
      ELSE
         IF (NEWSEQ) THEN
            CALL JMOVE (X,Y)
         ELSE
            CALL JDRAW (X,Y)
         ENDIF
         NEWSEQ = .FALSE.
      ENDIF

      IF (O.LT.2.0*PI) THEN
         DELO = DELTA / RNM / RNM
         DELO = MIN(MAXANG,DELO)
         O = O + DELO
         GO TO 10
      ENDIF

      INVAL = .FALSE.
      CALL LLINXY (BPELAT,BPELON,X,Y,INVAL,INVIS,NEWONS)
c      IF (.NOT.(INVIS)) THEN
      if ((.not.invis) .and. (.not.noelpl)) then
         XX = X - 3.0
         YY = Y
         CALL JMOVE (XX,YY)
         XX = X + 3.0
         CALL JDRAW (XX,YY)
         XX = X
         YY = Y + 3.0
         CALL JMOVE (XX,YY)
         YY = Y - 3.0
         CALL JDRAW (XX,YY)
      ENDIF

      CALL FLUSHB

      RETURN
      END


C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     DRAWF
C
C FUNCTIONAL DESCRIPTION:        .
C
C CALLED BY:                     DRWFTR, FDFPRO, FTRCON, OVRCON
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE DRAWF(IFTR)

C     DRAWS A SPECIFIC MAP FEATURE
      LOGICAL QLTON(16),QDOTEM
      INTEGER QPGRID(4),QTYPTB(16)
      INTEGER QLEVEL,QITPRO,QIRES,QLUNDA,QLUNIN,QLUNLI
      REAL QXRNM,QXC,QYC,QCLAT,QCLON,QXRAD,QYRAD,QORHAL
      COMMON /MAP/ QXRNM,QXC,QYC,QLEVEL,QCLAT,QCLON,QXRAD,QYRAD,
     +    QITPRO,
     +    QIRES,QTYPTB,QLUNDA,QLUNIN,QLUNLI,QLTON,QPGRID,QDOTEM,
     +    QORHAL

      INTEGER QNMPTS,QSHADE(60)
      REAL QLATT(60),QLONN(60)
      COMMON /FILLS/ QNMPTS,QLATT,QLONN,QSHADE
```

```
      LOGICAL LTON(16)
      logical ltovsv(16)
      dimension ltypov(16)
      logical ltonov(16),rankt(26,16)
      logical pflag
      COMMON /maptoo/ ltypov,ltonov,rankt
      logical map
      common /mapdbc/ map

      logical issegm
      INTEGER SEGNO,FIRSEG
      COMMON /SEGNO/ SEGNO,FIRSEG
      INTEGER CNAME,PBOUND
      INTEGER FPTS

c** featrs is common to pltnam routine for drwing
c** area names without redrawing any boundries.

      logical featrs(16), indrwf
      COMMON /pltftr/ featrs, indrwf
      logical filply,opnply
      common /polycb/ filply,opnply

      DATA CNAME/10/,PBOUND/2/
      DATA INDRWF /.TRUE./

          if (issegm(iftr+firseg)) then
             IF (map)
     +          PRINT*,'IN DRAWF PURGING',FIRSEG+IFTR
             CALL JPURGE(FIRSEG+IFTR)
      ENDIF

      DO 50 I=1,16

         LTON(I) = QLTON(I)
         featrs(i) = QLTON(I)
         ltovsv(i) = ltonov(i)
         QLTON(I) = .FALSE.
         ltonov(i) = .false.

 50   CONTINUE

c**   temporarily turn off poly flag
      pflag = filply
      filply = .false.

      IF (IFTR .LE. 16) THEN
           QLTON(IFTR) = .TRUE.
      ELSE
           LTONOV(IFTR - 20) = .TRUE.
      ENDIF

C**   IF POLITICAL BOUNDARIES ARE BEING TURNED ON AND
C**   COUNTRY NAMES ARE ON, COUNTRY NAMES WILL BE
C**   DRAWN INSTEAD OF CONTINENT NAMES.

c       IF ((IFTR.EQ.PBOUND).AND.(LTON(CNAME))) THEN
c          IF (.NOT.(LTON(PBOUND))) THEN
c           CALL JPURGE(FIRSEG + CNAME)
c           QLTON(CNAME) = .TRUE.
c          ENDIF
c       ENDIF

C**   COUNTRY NAMES WILL ONLY BE DRAWN IF POLITICAL
C**   BOUNDARIES ARE TURNED ON.  IF POLITICAL BOUNDARIES
C**   ARE NOT ON, JUST CONTINENT NAMES WILL BE DRAWN.

c       IF ((IFTR.EQ.CNAME).AND.(LTON(PBOUND))) THEN
c           CALL JPURGE(FIRSEG + PBOUND)
c           QLTON(PBOUND) = .TRUE.
c       ENDIF

      FPTS = QNMPTS
      QNMPTS = 0
```

```
      if (issegm(firseg)) then
         call jpurge(firseg)
      endif

      CALL MAPPER (.true.)

      DO 20 I=1,16

         QLTON(I) = LTON(I)
         ltonov(i) = ltovsv(i)

20    CONTINUE

c**   turn poly flag back on

      filply = pflag

      QNMPTS = FPTS
      IF (IFTR .LE. 16) THEN
           QLTON(IFTR) = .TRUE.
      ELSE
           LTONOV(IFTR - 20) = .TRUE.
      ENDIF
      RETURN
      END

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    DRAWFT
C
C FUNCTIONAL DESCRIPTION:       .
C
C CALLED BY:                    STATEC
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine drawft
c
c     this subroutine is the draw feature state interpreter (8)
c
      common /states/ nextst
      common /indpar/ indpro,indftr
c
      call drwftr (indftr)
      nextst = 1
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    DRAWIT
C
C FUNCTIONAL DESCRIPTION:       .
C
C CALLED BY:                    DRWMAP
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE DRAWIT

C     THIS SUBROUTINE ERASES THE MAP AREA AND CALLS MAPPER

      CALL CLRGRA
      CALL MAPPER (.true.)
      CALL MAPOVR

      RETURN
      END
```

```
C+*+*+*+*+*+*+*+*+*+*+*+*+*+*+*+*+*+*+*+*+*+*+*+*+*+*+*+*+*+*+*+*+*+*+*+*+*|*+*+*+*+
C* UNIT NAME:                         drawm
C*
C* FUNCTIONAL DESCRIPTION:
C*
C*          This subroutine creates a menu segment from a segment file
C*      and/or displays that/a segment in the menu area.
C*
C*
C* INPUT FILES/PARAMETERS:
C*
C*      Global Variables
C*        qcrmnu            integer; contains the current menu number
C*        qdarry      logical array; contains flags which show if a
C*                                   particular menu segment has been
C*                                   created
C*        qmxary            integer; contains the size of the qdarry array
C*        qmnum             integer; contains the number of the current
C*                                   menu on the screen when the drawm
C*                                   subroutine is called
C*        qoldm             integer; contains the number of the previous
C*                                   menu displayed
C*
C* OUTPUT FILES/PARAMETERS:
C*
C*        values in the global variables described above
C*
C*      Screen change
C*
C*        menus will be displayed and erased by this routine
C*
C* RESTRICTIONS:
C*
C*        The value in the variable qcrmnu must be within the range of
C*      the array qdarry.
C*
C* SUBROUTINES CALLED:
C*
C*        creatm            subroutine; creates menu segments
C*
C*        mesg              subroutine; places an appropriate message
C*                                      in the communications area
C*
C* CALLED BY:                         FCFILL, PRTMEN, RESCON, RPLSCN, SUBCAL
C                                     INIPIC
C*
C* LOCAL VARIABLES:
C*
C*        no local variables
C*
C* ABNORMAL RETURN CONDITIONS:
C*
C*        A system error will occur if the value in the variable qcrmnu
C*        is not within the range of the array qdarry.
C*
C* LOCATION:
C*
C*        /u2/vcn/a21proto/drawm
C*
C* PROGRAMMER:               DATE OF LAST CHANGE:   REASON FOR CHANGE:
C*
C*  VCNewton                   15 August 1983         initial entry
C*  L. McCleary               Jan 1988             sep amp & seg - drawm
C*
C-*-*-*-*-*-*-*-*-*-*-*-*-*-*-*-*-*-*-*-*-*-*-*-*-*-*-*-*-*-*-*-*-*-*-*-*-*|*-*-*-*-

      Subroutine DRAWM (menun,ierror)

C     This subroutine creates a menu segment or makes it visible

         Integer qcrmnu,qmxary,qmnum,qoldm
         Integer qdarry(500)
         Common /b3/ qdarry,qmnum,qoldm
         Common /b6/ qcrmnu
```

```
         Common /b8/ qmxary

         ierror = 0
C        (**Ensure qcrmnu value falls within the range of the array**)
C        (**qdarry                                               **)
c         print*,'DRAWM -- enter  menun,qcrmnu,qmxary = ',menun,qcrmnu,
c     +   qmxary
         mensav = qcrmnu
         If(menun .eq. 0)menun = 1
         If ((menun .gt. 0) .and. (menun .le. qmxary)) then
C           (**Ensure a menu is displayed before turning**)
C           (**visibility off                            **)
            If (qcrmnu .gt. 0) Call JVISBL(qcrmnu,0)
c           print*,'after visible',qcrmnu

c           (**Erase menu area**)
C           call clrmen

C****** ERASE ALL HIGHLIGHTS FROM LAST MENU
C****** SINCE HIGHLIGHTS ARE NOW RETAINED SEGMENTS

            CALL CLRHIL

c           (**Erase menu area**)
            call clrmen

            If (qdarry(menun) .eq. 0) then
C              (**Create menu segment from file**)
               Call CREATM(menun,ierror)
               if (ierror.eq.0) then
C                 (**Set qdarry location to true to show a segment for**)
C                 (**that menu has been created                       **)
                  qdarry(menun)=1
               else
C                 (**If a problem was found with the new menu file,**)
C                 (**retain the old menu                           **)
                  call JVISBL(qcrmnu,1)
               endif
            Else
C              (**Display new menu if new menu's segment was already**)
C              (**created                                            **)
               Call JVISBL(menun,1)
            Endif
         Else
            ierror = 215
            print*,'Menu number',menun,' is outside range of array : ',
     +      qmxary
C           (**Execute system error process**)
            call mesg(ierror)
            call paws
         Endif
         if (ierror.eq.0) qcrmnu = menun
c         print*,'DRAWM -- exit ierror = ',ierror
      End


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       DRAWST
C
C FUNCTIONAL DESCRIPTION:          .
C
C CALLED BY:                       STATEC
C
C PROGRAMMER:                      DATE OF LAST CHANGE     REASON FOR CHANGE
c  S. Lamb                       Feb 1988                command fix - drawst
C
C-*-*-*-*-*-*-*-*-*-*-*-*-*-*-*-*-*-*-*-*-*-*-*-*-*-*-*-*-*-*-*-*-*-*-*|*-*-*-*-
c
        subroutine drawst
c
c       this subroutine is the draw state interpreter (2)
c
        common /states/ nextst
        logical sketch,majorf,minorf
```

```
      common /statel/ sketch,majorf,minorf
      logical wordis,iseoc
      logical isfeat,isincr,isdecr,isarea,iscoor
c
      initls = nextst
c     do until nextst not = initial state
100   continue
         call getwrd
         if (iseoc()) then
            nextst = 3
         else if (wordis('CURRENT').or.wordis('THE').or.
     +      wordis('ME').or.wordis('MAP')) then
c * ** *** **** ***** ****** ******* draw current map
            nextst = 3
         else if (wordis('MAJOR').or.wordis('LARGE')) then
            majorf = .true.
            nextst = 9
         else if (wordis('MINOR').or.wordis('SMALL')) then
            minorf = .true.
            nextst = 10
         else if (wordis('WHAT').or.wordis('CURRENT')) then
            nextst = 4
         else if (wordis('PROJECTION')) then
            nextst = 5
         else if (wordis('SCALE')) then
            nextst = 6
         else if (wordis('CENTER')) then
            nextst = 7
         else if (iscoor()) then
            nextst = 19
         else if (isfeat()) then
            nextst = 8
         else if (wordis('MORE')) then
            nextst = 21
         else if (wordis('LESS')) then
            nextst = 22
         else if (isincr()) then
            nextst = 23
         else if (isdecr()) then
            nextst = 24
         else if (isarea()) then
            nextst = 11
         else
            nextst = 20
         endif
      if (nextst.eq.initls) go to 100
c
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        DRCMAP
C
C FUNCTIONAL DESCRIPTION:           .
C
C CALLED BY:                        STATEC
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine drcmap
c
c     this subroutine is the draw current map state interpreter (3)
c
      common /states/ nextst
      logical sketch,majorf,minorf
      common /statel/ sketch,majorf,minorf
c
      call drwmap
      nextst = 1
c
      return
      end
```

```
C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    dricon
c
c  Functional Description:
c       this subroutine draws the icon named in the text string textst
c       with the scale in scalef (1.0 is normal).
c       This subroutine has been temporarily coded for drawing
c       only filled RECTANGLES.
c
c  Input Files/Parameters:
c       icol2 is the interior color index number
c       len is the length of textst
c
c  Output Files/Parameters: N/A
c
c  Subroutines/Functions Called:
c      Note: Subroutines preceded by a "j" are explained in the DI-3000 manual.
c
c  Called By:                    CREATM
c
c  Local Variables: N/A
c
c  Restrictions: N/A
c
c  Abnormal Return Conditions:  N/A
c
c  Location:      /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine dricon (len,textst,icol2,scalef)

c       this subroutine draws the icon named in the text string textst

        character*(*) textst

c       print*,'dricon -- enter ',len,textst(1:len),'  ',icol2,scalef

        call jpintr (1)
        call xpidex (icol2,0)
        call jrrect (3.,3.)


        return
        end

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    drlnmn
c
c  Functional Description:
c       This subroutine draws the line indicated by the device-dependent
c       linestyle in the linestyle menu.
c       This routine is a special case.
c
c  Input Files/Parameters:
c       icol2 is the device-dependent linestyle
c
c  Output Files/Parameters: N/A
c
c  Subroutines/Functions Called:
c      Note: Subroutines preceded by a "j" are explained in the DI-3000 manual.
c
c  Called By: creatm
c
c  Local Variables: N/A
c
c  Restrictions: N/A
c
c  Abnormal Return Conditions:  N/A
c
c  Location:
```

```
c
c  Programmer         Date of Last Change       Reason for Change
c
c    avw              30 May 1985               Initial entry
c
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine drlnmn (lstyl)

c       this subroutine draws the line indicated by lstyl

        integer          lstyl

c       print *, 'drlnmn -- enter - lstyl = ', lstyl

        call jlstyl (lstyl - 1)
        call jrdraw (7.5, 0.)
        call jlstyl (0)

        return
        end

C++++++++++++++++++++++++++++++++++++++++++++++++++++++++++++++++++++++++|+++++++
C UNIT NAME: droutl
C
C FUNCTIONAL DESCRIPTION:  THIS SUBROUTINE DRAWS THE EARTH OUTLINE FOR
C                               ORTHOGRAPHIC PROJECTIONS
C
C INPUT FILES/PARAMETERS:
C
C GLOBAL VARIABLES : NONE.
C
C OUTPUT FILES/PARAMETERS:  NONE.
C
C SUBROUTINES/FUNCTIONS CALLED :
C
C CALLED BY:                    NO LONGER USED BY CARICATURE
C
C LOCAL VARIABLES: NONE.
C
C RESTRICTIONS: NONE.
C
C ABNORMAL RETURN CONDITIONS:   NONE.
C
C LOCATION:
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE DROUTL(ITPRO,LONINC,LATINC,CLO,CLA)

C       THIS SUBROUTINE DRAWS THE EARTH OUTLINE FOR ORTHOGRAPHIC PROJECTIONS

        COMMON /PROJT/ IGNOMN,IORTEQ,IORTPO,IORTHO,IPERSP
        COMMON /PROJT2/ IEQREC,IMERCA,ILAMCN
        COMMON /VIEWP/ XRAD,YRAD,IXNP,IYNP,XC,YC
        COMMON /CONST/ MAXVAL,RMPV,C,R,ERNM
        COMMON /PIE/ PIE,TPIE,PIO2,PIO4
        common /comgra/xllgra,yllgra,xurgra,yurgra,ibcgra,iocgra,incgra

C ----- POLYGON INTERIOR STYLE = FILLED
        CALL JPINTR (1)

C ----- POLYGON EDGE STYLE = SAME AS INTERIOR
        CALL JPEDGE (1)

        IF (ITPRO.EQ.IGNOMN) THEN
```

```
          CX1 = -XRAD
          CY1 = -YRAD
          CX2 = XRAD
          CY2 = YRAD
          GO TO 785
      ENDIF
      IF (ITPRO.EQ.IORTPO) THEN
          if (cla .ge. 0.0) then
            CALL LLTOXY(PIO2,0.,CX,CY)
          else
            CALL LLTOXY(-PIO2,0.,CX,CY)
          endif
          CALL LLTOXY(0.,0.,RX,RY)
          GO TO 760
      ENDIF
      IF (ITPRO.EQ.IORTEQ) THEN
          CALL LLTOXY(0.,CLO,CX,CY)
          CALL LLTOXY(PIO2,0.,RX,RY)
          GO TO 760
      ENDIF
      IF (ITPRO.EQ.IORTHO) THEN
          CX = 0.
          CY = 0.
          IF (CLA.GT.0) THEN
              RCLA = CLA - PIO2
          ELSE
              RCLA = CLA + PIO2
          ENDIF
          CALL LLTOXY(RCLA,CLO,RX,RY)
          GO TO 760
      ENDIF
      IF (ITPRO.EQ.IPERSP) THEN
          CX = 0.
          CY = 0.
          RX = XRAD
          RY = 0.
          GO TO 760
      ENDIF
      IF (ITPRO.EQ.IEQREC) THEN
          APXPI = PIE - .01
          CALL LLTOXY(89.*60.*C,CLO-APXPI,CX1,CY1)
          CALL LLTOXY(-89.*60.*C,CLO+APXPI,CX2,CY2)
          GO TO 785
      ENDIF
      IF (ITPRO.EQ.IMERCA) THEN
          APXPI = PIE - .01
          CALL LLTOXY(89.*60.*C,CLO-APXPI,CX1,CY1)
          CALL LLTOXY(-89.*60.*C,CLO+APXPI,CX2,CY2)
          GO TO 785
      ENDIF
      if (itpro.eq.ilamcn) then
          apxpi = pie - .001
          call lltoxy(pio2,clo+apxpi,cx1,cy1)
          call lltoxy(-pio2,clo+apxpi,cx2,cy2)
          call lltoxy(-pio2,clo-apxpi,cx3,cy3)
          call lltoxy(pio2,clo-apxpi,cx4,cy4)
          go to 788
      endif
      GO TO 790

cccccccccccccccccccccccccccccccccccccccccccccccccccccccccccccccccccccccc
C               EXIT HERE TO DRAW A CIRCLE
  760       CONTINUE
                RAD=SQRT((CX-RX)**2+(CY-RY)**2)
                RCX=CX
                RCY=CY
c               add fudge factor, the circle needs to be a little larger
                RAD = RAD + 0.5
                CALL JCIRCL(RCX,RCY,0.,RAD,0)
cccccccccccccccccccccccccccccccccccccccccccccccccccccccccccccccccccccccc

      GO TO 790
  785 CONTINUE
C                       DRAW RECTANGLE
```

```
      CALL JRECT (CX1, CY1, CX2, CY2)
      go to 790

788   continue
c       draw wedge
      call jrect (-xrad, -yrad, xrad, yrad)
      call xcolor(iocgra)
      call jmove(cx1,cy1)
      call jdraw(cx2,cy2)
      call jdraw(cx3,cy3)
      call jdraw(cx4,cy4)

790   CONTINUE
c     draw box around graphics area in case circle has erased it
      call xcolor (iocgra)
      call jmove (xrad,yrad)
      call jdraw (xrad,-yrad)
      call jdraw (-xrad,-yrad)
      call jdraw (-xrad,yrad)
      call jdraw (xrad,yrad)

      RETURN
      END

C+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    drwamp
c
c  Functional Description:
c       draw amplification area
c
c  Input Files/Parameters:
c
c  Output Files/Parameters: N/A
c
c  Subroutines/Functions Called:
c
c  Called By:                    CERROR, DECDET, DISTAN, INCDET,
C                                MESSAG, PLTOVP, SCRDIA, GMCLOS
c
c  Local Variables: N/A
c
c  Restrictions: N/A
c
c  Abnormal Return Conditions:  N/A
c
c  Location:
c
c  Programmer       Date of Last Change     Reason for Change
C  L. McCleary      Jan 1988                separate amp & sys - drwamp
c  S. Lamb          Feb 1988                detec chg - drwamp
c
C-*-*-*-*-*-*-*-*-*-*-*-*-*-*-*-*-*-*-*-*-*-*-*-*-*-*-*-*-*-*-*-*-*-*-*|*-*-*-*-
c
     subroutine drwamp(amptxt,ampcnt)
c
c*** This routine draws the amplification area for messages
c*** to be displayed
      integer ampcnt
      character*72 amptxt(4),line

c      common/comwdo/qcxmn,qcymn,qcxmx,qcymx
c      real qcxmn,qcymn,qcxmx,qcymx
      common/ampwdo/qaxmn,qaymn,qaxmx,qaymx
      real qaxmn,qaymn,qaxmx,qaymx

      common /comcvp/ xllcvp,yllcvp,xurcvp,yurcvp
      common /compic/xllpic,yllpic,xurpic,yurpic
      common /comamp/xllamp,yllamp,xuramp,yuramp,ibcamp,iocamp,incamp
      common /amfrst/ amfrst
      logical amfrst
      real xpos,ypos
      common/ampprm/ampseg,ampsgb
      integer ampseg,ampsgb
```

```
      integer dstsg1,dstsg2,dstsg3
      logical dstfst
      common/mrkseg/dstsg1,dstsg2,dstsg3,dstfst
      logical square
      common /sqrdbc/ square
      common/oneflg/oneflg
      logical oneflg

c      print*,'drwamp ---enter',amptxt(1)

C     call comvpt
C     call comwin
      call ampvpt
      call ampwin

c      xllpic=qcxmn+13.
c      yllpic=qcymn+.5
c      xurpic=qcxmx-13.
c      yurpic=qcymx-3.
      xllpic=qaxmn
      yllpic=qaymn
      xurpic=qaxmx
      yurpic=qaymx
c
c      print*,'xllpic ---',xllpic
c      print*,'yllpic ---',yllpic
c      print*,'xurpic ---',xurpic
c      print*,'yurpic ---',yurpic

      if (.not. amfrst)call jpurge(ampseg)

      if(amfrst)then
c          print*,'drwamp --- amfrst being set to false'
          amfrst = .false.
          call getseg(ampseg)
          call getseg(ampsgb)
c
          call jropen(ampsgb)
          call jpkid(0)
          call jpintr (1)
          call xpidex(ibcamp,0)
c
c      print*,'drwamp ampseg-- ',ampseg
c
          if(oneflg)then
                  call enall
                  call xcolor(3)
          else
c                  call xcolor(24)
                  call xcolor(iocamp)
          endif
c
          call jrect(xllpic,yllpic,xurpic,yurpic)
          call jrclos
      else
          call jvisbl(ampsgb,0)
          call jvisbl(ampsgb,1)
      endif
c
      call jropen(ampseg)
      call jpkid(1)
      if (ampcnt.eq.0) go to 100
      if(oneflg)then
              call enall
              call xcolor(3)
      else
c              call xcolor(24)
              call xcolor(iocamp)
      endif
      call jfont(1)
      IF (.not. square) call jsize(2.,2.)
      CALL XSIZE(1.0,1.0)
      call jbase(1.0,0.0,0.0)
      call jplane(0.0,1.0,0.0)
```

```
      call jpath(1)
      call jjust(1,1)
c
      xpos = xllpic + 1.
c      ypos = yurpic - (yurpic - yllpic)/(ampcnt+1.)
      ypos = yurpic - 1.0

c      print*,'xpos ---',xpos
c      print*,'ypos ---',ypos

      call lngth(amptxt(1),72,length)
c      print*,'length of amptxt1 ',length
      call jmove(xpos,ypos)
c
      line = amptxt(1)
      call j1strg(line(1:length))
c
      if(ampcnt .gt. 1) call putamp(amptxt,ampcnt)
      if(.not.(oneflg))call soverl
c
c      print*,'drwamp --- exit'

 100  continue
      call jrclos
      call jdetec(ampseg, 1)
      return
      end

C+*+*+*+*+*+*+*+*+*+*+*+*+*+*+*+*+*+*+*+*+*+*+*+*+*+*+*+*+*+*+*+*+*+*|*+*+*+*+
C UNIT NAME:                     DRWFTR
C
C FUNCTIONAL DESCRIPTION:        .
C
C CALLED BY:                     DRAWFT, ERASES, REMOVF
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*|*-*-*-*-

      subroutine drwftr (if)
      call drawf (if)
      return
      end

C+*+*+*+*+*+*+*+*+*+*+*+*+*+*+*+*+*+*+*+*+*+*+*+*+*+*+*+*+*+*+*+*+*+*|*+*+*+*+
C UNIT NAME:                     DRWICN
C
C FUNCTIONAL DESCRIPTION:        .
C
C CALLED BY:                     GETICN
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*|*-*-*-*-

      subroutine drwicn(filcol,outcol)

c     This routine is the same as the drawic routine used by the
c       Icon Editor, except for option 10 which is the fill
c       option for the entire icon.  Each line of the opened
c       file is read and the appropriate routine is called based
c       on the contents of the first position.  The array read
c       in is passed to the routine and that routine will read
c       any other lines which are needed for that line, etc.
c       to be drawn, so that this routine will always read the
c       first line of the next item to be drawn.
c     VARIABLES:
c      iarray- array to hold the points read in from the file
c      filcol - index of color to be used for fill
c      outcol- index of outline color--used for regular fills
c  CALLS:    apline apcirc aprect apfill apmark apsmoo aptext aparcs
c  PROGRAMMER:  Nancy Detrich, A215, March, 1984
```

```
      integer iarray(26,100)
      character*40 ictarr(100)
      common /iconda/ lenica,iarray,ictarr
      integer filcol,outcol
      logical sys,fill
      common /sysdbc/ sys
      common /fildbc/ fill
      if (sys) then
         print*,'DRWICN -- enter ',lenica
      endif

      if (lenica.gt.0) then
       do 120 i=1,lenica

c        iarray(i,1) holds the code indicating how the coordinates
c          are to be interpreted--call appropriate routine and
c          pass iarray and a flag to indicate if a line is to be
c          written out to the '.conv' file

         if      (iarray(1,i).eq.1) then
           call apline  (iarray(1,i),.false.)
         else if (iarray(1,i).eq.2) then
           call apcirc  (iarray(1,i),.false.)
         else if (iarray(1,i).eq.3) then
           call aprect  (iarray(1,i),.false.)
         else if (iarray(1,i).eq.4) then
           if (fill) then
               call apfill  (iarray(1,i),.false.,outcol)
           endif
         else if (iarray(1,i).eq.5) then
           call apmark  (iarray(1,i),.false.)
         else if (iarray(1,i).eq.6) then
           call apsmoo  (iarray(1,i),.false.)
         else if (iarray(1,i).eq.7) then
           call aptext  (iarray(1,i),.false.,ictarr(i),nchars)
         else if (iarray(1,i).eq.8) then
           call aparcs  (iarray(1,i),.false.)
         else if (iarray(1,i).eq.9) then
           call xcolor(iarray(2,i))
         else if (iarray(1,i).eq.10) then
c          check that a fill is to be performed
           if (filcol .ne. 0) then
c            for the prototype, call xcolor
             if (fill) then
                 call apfill(iarray(1,i),.false.,filcol)
             endif
           endif
         else
c            ignore unidentified lines
         endif
 120   continue
      endif
      if (sys) then
         print*,'DRWICN -- exit '
      endif

      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     DRWLOB
C
C FUNCTIONAL DESCRIPTION:        .
C
C CALLED BY:                     PLOTOV
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine drwlob (blat,blon,bazi,digrph,xrnm,itproj,iacept)
c
c     this subroutine draws a line of bearing on the current map
```

```
c
        character*2 digrph
        integer iacept

c ----- rlenth = length of 90 degrees in radians
        data rlenth/1.5708/

c ----- ernm = radius of earth in nautical miles
        data ernm/3440.34/

c ----- steps = no. of increments of bearing to put in half
c ----- a screen width
        data steps/20/

c ----- xrnm = radius of map in nautical miles

c       print*,'drwlob -- enter ',xrnm,blat,blon,bazi
c
        if (iacept.eq.1) then
            steps = 20.
        else
            steps = 60.
        endif

c ----- calculate length of increments in radians
        rinc = xrnm / (ernm*steps)

        call plotit(blat,blon,digrph,bazi,rlenth,rinc,xrnm,
     +              itproj,iacept)

c       print*,'drwlob -- Exit'
c
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        DRWMAP
C
C FUNCTIONAL DESCRIPTION:           .
C
C CALLED BY:                        CHECK, DRCMAP, FCHSCA, FMAIN, FSHOWA,
C                                   HLDF,  PROCON, RECDIS, RESCON,FDFPRO, GEOCON
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        subroutine drwmap

c       this subroutine draws the current map

        logical qmapup
        common /mapup/qmapup

        logical sys
        common /sysdbc/ sys

        call eramap
        qmapup = .true.
        call segmap
        if (sys)  print*,'drwmap ',iseg
        call drawit

        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        DSPFLN
C
C FUNCTIONAL DESCRIPTION:           .
C
C CALLED BY:
```

```
C
C PROGRAMMER:                        DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine dspfln( name )

clj --- The real version of this file is used in CELEBRATION.  It displays,
clj --- in the communications area, the name of the picture which is currently
clj --- being viewed.

      character *50 name

      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        DWTEXT
C
C FUNCTIONAL DESCRIPTION:           .
C
C CALLED BY:                        APTEXT
C
C PROGRAMMER:                        DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine dwtext(style,nchars,retstr)

c       this routine sets the font and calls the DI-3000 routine to
c        draw the text in the quality desired based on the
c        style passed by the calling routine.
c    VARIABLES:
c       retstr- text string to be displayed
c       nchars- number of characters in the text string
c       style- indicates the font selected by the user
c   PROGRAMMER:  Nancy Detrich, A215, March, 1984

      character*80 retstr
      integer style,nchars

      if (style .eq. 1) then
        call jfont(1)
        call j3strg(retstr(1:nchars))
      elseif (style .eq. 2) then
        call jfont(2)
        call j3strg(retstr(1:nchars))
      elseif (style .eq. 3) then
        call jfont(5)
        call jhstrg(retstr(1:nchars))
      elseif (style .eq. 4) then
        call jfont(6)
        call jhstrg(retstr(1:nchars))
      elseif (style .eq. 5) then
        call jfont(7)
        call jhstrg(retstr(1:nchars))
      endif

      return
      end

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                      echps
c
c  Functional Description:
c       set keyboard echo position
c
c  Input Files/Parameters:
c
c  Output Files/Parameters: N/A
c
c  Subroutines/Functions Called:
```

```
c      Note: Subroutines preceded by a "j" are explained in the DI-3000 manual.
c
c  Called By:                        MESGJF
c
c  Local Variables: N/A
c
c  Restrictions: N/A
c
c  Abnormal Return Conditions:  N/A
c
c  Location:       /a21/dave
c
c  Programmer         Date of Last Change        Reason for Change
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine echps (xpos,ypos)
c
c       set keyboard echo position
c
        call jconwv(xpos,ypos,z,vx,vy)
        call jpecho(1,4,1,vx,vy)
c
        return
        end


C+*+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                     ENALL
c
c  Functional Description:        Utility to set write mask to the viewing
c                                 planes.  Sets mask for all planes.
c
c  Input Files/Parameters:        N/A
c
c  Output Files/Parameters:       N/A
c
c  Called By:                     CLRBVP, CLRCOM, CLRFUL, CLRGRA, CLRVPT,
C                                 DRWAMP, FCFILL, GLTYPE, INIPIC
C                                 MAPPER, RECDIS, RESCON
c
c  Local Variables:
c    code        integer          escape code number
c    ilist       integer          array of integer parameters
c    ninteg      integer          number of integer parameters
c    nreal       integer          number of real paramenters
c    rlist       real             array of real parameters
c
c  Restrictions:                  N/A
c
c  Subroutines/Functions Called:          N/A
c
c  Abnormal Return Conditions:            N/A
c
c  Location:                              /ul/a21/bap/sbakovr.f
c
c  Programmer: Brian A. Pelletier
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE ENALL

c     set write mask to the viewing planes.  Sets mask for all planes.

        integer code, ninteg, nreal, ilist(1)
        real rlist(1)
        data code, ninteg, nreal/5127, 1, 0/
        data ilist(1)/255/
        call jescap(code, ninteg, nreal, ilist, rlist)
      return
      end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
```

```
c  UNIT NAME:                    eramap
c
c  Functional Description:
c       clear amplification area
c
c  Input Files/Parameters:
c
c  Output Files/Parameters: N/A
c
c  Subroutines/Functions Called:
c
c  Called By:                    DRWAMP, ERASEM, RECDIS, RESCON, RPLSCN,
C                                GEOCON
c
c  Local Variables: N/A
c
c  Restrictions: N/A
c
c  Abnormal Return Conditions:   N/A
c
c  Location:
c
c  Programmer       Date of Last Change      Reason for Change
C  L. McCleary      Jan 1988                separate amp & sys - eramap
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine eramap

c      erase map

       logical lton(16),dotem,savprt
       integer ipgrid(4),ltyptb(16)
       common /map/ XRNM,XC,YC,LEVEL,CLAT,CLON,XRAD,YRAD,ITPROJ,
     +     IRES,LTYPTB,LUNDAT,LUNIND,LUNLIN,LTON,IPGRID,DOTEM,
     +     ORHALT
       common /qprint/ qprint
       logical qprint
       logical savgrd
       data lcgrid /16/

c      since inipic turns grids off for celebration purposes,
c      mapgraph wants to save the current state of grids.

       savgrd = lton(lcgrid)
       savprt = qprint
       call inipic
       lton(lcgrid) = savgrd
       qprint = savprt
       call eratrk
       call drwamp(' ',0)

       return
       end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    ERASEM
C
C FUNCTIONAL DESCRIPTION:       .
C
C CALLED BY:                    STATEC
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

       subroutine erasem
c
c      this subroutine is the erase map state interpreter (14)
c
       common /states/ nextst
c
       call eramap
```

```
        call legend (.true.)
        nextst = 1
c
        return
        end


C+*+*+*+*+*+*+*+*+*+*+*+*+*+*+*+*+*+*+*+*+*+*+*+*+*+*+*+*+*+*+*+*+*+*|*+*+*+*+
C UNIT NAME:                    ERASES
C
C FUNCTIONAL DESCRIPTION:       .
C
C CALLED BY:                    STATEC
C
C PROGRAMMER:                   DATE OF LAST CHANGE     REASON FOR CHANGE
c  S. Lamb                     Feb 1988                command fix - erases
C
C-*-*-*-*-*-*-*-*-*-*-*-*-*-*-*-*-*-*-*-*-*-*-*-*-*-*-*-*-*-*-*-*-*-*-*|*-*-*-*-
c
        subroutine erases
c
c       this subroutine is the erase state interpreter (25)
c
        common /states/ nextst
        logical wordis,iseoc
        common /indpar/ indpro,indftr
        logical isfeat
c
        initls = nextst
c       do until nextst not = initial state
  100   continue
            call getwrd
            if (wordis('MAP').or.wordis('THE').or.wordis('CURRENT')
     +          .or.wordis('EVERYTHING') .or. iseoc()) then
c * ** *** **** ***** ****** ******* erase map
                nextst = 14
            else if (isfeat()) then
c               change feature's color to background color
                call drwftr (indftr)
c               change color back
                nextst = 1
            else
                call putwrd
                nextst = 14
            endif
        if (nextst.eq.initls) go to 100
c
        return
        end


C+*+*+*+*+*+*+*+*+*+*+*+*+*+*+*+*+*+*+*+*+*+*+*+*+*+*+*+*+*+*+*+*+*+*|*+*+*+*+
C UNIT NAME:                    ERATRK
C
C FUNCTIONAL DESCRIPTION:       .
C
C CALLED BY:                    ERAMAP
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        subroutine eratrk

c this routine purges the tracking segments currently active
c programmer: avw

        integer*4     i
        integer*4     numrcs
        integer*4     tkoset
        integer*4     trkndx (1000)

        logical       trackn
        logical       segact (1000)
```

```
        common /trkdbc/   trackn
        common /numrcs/   numrcs
        common /segact/   segact
        common /tkoset/   tkoset
        common /trkndx/   trkndx

        if (trackn)  print *, 'enter eratrk'

        do 10 i = 1, numrcs
           if (segact(i)) then
              call jpurge (trkndx(i)+tkoset)
              segact(i) = .false.
           end if
   10   continue
c
        if (trackn) print *, 'exit eratrk'

        return
        end


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    EXECUT
C
C FUNCTIONAL DESCRIPTION:       .
C
C CALLED BY:                    STATEC
C
C PROGRAMMER:                   DATE OF LAST CHANGE     REASON FOR CHANGE
c  S. Lamb                    Feb 1988                  command fix - execut
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine execut
c
c       this subroutine is the execute state interpreter (27)
c
        common /states/ nextst
        logical eol,eoc
        common /comnds/ lenl,indxw,lenw,eol,eoc
        logical wordis,iseoc
c
        initls = nextst
c       do until nextst not = initial state
  100   continue
           call getwrd
           if (wordis('COMMAND').or.wordis('FILE').or.wordis(':'))
     +        then
c * ** *** **** ***** ****** ******* not understood / implem
              nextst = 15
           else if (iseoc()) then
c             prompt for filename
              nextst = 1
           else
c             put word into filename
              nextst = 1
           endif
        if (nextst.eq.initls) go to 100
        if (lenfn.gt.0) then
c          open file using default path
c          if error, putwrd, msg
c          else cmdfil = .true.
        endif
c
        return
        end


C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                   FACT
c
c  Functional Description:      Function to return the factorial of an
c                               integer.
c
c  Input Files/Parameters:
```

```
c       n                           integer   number to be calculated
c
c  Output Files/Parameters:     N/A
c       fact                        real      factorial
c
c  Subroutines/Functions Called: N/A
c
c  Called By:  ICBEZ
c
c  Local Variables:
c       n                           integer   number to be calculated
c
c  Restrictions:                N/A
c
c  Abnormal Return Conditions:  N/A
c
c  Location:      stepc03       /w3/ssb/prototype/arrows/fact.f
c
c  Programmer         Date of Last Change       Reason for Change
c     ssb                 10/31/83               initial entry
c     ssb                  3/06/84               completion
c
C-*-*-*-*-*-*-*-*-*-*-*-*-*-*-*-*-*-*-*-*-*-*-*-*-*-*-*-*-*-*-*-*-*-*-*-*-*|*-*-*-*-

       real function fact(n)

c      Function to return the factorial of an integer.

c     **********************************************************
c     * this function uses real numbers rather than integers in
c     * order to avoid overflow for larger values -- limit is 33!
c     **********************************************************
      if (n.lt.0) then
c        print *,'ERROR--input to factorial is negative--n=',n
        fact=1.
      else
        if (n.eq.0) then
          fact=1.
        else
          fact=1.
          do 5 i=1,n
            fact=fact*i
 5        continue
        endif
      endif
      return
      end


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     FADBOX
C
C FUNCTIONAL DESCRIPTION:        .
C
C CALLED BY:                     SETFAD, TIMCHK
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

       subroutine fadbox(dtg)

c     this routine controls visibility of the boxes when the fade time
c     is changed (jit).

      character*9 dtg
      integer segnum

      integer trkndx(1000)
      character*160  trkrec(1000)
      logical spprsd(1000)
      integer lctrak

      character*2 actmrk(260)
```

```
      integer mrkcnt
      integer trklst(260)
      integer curseg(260)
      character*9 boxdtg(260)
      logical boxvis(260)

      integer ltypov(16)
      logical ltonov(16), rankt(26,16)

      common /actmrk/ trklst,mrkcnt,actmrk,curseg,
     +                boxdtg,boxvis
      common /trkndx/ trkndx
      common /trkrec/ trkrec
      common /spprsd/ spprsd
      common /maptoo/ ltypov, ltonov, rankt

      data lctrak /3/

      do 10 i = 1, mrkcnt
         segnum = curseg(i)
c
c        if box in position i of the array is older than the dtg for
c        the oldest possible non-faded box, then make that box invisible.
c
         if (boxdtg(i) .lt. dtg) then
           if (boxvis(i)) then
               call jvisbl(segnum,0)
             boxvis(i) = .false.
           endif
         else
c
c          if the box at this position has a more recent dtg than the dtg
c          for the oldest possible non-faded box then make that box visible
c          as long as the plot with that box is not suppressed.
c
           if (.not. boxvis(i)) then
              j = 1
 100          if (trkrec(trkndx(j))(22:30) .eq. boxdtg(i)) goto 110
              j = j + 1
              goto 100
 110          continue
              if (.not. spprsd(trkndx(j))) then
                 if (ltonov(lctrak)) then
                    call jvisbl(segnum,1)
                 endif
                 boxvis(i) = .true.
              endif
           endif

         endif

  10  continue

      return

      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    FADCHG
C
C FUNCTIONAL DESCRIPTION:       .
C
C CALLED BY:                    SETFAD, TRKINI
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine fadchg (dtg)

c
c     this subroutine sets the fade dtg and the fade index based
c     upon the fade time given
```

```
c
      character*9 dtg
      character*9 curdtg
      integer*2 newtim(6)
      integer yrsub
      integer monsub
      integer daysub
      integer hrsub
      integer minsub
      integer juldat
      integer yr, mon, day
      integer hour, min

      data yrsub  /1/
      data monsub /2/
      data daysub /3/
      data hrsub  /4/
      data minsub /5/

c
c***  newtim is returned in int(6) format where
c***  year =  newtim(1)
c***  month = newtim(2)
c***  day   = newtim(3)
c***  hour  = newtim(4)
c***  minute= newtim(5)
c***  newtim(6) = seconds (not used)
c
      call gettim(newtim)
      yr =   newtim(yrsub)
      mon =  newtim(monsub)
      day =  newtim(daysub)
      hour = newtim(hrsub)
      min  = newtim(minsub)
c
c***  convert yr/mon/day to julian date
c
      call julian(yr,mon,day,juldat)
c
c***  express curdtg in character format as yydddhhmm
c
      call chdate (yr,juldat,hour,min,curdtg)
c
c***  reset fade dtg global based upon new fade time in minutes -tfadtm
c
      call fadtim(curdtg,dtg)

      return
      end


C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    FADTIM
C
C FUNCTIONAL DESCRIPTION:       .
C
C CALLED BY:                    FADCHG, TIMCHK
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine fadtim(curdtg, lasdtg)
c
c  calculate the oldest dtg that a track can have and still be displayed
c  dtg is in yydddhhmm format
c  this is done by subtracting the current fade time (tfadtm) from the
c  current clock time (curdtg).
c  RESTRICTION:  fade time is expressed in hh:mm and cannot exceed 36:00
c
      character*9 curdtg
      character*9 lasdtg
      integer curyr, curday, curhr, curmin
```

```
      integer lasyr, lasday, lashr, lasmin
      integer cnthr
      integer cntday
      integer tfaddx
      integer tfadtm
      common /tfadez/ tfaddx, tfadtm

      read(curdtg,10,err=100) curyr, curday, curhr, curmin
 10   format(i2,i3,i2,i2)

c     initialize all date variables to current date/time

      lasyr = curyr
      lasday = curday
      lashr = curhr
      lasmin = curmin

c     find last minute for display list

      lasmin = curmin - tfadtm
      if (lasmin .lt. 0 .or. tfadtm .ge. 60) then
          if (mod(abs(lasmin),60) .eq. 0) then
               lasmin = 0
          else
               lasmin = 60 - mod(abs(lasmin),60)
          endif

c         next, find last hour for display list if diff

          cnthr = tfadtm / 60
cc          if (mod(tfadtm,60) .ne. 0) then
cc               cnthr = cnthr + 1
cc          endif
          if (lasmin .gt. curmin) then
               cnthr = cnthr + 1
          endif
          lashr = lashr - cnthr
          if (lashr .lt. 0) then
               if(mod(abs(lashr),24) .eq. 0) then
                  lashr = 0
               else
                  lashr = 24 - mod(abs(lashr),24)
               endif

c              third find the julian day of the year if diff

               cntday = tfadtm / 1440
               if (mod(tfadtm,1440) .ne. 0) then
                  cntday = cntday + 1
               endif
               lasday = curday - cntday
               if (lasday .lt. 1) then

c                 fourth, set the year if different

                  lasyr = curyr - 1
                  if ((mod(lasyr,4) .eq. 0) .and.
     +               ((mod(lasyr,100) .ne. 0) .or.
     +                (mod(lasyr,400) .eq. 0))) then
                        lasday = 366
                  else
                        lasday = 365
                  endif
               endif
          endif
      endif

c     express lasdtg in character format

      call chdate(lasyr,lasday,lashr,lasmin,lasdtg)
      goto 200
 100  print*,'error in fadtim read'
 200  continue
```

```
      return
      end

C+++++++++++++++++++++++++++++++++++++++++++++++++++++++++++++++++|+++++++
C UNIT NAME:                    FANNOT
C
C FUNCTIONAL DESCRIPTION:       .
C
C CALLED BY:                    GEOCON
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*|*-*-*-*-

        subroutine fannot

c       annotote function
        character * 80 retstr

        irchar = 80
        retstr = '                             '
        CALL PROMPT(1206,retstr,80,irchar)
        if (irchar.gt.0) then
           call mesg(1207)
           call annota (retstr,irchar)
        endif

        return
        end

C+++++++++++++++++++++++++++++++++++++++++++++++++++++++++++++++++|+++++++
c  UNIT NAME:                  FCFILL
c
c  Functional Description:
c       Color area fill function
c
c  Input Files/Parameters:
c
c  Output Files/Parameters:
c
c  Subroutines/Functions Called:
c      mesg                    displays messages in the communica-
c                               tions area
C
C  CALLED BY:                  GEOCON
c
c  Programmer          Date of Last Change       Reason for Change
c  L McCleary          Jan 1988             check for CANCEL - fcfill
c  L McCleary          Jan 1988          bkgrd investigation - fcfill
c
C-*-*-*-*-*-*-*-*-*-*-*-*-*-*-*-*-*-*-*-*-*-*-*-*-*-*-*-*-*-*-*-*-*|*-*-*-*-

        subroutine fcfill

c       Color area fill function

        common /b1/ qcancl,qext2m,qretrn,qstmnu,qnextm
        integer qnextm,hltab(34),ihllen
        logical qcancl,qext2m,qretrn,qstmnu
        common /b5/ qexitg
        logical qexitg
        logical bxclr
        common /bxcdbc/ bxclr
        common /defpth/ defpth
        character*50 defpth
        common /lendef/ lendef
        logical renew
        common /scratr/ qbox,qbkgrd
        integer qbox,qbkgrd
        integer button,icol

        integer qfb(26),qmb(4)
```

```
      common /butons/ qfb,qmb
      logical qlton(16),qdotem
      integer qpgrid(4),qtyptb(16)
      integer qlevel,qitpro,qires,qlunda,qlunin,qlunli
      real qxrnm,qxc,qyc,qclat,qclon,qxrad,qyrad,qorhal
      common /map/ qxrnm,qxc,qyc,qlevel,qclat,QCLON,QXRAD,QYRAD,
     +   qitpro,qires,qtyptb,qlunda,qlunin,qlunli,qlton,qpgrid,
     +   qdotem,qorhal

      data ihllen /34/

              if (bxclr) call enall
              qretrn = .false.
              qext2m = .false.
              qcancl = .false.
c              qbkgrd = qtyptb(8)
              call drawm(29,ierror)
              if (bxclr) call soverl
20            continue
                  call colbak
              if (.not.(qcancl.or.qext2m.or.qretrn)) goto 20
              qretrn = .false.
              if (bxclr) call enall
              call drawm(2,ierror)
              if (bxclr) call soverl
              call hilite(.true.,ichoic,1,ihllen,hltab)
              call mesg (1232)
              renew = .true.
              icol = qbkgrd
30            continue
                  call locat(button,vx,vy)
c                  if (button.eq.8) goto 40
                  if (button.eq.8.or.button.eq.qmb(3)) goto 40
                  call enall
                  call jfillv(5126,icol,vx,vy,renew)
                  call soverl
                  if (renew) renew = .false.
              goto 30
40            continue

      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: fdrawv
C
C FUNCTIONAL DESCRIPTION:  DRAWS A VECTOR FROM THE CURRENT GRAPHICS CURSOR
C                           LOCATION TO (X, Y)
C
C INPUT FILES/PARAMETERS:
C
C GLOBAL VARIABLES : NONE.
C
C OUTPUT FILES/PARAMETERS:  NONE.
C
C SUBROUTINES/FUNCTIONS CALLED :
C
C CALLED BY:                    FLUSHB, FPOSIT, PLOTIT, PROCPO
C
C LOCAL VARIABLES: NONE.
C
C RESTRICTIONS: NONE.
C
C ABNORMAL RETURN CONDITIONS:   NONE.
C
C LOCATION:
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C     Edward Swing              10--86                  Fixed wrap-around lines
```

```
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE FDRAWV (X,Y)

C     DRAWS A VECTOR FROM THE CURRENT GRAPHICS CURSOR LOCATION TO (X,Y)

      COMMON /PIE/ PIE,TPIE,PIO2,PIO4
      common /gmpos/ gmxpos,gmypos
      LOGICAL PSLAST
      COMMON /PSLAST/ PSLAST,XPOS,YPOS
      LOGICAL SAVEXY,xgto,xpgto
      COMMON /STMSGS/ XPREV,YPREV,IRESSQ,XSAV,YSAV,SAVEXY
      COMMON /VIEWP/ XRAD,YRAD,IXNP,IYNP,XC,YC
c     map parameters
      logical lton(16),dotem
      integer ipgrid(4),ltyptb(16)
      common /map/ XRNM,XCA,YCA,LEVEL,CLAT,CLON,XRADA,YRADA,ITPROJ,
     +    IRES,LTYPTB,LUNDAT,LUNIND,LUNLIN,LTON,IPGRID,DOTEM,
     +    ORHALT
c     the next declarations added for polyline processing
      real xpoly(500),ypoly(500)
      real tmplat,tmplon, dellat,dellon
      common /poly/ xpoly,ypoly
      common /inpoly/inpoly
      COMMON /PROJT/ IGNOMN,IORTEQ,IORTPO,IORTHO,IPERSP
      COMMON /PROJT2/ IEQREC,IMERCA,ILAMCN
      COMMON /COUNTS/ ICNTGP,ICNTDV,icntpl
      real epsilon,circum
      real dxr,dpxr, tmpx,tmpprvx
      data epsilon /0.001/
      data mxpoly/500/

      SAVEXY=.FALSE.
      XVEC=X-XPREV
      YVEC=Y-YPREV
C     THIS CODE IS NECESSARY TO RESOLVE THE LONG VECTOR PROBLEM WITH
C     RECTANGULAR PROJECTIONS

      call sgn(x,xgto)
      call sgn(xprev,xpgto)
      IF (xgto.neqv.xpgto) then
        if ((itproj.eq.ieqrec).or.(itproj.eq.imerca)
     +                     .or.(xvec.gt.xrad)) then
          call xytoll(x,y,trlat,trlon)
          call xytoll(xprev,yprev,prvlat,prvlon)
          dxr=abs(trlon-clon)
          dpxr=abs(prvlon-clon)
          if (dxr.gt.pie) then
              dxr = tpie - dxr
          endif
          if (dpxr.gt.pie) then
              dpxr = tpie - dpxr
          endif
c   This code checks if the line is larger than halfway around the globe
c   If so, this section draws the opposite line segment - the shorter one
          if (dxr+dpxr.gt.pie) then
              call lltoxy(0.,0.,tmplat,tmplon)
              call lltoxy(.1,.1,dellat,dellon)
              dellon = abs(dellon - tmplon)
              circum = dellon*tpie/.1
              if (x.gt.0.) then
                tmpx = x - circum
                tmpprvx = xprev + circum
              else
                tmpx = x + circum
                tmpprvx = xprev - circum
              endif
              if (pslast) then
                pslast = .false.
              else
                icntdv = icntdv + 1
                inpoly = inpoly + 1
                xpoly (inpoly) = tmpx
```

```
                ypoly (inpoly) = y
              endif
              call flpoly
              call jmove(x,y)
              icntgp = icntgp + 1
              gmxpos = xpos
              gmypos = ypos
          endif
        elseif ((yvec.gt.yrad).or.(xvec.gt.xrad)) then
          call fposit(x,y)
        endif
      endif
      IF (PSLAST) THEN
          PSLAST = .FALSE.
c         move to new location before continuing to draw
c         flush the polyline buffer and place new starting
c         coordinates into the arrays
          call flpoly
          CALL JMOVE (XPOS,YPOS)
          icntgp = icntgp + 1
          gmxpos = xpos
          gmypos = ypos
      endif
      IF(XVEC*XVEC+YVEC*YVEC.LE.IRESSQ) THEN
          XSAV=X
          YSAV=Y
          SAVEXY=.TRUE.
      ELSE
          icntdv = icntdv + 1
c         place values into polyline buffers
          inpoly = inpoly + 1
          xpoly (inpoly) = x
          ypoly (inpoly) = y
          if ( inpoly .eq. mxpoly ) then
              call flpoly
              gmxpos = x
              gmypos = y
          endif
          XPREV=X
          YPREV=Y
      ENDIF

      RETURN
      END

C+*+*+*+*+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: FILLIT
C
C FUNCTIONAL DESCRIPTION:  FILLS BODIES OF WATER ON THE CURRENT MAP.
C
C INPUT FILES/PARAMETERS:
C
C        ICOL                   INTEGER     COLOR.
C        XRNM                   REAL        NAUTICAL MILE RADIUS.
C        LEVEL                  INTEGER     LEVEL OF DETAIL OF WATER
C                                           FEATURES.
C
C GLOBAL VARIABLES :
C
C        LENMAP                 INTEGER     LENGTH OF FILL PATHNAME.
C        MAPATH                 CHAR*50     MAP DATA PATHNAME.
C
C OUTPUT FILES/PARAMETERS:  NONE.
C
C SUBROUTINES/FUNCTIONS CALLED :
C
C        INVTES                 TESTS LAT/LONG PAIR FOR INVISIBILITY.
C        FILLPT                 COLORS POINT X,Y.
C
C CALLED BY: DMAPII.
C
C LOCAL VARIABLES:
C
```

```
C         ISINV              LOGICAL     INDICATES INVISIBILITY.
C         IFL                INTEGER     LOGICAL UNIT NUMBER FOR
C                                        FILL FILE.
C         CHATMP             CHAR*50     FULL PATHNAME.
C         XRV                REAL        XRNM*.8
C         RLAT               REAL        LATITUDE OF FILL POINT.
C         RLON               REAL        LONGITUDE OF FILL POINT.
C         XRN                REAL        DIAMETER OF BODY OF WATER.
C         ITYP               INTEGER     TYPE OF BODY OF WATER.
C         LEVL               INTEGER     LEVEL OF DETAIL.
C         renew              logical     indicates whether this is the first
C                                        point in a series
C
C RESTRICTIONS: NONE.
C
C ABNORMAL RETURN CONDITIONS:    NONE.
C
C LOCATION:                      /a21/gjf/MAPSRC.FTN
C
C PROGRAMMER:                    DATE OF LAST CHANGE     REASON FOR CHANGE
C
C     DAVE NATION                                        ORIGINAL CODE.
C     JERRY FENERTY                                      DOCUMENT AND MODIFY
C                                                        FOR A21 PROTOTYPE.
C     Dave Nation                5/6/85                  Change fill path name
C                                                        from defpth to mapath
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE FILLIT (ICOL,XRNM,LEVEL)

C     THIS SUBROUTINE READS THE FILL FILE AND FILLS BODIES OF WATER
C     ON THE CURRENT MAP

C     INPUT PARAMETERS:
C       ICOL - COLOR INDEX VALUE TO USE AS FILL COLOR
C       XRNM - 1/2 THE WIDTH OF THE CURRENTLY DISPLAYED MAP IN
C               NAUTICAL MILES (X RADIUS)
C       LEVEL - CURRENT LEVEL OF DETAIL FOR INCLUSION OF GEOGRAPHIC
C               FEATURES (1=LEAST DETAIL, 15=MOST DETAIL)

C     SUBROUTINES CALLED:
C       INVTES - TESTS A LAT/LON PAIR FOR INVISIBILITY (ON OPPOSITE
C                SIDE OF GLOBE) FOR CIRCULAR PROJECTIONS
C       FILLPT - FILLS USING A SELECTED LAT/LON PAIR WITH COLOR ICOL


      logical renew
      CHARACTER*50 CHATMP
      character*50 mapath
      common /mapath/ mapath
      common /lenmap/ lenmap
      LOGICAL ISINV
      logical interr
      common /interr/ interr
      character ch
      DATA IFL/15/

      if(lenmap .gt. 0) then
         chatmp = mapath(1:lenmap) // 'FILL.dat'
      else
         chatmp = 'FILL.dat'
      endif
C
      OPEN(UNIT=IFL,FILE=CHATMP(1:LENMAP+8),err=181,
     +                              STATUS='UNKNOWN')
C
      REWIND(IFL)
      XRV = XRNM*.8
      renew = .true.
  100 CONTINUE
```

```
      call chint (interr,ch)
      if (interr) go to 190
      READ (IFL,10100,END=190,ERR=180) RLAT,RLON,XRN,ITYP,LEVL
     +     ,ITPRO
10100 FORMAT(2F11.7,F10.0,3I5)
      CALL INVTES (RLAT,RLON,ISINV)
      IF (.NOT.ISINV) THEN
          IF (LEVL.LE.LEVEL) THEN
              IF (XRN.GE.XRV) THEN
                  CALL FILLPT (ICOL,RLAT,RLON,renew)
              ENDIF
          ENDIF
      ENDIF
      GO TO 100
  180 CONTINUE
c     PRINT*,'ERROR ON READ OF FILL FILE'
      go to 190
  181 continue
c      print*,'Open error on fill file ',chatmp
  190 CONTINUE
      CLOSE (IFL)

      RETURN
      END


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    FILLPT
C
C FUNCTIONAL DESCRIPTION:
C
C CALLED BY:                    AREAFL, FILLIT
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

      SUBROUTINE FILLPT (ICOL,RLAT,RLON,renew)

C     THIS SUBROUTINE CONVERTS A CANDIDATE LAT/LON TO X/Y AND CALLS THE
C         PRIMITIVE FILL FUNCTION IF THE POINT IS ON THE SCREEN

C     INPUT PARAMETERS:
C       ICOL - COLOR INDEX VALUE TO USE AS FILL COLOR
C       RLAT - LATITUDE OF POINT TO BE FILLED IN RADIANS
C       RLON - LONGITUDE OF POINT TO BE FILLED IN RADIANS

C     SUBROUTINES CALLED:
C       LLTOXY - CONVERT LAT/LON PAIR TO X/Y USING CURRENT PROJECTION
C       CLIPXY - FIND OUT WHETHER X/Y IS WITHIN THE CURRENT SCREEN BOUNDARY
C       JFILLM - PRIMITIVE HARDWARE FILL FUNCTION AT X/Y WITH COLOR ICOL
C                (A STANDARD ESCAPE FUNCTION WITH THE AED512 DI-3000 DRIVER)

      logical renew
      LOGICAL NEWONS
      LOGICAL INVALI
      COMMON /INVALI/ INVALI
      logical map
      common /mapdbc/ map

      INVALI = .FALSE.
      CALL LLTOXY(RLAT,RLON,X,Y)
      if (map) print*,'fillpt -- ',rlat,rlon,x,y,invali,renew
      IF (.NOT.INVALI) THEN
          CALL CLIPXY (X,Y,NEWONS)
          IF (NEWONS) THEN
               if (map) print*,'fillpt -- ',x,y
               CALL JFILLM (ICOL,X,Y,renew)
               if (renew) renew = .false.
          ENDIF
      ENDIF

      RETURN
      END
```

```
C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      FINDTK
C
C FUNCTIONAL DESCRIPTION:         .
C
C CALLED BY:                      CHECK
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine findtk(segnam,found)

c
c     this subroutine finds and displays a track that matches the segment
c     segnam.  This routine is called from CHECK which is used for interrogation
c     from any menu. So if user PICKS on a track at any time other than while
c     in the interrogate menu option, this routine will be called.

      logical endlst
      logical found

      integer*4 chkndx
      integer*4 chkseg
      integer*4 lctrak
      integer*4 segnam

      integer*4 ltypov (16)
      logical ltonov (16)
      logical rankt (26, 16)
      common /maptoo/ ltypov, ltonov, rankt
      integer*4 tkoset
      common /tkoset/ tkoset
      integer*4 trkndx(1000)
      common /trkndx/ trkndx
      integer*4 tfaddx
      integer*4 tfadtm
      common /tfadez/ tfaddx, tfadtm
      integer*4 tnewst
      integer*4 toldst
      common /tarbou/ tnewst, toldst
      integer*4 numrcs
      common /numrcs/ numrcs

      data lctrak  /3/


      found = .false.
      if (ltonov(lctrak)) then

c          chkndx = mod(tfaddx,numrcs) - 1
c         prevent indexing trkndx by 0
          if (tfadddx .gt. 0) then
             chkndx = mod(tfaddx,numrcs) - 1
          else
             chkndx = 0
          endif
c
          found = .false.
          endlst = .false.
c
c         search list until a segment match is found
c         or the end of the list is reached
c
 100      if (found .or. endlst) goto 110
                chkndx = mod(chkndx,numrcs) + 1
                chkseg = trkndx(chkndx) + tkoset
                if (chkseg .eq. segnam) then
                       found = .true.
                else
                       if (chkndx .eq. tnewst) then
                              endlst = .true.
                       endif
                endif
```

```
          goto 100
 110      continue
c
c         if match is found, then print information related
c         to that particular track in the communications area
c
          if (found) then
              call tkinfo(chkndx,chkseg)
          endif
      endif

      return
      end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME: flpoly
C
C FUNCTIONAL DESCRIPTION:  this subroutine flushes the polyline buffer
C
C INPUT FILES/PARAMETERS:
C
C GLOBAL VARIABLES : NONE.
C
C OUTPUT FILES/PARAMETERS:  NONE.
C
C SUBROUTINES/FUNCTIONS CALLED :
C
C CALLED BY:                    FDRAWV, FLUSHB
C
C LOCAL VARIABLES: NONE.
C
C RESTRICTIONS: NONE.
C
C ABNORMAL RETURN CONDITIONS:   NONE.
C
C LOCATION:
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C
C-*-*-*-*-*-*-*-*-*-*-*-*-*-*-*-*-*-*-*-*-*-*-*-*-*-*-*-*-*-*-*-*-*-*-*|*-*-*-*-

      subroutine flpoly

c     this subroutine flushes the polyline buffer

      real xpoly(500),ypoly(500)
      common /poly/ xpoly,ypoly
      common /inpoly/inpoly
      COMMON /COUNTS/ ICNTGP,ICNTDV,icntpl

      if ( inpoly .gt. 0 ) then
          call jpoly (xpoly,ypoly,inpoly)
          icntpl = icntpl + 1
          inpoly =  0
      end if

      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME: FLUSHB
C
C FUNCTIONAL DESCRIPTION:  FLUSHES GRAPHICS BUFFER.
C
C INPUT FILES/PARAMETERS:  NONE.
C
C GLOBAL VARIABLES :
C
```

```
C        XSAV                   REAL       SAVED X COORDINATE.
C        YSAV                   REAL       SAVED Y COORDINATE.
C        SAVEXY                 LOGICAL    INDICATES IF POINT WAS SAVED.
C        IRESSQ                 REAL       RESOLUTION OF LINES.
C
C OUTPUT FILES/PARAMETERS:  NONE.
C
C SUBROUTINES/FUNCTIONS CALLED : NONE.
C
C CALLED BY:                     CHKSIZ, DMAPII, DRAWEL, DROUTL, GLTYPE,
C                                GTEXT,  LLGRID, MAPPER, PLOTIT,
C                                PLTOVP
C
C LOCAL VARIABLES:
C
C        IRESSV                 REAL       RESOLUTION OF LINES.
C
C RESTRICTIONS: NONE.
C
C ABNORMAL RETURN CONDITIONS:    NONE.
C
C LOCATION:                      /a21/gjf/MAPSRC.FTN
C
C PROGRAMMER:                    DATE OF LAST CHANGE    REASON FOR CHANGE
C
C     DAVE NATION                                       ORIGINAL CODE.
C     JERRY FENERTY                                     DOCUMENT AND MODIFY
C                                                       FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE FLUSHB

C     THIS SUBROUTINE FLUSHES THE GRAPHICS BUFFER

      LOGICAL SAVEXY
      COMMON /STMSGS/ XPREV,YPREV,IRESSQ,XSAV,YSAV,SAVEXY

C ***** VERY SHORT VECTORS HAVE BEEN DISABLED COMPLETELY
C ***** THIS CAN CAUSE HOLES IN LINES AND ELIMINATE SMALL ISLANDS
C ***** TO REENABLE, PUT THE FOLLOWING IF BLOCK BACK IN

      IF (SAVEXY) THEN
         IRESSV=IRESSQ
         IRESSQ=0
         CALL FDRAWV(XSAV,YSAV)
         IRESSQ=IRESSV
      ENDIF

      call flpoly
      CALL JUPDAT

      RETURN
      END

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     FMTGEO
C
C FUNCTIONAL DESCRIPTION:        .
C
C CALLED BY:                     DISCEN
C
C PROGRAMMER:                    DATE OF LAST CHANGE    REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine fmtgeo (flat,flon,geostr)
c
c     format geo coordinate for ascii display
c
      character nsi,ewi
      real*8 rdlat,rdlon
      integer*4 iilat,iilon
      real*8 rlat,rlon
```

```
      character*20 geostr
      real*8 dtor,stor
      common /dtor/ dtor,stor
c
      rlat = flat
      rlon = flon
      if (rlat.gt.1.58.or.rlat.lt.-1.58
     + .or.rlon.gt.3.15.or.rlon.lt.-3.15) then
c        print*,'Invalid Geo value : ',rlon,rlat
         iegeo = 1
      else
         iegeo = 0
      endif
      geostr = ' '
      if (iegeo.gt.0) then
         write (geostr,1200) iegeo
 1200    format('GEO conv. error ',i2,2x)
      else
         rdlat = abs(rlat) / dtor
         rdlat = (rdlat * 3600. + .5) / 3600.
         idlat = rdlat
         imlat = (rdlat - idlat) * 60.
         islat = (rdlat - idlat - imlat / 60.) * 3600.
         iilat = islat + imlat * 100 + idlat * 10000
         nsi = 'N'
         if (rlat.lt.0) nsi = 'S'
         rdlon = abs(rlon) / dtor
         rdlon = (rdlon * 3600. + .5) / 3600.
         idlon = rdlon
         imlon = (rdlon - idlon) * 60.
         islon = (rdlon - idlon - imlon / 60.) * 3600.
         iilon = islon + imlon * 100 + idlon * 10000
         ewi = 'E'
         if (rlon.lt.0) ewi = 'W'
         write (geostr,1500) iilat,nsi,iilon,ewi
 1500    format(i6,a1,i7,a1)
      endif
c     print*,'fmtgeo -- exit ',rlat,rlon,'  ',geostr
c
      return
      end


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    FNDHLP
C
C FUNCTIONAL DESCRIPTION:       .
C
C CALLED BY:                    HELP
C
C PROGRAMMER:                   DATE OF LAST CHANGE    REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine fndhlp(ifl,helpno,eof,eom)
c
c     subroutine to find the numbered help message
c
      logical eof,eom
      character cchar
      character*80 msg
      integer msgnum,helpno

c     print*,'in fndhlp'
      eof=.false.
      eom=.false.
 300  continue
      read(ifl,1300,end=320,err=310)cchar,msg
 1300 format(a1,a80)
      if (cchar.eq.'C'.or.cchar.eq.'c') go to 300
      if (cchar.eq.'M'.or.cchar.eq.'m') then
         read(msg,1350,end=320,err=310)msgnum
 1350    format(i5)
         if (msgnum.eq.helpno) go to 330
```

```
       endif
       go to 300
310    continue
       print*,'read error on message file',msgnum
       go to 330
320    continue
       eof=.true.
c      print*,'end of file'
330    continue
c      print*,'end fndhlp'
       return
       end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME: FORMT
C
C FUNCTIONAL DESCRIPTION:  FORMATS LAT/LONG (RADIANS) INTO A CHARACTER
C                          STRING OF TYPE DDMMSSN/DDDMMSSE.
C
C INPUT FILES/PARAMETERS:
C
C        RLAT               REAL        LATITUDE.
C        RLON               REAL        LONGITUDE.
C        IEGEO              INTEGER     ERROR CONDITION.
C
C GLOBAL VARIABLES : NONE.
C
C OUTPUT FILES/PARAMETERS:
C
C        GEOSTR             CHAR*20     STRING WHICH HOLDS DDMMSSN/DDDMMSS
C
C SUBROUTINES/FUNCTIONS CALLED : NONE.
C
C CALLED BY:                  LLSHOW, SCRDIA
C
C LOCAL VARIABLES:
C
C        NSI                CHARACTER   NORTH/SOUTH INDICATOR.
C        EWI                CHARACTER   EAST/WEST INDICATOR.
C        SLASH              CHARACTER   /.
C        RDLAT              REAL*8      DEGREES LATITUDE.
C        RDLON              REAL*8      DEGRESS LONGITUDE
C        IILAT              INTEGER     DDMMSS LATITUDE.
C        IDLAT              INTEGER     DEGREES LATITUDE.
C        IMLAT              INTEGER     MINUTES LATITUDE.
C        ISLAT              INTEGER     SECONDS LATITUDE.
C        IILON              INTEGER     DDDMMSS LONGITUDE.
C        IDLON              INTEGER     DEGREES LONGITUDE.
C        IMLON              INTEGER     MINUTES LONGITUDE.
C        ISLON              INTEGER     SECOND LONGITUDE.
C        DTOR               REAL        DEGREES TO RADIANS CONVERSION.
C
C RESTRICTIONS: NONE.
C
C ABNORMAL RETURN CONDITIONS:   NONE.
C
C LOCATION:                     /a21/gjf/A21GEO.FTN
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C
C-*-*-*-*-*-*-*-*-*-*-*-*-*-*-*-*-*-*-*-*-*-*-*-*-*-*-*-*-*-*-*-*-*-*-*|*-*-*-*-

       SUBROUTINE FORMT (RLAT,RLON,IEGEO,GEOSTR)

C      FORMAT GEO COORDINATE FOR ASCII DISPLAY

       CHARACTER NSI,EWI,SLASH
       REAL*8 RDLAT,RDLON
       INTEGER*4 IILAT,IILON
```

```
C  COMMENTED OUT BECAUSE LLSHOW CALLS FORMT WITH REAL.

C          REAL*8 RLAT,RLON

        CHARACTER*(*) GEOSTR

        GEOSTR = ' '
        DTOR = DATAN (1.0D0)
        DTOR = DTOR / 45.D0

        IF (IEGEO.GT.0) THEN

           WRITE (GEOSTR,1200) IEGEO
 1200      FORMAT('GEO CONV. ERROR ',I2,2X)

        ELSE

C  BREAK DOWN LAT/LONG INTO DEGREES, MINUTES AND SECONDS AND LOAD THEM
C  INTO STRING.

           RDLAT = ABS(RLAT) / DTOR
           RDLAT = (RDLAT * 3600. + .5) / 3600.
           IDLAT = RDLAT
           IMLAT = (RDLAT - IDLAT) * 60.
           ISLAT = (RDLAT - IDLAT - IMLAT / 60.) * 3600.
           IILAT = ISLAT + IMLAT * 100 + IDLAT * 10000
           NSI = 'N'

           IF (RLAT.LT.0) NSI = 'S'

           RDLON = ABS(RLON) / DTOR
           RDLON = (RDLON * 3600. + .5) / 3600.
           IDLON = RDLON
           IMLON = (RDLON - IDLON) * 60.
           ISLON = (RDLON - IDLON - IMLON / 60.) * 3600.
           IILON = ISLON + IMLON * 100 + IDLON * 10000
           EWI = 'E'

           IF (RLON.LT.0) EWI = 'W'

           SLASH = '/'
           WRITE (GEOSTR,1500) IILAT,NSI,SLASH,IILON,EWI
 1500      FORMAT(I6,A1,A1,I7,A1)

C  FOLLOWING CODE PUT IN TO ELIMINATE BLANKS.

           IZERO = 0
           DO 30 I=1,16
              IF (GEOSTR(I:I).EQ.' ') THEN
                 WRITE(GEOSTR(I:I),1300) IZERO
 1300            FORMAT(I1)
              ENDIF
 30        CONTINUE


        ENDIF
        RETURN
        END

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                      foverl
c
c  Functional Description:
c       display overlay data
c
c  Input Files/Parameters:
c
c  Output Files/Parameters: N/A
c
c  Subroutines/Functions Called:
c
c  Called By: geocon
c
```

```
c  Local Variables: N/A
c
c  Restrictions: N/A
c
c  Abnormal Return Conditions:  N/A
c
c  Location:
c
c  Programmer        Date of Last Change      Reason for Change
C  L. McCleary       Jan 1988              separate amp & sys - foverl
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
-       subroutine foverl
c
c       display overlay data function
c
        character*80 ovfnam
        common /ovfnam/ ovfnam
        integer lenovf
        common /lenovf/ lenovf
        integer ovseg, dfseg
        COMMON /OVSEGS/ ovseg, dfseg

c       map parameters
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        dimension ltypov(16)
        logical ltonov(16),rankt(26,16)
        common /maptoo/ ltypov,ltonov,rankt

        data maxlen /40/
        data lcover/21/
c
c       display overlay data
c
c        print *,'foverl - enter'
         CALL PROMPT (1208,ovfnam,MAXLEN,lenovf)
         if (lenovf.gt.0) then
            call mesg(250)
            ltonov(lcover-20) = .true.
c            call jrclos
            call getseg(ovseg)
            call geowin
            call gravpt
            call jropen(ovseg)
            ltype = ltypov(lcover-20)
            call xcolor(ltype)
            call pltovp(xrnm,ovfnam,lenovf)
            call jrclos
        endif
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: FPOINT
C
C FUNCTIONAL DESCRIPTION:  DRAWS POINT AT X,Y.
C
C INPUT FILES/PARAMETERS:
C
C       X                    REAL         X COORDINATE.
C       Y                    REAL         Y COORDINATE.
C
C GLOBAL VARIABLES :
C
C       SEGNO                INTEGER      CURRENT MAP SEGMENT NUMBER.
C       LTYPE                INTEGER      CURRENT LINE TYPE.
C
C OUTPUT FILES/PARAMETERS:  NONE.
```

```
C
C SUBROUTINES/FUNCTIONS CALLED : NONE.
C
C CALLED BY:                    GRDLAT, GRDLON, PLOTIT
C
C LOCAL VARIABLES: NONE.
C
C RESTRICTIONS: NONE.
C
C ABNORMAL RETURN CONDITIONS:   NONE.
C
C LOCATION:                     /a21/gjf/MAPSRC.FTN
C
C PROGRAMMER:                   DATE OF LAST CHANGE    REASON FOR CHANGE
C
C     DAVE NATION                                      ORIGINAL CODE.
C     JERRY FENERTY                                    DOCUMENT AND MODIFY
C                                                      FOR A21 PROTOTYPE.
C
C-*-*-*-*-*-*-*-*-*-*-*-*-*-*-*-*-*-*-*-*-*-*-*-*-*-*-*-*-*-*-*-*-*-*-*|*-*-*-*-

      SUBROUTINE FPOINT(X,Y)

C     THIS SUBROUTINE DRAWS A POINT AT CURSOR POSITION X, Y

      CALL JMARK (X,Y)

      RETURN
      END

C+*+*+*+*+*+*+*+*+*+*+*+*+*+*+*+*+*+*+*+*+*+*+*+*+*+*+*+*+*+*+*+*+*+*|*+*+*+*+
C UNIT NAME: FPOSIT
C
C FUNCTIONAL DESCRIPTION:  POSITIONS POINT AT X,Y.
C
C INPUT FILES/PARAMETERS:
C
C       X                  REAL        X COORDINATE.
C       Y                  REAL        Y COORDINATE.
C
C GLOBAL VARIABLES :
C
C       XSAV               REAL        SAVED X COORDINATE.
C       YSAV               REAL        SAVED Y COORDINATE.
C       SAVEXY             LOGICAL     INDICATES IF POINT WAS SAVED.
C       IRESSQ             REAL        RESOLUTION OF LINES.
C       XPREV              REAL        PREVIOUS X COORDINATE.
C       YPREV              REAL        PREVIOUS Y COORDINATE.
C       XPOS               REAL        CURRENT X COORDINATE.
C       YPOS               REAL        CURRENT Y COORDINATE.
C       PSLAST             LOGICAL     INDICATES WHETHER XPOS,YPOS WAS LAST
C                                      POINT POSITIONED.
C
C
C OUTPUT FILES/PARAMETERS:  NONE.
C
C SUBROUTINES/FUNCTIONS CALLED : NONE.
C
C CALLED BY:                    FDRAWV, PLOTIT, PROCPO
C
C LOCAL VARIABLES:
C
C       IRESSV             REAL        RESOLUTION OF LINES.
C
C RESTRICTIONS: NONE.
C
C ABNORMAL RETURN CONDITIONS:   NONE.
C
C LOCATION:                     /a21/gjf/MAPSRC.FTN
C
C PROGRAMMER:                   DATE OF LAST CHANGE    REASON FOR CHANGE
C
C     DAVE NATION                                      ORIGINAL CODE.
C     JERRY FENERTY                                    DOCUMENT AND MODIFY
```

```
C
C                                                        FOR A21 PROTOTYPE.
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE FPOSIT (X,Y)

C     THIS SUBROUTINE POSITIONS THE GRAPHICS CURSOR AT X/Y POSITION X,Y

      LOGICAL PSLAST
      COMMON /PSLAST/ PSLAST,XPOS,YPOS
      LOGICAL SAVEXY
      COMMON /STMSGS/ XPREV,YPREV,IRESSQ,XSAV,YSAV,SAVEXY

C ***** VERY SHORT VECTORS HAVE BEEN DISABLED COMPLETELY
C ***** THIS CAN CAUSE HOLES IN LINES AND ELIMINATE SMALL ISLANDS
C ***** TO REENABLE, PUT THE FOLLOWING IF BLOCK BACK IN

      IF (SAVEXY) THEN
         IRESSV=IRESSQ
         IRESSQ=0
         CALL FDRAWV(XSAV,YSAV)
         IRESSQ=IRESSV

      ENDIF

      XPREV = X
      YPREV = Y

      XPOS = X
      YPOS = Y
      PSLAST = .TRUE.

      RETURN
      END

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                  FSHOWA
C
C FUNCTIONAL DESCRIPTION:     .
C
C CALLED BY:                  GEOCON
C
C PROGRAMMER:                 DATE OF LAST CHANGE      REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine fshowa

c     show area menu function

      logical found
      character * 25 retstr, tmpstr
      common /mapdat/ mdraw,ovdraw
      logical mdraw,ovdraw
      logical map
      common /mapdbc/ map
      INTEGER QNMPTS,QSHADE(60)
      REAL QLATT(60),QLONN(60)
      COMMON /FILLS/ QNMPTS,QLATT,QLONN,QSHADE

      CHARACTER*3 QLABEL
      COMMON /LABEL/ QLABEL
      CHARACTER TYPEC
      common /bounds/ parms
      real parms(4)
c     map parameters
      logical lton(16),dotem
      integer ipgrid(4),ltyptb(16)
      common /map/ XRNM,XC,YC,LEVEL,CLAT,CLON,XRAD,YRAD,ITPROJ,
     +   IRES,LTYPTB,LUNDAT,LUNIND,LUNLIN,LTON,IPGRID,DOTEM,
     +   ORHALT
c
```

```
c               show area by name
                QNMPTS = 0
  170           continue
                irchar = 25
                retstr = '                         '
                CALL PROMPT(270,retstr,25,irchar)
                IF (map) print*,'name -- ',retstr(1:irchar),irchar
                tmpstr = retstr
                if (irchar.gt.0) then
                    call mesg (271)
                    call shownm (retstr,irchar,parms,found,TYPEC)
                    IF (map) print*,'name2 -- ',retstr(1:irchar),irchar
                    if (found) then
c
c                       typec values :
c                           ' ' - country
c                           'S' - state
c                           'C' - Continent
c                           'W' - body of water
c
c                       lton values :
c                            (2) - political bound.
c                            (3) - internal bound.
c
                        if (typec.eq.' ') then
                            lton(2) = .true.
                            lton(3) = .false.
                        else if (typec.eq. 'S' .or. typec.eq. 's') then
                            lton(2) = .true.
                            lton(3) = .true.
                        else if (typec.eq. 'C' .or. typec.eq. 'c') then
                            lton(3) = .false.
                        endif
                        call calmap (parms)
                        qlabel = 'GEO'
                        call drwmap
                    else
                        call mesg (273)
c***                    go after another name if not found
                        go to 170
                    endif
                endif
c
        return
        end

C+*+*+*+*+*+*+*+*+*+*+*+*+*+*+*+*+*+*+*+*+*+*+*+*+*+*+*+*+*+*+*+*|*+*+*+*+
C UNIT NAME:                     FUDGEX
C
C FUNCTIONAL DESCRIPTION:        .
C
C CALLED BY:                     CREATM
C
C PROGRAMMER:                    DATE OF LAST CHANGE    REASON FOR CHANGE
C
C-*-*-*-*-*-*-*-*-*-*-*-*-*-*-*-*-*-*-*-*-*-*-*-*-*-*-*-*-*-*-*-*-*|*-*-*-*-

        subroutine fudgex (xval)

c       fudge the x coordinate in menu files to fit with the square
c       coordinate system

        common /commen/xllmen,yllmen,xurmen,yurmen,ibcmen,iocmen,incmen
        logical sys
        common /sysdbc/ sys

c       fudge factor indicates chosen x coordinate system logical width
        data fudgef/20./

        xnval = xval * (xurmen - xllmen) / fudgef

        if (sys) print*,'fudgex -- ',xval,xnval,fudgef,xurmen,xllmen
```

```
      xval = xnval

      return
      end


C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:   GEOWIN
c
c  Functional Description:
c       this subroutines sets the geographics area window
c
c  Input Files/Parameters:
C       xllgeo,yllgeo              The lower left X,Y point
C       xurgeo,yurgeo              The upper right X,Y point
c
c  Output Files/Parameters:
c
c  Subroutines/Functions Called:
c       Note: Subroutines preceded by a "j" are explained in the DI-3000 manual.
c
c  Called By:                   ANNOTA, BOXARE, CHKSIZ, CLRGRA, DOVERL,
C                               FOVERL, GLTYPE, LLSHOW, MAPPER
C                               OFFST,  SEGHND, TKINFO, TXWRIT,
C                               DSPCLS, STORCL
c
c  Local Variables:             N/A
c
c  Restrictions:                N/A
c
c  Abnormal Return Conditions: N/A
c
c  Location:   /a21/dave
c
C  Programmer        Date of Last Change        Reason for Change
c
C-*-*-*-*-*-*-*-*-*-*-*-*-*-*-*-*-*-*-*-*-*-*-*-*-*-*-*-*-*-*-*-*-*-*-*|*-*-*-*-
c
      subroutine geowin
c
c     this subroutines sets the geographics area window
c
      common /gphwdo/xllgeo,yllgeo,xurgeo,yurgeo
c
      call jwindo (xllgeo,xurgeo,yllgeo,yurgeo)
c
      return
      end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    GETARC
C
C FUNCTIONAL DESCRIPTION:
C
C CALLED BY:                    APARCS
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

      subroutine getarc(iarray,xsave1,ysave1,xsave2,ysave2,xsave3,
     +       ysave3,numarc)

c     This routine loads the points from iarray into the appropriate
c       arrays so the same routines used to create the arcs
c       may be used for redrawing. The points for the first
c       4 arcs are in iarray previously read. If more than three
c       arcs are to be drawn, the next record in the file is read
c       in. Arcs 5 to 8 are in the second "record." The points
c       of the last 4 arcs are in the last "record" which may
c       be read in.
```

```
c    VARIABLES:
c        xsaveX/ysaveX- arrays to be loaded with points of the arcs.
c        iarray- array passed from calling routine
c        common block ifls- logical unit numbers for files being accessed
c        numarc- number of arcs to get points for (stored in iarray(2))
c   CALLS:      readem
c   PROGRAMMER:  Nancy Detrich, A215, March, 1984
C------  MODIFIED BY A692 FOR COMPLETION


      real xsave1(*),ysave1(*),xsave2(*),ysave2(*)
      real xsave3(*),ysave3(*)
      integer iarray(*),numarc
      common/ifls/newifl,oldifl
      integer newifl, oldifl

      numarc = iarray(2)

      j = 3
      do 100 i = 1, numarc
        xsave1(i) = REAL(iarray(j))
        ysave1(i) = REAL(iarray(j+1))
        xsave2(i) = REAL(iarray(j+2))
        ysave2(i) = REAL(iarray(j+3))
        xsave3(i) = REAL(iarray(j+4))
        ysave3(i) = REAL(iarray(j+5))
c       increment counter beyond the 5 just read in iarray
        j = j + 6

        if ((i.eq.4 .or. i.eq.8).and.i.ne.numpts) then
c         must read next record before able to continue loading arrays
          call readem (oldifl,iarray,26,ierror)
          j = 1
        endif
  100 continue
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    GETCIR
C
C FUNCTIONAL DESCRIPTION:
C
C CALLED BY:                    APCIRC
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine getcir(iarray,radius,xcentr,ycentr)

c      this routine loads the radius and x and y coordinate arrays
c      of the circles written to the savefile.  If necessary, multiple
c      records are read in to restore the arrays (limited to dimensions
c      set in apcirc for the arrays being restored).
c   VARIABLES:
c      iarray- record already read in by drwicn or drawic routine
c      radius,xcentr,ycentr- arrays to be loaded and passed back
c        to the calling routine
c      numcir- number of circles saved in file
c      maxlen- maximum number of "points" stored in one record
c      common block ifls- logical unit numbers for files being accessed
c   CALLS:     readem
c   PROGRAMMER:  Nancy Detrich, A215, March, 1984


      integer iarray(*)
      real radius(*),xcentr(*),ycentr(*)
      integer numcir,maxlen
      common/ifls/newifl,oldifl
      integer newifl,oldifl
      data maxlen/26/
```

```
      numcir = iarray(2)
      j = 3
      do 100 i= 1,numcir
        radius(i) = FLOAT(iarray(j))
        xcentr(i) = FLOAT(iarray(j+1))
        ycentr(i) = FLOAT(iarray(j+2))
        j = j+3
c       eight circles are stored in each record-- read the next one
        if(MOD(i,8) .eq. 0) then
          call readem(oldifl,iarray,maxlen,ierror)
          j = 1
        endif
100   continue
      return
      end

C++++++++++++++++++++++++++++++++++++++++++++++++++++++++++++++++++++|+++++++
c  UNIT NAME:                    getcmd
c
c  Functional Description:
c       get next command
c
c  Input Files/Parameters:
c
c  Output Files/Parameters: N/A
c
c  Subroutines/Functions Called:
c
c  Called By:                    CMDMAI, STATEC
c
c  Local Variables: N/A
c
c  Restrictions: N/A
c
c  Abnormal Return Conditions:  N/A
c
c  Location:
c
c  Programmer       Date of Last Change     Reason for Change
C  L. McCleary      Jan 1988             delete call xcolor - getcmd
c
C-*-*-*-*-*-*-*-*-*-*-*-*-*-*-*-*-*-*-*-*-*-*-*-*-*-*-*-*-*-*-*-*-*-*-*|*-*-*-*-
c
      subroutine getcmd
c
c     this subroutine gets a command line
c
      logical eol,eoc
      common /comnds/ lenl,indxw,lenw,eol,eoc
      character * 80 comlin
      common /comlin/ comlin
      common /oldwrd/ indxwo,lenwo
      common /colorm/ nonsel,iselec
c
c     lenl -- length of command line
c     indxw -- index in command line of current word
c     lenw -- length of current word
c     indxwo -- index in command line of previous word in line
c     lenwo -- length of previous word in line
c     eol -- indicates end of command line (no more words)
c     eoc -- indicates end of current command (a delimiter)
c     comlin -- command line that is input
c
c     print*,'getcmd -- enter'
c      call xcolor (nonsel)
      call prompt(1246,comlin,80,irchar)
      lenl = irchar
      if (irchar.gt.0) then
          call tocaps (comlin,lenl)
          eol = .false.
          eoc = .false.
          indxw = 1
          lenw = 0
```

```
            indxwo = 0
            lenwo = 0
         else
c ----- updated 7/31/87 CSL
            eol = .true.
            eoc = .true.
            indxw = 0
         endif
c        print*,'getcmd -- exit ',lenl,'  ',comlin(1:lenl)
c
         return
         end

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                      getfnm
c
c  Functional Description:
c       get a file name from the command line (or default) for read_keys
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                      INIGRA
c
c  Local Variables: N/A
c
c  Restrictions: N/A
c
c  Abnormal Return Conditions:  N/A
c
c  Location:      /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-

         subroutine getfnm (lennam,filnam)

c        get a file name from the command line (or default) for read_keys

         character*80 filnam
         character*80 argume

         call getarg (lenarg,argume)
c        print*,'getfnm -- ',lenarg,'  ',argume(1:lenarg)
         if (lenarg.gt.0) then
             lennam = lenarg
             if (lennam.gt.80) lennam = 80
             filnam(1:lennam) = argume(1:lennam)
         else
             lennam = 9
             filnam(1:lennam) = 'read_keys'
         endif

         return
         end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      GETICN
C
C FUNCTIONAL DESCRIPTION:         .
C
C CALLED BY:                      CREATM, PLOTOV
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-
```

```
      subroutine geticn(outcol,filcol,scalex,scaley,x,y,icnnam,
     +           miror,rot)

c       this routine is called by the prototype whenever
c        an icon is to be drawn.  The viewport and window must
c        be set prior to the call, and this routine uses the
c        x and y values to place the icon and the scale to
c        to size the icon--the points are changed by the
c        chgpts routine before the draws in the 'ap' routines.
c        A segment must also be open for the icon to be put in.
c        The icon is drawn in the color outcol and filled
c        with the color filcol (it is not filled if filcol = 0).
c        This routine calls drwicn which reads the requested
c        icon file and calls other routines (apline,apcirc,etc.)
c        which actually have the moves and draws for the icons.
c        A scalefactor of 1 will give an icon with points in
c        the range from 0 to 100 in world coordinates.
c     VARIABLES:
c        outcol- index of outline color
c        filcol- index of fill color
c        miror -integer flag to indicate if the points are to be mirrored
c             0= mirror the x array, 1= mirror the y array,
c             2= do not mirror the points
c        scalex- scalefactor to be used on the x coordinates
c        scaley- scalefactor to be used on the y coordinates
c        x/y- the coordinates to be used to position the icon
c           (will be place in the chgit common area as offsets
c        icnnam- name of the icon to be drawn
c        common block device- selected display device for pausing
c        common block chgit- parameters set for changing points
c             in a file (mirror,scalefactors and offsets)
c   CALLS:    loadic drwicn
c   PROGRAMMER:  Nancy Detrich, A215, March, 1984
C------  MODIFIED BY A692 FOR COMPLETION
c   Modified by M. Bloom, T333 June 1987 to position icons by
c        center point rather than lower left corner.

      integer outcol,filcol,miror
      real scalex,scaley,x,y
      integer qdsdev,qpydev,qecho,qlecho
      common /device/ qdsdev,qpydev,qecho,qlecho
      common /chgit/ mirflg,xscale,yscale,xoffst,yoffst,rotang
      real xscale,yscale,rotang
      integer xoffst,yoffst,mirflg
      integer icnnam
      logical sys
      common /sysdbc/ sys
      common /icold/ icold
      real rot

c ---- initialize rotation angle
      data icold /-1/

      if (sys) print*,'GETICN -- enter',icnnam,icold
      if (icnnam.ne.icold) then
          icold = icnnam
c         load current icon into tables
          call loadic (icnnam)
      endif
c     set parameters in common area to be used by chgpts
c       routine for drawing the icon in the right place
c       and scaled appropriately
      mirflg = miror
      rotang = rot

      xscale = scalex
      yscale = scaley

c     must negate points here to accommodate the chgpts routine
clj      xoffst = -(INT(x + 0.5))
clj      yoffst = -(INT(y + 0.5))

c  THE FOLLOWING MAKES AN X AND Y OFFSET FOR THE ICON.
```

```
c  THE -100 WAS ADDED FOR POSITIONING THE ICONS BY THE
c  CENTER POINT RATHER THAN THE LOWER LEFT.

       if (miror.eq.2) then
          xoffst = -(INT(x + 0.5))
          yoffst = -(INT(y + 0.5))
       elseif (miror.eq.1) then
          xoffst = -(INT(x + 0.5))
          yoffst = (INT(y + 0.5)) - 100
       else
          xoffst = (INT(x + 0.5)) - 100
          yoffst = -(INT(y + 0.5))
       endif

c      set scale factor to 1 if 0 was sent so an icon may be seen
       if (scafac .eq. 0.) scafac = 1.

c      set the color for the prototype
       call xcolor(outcol)

c      draw the icon and fill it with the appropriate color
       call drwicn(filcol,outcol)

       if (sys) print*,'GETICN -- exit'

       return
       end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: GETLL
C
C FUNCTIONAL DESCRIPTION:  EXTRACTS NUMERICAL PORTION OF DDMMSSN/E STRING,
C                          DETERMINES SIGN AND CALLS FOR CONVERSION TO RADIANS.
C
C INPUT FILES/PARAMETERS:
C
C          STRNG                CHAR*(*)      LAT/LONG STRING.
C          LEN                  INTEGER       LENGTH OF STRING.
C          NST                  CHAR(4)       TABLE OF EITHER N,S OR E,W.
C
C GLOBAL VARIABLES : NONE.
C
C OUTPUT FILES/PARAMETERS:
C          LAT                  REAL*8        LATITUDE OR LONGITUDE.
C          INDX                 INTEGER       INDICATES WHERE DIRECTION INDICATOR
C                                             (N,S,E,W) WAS FOUND IN STRING.
C          IERROR               INTEGER       ERROR CONDITION.
C
C SUBROUTINES/FUNCTIONS CALLED :
C
C          LLCONV               CONVERTS DDMMSS TO A LAT OR LONG VALUE.
C
C CALLED BY: LLTORD.
C
C LOCAL VARIABLES:
C
C          CLAT                 REAL*8        LATITUDE OR LONGITUDE (DDMMSS).
C
C RESTRICTIONS: NONE.
C
C ABNORMAL RETURN CONDITIONS:   NONE.
C
C LOCATION:                     /a21/gjf/A21GEO.FTN
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*|*-*-*-*-
```

```
      SUBROUTINE GETLL (STRNG,NST,LAT,INDX,LEN,IERROR)

C     GET A LAT OR LON VALUE FROM A PARAMETER STRING

      CHARACTER*(*) STRNG
C      REAL*8 LAT,CLAT
      REAL LAT,CLAT
C      REAL*8 LLCONV
      REAL LLCONV
      CHARACTER NST(4)

C  SEARCH FOR DIRECTION INDICATOR

      DO 110 I=1,4

          INDX = INDEX (STRNG(1:LEN),NST(I))
          IF (INDX.GT.0) GO TO 115

  110 CONTINUE

      IERROR = 1
      GO TO 190

  115 CONTINUE

      IF (I.GT.2) THEN
          ISIGN = -1

      ELSE

          ISIGN = 1

      ENDIF

      READ (STRNG(1:INDX-1),1115,ERR=182) CLAT
 1115 FORMAT(F10.0)

      CLAT = CLAT + .5
      LAT = LLCONV (CLAT,ISIGN)
      GO TO 190

  182     CONTINUE
          IERROR = 2

  190 CONTINUE

      RETURN
      END

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    GETMARK
C
C FUNCTIONAL DESCRIPTION:       .
C
C CALLED BY:                    PLTDAT
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine getmark(track,marker,posit,exist,timbuf)

      logical exist

      character*1 ucalpha(26)
      character*1 lcalpha(26)
      character*1 nums(9)
      character*2 marker
      character*9 timbuf

      integer*4 tmpmk1
      integer*4 tmpmk2
      integer*4 maxalp
      integer*4 maxlst
```

```
      integer*4 posit
      integer*4 track

c     posit- element of track in the table
c     exist- logical is true if track already exists , false if
c            is a new track (output parameter).
c     actmrk - list of markers that are currently active on the system
c     mrkcnt - count of number of these markers (and, by correlation,
c              the count of # of tracks in the system currently.
c              Initialized to 0 in fmain.
c     trklst - list of all currentl track numbers in the system
c
c     marker assignment scheme is as follows:
c
c     A-Z, a1-z1, a2-z2, a3-z3,...,a9-z9, <recycle>
c
c     Total number of unique markers = 260
c
c

      integer*4 trklst(260)
      integer*4 curseg(260)
      integer*4 mrkcnt
      character*2 actmrk(260)
      character*9 boxdtg(260)
      logical  boxvis(260)
      common /actmrk/ trklst,mrkcnt,actmrk,curseg,
     +                boxdtg,boxvis

      data maxalp /26/
      data maxlst /260/
      data nums    /'1','2','3','4','5','6','7','8','9'/
      data ucalpha /'A','B','C','D','E','F','G','H','I','J','K','L',
     +             'M','N','O','P','Q','R','S','T','U','V','W','X',
     +             'Y','Z'/
      data lcalpha /'a','b','c','d','e','f','g','h','i','j','k','l',
     +             'm','n','o','p','q','r','s','t','u','v','w','x',
     +             'y','z'/

      i = 0
c
c     search for the track number found in the active track number list
c     (mrkcnt initialized to 0 in fmain)
c
 100  i = i + 1
      if (i .le. mrkcnt .and. track .ne. trklst(i)) goto 100

      posit = i
c
c     if this track number is already on current list,
c     use the same marker that was previously used for this track number
c     and set exist to true
c     change current date time group of most recent plot for that track.

      if (track .eq. trklst(i)) then
          marker = actmrk(i)
          exist = .true.
c
c     only switch box value if it is newer than the one
c     already there.
c
          if (timbuf .gt. boxdtg(i)) then
             boxdtg(i) = timbuf
          endif

      else
c
c         if this track number is not currently on list, generate a new
c         marker and put both the track number on the trklist and the
c         new marker on the actmrk list, set exist to false
c         and set most recent date time group for that track.
c
          exist = .false.
          mrkcnt = mrkcnt + 1
```

```
            if (mrkcnt .eq. maxlst) then
                mrkcnt = 1
            endif
            posit = mrkcnt
            if (mrkcnt .le. maxalp) then
                 marker = ucalpha(mrkcnt) // ' '
            else
                 tmpmkl = mod(mrkcnt,maxalp)
                 tmpmk2 = mrkcnt / maxalp
                 marker = lcalpha(tmpmkl) // nums(tmpmk2)
            endif
            actmrk(mrkcnt) = marker
            trklst(mrkcnt) = track
            boxdtg(mrkcnt) = timbuf
       endif
       return
       end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    GETPTS
C
C FUNCTIONAL DESCRIPTION:
C
C CALLED BY:                    APFILL. APLINE, APMARK, APRECT, APSMOO
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine getpts(iarray,numpts,xarray,yarray)

c       iarray is passed from the read in the drawic (passed through either
c         apsmoo or apline) and the number of points and the first 12
c         points are loaded from that record.  If necessary, up to 2 more
c         records are read in and the points loaded into the appropriate
c         x and y arrays to be used in the redrawing of the curve or line.
c      VARIABLES:
c         xarray/yarray- arrays to be loaded with coordinates from file
c         iarray- holds coordinates read from file
c         numpts- number of points to be read from the file
c         ierror- integer flag set if error occurs during read
c         ifl- logical unit number of the file to be accessed
c   CALLS:      readem
c   PROGRAMMER:  Nancy Detrich, A215, March, 1984
        real xarray(*),yarray(*)
        integer iarray(*),numpts,i,j,ifl,ierror

        numpts = iarray(2)

c       start loading arrays from third position of iarray
        j = 3
        do 100 i = 1, numpts
          xarray(i) = REAL(iarray(j))
          yarray(i) = REAL(iarray(j+1))

          if ((i.eq.12 .or. i.eq.25).and.i.ne.numpts) then
c           must read next record before able to continue loading arrays
            ifl = 10
            call readem (ifl,iarray,26,ierror)
c           reset to -1 so it will be 1 at the beginning of the loop
            j = -1
          endif
c         increment counter for iarray past saved points
          j = j + 2
  100   continue
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c* UNIT NAME:  getseg
c*
c* FUNCTIONAL DESCRIPTION:  a subroutine to generate a one-up segment name
```

```
c*
c*
c* INPUT FILES/PARAMETERS:
c*
c*
c* OUTPUT FILES/PARAMETERS:      qsegnm       generated segment number
c*
c* SUBROUTINES/FUNCTIONS CALLED:
c*
c* CALLED BY:                   ANNOTA, AREAFL, CHKSIZ, CURBOX, DISTAN
C                               DOVERL, DRWAMP, FOVERL, INIPIC
C                               LLSHOW, MAPOVR, MESGJF,RECDIS, SAVDIS,
C                               SEGMAP, SETFAD, TKINFO, TXWRIT, DSPCLS
c*
c* LOCAL VARIABLES:
c*
c* RESTRICTIONS:  qsegnm must be within the range 1100 < qsegnm < 32767
c*
c*
c* ABNORMAL RETURN CONDITIONS:  n/a
c*
c*
c* PROGRAMMER:  Sue Ferris       DATE OF LAST CHANGE     REASON FOR CHANGE
c*              Dave             11/1/84     put limits of segment numbers in *
c*                                           common area /getseg/
c*
C-*-*-*-*-*-*-*-*-*-*-*-*-*-*-*-*-*-*-*-*-*-*-*-*-*-*-*-*-*-*-*-*-*-*-*-*-*|*-*-*-*-

      Subroutine getseg(segno)

c     a subroutine to generate a one-up segment name

      common/segnum/qsegnm
      integer qsegnm

      integer segno

c       getseg segment number range
        common /gtseg/qstart,qsgend
        integer qstart,qsgend

        logical sys
        common /sysdbc/ sys

      if (sys) print*,'getseg -- enter',qsegnm
      segno = qsegnm
   10 if ((segno .ge. qstart) .and. (segno .le. qsgend)) then
          segno = segno + 1
          if (segno .eq. qsgend - 50) then
             call mesg(450)
             call paws

c "WARNING: Picture storage space is getting low..... Hit any button
c           to continue.

          end if
      else if (segno .lt. qstart) then
          call mesg(451)
          call paws

c  System is trying to access a reserved segment number.  Inform system
c  administrator.

      else
          segno = -999
          call mesg(452)
          call paws

c Picture storage space is FULL!  You cannot add anything more to your
c picture....  Hit any button to continue.
```

```
      end if
      qsegnm = segno
      if (sys) print*,'getseg -- exit',qsegnm
      return
      end


C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        GETWRD
C
C FUNCTIONAL DESCRIPTION:           .
C
C CALLED BY:                        CALCPR, CMDMAI, DECDET, DECSCA, DRAWST,
C                                   ERASES, EXECUT, INCDET, INCSCA,
C                                   INQSTA, MAJORS, MINORS, REMOVF, SAVEST,
C                                   SCENTE, SETSCA, SPROJE, SSCALE, TURNST
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine getwrd
c
c       this subroutine gets the next command word
c
        logical eol,eoc
        common /comnds/ lenl,indxw,lenw,eol,eoc
        character * 80 comlin
        common /comlin/ comlin
        common /oldwrd/ indxwo,lenwo
c
c       print*,'getwrd -- enter',indxw,lenw
        indxwo = indxw
        lenwo = lenw
        indxw = indxw + lenw
c       look for the first non-blank char or end of line
  100   continue
c ----- updated 7/31/87 CSL                                 - getwrd
            if (indxw.gt.lenl) go to 170
            if (lenl.eq.0) go to 170
            if (comlin(indxw:indxw).ne.' ') go to 110
c            if (indxw+1.gt.lenl) go to 170
            indxw = indxw + 1
            go to 100
  110   continue
c       look for end of word, command or line
        lenw = 1
  120   continue
            if (indxw + lenw.gt.lenl.or.
     +      comlin(indxw + lenw:indxw + lenw).eq.' ') go to 190
            lenw = lenw + 1
            go to 120
  170   continue
            indxw = lenl
            eoc = .true.
            eol = .true.
  190   continue
c       print*,'getwrd -- exit',indxw,lenw,eoc,eol
c
        return
        end


C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        GLTYPE
C
C FUNCTIONAL DESCRIPTION:           .
C
C CALLED BY:                        AREAFL, DMAPII
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-
```

```
      SUBROUTINE GLTYPE (LTYP,ltonvl)
C     THIS SUBROUTINE SETS A NEW LINE TYPE VALUE IF NECESSARY
      INTEGER OFFSET,SEG
      INTEGER SEGNO,FIRSEG
      COMMON /SEGNO/ SEGNO,FIRSEG
      COMMON /LTYPS/ LTYPS
      COMMON /LTYPE/ LTYPE
      logical map
      common /mapdbc/ map
      logical bitmod
      common /bitmod/ bitmod
      logical oneflg
      common /oneflg/ oneflg
      integer prtchoi(2)
      common /prtchoi/ prtchoi

C     DATA LTYPS/-1/
      DATA OFFSET/250/

      if (ltonvl.gt.0) then
          segno = firseg + ltonvl
      endif
      CALL FLUSHB
      if (bitmod) then
          call jclose
      else
          CALL JRCLOS
      endif
      SEG = ltonvl
      call soverl
      if (.not.(oneflg.and.(prtchoi(1).eq.2))) then
        IF (SEG.GT.16) THEN
            CALL MESG(267)
        ELSE
            CALL MESG(SEG+OFFSET)
        ENDIF
      endif
      call enall
      CALL GEOWIN
      CALL GRAVPT
      IF (map)
     +    PRINT*,'IN GLTYPE OPENING SEGMENT # ',SEGNO
      if (bitmod) then
          call jopen
      else
          CALL JROPEN(SEGNO)
      endif
      LTYPE = LTYP
C***  COLOR MUST BE SET EACH TIME YOU OPEN NEW
C***  SEGMENT WITH DI-3000 -- GJF
C      IF (LTYPE.NE.LTYPS) THEN
          CALL XCOLOR (LTYPE)
          LTYPS=LTYPE
C      ENDIF

      RETURN
      END

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:    GRAVPT
c
c  Functional Description:
c       this subroutines sets the graphics area viewport
c
c  Input Files/Parameters:
C       xllgvp,yllgvp,xurgvp,yurgvp
c
```

```
c  Output Files/Parameters:
c
c  Subroutines/Functions Called:
c       Note: Subroutines preceded by a "j" are explained in the DI-3000 manual.
c
c  Called By:                      ANNOTA, BOXARE, CHKSIZ, CLRGRA, DOVERL,
C                                  FOVERL, GLTYPE, INIPIC, LLSHOW,
C                                  LOGO,   MAKGRA, MAPPER, OFFST,  SEGHND,
C                                  TKINFO, TXWRIT, DSPCLS, STORCL
c
c  Local Variables:       N/A
c
c  Restrictions:                   N/A
c
c  Abnormal Return Conditions: N/A
c
c  Location:   /a21/dave
c
c  Programmer        Date of Last Change        Reason for Change
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine gravpt
c
c       this subroutines sets the graphics area viewport
c
        common /comgvp/ xllgvp,yllgvp,xurgvp,yurgvp
c
        call jvport (xllgvp,xurgvp,yllgvp,yurgvp)
c
        return
        end


C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       GRDLAT
C
C FUNCTIONAL DESCRIPTION:          .
C
C CALLED BY:                       LLGRID
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine grdlat (lon,lonst2,loninc,lonstp,plat,frstpo,
     +      ylatof,dotem,latval)

c       draw one latitude grid line

        COMMON /CONST/ MAXVAL,RMPV,C,R,ERNM

        LOGICAL NEWONS,NEWSEQ
        LOGICAL ISINV
        LOGICAL DOTEM,FRSTPO
        COMMON /LABSON/ LABSON
        LOGICAL LABSON
        LOGICAL INVALI
        COMMON /INVALI/ INVALI
        CHARACTER*15 LABELS
        logical map
        common /mapdbc/ map
        DATA ITYPE/1/,LLEN/9/

        if (map) then
            print*,'  ',lon,lonst2,loninc,lonstp,plat,frstpo,
     +      ylatof,dotem
        endif

                NEWSEQ=.TRUE.

                DO 870 LONVAL=LON,LON+LONST2,LONINC

                    PLON=LONVAL*C
                    CALL INVTES (PLAT,PLON,ISINV)
```

```
                IF (.NOT.ISINV) THEN

                    CALL LLTOXY (PLAT,PLON,X,Y)

                    IF (.NOT.INVALI) THEN

                        CALL CLIPXY (X,Y,NEWONS)

                        IF (LABSON.AND.FRSTPO.AND.NEWONS) THEN
                        FRSTPO=.FALSE.
                        IDEG=ABS(LATVAL)/60
                        MIN=MOD(ABS(LATVAL),60)

                        if (map) then
                            print*,'ideg,min',ideg,min,latval
                        endif

                        IF (MIN.GT.0) THEN
                            WRITE (LABELS,1825) IDEG,MIN
1825                        FORMAT(I3,1X,I2,'''')
                            LEN=LLEN
                        ELSE
                               IF(IDEG.LT.10) THEN
                                        WRITE(LABELS,1821)IDEG
                                        LEN=2
                               ELSE
                                        WRITE(LABELS,1822)IDEG
                                        LEN=3
                               ENDIF
1821                           FORMAT(I1)
1822                           FORMAT(I2)
                        ENDIF

                        IF (LATVAL.LT.0) THEN
                            LABELS(LEN:LEN)='S'
                        ELSE
                            LABELS(LEN:LEN)='N'
                        ENDIF

                        call gtext (x,y+ylatof,itype,len,labels)

                    ENDIF

                    IF (DOTEM) THEN

                      IF (NEWONS) THEN
                        CALL FPOINT(X,Y)
                        IF (NEWSEQ) NEWSEQ=.FALSE.
                      ENDIF

                    ELSE
                        CALL PROCPO (NEWSEQ,NEWONS,X,Y)

                    ENDIF

                ENDIF
            ENDIF
870     CONTINUE

        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    GRDLON
C
C FUNCTIONAL DESCRIPTION:       .
C
C CALLED BY:                    LLGRID
C
C PROGRAMMER:                   DATE OF LAST CHANGE      REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-
```

```
      subroutine grdlon (lat,latst2,latinc,latstp,plon,frstpo,
     +     ylonof,dotem,lonval)

c     draw one longitude grid line

      COMMON /CONST/ MAXVAL,RMPV,C,R,ERNM

      LOGICAL NEWONS,NEWSEQ
      LOGICAL ISINV
      LOGICAL DOTEM,FRSTPO
      COMMON /LABSON/ LABSON
      LOGICAL LABSON
      LOGICAL INVALI
      COMMON /INVALI/ INVALI
      CHARACTER*15 LABELS
      logical map
      common /mapdbc/ map

      DATA ITYPE/1/,LLEN/9/

      if (map) then
          print*,'  ',lat,latst2,latinc,latstp,plon,frstpo,
     +     ylonof,dotem
      endif
              NEWSEQ=.TRUE.

              DO 840 LATVAL=LAT-LATST2,LAT,LATINC

                  PLAT=LATVAL*C
                  CALL INVTES (PLAT,PLON,ISINV)

                  IF (.NOT.ISINV) THEN

                      CALL LLTOXY (PLAT,PLON,X,Y)

                      IF (.NOT.INVALI) THEN

                          CALL CLIPXY (X,Y,NEWONS)
                          IF (LABSON.AND.FRSTPO.AND.NEWONS) THEN

                            FRSTPO=.FALSE.
                            IDEG=ABS(LONVAL)/60
                            MIN=MOD(ABS(LONVAL),60)

                            if (map) then
                               print*,'ideg,min',ideg,min,lonval
                            endif
                          IF (MIN.GT.0) THEN
                              WRITE(LABELS,1825) IDEG,MIN
1825                          FORMAT(I3,1X,I2,'''')
                              LEN=LLEN
                          ELSE
                                   IF(IDEG.LT.10) THEN
                                            WRITE(LABELS,1821)IDEG
                                            LEN=2
                                   ELSEIF (IDEG.LT.100)THEN
                                            WRITE(LABELS,1822)IDEG
                                            LEN=3
                                   ELSE
                                            WRITE(LABELS,1823)IDEG
                                            LEN=4
                                   ENDIF
1821                               FORMAT(I1)
1822                               FORMAT(I2)
1823                               FORMAT(I3)
                          ENDIF

                          IF (LONVAL.LT.0) THEN
                              LABELS(LEN:LEN)='W'
                          ELSE
                              LABELS(LEN:LEN)='E'
                          ENDIF
```

```
                    call gtext (x,y+ylonof,itype,len,labels)

660               ENDIF

                  IF (DOTEM) THEN

                    IF (NEWONS) THEN
                      CALL FPOINT(X,Y)
                      IF (NEWSEQ) NEWSEQ=.FALSE.
                    ENDIF

                  ELSE
                      CALL PROCPO (NEWSEQ,NEWONS,X,Y)

                  ENDIF

                ENDIF
              ENDIF

840       CONTINUE

      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: GTEXT
C
C FUNCTIONAL DESCRIPTION:  OUTPUTS CHARACTER STRING AT CURRENT POSITION.
C
C INPUT FILES/PARAMETERS:
C
C        X                      REAL         X COORDINATE.
C        Y                      REAL         Y COORDINATE.
C        ITYPE                  INTEGER      SIZE PARAMETER.
C        NCHARS                 INTEGER      LENGTH OF STRING.
C        BBUF                   INTEGER(66)  STRING.
C
C GLOBAL VARIABLES : NONE.
C
C OUTPUT FILES/PARAMETERS:  NONE.
C
C SUBROUTINES/FUNCTIONS CALLED : NONE.
C
C CALLED BY:                    GRDLAT, GRDLON
C
C LOCAL VARIABLES: NONE.
C
C RESTRICTIONS: NONE.
C
C ABNORMAL RETURN CONDITIONS:   NONE.
C
C LOCATION:                     /a21/gjf/MAPSRC.FTN
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE GTEXT (X,Y,ITYPE,NCHAR,BBUF)

C     THIS SUBROUTINE OUTPUTS A CHARACTER ARRAY TO THE
C     CURRENT POSITION OF THE GRAPHIC CURSOR OF TYPE ITYPE.

      CHARACTER*(*) BBUF

      logical sys
      common /sysdbc/ sys
```

```
      if (sys) print *,'in gtext'
      call flushb
      CALL JMOVE (X,Y)
      CALL J1STRG (BBUF(1:NCHAR))

      RETURN
      END
C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    fmain
c
c  Functional Description:
C       CARICATURE and CELEBRATION main FORTRAN program.
c
c  Input Files/Parameters: N/A
c
c  Output Files/Parameters: N/A
c
c  Subroutines/Functions Called:
c      Note: Subroutines preceded by a "j" are explained in the DI-3000 manual
c
c  Called By: N/A
c
c  Local Variables: N/A
c
c  Restrictions: N/A
c
c  Abnormal Return Conditions:  N/A
c
c  Location:      /gl
c
c  Programmer         Date of Last Change       Reason for Change
c  L McCleary         Jan 1988                 sep amp & sys - fmain
c  C.S. Lamb          Jan 1988                 jclear logic - fmain
c
C-*-*-*-*-*-*-*-*-*-*-*-*-*-*-*-*-*-*-*-*-*-*-*-*-*-*-*-*-*-*-*-*-*-*-*|*-*-*-*-
C
      program fmain

C     main process for CARICATURE and CELEBRATION

      logical sys,txtsiz,metafl,nolabl,nologo,nobitm,malbox,batch
      logical vax,clr
      common /sysdbc/ sys
      common /txsdbc/ txtsiz
      common /metdbc/ metafl
      common /nlbdbc/ nolabl
      common /nlgdbc/ nologo
      common /nbtdbc/ nobitm
      common /mlbdbc/ malbox
      common /batdbc/ batch
      common /vaxdbc/ vax
      common /clrdbc/ clr
c     added by gre needed for calls to xsize
      common /txtsz/ txtsz
      real*8 dtor,stor
      common /dtor/ dtor,stor
      logical gmactv
      common /gmactv/ gmactv
      integer qdsdev,qpydev,qecho,qlecho
      common /device/ qdsdev,qpydev,qecho,qlecho
c     aspect ratio and virtual coordinate limits of viewspace
      common /aspect/ xaspec,yaspec,xvlow,xvhigh,yvlow,yvhigh
      character*50 defpth
      common /defpth/ defpth
      common /lendef/ lendef
      character*50 chatmp
      integer prtchoi(2)
      common /prtchoi/ prtchoi
      character*12 mapcho
      integer mfln
      common /mapcho/mapcho,mfln
      common /tablet/ inpdev
c     legend world coordinates, colors
      common /commen/xllmen,yllmen,xurmen,yurmen,ibcmen,iocmen,incmen
```

```
      common /commvp/ xllmvp,yllmvp,xurmvp,yurmvp
      logical bitmod
      common /bitmod/ bitmod
      logical qmapup
      common /mapup/qmapup
      logical ampflg,graflg,keyflg,legflg,menflg,popflg,
     +     sysflg,worflg,af(8)
      common /areaon/ ampflg,graflg,keyflg,legflg,menflg,popflg,
     +     sysflg,worflg,af
      logical exitfl
      integer trkndx (1000)
      common /trkndx/ trkndx
      character*160 trkrec (1000)
      common /trkrec/ trkrec
      logical segact (1000)
      common /segact/ segact
      logical LABSON
      common /LABSON/ LABSON
      logical logoon
      common /logoon/logoon
      logical mailfl(6)
      common/mlflag/mailfl
      dimension ltypov(16)
      logical ltonov(16),rankt(26,16)
      common /maptoo/ ltypov,ltonov,rankt
      logical overfl
      common/oneflg/oneflg
      logical oneflg
      Integer qmnum,qoldm
      Integer qdarry(500)
      Common /b3/ qdarry,qmnum,qoldm
      logical mesgon(1299)
      common /mesgon/ mesgon
c     segopen is only used with carjs.ftn on apollo
      common /segopen/  segopen
      logical segopen
      common /msgold/ msgold,msgonm
      logical lton(16),dotem
      integer ipgrid(4),ltyptb(16)
      common /map/ XRNM,XC,YC,LEVEL,CLAT,CLON,XRAD,YRAD,ITPROJ,
     +     IRES,LTYPTB,LUNDAT,LUNIND,LUNLIN,LTON,IPGRID,DOTEM,
     +     ORHALT
      logical mbxflg
      common /mbxflg/ mbxflg
      logical MBXACT
      common /MBXACT/ MBXACT, fstmsg

      mbxflg = .false.
 1    continue
c     initialize common variables with data statements or block data
       call inicom

c     initialize ctrl y testing on VAX only
c       call sictrly

      mapcho = 'default'
      mfln = 7
      ierror = 0
c     read file containing path names for default files & map
c     data along with idebug string
      call rpaths (8,'path.dat',ierror)
c     examine idebug and set up logicals
      call setdbg

      if (sys)
     + print*,'default path : ',defpth(1:lendef),lendef,idebug

c     define function keys
       call defkeys

C     ASSIGN THE REQUESTED GRAPHICS TERMINAL

c     print*,'Enter display device number if other than 1'
c     print*,'   Current AED512 assignments:'
```

```
c       print*,'        1 - ttyhc'
c       print*,'        2 - tty05'
c       read(*,1100) idev
c1100   format(i5)
c       if (idev.gt.1) qdsdev = idev

C       INITIALIZE_GRAPHICS
        if (txtsiz) then
                txtsz = 0.8
        else
                txtsz = 2.0
        end if
        if (sys) print*,'fmain - calling INIGRA'
        dtor = DATAN (1.0D0)
        dtor = dtor / 45.D0
        stor = dtor / 3600.0D0
        call inigra(ierr)
        call jdpint(1)
        if (metafl) then
           call inigm
           gmactv = .true.
        else
           gmactv = .false.
        endif
        if (nolabl) then
          labson = .false.
        else
          labson = .true.
        endif
        CALL JASPEK (qdsdev, RATIO)
        if (ratio.lt.1.) then
            xaspec = 1.
            yaspec = ratio
        else
            xaspec = ratio
            yaspec = 1.
        endif
        xvlow = -1.
        xvhigh = -1.+2.*xaspec
        yvlow = -1.
        yvhigh = -1.+2.*yaspec
        call jvspac (xvlow,xvhigh,yvlow,yvhigh)
        call saveco
C        call adjust
        chatmp = defpth(1:lendef) // 'default'
        lentmp = lendef + 7
        if (sys)  print*,'default path : ',chatmp(1:lentmp)
        call rbound (lentmp,chatmp)
c**     next two stmts were uncommented out 16aug - cas **
        call rconfg (lentmp,chatmp)
        call rcolor (lentmp,chatmp)
        call rsavpr (lentmp,chatmp)
        if (sys) print*,'Fmain -- calc vps'
        chatmp = defpth(1:lendef) // mapcho
        lentmp = lendef + mfln
        call rparam (lentmp,chatmp,.true.,ierror)

c       calculate viewport parameters
        call calgvp
        call calcvp
        call calavp
        call calbvp
        call calmvp
        call calkvp
        if (vax)        CALL JESCAP(9801,1,0,1,0)
        if (batch)      CALL JBGBAT(0)
        if (sys) print*,'Fmain -- make segm'
c**** CSL erase 10/87
c*** following calls recommended in inipic for Sun version *******
c ++++++++++++++++++++++++++++++++++++++++++++++++++++++++++
        if (.not. clr) then
c       clear areas and make retained segments
            call makful
            call makgra
```

```
            call makmen
            call makcom
            call makamp
            call makkey
            call makbox
            call maksho
        endif
c ++++++++++++++++++++++++++++++++++++++++++++++++++++++++++++
        if (sys) print*,'Fmain -- enable dev'
        call jienab (qdsdev,1,qpydev)
        call jienab (qdsdev,2,inpdev)
        call jienab (qdsdev,4,qpydev)
        call jienab (qdsdev,5,inpdev)
        if (nologo) then
         logoon = .false.
        else
         if (sys) print*,'Fmain -- call logo'
         logoon = .true.
c**** CSL erase 10/87
c*** following call recommended in inipic for Sun version *******
         if (.not. clr) call logo
        endif
        xllmen = 0.
        xurmen = 17.
        yllmen = 1.
        yurmen = 43.
c       set aspect ratio of menu world coordinates so the units are square
        xurmen = xllmen +
     +  (xurmvp - xllmvp) * (yurmen - yllmen) / (yurmvp - yllmvp)
        if (sys)
     +  print*,'fmain -- Menu World C.',xllmen,xurmen,yllmen,yurmen
        call init
        if (sys) print*,'after init'
        do 155 i=1,6
              if(mailfl(i))then
                    ltonov(i)=.true.
                    overfl =.true.
              end if
 155    continue
        if (.not. nobitm) then
                if (bitmod) then
                    call recdat (chatmp,lentmp)
                    call mapper (.false.)
                    CALL MAPOVR
                    qmapup = .true.
                endif
        else if(malbox .and. mbxflg) then
                call drwmap
                qmapup = .true.
        endif
c**** CSL erase 10/87
c*** following call recommended in inipic for Sun version *******
        if (.not. clr)  call keys
        if (batch)      CALL JENBAT
        if (popflg) then
            call pmainmn (exitfl)
        else
          if (batch) CALL JBGBAT(0)
c          if(overfl)then
c                call doverl(ltypov,ltonov)
c                print*,'doverl in fmain'
c          endif
          if(mailfl(5))then
                prtchoi(1) = 2
                prtchoi(2) = 4
                call printr
          endif
          call mhand
          if (batch) CALL JENBAT
        endif
        call jidisa (qdsdev,5,inpdev)
        call jidisa (qdsdev,4,qpydev)
        call jidisa (qdsdev,2,inpdev)
        call jidisa (qdsdev,1,qpydev)
```

```
C       SAVE_PARAMETER_FILE

c       call sparam (6,'noname',.true.,ierror)
        call wsavpr (lentmp,chatmp)

        if (metafl) call termgm
        CALL CLENUP
        if (sys) print*,'After clenup call'

        do 998 i = 1, numrcs
           if (trkndx(i) .eq. 0) then
              go to 999
           else
              print *, i,' ',segact(trkndx(i)),' ',trkrec(trkndx(i))
           end if
 998    continue
 999    continue
        if ((malbox) .and. mbxflg)then
             do 1000 i=1,500
                qdarry(i) = 0
1000         continue
             do 1001 i=1,1299
                mesgon(i) = .false.
1001         continue
             do 1002 i=1,16
                ltonov(i)=.false.
                lton(i) =.false.
                mailfl(i)=.false.
1002           continue
             segopen = .false.
             msgold = -1
             msgonm = -1
             qmapup = .false.
             overfl=.false.
             goto 1
       endif

C   END_MAIN_PROCEDURE

       END

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                        help
c
c  Functional Description:
c       display help msg
c
c  Input Files/Parameters:
c
c  Output Files/Parameters: N/A
c
c  Subroutines/Functions Called:
c
c  Called By: helper
c
c  Local Variables: N/A
c
c  Restrictions: N/A
c
c  Abnormal Return Conditions:  N/A
c
c  Location:
c
c  Programmer       Date of Last Change      Reason for Change
C  L. McCleary      Jan 1988                 separate amp & sys - help
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine help(msgno,menun)
c
c      subroutine to display help msgs
```

```
c
      Logical qcancl,qext2m,qretrn,qstmnu
      Common /b1/ qcancl,qext2m,qretrn,qstmnu,qnextm
      character cchar
      character*50 menpth
      common /menpth/ menpth
      common /lenmen/ lenmen
      common /msgold/ msgold,msgonm
      integer mysegn,helpno
      character*26 flettr
      character*80 filenm
      character*4 fname
      logical rflag,eof,eom,ERROR
      integer qfb(26),qmb(4)
      common /butons/ qfb,qmb
      logical sys,frame
      common /sysdbc/ sys
      common /frmdbc/ frame
      common /cmxlin/maxlin

      data msginc,meninc,maxnum /50,25,26/

      data mysegn/303/
      data flettr/'abcdefghijklmnopqrstuvwxyz'/
      data fname/'help'/
      data lname/4/
      if (sys) print*,'help -- enter ',msgno,menun
      call clrmsg
      rflag=.false.
      ifl=17
      if (msgno.eq.1.or.msgno.eq.121) then
c             menu help
              if (sys) print*,'  menu help', menun
              indlet=menun/meninc+1
              if (indlet.lt.1) indlet=1
              if (indlet.gt.maxnum) indlet=maxnum
              filenm=menpth(1:lenmen)//fname(1:lname)//
     x              flettr(indlet:indlet)//'.men'
              lennam=lenmen+lname+5
              helpno=menun
      else
c             msg help
              if (sys) print*,'  msg help', msgno
              indlet=msgno/msginc+1
              if (indlet.lt.1) indlet=1
              if (indlet.gt.maxnum) indlet=maxnum
              filenm=menpth(1:lenmen)//fname(1:lname)//
     x                flettr(indlet:indlet)//'.msg'
              lennam=lenmen+lname+5
              helpno=msgno
      endif
c     print*,'file selected is ',filenm
      call openit(filenm,lennam,ifl,0,ierror)
      if (ierror.ne.0) go to 40
c     display 1st page of help msg
      if (sys) print*, '  display first page '
      rewind ifl
      call fndhlp(ifl,helpno,eof,eom)
      call disp5(ifl,eof,eom)
      lineno=1
      if (.not.eof) then
10        continue
c             input user option
              call mpick(ichoice,mysegn,ibuttn)
15            continue
              if (sys) print*,'  after mpick',
     +            ichoice,mysegn,ibuttn,qfb(15),qfb(16)
              if (ibuttn.eq.qfb(15)) then
c                     display the next page of help msg
c                     print*,'display next page'
                      if (.not.eom.and..not.eof) then
                              call disp5(ifl,eof,eom)
                              lineno=lineno+maxlin
                      endif
```

```
                else if(ibuttn.eq.qfb(16)) then
c                       display the previous page of help msg
c                       print*,'display previous page'
                        IF (LINENO.GT.1)  THEN
                            lineno=lineno-maxlin
                            rewind ifl
                            call fndhlp(ifl,helpno,eof,eom)
                            if (.not.eof) then
                                do 20 i=1,lineno-1
                                        read(ifl,1000,err=30)cchar,msg
20                              continue
1000                            format(a1,a80)
                            endif
                            call disp5(ifl,eof,eom)
                        ENDIF
                else if (ibuttn.eq.qfb(23)) then
                        call clrcom
                        call mesg(47)
                        call BUTTN(IBUT)
                        call clrmsg
                        rewind ifl
                        call fndhlp(ifl,helpno,eof,eom)
                        if (.not.eof) then
                                do 60 i=1,lineno-1
                                        read(ifl,1000,err=30)cchar,msg
60                              continue
                        endif
                        call disp5(ifl,eof,eom)
                else
                    if (frame) then
c*******                 temporarily do a jframe before processing unknown button
                         call jframe
                    endif
                    call subchk (ibuttn,mysegn,error,rflag)
                endif
            if (.not.rflag) go to 10
            qretrn = .false.
            if (frame) then
c*******         temporarily do a jframe at end of help to clear screen
                 call jframe
            endif
        endif
c       if RETURN, leave help routine and redisplay previous menu and msg
        go to 50
30      continue
                print*,'read error on msg file'
                go to 50
40      continue
                print*,'open error on message file',helpno,ierror
50      continue
        call closit(ifl)
        call clrcom
        call mesg(msgno)
        if (sys) print*,'help -- exit '
        return
        end

C+*+*+*+*+*+*+*+*+*+*+*+*+*+*+*+*+*+*+*+*+*+*+*+*+*+*+*+*+*+*+*+*+*+*+|*+*+*+*+
c  UNIT NAME:                        helper
c
c  Functional Description:
c       performs help function by calling help with the current message
c       and  menu numbers
c
c  Input Files/Parameters:
c
c  Output Files/Parameters: N/A
c
c  Subroutines/Functions Called:
c
c  Called By:                        CHECK, PAWS
c
c  Local Variables: N/A
c
```

```
c  Restrictions: N/A
c
c  Abnormal Return Conditions:  N/A
c
c  Location:      Apollo      /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine helper (menu)
c
c       performs help function by calling help with the current message and
c       menu numbers
c
        common /msgold/ msgold,msgonm
c
        msgno = msgonm
        call help (msgno,menu)
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                     hilite
c
c  Functional Description:
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                     COLBAK, DETCON, FCFILL, PROCON, PRTMEN,
C                                 RESCON, RSLCON, TRKCON, CLASSN
C                                 FTRCON, GEOCON, OVRCON
c
c  Local Variables: N/A
c
c  Restrictions: N/A
c
c  Abnormal Return Conditions:  N/A
c
c  Location:       /a21/dave
c
c  Programmer        Date of Last Change       Reason for Change
c  L McCleary        Jan 1988               sep amp & sys - hilite
c
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine hilite (onflag,ichoic,width,len,table)

c     Highlight menu items

      integer ichoic,width,len,table(*),seg
      integer start,xend,array(19)
      real x1,x2,y1,y2,yhigh
      logical onflag,found
      common /commvp/ xllmvp,yllmvp,xurmvp,yurmvp
      common /commen/ xllmen,yllmen,xurmen,yurmen,ibcmen,iocmen,incmen
      logical sys,batch
      common /sysdbc/ sys
      common /batdbc/ batch

      IF (sys) then
            print*,' In Hilite '
            PRINT*,'ONFLAG = ',ONFLAG
            PRINT*,'ICHOIC = ',ICHOIC
            PRINT*,'WIDTH  = ',WIDTH
            PRINT*,'LEN    = ',LEN
      ENDIF
```

```
      IF (LEN .GT. 43) THEN
           PRINT*,' ERROR  IN PASSING PARAMETERS TO HILITE'
      ENDIF
c --- x1,y1,x2,y2 are calculated so as to draw a box around a menu
c --- item that is to be highlighted.--------------- <--- x=17.
c                                       |           |M |      y=43.
c                                       |GRAPHICS |EA|
c               ------------x2,y2       |AREA      |NR|
c               |  Hilite   |           |          |UE|
c               |  Box      |           |          | A|
c        x1,y1------------              -  x=0.-->----
c                                       |  y=1.      |
c                                       --------------
c
c --- The menu area goes from (0.,1.) to (17.,43.) (see diagram).
c --- The "y" values therefore range from 43. down to 1.  That means
c --- that 42 lines of text can fit in the menu area.  It has been
c --- estimated that 4 lines should be allowed for titles (at the top
c --- of the menu area) and 8 lines should be allowed for the con-
c --- struction box (the last 8 lines of the menu area).  That leaves
c --- 30 lines which are always available for menu items (15 double-
c --- spaced menu items).  Adjacent menu items are always supposed
c --- to be separated by a blank line to allow the highlight box to
c --- be drawn around the item.

c --- The following do loop searches each position of "table"
c --- looking for a match on "ichoic".  Since ichoic may be found
c --- in more than one position of table (i.e. the item may
c --- occupy more than one line in the menu), the starting position
c --- and ending position are saved in the appropriately named
c --- variables. (Note: the ending positioning is spelled "xend"
c --- because "end" is a reserved word in FORTRAN.)

      START = 1
      found = .false.
      do 50 i=1,len
         if (ichoic.eq.table(i)) then
            if (found) then
               xend = i
            else
               found = .true.
               start = i
               xend = i
            endif
         endif
   50 continue

c --- "yhigh" is the upper limit for the menu window in the
c --- y direction.
      yhigh = 43.

c --- If "ichoic" was found in "table", then calculate the lower
c --- left and upper right corners of the highlight box.
      if (found) then
         y2 = yhigh - (start - 1)
         y1 = yhigh - xend
c ------ The following adjustments are made so that the highlight
c ------ boxes of adjacent menu items do not touch (an adjustment
c ------ of 30% is made to the top and 40% to the bottom of each
c ------ box).
         y2 = y2 + .3
         y1 = y1 - .4
      endif


      if (width.eq.1) then
c ------ A "width" of 1 indicates that the menu item uses the
c ------ entire width of the menu area.
         x1 = .5
         x2 = 16.5
      elseif (width.eq.2) then
c ------ A "width" of 2 indicates that the menu item uses the
c ------ left quarter of the menu area (for color menus).
         x1 = .5
```

```
clj      x2 = 4.5
         x2 = 5.25
      elseif (width.eq.3) then
c ------ A "width" of 3 indicates that the menu item uses the
c ------ right quarter of the menu area (for color menus).
clj      x1 = 12.5
clj      x2 = 16.5
         x1 = 10.75
         x2 = 15.5
      elseif (width.eq.4) then
c ------ A "width" of 4 indicates that the menu item uses the
c ------ left half of the menu area.
         x1 = .5
         x2 = 8.
      elseif (width.eq.5) then
c ------ A "width" of 5 indicates that the menu item uses the
c ------ right half of the menu area.
         x1 = 9.
         x2 = 16.5
      endif

c --- Now draw the highlight box in the appropriate color (i.e. yellow
c --- to highlight and black to remove highlighting).

      call jvport (xllmvp,xurmvp,yllmvp,yurmvp)
      call jwindo (0.,17.,1.,43.)
c --- if requesting to turn segment on
      if (onflag) then
c ------ set segment number to a reserved hilite number
         if (width.eq.3) then
            seg = start + 31100
         else
            seg = START + 1019
         endif
c ------ if not already on  draw a rectangle as a hilite
         call jisgmt(seg,array)
         if (array(1) .eq. 0) then
            call jropen(seg)
            call jpintr (0)
            call xcolor (24)
            call jrect (x1,y1,x2,y2)
            call jrclos
            CALL JDETEC(seg,0)
         else
c ------ segment already on, do nothing
            if (sys) then
               print*,'TRYING TO HILITE ICHOIC ',ICHOIC,
     *         ',HOWEVER, CHOICE IS ALREADY ON '
            ENDIF
         endif

      else
c ------ requesting to turn segment off
         if (width.eq.3) then
            seg = start + 31100
         else
            seg = START + 1019
         endif
c ------ if it exists, purge it
         call jisgmt(seg,array)
         if(array(1) .eq. 1) then
          call jpurge(seg)
c          if (batch) then
             call jopen
             call jpintr (0)
c             call xcolor (8)
             call xcolor (ibcmen)
             call jrect (x1,y1,x2,y2)
             call jclose
c          endif
          if (sys) print*,'purging ',seg
         endif
      endif
```

```
      if (sys) print*,' Leaving Hilite ',START + 1019
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    HILPLT
C
C FUNCTIONAL DESCRIPTION:       .
C
C CALLED BY:                    TKINFO
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

      subroutine hilplt(lat,lon)
c
c
c     this subroutine hilites the plot at the input lat/lon to let the user
c     know which plot has been chosen for interrogation.  The hilite is a
c     diamond.
c

      character ewi
      character nsi
      character*7 lat
      character*8 lon
      integer*4 exlat
      integer*4 exlon
      real dx
      real dy
      real plat
      real plon
      real box
      real x
      real y
      logical isinv

c
c***  seperate the lat/long numbers from the nsi/ewi indicators
c
      read(lat,10) exlat,nsi
 10   format(i6,a1)
      read(lon,20) exlon,ewi
 20   format(i7,a1)
      call lltor (exlat,exlon,nsi,ewi,plat,plon)
      call invtes (plat,plon,isinv)
      if (.not.isinv) then
c
c***        draw the diamond with the center around the plot
c
            call lltoxy (plat,plon,x,y)
            box = 6.
            dx = x
            dy = y - box
            call jmove (dx,dy)
            dx = x + box
            dy = y
            call jdraw (dx,dy)
            dx = x
            dy = y + box
            call jdraw (dx,dy)
            dx = x - box
            dy = y
            call jdraw (dx,dy)
            dx = x
            dy = y - box
            call jdraw (dx,dy)
      endif
      return
      end
```

```
C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    HLDF
C
c FUNCTIONAL DESCRIPTION:       In CELEBRATION, HLDF is the
c                               interface to high level display
c                               files. This version is to give
c                               CARICATURE similar capability
c                               from the same calls to HLDF so
c                               that different versions of many
c                               modules don't have to be created
c                               for each of the software packages
C
C CALLED BY:                    INIPIC, INTSCN, RPLSCN, CLASSN, STORCL
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine hldf(choice,action,segid,pickid,flag)
      integer   choice,action,segid,pickid
      logical   flag
      integer   iseg
      common/contrl/qclass
      logical      qclass
      common/gphwdo/qgxmin,qgymin,qgxmax,qgymax
      real        qgxmin,qgymin,qgxmax,qgymax
      common /comgvp/ xllgvp,yllgvp,xurgvp,yurgvp
       if(choice .eq. 1)then
c-----------     in CELEBRATION this retrieves next opcode
       else if(choice .eq. 2)then
c-----------     in CELEBRATION this builds opcode & puts it in table
c-----------     in CARICATURE just needs to redraw map
                 flag=qclass
                 call drwmap
                 qclass=flag
                 if(flag)call dspcls(iseg)
       else if(choice .eq. 3)then
c-----------     in CELEBRATION this puts locator in table
       else if(choice .eq. 4)then
c-----------     in CELEBRATION deletes something by segid
       else if(choice .eq. 5)then
c-----------     in CELEBRATION modifies something by segid
       else if(choice .eq. 6)then
c-----------     in CELEBRATION searches by opcode
       else if(choice .eq. 7)then
c-----------     in CELEBRATION deletes allitems of opcode
       else if(choice .eq. 8)then
c-----------     in CELEBRATION creates external HLDF file
       else if(choice .eq. 9)then
c-----------     in CELEBRATION clears HLDF tables
       else if(choice .eq. 10)then
c-----------     in CELEBRATION compacts storage
       else
                 print*,'ERROR IN CHOICE TO HLDF'
       endif

       return
       end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                 hlsrgb
c
c  Functional Description:
c       converts hue/saturation/lightness color specifications to r/g/b
c
c  Input Files/Parameters:
c
c  Output Files/Parameters: N/A
c
c  Subroutines/Functions Called:
c      Note: Subroutines preceded by a "j" are explained in the DI-3000 manual.
c
```

```
c  Called By:
c
c  Local Variables: N/A
c
c  Restrictions: N/A
c
c  Abnormal Return Conditions:  N/A
c
c  Location:      /a21/dave
c
c  Programmer         Date of Last Change        Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine hlsrgb (icnt,ihue,isat,ilight,r,g,b)
c
c     converts hue/saturation/lightness color specifications to r/g/b
c
      integer ihue(1),isat(1),ilight(1)
      real r(1),g(1),b(1)
c
c     print*,'hlsrgb -- enter ',icnt,ihue(1),isat(1),ilight(1)
      do 110 i=1,icnt
          rhue = ihue(i)
          rt = isat(i)
          rsat = rt / 32768.
          rt = ilight(i)
          rlight = rt / 32768.
          if (rlight.gt.0.5) fact1 = rlight + rsat - (rlight *
     +    rsat)
          if (rlight.le.0.5) fact1 = rlight * (1.0 + rsat)
          fact2 = 2.0 * rlight - fact1
          r(i) = ddcval (fact2, fact1, rhue)
          g(i) = ddcval (fact2, fact1, rhue - 120.)
          b(i) = ddcval (fact2, fact1, rhue - 240.)
c         print*,ihue(i),isat(i),ilight(i),r(i),g(i),b(i)
  110 continue
c     print*,'hlsrgb -- exit ',r(10),g(10),b(10),ihue(10),
c    + isat(10),ilight(10),icnt
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                      hlssav

c  Functional Description:
c       this subroutine saves color values in a table
c
c  Input Files/Parameters:

c  Output Files/Parameters: N/A

c  Subroutines/Functions Called:

c  Called By:                      RCOLOR

c  Local Variables: N/A

c  Restrictions: N/A

c  Abnormal Return Conditions:  N/A
c  Location:      /a21/dave

c  Programmer         Date of Last Change        Reason for Change

C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine hlssav (indx,hue,rlight,satur)

c     this subroutine saves color values in a table
```

```
      real hlscol(3,0:255)
      common /hlscol/ hlscol

      if (indx .ge. 0 .and. indx .le. 255) then
          hlscol(1,indx) = hue
          hlscol(2,indx) = rlight
          hlscol(3,indx) = satur
      endif

      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    ICBEZ
C
C FUNCTIONAL DESCRIPTION:       .
C
C CALLED BY:                    APSMOO
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine icbez (npol,xp,yp,xc,yc,npts)

c     this subroutine calculates the coordinates (xc,yc) for npts on
c     a bezier curve.  the input data are the npol points of the bezier
c     polygon given in (xp,yp).  the float function is used to convert
c     the integers to real values for calculations.
c   VARIABLES:
c     xc/yc- arrays loaded with the calculated points from this routine
c     xp/yp- arrays with the points from the savefile (user's points)
c     nbez/nlim/t/deltat- used in calculations
c     fact- factorial function--returns a real variable
c  PROGRAMMER:  Nancy Detrich, A215, March, 1984

      real xc(*),yc(*),xp(*),yp(*)
      integer nbez,nlim
      real t,deltat,fact

c     set the number of points to be calculated (fewer input points,
c         calculate more points to get a smooth curve)
c     CAUTION-- length of xc array is set to 34, so npts cannot be set
c         larger than that!!
      if (npol .le. 5) then
       npts = 4 * npol
     else
       if (npol .le. 15) then
         npts = 2 * npol
       else
         npts = npol
       endif
     endif

c     the parametric iteration interval
      deltat = 1.0/float(npts-1)

c     first point of smooth line remains same as first point of polygon
      xc(1) = xp(1)
      yc(1) = yp(1)

c     the parameter nbez is one less than the number of points on the
c        polygon
      nbez = npol-1
      nlim = npts-1

c     calculate each point of the smooth line except first/last points
      do 2000 intep = 2,nlim
        t = (intep-1)*deltat
        xc(intep) = 0
        yc(intep) = 0
```

```
c         loop for each input point
          do 1000 j = 1,npol
            i = j-1
            bezbin = (fact(nbez))/(fact(i)*fact(nbez-i))
            bezwt = bezbin*(t**(i))*((1.0-t)**(nbez-i))

            xc(intep) = xc(intep)+xp(j)*bezwt
            yc(intep) = yc(intep)+yp(j)*bezwt
 1000     continue
 2000   continue

c       last point of smoothed line remains same as last point of polygon
        xc(npts) = xp(npol)
        yc(npts) = yp(npol)

        return
        end


C+*+*+*+*+*+*+*+*+*+*+*+*+*+*+*+*+*+*+*+*+*+*+*+*+*+*+*+*+*+*+*+*+*+*+*+|*+*+*+*+
c   UNIT NAME:                        ICINIT
c
c   Functional Description:           Subroutine to initialize certain symbol
c                                     variables
c
c   Input Files/Parameters:
c
c      General Globals
c          qicolr       colors     integer   current interior color
c          qocolr       colors     integer   current outline color
c
c      Icon Globals
c          qicseg       icon       integer   segment number for icon appear-
c                                            ing the construction box
c          qiconx       icon       real      x position of icon
c          qicony       icon       real      y position of icon
c          qicmir       icon       integer   denotes direction in which icon
c                                            is mirrored (0=x; 1=y; 2=none)
c          qicszx       icon       real      scaling factor for x points of
c                                            icon
c          qicszy       icon       real      scaling factor for y points of
c                                            icon
c
c   Output Files/Parameters:  N/A
c
c   Subroutines Called:    N/A
c
c   Called By:                     INIPIC
c
c   Local Variables:   N/A
c
c   Restrictions:    N/A
c
c   Abnormal Return Conditions:   N/A
c
c   Location:       stepc03      /w3/ssb/prototype/icons/icinit.f
c
c   Programmer          Date of Last Change       Reason for Change
c      ssb                  3/08/84                 initial entry
c
C-*-*-*-*-*-*-*-*-*-*-*-*-*-*-*-*-*-*-*-*-*-*-*-*-*-*-*-*-*-*-*-*-*-*-*-*-|*-*-*-*-

      subroutine icinit
c
      common/colors/qccolr,qicolr,qocolr
      integer qccolr,qicolr,qocolr
      common/icon/qicnum,qicseg,qiconx,qicony,qicszx,
     +            qicszy,qicrot,qicmir,qictyp,qconnx,qconny,
     +            qiconn
      integer qicnum(6),qicseg,qicmir,qictyp,qiconn
      real qiconx,qicony,qicszx,qicszy,qicrot
      real qconnx,qconny
      common/ictext/qictxt
      character*15 qictxt(8)
```

```
      qicseg=0

c     these have to be reset for symbols for release II,
c     otherwise the symbols use the color last set.

      qicolr = 104
      qocolr = 104

c     Set qiconx,qicony to 50,50 which is the center point
c     of the construction box.
      qiconx = 50.
      qicony = 50.
      qicszx = 1.
      qicszy = 1.
      qicrot = 0.
      qicmir = 2
      qiconn = 0
      qconnx = 0.
      qconny = 0.
      do 5 i = 1,8
         qictxt(i) = ' '
5     continue
      do 10 i = 1,6
         qicnum(i) = 0
10    continue
      return
      end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        INCDET
C
C FUNCTIONAL DESCRIPTION:           .
C
C CALLED BY:                        STATEC
C
C PROGRAMMER:                        DATE OF LAST CHANGE     REASON FOR CHANGE
c  S. Lamb                         Feb 1988               command fix - incdet
C
C-*-*-*-*-*-*-*-*-*-*-*-*-*-*-*-*-*-*-*-*-*-*-*-*-*-*-*-*-*-*-*-*-*-*-*|*-*-*-*-
c
        subroutine incdet
c
c       this subroutine is the increase detail state interpreter (21)
c
        common /states/ nextst
        logical wordis,iseoc
        character*6 curwdb
        common /curwdb/ curwdb
        integer detail(6)
        common /detail/ detail
        character postfix(6)
        integer current
        integer i
        integer next
        data postfix/'a','b','c','d','e','f'/
c
c
        initls = nextst
c       do until nextst not = initial state
 100    continue
            call getwrd
c * ** *** **** ***** ****** ******* change check order, etc.
            if (wordis('SCALE')) then
                nextst = 23
            else if (wordis('DETAIL').or.wordis('MAP')
    +                .or. iseoc()) then
c  ***          increase detail
                do 110 i=1,6
                     if(curwdb(6:6).eq.postfix(i)) then
                        current = i
                     endif
 110            continue
```

```
c               print*,'current state is ',postfix(current)
                next = current - 1
 120            continue
                if(next .gt. 0 .and. detail(next) .ne. 1) then
                     next = next - 1
                     goto 120
                else
                     continue
                endif
c               print*,'next level is ',postfix(next)
                if(next.gt.0) then
                     curwdb(6:6) = postfix(next)
                     call chawdb(6,curwdb)
                     nextst = 3
                else
c                     call drwamp(' ',1)                        - incdet
c ----- updated 7/31/87 CSL                                     - incdet
                     call drwamp('Most detail already in use ',1)
                     nextst = 1
                endif
           else
c  ***          increase detail
                do 130 i=1,6
                     if(curwdb(6:6).eq.postfix(i)) then
                          current = i
                     endif
 130            continue
                next = current - 1
 140            continue
                if(next .gt. 0 .and. detail(next) .ne. 1) then
                     next = next - 1
                     goto 140
                else
                     continue
                endif
                if(next.gt.0) then
                     curwdb(6:6) = postfix(next)
                     call chawdb(6,curwdb)
                     nextst = 3
                else
c                     call drwamp(' ',1)                        - incdet
c ----- updated 7/31/87 CSL                                     - incdet
                     call drwamp('Most detail already in use ',1)
                     nextst = 1
                endif
                call putwrd
           endif
       if (nextst.eq.initls) go to 100
c
       return
       end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     INCSCA
C
C FUNCTIONAL DESCRIPTION:        .
C
C CALLED BY:                     STATEC
C
C PROGRAMMER:                    DATE OF LAST CHANGE     REASON FOR CHANGE
c  S. Lamb                     Feb 1988                command fix - incsca
C
C-*-*-*-*-*-*-*-*-*-*-*-*-*-*-*-*-*-*-*-*-*-*-*-*-*-*-*-*-*-*-*-*-*-*-*|*-*-*-*-
c
       subroutine incsca
c
c      this subroutine is the increase scale state interpreter (23)
c
       common /states/ nextst
       logical wordis,iseoc
c      map parameters
       logical lton(16),dotem
       integer ipgrid(4),ltyptb(16)
```

```
      common /map/ XRNM,XC,YC,LEVEL,CLAT,CLON,XRAD,YRAD,ITPROJ,
     +    IRES,LTYPTB,LUNDAT,LUNIND,LUNLIN,LTON,IPGRID,DOTEM,
     +    ORHALT
c
      initls = nextst
c     do until nextst not = initial state
 100  continue
          call getwrd
c * ** *** **** ***** ****** ******* change check order, etc.
          if (wordis('DETAIL')) then
              nextst = 21
          else if (wordis('SCALE').or.wordis('MAP')
     +            .or. iseoc()) then
c             increase scale
              xrnmn = xrnm * 1.5
              call chscal (xrnmn)
              nextst = 3
          else
c             increase scale
              xrnmn = xrnm * 1.5
              call chscal (xrnmn)
              call putwrd
              nextst = 3
          endif
      if (nextst.eq.initls) go to 100
c
      return
      end
C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    inicom
c
c  Functional Description:
c       initialize common variables with data statements
c
c  Input Files/Parameters:
c
c  Output Files/Parameters: N/A
c
c  Subroutines/Functions Called:
c
c  Called By: fmain
c
c  Local Variables: N/A
c
c  Restrictions: N/A
c
c  Abnormal Return Conditions:  N/A
c
c  Location:
c
c  Programmer      Date of Last Change     Reason for Change
C  L. McCleary     Jan 1988                separate amp & sys - inicom
c
C-*-*-*-*-*-*-*-*-*-*-*-*-*-*-*-*-*-*-*-*-*-*-*-*-*-*-*-*-*-*-*-*-*-*-*-*|*-*-*-*-
c
       subroutine inicom

c      initialize common variables with data statements or use a block data

c     screen world coordinates
       common /comscr/ xllscr,yllscr,xurscr,yurscr
c     construction box world coordinates, colors
       common /combox/xllbox,yllbox,xurbox,yurbox,ibcbox,iocbox,incbox
c     menu world coordinates, colors
       common /commen/xllmen,yllmen,xurmen,yurmen,ibcmen,iocmen,incmen
c     legend world coordinates, colors
       common /comleg/xllleg,yllleg,xurleg,yurleg,ibcleg,iocleg,incleg
c     system area world coordinates, colors
       common /comsys/xllsys,yllsys,xursys,yursys,ibcsys,iocsys,incsys
c     graphics area world coordinates, colors
       common /comgra/xllgra,yllgra,xurgra,yurgra,ibcgra,iocgra
c     standard key area world coordinates, colors
       common /comkey/xllkey,yllkey,xurkey,yurkey,ibckey,iockey,inckey
c     amplification area world coordinates, colors
```

```
      common /comamp/xllamp,yllamp,xuramp,yuramp,ibcamp,iocamp,incamp
c     Pic amplification area world coordinates, colors
      common /compic/xllpic,yllpic,xurpic,yurpic,ibcpic,iocpic,incpic
c     graphics area virtual coordinates
      common /comgvp/ xllgvp,yllgvp,xurgvp,yurgvp
c     aspect ratio and virtual coordinate limits of viewspace
      common /aspect/ xaspec,yaspec,xvlow,xvhigh,yvlow,yvhigh
c     initialize common variables in states.ftn
      logical sketch,majorf,minorf
      common /statel/ sketch,majorf,minorf
      logical eofkey
      common /keylun/ keylun,newlun,eofkey
      logical quickd
      common /quickd/ quickd

c      common /cmenu/ imhigh,imoff,imstan,imnons
      common /ctext/ igrtxt,isytxt,iantxt
      common /tablet/ inpdev
      character*50 defpth
      common /defpth/ defpth
      common /lendef/ lendef
      character*50 mapath
      common /mapath/ mapath
      common /lenmap/ lenmap
      common /arsegs/ nsgmen,nsggra,nsgsys,nsgmsg,nsgmap,nsgful
      common /msgoff/ msgoff
      common /inewmn/ inewmn
      common /logseg/ nsglog
      common /nsgkey/ nsgkey,nsgktx
      common /csgamp/ nsgamp
      integer qfb(26),qmb(4)
      common /butons/ qfb,qmb
      integer qdsdev,qpydev,qecho,qlecho
      common /device/ qdsdev,qpydev,qecho,qlecho
      common /commvp/ xllmvp,yllmvp,xurmvp,yurmvp
      common/comwdo/qcxmn,qcymn,qcxmx,qcymx
      real qcxmn,qcymn,qcxmx,qcymx
      common/ampwdo/qaxmn,qaymn,qaxmx,qaymx
      real qaxmn,qaymn,qaxmx,qaymx
      common /cmxlin/maxlin
      common/scratr/qbox,qbkgrd,qmcolr
      integer qbox,qbkgrd,qmcolr
      common/segnum/qsegnm
      integer qsegnm
c     added by gre needed for calls to xsize
      common /txtsz/ txtsiz
      logical ampflg,graflg,keyflg,legflg,menflg,popflg,
     +      sysflg,worflg,af(8)
      common /areaon/ ampflg,graflg,keyflg,legflg,menflg,popflg,
     +      sysflg,worflg,af
      real*8 dtor,stor
      common /dtor/ dtor,stor
      integer ovseg, dfseg
      common /OVSEGS/ ovseg, dfseg
      COMMON /GRDSEG/ LLSEG,UTMSEG,GAUSEG
      INTEGER LLSEG,UTMSEG,GAUSEG
      common/ampprm/ampseg
      integer ampseg
      INTEGER   isecs,imins
      REAL      cc,cs
      COMMON    /c/ cc,isecs,cs,imins

      common /amfrst/ amfrst
      logical amfrst
      common /MBXACT/ MBXACT, fstmsg
      logical MBXACT, fstmsg

      integer bgnpos
      integer endpos
      integer numrcs
      integer tfaddx
      integer tfadtm
      integer tkoset
      integer tnewst
```

```
      integer toldst
      integer trkndx (1000)

      character*9 tfddtg
      character*9 tnewtm
      character*9 toldtm


      character*160 trkrec (1000)

      logical opnflg
      logical segact (1000)
      logical spprsd (1000)
      logical trkoff

      integer trklst(260)
      integer curseg(260)
      integer mrkcnt
      character*2 actmrk(260)
      character*9 boxdtg(260)
      logical boxvis(260)
      logical boxon
      integer boxcur

      common /colorm/ nonsel,iselec
      logical bitmod
      common /bitmod/ bitmod
      logical qmapup
      common /mapup/qmapup

      common /numrcs/ numrcs
      common /openfl/ opnflg
      common /segact/ segact
      common /spprsd/ spprsd
      common /tarbou/ tnewst, toldst
      common /tfadez/ tfaddx, tfadtm
      common /tfddtg/ tfddtg
      common /timpos/ bgnpos, endpos
      common /tkoset/ tkoset
      common /trcbou/ tnewtm, toldtm
      common /trkndx/ trkndx
      common /trkoff/ trkoff
      common /trkrec/ trkrec
      common /actmrk/ trklst,mrkcnt,actmrk,curseg,boxdtg,boxvis
      common /boxcur/ boxon,boxcur
c     aspect ratio and virtual coordinate limits of viewspace
      common /boxseg/ nsgbox,nsgsho,nsgcrm

      common /supflg/ supflg

c     initialize common areas for iosubs.ftn

      character*6 curwdb
      common /curwdb/ curwdb
      common /lenwdb/ lenwdb
      logical lton(16),dotem
      integer ipgrid(4),ltyptb(16)
      common /map/ XRNM,XC,YC,LEVEL,CLAT,CLON,XRAD,YRAD,ITPROJ,
     +     IRES,LTYPTB,LUNDAT,LUNIND,LUNLIN,LTON,IPGRID,DOTEM,
     +     ORHALT
      dimension ltypov(16)
      logical ltonov(16),rankt(26,16)
      common /maptoo/ ltypov,ltonov,rankt
      character*50 classi
      common /classi/ classi
      common /lencla/ lencla
      common /overly/ overtb
      logical overtb(16)
      character*80 savdes(20)
      common /savdes/ savdes
      common /maxsav/ maxsav,limsav
      real hlscol(3,0:255)
      common /hlscol/ hlscol
```

```
c     initialize common areas in mapsrc.ftn

      COMMON /CONST/ MAXVAL,RMPV,C,R,ERNM
      COMMON /PIE/ PIE,TPIE,PIO2,PIO4
      COMMON /ECCEN/ ECCEN,EC2
      COMMON /PROJT/ IGNOMN,IORTEQ,IORTPO,IORTHO,IPERSP
      COMMON /PROJT2/ IEQREC,IMERCA,ILAMCN
      COMMON /RADE/ RADE
      common /ltyps/ ltyps
      common /nmlim/ lunnam,areamn,areamx
      LOGICAL SAVEXY
      COMMON /STMSGS/ XPREV,YPREV,IRESSQ,XSAV,YSAV,SAVEXY
      logical gmactv
      common /gmactv/ gmactv

      COMMON /chscle/ scale,levtab,istptb,inctab
      DIMENSION SCALE(17)
      INTEGER LEVTAB(17),ISTPTB(17),INCTAB(17)
      COMMON /LABSON/ LABSON
      LOGICAL LABSON
c
c      initialize common for plotit
       logical nolobx
       common /nolobx/ nolobx
c      initialize common for drawel
       logical noelpl
       common /noelpl/ noelpl
      data ampflg/.true./,graflg/.true./,keyflg/.false./,
     + legflg/.true./,menflg/.true./,popflg/.false./,
     + sysflg/.true./,worflg/.false./,af/8*.false./
      data fstmsg/.true./
      data curwdb /'wdbiif'/,lenwdb/6/
      data classi/'UNCLASSIFIED'/,lencla/12/
      data keylun/28/,newlun/29/,eofkey/.false./
      data overtb/8*.true.,8*.false./
      data dotem/.true./
      DATA LUNDAT,LUNIND,LUNLIN/11,12,13/
      DATA ITPROJ/7/,ires/1/
      DATA LEVEL/1/,xrnm/4000/,orhalt/0./
      DATA LTON/.TRUE.,15*.false./
      data ltonov/16*.false./
      data rankt/.true.,415*.false./
      data ipgrid/1800,1800,180,180/
      DATA LTYPTB/34,35,36,37,38,39,48,41,69,43,44,44,45,44,46,47/
      data ltypov/16*152/
      data xc,yc,xrad,yrad/200,200,200,200/
      data maxsav/0/,limsav/20/
      data savdes/20*' '/
      data hlscol/768*0./
      DATA C/2.908882087E-4/
      DATA isecs/648000/
      DATA imins/10800/
      DATA cc/2.908882087e-4/

      DATA ERNM/3440.34/
      DATA RADE/57.2957795/
      DATA PIE/3.1415927/,TPIE/6.2831853/
      DATA PIO2/1.5707963/,PIO4/0.7853982/
      DATA IGNOMN/1/,IORTEQ/2/,IORTPO/3/,IORTHO/4/,IPERSP/5/
      DATA IEQREC/6/,IMERCA/7/,ILAMCN/8/
c     eccentricity of earth
      data eccen/0.016718/
      data ltyps/-1/
      data lunnam/16/,areamn,areamx/100.,25000./
      data savexy /.false./
      data ovseg,dfseg,llseg /0,0,0/
      data defpth/'/map/default/'/,lendef/13/
      data mapath/'/map/data/'/,lenmap/10/
      data qsegnm/1101/
      data nonsel,iselec /16,24/
c      data qbox,qbkgrd,qmcolr/32,0,7/
      data qbox,qbkgrd,qmcolr/32,8,7/
      data qcxmn,qcymn,qcxmx,qcymx/0.;0.,70.,4./
      data qaxmn,qaymn,qaxmx,qaymx/0.,0.,70.,4./
      data maxlin/4/
```

```
      data qdsdev,qpydev,qecho,qlecho/1,1,1,1/
c****** states.ftn data stmts
      data sketch,majorf,minorf/3*.false./
c     offset for start of message retained segment numbers
      data msgoff/30000/
      data nsgmen,nsggra,nsgsys,nsgmsg,nsgmap,nsgful
     + /310,311,312,313,314,315/
      data nsgbox /316/,nsgsho/317/,nsgcrm/318/,inewmn/0/
      data nsglog /319/
      data nsgkey /320/,nsgktx/321/
      data nsgamp /322/
      data inpdev/1/
c      data imhigh,imoff,imstan,imnons/20,21,22,19/
      data igrtxt,isytxt,iantxt/96,96,96/
      data
     + xllscr,yllscr,xurscr,yurscr/1.,1.,65.,41./
     + xllbox,yllbox,xurbox,yurbox,ibcbox,iocbox/49.,8.,65.,15.,56,16/
     + xllmen,yllmen,xurmen,yurmen,ibcmen,iocmen/49.,8.,65.,41.,56,16/
     + xllleg,yllleg,xurleg,yurleg,ibcleg,iocleg/32.,1.,65.,8.,56,16/
     + xllsys,yllsys,xursys,yursys,ibcsys,iocsys/1.,1.,49.,8.,56,16/
     + xllgra,yllgra,xurgra,yurgra,ibcgra,iocgra/1.,8.,49.,41.,25,16/
     + xllkey,yllkey,xurkey,yurkey,ibckey,iockey/49.,1.,65.,8.,56,16/
     + xllpic,yllpic,xurpic,yurpic,ibcpic,iocpic/1.,1.,65.,7.,25,16/
     + xllamp,yllamp,xuramp,yuramp,ibcamp,iocamp/1.,1.,54.,4.,56,16/

      data bgnpos /22/
      data boxon  /.false./
      data endpos /30/
      data numrcs /1000/
      data opnflg /.false./
      data segact /1000*.false./
      data spprsd /1000*.false./
      data tfaddx /0/
      data tfadtm /1440/
      data tfddtg /'000000000'/
      data tkoset /20000/
      data tnewst /0/
      data tnewtm /'000000000'/
      data toldst /0/
      data toldtm /'000000000'/
      data trkndx /1000*0/
      data trkoff /.false./
      data mrkcnt /0/
      data trklst /260*0/
      data trkrec /1000*' '/

c      DATA SCALE/50.,100.,200.,350.,450.,600.,750.,1000.,1500.,1750.,
c     +     2500.,3000.,4000.,6000.,8000.,10000.,11000./
c      DATA LEVTAB/99,3,2,1,1,1,1,1,1,1,1,1,1,1,1,1,1/
c      DATA ISTPTB/1,5,5,10,30,60,60,120,300,600,600,900,900,1800,
c     +     1800,1800,1800/
c      DATA INCTAB/1,1,2,5,5,10,10,30,60,60,90,90,180,180,180,180,
c     +     180/
      DATA SCALE /60.,350., 450.,600.,750., 1000.,1500.,1750.,
     +            2500.,3000.,4000., 6000.,8000.,10000.,
     +            11000.,12000.,13000./
      DATA LEVTAB/26,26,4,4,4,2,2,2,2,1,1,1,1,1,1,1,1/
      DATA ISTPTB/20,60, 300,300,300, 600,600,600,
     +            900,900,900, 1800,1800,1800,
     +            1800,1800,1800/
      DATA INCTAB/10,10, 60,60,60, 60,60,60,
     +            300,300,300, 300,300,300,
     +            300,300,300/
      DATA LABSON/.TRUE./
      DATA quickd/.TRUE./
      data nolobx /.false./
      data noelpl /.false./

      return
      end
```

```
C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                     inigra
c
c  Functional Description:
C       THIS SUBROUTINE INITIALIZES THE GRAPHIC DISPLAY
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                     FMAIN
c
c  Local Variables: N/A
c
c  Restrictions: N/A
c
c  Abnormal Return Conditions:  N/A
c
c  Location:      /a21/dave
c
c  Programmer        Date of Last Change        Reason for Change
c  S. Lamb           Feb 1988                   detec chg - inigra
c
C-*-*-*-*-*-*-*-*-*-*-*-*-*-*-*-*-*-*-*-*-*-*-*-*-*-*-*-*-*-*-*-*-*-*-*|*-*-*-*-
C
      SUBROUTINE INIGRA (IERR)

C     THIS SUBROUTINE INITIALIZES THE GRAPHIC DISPLAY

      integer qdsdev,qpydev,qecho,qlecho
      common /device/ qdsdev,qpydev,qecho,qlecho
      integer mbxres
      common /mbxres/ mbxres
      character*80 filnam
      integer keylun,newlun
      logical eofkey
      common /keylun/ keylun,newlun,eofkey
      logical mailfl(4)
      common/mlflag/mailfl
      character*6 command
c     *** This variable must be set to the number of planes
c         in the graphics frame buffer somehow in order to
c         use the bitmod flag to modify map display
      common /nplane/ nplane
      logical bit,rdkey,savkey,malbox
      common /bitdbc/ bit
      common /rkdbc/ rdkey
      common /svkdbc/ savkey
      common /mlbdbc/ malbox
      logical bitmod
      common /bitmod/ bitmod
      data irdwr/0/

c     print*,'OMSGS - INIGRA'
      if (rdkey) then
         call getfnm (lennam,filnam)
c        print*,'inigra -- ',lennam,'  ',filnam(1:lennam)
         call openit (filnam(1:lennam),lennam,keylun,irdwr,ierror)
         if (ierror.ne.0) then
            print*,'inigra -- error on open of read key file ',
     +      keylun,irdwr,ierror,'  ',filnam(1:lennam),lennam
            eofkey = .true.
         else
            eofkey = .false.
            call kpause (eofkey)
            read (keylun,*,end=192,err=191) command
            if (command(1:6).ne.'jbegin') then
               print*,'inigra -- incompatible command in save',
     +         ' file  ',command
c              *** exit on error
               go to 199
```

```
               endif
           endif
       endif
       go to 199
191    continue
           print*,'inigra -- error on read of save key file',
     +     ' ',keylun
           go to 199
192    continue
           print*,'Read key file is empty.'
           eofkey = .true.
199    continue
       if (savkey) then
           call openit ('save_keys',9,newlun,irdwr,ierror)
           if (ierror.ne.0) then
               print*,'inigra -- error on open of save_keys',
     +         newlun,irdwr,ierror
           else
               write (newlun,*,err=135) '''jbegin'''
           endif
       endif
       go to 140
135    continue
           print*,'inigra -- error on write to save key file',
     +     ' ',newlun
140    continue
       CALL JBEGIN
       call jseter (7)
c  *** Apollo specific subroutine loop for receiving mailbox
       if (malbox) then
          call inmail
          if (mbxres .eq. 1) then
              call sndmail
          end if
       endif
c  ***
       CALL JDINIT (qdsdev)
       CALL JDEVON (qdsdev)
       call jddete (0)
       if ((bit) .and.nplane.ge.4) then
           bitmod = .true.
       else
           bitmod = .false.
       endif

       RETURN
       END


C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                        inione
c
c  Functional Description:
c       initialize common variables
c
c  Input Files/Parameters:
c
c  Output Files/Parameters: N/A
c
c  Subroutines/Functions Called:
c
c  Called By: init
c
c  Local Variables: N/A
c
c  Restrictions: N/A
c
c  Abnormal Return Conditions:  N/A
c
c  Location:
c
c  Programmer        Date of Last Change      Reason for Change
C  L. McCleary       Jan 1988                 separate amp & sys - inione
c
C-*-*-*-*-*-*-*-*-*-*-*-*-*-*-*-*-*-*-*-*-*-*-*-*-*-*-*-*-*-*-*-*-*-*-*-*-*|*-*-*-*-
```

```
c
      subroutine inione
c
c     this subroutine can be used to initialize common blocks for
c     using the menu controllers and hldf
c
c
      common/dasegs/qdaseg
      integer      qdaseg

      common /label/ qlabel
      character *3   qlabel

      common/contrl/qclass
      logical qclass

      common/scratr/qbox,qbkgrd,qmback
      integer qbox,qbkgrd,qmback

      common/clsstr/qmajst,qcdwst,qcavst,qcurmj,qcurcw,qcurcv
      character *50 qmajst,qcdwst,qcavst(20),qcurmj,qcurcw,qcurcv(20)

      common/clindx/qmjidx,qarray
      integer qmjidx
      logical qarray(6)

      common/maxchr/qmxchr,qactul
      integer     qmxchr,qactul(4)

      common /nmbtxt/qtxtct
      integer qtxtct

      common/picks/qsegid,qpick,qmodfl
      integer     qsegid,qpick
      logical     qmodfl

      common/grfdef/qlclr,qlst1,qlst2,qlwid,qxsiz,qysiz,
     +      qcclr,qcfont,qtpath,qhjst,qvjst
      integer       qlclr,qlst1,qlst2,qlwid,qxsiz,qysiz,
     +      qcclr,qcfont,qtpath,qhjst,qvjst

      common/boxwdo/qbxmin,qbymin,qbxmax,qbymax
      real qbxmin,qbymin,qbxmax,qbymax

      common/mnuatr/qmcolr
      integer qmcolr

      common/milseg/qmilsg
      integer qmilsg(7)

c       getseg segment number range
        common /gtseg/qstart,qsgend
        integer qstart,qsgend

C SCALE COMMON BLOCKS
        Common /scale/qscclr,qscxy,qsctmp,qscseg,qsfacx
           Integer qscclr(3),qscseg(3)
           Real qscxy(3,2),qsctmp(3),qsfacx(3)
        Common /scltxt/qsctmv,qscid
           Character*5 qsctmv(3,3)
           character*2 qscid(3)
        Common /sclflg/qscflg
           Logical qscflg(3)

       common  /qprint/ qprint
       logical qprint
       common/flname/ qname, qdscrp
       character *50 qname
       character *60 qdscrp

       common /hitabl/ hitabl
       integer hitabl(43)
```

```
      qstart = 1100
      qsgend = 20000

      qprint = .false.

c*******set global variables which DO NOT change during execution

      qdaseg = 1100
      qmxchr = 50

c*****initialize screen attribute colors
c*****note: qbox and qbkgrd are now loaded from default.cfg by rconfg
c*****      since they have already been used by makgra etc.
c     qbox = 32
cC     qbkgrd = 0
c     qbkgrd = 8
      qmback = 5

c****** Classification variables

      qclass = .false.
c     qarray(1) = .true.
c     qarray(2) = .false.
c     qarray(3) = .false.
c     qarray(4) = .false.
c     qarray(5) = .false.
c     qarray(6) = .false.

c**** count of text blocks
      qtxtct = 0
      qmodfl = .false.

      qlclr = 104
      qlst1 = 1
      qlst2 = 1
      qlwid  = 32535
      call convwh(10.0,10.0,qxsiz,qysiz,1)
      qcclr = 104
      qcfont = 3
      qtpath = 1
      qhjst = 1
      qvjst = 1

c*****initialize construction box parameters
      qbxmin=-10.
      qbymin=-10.
      qbxmax=200.
      qbymax=200.
c*****initialize menu color
      qmcolr=28

c*****initialize military reserved segment numbers
      do 10 i=1,7
         qmilsg(i)=31000+i
 10   continue
c**** initialize hitabl to 0
      do 20 i = 1,43
         hitabl(i) = 0
 20   continue

c*****read files from INDEX into array
      call intind
c
c SCALE COMMON VARIABLES
      qsfacx(1) = 1.0
      qsfacx(2) = 1.0
      qsfacx(3) = 1.0
      qscflg(1) = .false.
      qscflg(2) = .false.
      qscflg(3) = .false.

c*******Set default file name and file description to all blanks
      qname( 1:50 ) = ' '
```

```
      qdscrp( 1:60 ) = ' '

      return
      end


C+*+*+*+*+*+*+*+*+*+*+*+*+*+*+*+*+*+*+*+*+*+*+*+*+*+*+*+*+*+*+*+*+*+*+|*+*+*+*+
c  UNIT NAME:                    inipic
c
c  Functional Description:
c       initialize variables for new picture
c
c  Input Files/Parameters:
c
c  Output Files/Parameters: N/A
c
c  Subroutines/Functions Called:
c
c  Called By: eramap, init, intscn
c
c  Local Variables: N/A
c
c  Restrictions: N/A
c
c  Abnormal Return Conditions:  N/A
c
c  Location:
c
c  Programmer      Date of Last Change     Reason for Change
C  L. McCleary     Jan 1988               separate amp & sys - inipic
C  C.S. Lamb       Jan 1988                jclear logic - inipic
c
C-*-*-*-*-*-*-*-*-*-*-*-*-*-*-*-*-*-*-*-*-*-*-*-*-*-*-*-*-*-*-*-*-*-*-*|*-*-*-*-
c
      subroutine inipic
c
c  -   this subroutine can be used to initialize common blocks
c      when beginning a new picture either from create or edit
c
c
     integer         segnum
c
     common /linatr/ qthick,qcolor,qstyle,qlsty2,qrohed
     integer         qthick,qcolor,qstyle,qlsty2,qrohed

     common /modlin/ qsgnum, qpikid, qcurln, qhiseg, qmdflg
     integer         qsgnum, qpikid, qcurln, qhiseg
     logical                                         qmdflg

     common /scgrid/ qlndot, qgrdsz, qgrdsg
     integer         qlndot, qgrdsz, qgrdsg

     common/colors/ qccolr,qicolr,qocolr
     integer qccolr,qicolr,qocolr

     common/segnum/qsegnm
     integer     qsegnm

     common/ampprm/ampseg
     integer ampseg

     common/mrkseg/dstsg1,dstsg2,dstsg3,dstfst
     integer dstsg1,dstsg2,dstsg3
     logical dstfst

     common/llseg/llsgmt,llfrst
     integer llsgmt
     logical llfrst

     common /amfrst/ amfrst
     logical amfrst

     common/contrl/qclass
     logical       qclass
```

```
      common/clindx/qmjidx,qarray
      integer qmjidx
      logical qarray(6)

      common/label/qlabel
      character*3  qlabel

      common/textfl/qftnot,qttlfl,qttl,qftn,qaxn
      logical      qftnot,qttlfl,qttl,qftn
      integer      qaxn

      common /txszay/ size
      real size(9)

      common/picks/qsegid,qpick,qmodfl
      integer      qsegid,qpick
      logical      qmodfl

      common /nmbtxt/qtxtct
      integer qtxtct

      common /comflg/qcmpfl
      logical qcmpfl

      common/arrow/qaline,qmaxln,qmaxpt,qheads,qmaxhd,qaflpt,qafill,
     +             qarcol,qaname,qmodln,qres,qmxres
      real qaline(10,21),qheads(5,9),qaflpt(2)
      integer qmaxln,qmaxpt(10),qmaxhd,qarcol,qaname,qmodln,
     +        qres(50),qmxres
      logical qafill

        common /qprint/ qprint
        logical qprint

       common/grfdef/qlclr,qlst1,qlst2,qlwith,qxsiz,qysiz,
     +               qcclr,qcfont,qtpath,qhjst,qvjst
        integer      qlclr,qlst1,qlst2,qlwith,qxsiz,qysiz,
     +               qcclr,qcfont,qtpath,qhjst,qvjst


c ----- legend common blocks
        common /legatr/ qlegfl,qcolin,qcolou,qlgfnt,qmodlg
        integer qcolin,qcolou,qlgfnt
        logical qlegfl,qmodlg

        common/legnos/qboxno,qsymno,qtxtno,qprtno
        integer qboxno,qsymno,qtxtno,qprtno

        common/legdim/qentry,qbordr,qinity,qtype,qtxtln,qtext,qydist,
     +               qytext,qlwide,qlclor,qinclr,qoclor,qmtype,
     +               qxscal,qyscal,qtclor,qahead
        integer qentry,qtype(10,6),qtxtln(10,2),qlwide(10),qahead(10)
        integer qlclor(10),qinclr(10),qoclor(10),qmtype(10),qtclor
        character*20 qtext(10,2)
        real qbordr,qinity,qydist,qytext,qxscal,qyscal
c -----

c scale common blocks
         common /scale/qscclr,qscxy,qsctmp,qscseg,qsfacx
            integer qscclr(3),qscseg(3)
            real qscxy(3,2),qsctmp(3),qsfacx(3)
         COMMON /SCLTXT/QSCTMV,QSCID
            CHARACTER*5 QSCTMV(3,3)
            CHARACTER*2 QSCID(3)
         common /sclflg/qscflg
            logical qscflg(3)
         common /scfrst/ qlstsc
            logical qlstsc
            common/change/qchang
            logical       qchang

            common /mapup/ qmapup
            logical qmapup
```

```
c grid common blocks

        common /grids/ qsw,qgtype,qgcolr,qxinc,qyinc
        real    qxinc(3),qyinc(3)
        logical   qsw(3)
        integer   qgcolr(3),qgtype(3)

        common/newgrd/newgrd,first
        logical newgrd,first

        integer qnmpts,qshade(60)
        real qlatt(60),qlonn(60)
        common /fills/ qnmpts,qlatt,qlonn,qshade

        integer qinpnm,qmax
        common /inpfil/ qinpnm,qmax

c       getseg segment number range
        common /gtseg/qstart,qsgend
        integer qstart,qsgend

        integer qlen
        character*80 qfilnm
        common /ovfnam/ qfilnm
        common /lenovf/ qlen

        common/filinp/qnum,qmknum,qxpos,qypos,qscal,qtyp,qintcl,qextcl
        integer   qnum,qmknum(100),qtyp(100),qintcl,qextcl
        real      qxpos(100),qypos(100),qscal(100)

        integer filseg
        common /dspseg/ filseg

        common/clsseg/qclssg
        integer qclssg

      common/chratr/qvert,qxbase,qybase,qxplan,qyplan,
     +              qhjust,qvjust,qcrpth,qxsize,qysize,
     +              qxxpos,qyypos,qfnum,qsdiam
      integer     qvert,qhjust,qvjust,qcrpth,
     +            qfnum,qxxpos(4),qyypos(4)
      real        qxbase,qybase,qxplan,qyplan,
     +            qxsize,qysize,qsdiam

        logical qlton(16),qdotem
        integer qpgrid(4),qtyptb(16)
        integer qlevel,qitpro,qires,qlunda,qlunin,qlunli
        real qxrnm,qxc,qyc,qclat,qclon,qxrad,qyrad,qorhal
        common /map/ qxrnm,qxc,qyc,qlevel,qclat,qclon,qxrad,qyrad,
     +     qitpro,
     +     qires,qtyptb,qlunda,qlunin,qlunli,qlton,qpgrid,qdotem,
     +     qorhal

        INTEGER QSYM
        COMMON /SYMUP/ QSYM

c       declare local variables
        integer array(19)
        logical hflag

c  serial number common bloc

        common/sernum/qserno,qserfl
        integer        qserno
        logical        qserfl

        character*50 defpth
        common /defpth/ defpth
        common /lendef/ lendef
        integer arrcnt
        common /arrcnt/arrcnt
```

```
c  free drawing

      common/fdrbgd/qseg,qpck,qbkgd
      integer     qseg,qpck
       logical     qbkgd

c  interrogation box

      logical boxon
      integer boxcur
      common /boxcur/ boxon,boxcur


c  common block to reinitialize track boxes (jit)

        character*2 actmrk(260)
        integer mrkcnt
        integer trklst(260)
        integer curseg(260)
        character*9 boxdtg(260)
        logical sys,vax,clr
        common /sysdbc/ sys
        common /vaxdbc/ vax
        common /clrdbc/ clr
        logical  boxvis(260)
        common /actmrk/ trklst,mrkcnt,actmrk,curseg,
     +                  boxdtg,boxvis

        logical bitmod
        common /bitmod/ bitmod
c**** CSL erase 10/87
c**** following recommended in Sun version *******
c ++++++++++++++++++++++++++++++++++++++++++++++++
        common /mesgon/ mesgon
        logical mesgon(1299)
        common /msgold/ msgold,msgonm
        integer msgold,msgonm
        common /logoon/ logoon
        logical logoon
        common /logseg/ nsglog
        integer nsglog
        Common /b6/ qcrmnu
        Integer qcrmnu
        Common /b3/ qdarry,qmnum,qoldm
        Integer qdarry(500),qmnum,qoldm
        integer j
        logical jerr
c ++++++++++++++++++++++++++++++++++++++++++++++++
c       set data areas
        data size /05.,7.,10.,12.,15.,17.,20.,22.,25./

        QSYM = 0

        qmdflg = .false.
        qlndot = 12
        qgrdsz = 13

        if (sys) print*,'inipic -- enter',qchang,qsegnm

        qmapup = .false.
        qnmpts = 0

        qinpnm = 0
        qintcl = 72
        qextcl = 80
        qmax = 10

c       delete retained segments

        if (sys) print*,'  purging old picture',qsegnm

c**** CSL erase 10/87 clear all segments at once => redraw boxes etc.
c**** following calls recommended in Sun version *******
```

```
c ++++++++++++++++++++++++++++++++++++++++++++++++++
      if (clr) then
        call jclear
        call makful
        call makgra
        call makmen
        msgold = 0
        call makcom
        call makamp
        call makkey
        call makbox
        call maksho
        do 101 j = 1, 500
 101    qdarry(j) = 0
        do 102 j = 1, 1299
 102    mesgon(j) = .false.
        j = qcrmnu
        if (j .eq. 0) then
           j=1
           call logo
           call jvisbl (nsglog,1)
        endif
        call keys
        qcrmnu = 0
        msgonm = -1
        if (logoon) then
           logoon = .false.
        else
          call drawm(j, jerr)
        endif
      endif
c ++++++++++++++++++++++++++++++++++++++++++++++++++
c       purge classification segment
        call jisgmt(qclssg,array)
        if (array(1).eq.1) call jpurge(qclssg)
        do 100 i = qstart,qsegnm
            call jisgmt(i,array)
            if(array(1) .eq. 1)  call jpurge(i)
 100    continue
c ----- updated 7/31/87 CSL
c        if ((.not. amfrst).and.(ampseg.ne.0)) call jpurge(ampseg)
        qchang = .false.
        qsegnm = qstart
c*******set flags to begin a new picture

        qprint = .false.

c*******text flags
        qftnot = .false.
        qttlfl = .false.
        qttl = .false.
        qftn = .false.
        qmodfl = .false.
        qtxtct = 0
        qfnum  = 1
        qxbase = 1.0
        qybase = 0.0
        qxplan = 0.0
        qyplan = 1.0
        qcrpth = 1
        qvert  = 1
        qysize = 10.0
        qxsize = 10.0
        qvjust = 1
        qhjust = 1
c******classification flags
        qclass = .false.
        qclssg = 0
c       qarray(1) = .true.
c       qarray(2) = .false.
c       qarray(3) = .false.
c       qarray(4) = .false.
c       qarray(5) = .false.
c       qarray(6) = .false.
```

```
c******compass flag
      qcmpfl = .false.

c****** free drawing
      qbkgd = .false.

c******serial number flags
      qserno = 0
      qserfl = .false.

c*****call other initialization routines
      call clrstr
c      call hldfin

c*****initialize reserved retained segments for arrows
      qmxres=0
c      qres(1)=31000
      do 5 i=1,50
c        qres(i)=31000+i
        call getseg(qres(i))
 5    continue
      qccolr=104
      arrcnt = 0

c*****initialize screen attribute colors
c     qbox = 37
c     qbkgrd = 3
c     qmback = 5

c scale common variables
        qsfacx(1) = 1.0
        qsfacx(2) = 1.0
        qsfacx(3) = 1.0
        qscflg(1) = .false.
        qscflg(2) = .false.
        qscflg(3) = .false.
        qlstsc = .true.
c grid common variables
C       if (.not. vax) qlton(16) = .false.
        do 26 i = 1,3
          qsw(i) = .false.
          qgcolr(i) = 224
 26     continue
        qsw(1) = .true.
        first = .true.
        newgrd = .false.
c
c       clear graphics area
c        call clrgra
c**** CSL erase 10/87 clear all segments at once => redraw boxes etc.
c**** following call recommended in Sun version *******
c +++++++++++++++++++++++++++++++++++++++++++++++++++
      if (.not. clr) call clrgra
c +++++++++++++++++++++++++++++++++++++++++++++++++++

        qthick = 16383
        qcolor = 16
        qstyle = 1
        qlsty2 = 1
        qrohed = 11

        call getseg (qcurln)
        call getseg (qgrdsg)
        call getseg (qhiseg)
c

c ----- no legend is in existence.
        qlegfl = .false.
c ----- this is not a modification.
        qmodlg = .false.
c ----- there are no legend entries.
        qentry = 0
c ----- use the simplest and fastest font initially.
        qlgfnt = 1
```

```
c ----- set text color to black initially.
        qtclor = 248
c ----- there is no amplification area, first is true
        amfrst = .true.
c ----- there is are no markers, first for these are true
        dstfst = .true.
        llfrst  = .true.
c ----- get the segment numbers for the legend box, the legend
c ----- symbols area, the legend text area, and the legend
c ----- box user prompts
C THESE HAVE BEEN MOVED TO LEGBOX TO PREVENT THE LEGEND FROM BEING OVERWRITEN
C BY OTHER SYMBOLS
c        call getseg(qboxno)
c        call getseg(qsymno)
c        call getseg(qtxtno)
c        call getseg(qprtno)


c ----- initialize symbol (icon) variables.
        call icinit

c ----- initialize the current interior and outline
c ----- colors to red
        qicolr = 104
        qocolr = 104

c       get the segment number for the text shown in
c       the message area
        call getseg(filseg)

c       initialize timeline common blocks
        call initim

c       initialize hldf common blocks using dummy variables
c       these are set in fmain so no need to re init here - cas

        call hldf(9,iact,iseg,ipick,hflag)

c     jit: reinitialize the track boxes to new values.
c          these new segment numbers retain the
c          visibility flag of the old segment for that box.
c          This is to preserve the attributes of fade or
c          suppression.  Also, set boxon to false for interrogation.

        boxon = .false.

        do 10 i = 1,mrkcnt
           call getseg(segnum)
           curseg(i) = segnum
  10    continue

        if (bitmod) then
            call enall
            call gravpt
            call boxclr
            call soverl
        endif

        return

        end

C+*+*+*+*+*+*+*+*+*+*+*+*+*+*+*+*+*+*+*+*+*+*+*+*+*+*+*+*+*+*+*+*+*+*+*+*+*|*+*+*+*+
C* UNIT NAME:                         init
C*
C* FUNCTIONAL DESCRIPTION:
C*
C*   This subroutine initializes variables
C*
C*
C* INPUT FILES/PARAMETERS:
C*
C*       user input
C*
```

```
C* OUTPUT FILES/PARAMETERS:
C*
C*     Global Variables
C*       qcancl            logical; cancel flag
C*       qcr               integer; contains the asci value for the
C*                                  carriage return
C*       qcrmnu            integer; contains the current menu number
C*       qdarry            logical; array of flags which shows if a
C*                                  menu segment has been created for a
C*                                  particular menu
C*       qext2m            logical; exit to main menu flag
C*       qexitg            logical; flag to exit graphics system
C*       qfb         integer array; contains the asci values for the
C*                                  function buttons, the button number
C*                                  corresponds to the array location
C*       qmb         integer array; contains the asci values for the
C*                                  mouse buttons
C*       qmloc             integer; contains the current location in the
C*                                  qstack array
C*       qmnum             integer; contains the menu number of the menu
C*                                  being displayed when the DRAWM
C*                                  routine is called
C*       qmodfl            logical; modify flag for the HLDF
C*       qmxary            integer; contains the size of the qdarry array
C*       qmxst             integer; contains the size of the qstack array
C*       qnextm            integer; contains the number of the next menu
C*                                  to be displayed
C*       qoldm             integer; contains  the number of the previous
C*                                  menu displayed
C*       qpick             integer; contains a pick id being passed back
C*                                  from DI3000
C*       qretrn            logical; return to previous menu flag
C*       qsegid            integer; contains a segment id being passed
C*                                  back from DI3000
C*       qsegnm            integer; contains the current segment id
C*       qstack            integer; array which contains the menu numbers
C*                                  of previous menu displayed
C*       qstmnu            logical; flag to put current menu on the stack
C*
C*
C* RESTRICTIONS:
C*
C*      The user must enter mouse or joystick when prompted for
C*      device choice.
C*
C* SUBROUTINES CALLED:
C*
C*      mhand              subroutine; drives the menu interface of the
C*                                     A21PROTOTYPE
C*      setvar  block data routine; initializes control variables
C*
C*      mesg               subroutine; places appropriate message in
C*                                     communications area
C*
C* CALLED BY:                  FMAIN, INIGM
C*
C* LOCAL VARIABLES:
C*
C*      no local variables
C*
C* ABNORMAL RETURN CONDITIONS:
C*
C*      A user error occurs if the user enters a device name other
C*      then mouse or joystick for device choice.
C*
C* LOCATION:
C*
C*      /u2/vcn/a21proto/maind
C*
C* PROGRAMMER:             DATE OF LAST CHANGE:    REASON FOR CHANGE:
C*
C*  VCNewton                15 August 1983          initial entry
C*
C-*-*-*-*-*-*-*-*-*-*-*-*-*-*-*-*-*-*-*-*-*-*-*-*-*-*-*-*-*-*-*-*-*-*-*-*|*-*-*-*-
```

```
      Subroutine INIT

C     This subroutine initializes menu handler variables

C        (**Declare common blocks and common block variables**)
         Integer qcrmnu,qmxary,qmxst,qmloc,qmnum,
     +           qnextm,qoldm,qpick,qsegid,qsegnm,qstack(10)
         Logical qcancl,qext2m,qexitg,qmodfl,qretrn,qstmnu
         Integer qdarry(500)
         Common /b1/ qcancl,qext2m,qretrn,qstmnu,qnextm
         Common /b2/ qstack
         Common /b3/ qdarry,qmnum,qoldm
         Common /b4/ qmloc
         Common /b5/ qexitg
         Common /b6/ qcrmnu
         Common /b7/ qmxst
         Common /b8/ qmxary
         common/picks/qsegid,qpick,qmodfl
         Common /segnm/ segnm
         data qstack,qdarry/10*0,500*0/

C        (**Initialize variables needed for menu controllers**)
         Call inione
C        (**Initialize control variables**)
         Call SETVAR
C        (**Initialize other variables declared**)
         qcrmnu=0
         qexitg=.false.
         qmxary=500
         qmxst=10
         qmnum=0
C        qmodfl=.false.
         qoldm=0
         qpick=0
         qsegid=0
         qsegnm=1000
C        (**Initialize menu controller variables**)
         call inipic
c
c        (**Initialize variables for test of individual menus**)
c
         call tstini

      End

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                         INITIM
C
C FUNCTIONAL DESCRIPTION:            .
C
C CALLED BY:                         INIPIC
C
C PROGRAMMER:                        DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        subroutine initim
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                         INMAIL
C
C FUNCTIONAL DESCRIPTION:            .
C
C CALLED BY:                         INIGRA
C
C PROGRAMMER:                        DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        subroutine inmail
```

```
c
c       initialize mail function for Apollo version
c
        integer mbxres
        common /mbxres/ mbxres
        logical MBXACT, fstmsg
        common /MBXACT/ MBXACT, fstmsg
c
c        print*,'in inmail'
        mbxres = 0
        if(fstmsg) then
c             print*,'in inmail,first message,call openmail
            call opmail(mbxres)
            fstmsg = .false.
        else
c             print*,'in inmail, call checkmail'
            call chekml(mbxres)
        endif
c
c  mbxres = 0   no channel to be opend, assume normal nsagrf
c  mbxres = 1   successful in opening mailbox channel
c
c       print*,'inmail -- exit'
        return
        end

C+*+*+*+*+*+*+*+*+*+*+*+*+*+*+*+*+*+*+*+*+*+*+*+*+*+*+*+*+*+*+*+*+*+*|*+*+*+*+
C UNIT NAME:                    INQSTA
C
C FUNCTIONAL DESCRIPTION:       .
C
C CALLED BY:                    STATEC
C
C PROGRAMMER:                   DATE OF LAST CHANGE     REASON FOR CHANGE
c  S. Lamb                    Feb 1988             command fix - inqsta
C
C-*-*-*-*-*-*-*-*-*-*-*-*-*-*-*-*-*-*-*-*-*-*-*-*-*-*-*-*-*-*-*-*-*-*-*|*-*-*-*-
c
        subroutine inqsta
c
c       this subroutine is the inquire state interpreter (4)
c
        common /states/ nextst
        logical wordis
c
        initls = nextst
c       do until nextst not = initial state
  100   continue
            call getwrd
            if (wordis('IS').or.wordis('THE').or.wordis('CURRENT'))
     +          then
c * ** *** **** ***** ****** ******* not understood / implem.
                nextst = 15
            else if (wordis('PROJECTION')) then
                nextst = 5
            else if (wordis('SCALE')) then
                nextst = 6
            else if (wordis('CENTER')) then
                nextst = 7
            else
                call putwrd
                nextst = 15
            endif
        if (nextst.eq.initls) go to 100
c
        return
        end
```

```
C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      INTIND
C
C FUNCTIONAL DESCRIPTION:         .
C
C CALLED BY:                      INIONE
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

      subroutine intind
      return
      end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      INTSCN
C
C FUNCTIONAL DESCRIPTION:         ENLARGES PICTURE TO FULL SCREEN
C                                  AND CONVERTS SCREEN FOR BW PRINTOUT
C
C INPUT FILES/PARAMETERS:
C
C                    COMMON
C    VARIABLE        BLOCK         TYPE        DESCRIPTION
C
C     XLLGVP         COMGVP        REAL     LOWER LEFT X OF ORIGINAL VIEWPORT
C     YLLGVP         COMGVP        REAL     LOWER LEFT Y OF ORIGINAL VIEWPORT
C     XURGVP         COMGVP        REAL     UPPER RIGHT X OF ORIGINAL VIEWPORT
C     YURGVP         COMGVP        REAL     UPPER RIGHT Y OF ORIGINAL VIEWPORT
C     QCRMNU         B6            INTEGER  CURRENT MENU NUMBER
C     XVLOW          ASPECT        REAL     LOWER LEFT X-CORNER OF SCREEN
C     YVLOW          ASPECT        REAL     LOWER LEFT Y-CORNER OF SCREEN
C     XVHIGH         ASPECT        REAL     UPPER RIGHT X-CORNER OF SCREEN
C     YVHIGH         ASPECT        REAL     UPPER RIGHT Y-CORNER OF SCREEN
C
C OUTPUT FILES/PARAMETERS:        NONE
C
C                    COMMON
C    VARIABLE        BLOCK         TYPE        DESCRIPTION
C
C     SXLLGP         SAVGVP        REAL     LOWER LEFT X OF ORIGINAL VIEWPORT
C     SYLLGP         SAVGVP        REAL     LOWER LEFT Y OF ORIGINAL VIEWPORT
C     SXURGP         SAVGVP        REAL     UPPER RIGHT X OF ORIGINAL VIEWPORT
C     SYURGP         SAVGVP        REAL     UPPER RIGHT Y OF ORIGINAL VIEWPORT
C     SAVMNU         SAVMNU        INTEGER  MENU NUMBER OF CURRENT MESSAGE
C                                           BEFORE SCREEN WAS ENLARGED
C
C SUBROUTINES/FUNCTIONS CALLED
C
C    INIPIC        INITIALIZE VARIABLES FOR DRAWING NEW PICTURE
C    HLDF          RETRIEVES FILE FOR DISPLAY (CURRENT PICTURE)
C    STORE         STORES THE PICTURE IN AN HLDF FILE
C    JVSALL        MAKE ALL SEGMENTS INVISIBLE
C    CLRFUL        CLEAR FULL SCREEN
C
C CALLED BY:                    PRINTR
C
C LOCAL VARIABLES:
C
C    VARIABLE              TYPE        DESCRIPTION
C
C     LOG                 LOGICAL      FLAG SET BY HLDF (NOT NEEDED)
C     OCHANG              LOGICAL      SAVE QCHANG
C
C RESTRICTIONS:
C
C
C ABNORMAL RETURN CONDITIONS:   N/A
C
C
```

```
C PROGRAMMER:                    DATE OF LAST CHANGE     REASON FOR CHANGE
C
C     DABUTSON                       11/13/84              INITIAL ENTRY
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE INTSCN
C
C ENLARGES THE DISPLAY AREA TO FULL SCREEN AND SAVES HLDF FILE
C
      common/oneflg/oneflg
      logical oneflg
      common /coltab/ coltab
      integer coltab(256)
      common/contrl/qclass
      logical       qclass
      common /coltobw/ coltobw
      logical       coltobw

      COMMON /COMGVP/ XLLGVP,YLLGVP,XURGVP,YURGVP
      COMMON /SAVGVP/ SXLLGP,SYLLGP,SXURGP,SYURGP
      COMMON /ASPECT/ XASPEC,YASPEC,XVLOW,XVHIGH,YVLOW,YVHIGH
      COMMON /ARSEGS/ NSGMEN,NSGGRA,NSGSYS,NSGMSG,NSGMAP,NSGFUL

      COMMON /QPRINT/QPRINT
      LOGICAL QPRINT

      COMMON/CHANGE/QCHANG
      LOGICAL       QCHANG

      COMMON/FLNAME/QNAME,qdscrp
      CHARACTER *50 QNAME
      character*60 qdscrp

        LOGICAL QLTON(16),QDOTEM
        INTEGER QPGRID(4),QTYPTB(16)
        INTEGER QLEVEL,QITPRO,QIRES,QLUNDA,QLUNIN,QLUNLI
        COMMON /MAP/ QXRNM,QXC,QYC,QLEVEL,QCLAT,QCLON,QXRAD,QYRAD,
     +       QITPRO,
     +       QIRES,QTYPTB,QLUNDA,QLUNIN,QLUNLI,QLTON,QPGRID,QDOTEM,
     +       QORHAL

      INTEGER QCRMNU
      COMMON /B6/ QCRMNU

      INTEGER QBOX,QBKGRD,QMBACK
      COMMON /SCRATR/ QBOX,QBKGRD,QMBACK

      COMMON /SAVMNU/ SAVMNU
      INTEGER SAVMNU
      integer prtchoi(2),featbk,featw,int,ierror
      common /prtchoi/ prtchoi

      CHARACTER*50 SVNAM
      LOGICAL LOG,OCHANG,tmpcls,savgrid
      common/label/qlabel
      character*3  qlabel

      common /msgold/ msgold,msgonm
      common /commvp/ xllmvp,yllmvp,xurmvp,yurmvp
      common /comkvp/ xllkvp,yllkvp,xurkvp,yurkvp
      common /comcvp/ xllcvp,yllcvp,xurcvp,yurcvp
      common /commen/xllmen,yllmen,xurmen,yurmen,ibcmen,iocmen,incmen
      common /nsgkey/ nsgkey,nsgktx
      common /pmenu/ pmenu,pmsg
      integer pmenu,pmsg
      logical qmapup
      common /mapup/ qmapup

      ierror = 0

C
C --- SAVE MAP VIEWPORT AND CURRENT MENU
C
```

```
      SXLLGP = XLLGVP
      SYLLGP = YLLGVP
      SXURGP = XURGVP
      SYURGP = YURGVP
      SAVMNU = QCRMNU

C
C --- STORE THE PICTURE
C
      OCHANG = QCHANG
      QCHANG = .TRUE.
      CALL STORE

C
C ---- CHANGE MAP VIEWPORT
C
      if(prtchoi(1).eq.2) then
         XLLGVP = XVLOW
         YLLGVP = YVLOW
         XURGVP = XVHIGH
         YURGVP = YVHIGH
      endif
C
C ---- CLEAR SCREEN AND INITIAL ALL NEEDED VARIABLES FOR A PICTURE
C
      if(.not.coltobw .or. (coltobw.and.qlabel.ne.'GEO')) then
         tmpcls=qclass
         savgrid = qlton(16)
         CALL INIPIC
         qclass=tmpcls
         qlton(16) = savgrid
      endif
      QCHANG = OCHANG
      QPRINT = .TRUE.
      if(prtchoi(1).eq.2) then
         CALL JVSALL(0)
         CALL CLRFUL
      else
c          call mesg(614)
      endif


      if (coltobw) then
        oneflg = .true.
        featbk = QTYPTB(8)
        featw  = QTYPTB(9)
        iboxtp = qbox
        qbox = 0
        QTYPTB(8) = 0
        QTYPTB(9) = 0
      endif


      if(coltobw) then

        if(qlabel .eq. 'GEO') then
           call UPDTMP
        else
           call HLDF (2,18,1,1,LOG)
clj ------ If not printing in full screen mode, then rewrite
clj ------ the filename so that it appears on the hardcopy.
           if(prtchoi(1).eq.1) call dspfln ( qname )
        endif

c         if(prtchoi(1).eq.1) then
c ---       REDRAW MENU,KEY,AND COMM. AREAS
c
c            call tmpcma (qname,pmsg)
c
c            call jvport (xllmvp,xurmvp,yllmvp,yurmvp)
c            call jwindo (xllmen,xurmen,yllmen,yurmen)
c            call jopen
c            call jrect (xllmen,yllmen,xurmen,yurmen)
c            Call tmpmen(pmenu,ierror)
```

```
c          call jclose
c
c          tmp = yurmen
c          yurmen = 8.
c          call keyvpt
c          call menwin
c          call jopen
c          call jrect (xllmen,yllmen,xurmen,yurmen)
c          call tmpmen (nsgktx,ierror)
c          yurmen = tmp
c          call jclose
c
c       endif

      else

        CALL HLDF(2,18,1,1,LOG)
      endif


      if (coltobw) then

        qbox = iboxtp
        QTYPTB(8) = featbk
        QTYPTB(9) = featw
        oneflg = .false.
      endif

      QPRINT = .FALSE.

C
C ---- COPY HLDF FILE TO SYSTEM ADMINSTRATOR'S DIRECTORY
C
      SVNAM = QNAME
      CALL SYSNAM(SVNAM,QNAME)
      CALL HLDF(8,INT,INT,INT,LOG)
      QNAME = SVNAM
      RETURN
      END

C+*+*+*+*+*+*+*+*+*+*+*+*+*+*+*+*+*+*+*+*+*+*+*+*+*+*+*+*+*+*+*+*+*+*+*+*+|*+*+*+*+
C UNIT NAME:                        INVTS2
C
C FUNCTIONAL DESCRIPTION:
C -             CHECKS MERCATOR AND EQUIRECTANGULAR FOR LINES
C -             TO BE CLIPPED AT LEFT AND RIGHT OF SCREEN.
C
C CALLED BY:                        NO LONGER USED BY CARICATURE
C
C PROGRAMMER:                       DATE OF LAST CHANGE     REASON FOR CHANGE
c -   L MCCLEARY                                            ORIGINAL CODE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE INVTS2(TRLAT,TRLON,X,Y,PRVLON,PRVX,ISGOOD)

        LOGICAL ISGOOD
        LOGICAL INVALI
        COMMON/INVALI/INVALI
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        COMMON /PROJT/ IGNOMN,IORTEQ,IORTPO,IORTHO,IPERSP
        COMMON /PROJT2/ IEQREC,IMERCA,ILAMCN
        COMMON/PIE/PIE,TPIE,PIO2,PIO4

        C =2.908882087E-4

C      SPECIAL LOGIC FOR MERCATOR AND EQUIRECTANGULAR TO PREVENT THE
C      CONNECTION OF TWO POINTS WHICH SHOULD ONLY BE JOINED BY CLIPPING
```

```
C       TO THE LEFT AND RIGHT OF THE SCREEN
        IF(ITPROJ.EQ.IEQREC.OR.ITPROJ.EQ.IMERCA) THEN
             ISGOOD=.TRUE.
             PRVLN=0.
             TRLN=0.
C       CHECK FOR SAME SIGN OF X,PRVX
             IF(ABS(PRVX+X).EQ.ABS(PRVX)+ABS(X)) GO TO 14
C       IF ABS(LON) .GE. 90 DEG , ADD OR SUB 360 DEPENDING ON CLON SIGN
             IF(ABS(TRLON).LT.PIO2) THEN
                 TCON=0.
             ELSE
                 TCON=TPIE
             ENDIF
             IF(CLON.GE.0) THEN
                 IF(TRLON.GE.0) THEN
                   TRLN=TRLON
                 ELSE
                   TRLN=TRLON+TCON
                 ENDIF
                 IF(PRVLON.GE.0) THEN
                   PRVLN=PRVLON
                 ELSE
                   PRVLN=PRVLON+TCON
                 ENDIF
             ELSE
                 IF(TRLON.LT.0) THEN
                   TRLN=TRLON
                 ELSE
                   TRLN=TRLON-TCON
                 ENDIF
                 IF(PRVLON.LT.0) THEN
                   PRVLN=PRVLON
                 ELSE
                   PRVLN=PRVLON-TCON
                 ENDIF
             ENDIF
C       REJECT IF LONS MORE THAN 180 DEG APART
             IF(ABS(TRLN-PRVLN).GE.PIE) THEN
                 ISGOOD=.FALSE.
                 GO TO 14
             ENDIF
C       REJECT IF LONS DO NOT STRADDLE CLON
             TDIFF=TRLN-CLON
             PDIFF=PRVLN-CLON
             IF(TDIFF.GE.0..AND.PDIFF.LE.0.) GO TO 14
             IF(PDIFF.GE.0..AND.TDIFF.LE.0.) GO TO 14
             ISGOOD=.FALSE.
      ENDIF

   14     CONTINUE

      RETURN
      END


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       ISAREA
C
C FUNCTIONAL DESCRIPTION:          .
C
C CALLED BY:                       CALCPR, DRAWST
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        logical function isarea ()
c
c       this function determines whether the current word is an area name
c
        logical found
c ----- updated 7/31/87 CSL                              - isarea
        character typec
        real mparms(4)
```

```
      common /mparms/ mparms
      logical eol,eoc
      common /comnds/ lenl,indxw,lenw,eol,eoc
      character * 80 comlin
      common /comlin/ comlin
c
      call mesg(271)
c ----- updated 7/31/87 CSL                              - isarea
      call shownm (comlin(indxw:indxw+lenw-1),lenw,mparms,found,typec)
      isarea = found
c
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    ISBLAN
C
C FUNCTIONAL DESCRIPTION:       .
C
C CALLED BY:                    CMDMAI
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

      logical function isblan ()
c
c     this function determines whether the current command is blank
c
      logical eol,eoc
      common /comnds/ lenl,indxw,lenw,eol,eoc
c
      if (eoc.and.lenl.le.0) then
          isblan = .true.
      else
          isblan = .false.
      endif
c     print*,'isblan -- exit ',isblan
c
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    ISCOOR
C
C FUNCTIONAL DESCRIPTION:       .
C
C CALLED BY:                    CMDMAI, DRAWST, SCENTE
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

      logical function iscoor ()
c
c     this function determines whether the current word is a geographic
c     coordinate
c
c
c ****
      iscoor = .false.
c
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    ISDECR
C
C FUNCTIONAL DESCRIPTION:       .
C
```

```
C CALLED BY:                      CMDMAI, DRAWST
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        logical function isdecr ()
c
c       this function determines whether the current word is an 'increase' word
c
        logical wordis
c
        if (wordis('LOWER').or.wordis('DOWN').or.wordis('DECREASE'))
     +  then
            isdecr = .true.
        else
            isdecr = .false.
        endif
c
        return
        end
C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      ISEOC
C
C FUNCTIONAL DESCRIPTION:         .
C
C CALLED BY:                      CALCPR, CMDMAI, DECDET, DECSCA, DRAWST,
C                                 INCDET, INCSCA, MAJORS, MINORS
C                                 SCENTE, SETSCA, SPROJE, SSCALE
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        logical function iseoc ()
c
c       this function determines whether you are currently at an end of command
c
        logical eol,eoc
        common /comnds/ lenl,indxw,lenw,eol,eoc
c
        iseoc = eoc
c       print*,'iseoc -- exit ',iseoc
c
        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      ISFEAT
C
C FUNCTIONAL DESCRIPTION:         .
C
C CALLED BY:                      CMDMAI, DRAWST, ERASES, MAJORS, MINORS,
C                                 REMOVF
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        logical function isfeat ()
c
c       this function determines whether the current word is a map feature
c
        common /indpar/ indpro,indftr
        logical wordis
c
        isfeat = .true.
        if (wordis('COASTLINES')) then
            indftr = 1
        else if (wordis('COUNTRIES')) then
            indftr = 2
        else if (wordis('STATES')) then
            indftr = 3
        else if (wordis('RIVERS')) then
```

```
        else if (wordis('RAILROADS')) then
            indftr = 5
        else if (wordis('ROADS')) then
            indftr = 6
        else if (wordis('GRIDS')) then
            indftr = 7
        else if (wordis('NAMES')) then
            indftr = 10
        else if (wordis('CITIES')) then
            indftr = 16
        else if (wordis('OVERLAY')) then
            indftr = 11
        else if (wordis('GAZETTEER')) then
            indftr = 15
        else
            isfeat = .false.
        endif
c
        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    ISINCR
C
C FUNCTIONAL DESCRIPTION:       .
C
C CALLED BY:                    CMDMAI, DRAWST
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        logical function isincr ()
c
c       this function determines whether the current word is an 'increase' word
c
        logical wordis
c
        if (wordis('HIGHER').or.wordis('UP').or.wordis('RAISE')
     +  .or.wordis('INCREASE')) then
            isincr = .true.
        else
            isincr = .false.
        endif
c
        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    ISKILO
C
C FUNCTIONAL DESCRIPTION:       .
C
C CALLED BY:                    SETSCA
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        logical function iskilo ()
c
c       this function determines whether the current word is kilometers
c
c
c ****
        iskilo = .false.
c
        return
        end
```

```
C+*+*+*+*+*+*+*+*+*+*+*+*+*+*+*+*+*+*+*+*+*+*+*+*+*+*+*+*+*+*+*+*+*|*+*+*+*+
C UNIT NAME:                    ISMILE
C
C FUNCTIONAL DESCRIPTION:       .
C
C CALLED BY:                    SETSCA
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        logical function ismile ()
c
c       this function determines whether the current word is miles
c
c
c ****
        ismile = .false.
c
        return
        end

C+*+*+*+*+*+*+*+*+*+*+*+*+*+*+*+*+*+*+*+*+*+*+*+*+*+*+*+*+*+*+*+*+*|*+*+*+*+
C UNIT NAME:                    ISNM
C
C FUNCTIONAL DESCRIPTION:       .
C
C CALLED BY:                    SETSCA
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        logical function isnm ()
c
c       this function determines whether the current word is nautical miles
c
c ****
        isnm = .false.
c
        return
        end

C+*+*+*+*+*+*+*+*+*+*+*+*+*+*+*+*+*+*+*+*+*+*+*+*+*+*+*+*+*+*+*+*+*|*+*+*+*+
C UNIT NAME:                    ISNUMB
C
C FUNCTIONAL DESCRIPTION:       .
C
C CALLED BY:                    SSCALE
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        logical function isnumb ()
c
c       this function determines whether the current word is a number
c
c
c ****
        isnumb = .false.
c
        return
        end

C+*+*+*+*+*+*+*+*+*+*+*+*+*+*+*+*+*+*+*+*+*+*+*+*+*+*+*+*+*+*+*+*+*|*+*+*+*+
C UNIT NAME:                    ISPROJ
C
C FUNCTIONAL DESCRIPTION:       .
C
```

```
C CALLED BY:                    CMDMAI, SPROJE
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

      logical function isproj ()
c
c     this function determines whether the current word is a map projection
c
      common /indpar/ indpro,indftr
      logical wordis
c
      isproj = .true.
      if (wordis('GNOMONIC')) then
          indpro = 1
      else if (wordis('EQUATORIAL')) then
          indpro = 2
      else if (wordis('POLAR')) then
          indpro = 3
      else if (wordis('ORTHOGRAPHIC')) then
          indpro = 4
      else if (wordis('PERSPECTIVE')) then
          indpro = 5
      else if (wordis('EQUIRECTANGULAR')) then
          indpro = 6
      else if (wordis('MERCATOR')) then
          indpro = 7
      else
          isproj = .false.
      endif
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    ISSEGM
C
C FUNCTIONAL DESCRIPTION:       .
C
C CALLED BY:                    DRAWF, FTRCON
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

      logical function issegm (nsegm)

c     does nsegm currently exist as a segment

      integer ARAY(19)

      ARAY(1) = 0
      CALL JISGMT(nsegm,ARAY)
      if (ARAY(1).EQ.1) then
          issegm = .true.
      else
          issegm = .false.
      endif

      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    JFILLM
C
C FUNCTIONAL DESCRIPTION:       .
C
C CALLED BY:                    FILLPT
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-
```

```
        subroutine jfillm (icol,x,y,renew)
c
c       this subroutine does a hardware fill usually of a map using color
c       icol at x/y
c
        logical renew
        logical sys
        common /sysdbc/ sys

        call jconwv (x,y,z,vx,vy)
        if (sys) then
            print*,'jfillm -- ',x,y,vx,vy,renew,icol
            call jcmark (5)
            call jmark (x,y)
        else
            call jfillv (5126,icol,vx,vy,renew)
        endif
c
        return
        end

C+++++++++++++++++++++++++++++++++++++++++++++++++++++++++++++++++|+++++++
c  UNIT NAME:                    jfills
c
c  Functional Description:
c       this subroutine does a hardware fill using color icol at x/y
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                    APFILL
c
c  Local Variables: N/A
c
c  Restrictions: N/A
c
c  Abnormal Return Conditions:  N/A
c
c  Location:      /a21/dave
c
c  Programmer          Date of Last Change       Reason for Change
c
C-*-*-*-*-*-*-*-*-*-*-*-*-*-*-*-*-*-*-*-*-*-*-*-*-*-*-*-*-*-*-*-*-|*-*-*-*-
c
        subroutine jfills (icol,x,y,renew)
c
c       this subroutine does a hardware fill usually of a symbol using
c       color icol at x/y
c
        logical renew
        call jconwv (x,y,z,vx,vy)
        call jfillv (5125,icol,vx,vy,renew)
c
        return
        end

C+++++++++++++++++++++++++++++++++++++++++++++++++++++++++++++++++|+++++++
c  UNIT NAME:                    jfillv
c
c  Functional Description:
c       this subroutine does a hardware fill using color icol at x/y using
c       escape code icode
c
c  Input Files/Parameters:
c
c  Output Files/Parameters: N/A
c
c  Subroutines/Functions Called:
```

```
c      Note: Subroutines preceded by a "j" are explained in the DI-3000 manual.
c
c  Called By:                     FCFILL, JFILLM, JFILLS
c
c  Local Variables: N/A
c
c  Restrictions: N/A
c
c  Abnormal Return Conditions:  N/A
c
c  Location:       /a21/dave
c
c  Programmer         Date of Last Change        Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine jfillv (icode,icol,vx,vy,renew)
c
c      this subroutine does a hardware fill using color icol at x/y
c
       logical renew
       real reapar(2)
       integer intpar(2)
       integer coltab(256)
       common /coltab/ coltab
       common /aspect/ xaspec,yaspec,xvlow,xvhigh,yvlow,yvhigh

       icol = coltab(icol+1)
c ***  fudge values because of Apollo seedfill problem
       avx = (vx + 1.) / 2.
       avx = avx / xaspec
       vx = avx * 2. - 1.
       avy = (vy + 1.) / 2.
       avy = avy / yaspec
       vy = avy * 2. - 1.

       reapar(1) = vx
       reapar(2) = vy
       intpar(1) = icol
       if (renew) then
          intpar(2) = 1
       else
          intpar(2) = 0
       endif
       call jescap (icode,2,2,intpar,reapar)

       return
       end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       JULIAN
C
C FUNCTIONAL DESCRIPTION:          .
C
C CALLED BY:                       DIFTIM, FADCHG
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine julian (julyr, julmon, julday, juldat)

c     this subroutine converts  yr, mon, day, values
c     into a corresponding julian date.

      integer i
      integer julyr
      integer julmon
      integer julday
      integer juldat
      integer*2 months(12)

      data months /31,28,31,30,31,30,31,31,30,31,30,31/
```

```
c       julyr = year
c       julmon = month
c       julday = day

        months(2) = 28

        if ((mod(julyr,4) .eq. 0) .and.
     +        ((mod(julyr,100) .ne. 0) .or.
     +        (mod(julyr,400) .eq. 0))) then
           months(2) = 29
        end if

        juldat = 0
        if (julmon .eq. 1) then
           juldat = julday
        else
           do 100 i=1,julmon-1
              juldat = juldat + months(i)
 100       continue
           juldat = juldat + julday
        end if
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    keybd
c
c  Functional Description:       Subroutine to get keyboard input
c
c  Input Files/Parameters:
c      General Gobals
c        qdsdev        device       integer   DI-3000 variable
c        qpydev        device       integer   DI-3000 variable
c        qecho         device       integer   DI-3000 variable
c
c  Output Files/Parameters:     N/A
c
c  Subroutines/Functions Called:
c       Note: Subroutines preceded by a "j" are explained in the DI-3000 man
c
c  Called By:                    CLASS, OTHCLS
c
c  Local Variables:
c      maxchr                    integer   maximum length of input wanted
c                                            (80 or less characters)
c      length                    integer   actual length of input recieved
c      input                     character string of character input
c                                          from a menu
c
c  Restrictions: Input cannot be longer than 254 characters
c
c  Abnormal Return Conditions:  N/A
c
c  Location:   /a21/dave
c
c  Programmer          Date of Last Change         Reason for Change
c     bam               October 27, 1983
c
c  Work still to be done:
c
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine keybd(maxchr,input,length)

c       calls jkeybd function

        integer qdsdev,qpydev,qecho,qlecho
        common /device/ qdsdev,qpydev,qecho,qlecho

        integer maxchr,length
        character *(*) input
        logical sys,rdkey,savkey
        common /sysdbc/ sys
```

```
      common /rkdbc/ rdkey
      common /svkdbc/ savkey
      logical eofkey
      integer keylun,newlun
      common /keylun/ keylun,newlun,eofkey
      character*6 command
      logical timout
      integer*2 time
      common /timout/ timout,time
C      data keylun/28/,newlun/29/,eofkey/.false./    - keybd

      if (sys) print*,'keybd -- enter',maxchr
c     call enall
 100  continue
      if ( (rdkey).and..not.eofkey) then
          call kpause (eofkey)
          read (keylun,*,end=192,err=191) command,length,input
          if (command(1:5).ne.'jkeyb') then
              print*,'keybd -- incompatible command in ',
     +        'read_keys file  ',command,length
c             *** exit on error
              go to 199
          endif
      else

 125      continue

c         polling loop to check for incoming data or clock interrupt

          call datpol

c         check for keyboard interrupt

          call jkeybs(qdsdev,qpydev,qecho,maxchr,input,length)
          if (timout) then
             go to 125
          end if
      end if

      go to 199
 191  continue
          print*,'keybd -- error on read of save key file',
     +    '  ',keylun,length,'  ',input(1:length)
          go to 199
 192  continue
          print*,'keybd -- premature end of read key file.'
          eofkey = .true.
          go to 100
c         **** go back and get the function interactively on end of file
 199  continue
      if (savkey) then
          write (newlun,*,err=135) '''jkeybd''',length,' ''',
     +    input(1:length),''''
      endif
      go to 140
 135  continue
          print*,'keybd -- error on write to save key file',
     +    '  ',newlun,length,'  ',input(1:length)
 140  continue
      if (length.gt.maxchr) then
c         print*,'keybd -- length > maxchr : ',length,maxchr
          length = maxchr
      endif
c     call soverl
      if (sys) print*,'keybd -- exit ',length,'  ',input(1:length)

      return
      end

C++++++++++++++++++++++++++++++++++++++++++++++++++++++++++++++++++++|+++++++
c  UNIT NAME:                     keybs
c
```

```
c  Functional Description:
c       calls jkeybs function
c
c  Input Files/Parameters:
c
c  Output Files/Parameters: N/A
c
c  Subroutines/Functions Called:
c       Note: Subroutines preceded by a "j" are explained in the DI-3000 man
c
c  Called By:                    PROMPT
c
c  Local Variables: N/A
c
c  Restrictions: N/A
c
c  Abnormal Return Conditions:  N/A
c
c  Location:      Apollo       /gl
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine keybs (maxchr,input,length)

c       calls jkeybs function

        integer qdsdev,qpydev,qecho,qlecho
        common /device/ qdsdev,qpydev,qecho,qlecho

        integer maxchr,length
        character *(*) input
        logical sys,rdkey,savkey
        common /sysdbc/ sys
        common /rkdbc/ rdkey
        common /svkdbc/ savkey
        logical eofkey
        integer keylun,newlun
        common /keylun/ keylun,newlun,eofkey
        character*6 command
        integer*2 time
        logical timout
        common /timout/ timout, time

        if (sys) print*,'keybs -- enter',maxchr
c       call enall
  100   continue
        if ((rdkey).and..not.eofkey) then
            call kpause (eofkey)
            read (keylun,*,end=192,err=191) command,length,input
            if (command(1:5).ne.'jkeyb') then
                print*,'keybs -- incompatible command in ',
     +          'read_keys file  ',command,length
c               *** exit on error
                go to 199
            endif
        else

  125       continue
c
c           polling loop to check for incoming data or clock interrupt
c
            call datpol
c
c           check for keyboard interrupt
c
            call jkeybs (qdsdev,qpydev,qecho,maxchr,input,length)
            if (timout) then
               go to 125
            end if
        endif
```

```
c*******    remove <return> from length of input string ******************
c           length = length - 1
c***********************************************************************
        go to 199
  191   continue
            print*,'keybs -- error on read of save key file',
     +      '  ',keylun,length,'  ',input(1:length)
            go to 199
  192   continue
            print*,'keybs -- premature end of read key file.'
            eofkey = .true.
            go to 100
c           **** go back and get the function interactively on end of file
  199   continue
        if (savkey) then
            write (newlun,*,err=135) '''jkeybs''',length,' ''',
     +      input(1:length),''''
        endif
        go to 140
  135   continue
            print*,'keybs -- error on write to save key file',
     +      '  ',newlun,length,'  ',input(1:length)
  140   continue
        if (length.gt.maxchr) then
c           print*,'keybs -- length > maxchr : ',length,maxchr
            length = maxchr
        endif
c       call soverl
        if (sys) print*,'keybs -- exit ',length,'  ',input(1:length)

        return
        end


C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                     keys
c
c  Functional Description:
c       puts standard function key items in key area
c
c  Input Files/Parameters:
c
c  Output Files/Parameters: N/A
c
c  Subroutines/Functions Called:
c
c  Called By:                     FMAIN
c
c  Local Variables: N/A
c
c  Restrictions: N/A
c
c  Abnormal Return Conditions:  N/A
c
c  Location:       /a21/dave
c
c  Programmer         Date of Last Change        Reason for Change
c
C-*-*-*-*-*-*-*-*-*-*-*-*-*-*-*-*-*-*-*-*-*-*-*-*-*-*-*-*-*-*-*-*-*-*-*|*-*-*-*-
c
        subroutine keys
c
c       puts standard function key items in key area
c
        common /commen/xllmen,yllmen,xurmen,yurmen,ibcmen,iocmen,incmen
        common /nsgkey/ nsgkey,nsgktx
        data icolcm/16/
c
c       print*,'keys -- enter',nsgkey,nsgktx
        tmp = yurmen
        yurmen = 8.
        call keyvpt
        call menwin
```

```
       call creatm (nsgktx,ierror)
       yurmen = tmp
c      print*,'keys -- exit',ierror
c
       return
       end

C+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    keyvpt
c
c  Functional Description:
c       this subroutines sets the key area viewport
c
c  Input Files/Parameters:
c
c  Output Files/Parameters: N/A
c
c  Subroutines/Functions Called:
c       Note: Subroutines preceded by a "j" are explained in the DI-3000 manual.
c
c  Called By:                    KEYS, MAKKEY
c
c  Local Variables: N/A
c
c  Restrictions: N/A
c
c  Abnormal Return Conditions:  N/A
c
c  Location:      Apollo       /a21/dave
c
c  Programmer         Date of Last Change        Reason for Change
c
C-*-*-*-*-*-*-*-*-*-*-*-*-*-*-*-*-*-*-*-*-*-*-*-*-*-*-*-*-*-*-*-*-*-*-*|*-*-*-*-
c
       subroutine keyvpt
c
c      this subroutines sets the key area viewport
c
       common /comkvp/ xllkvp,yllkvp,xurkvp,yurkvp
c
       call jvport (xllkvp,xurkvp,yllkvp,yurkvp)
c
       return
       end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     LEGEND
C
C FUNCTIONAL DESCRIPTION:
C
C CALLED BY:                     ERASEM
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

      subroutine legend
      return
      end
C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    length
c
c  Functional Description:
c       this subroutine finds the length of a string
c
c  Input Files/Parameters:
c
c  Output Files/Parameters: N/A
c
c  Subroutines/Functions Called:
c       Note: Subroutines preceded by a "j" are explained in the DI-3000 manual.
```

```
c
c  Called By:                     CRMESG, DISP5,  MESGJF, PLTCIT,
c                                 READCH, GETARG, DSPCLS
c
c  Local Variables: N/A
c
c  Restrictions: N/A
c
c  Abnormal Return Conditions:  N/A
c
c  Location:     /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*|*-*-*-*-
c
      subroutine length (buf,maxlen,lenbuf)
c
c     this subroutine finds the length of a string
c
      character*(*) buf
c
      call lngth (buf,maxlen,lenbuf)
c
      return
      end


c     subroutine length (buf,maxlen,lenbuf)
c
c     this subroutine finds the length of a string
c
c     character*(*) buf
c
c     do 110 i=maxlen,1,-1
c        if (buf(i:i).ne.' ') go to 120
c 110 continue
c     i=0
c 120 continue
c     lenbuf = i
c
c     return
c     end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME: limits
C
C FUNCTIONAL DESCRIPTION:  CALCULATE GEOGRAPHIC LIMITS OF VIEWPORT
C
C INPUT FILES/PARAMETERS:
C
C GLOBAL VARIABLES : NONE.
C
C OUTPUT FILES/PARAMETERS:  NONE.
C
C SUBROUTINES/FUNCTIONS CALLED :
C
C CALLED BY:                NO LONGER USED BY CARICATURE
C
C LOCAL VARIABLES: NONE.
C
C RESTRICTIONS: NONE.
C
C ABNORMAL RETURN CONDITIONS:   NONE.
C
C LOCATION:
C
C PROGRAMMER:               DATE OF LAST CHANGE     REASON FOR CHANGE
C
C     DAVE NATION                                   ORIGINAL CODE.
C     JERRY FENERTY                                 DOCUMENT AND MODIFY
C                                                   FOR A21 PROTOTYPE.
```

```
C     David Nation               12/10/86              Correct Equirect code
C                                                      & impl Mercator code
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE LIMITS(ITPRO,XRA,YRA,CLA,CLO,VMAXLA,VMINLA,
     + VMAXLO,VMINLO)

C     CALCULATE GEOGRAPHIC LIMITS OF VIEWPORT

      LOGICAL NEWONS
      LOGICAL ISINV
      LOGICAL NPONSC,SPONSC

      COMMON /PROJT/ IGNOMN,IORTEQ,IORTPO,IORTHO,IPERSP
      COMMON /PROJT2/ IEQREC,IMERCA,ILAMCN
      COMMON /PIE/ PIE,TPIE,PIO2,PIO4
      COMMON /CONST/ MAXVAL,RMPV,C,R,ERNM
      LOGICAL INVALI
      COMMON /INVALI/ INVALI
      logical sys
      common /sysdbc/ sys

      if (sys) then
          print*,'limits -- enter ',ITPRO,XRA,YRA,CLA,CLO,VMAXLA,
     +        VMINLA,VMAXLO,VMINLO
      endif
      VMAXLA=90.*60.*C
      VMINLA=-90.*60.*C
      VMAXLO=180.*60.*C
      VMINLO=-180.*60.*C

C     TEST FOR POLES (DOES NOT WORK AS EXPECTED FOR OE PROJ)

      PLAT=90.*60.*C
      PLON=0.
      CALL INVTES (PLAT,PLON,ISINV)
      NPONSC=.FALSE.
      IF (.NOT.ISINV) THEN
          CALL LLTOXY (PLAT,PLON,X,Y)
          CALL CLIPXY (X,Y,NPONSC)
      ENDIF
      PLAT=-PLAT
      CALL INVTES (PLAT,PLON,ISINV)
      SPONSC=.FALSE.
      IF (.NOT.ISINV) THEN
          CALL LLTOXY (PLAT,PLON,X,Y)
          CALL CLIPXY (X,Y,SPONSC)
      ENDIF
C     GO TO (910,920,930,940,950,960,960,980),ITPRO     - limits
      GO TO (910,920,930,990,990,960,960,990),ITPRO
C                                 GNOMONIC        1
  910 CONTINUE
      IF (NPONSC) THEN
          CALL XYTOLL(0.,-YRA,PLAT,PLON)
          VMINLA=PLAT
          CALL XYTOLL(XRA,-YRA,PLAT,PLON)
          IF (PLAT.LT.VMINLA) VMINLA=PLAT
          GO TO 918
      ENDIF
      IF (SPONSC) THEN
          CALL XYTOLL (0.,YRA,PLAT,PLON)
          VMAXLA=PLAT
          CALL XYTOLL(XRA,YRA,PLAT,PLON)
          IF (PLAT.GT.VMAXLA) VMAXLA=PLAT
          GO TO 918
      ENDIF
          CALL XYTOLL (0.,YRA,PLAT,PLON)
          VMAXLA=PLAT
          CALL XYTOLL(XRA,YRA,PLAT,PLON)
          IF (PLAT.GT.VMAXLA) VMAXLA=PLAT
          CALL XYTOLL(0.,-YRA,PLAT,PLON)
          VMINLA=PLAT
```

```
         CALL XYTOLL(XRA,-YRA,PLAT,PLON)
         IF (PLAT.LT.VMINLA) VMINLA=PLAT
         CALL XYTOLL (-XRA,YRA,PLAT,PLON)
         VMIN=PLON
         CALL XYTOLL (-XRA,-YRA,PLAT,PLON)
         IF (PLON.LT.VMIN) VMIN=PLON
         CALL XYTOLL (XRA,YRA,PLAT,PLON)
         VMAX=PLON
         CALL XYTOLL (XRA,-YRA,PLAT,PLON)
         IF (PLON.GT.VMAX) VMAX=PLON
         IF (VMAX.GT.VMIN) THEN
             VMAXLO=VMAX
             VMINLO=VMIN
         ENDIF
 918  CONTINUE
      GO TO 990

C     ORTHOGRAPHIC EQUATORIAL    2

 920  CONTINUE
      CALL XYTOLL (0.,-YRA,PLAT,PLON)
      IF (.NOT.INVALI) THEN
          VMINLA=PLAT
      ENDIF
      CALL XYTOLL (0.,YRA,PLAT,PLON)
      IF (.NOT.INVALI) THEN
          VMAXLA=PLAT
      ENDIF
      PLAT=0.
      PLON=180.*60.*C
      CALL INVTES (PLAT,PLON,ISINV)
      NEWONS=.FALSE.
      IF (.NOT.ISINV) THEN
          CALL LLTOXY (PLAT,PLON,X,Y)
          CALL CLIPXY (X,Y,NEWONS)
      ENDIF
      IF (.NOT.NEWONS) THEN
          VMAXLO=CLO+PIO2
          VMINLO=CLO-PIO2
          CALL XYTOLL (-XRA,YRA,PLAT,PLON)
          IF (INVALI) GO TO 928
          VMIN=PLON
          CALL XYTOLL (-XRA,-YRA,PLAT,PLON)
          IF (INVALI) GO TO 928
          IF (PLON.LT.VMIN) VMIN=PLON
          VMINLO=VMIN
          CALL XYTOLL (XRA,YRA,PLAT,PLON)
          IF (INVALI) GO TO 928
          VMAX=PLON
          CALL XYTOLL (XRA,-YRA,PLAT,PLON)
          IF (INVALI) GO TO 928
          IF (PLON.GT.VMAX) VMAX=PLON
          VMAXLO=VMAX
      ENDIF
      GO TO 929
 928  CONTINUE
C     PRINT*,'LIMITS -- ERROR  INVALI,PLAT,PLON=',INVALI,PLAT,PLON
 929  CONTINUE
      GO TO 990

C     ORTHOGRAPHIC POLAR    3

 930  CONTINUE
      IF (CLA.GE.0.) THEN
      VMINLA=0.
      if (.not.nponsc) then
        call xytoll(xra,yra,plat,plon)
        vmaxlo = plon
        call xytoll(-xra,yra,plat,plon)
        vminlo = plon
        call xytoll(0.0,yra,plat,plon)
        vmaxla = plat
      else
        vmaxlo =  PIE
```

```
            vminlo = -PIE
            vmaxla =  PIO2
          endif
        ELSE
          VMAXLA=0.
          if (.not.sponsc) then
            call xytoll(xra,-yra,plat,plon)
            vmaxlo = plon
            call xytoll(-xra,-yra,plat,plon)
            vminlo = plon
            call xytoll(0.0,-yra,plat,plon)
            vmaxla = plat
          else
            vmaxlo =  PIE
            vminlo = -PIE
            vminla = -PIO2
          endif
        ENDIF
        if (vmaxlo.lt.vminlo) then
            vmaxlo =  PIE
            vminlo = -PIE
        endif
        GO TO 990

C       ORTHOGRAPHIC              4

  940   CONTINUE
        if (clat.gt.0) then
            call xytoll(-xra,-yra,plat,plon)
            vminla = plat
            if (.not.nponsc) then
              call xytoll(xra,yra,plat,plon)
              vmaxlo = plon
              call xytoll(-xra,yra,plat,plon)
              vminlo = plon
              call xytoll(0.0,yra,plat,plon)
              vmaxla = plat
            else
              vmaxlo =  PIE
              vminlo = -PIE
              vmaxla =  PIO2
            endif
        else
            call xytoll(xra,yra,plat,plon)
            vmaxla = plat
            if (.not.sponsc) then
              call xytoll(xra,-yra,plat,plon)
              vmaxlo = plon
              call xytoll(-xra,-yra,plat,plon)
              vminlo = plon
              call xytoll(0.0,-yra,plat,plon)
              vminla = plat
            else
              vmaxlo =  PIE
              vminlo = -PIE
              vminla =  PIO2
            endif
        endif
        if (vmaxlo.lt.vminlo) then
            vmaxlo =  PIE
            vminlo = -PIE
        endif

        GO TO 990

C       PERSPECTIVE               5

  950   CONTINUE
        xedge = sqrt(xra**2 - yra**2) -1
        if (clat.gt.0.) then
            call xytoll(xedge,-yra,plat,plon)
            vminla = plat
            if (.not.nponsc) then
              call xytoll(0.,yra,plat,plon)
```

```
          vmaxla = plat
          PLAT=CLA
          PLON=180.*60.*C
          NEWONS=.FALSE.
          call xytoll(xedge,yra,plat,plon)
          vmaxlo = plon
          call xytoll(-xedge,yra,plat,plon)
          vminlo = plon
          if (vmaxlo.lt.vminlo) then
            vmaxlo =  PIE
            vminlo = -PIE
          endif
        endif
    else
        call xytoll(xedge,yra,plat,plon)
        vmaxla = plat
        if (.not.sponsc) then
          call xytoll(0.,-yra,plat,plon)
          vmaxla = plat
          PLAT=CLA
          PLON=180.*60.*C
          NEWONS=.FALSE.
          call xytoll(xedge,-yra,plat,plon)
          vmaxlo = plon
          call xytoll(-xedge,-yra,plat,plon)
          vminlo = plon
          if (vmaxlo.lt.vminlo) then
            vmaxlo =  PIE
                  vminlo = -PIE
                endif
              endif
         endif

         GO TO 990

C        EQUIRECTANGULAR  AND MERCATOR

  960    CONTINUE
         CALL XYTOLL (0.,YRA,PLAT,PLON)
         IF (.not.INVALI) THEN
             VMAXLA=PLAT
         ENDIF
         CALL XYTOLL (0.,-YRA,PLAT,PLON)
         IF (.not.INVALI) THEN
             VMINLA=PLAT
         ENDIF
         PLAT=CLA
         PLON=180.*60.*C
         NEWONS=.FALSE.
         CALL LLTOXY (PLAT,PLON,X,Y)
         CALL CLIPXY (X,Y,NEWONS)
         IF (.NOT.NEWONS) THEN
             CALL XYTOLL (-XRA,0.,PLAT,PLON)
             VMINLO=PLON
             CALL XYTOLL (XRA,0.,PLAT,PLON)
             VMAXLO=PLON
         ENDIF
         GO TO 990

C        LAMBERT
  980    CONTINUE
         if (clat.gt.0.) then
             call xytoll(-xra,-yra,plat,plon)
             vminla = plat
             if (.not.nponsc) then
               call xytoll(0.,yra,plat,plon)
               vmaxla = plat
               call xytoll(xra,yra,plat,plon)
               vmaxlo = plon
               call xytoll(-xra,yra,plat,plon)
               if (plon.lt.vmaxlo) then
                 vminlo = plon
               else
```

```
            vmaxlo = -vminlo
          endif
        endif
      else
        call xytoll(xra,yra,plat,plon)
        vmaxla = plat
        if (.not.sponsc) then
          call xytoll(0.,-yra,plat,plon)
          vmaxla = plat
          call xytoll(xra,-yra,plat,plon)
          vmaxlo = plon
          call xytoll(-xedge,-yra,plat,plon)
          if (plon.lt.vmaxlo) then
            vminlo = plon
          else
            vmaxlo = -vminlo
          endif
        endif
      endif

      GO TO 990

990   CONTINUE
      if (sys) then
          print*,'limits -- exit ',ITPRO,XRA,YRA,CLA,CLO,VMAXLA,
     +        VMINLA,VMAXLO,VMINLO
      endif
      RETURN
      END

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME: LLCONV
C
C FUNCTIONAL DESCRIPTION:  CONVERTS DDMMSS,SIGN INTO LAT OR LONG.
C
C INPUT FILES/PARAMETERS:
C
C        CLAT                REAL*8      LAT OR LONG VALUE (DDMMSS).
C        SIGN                INTEGER     INDICATES DIRECTION
C
C GLOBAL VARIABLES : NONE.
C
C OUTPUT FILES/PARAMETERS:

C        LLCONV              REAL*8      LAT OR LONG VALUE (RADIANS)
C
C SUBROUTINES/FUNCTIONS CALLED : NONE.
C
C CALLED BY: GETLL, PLTCIT, PLTDAT
C
C LOCAL VARIABLES:

C        IDEG                INTEGER     DEGRESS.
C        IMIN                INTEGER     MINUTES.
C        ISEC                INTEGER     SECONDS.
C        DTORAD              REAL*8      DEGREES TO RADIANS CONVERSION.

C RESTRICTIONS: NONE.
C
C ABNORMAL RETURN CONDITIONS:   NONE.
C
C LOCATION:                     /a21/gjf/A21GEO.FTN
C
C PROGRAMMER:                   DATE OF LAST CHANGE    REASON FOR CHANGE
C
C    DAVE NATION                                       ORIGINAL CODE.
C    JERRY FENERTY                                     DOCUMENT AND MODIFY
C                                                      FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*|*-*-*-*-
```

```
C        REAL*8 FUNCTION LLCONV (CLAT,ISIGN)
        REAL FUNCTION LLCONV (CLAT,ISIGN)

C       CONVERT DDMMSS INTEGER TO SECONDS ISIGN IS 1 OR -1 FOR THE SIGN

C        REAL*8 CLAT
        REAL CLAT

        DATA C /2.908882087E-4/
        DTORAD = C * 60
        IDEG = CLAT / 10000
        IMIN = (CLAT - IDEG * 10000) / 100
        ISEC = CLAT - IDEG * 10000 - IMIN * 100
        ZMIN = IMIN
        ZSEC = ISEC
        LLCONV = (IDEG + ZMIN/60 + ZSEC/3600) * ISIGN

        IF (LLCONV.GT.180) LLCONV = LLCONV - 360.

        LLCONV = LLCONV * DTORAD

        RETURN
        END

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      LLGRID
C
C FUNCTIONAL DESCRIPTION:         .
C
C CALLED BY:                      DGRID
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE LLGRID (IPGRID,VMAXLA,VMINLA,VMAXLO,VMINLO,DOTEM,
     +  ITPRO)
C               LATITUDE/LONGITUDE GRID DISPLAY SUBROUTINE
c
Ctfw    Replaced checka calls with ck4any calls to draw lines
Ctfw    through graticle concavities  - Tom Wescott 11/87
c
        COMMON /CONST/ MAXVAL,RMPV,C,R,ERNM

        LOGICAL CHINV,SETINV,SOMEON
        LOGICAL DOTEM,FRSTPO
        logical sys
        common /sysdbc/ sys

        DIMENSION ALIMIT(4)
        INTEGER IPGRID(4)
        LOGICAL INTERR
        COMMON /INTERR/ INTERR

        EQUIVALENCE (RMINLA,ALIMIT(1)),(RMAXLA,ALIMIT(2))
        EQUIVALENCE (RMINLO,ALIMIT(3)),(RMAXLO,ALIMIT(4))

        DATA LONST2/1800/,LATST2/1800/
        data ylatof/-6/, ylonof/2/

        if (sys) then
            print*,'llgrid -- enter ',ipgrid,vmaxla,vminla,vmaxlo,
     +      vminlo,dotem,itpro
        endif

        LATSTP=IPGRID(1)
        LONSTP=IPGRID(2)
        LATINC=IPGRID(3)
        LONINC=IPGRID(4)
        IF (LATSTP.LT.1.OR.LATSTP.GT.LATST2) LATSTP=600
        IF (LONSTP.LT.1.OR.LONSTP.GT.LONST2) LONSTP=600
        IF (LATINC.LT.1.OR.LATINC.GT.LATSTP) LATINC=60
        IF (LONINC.LT.1.OR.LONINC.GT.LONSTP) LONINC=60
```

```
      MAXLON=180*60
      MAXLAT=90*60

      CALL JSIZE(4.,5.)

      DO 850 LONVAL=-MAXLON+LONSTP,MAXLON,LONSTP

          PLON=LONVAL*C

          IF (PLON.LT.VMINLO) GO TO 850
          IF (PLON.GT.VMAXLO) GO TO 851

          RMAXLO=PLON
          RMINLO=PLON
          CHINV=SETINV
          FRSTPO=.TRUE.

          DO 845 LAT=latst2,MAXLAT,LATST2

              CALL CHINT (INTERR,CH)
              IF (INTERR) GO TO 851

              RMAXLA=LAT*C
              if (rmaxla.ge.pio2) rmaxla = rmaxla-.001
              RMINLA=(LAT-LATST2)*C

              IF (RMAXLA.LT.VMINLA) GO TO 845
              IF (RMINLA.GT.VMAXLA) GO TO 845

              call ck4any(someon,alimit)

              IF (SOMEON) THEN
                 call grdlon (lat,latst2,latinc,latstp,plon,frstpo,
     +              ylonof,dotem,lonval)

             ENDIF

845       CONTINUE

          DO 847 LAT=0,-MAXLAT+LATST2,-LATST2

             CALL CHINT (INTERR,CH)
             IF (INTERR) GO TO 851

             RMAXLA=LAT*C
             RMINLA=(LAT-LATST2)*C

             IF (RMAXLA.LT.VMINLA) GO TO 847
             IF (RMINLA.GT.VMAXLA) GO TO 847

             call ck4any(someon,alimit)

             IF (SOMEON) THEN

                 call grdlon (lat-latst2,-latst2,-latinc,latstp,
     +                        plon,frstpo,ylonof,dotem,lonval)

             ENDIF

847       CONTINUE
850   CONTINUE
851   CONTINUE

      DO 880 LATVAL=MAXLAT-LATSTP,-MAXLAT+LATSTP,-LATSTP

          CALL CHINT (INTERR,CH)
          IF (INTERR) GO TO 881
          PLAT=LATVAL*C

          IF (PLAT.GT.VMAXLA) GO TO 880
          IF (PLAT.LT.VMINLA) GO TO 881

          RMAXLA=PLAT
```

```
          RMINLA=PLAT
          CHINV=SETINV
          FRSTPO=.TRUE.

          DO 875 LON=-MAXLON,MAXLON-LONST2,LONST2

              RMAXLO=(LON+LONST2)*C
              RMINLO=LON*C

              IF (RMAXLO.LT.VMINLO) GO TO 875
              IF (RMINLO.GT.VMAXLO) GO TO 875

              call ck4any(someon,alimit)
              IF (SOMEON) THEN

                  call grdlat (lon,lonst2,loninc,lonstp,plat,frstpo,
     +                ylatof,dotem,latval)

              ENDIF
  875     CONTINUE
  880   CONTINUE
  881   CONTINUE
C---- flush the graphics buffer of any remaining lat/long lines
        call flushb
        if (sys) print*,'llgrid -- exit '
        RETURN
        END

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: llinxy
C
C FUNCTIONAL DESCRIPTION:  CONVERTS LAT/LON TO X/Y, ALSO CHECKS FOR INVALID
C       CONVERSIONS, INVISIBLE POINTS, AND CLIPS
C
C INPUT FILES/PARAMETERS:
C
C GLOBAL VARIABLES : NONE.
C
C OUTPUT FILES/PARAMETERS:  NONE.
C
C SUBROUTINES/FUNCTIONS CALLED :
C
C CALLED BY:                    DRAWEL, PLOTIT
C
C LOCAL VARIABLES: NONE.
C
C RESTRICTIONS: NONE.
C
C ABNORMAL RETURN CONDITIONS:   NONE.
C
C LOCATION:
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE LLINXY (PLAT,PLON,X,Y,INVAL,ISINV,NEWONS)

C       CONVERTS LAT/LON TO X/Y, ALSO CHECKS FOR INVALID CONVERSIONS,
C       INVISIBLE POINTS, AND CLIPS
C       TO SCREEN WITH NEWONS

        LOGICAL ISINV,NEWONS,INVAL
        LOGICAL INVALI
        COMMON /INVALI/ INVALI

        INVAL = .TRUE.
```

```
      ISINV = .TRUE.
      NEWONS = .FALSE.
      CALL INVTES (PLAT,PLON,ISINV)
      CALL LLTOXY (PLAT,PLON,X,Y)
      IF (.NOT.INVALI) THEN
          INVAL = .FALSE.
          CALL CLIPXY (X,Y,NEWONS)
      ENDIF

      RETURN
      END

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      LLSEC
C
C FUNCTIONAL DESCRIPTION:         .
C
C CALLED BY:                      LLTOR
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      integer*4 function llsec (lat)
c
c     convert dms format of lat/lon to seconds
c
      integer*4 lat,ideg,imin,isec
c
c     print*,'llsec -- enter ',lat
      ideg = lat / 10000
      imin = (lat - ideg * 10000) / 100
      isec = lat - ideg * 10000 - imin * 100
      llsec = ideg * 3600 + imin * 60 + isec
c     print*,'llsec -- exit ',llsec
c
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      LLTOR
C
C FUNCTIONAL DESCRIPTION:         .
C
C CALLED BY:                      CURBOX, HILPLT, PLOTOV, PROCOV
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine lltor (lat,lon,nsi,ewi,plat,plon)

c
c     convert lat/lon in integer seconds to real lat/lon in radians
c
      real*8 dtor,stor
      common /dtor/ dtor,stor
      character nsi,ewi
      integer*4 lat,lon,lats,lons
      integer*4 llsec
c
          rlat = llsec (lat)
          if (nsi.eq.'S'.or.nsi.eq.'s') rlat = -rlat
          rlon = llsec (lon)
          if (ewi.eq.'W'.or.ewi.eq.'w') rlon = -rlon
          lats = rlat
          lons = rlon
          plat = rlat * stor
          plon = rlon * stor
c
      return
      end
```

```
C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: LLTORD
C
C FUNCTIONAL DESCRIPTION:  INTERPRETS A LAT/LONG STRING (DDMMSSN/DDDMMSSE)
C                          AND RETURNS LAT/LONG IN RADIANS.
C
C INPUT FILES/PARAMETERS:
C
C        STRNG               CHAR*(*)    LAT/LONG STRING.
C        LEN                 INTEGER     LENGTH OF STRING.
C
C
C GLOBAL VARIABLES : NONE.
C
C OUTPUT FILES/PARAMETERS:
C
C        LAT                 REAL*8      LATITUDE.
C        LON                 REAL*8      LONGITUDE.
C        IERROR              INTEGER     ERROR CONDITION.
C
C SUBROUTINES/FUNCTIONS CALLED :
C
C        GETLL               CONVERTS DDMMSS TO A LAT OR LONG VALUE.
C
C CALLED BY:                  BSTMAP, LLCENT
C
C LOCAL VARIABLES:
C
C        NST                 CHAR(4)     'N','n','S','s'.
C        EWT                 CHAR(4)     'E','e','W','e'.
C
C RESTRICTIONS: STRING MUST BE IN FORMAT DDMMSS(N OR S)/DDDMMSS(E OR W).
C
C ABNORMAL RETURN CONDITIONS:   NONE.
C
C LOCATION:                   /a21/gjf/A21GEO.FTN
C
C PROGRAMMER:                 DATE OF LAST CHANGE     REASON FOR CHANGE
C
C     DAVE NATION                                     ORIGINAL CODE.
C     JERRY FENERTY                                   DOCUMENT AND MODIFY
C                                                     FOR A21 PROTOTYPE.
C     L. MCCLEARY             AUG 1988                LAT LIMITS CHECK
C
C-*-*-*-*-*-*-*-*-*-*-*-*-*-*-*-*-*-*-*-*-*-*-*-*-*-*-*-*-*-*-*-*-*-*-*|*-*-*-*-

      SUBROUTINE LLTORD (STRNG,LEN,LAT,LON,IERROR)

C     INTERPRET LATITUDE LONGITUDE COORDINATE STRING

      CHARACTER*(*) STRNG
      REAL LAT,LON
      CHARACTER NST(4),EWT(4)
      DATA NST/'N','n','S','s'/,EWT/'E','e','W','w'/
      DATA PIO2/1.5707963/

      IERROR = 0

C  CALL GETLL WITH LATITUDE AND LONGITUDE PORTIONS OF STRING.

      CALL GETLL (STRNG(1:LEN),NST,LAT,INDX,LEN,IERROR)
      IF (IERROR.EQ.0) THEN
         IF (LAT.GT.PIO2) LAT = PIO2
         IF (LAT.LT.-PIO2) LAT = -PIO2
         INDX = INDX + 1
         IF (INDX.GT.LEN) THEN
            IERROR = 1
            RETURN
         ENDIF
25       CONTINUE
         IF (STRNG(INDX:INDX).EQ.' '.OR.
     +       STRNG(INDX:INDX).EQ.'/') THEN
            INDX = INDX + 1
            IF (INDX.LT.LEN+1) GOTO 25
```

```
            IERROR = 1
         ENDIF
         IF (IERROR.EQ.0) THEN
            CALL GETLL (STRNG(INDX:LEN),EWT,LON,INDX2,
     +                  LEN-INDX+1,IERROR)
         ENDIF
      ENDIF
      RETURN
      END

C+*+*+*+*+*+*+*+*+*+*+*+*+*+*+*+*+*+*+*+*+*+*+*+*+*+*+*+*+*+*+*+*+*.|*+*+*+*+
C UNIT NAME:                    LNGTH
C
C FUNCTIONAL DESCRIPTION:       FINDS THE LENGTH OF A TEXT STRING BY SEARCH-
C                               ING BACKWARDS FOR THE FIRST OCCURENCES OF A
C                               PRINTABLE CHARACTER
C
C INPUT FILES/PARAMETERS:
C
C    VARIABLE                  TYPE           DESCRIPTION
C
C      BUF                   CHAR*(*)   A CHARACTER STRING OF UNKNOWN LENGTH
C      MAXLEN                INTEGER    THE MAXIMUM LENGTH BUF CAN BE
C
C OUTPUT FILES/PARAMETERS:
C
C    VARIABLE                  TYPE           DESCRIPTION
C
C      LENBUF                INTEGER    THE LENGTH OF THE TEXT STRING
C
C SUBROUTINES/FUNCTIONS CALLED
C
C      JXXXX           DI-3000 SUBROUTINES
C
C CALLED BY:                    DRWAMP, LENGTH, PLOTOV, PUTAMP
C
C LOCAL VARIABLES:      NONE
C
C RESTRICTIONS:         NONE
C
C ABNORMAL RETURN CONDITIONS: N/A
C
C PROGRAMMER:                   DATE OF LAST CHANGE    REASON FOR CHANGE
C
C  DABUTSON                            4/30/84            INITIAL ENTRY
c  L McCleary                 1987               empty string - lngth
C
C-*-*-*-*-*-*-*-*-*-*-*-*-*-*-*-*-*-*-*-*-*-*-*-*-*-*-*-*-*-*-*-*-*-*|*-*-*-*-
C
      SUBROUTINE LNGTH (BUF,MAXLEN,LENBUF)
C
C     THIS SUBROUTINE FINDS THE LENGTH OF A STRING
C
      CHARACTER*(*) BUF
C
C*** FROM THE MAXIMUM LENGTH UNTIL A PRINTABLE CHARACTER IS FOUND
      DO 110 I=MAXLEN,1,-1
         IF (BUF(I:I) .GE. '!' .AND. BUF(I:I) .LE. '~') GOTO 120
  110 CONTINUE
      I=0
  120 CONTINUE
C*** LENGTH IS SET TO I
      LENBUF = I
      IF (LENBUF.EQ.0.AND.BUF(1:1).EQ.' ') LENBUF = 1
C
      RETURN
      END

C+*+*+*+*+*+*+*+*+*+*+*+*+*+*+*+*+*+*+*+*+*+*+*+*+*+*+*+*+*+*+*+*+*+|*+*+*+*+
C UNIT NAME:                    LOADIC
```

```
C
C FUNCTIONAL DESCRIPTION:
C
C CALLED BY:                    GETICN
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine loadic (icnnam)

c      this routine is called by the geticn to load the current
c       icon into a table.
c     VARIABLES:
c       icnnam- name of the icon to be drawn
c       filnam - name of the file to be accessed
c       common block device- selected display device for pausing
c       iunit- logical unit number  assigned to the file
c    CALLED BY: geticn
c    CALLS:    openit  closit
c    PROGRAMMER:  Nancy Detrich, A215, March, 1984

        character*50 filenm
        character*30 fname
        character*50 menpth
        common /menpth/ menpth
        common /lenmen/ lenmen
        integer icnnam
        logical sys
        common /sysdbc/ sys
        integer iarray(26,100)
        character*40 ictarr(100)
        common /iconda/ lenica,iarray,ictarr
        character cchar
        character*80 msg
        character*26 flettr
        data maxica,maxtxt /100,40/
c  !!!!! hard-coded unit number !!!!
        data iunit/10/
        data flettr /'abcdefghijklmnopqrstuvwxyz'/
c       numinc is range of menu numbers in each file
c       maxnum is number of menu files
        data numinc,maxnum /25,15/
        data fname/'file'/,lname/4/

        if (sys) print*,'LOADIC -- icnnam = ',icnnam
        ierror = 0
        indlet = icnnam / numinc + 1
        if (indlet.lt.1) indlet = 1
        if (indlet.gt.maxnum) indlet = maxnum
        filenm = menpth(1:lenmen) // fname(1:lname) //
     +  flettr(indlet:indlet) // '.icon'
        lennam = lenmen + lname + 6
c       print*,'  before open ',filenm(1:lennam)
        call openit(filenm,lennam,iunit,0,ierror)
        if (ierror.ne.0) go to 20
        REWIND iunit

        lenica = 0
c       loop until the correct icon records are located
  100   continue
            read (iunit,10110,end=193,err=192) cchar,msg
10110       format (a1,a80)
c           *** skip comment lines
            if (cchar.eq.'C'.or.cchar.eq.'c') go to 100
            if (cchar.eq.'I'.or.cchar.eq.'i') then
                read (msg,1150,end=193,err=192) msgnum
 1150           format (i5)
                if (msgnum.eq.icnnam) go to 115
            endif
        go to 100
  115   continue
C        print*,'ICON found ',ICNNAM
        i=0
```

```
c       loop until no more data lines (blank first char)
  120   continue
            read (iunit,10110,end=20,err=192) cchar,msg
c           *** skip comment lines
            if (cchar.eq.'C'.or.cchar.eq.'c')
     +      go to 120
            if (cchar.eq.' ') then
c                   read in record and load iarray with integers
c                   from the file
                    read(msg,11,end=20,err=192)
     +              (iarray(i,lenica+1),i = 1,26)
  11                format(26i3)
                    lenica = lenica + 1
C                    if (iarray(lenica,1).eq.7) then
                    if (iarray(1,lenica).eq.7) then
c                       read in the text string to be displayed
                        nchars = maxtxt
                        call readch(iunit,ictarr(lenica),nchars,ierror)
                        if (ierror.ne.0) go to 20
                    endif
                    if (lenica.ge.maxica) go to 20
            else
                go to 20
            endif
            go to 120

 20     continue
        go to 200
  190       continue
            print*,' Menu number conversion error ',icnnam
            ierror = 211
            go to 200
  191       continue
            print*,' Couldn''t open file ',filenm
            ierror = 212
            go to 200
  192       continue
            print*,' Error in icon file read ',filenm(1:LENNAM),icnnam
            ierror = 213
            go to 200
  193       continue
         print*,' Premature end of icon file ',filenm(1:LENNAM),icnnam
            ierror = 214
            go to 200
  200   continue

        call closit(iunit)
        if (sys) print*,'LOADIC -- exit',lenica
        return
        end


C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:   LOCAT
c
c  Functional Description:
c
c  Input Files/Parameters:
C       qdsdev,qpydev,qecho          INTEGER
C       BUTTON                       INTEGER
C       VX,VY                        REAL
c
c  Output Files/Parameters:
c
c  Subroutines/Functions Called:
c       Note: Subroutines preceded by a "j" are explained in the DI-3000 manual.
C       ENALL
C       SOVERL
c
c  Called By:                   FCFILL, LOCGEO
c
c  Local Variables:   N/A
c
c  Restrictions:                N/A
```

```
c
c  Abnormal Return Conditions: N/A
c
c  Location:   /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine locat (button,vx,vy)

c       calls jlocat function

        integer button
        real vx,vy
        integer qdsdev,qpydev,qecho,qlecho
        common /device/ qdsdev,qpydev,qecho,qlecho
        logical sys,rdkey,savkey
        common /sysdbc/ sys
        common /rkdbc/ rdkey
        common /svkdbc/ savkey
        logical eofkey
        integer keylun,newlun
        common /keylun/ keylun,newlun,eofkey
        character*6 command
        logical timout
        integer*2 time
        common /timout/ timout, time

        if (sys) print*,'locat -- enter'
c       call enall
  100   continue
        if ((rdkey).and..not.eofkey) then
            call kpause (eofkey)
            read (keylun,*,end=192,err=191) command,button,vx,vy
            if (command(1:6).ne.'jlocat') then
                print*,'locat -- incompatible command in ',
     +          'read_keys file  ',command,button,vx,vy
c               *** exit on error
                go to 199
            endif
        else

  125      continue
c
c          polling loop to check for incoming data or clock interrupt
c
           call datpol
c
c          check for keyboard interrupt
c
           call jlocat (qdsdev,qpydev,qlecho,button,vx,vy)
           if (timout) then
              go to 125
           end if
        endif
        go to 199
  191   continue
            print*,'locat -- error on read of save key file',
     +      '  ',keylun,button,vx,vy
            go to 199
  192   continue
            print*,'locat -- premature end of read key file.'
            eofkey = .true.
            go to 100
c           **** go back and get the function interactively on end of file
  199   continue
        if (savkey) then
            write (newlun,*,err=135) '''jlocat''',button,vx,vy
        endif
        go to 140
  135   continue
            print*,'locat -- error on write to save key file',
     +      '  ',newlun,button,vx,vy
  140   continue
```

```
c       call soverl
        if (sys) print*,'locat -- exit',button,vx,vy

        return
        end


C+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    LOCGEO
c
c  Functional Description:       Subroutine to position something in the
c                                display area, convert the point to world
c                                coordinates, and to check that point is in
c                                the display area (only for geography)
c
c  Input Files/Parameters:
c
c     General Gobals
c       qmb          butons      integer   contains mouse button values
c       xllgvp       comgvp      real      minimum window boundary in x
c                                          direction (for display area)
c       xurgvp       comgvp      real      maximum window boundary in x
c                                          direction (for display area)
c       yllgvp       comgvp      real      minimum window boundary in y
c                                          direction (for display area)
c       yurgvp       comgvp      real      maximum window boundary in y
c                                          direction (for display area)
c  Output Files/Parameters:
c
c       button                   integer   value of button pressed
c       worldx                   real      world coordinate value x of
c                                          point picked
c       worldy                   real      world coordinate value y of
c                                          point picked
c       valid                    logical   true if point is in display area
c
c  Subroutines/Functions Called:
c
c       geowin                 set the graphics viewport window coordinates
c       gravpt                 sets the graphics viewport
c       locat                  returns x,y position in virtual coordinates
c
c  Called By:                    ANNOTA, BOXARE, DISTAN, LLSHOW, OFFST
c
c  Local Variables:
c
c       button                   integer   value of button pressed
c       virtx                    real      x virtual coordinate of
c                                          point picked
c       virty                    real      y virtual coordinate of
c                                          point picked
c       worldx                   real      world coordinate value x of
c                                          point picked
c       worldy                   real      world coordinate value y of
c                                          point picked
c       valid                    logical   true if point is in display area
c  Restrictions:                 N/A
c
c  Abnormal Return Conditions:   N/A
c
c  Location:       stepc03       /w3/ssb/prototype/arrows/locgeo.f
c
c  Programmer        Date of Last Change       Reason for Change
c     ssb                11/09/83               initial entry
c     ssb                 3/06/84               completion
c     bap                11/06/84               Debug to work on Apollo
c
C-*-*-*-*-*-*-*-*-*-*-*-*-*-*-*-*-*-*-*-*-*-*-*-*-*-*-*-*-*-*-*-*-*-*|*-*-*-*-

      subroutine locgeo(button,worldx,worldy,valid)

c     do locate in the display area, convert the point to world coordinates

      common/butons/qfb,qmb
```

```
      integer qfb(26),qmb(4)
      common /comgvp/ xllgvp,yllgvp,xurgvp,yurgvp
      real            xllgvp,yllgvp,xurgvp,yurgvp
      real virtx, virty, worldx, worldy, worldz
      integer button
      logical valid
c
c
      valid=.false.
      call locat(button, virtx, virty)
c     *********************************************************
c     * insure that pick is within the display area world coordinates
c     * and that the 'Pick' button (qmb(1)) was used
c     *********************************************************
c
c Temporarily comment out requirement that button be qmb(1) until
c DI3000 is installed.
c
c      if ((virtx.lt.xurgvp).and.(virtx.gt.xllgvp).and.(virty.gt.yllgvp)
c     +.and.(virty.lt.yurgvp).and.(button.eq.qmb(1))) then
      if ((virtx.lt.xurgvp).and.(virtx.gt.xllgvp).and.(virty.gt.yllgvp)
     +.and.(virty.lt.yurgvp)) then
        call jconvw (virtx, virty, worldx, worldy, worldz)
        valid=.true.
      endif
      return
      end


C+*+*+*+*+*+*+*+*+*+*+*+*+*+*+*+*+*+*+*+*+*+*+*+*+*+*+*+*+*+*+*+*+*+*|*+*+*+*+
c  UNIT NAME:                          logasc
c
c  Functional Description:
c        convert a logical array to t's and f's in a character string
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                          SPARAM
c
c  Local Variables: N/A
c
c  Restrictions: N/A
c
c  Abnormal Return Conditions:  N/A
c
c  Location:      /a21/dave
c
c  Programmer         Date of Last Change       Reason for Change
c
C-*-*-*-*-*-*-*-*-*-*-*-*-*-*-*-*-*-*-*-*-*-*-*-*-*-*-*-*-*-*-*-*-*-*|*-*-*-*-
c
      subroutine logasc (logarr,len,chastr)
c
c     convert a logical array to t's and f's in a character string
c
      logical logarr(*)
      character*(*) chastr
c
      do 110 i=1,len
          if (logarr(i)) then
              chastr(i:i) = 't'
          else
              chastr(i:i) = 'f'
          endif
  110 continue
c
      return
      end
```

```
C+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    logo
c
c  Functional Description:
c       displays logo information when first starting program in graphics ar
c
c  Input Files/Parameters:
c
c  Output Files/Parameters: N/A
c
c  Subroutines/Functions Called:
c     Note: Subroutines preceded by a "j" are explained in the DI-3000 manu
c
c  Called By:                    FMAIN
c
c  Local Variables: N/A
c
c  Restrictions: N/A
c
c  Abnormal Return Conditions:  N/A
c
c  Location:      /a21/dave
c
c  Programmer        Date of Last Change       Reason for Change
c  L McCleary         1987                     update    - logo
c
C-*-*-*-*-*-*-*-*-*-*-*-*-*-*-*-*-*-*-*-*-*-*-*-*-*-*-*-*-*-*-*-*-*-*-*|*-*-*-*-

      subroutine logo

c     displays logo information when first starting program in graphics ar

      common /comgra/xllgra,yllgra,xurgra,yurgra,ibcgra,iocgra
      common /mapdat/ mdraw,ovdraw
      logical mdraw,ovdraw
      common /logseg/ nsglog
      logical sys,plain
      common /sysdbc/ sys
      common /plndbc/ plain
      character*40 versn

      data lenver/40/
      data versn/'       Version 3.1      June, 1989'/
      data icolcm/16/

      call jdvisb (0)
      call gravpt
      call jwindo (xllgra,xurgra,yllgra,yurgra)
      call jropen (nsglog)
      diffx = xurgra - xllgra
      diffy = yurgra - yllgra
      xsize = .06 * diffx
      ysize = .09 * diffy
      call jsize (xsize,ysize)
      call jfont (3)
      call xcolor (icolcm)
      call jjust (2,1)
      rmidx = xllgra + diffx / 2
      posy = yllgra + diffy * .58
      if (sys) print*,'logo -- ',xllgra,
     + xurgra,yllgra,yurgra,rmidx,posy,diffx,diffy,xsize,ysize
      call jmove (rmidx,posy)
      if (plain) then
         CALL J1STRG('Caricature')
      else
         CALL JHSTRG('Caricature')
      endif
      call jfont (1)
      xsize = .02 * diffx
      ysize = .03 * diffy
      call jsize (xsize,ysize)
      posy = yllgra + diffy * .25
      call jmove (rmidx,posy)
      if (plain) then
```

```
    CALL J1STRG ('National Security Agency')
    posy = yllgra + diffy * .20
    call jmove (rmidx,posy)
    CALL J1STRG ('Naval Ocean Systems Center')
else
    CALL JHSTRG ('National Security Agency')
    posy = yllgra + diffy * .20
    call jmove (rmidx,posy)
    CALL JHSTRG ('Naval Ocean Systems Center')
endif
posy = yllgra + diffy * .09
call jmove (rmidx,posy)
if (plain) then
   call jlstrg (versn(1:lenver))
else
   call jhstrg (versn(1:lenver))
endif
call jrclos
ovdraw = .true.
call jdvisb (1)
call jvisbl (nsglog,0)

return
end
C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    MAJORS
C
C FUNCTIONAL DESCRIPTION:       .
C
C CALLED BY:                    STATEC
C
C PROGRAMMER:                   DATE OF LAST CHANGE     REASON FOR CHANGE
c  S. Lamb                Feb 1988                command fix - majors
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine majors
c
c      this subroutine is the major feature state interpreter (9)
c
       common /states/ nextst
       logical wordis,iseoc
       logical isfeat
       logical sketch,majorf,minorf
       common /statel/ sketch,majorf,minorf
c      map parameters
       logical lton(16),dotem
       integer ipgrid(4),ltyptb(16)
       common /map/ XRNM,XC,YC,LEVEL,CLAT,CLON,XRAD,YRAD,ITPROJ,
     +     IRES,LTYPTB,LUNDAT,LUNIND,LUNLIN,LTON,IPGRID,DOTEM,
     +     ORHALT
c
       initls = nextst
c      do until nextst not = initial state
 100   continue
           call getwrd
           if (wordis('DETAIL')) then
               nextst = 21
           else if (wordis('SCALE')) then
               nextst = 23
           else if (isfeat()) then
               if (majorf) then
                   level = 0
                   nextst = 8
               else
                   level = level - 1
c                  *** could expand on this -- error message ***
                   if (level.lt.0) then
                       level = 0
                       nextst = 1
                   else
                       nextst = 8
                   endif
               endif
```

```
            else if.(wordis('LEVEL').or.wordis('OF')) then
c * ** *** **** ***** ****** ******* not understood / implem.
                nextst = 15
            else if (iseoc()) then
                if (majorf) then
                    level = 0
                else
                    level = level - 0
c                   *** could expand on this -- error message ***
                    if (level.lt.0) level = 0
                endif
                nextst = 1
            else
                call putwrd
                nextst = 15
            endif
        if (nextst.eq.initls) go to 100
c
        return
        end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME: makamp
c
c  Functional Description:
c       this subroutine clears the amplification area
c       and puts it in a retained segment
c
c  Input Files/Parameters:
C       qbox,qbkgrd
C       nsgamp
c
c  Output Files/Parameters:
c
c  Subroutines/Functions Called:
c       Note: Subroutines preceded by a "j" are explained in the DI-3000 manual.
C       AMPVPT
C       CLRVPT
c
c  Called By:                   FMAIN, INIPIC
c
c  Local Variables:             N/A
c
c  Restrictions:                N/A
c
c  Abnormal Return Conditions: N/A
c
c  Location:
c
c  Programmer          Date of Last Change       Reason for Change
C  L. McCleary         Jan 1988               separate amp & sys - makamp
c
C-*-*-*-*-*-*-*-*-*-*-*-*-*-*-*-*-*-*-*-*-*-*-*-*-*-*-*-*-*-*-*-*-*-*-*-*|*-*-*-*-
c
        subroutine makamp
c
c       this subroutine clears the amplification area and puts it in a retained
c
        common /csgamp/ nsgamp
        common/scratr/qbox,qbkgrd
        integer qbox,qbkgrd
c
        call ampvpt
        call clrvpt (nsgamp,qbox,qbkgrd)
        call jvisbl (nsgamp,1)
c
        return
        end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:    MAKBOX
c
c  Functional Description:
```

```
c  this subroutine clears the construction box area
c  and puts it in a retaind segment
c
c  Input Files/Parameters:
C       qbox,qbkgrd,qmcolr
C       nsgbox,nsgsho,nsgcrm
c
c  Output Files/Parameters:
c
c  Subroutines/Functions Called:
C       BOXVPT
C       CLRBVP
c
c  Called By:                   FMAIN, INIPIC
c
c  Local Variables:             N/A
c
c  Restrictions:                N/A
c
c  Abnormal Return Conditions: N/A
c
c  Location:  ./a21/dave
c
c  Programmer          Date of Last Change        Reason for Change
c
C-*-*-*-*-*-*-*-*-*-*-*-*-*-*-*-*-*-*-*-*-*-*-*-*-*-*-*-*-*-*-*-*-*-*-*|*-*-*-*-
c
       subroutine makbox
c
c      this subroutine clears the construction box area and puts it in a
c      retained segment
c
       common /boxseg/ nsgbox,nsgsho,nsgcrm
       common/scratr/qbox,qbkgrd
       integer    qbox,qbkgrd

c ---- define box window
       common /boxdim/ qbxwmn,qbxwmx,qbywmn,qbywmx
       real            qbxwmn,qbxwmx,qbywmn,qbywmx

c ---- define default window for box area
       qbxwmn = -50.
       qbxwmx = 160.
       qbywmn = -50.
       qbywmx = 160.

c       common/scratr/qbox,qbkgrd,qmcolr
c       integer qbox,qbkgrd,qmcolr
c
c      print*,'makbox -- enter ',nsgbox
       call boxvpt
c       call clrbvp (nsgbox,qbox,qmcolr)
       call clrbvp (nsgbox,qbox,qbkgrd)
c
       return
       end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:  MAKCOM
c
c  Functional Description:
c       this subroutine clears the communications area
c       and puts it in a retaind segment
c
c  Input Files/Parameters:
C       qbox,qbkgrd,qmcolr
C       nsgmen,nsggra,nsgsys,nsgmsg,nsgmap,nsgful,nsgkey
c
c  Output Files/Parameters:
c
c  Subroutines/Functions Called:
c       Note: Subroutines preceded by a "j" are explained in the DI-3000 manual.
C       COMVPT
C       CLRVPT
```

```
c
c  Called By:                  FMAIN, INIPIC
c
c  Local Variables:            N/A
c
c  Restrictions:               N/A
c
c  Abnormal Return Conditions: N/A
c
c  Location:   /a21/dave
c
c  Programmer       Date of Last Change      Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine makcom
c
c     this subroutine clears the communications area and puts it in
c     a retained segment
c
      common /arsegs/ nsgmen,nsggra,nsgsys,nsgmsg,nsgmap,nsgful
      common/scratr/qbox,qbkgrd
      integer qbox,qbkgrd
c
      call comvpt
      call clrvpt (nsgsys,qbox,qbkgrd)
      call jvisbl (nsgsys,1)
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:    MAKFUL
c
c  Functional Description:
c     this subroutine clears the full screen area and
c     puts it in a retained egment
c
c  Input Files/Parameters:
C     qbox,qbkgrd,qmcolr
C     nsgmen,nsggra,nsgsys,nsgmsg,nsgmap,nsgful,nsgkey
C     xaspec,yaspec,xvlow,xvhigh,yvlow,yvhigh
c
c  Output Files/Parameters:
c
c  Subroutines/Functions Called:
c     Note: Subroutines preceded by a "j" are explained in the DI-3000 manual.
C     JVISBL
C     CLRVPT
c
c  Called By:                  FMAIN, INIPIC
c
c  Local Variables:            N/A
c
c  Restrictions:               N/A
c
c  Abnormal Return Conditions: N/A
c
c  Location:   /a21/dave
c
c  Programmer       Date of Last Change      Reason for Change
c  L McCleary       Jan 1988               sep amp & sys - makful
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine makful
c
c     this subroutine clears the full screen area and puts it in a
c     retained segment
c
      common /aspect/ xaspec,yaspec,xvlow,xvhigh,yvlow,yvhigh
      common /arsegs/ nsgmen,nsggra,nsgsys,nsgmsg,nsgmap,nsgful
```

```
      common/scratr/qbox,qbkgrd
      integer qbox,qbkgrd
c
      call jvport (xvlow,xvhigh,yvlow,yvhigh)

      call clrvpt (nsgful,qbox,qbkgrd)
c      call jvisbl (nsgful,0)
      call jvisbl (nsgful,1)
c
      return
      end

C++++++++++++++++++++++++++++++++++++++++++++++++++++++++++++++++++|+++++++
c  UNIT NAME:   MAKGRA
c
c  Functional Description:
c       this subroutine clears the graphics area
c       and puts it in a retained segent
c
c  Input Files/Parameters:
C       qbox,qbkgrd,qmcolr
C       nsgmen,nsggra,nsgsys,nsgmsg,nsgmap,nsgful,nsgkey
c
c  Output Files/Parameters:
c
c  Subroutines/Functions Called:
c       Note: Subroutines preceded by a "j" are explained in the DI-3000 manual.
C       GRAVPT
C       CLRVPT
c
c  Called By:                FMAIN, INIPIC
c
c  Local Variables:          N/A
c
c  Restrictions:             N/A
c
c  Abnormal Return Conditions: N/A
c
c  Location:   /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*|*-*-*-*-
c
      subroutine makgra
c
c     this subroutine clears the graphics area and puts it in a
c     retained segment
c
      common /arsegs/ nsgmen,nsggra,nsgsys,nsgmsg,nsgmap,nsgful
      common/scratr/qbox,qbkgrd
      integer qbox,qbkgrd
c
      call gravpt
      call clrvpt (nsggra,qbox,qbkgrd)
      call jvisbl (nsggra,1)
c
      return
      end
C++++++++++++++++++++++++++++++++++++++++++++++++++++++++++++++++++|+++++++
C UNIT NAME:                MAKINV
C
C FUNCTIONAL DESCRIPTION:
C
C CALLED BY:                TIMCHK
C
C PROGRAMMER:               DATE OF LAST CHANGE    REASON FOR CHANGE
C
C-*-*-*-*-*-*-*-*-*-*-*-*-*-*-*-*-*-*-*-*-*-*-*-*-*-*-*-*-*-*-*-*-*-*|*-*-*-*-

      subroutine makinv(fadndx)
c
```

```
c     this subroutine invisibles the track
c     indicated by fadndx
c
      integer*4 fadndx
      integer*4 segnum
      integer*4 aray(19)

      integer tkoset
      common /tkoset/ tkoset
      integer trkndx(1000)
      common /trkndx/ trkndx

      segnum = trkndx(fadndx) + tkoset
c
c***  check to see if this plot has been suppressed
c***  if not, then make it invisible
c
      call jisgmt(segnum,aray)
      if (aray(1) .eq. 1) then
         call jvisbl(segnum,0)
      endif

      return
      end

C+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:   MAKKEY
c
c  Functional Description:
c       this subroutine clears the key area and
c       puts it in a retained segment
c
c  Input Files/Parameters:
C       qbox,qbkgrd,qmcolr
C       nsgmen,nsggra,nsgsys,nsgmsg,nsgmap,nsgful,nsgkey
c
c  Output Files/Parameters:
c
c  Subroutines/Functions Called:
c       Note: Subroutines preceded by a "j" are explained in the DI-3000 manual.
C       KEYVPT
C       CLRVPT
c
c  Called By:                   FMAIN, INIPIC
c
c  Local Variables:                    N/A
c
c  Restrictions:                N/A
c
c  Abnormal Return Conditions: N/A
c
c  Location:   /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine makkey
c
c      this subroutine clears the key area and puts it in a retaind segment
c
       common /nsgkey/ nsgkey,nsgktx
       common/scratr/qbox,qbkgrd
       integer qbox,qbkgrd
c
       call keyvpt
       call clrvpt (nsgkey,qbox,qbkgrd)
       call jvisbl (nsgkey,1)
c
       return
       end
```

```
C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:   MAKMEN
c
c  Functional Description:
c       this subroutine clears the menu area and
c       puts it in a retained segment
c
c  Input Files/Parameters:
C       qbox,qbkgrd,qmcolr
C       nsgmen,nsggra,nsgsys,nsgmsg,nsgmap,nsgful,nsgkey
c
c  Output Files/Parameters:
c
c  Subroutines/Functions Called:
c       Note: Subroutines preceded by a "j" are explained in the DI-3000 manual.
C       MENVPT
C       CLRVPT
c
c  Called By:                   FMAIN, INIPIC
c
c  Local Variables:      N/A
c
c  Restrictions:                N/A
c
c  Abnormal Return Conditions: N/A
c
c  Location:   /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*|*-*-*-*-
c
      subroutine makmen
c
c     this subroutine clears the menu area and puts it in a retained segment
c
      common /arsegs/ nsgmen,nsggra,nsgsys,nsgmsg,nsgmap,nsgful
      common/scratr/qbox,qbkgrd
      integer qbox,qbkgrd
c
      call menvpt
      call clrvpt (nsgmen,qbox,qbkgrd)
      call jvisbl (nsgmen,1)
c
      return
      end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:   MAKSHO
c
c  Functional Description:
c       this subroutine clears the short menu area and
c       puts it in a retained segment
c
c  Input Files/Parameters:
C       nsgbox,nsgsho,nsgcrm
C       qbox,qbkgrd,qmcolr
c
c  Output Files/Parameters:
c
c  Subroutines/Functions Called:
C       CLRVPT
C       SHOVPT
c
c  Called By:                   FMAIN, INIPIC
c
c  Local Variables:          N/A
c
c  Restrictions:                N/A
c
c  Abnormal Return Conditions: N/A
c
c  Location:   /a21/dave
```

```
c
c  Programmer         Date of Last Change        Reason for Change
c
C-*-*-*-*-*-*-*-*-*-*-*-*-*-*-*-*-*-*-*-*-*-*-*-*-*-*-*-*-*-*-*-*-*-*-*-*|*-*-*-*-
c
       subroutine maksho
c
c      this subroutine clears the short menu area and puts it in a
c      retained segment
c
       common /boxseg/ nsgbox,nsgsho,nsgcrm
       common/scratr/qbox,qbkgrd
       integer qbox,qbkgrd
c
       call shovpt
       call clrvpt (nsgsho,qbox,qbkgrd)
c
       return
       end


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    MAPOVR
C
C FUNCTIONAL DESCRIPTION:       .
C
C CALLED BY:                    DRAWIT, FMAIN, RECDIS, OVRCON
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

       subroutine mapovr

c      this subroutine overlays text data on the map

       common /aspect/ xaspec,yaspec,xvlow,xvhigh,yvlow,yvhigh
       common /comgra/ xllgra,yllgra,xurgra,yurgra,ibcgra,iocgra
       logical overly,sclflg,f3,clsflg,f5,f6,incrdf,f8,
     +     tablet,ff(7)
       common /overly/ overly,sclflg,f3,clsflg,f5,f6,incrdf,f8,
     +     tablet,ff
       common /comscr/ xllscr,yllscr,xurscr,yurscr
       common /mapdat/ mdraw,ovdraw
       logical mdraw,ovdraw
       common /ctext/ igrtxt,isytxt,iantxt
       common /classi/ classi
       common /lencla/ lencla
       character*50 classi
       integer unidtb(16)
       character*15 comnam(10),crynam(10)
       common /dbover/ comnam,crynam,unidtb,numcom,numcry
       common /envirn/ comsat,hf,los,ll,unkn
       logical comsat,hf,los,ll,unkn
       integer sclseg,clsseg
       common /lnseg/ sclseg,clsseg
       logical lton(16),dotem
       integer ipgrid(4),ltyptb(16)
       common /map/ XRNM,XC,YC,LEVEL,CLAT,CLON,XRAD,YRAD,ITPROJ,
     +     IRES,LTYPTB,LUNDAT,LUNIND,LUNLIN,LTON,IPGRID,DOTEM,
     +     ORHALT
       character*32 scabuf
       character *10 str,text
       data scabuf/'       N Miles at center        '/
       data text/'          '/,str/'          '/
       data xarrow,yarrow/1.5,.2/

       ovdraw = .true.
       call jvport (xvlow,xvhigh,yvlow,yvhigh)
       call jwindo (xllscr,xurscr,yllscr,yurscr)
       if (sclflg) then
           if(clsseg.ne.0) call jpurge(sclseg)
           call getseg(sclseg)
           call jropen(sclseg)
```

```
          call jsize (1.,1.)
          call xcolor (igrtxt)
          ixr=xrnm
          if(ixr.gt.100000) ixr=99999
          write(scabuf(1:6),10100) ixr
10100     format(i6)
c          if (itproj.eq.6.or.itproj.eq.7) then
c              scabuf(8:14) = 'Minutes'
c          else
              scabuf(8:14) = 'N Miles'
c          endif
c          if (itproj.eq.5) then
c              call jjust(1,1)
c              call jmove (xllgra,yllgra+1.)
c              scabuf(16:24) = 'altitude '
c          else
              call jmove (xllgra,yllgra+1.)
              call jdraw (xllgra+(xurgra-xllgra)/2.,yllgra+1.)
              call jrdraw (-xarrow,yarrow)
              call jrmove (0.,-2.*yarrow)
              call jrdraw (xarrow,yarrow)
              call jmove (xllgra,yllgra+1.)
              call jrdraw (xarrow,yarrow)
              call jrmove (0,-2.*yarrow)
              call jrdraw (-xarrow,yarrow)
              call jjust(2,1)
              xx = xllgra+(xurgra-xllgra)/4.
              call jmove (xx,yllgra+2.)
              scabuf(16:24) = 'at center'
c          endif.
          call mytext (24,scabuf)
          call jrclos
      endif
c      if (clsflg) then
c          if(clsseg .ne. 0) call jpurge(clsseg)
c          call getseg(clsseg)
c          call jropen(clsseg)
c          call jsize (1.,1.)
c          call xcolor (igrtxt)
c          call jjust(3,1)
c          call jmove (xurgra-1.,yllgra+1.)
c          call mytext (lencla,classi)
c          call jrclos
c      endif
      return
      end

C+*+*+*+*+*+*+*+*+*+*+*+*+*+*+*+*+*+*+*+*+*+*+*+*+*+*+*+*+*+*+*+*+*+*|*+*+*+*+
C UNIT NAME:                     MAPPER
C
C FUNCTIONAL DESCRIPTION:        .
C
C CALLED BY:                     DRAWF, DRAWIT, FMAIN, RECDIS
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*|*-*-*-*-

      SUBROUTINE MAPPER (drawon)

C     THIS SUBROUTINE CALLS THE DMAPII SUBROUTINE

      INTEGER SEGNO,FIRSEG
      COMMON /SEGNO/ SEGNO,FIRSEG

      INTEGER QLEVL(16)
      COMMON /LEVLS/ QLEVL

      logical metafl,map
      common /mapdbc/ map
      common /metdbc/ metafl

      logical drawon
```

```
      LOGICAL QMAPUP
      COMMON /MAPUP/ QMAPUP
      COMMON /PROJT/ IGNOMN,IORTEQ,IORTPO,IORTHO,IPERSP
      COMMON /PROJT2/ IEQREC,IMERCA,ILAMCN
      COMMON /PIE/ PIE,TPIE,PIO2,PIO4

      LOGICAL QLTON(16),QDOTEM
      INTEGER QPGRID(4),QTYPTB(16)
      INTEGER QLEVEL,QITPRO,QIRES,QLUNDA,QLUNIN,QLUNLI
      COMMON /MAP/ QXRNM,QXC,QYC,QLEVEL,QCLAT,QCLON,QXRAD,QYRAD,
     +    QITPRO,
     +    QIRES,QTYPTB,QLUNDA,QLUNIN,QLUNLI,QLTON,QPGRID,QDOTEM,
     +    QORHAL

      common/oneflg/oneflg
      logical oneflg
      dimension ltypov(16)
      logical ltonov(16),rankt(26,16)
      common /maptoo/ ltypov,ltonov,rankt
      logical bitmod
      common /bitmod/ bitmod
c
c
c-----------------------------------------------------------------------|--+
c Itproj:  1  2  3  4  5  6  7  8  9 10 11 12 13 14 15 16 17 18 19 20 21  |
c--------------------------------------------------------------------------+
c          g  o  o  o  p  e  m  l  a  a  k  m  o  p  p  u  s  s           |
c          n  r  r  r  e  q  e  a  l  z  a  i  b  o  o  t  i  t           |
c          o  e  p  t  r  r  r  m  b  e  e  v  l  l  s  l  m  n  e        |
c          m  q  o  h  s  e  c  c  r  a  d  r  l  m  t  y  z  u  r        |
c--------------------------------------------------------------------------+
     goto(1,03,01,01,01,02,02,02,02,01,01,01,02,03,01,01,02,02,01
    +    )qitpro
c
c     Case #1  Poles are ok for map center.
 1       if (abs(qclat).gt.pio2)  qclat = sign(pio2,qclat)
         go to 900
c
c     Case #2  Some projections must be nudged slightly off poles.
 2       hilat = pio2-(.01745329/2.)
         if (abs(qclat).gt.hilat)  qclat = sign(hilat,qclat)
         go to 900
c
c     Case #3  Others need respectably safe distance.
 3       hilat = pio2-.01745329
         if (abs(qclat).gt.hilat)  qclat = sign(hilat,qclat)
         go to 900
c
c     End Cases
 900  continue

      CALL INITIA (QXC,QYC,QCLAT,QCLON,QXRAD,QYRAD,QITPRO,QIRES,
     + QXRNM,QORHAL)

c     screen width in amp area                              - mapper
      CALL SCRDIA
      CALL GRAVPT
      CALL GEOWIN
      CALL JWCLIP (.TRUE.)

      if (drawon) then
c         Enable all planes for display of map data
          call enall

          if (metafl) call gmopen ('metafile',8,ierror)
          if (bitmod) then
              call jopen
          else
              IF (map) print*,'opening',firseg
              CALL JROPEN(FIRSEG)
          endif

          CALL DMAPII(QXRNM,QXC,QYC,QLEVL,QCLAT,QCLON,QXRAD,QYRAD,
```

```
     +      QITPRO,
     +      QIRES,QTYPTB,QLUNDA,QLUNIN,QLUNLI,QLTON,QPGRID,QDOTEM,
     +      QORHAL,ltypov,ltonov,rankt)
c
            if (bitmod) then
               call jclose
            else
               CALL JRCLOS
            endif
            if (metafl) call gmclos
c
c           Display map parameters.
            call scrdia
c
        endif

c       Set to overlay planes to protect map from here on
c       but only if not drawing to one plane

        if (.not.(oneflg)) call soverl

c       draw all overlay features

        call doverl (ltypov,ltonov)
        CALL FLUSHB

        IF (map) PRINT*,'MAP CALL IS COMPLETE'

        RETURN
        END

C+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                        menupr
c
c  Functional Description:
c       this subroutine puts a standard prompt for menu selection
c
c  Input Files/Parameters:
c
c  Output Files/Parameters: N/A
c
c  Subroutines/Functions Called:
c
c  Called By:                        DETCON, MMCON,  NOTAVA, PROCON, RESCON
C                                    RSLCON, SUBCHK, TRKCON, FTRCON
C                                    GEOCON, OVRCON
c
c  Local Variables: N/A
c
c  Restrictions: N/A
c
c  Abnormal Return Conditions:  N/A
c
c  Location:      /a21/dave
c
c  Programmer          Date of Last Change          Reason for Change
c
C-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine menupr
c
c       this subroutine puts a standard prompt for menu selection
c
c
c       call system (17,'Select menu item.')
        call mesg(1)
c
        return
        end

C+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:      MENVPT
```

```
c
c  Functional Description:
c       this subroutines sets the menu area viewport
c
c  Input Files/Parameters:
C       xllmvp,yllmvp,xurmvp,yurmvp
c
c  Output Files/Parameters:
c
c  Subroutines/Functions Called:
c       Note: Subroutines preceded by a "j" are explained in the DI-3000 manual.
c
c  Called By:                  CLRMEN, MAKMEN, RECDIS, SAVDIS, CLASS
c
c  Local Variables:     N/A
c
c  Restrictions:               N/A
c
c  Abnormal Return Conditions: N/A
c
c  Location:    /a21/dave
c
c  Programmer         Date of Last Change        Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine menvpt
c
c      this subroutines sets the menu area viewport
c
       common /commvp/ xllmvp,yllmvp,xurmvp,yurmvp
c
       call jvport (xllmvp,xurmvp,yllmvp,yurmvp)
c
       return
       end


C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:     MENWIN
c
c  Functional Description:
c       this subroutines sets the menu area window
c
c  Input Files/Parameters:
C       xllmen
c       yllmen
c       xurmen
c       yurmen
c       ibcmen
c       iocmen
c       incmen
c
c  Output Files/Parameters:
c
c  Subroutines/Functions Called:
c       Note: Subroutines preceded by a "j" are explained in the DI-3000 manual.
c
c  Called By:                  CLRMEN, KEYS, RECDIS, SAVDIS, CLASS
c
c  Local Variables:     N/A
c
c  Restrictions:               N/A
c
c  Abnormal Return Conditions: N/A
c
c  Location:    /a21/dave
c
c  Programmer         Date of Last Change        Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
       subroutine menwin
c
c      this subroutines sets the menu area window
```

```
c
      common /commen/xllmen,yllmen,xurmen,yurmen,ibcmen,iocmen,incmen
c
      call jwindo (xllmen,xurmen,yllmen,yurmen)
c
      return
      end

C+*+*+*+*+*+*+*+*+*+*+*+*+*+*+*+*+*+*+*+*+*+*+*+*+*+*+*+*+*+*+*+*+*+*|*+*+*+*+
c  UNIT NAME:                 mesg
c
c  Functional Description:    Subroutine to display a message in the
c                              communications area
c
c  Input Files/Parameters:
c     General Gobals
c       qdsdev       device      integer   DI-3000 variable
c       qpydev       device      integer   DI-3000 variable
c       qecho        device      integer   DI-3000 variable
c       qxllcv       comcvp      integer   lower left x value of the
c                                           communications viewport
c       qyllcv       comcvp      integer   lower left y value of the
c                                           communications viewport
c       qxurcv       comcvp      integer   upper right x value of the
c                                           communications viewport
c       qyurcv       comcvp      integer   upper right y value of the
c                                           communications viewport
c       qcxmin       comwdo      real      minimum x boundary for the
c                                           communications window
c       qcxmax       comdow      real      maximum x boundary for the
c                                           communications window
c       qcymin       comdow      real      minimum y boundary for the
c                                           communications window
c       qcymax       comdow      real      maximum y boundary for the
c                                           communications window
c
c  Output Files/Parameters:    N/A
c
c  Subroutines/Functions Called:
c     Note: Subroutines preceded by a "j" are explained in the DI-3000 manual.
c     clrbox                  clears the construction box area
c
c  Called By:  46 Routines
c
c  Local Variables:
c     msgno                integer   number of message to be displayed
c                                     true if valid file name
c     msg                  character 80 by 5 character array to hold
c                                     message
c     lines                integer   number of lines of message to be
c                                       displayed
c     length               integer   actual length of input recieved
c
c  Restrictions: If communications area is only 6 lines high, then the
c   message to out putted must be one line less than 6, (5).  The com-
c   munications area is thought to have 80 character lines, therefore,
c   each line of an output message can be no longer than 80 characters.
c
c  Abnormal Return Conditions:  N/A
c
c  Location:   /a21/dave
c
c  Programmer         Date of Last Change       Reason for Change
c     bam              October 27, 1983
c  L McCleary          Jan 1988              sep amp & sys - mesg
c
C-*-*-*-*-*-*-*-*-*-*-*-*-*-*-*-*-*-*-*-*-*-*-*-*-*-*-*-*-*-*-*-*-*-*|*-*-*-*-

      subroutine mesg(msgno)
c
c     put a message into the communications area
```

```
c
      logical mesgon(1299)
      logical sys
c      logical batch
      common /sysdbc/ sys
      common /msgold/ msgold,msgonm
      common /msgoff/ msgoff
      common /qprint/ qprint
      common /mesgon/ mesgon
      logical qprint
      data mesgon/1299*.false./

      data msgold/-1/,msgonm/-1/,maxmsg/1299/
c
c     If repeated input from the keyboard is needed without
c     changing the message, include the msgold common area in
c     your program and set it's value to 0 before calling mesg
c
      if (sys) print*,'mesg -- enter ',msgno,msgold
      if (msgno.ne.msgold .and. .not. qprint) then
c          if (batch) call clrcom
         if ((msgno .gt. 0) .and. (msgno .le. maxmsg)) then
             if (msgonm .gt. 0) then
                 call jvisbl(msgonm + msgoff,0)
             else if (msgonm .eq. 0) then
c                msgonm 0 has been reserved for temporary messages used
c                by dmapii and sysmsg, these are purged when replaced
                 call jpurge (msgoff)
             endif
             if (.not.mesgon(msgno)) then
                 call crmesg(msgno)
                 mesgon(msgno) = .true.
             else
                 call jvisbl(msgno + msgoff, 1)
             endif
             msgold = msgno
             msgonm = msgno
         else
             print*,'mesg -- message number ',msgno,' outside ',
     +       'range of message numbers (',maxmsg,')'
         endif
      endif
c
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       MESGJF
C
C FUNCTIONAL DESCRIPTION:
C
C CALLED BY:
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine mesgjf(msgno,il,iseg)

C  SUBROUTINE TO PLACE A MESSAGE IN THE COMMUNICATIONS AREA UNDER A
C  CURRENTLY DISPLAYED MESSAGE WITHOUT PURGING THE CURRENT MESSAGE IN
C  THE COMMUNICATIONS AREA.  THE MESSAGE IS DISPLAYED ON LINE
C  IL.  THE NEW MESSAGE IS PLACED IN A RETAINED SEGMENT AND THE
C  RETAINED SEGMENT NUMBER IS PASSED BACK TO THE CALLING ROUTINE,
C  (USUALLY PRMGJF)  WHERE THE SEGMENT CAN BE PURGED AFTER INPUT
C  IS RECIEVED.
      integer il
      character*50 menpth
      common /menpth/ menpth
      common /lenmen/ lenmen
      common/comwdo/qcxmn,qcymn,qcxmx,qcymx
      real qcxmn,qcymn,qcxmx,qcymx
C      common /arsegs/ nsgmen,nsggra,nsgsys,nsgmsg,nsgmap,nsgful
      character cchar
```

```
C        common /msgold/ msgold
c
       character *80 msg
       integer msgno,lenmsg
       character*80 filenm
       character*30 fname
       character*26  flettr
       data fname/'file'/,lname/4/
       data flettr /'abcdefghijklmnopqrstuvwxyz'/
       data icolcm/16/


           filenm = ' '

           call jwindo(qcxmn,qcxmx,qcymn,qcymx)
           CALL COMVPT
           CALL GETSEG(iseg)
           call jropen (iseg)
           call xsize (1.,1.)
           call xcolor (icolcm)
c
           ifl = 19
           indlet = msgno / 50 + 1
           if (indlet.lt.1) indlet = 1
           if (indlet.gt.26) indlet = 26
           filenm = menpth(1:lenmen) // fname(1:lname) //
     +     flettr(indlet:indlet) // '.msg'
           lennam = lenmen + lname + 5
           call openit(filenm,lennam,ifl,0,ierror)
           if (ierror.ne.0) go to 181
c          Loop though message file looking for message
  100      continue
               read (ifl,1100,end=183,err=182) cchar,msg
 1100          format (a1,a80)
c              print*,'line read - cchar: ',cchar,msg
c              *** skip comment lines
               if (cchar.eq.'C'.or.cchar.eq.'c') go to 100
               if (cchar.eq.'M'.or.cchar.eq.'m') then
                   read (msg,1150,end=183,err=182) msgnum
 1150              format (i5)
                   if (msgnum.eq.msgno) then
                       i=il-1
c                      loop until no more data lines (blank first char)
  120                  continue
                           read (ifl,1100,end=183,err=182) cchar,msg
c                          *** skip comment lines
                           if (cchar.eq.'C'.or.cchar.eq.'c')
     +                     go to 120
                          if (cchar.eq.'m'.or.cchar.eq.'M') go to 130
                          call length (msg,80,lenmsg)
                          i = i + 1
                          if (lenmsg.gt.0) then
                              call jmove(qcxmn + 1,(qcymx - i - .3))
                              call j1strg (msg(1:lenmsg))
                          endif
                      go to 120
  130                 continue
c                     position after last line for prompt subroutine
                      call echps(qcxmn+1,(qcymx - i - 1 - .3))
c                     exit after message found
                      go to 180
                  endif
              endif
          go to 100
  180     continue
          go to 190
  181     continue
              print*,'open error on message file ',msgno,ierror
              go to 190
  182     continue
              print*,'read error on message file ',msgno
              go to 190
  183     continue
              print*,'end of file - message not found :',msgno
```

```
190       continue
          call jrclos
          call closit (ifl)
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                        messag
c
c  Functional Description:
c       calculate
c
c  Input Files/Parameters:
c
c  Output Files/Parameters: N/A
c
c  Subroutines/Functions Called:
c
c  Called By: llshow
c
c  Local Variables: N/A
c
c  Restrictions: N/A
c
c  Abnormal Return Conditions:  N/A
c
c  Location:
c
c  Programmer      Date of Last Change     Reason for Change
C  L. McCleary     Jan 1988              separate amp & sys - messag
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        SUBROUTINE MESSAG(DIAM,LEN,LINE)

C  SUBROUTINE TO PLACE A CHARACTER STRING IN THE MESSAGE
C  AREA FOLLOWED WITH A MESSAGE TO PRESS ANY KEY TO CONTINUE.
C  THE MESSAGE AREA IS CLEARED BEFORE THE MESSAGE IS PLACED
C  IN THE COMMUNICATIONS AREA. NSGMSG IS USED AS THE RETAINED
C  SEGMENT NUMBER.

        CHARACTER*80 DIAM
        INTEGER LEN,LINE

        COMMON /MSGOLD/ MSGOLD,MSGONM

c         ICOLCM = 16
c         LOFF = LINE + .3
c         call clrcom
c         call CLRMSG
c         MSGONM = 0
        call drwamp(diam,1)

c         MSGOLD = 0

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C* UNIT NAME:                        mhand
C*
C* FUNCTIONAL DESCRIPTION:
C*
C*   This subroutine drives the menu interface of the A21PROTOTYPE.
C*
C* INPUT FILES/PARAMETERS:
C*
C*     Global Variables
C*       qcancl          logical; cancel flag
C*       qcrmnu          integer; contains the current menu number
C*       qext2m          logical; exit to main menu flag
```

```
C*      qexitg          logical; flag to exit graphics system
C*      qnextm          integer; number of next menu to be displayed
C*      qretrn          logical; return to previous menu flag
C*      qstmnu          logical; flag to put current menu on the stack
C*
C* OUTPUT FILES/PARAMETERS:
C*
C*      values in global variables described above
C*
C* RESTRICTIONS:
C*
C*      not restricted

C*
C* SUBROUTINES CALLED:
C*
C*      popst           subroutine; simulates popping an item off a
C*                                  stack
C*      pushst          subroutine; simulates pushing an item on a
C*                                  stack
C*      setvar  block data routine; initializes control variables to
C*                                  point to the main menu
C*      store           subroutine; handles permanent stores
C*      subcal          subroutine; calls menu drawing routine and
C*                                  appropriate menu controller
C*
C* CALLED BY:                    FMAIN
C*
C* LOCAL VARIABLES:
C*
C*      no local variables
C*
C* ABNORMAL RETURN CONDITIONS:
C*
C*      no abnormal return conditions
C*
C* LOCATION:
C*
C*      /u2/vcn/a21proto/mhand
C*
C* PROGRAMMER:              DATE OF LAST CHANGE     REASON FOR CHANGE
C*
C*  VCNewton                  15 August 1983          initial entry
C*
C-*-*-*-*-*-*-*-*-*-*-*-*-*-*-*-*-*-*-*-*-*-*-*-*-*-*-*-*-*-*-*-*-*-*-*|*-*-*-*-

      Subroutine MHAND

C     This subroutine drives the menu interface of the A21PROTOTYPE.

C        (**Declare common blocks and common block variables**)
         Integer qcrmnu,qnextm
         Logical qcancl,qexitg,qext2m,qretrn,qstmnu
         Common /b1/ qcancl,qext2m,qretrn,qstmnu,qnextm
         Common /b5/ qexitg
         Common /b6/ qcrmnu
         logical stackd
         stackd = .false.
         call setvar
C        (**Loop:                               **)
C        (**Do-until exit graphics is chosen**)
   10    Continue
C           (**Execute menu process**)
            menun = qnextm
            Call SUBCAL (menun,ierror)
            if (ierror.ne.0) then
               qnextm = qcrmnu
               qstmnu = .false.
               if (stackd) call popst
```

```
                  stackd = .false.
                  print*,'mhand -- unable to interpret menu',menun,ierror
               else
C                 (**Fall through loop if exit graphics is chosen**)
                  If (.not.(qexitg)) then
                     stackd = .false.
C                    (**Check for exit to main menu or cancel**)
                     if ((qext2m) .or. (qcancl)) then
                        if (.not.qcancl) then
                           Call STORE
                        endif
C                       (**Re-init control variables to point to the**)
C                       (**main menu                                 **)
                        Call SETVAR
C                       (**Initialize menu controller variables**)
                        Call reinip
C                    (**Check for return to previous menu**)
                     elseIf (qretrn) then
                        Call POPST
                        qretrn=.false.
C                       (**Reset qstmnu flag in case it was set when**)
C                       (**return was executed                      **)
                        qstmnu=.false.
C                       (**Perform store if multiple returns were made**)
C                       (**to return to the main menu                 **)
                        If (qnextm .eq. 1) then
C                          (**Before a store is made a check should be done**)
C                          (**to see if a picture exists                    **)
                           Call Store
C                          (**Initialize menu controller variables**)
                           Call reinip
                        Endif
C                    (**Check for placing a menu on the stack**)
                     Elseif (qstmnu) then
                        Call PUSHST
                        qstmnu=.false.
                        stackd = .true.
                     Endif
C                    (**Set the current menu number to the number    **)
C                    (**corresponding to the next menu to be displayed**)
c                    qcrmnu=qnextm
                  Endif
               endif
               If (qnextm .eq. 1) then
C                 (**Store the index**)
                  Call strind
               Endif
C              (**Remain in loop if exit graphics is not chosen**)
               If (.not.(qexitg)) goto 10
         end

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     MINORS
C
C FUNCTIONAL DESCRIPTION:        .
C
C CALLED BY:                     STATEC
C
C PROGRAMMER:                    DATE OF LAST CHANGE     REASON FOR CHANGE
c  S. Lamb                 Feb 1988                   command fix - minors
C
C-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine minors
c
c       this subroutine is the minor feature state interpreter (10)
c
        common /states/ nextst
        logical wordis,iseoc
        logical isfeat
        logical sketch,majorf,minorf
        common /statel/ sketch,majorf,minorf
c       map parameters
```

```
      logical lton(16),dotem
      integer ipgrid(4),ltyptb(16)
      common /map/ XRNM,XC,YC,LEVEL,CLAT,CLON,XRAD,YRAD,ITPROJ,
     +     IRES,LTYPTB,LUNDAT,LUNIND,LUNLIN,LTON,IPGRID,DOTEM,
     +     ORHALT
c
      initls = nextst
c     do until nextst not = initial state
 100  continue
          call getwrd
          if (wordis('DETAIL')) then
              nextst = 22
          else if (wordis('SCALE')) then
              nextst = 24
          else if (isfeat()) then
              if (minorf) then
                  level = 15
                  nextst = 8
              else
                  level = level + 1
c                 *** could expand on this -- error message ***
                  if (level.gt.15) then
                      level = 15
                      nextst = 1
                  else
                      nextst = 8
                  endif
              endif
              nextst = 8
          else if (wordis('LEVEL').or.wordis('OF')) then
c * ** *** **** ***** ****** ******* not understood / implem.
              nextst = 15
          else if (iseoc()) then
              if (minorf) then
                  level = 15
              else
                  level = level + 1
c                 *** could expand on this -- error message ***
                  if (level.gt.15) level = 15
              endif
              nextst = 1
          else
              call putwrd
              nextst = 15
          endif
      if (nextst.eq.initls) go to 100
c
      return
      end


C+*+*+*+*+*+*+*+*+*+*+*+*+*+*+*+*+*+*+*+*+*+*+*+*+*+*+*+*+*+*+*+*+*|*+*+*+*+
C UNIT NAME:                   MIRRIT
C
C FUNCTIONAL DESCRIPTION:      .
C
C CALLED BY:                   CHGPTS
C
C PROGRAMMER:                  DATE OF LAST CHANGE    REASON FOR CHANGE
C
C-*-*-*-*-*-*-*-*-*-*-*-*-*-*-*-*-*-*-*-*-*-*-*-*-*-*-*-*-*-*-*-*-*-*|*-*-*-*-

      subroutine mirrit(array,npts,scale)

c     This routine mirrors an array of points around the
c         0-point  by calculating the distance the point is
c         from 0 and subtracting two times that distance from
c         the point.
c    VARIABLES:
c        array- the points to be changed
c        npts- number of points in the array

      real array(*),scale
      integer npts
      real xv(4),yv(4),zv(4)
```

```
      call jiwind (xv,yv,zv)
      do 10 i=1,npts
         array(i) = -(array(i)) + (190./(2.6/scale))
10    continue
      return
      end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                          mpick
c
c  Functional Description:
c       this subroutine gets a selection from the menu
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                          COLBAK, DETCON, HELP, MMCON,  PROCON,
C                                      PRTMEN, RESCON, RSLCON, TRKCON
C                                      TXWRIT, CLASS,  FTRCON, GEOCON, OVRCON
c
c  Local Variables: N/A
c
c  Restrictions: N/A
c
c  Abnormal Return Conditions:  N/A
c
c  Location:      /a21/dave
c
c
C-*-*-*-*-*-*-*-*-*-*-*-*-*-*-*-*-*-*-*-*-*-*-*-*-*-*-*-*-*-*-*-*-*-*-*|*-*-*-*-
c
       subroutine mpick (ichoic,mysegn,ibuttn)
c
c      this subroutine gets a selection from the menu
c
c      *** this is a machine dependent subroutine and should be changed
c          if necessary when a new device driver is used that returns
c          different values for buttons ****
c          currently the value for the '0' key is 48
c
       logical sys,aed,vax
       common /sysdbc/ sys
       common /aeddbc/ aed
       common /vaxdbc/ vax
       integer segnam,pickid
       integer qfb(26),qmb(4)
       common /butons/ qfb,qmb
       character ch1
       equivalence (ch1(1:1),ikey)
c      on screen standard function key common
       common /nsgkey/ nsgkey,nsgktx

c
       if (sys) print*,'mpick -- enter  ',mysegn
       call pick (ibuttn,segnam,pickid)
       if (sys) print*,'mpick --  ',ibuttn,segnam,pickid,qmb(1)
       ichoic = 0
clj ------ The following 3 lines were changed so that a
clj ------ pick can only be triggered with function
clj ------ button 1.   (June 3,1985)
clj        if (mysegn.eq.segnam) then
clj            ichoic = pickid
clj            ibuttn = qmb(1)
       if (mysegn.eq.segnam.and.ibuttn.eq.qmb(1)) then
           ichoic = pickid
       else if (ibuttn .ne. qmb(3) .and. ibuttn .ne. qfb(26) .and.
     +          ibuttn .ne. qfb(15) .and. ibuttn .ne. qfb(16)) then
           if (segnam.eq.nsgktx) then
               ibuttn = pickid
```

```
            else if (aed) then
                ichoic = ibuttn - 48
            else
c
c***            otherwise, set ibuttn to the segment number,
c***            this will trigger the call to check to look for a
c***            segment associated with a tracking plot on the screen
c
                ibuttn = segnam
            endif
        endif

c       The following logic is for button menu input
c
c       if (vax) then
c        if(ibuttn.le.9)then
c                ichoic=ibuttn
c        elseif (ibuttn.eq.ichar('A'))then
c                ichoic=10
c        elseif (ibuttn.eq.ichar('B'))then
c                ichoic=11
c        elseif (ibuttn.eq.ichar('C'))then
c                ichoic=12
c        elseif (ibuttn.eq.ichar('D'))then
c                ichoic=13
c        endif
c       endif

        if (sys)
     +  print*,'mpick -- exit  ichoic = ',ichoic,mysegn,ibuttn
c
        return
        end

C+*+*+*+*+*+*+*+*+*+*+*+*+*+*+*+*+*+*+*+*+*+*+*+*+*+*+*+*+*+*+*+*+*+*|*+*+*+*+
C UNIT NAME:                      MRCNTR
C
C FUNCTIONAL DESCRIPTION:
c -   Description: This routine mirrors an array of points around the
c                     50, 59 point.
c    VARIABLES:
c        array- the points to be changed
c        npts- number of points in the array
C
C CALLED BY:
C
C PROGRAMMER:                     DATE OF LAST CHANGE     REASON FOR CHANGE
c    MODIFIED BY M. Bloom, T333 June 1987 to allow icons to be
c      positioned by center point rather than lower left
c      corner
C
C-*-*-*-*-*-*-*-*-*-*-*-*-*-*-*-*-*-*-*-*-*-*-*-*-*-*-*-*-*-*-*-*-*-*|*-*-*-*-

       subroutine mrcntr(array,npts,scale)
      real array(*),scale
      integer npts

      real xv(4),yv(4),zv(4)
      call jiwind (xv,yv,zv)
      do 100 i=1,npts

c   Since the center of the construction box is 50,50 add 100
c   to the inverse of the point.  This mirrors the icon around
c   the center.

           array(i) = -(array(i)) + 100.
c          array(i) = -(array(i)) + (190./(2.6/scale))

100   continue
      return
      end
```

```
C+*+*+*+*+*+*+*+*+*+*+*+*+*+*+*+*+*+*+*+*+*+*+*+*+*+*+*+*+*+*+*+*+*|*+*+*+*+
C UNIT NAME:                    MVPDDG
C
C FUNCTIONAL DESCRIPTION:        .
C
C CALLED BY:                    MVTEXT
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*|*-*-*-*-

      subroutine mvpddg(line1,line2)
c
c
c  this subroutine moves a pddg name from line1 into line2
c
      character * 120 line1
      character * 120 line2
      character*4 text

c     print*,'mvpddg -- enter'
      if(line1(37:38) .ne. '  ') then
           text(1:2) = line1(37:38)
           line1(37:38) = '  '
           line2(39:41) = '/' // text(1:2)
      endif
      return
      end


C+*+*+*+*+*+*+*+*+*+*+*+*+*+*+*+*+*+*+*+*+*+*+*+*+*+*+*+*+*+*+*+*+*|*+*+*+*+
C UNIT NAME:                    MVTEXT
C
C FUNCTIONAL DESCRIPTION:        .
C
C CALLED BY:                    READML, PROCDF
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*|*-*-*-*-

      subroutine mvtext(fname,len)
c
c   this subroutine checks for co-located pddg names in an overlay file
c
c
      character*80 fname
      character*120 line(70)
      integer*2 lincnt
      character*15 latlo1
      character*15 latlo2
      data lunnam/19/

c      print*,'movtxt -- enter'
      open(unit=lunnam,file=fname(1:len),
     +     err = 200,status = 'old')
      i = 1
 100  continue
          read(lunnam,120,end=150) line(i)
 120      format(a120)
          i = i + 1
          goto 100
 150  continue
      lincnt = i-1
      do 170 j= 1,lincnt-1
c          print*,'line: ',line(j)
          if(line(j)(1:1) .ne. 'c') then
               latlo1 = line(j)(3:17)
               do 160 i=j+1,lincnt
                     latlo2 = line(i)(3:17)
                     if(latlo1 .eq. latlo2) then
                           call mvpddg(line(i),line(j))
                     endif
 160           continue
          endif
```

```
 170  continue
      REWIND lunnam
      do 180 j=1, lincnt
           write(lunnam,120) line(j)
 180  continue
      close(unit=lunnam)
      goto 300
 200  print*,'error in movtxt'
 300  continue
c      print*,'movtxt -- exit'
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                      mytext
c
c  Functional Description:
c       this subroutine formats a text string for graphics output
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                      CREATM, MAPOVR, PLOTIT
c
c  Local Variables: N/A
c
c  Restrictions: N/A
c
c  Abnormal Return Conditions:  N/A
c
c  Location:      /a21/dave
c
c  Programmer         Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine mytext (nbytes,textst)
c
c       this subroutine formats a text string for graphics output
c
        character*(*) textst
c
        call jlstrg(textst(1:nbytes))
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: NAMLIM
C
C FUNCTIONAL DESCRIPTION:  NAMLIM OPENS NAME LIMITS FILE AND CALLS PLTNAM.
C
C INPUT FILES/PARAMETERS:
C
C        NAMFIL                CHAR*80      NAME OF NAME LIMITS FILE.
C        LENNMF                INTEGER      LENGTH OF NAMFIL.
C        LTON                  LOGICAL(16)  INDICATES WHICH FEATURES ARETURNED ON.
C        XRNM                  REAL         NAUTICAL MILE RADIUS OF MAP.
C
C GLOBAL VARIABLES :
C
C        LENMAP                INTEGER      LENGTH OF MAP PATH.
C        MAPATH                CHAR*50      MAP DATA PATH NAME.
C        LUNNAM                INTEGER      LOGICAL UNIT NUMBER FOR NAME LIMITS
C                                           FILE.
C        AREAMN                REAL         MINIMUM AREA SIZE.
C        AREAMX                REAL         MAXIMUM AREA SIZE.
C
```

```
C OUTPUT FILES/PARAMETERS:  NONE.
C
C SUBROUTINES/FUNCTIONS CALLED :
C
C        PLTNAM                 PLOTS NAMES FROM NAME LIMITS FILE.
C
C CALLED BY: DMAPII.
C
C LOCAL VARIABLES:
C
C        FILEN                  CHAR*100    FULL PATHNAME.
C
C RESTRICTIONS: NONE.
C
C ABNORMAL RETURN CONDITIONS:   NONE.
C
C LOCATION:                       /a21/gjf/MAPSRC.FTN
C
C PROGRAMMER:                     DATE OF LAST CHANGE     REASON FOR CHANGE
C
C     DAVE NATION                                         ORIGINAL CODE.
C     JERRY FENERTY                                       DOCUMENT AND MODIFY
C                                                         FOR A21 PROTOTYPE.
C     Dave Nation                 5/6/85                  Change fill path name
C                                                         from defpth to mapath
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

       SUBROUTINE NAMLIM (NAMFIL,LENNMF,LTON,XRNM)

C      THIS SUBROUTINE OPENS THE NAME LIMITS FILE AND CALLS PLTNAM

       character*50 mapath
       common /mapath/ mapath
       common /lenmap/ lenmap
       COMMON /NMLIM/ LUNNAM,AREAMN,AREAMX
       LOGICAL LTON(16)
       CHARACTER*80 NAMFIL
       CHARACTER*100 FILEN

       LEN = LENNMF + LENMAP
       if(lenmap .gt. 0) then
            filen = mapath(1:lenmap) // namfil(1:lennmf)
       else
            filen = namfil(1:lennmf)
       endif
       OPEN(UNIT=LUNNAM,FILE=FILEN(1:LEN),STATUS='OLD',
     + ERR=671)

           CALL PLTNAM (LTON,XRNM)
           GO TO 699
  671  CONTINUE
c           PRINT*,'PLOT -- ERROR ON OPEN OF NAME LIMITS FILE ',
c     +     filen(1:lennmf)
  699  CONTINUE
       CLOSE(LUNNAM)

       RETURN
       END

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      NEXTPT
C
C FUNCTIONAL DESCRIPTION:         .
C
C CALLED BY:                      NO LONGER USED BY CARICATURE
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine nextpt (longfl,alat,alon,df,arc,itproj)
c
```

```
c     This subroutine gets the next point of the DF l.o.b.
c

      logical longfl,NEWSEQ
      real LNP,LNM,L0

      common/constx/sazi,slat,cosazi,scazi,coslat,sinazi,cosi,
     1             sini,cosl0,cosf0,L0,lnp,lnm,f,f0

      data PI/3.14159/
      data TWOPI/6.28318/
      data R90/1.5708/


      if (longfl) then
c ------- This is a longitudinal bearing.
C ------- Latitude of new point
          ALAT = ALAT + DF
C ------- New length of arc
          ARC = ARC + ABS(DF)
          ABSLAT = ABS(ALAT)
C ------- Special case for crossing a pole
          IF (ABSLAT.GT.R90) THEN
C ----------- Convert latitude to value between -pi/2 and +pi/2
              SALAT = SIGN(1.0,ALAT)
              ALAT = SALAT*(PI-ABSLAT)
C ----------- Reverse direction of bearing
              DF = -DF

C ----------- Calculate new longitude (opposite side of globe)
              ALON = ALON + PI
              IF (ALON.GT.PI) THEN
                  ALON = ALON - TWOPI
              END IF

C ----------- Special case for non-circular projection types
              IF (itproj.GE.6) THEN
C --------------- Start new line at opposite bound of projection
                  NEWSEQ = .TRUE.
              END IF
          END IF
      else
c         This is a regular bearing.
          IF (ABS(SINI).LT.0.001) THEN
C ----------- If track along equator, just increment longitude
              ALON = LNM + SAZI*F
          ELSE
              SINLAT = SINI*SIN(F)
C ----------- L is difference in longitude from intersection of great circle
C ----------- with equator to next point
              COSL = COS(F)/SQRT(1-SINLAT**2)
C ----------- The following lines are limits,not sure if
C ----------- if it should be done this way
              COSL = AMAX1(-1.0000000,COSL)
              COSL = AMIN1( 1.0000000,COSL)
C ----------- Latitude of next point
              ALAT = ASIN(SINLAT)
              SALAT = SIGN(1.0,ALAT)
C ----------- Longitude of next point
              ALON = SALAT*SAZI*ACOS(COSL)
              IF (SLAT.GT.0.0) THEN
                  ALON = LNM + ALON
              ELSE
                  ALON = LNP + ALON
              END IF
          END IF
          IF (ABS(ALON).GT.PI) THEN
              ALON = ALON - SIGN(1.0,ALON)*TWOPI
          END IF
      endif

      return
      end
```

```
C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                     notava
c
c  Functional Description:
c       puts out an error message indicating the function is not currently
c       available
c
c  Input Files/Parameters:
c
c  Output Files/Parameters: N/A
c
c  Subroutines/Functions Called:
c
c  Called By:                     PRINTR
c
c  Local Variables: N/A
c
c  Restrictions: N/A
c
c  Abnormal Return Conditions:  N/A
c
c  Location:      /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine notava
c
c       puts out an error message indicating the function is not currently
c       available
c
        call mesg (2)
        call paws
        call menupr
        return
        end


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     NOTUND
C
C FUNCTIONAL DESCRIPTION:        .
C
C CALLED BY:                     STATEC
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine notund
c
c       this subroutine is the not understood state interpreter (15)
c
        common /states/ nextst
        logical eol,eoc
        common /comnds/ lenl,indxw,lenw,eol,eoc
        character * 80 comlin
        common /comlin/ comlin
        character * 105 errlin
c
        errlin = 'Command not understood : ' //
     +  comlin(indxw:indxw + lenw - 1)
        lenlin = 25 + lenw
        call cerror(lenlin,errlin)
        nextst = 1
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     NPICK
C
C FUNCTIONAL DESCRIPTION:        .
```

```
C
C CALLED BY:                    RECDIS, SAVDIS
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine npick (ichoic,mysegn,ibuttn,isegn)
c
c     modified mpick to get a selection from the menu
c
c     *** this is a machine dependent subroutine and should be changed
c         if necessary when a new device driver is used that returns
c         different values for buttons ****
c         currently the value for the '0' key is 48
c
      logical sys,aed
      common /sysdbc/ sys
      common /aeddbc/ aed
      integer segnam,pickid
      integer qfb(26),qmb(4)
      common /butons/ qfb,qmb
      character ch1
      equivalence (ch1(1:1),ikey)
c     on screen standard function key common
      common /nsgkey/ nsgkey,nsgktx
c
      if (sys) print*,'npick -- enter  ',mysegn
      call pick (ibuttn,segnam,pickid)
      if (sys) print*,'npick --  ',ibuttn,segnam,pickid,qmb(1)
      ichoic = 0
      if ((mysegn.eq.segnam.or.isegn.eq.segnam)
     + .and.ibuttn.eq.qmb(1)) then
          ichoic = pickid
      else
          if (segnam.eq.nsgktx) then
              ibuttn = pickid
          else
              if (aed) ichoic = ibuttn - 48
          endif
      endif
      if (sys)
     + print*,'npick -- exit  ichoic = ',ichoic,mysegn,ibuttn
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                   openit

c  Functional Description:
c       this subroutine opens a file
c
c  Input Files/Parameters:
c  Output Files/Parameters: N/A

c  Subroutines/Functions Called:

c  Called By:                   BSTMAP, CREATM, CRMESG, HELP,   INIGRA,
C                               LOADIC, MESGJF, RBOUND, RCOLOR
C                               RCONFG, RPARAM, RPATHS, RSAVPR, SPARAM
C                               WSAVPR, WRITER

c  Local Variables: N/A

c  Restrictions: N/A

c  Abnormal Return Conditions:  N/A

c  Location:     /a21/dave

c  Programmer        Date of Last Change       Reason for Change
c  C.S. Lamb         Jan 1988               stat='UNKNOWN' - openit
```

```
C-*-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine openit (filenm,len,ifl,irdwr,ierror)

c       this subroutine opens a file

        character*(*) filenm

c       print*,'Openit -- enter'
        ierror = 0
C        OPEN (file = filenm(1:len), UNIT=ifl, ERR=120, status='UNKNOWN')
        IF(IRDWR.EQ.0) THEN
            OPEN (file = filenm(1:len), UNIT = ifl, ERR = 120,
     1          STATUS='OLD')
        ELSE
            OPEN (file = filenm(1:len), UNIT = ifl, ERR = 100,
     1          STATUS='OLD')
            GOTO 110
  100       OPEN (file = filenm(1:len), UNIT = ifl, ERR = 120,
     1          STATUS='NEW')
        ENDIF
  110   rewind (ifl)
        go to 190
  120   continue
c       print*,'Openit -- open error'
        PRINT *,FILENM(1:LEN),' FILE OPEN PROBLEM, COULD BE SERIOUS!'
        ierror = 1
  190   continue

        return
        end

C+*+*+*+*+*+*+*+*+*+*+*+*+*+*+*+*+*+*+*+*+*+*+*+*+*+*+*+*+*+*+*+*+*+*+*+*+*+*+*+|*+*+*+*+
c  UNIT NAME:     PAWS
c
c  Functional Description:
c       jpause function
c
c  Input Files/Parameters:
c       qdsdev
c       qpydev
c       qecho
c       qfb
c       qmb
c
c  Output Files/Parameters:
c
c  Subroutines/Functions Called:
c       buttn
c       helper
c
c  Called By:                     24 routines
c
c  Local Variables:
c       button           INTEGER              integer value of button pressed
c
c  Restrictions:                 N/A
c
c  Abnormal Return Conditions: N/A
c
c  Location:          /a21/dave
c
c  Programmer         Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine paws
c
c       pause function used after error messages (also calls help when
c       appropriate
c
        integer qfb(26),qmb(4)
        common /butons/ qfb,qmb
```

```
      integer button
      Common /b6/ qcrmnu
      integer qcrmnu
c
      call buttn (button)
      if (button.eq.qfb(23)) then
          call helper (qcrmnu)
      endif
c
      return
      end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:     PICK
c
c  Functional Description:
c       this subroutine does a jpick and supplies the first three variables
c
c  Input Files/Parameters:
c       qdsdev              INTEGER     device
c       qpydev              INTEGER     device
c       qecho               INTEGER     echo value for input
C       inpdev              INTEGER     input device
c       ichoic
c       segnam
c       pickid
c
c  Output Files/Parameters:
c
c  Subroutines/Functions Called:
c       Note: Subroutines preceded by a "j" are explained in the DI-3000 man
c
c  Called By:                       mpick, npick, pltsup, tquery
c
c  Local Variables:
c       segnam              INTEGER
c       pickid              INTEGER
c
c  Restrictions: N/A
c
c  Abnormal Return Conditions: N/A
c
c  Location:           /a21/dave
c
c  Programmer          Date of Last Change        Reason for Change
c
C-*-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine pick (ibuttn,segnam,pickid)

c     this subroutine does a jpick and supplies the first three variables

      common /tablet/ inpdev
      integer segnam,pickid
      integer qdsdev,qpydev,qecho,qlecho
      common /device/ qdsdev,qpydev,qecho,qlecho
      logical sys,rdkey,savkey
      common /sysdbc/ sys
      common /rkdbc/ rdkey
      common /svkdbc/ savkey
      logical eofkey
      integer keylun,newlun
      common /keylun/ keylun,newlun,eofkey
      character*6 command
      logical timout
      integer*2 time
      common /timout/ timout, time

      if (sys) print*,'pick -- enter'

c -- position cursor near middle of menu area

      CALL JPKAPR (QDSDEV,QPYDEV,.04,.04)
```

```
c       set pick echo position                          - pick
        CALL JPECHO(1,5,1,.69,.23)
  100   continue
        if ((rdkey).and..not.eofkey) then
            call kpause (eofkey)
            read (keylun,*,end=192,err=191) command,ibuttn,segnam,
     +      pickid
            if (command(1:5).ne.'jpick') then
                print*,'jpick -- incompatible command in ',
     +          'read_keys file  ',command,ibuttn,segnam,pickid
c               *** exit on error
                go to 199
            endif
        else

  125      continue
c
c          polling loop to check for incoming data or clock interrupt
c
           call datpol
c
c          check for keyboard interrupt
c
           call jpick (qdsdev,inpdev,qecho,ibuttn,segnam,pickid)
           if (timout) then
              go to 125
           end if
        endif

        go to 199
  191   continue
            print*,'pick -- error on read of save key file',
     +      '  ',keylun,ibuttn,segnam,pickid
            go to 199
  192   continue
            print*,'pick -- premature end of read key file.'
            eofkey = .true.
            go to 100
c           **** go back and get the function interactively on end of file
  199   continue
        if (savkey) then
            write (newlun,*,err=135)'''jpick'' ',ibuttn,segnam,
     +      pickid
        endif
        go to 140
  135   continue
            print*,'pick -- error on write to save key file',
     +      '  ',newlun,ibuttn,segnam,pickid
  140   continue
        if (sys) print*,'pick -- exit',ibuttn,segnam,pickid

        return
        end


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   PLOTIT
C
C FUNCTIONAL DESCRIPTION:      Marks DF station, and draws line of bearing.
C
C INPUT FILES/PARAMETERS:      rlo,rla - station coords.
C                              az,dst  - DF azimuth and arc length.
C                              xrnm    - map half width, nm
C
C GLOGBAL VARIABLES:           invali  - unplotable point flag.
C                              nolobx  - no label/box flag.
C
C SUBROUTINES CALLED:          llplxy,da2ll,ll2gc,blplin,mytext
C
C CALLED BY:                   drwlob
C
C LOCAL VARIABLES:             size    - annotation character size.
C                              box     - half width of marker box.
C
```

```
C PROGRAMMER:                        DATE OF LAST CHANGE      REASON FOR CHANGE
C       Tom Wescott (NOSC)           8/88                     add clip, simplify
C
C-*-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine plotit(rla,rlo,brgid,az,dst,rinc,xrnm,itproj,iacept)
c
c       Note:  arguments  rinc,itproj,iacept are no longer used.
        character*2 brgid
        real slat(2),slon(2),plat(361),plon(361)
        logical invali
        common /invali/invali
        common /pie/ pie,tpie,pio2,pio4
c
        logical nolobx
        common /nolobx/ nolobx
c
c
        if (abs(az).gt.pie)  az = az - sign(tpie,az)
        call llplxy(rlo,rla,1,x,y,nout)
c
c       Skip plotting of stations over the horizon or unlabeled.
        if ((.not.invali) .and. (.not.nolobx)) then
           if (xrnm .gt. 2000.) then
              size = 4.
              box = 2.
           else
              if (xrnm .gt. 1000.) then
                 size = 5.
                 box = 3.
              else
                 size = 6.
                 box = 5.
              endif
           endif
c
c          Draw box around location of DF station
           call jlstyl (0)
           call jmove (x-box,y-box)
           call jdraw (x+box,y-box)
           call jdraw (x+box,y+box)
           call jdraw (x-box,y+box)
           call jdraw (x-box,y-box)
c
c          Label the box with the bearing ID (station).
           if(abs(az).gt.1.57) then
              xx = x - box - 1.
              yy = y + box + 3.
           else
              xx = x - box - 2.
              yy = y - box - size - 3.
           endif
           call jmove (xx,yy)
           call jsize (size,size)
c           call jltext (2,brgid)
           call mytext (2,brgid)
        endif
c
c       Generate a great circle polyline along line of bearing.
        slat(1) = rla
        slon(1) = rlo
        call da2ll(slat(1),slon(1),dst,az,slat(2),slon(2))
        call ll2gc(slon,slat,2,361,plon,plat,npts)
c
c       Draw polyline with clipping.
        call blplin(plon,plat,npts)
c
        return
        end

C++++++++++++++++++++++++++++++++++++++++++++++++++++++++++++++++++++++++++++++++|+++++++
C UNIT NAME:                   PLOTON
C
```

```
C FUNCTIONAL DESCRIPTION:
C
C CALLED BY:                   TRKCON
C
C PROGRAMMER:                  DATE OF LAST CHANGE    REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine ploton

c this routine makes visible all the currently active segments within the
c fade time
c programmer: avw

        integer          curseg(260)
        integer          lctrak
        integer          loc
        integer          ltypov (16)
        integer          mrkcnt
        integer          numrcs
        integer          tfaddx
        integer          tfadtm
        integer          tkoset
        integer          tnewst
        integer          toldst
        integer          trklst(260)
        integer          trkndx (1000)

        logical          ltonov (16)
        logical          rankt (26, 16)
        logical          segact (1000)
        logical          spprsd (1000)
        logical          boxvis(260)
        logical          trackn

        character*2      actmrk(260)
        character*9      boxdtg(260)
        character*160     trkrec (1000)

        common /trkdbc/  trackn
        common /actmrk/  trklst, mrkcnt, actmrk, curseg,
     +                   boxdtg, boxvis
        common /maptoo/  ltypov, ltonov, rankt
        common /numrcs/  numrcs
        common /segact/  segact
        common /spprsd/  spprsd
        common /tarbou/  tnewst, toldst
        common /tfadez/  tfaddx, tfadtm
        common /tkoset/  tkoset
        common /trkndx/  trkndx
        common /trkrec/  trkrec

        data lctrak      /3/

        if (trackn) then
           print *, 'enter ploton:'
           print *, '   tfaddx = ', tfaddx
        end if

        ltonov(lctrak) = .true.

        if (tfaddx .ne. 0) then
           loc = tfaddx
   10      continue
           if (.not. spprsd(trkndx(loc))) then
              if (segact(trkndx(loc))) then
                  call jvisbl (trkndx(loc)+tkoset, 1)
              else
                 call seghnd (trkndx(loc)+tkoset, trkrec(trkndx(loc)))
                 segact(trkndx(loc)) = .true.
              end if
           end if
           if (loc .eq. tnewst) then
              go to 20
           else
              loc = mod (loc, numrcs) + 1
```

```
            go to 10
         end if
      end if

   20 continue

c     turn on the boxes around the most current point of
c     each track if it is within the fade time and it is
c     not suppressed. (jit)

      do 30 i = 1,mrkcnt
         if (boxvis(i)) then
            call jvisbl(curseg(i), 1)
         endif
   30 continue
c
      if (trackn) then
         print *, 'exit ploton:'
         print *, '   tfaddx = ', tfaddx
      end if

      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   PLOTOV
C
C FUNCTIONAL DESCRIPTION:
C
C CALLED BY:                   PLTDAT, PLTOVP
C
C RESTRICTIONS:                This subroutine can omit overlays in azimuthal
C                              projections with horizon.  Needs a proper clip.
C
C PROGRAMMER:                  DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-
c
      subroutine plotov (lat,nsi,lon,ewi,marknm,
     +    rsize,placen,linsym)
c
c     plot an overlay point and name on the current map at lat/lon
c     lat/lon are in d/m/s format as an integer*4
c
      real x
      real y
      character linsym
      character nsi,ewi
      character*80 placen
      character*80 string
      character*80 tmpstr
      integer iacept
      integer*4 lat,lon
      integer*4 marknm
      integer mrkbeg
      integer mrkend
      logical draw
      logical isinv
      logical newons
      logical map
      common /mapdbc/ map

      real oldx, oldy
      logical oldons,oldinv
      common /oldxy/ oldx,oldy,ixop,iyop,oldons,oldinv
      real plo(2),pla(2),gcplo(1200),gcpla(1200)
      common /savpln/ plo,pla
      real*8 dtor,stor
      common /dtor/ dtor,stor
      logical invali
      common /invali/ invali
      dimension ltypov(16)
      logical ltonov(16),rankt(26,16)
```

```
      common /maptoo/ ltypov,ltonov,rankt
      logical lton(16),dotem
      integer ipgrid(4),ltyptb(16)
      common /map/ XRNM,XC,YC,LEVEL,CLAT,CLON,XRAD,YRAD,ITPROJ,
     +    IRES,LTYPTB,LUNDAT,LUNIND,LUNLIN,LTON,IPGRID,DOTEM,
     +    ORHALT

      data mrkbeg /10/
      data mrkend /11/
      data lcover /1/
c
      if (map) then
          print*,'plotov -- ',XRNM,XC,YC,LEVEL,CLAT,CLON,XRAD,
     +    YRAD,ITPROJ,IRES,LTYPTB,LUNDAT,LUNIND,LUNLIN,LTON,
     +    IPGRID,DOTEM,ORHALT
      endif
      draw = .false.
      if (xrnm .gt. 2000) then
          sizef = 8.
      else if (xrnm .le. 2000 .and. xrnm .gt. 1000) then
          sizef = 10.
      else
          sizef = 12.
      endif
          call lltor (lat,lon,nsi,ewi,plat,plon)
          call invtes (plat,plon,isinv)
c          print*,'plotov -- ',lat,nsi,lon,ewi,plat,plon,
c    +     isinv,'  ',placen
          if (isinv) then
             plo(1) = plon
             pla(1) = plat
          else
              call lltoxy (plat,plon,x,y)
              if (map) print*,'plat,plon,x,y=',plat,plon,x,y
              if (linsym.eq.'s'.or.linsym.eq.'S') then
                  draw = .true.
                  oldx = x
                  oldy = y
                  plo(1) = plon
                  pla(1) = plat
              else if (linsym.eq.'d'.or.linsym.eq.'D') then
                  draw = .true.
                  plo(2) = plon
                  pla(2) = plat
c                 Convert line segment into a great circle polyline.
                  call ll2gc(plo,pla,2,1200,gcplo,gcpla,nverts)
c                 Draw breakline clipped polyline to current point.
                  call blplin(gcplo,gcpla,nverts)
                  plo(1) = plo(2)
                  pla(1) = pla(2)
                  oldx = x
                  oldy = y
              else if (linsym.eq.'e'.or.linsym.eq.'E') then
                  read(placen, 10120) sma, smi, dazi,tmpstr
10120             format(3f8.0,a)
                  placen = ' '
                  placen = tmpstr
                  call drawel(plat,plon, sma, smi, dazi)
              else if (linsym.eq.'b'.or.linsym.eq.'B') then
                  linsym = 'b'
                  read (placen,10110,err=120) dazi,iacept,string
10110             format(f7.0,1x,i1,1x,a70)
                  razi = dazi * dtor
                  placen = string
                  call drwlob (plat,plon,razi,'  ',xrnm,
     +                         itproj,iacept)
                  go to 125
  120             continue
                      print*,'Error in conversion of bearing azimuth',
     +                placen
  125             continue
              endif
              call lltoxy (plat,plon,x,y)
              call clipxy (x,y,newons)
```

```
                if(newons.and..not.invali) then
                    if (rsize.lt..1) rsize = 1.
                    size = rsize * sizef
                    call jsize (size*.8,size)
c
c****               if tracking is being plotted, put up the 2 letter marker
c****               found in the placen string
c
                    if (linsym .eq. 't') then
                            size = rsize * 8.
                            call jsize(size,size)
                            call jmove(x-1.,y-1.2)
                            call j1strg(placen(mrkbeg:mrkend))
                            placen = '  '
                    else if (.not.draw.or.marknm.ge.1) then
                        if (marknm.ge.1.and.marknm.le.15)
     +                  then
                            marker = marknm
                            call jcmark (marker)
                            call jmark(x,y)
                        else
c
c if markernumber > 15, assume this is an icon file to be displayed
c
                            size = rsize * (sizef / 6.)
                            call geticn(ltypov(lcover),ltypov(lcover),
     +                                  size,size,x,y,marknm,2,0.0)
                        endif
                    endif
                    call lngth (placen,80,len)
                    if (len.gt.0) then
                        if (linsym.eq.'b'.and.dazi.lt.180.) then
                            call jjust (3,2)
                            ioffs = -5
                        else
                            call jjust (1,2)
                            ioffs = 5
                        endif
                        call jmove (x + ioffs,y)
                        call j1strg (placen(1:len))
                    endif
                endif
            endif
c
        return
        end

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     PLTCIT
C
C FUNCTIONAL DESCRIPTION:        .
C
C CALLED BY:                     DMAPII
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine pltcit (xrnm,citfil,lenctf)

c       this subroutine opens the cities file and plots it

        character*50 mapath
        common /mapath/ mapath
        common /lenmap/ lenmap
        character*80 citfil
        character*100 filen
        logical interr
        common /interr/ interr
        logical invali
        common /invali/ invali
        logical newons,isinv
        character nsi,ewi
        character*35 name
        character*35 string
```

```
      character*4 pnab
      integer*4 lat,lon
      logical pnatmp
      logical pnabon
      common /pnabon/ pnabon

      real llconv

      data pnabon/.true./
      data nxpc/80/
      data lunnam/16/
      DATA ICNAME/7/
c     factor is the value to divide xrnm by to limit the cities displayed
c     by population
      data factor/10./
c     ioffs is the offset from the marker to the pnab
      data ioffs/3/
c
      len = lenctf + lenmap
      if(lenmap .gt. 0) then
           filen = mapath(1:lenmap) // citfil(1:lenctf)
      else
           filen = citfil(1:lenctf)
      endif
c     print*,'pltcit -- ',len,'  ',filen(1:len)
      open(unit=lunnam,file=filen(1:len),status='old',
     + err=185)
      rewind(lunnam)
      call jsize (7.,7.)
      call jjust (2,1)
      CALL JFONT(1)
      CALL JGAP(0.)
      CALL JPATH(1)
      CALL JBASE(1.,0.,0.)
      CALL JPLANE(0.,1.,0.)
 100  continue
          call chint (interr,ch)
          if (interr) go to 190
          read(lunnam,1110,err=181,end=190) pnab,lat,nsi,lon,ewi,
     +    ipop,marker,name
 1110     format (a4,1x,i6,a1,i7,a1,i5,1x,i1,1x,a35)
c         skip record if population is too small *****
          if (ipop.lt.xrnm/factor.and.marker.ne.4) go to 100
          call tocaps(nsi,1)
          isign = 1
          if (nsi.eq.'S') isign = -1
          plat = llconv(real(lat),isign)
          call tocaps(ewi,1)
          isign = 1
          if (ewi.eq.'W') isign = -1
          plon = llconv(real(lon),isign)
c          call lltord (lat,lon,nsi,ewi,plat,plon)
          call invtes (plat,plon,isinv)
          if (.not.isinv) then
              call lltoxy (plat,plon,x,y)
              call clipxy (x,y,newons)
          if(newons.and..not.invali) then
              if (pnabon.and.pnab.eq.'....') then
                  pnatmp = .false.
              else
                  pnatmp = pnabon
              endif
              if (pnatmp) then
                  string = pnab
                  lenstr = 4
              else
                  call length (name,35,lenstr)
                  string = name(1:lenstr)
              endif
              if (marker.gt.1.and.marker.le.15) then
                  mark = marker
              else
                  mark = 1
              endif
              call jcmark (mark)
              call jmark (x,y)
```

```
                if (lenstr.gt.0) then
                   CALL JMOVE(X+IOFFS,Y)
                   CALL JHSTRG(string(1:LENSTR))
                ENDIF
             endif
          endif
          go to 100
  181 continue
          print*,'read error on cities file'
          go to 190
  185 continue
          print*,'pltcit -- Error on open of cities file',len,
     +    '  ',filen(1:len)
  190 continue
      call jjust (1,1)
      close(lunnam)
c
      return
      end


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     PLTDAT
C
C FUNCTIONAL DESCRIPTION:        .
C
C CALLED BY:                     SEGHND
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine pltdat (trdata)

c  this subroutine sends a line of tracking data to be plotted on
c  the current map (originally called trakpt in /dsee/apollo)
       integer alat
       integer alon
       integer ipgrid(4)
       integer ires
       integer isign
       integer itproj
       integer latbeg, latend
       integer lonbeg, lonend
       integer level
       integer ltyptb(16)
       integer lundat
       integer lunind
       integer lunlin
       integer mrkrnr
       integer posit
       integer trkcol
       integer*4 track
       integer ltypov(16)
       integer lctrak

       real    clat
       real    clon
       real    dx
       real    dy
       real    orhalt
       real    rlat
       real    rlon
       real    rsize
       real    tmplat
       real    tmplon
       real    xc
       real    xllgvp
       real    xrad
       real    xrnm
       real    xurgvp
       real    yc
       real    yllgvp
       real    yrad
       real    yurgvp
```

```
      character*1       ewi
      character*1       linsym
      character*1       nsi
      character*7       lat
      character*8       lon
      character*160     trdata
      character*80      timbuf
      character*9       tmpdtg
      character*2       marker

      logical  lton(16)
      logical  dotem
      logical  isinv
      logical  exist
      logical  ltonov(16)
      logical  rankt(26,16)
      logical  trackn
c
c       llconv is a latlon conversion function

      real    llconv
c   exist is set in subroutine getmark depending on whether or not
c   the track already exists, or is newly created.
c   posit is the position of the track in the table.

      common /trkdbc/   trackn
      common /comgvp/   xllgvp, yllgvp, xurgvp, yurgvp
      common /map/      xrnm, xc, yc, level, clat, clon, xrad, yrad,
     +                  itproj, ires, ltyptb, lundat, lunind, lunlin,
     +                  lton, ipgrid, dotem, orhalt

      integer qdsdev,qpydev,qecho,qlecho
      common /device/ qdsdev,qpydev,qecho,qlecho
      common /maptoo/ ltypov, ltonov, rankt

      logical oneflg
      common /oneflg/ oneflg

      logical last
      common /lstplt/ last

      data trkcol /224/
      data lctrak /3/

      if (trackn) print *, 'enter pltdat,trdata=',trdata

      read (trdata, 45, err=200) linsym
   45 format (a1)

c ----- ignore comments and amplification lines in input text

      if (linsym .eq. ' ' ) then
c
c          reset linsym to signify tracking data
c
           linsym = 't'
c
c          new variables: track, alert, pddg, series, repnum
c
           read (trdata, 50, err=200)
     +              alat, nsi,alon, ewi,track,timbuf
   50      format (2x, i6, a1, i7, a1, i4, a9)
c
c          get the marker for this plot
c          JIT: add parameter timbuf to be used in fade time routines.
c
           call getmark(track, marker, posit, exist,timbuf(1:9))
           tmpdtg = timbuf(1:9)
c
c          put marker into timbuf after the date/time group
c          to be used in the plotting of this track
```

```
          timbuf(10:11) = marker
c
          rsize = 1.5
c
c         convert alat and alon to character, then convert to radians
c
          if (nsi .eq. 'N' .or. nsi .eq. 'n') then
               isign = 1
          else
               isign = -1
          endif
          tmplat = alat
          rlat = llconv(tmplat, isign)
          if (ewi .eq. 'E' .or. ewi .eq. 'e') then
               isign = 1
          else
               isign = -1
          endif
c
c         Check to see if this plot is visible on the current map.
c
          tmplon = alon
          rlon = llconv(tmplon, isign)
          call invtes(rlat,rlon,isinv)


          if ( .not. isinv .and. ltonov(lctrak)) then
c
c            this is true white on the color node
c
             call xcolor (trkcol)
c
c            set the pick aperture to a very small size for the plot
c
             dx = .0003
             dy = .0003
             call jpkapr(qdsdev,qpydev,dx,dy)
             call plotov (alat, nsi, alon, ewi, mrkrnr, rsize, timbuf,
     +            linsym)
c
c  split off the latitude and longitude values from the
c  tracking data line, and then pass these values to boxseg.
c
             latbeg = 3
             latend = 9
             lonbeg = 10
             lonend = 17
             lat = trdata(latbeg:latend)
             lon = trdata(lonbeg:lonend)

c
c            jrclos is used to close the segment which is opened in
c            the segment-handler routine.  this segment will redundantly be
c            closed when control returns to the segment-handler routine.
c            call jrclos
c
             if (.not.(oneflg)) call curbox(lat, lon,
     +                                     posit,exist,tmpdtg)
         endif
      end if
      go to 250

  200 print *, 'error in overlay read in pltdat routine'
      go to 250

  210 print *, 'error in overlay write in pltdat routine'
  250 continue

      if (trackn) print *, 'exit pltdat'

      return
      end
```

```
C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: pltnam
C
C FUNCTIONAL DESCRIPTION:  THIS SUBROUTINE READS THE NAME LIMITS FILE AND PLOTS
C
C INPUT FILES/PARAMETERS:
C
C GLOBAL VARIABLES : NONE.
C
C OUTPUT FILES/PARAMETERS:  NONE.
C
C SUBROUTINES/FUNCTIONS CALLED :
C
C CALLED BY:                    NAMLIM
C
C LOCAL VARIABLES: NONE.
C
C RESTRICTIONS: NONE.
C
C ABNORMAL RETURN CONDITIONS:   NONE.
C
C LOCATION:
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE PLTNAM (LTON,XRNM)

C       THIS SUBROUTINE READS THE NAME LIMITS FILE AND PLOTS

        CHARACTER*1 CH
        LOGICAL INTERR
        COMMON /INTERR/ INTERR
        CHARACTER*20 NAME
        CHARACTER TYPEC
        LOGICAL LTON(16)
        INTEGER CHRLEN
        LOGICAL INVALI
        COMMON /INVALI/ INVALI
        LOGICAL IFRST,NEWONS,ISINV
        COMMON /NMLIM/ LUNNAM,AREAMN,AREAMX
        COMMON /CHSIZE/ XCHSIZ,YCHSIZ,XCHMIN,YCHMIN
c** featrs is common to drawf routine for drwing
c** area names without redrawing any boundries.
        logical featrs(16), indrwf
        COMMON /pltftr/ featrs, indrwf
        INTEGER   isecs,imins
        REAL      c,cs
        COMMON    /c/ c,isecs,cs,imins

        DATA NXPC/80/
        DTORAD=C*60.

        AREAMN = XRNM/250.

        IF (AREAMN.LT.5) AREAMN = 0.

        REWIND(LUNNAM)
        NNAMS=0
        IFRST=.TRUE.

        IF (XRNM .GT. 2000) THEN
            SIZE = 8.
        ELSE IF (XRNM .LE. 2000 .AND. XRNM .GT. 1000) THEN
            SIZE = 10.
        ELSE
            SIZE = 12.
        ENDIF
```

```
C         CALL JSIZE (SIZE*.8,SIZE)
C         CALL JJUST (2,1)

        call jsize (7.,7.)
        call jjust (2,1)
        CALL JFONT(1)
        CALL JGAP(0.)
        CALL JPATH(1)
        CALL JBASE(1.,0.,0.)
        CALL JPLANE(0.,1.,0.)

  100   CONTINUE

            CALL CHINT (INTERR,CH)

            IF (INTERR) GO TO 190

            READ(LUNNAM,1110,ERR=182,END=190) NAME(1:20),RLATL
     +      ,RLATH,RLONL,RLONH,
     +      CLAT,CLON,DLAT,DLON,TYPEC
 1110       FORMAT(A20,2(F5.1,1X),6(F6.1,1X),A1)

C           do not plot aliases

            if(typec.eq.'A') go to 100

C           NO STATE IF NOT ON

            if (indrwf) then
               if(TYPEC.EQ.'S'.AND..NOT.featrs(3)) GO TO 100
            else
               if(TYPEC.EQ.'S'.AND..NOT.LTON(3)) GO TO 100
            endif

C           no country if not on

            if (indrwf) then
               if(typec.eq.' '.and..not.featrs(2)) go to 100
            else
               if(typec.eq.' '.and..not.lton(2)) go to 100
            endif

c           no continents if countries or states on

            if (indrwf) then
               if(typec.eq.'C'.and.(featrs(2).or.featrs(3))) go to 100
            else
               if(typec.eq.'C'.and.(lton(2).or.lton(3))) go to 100
            endif

            IF(TYPEC.EQ.'M'.AND..NOT.LTON(12)) GO TO 100

            PLAT=CLAT*DTORAD
            PLON=CLON*DTORAD
            CALL INVTES (PLAT,PLON,ISINV)

            IF (.NOT.ISINV) THEN

                CALL LLTOXY (PLAT,PLON,X,Y)
                CALL CLIPXY (X,Y,NEWONS)

                IF(NEWONS.AND..NOT.INVALI) THEN

                    LEN=CHRLEN(NAME)
                    AREA=DLAT*DLON*COS(PLAT)
                    IF(AREA.GE.AREAMN.AND.AREA.LE.AREAMX) THEN

                       CALL JMOVE(X,Y)
                       CALL JHSTRG(NAME(1:LEN))

                    ENDIF

                ENDIF
```

```
      ENDIF

      GO TO 100

182   CONTINUE

c           PRINT*,'ERROR ON NAME LIMITS FILE'

190   CONTINUE
      call jjust (1,1)

      RETURN
      END


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     PLTOFF
C
C FUNCTIONAL DESCRIPTION:        .
C
C CALLED BY:                     TRKCON
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine pltoff

c this routine turns off all currently visible plots
c programmer: avw

      integer           curpos
      integer           curseg(260)
      integer           lctrak
      integer           ltypov (16)
      integer           mrkcnt
      integer           numrcs
      integer           tfaddx
      integer           tfadtm
      integer           tkoset
      integer           tnewst
      integer           toldst
      integer           trklst(260)
      integer           trkndx (1000)

      character*2       actmrk(260)
      character*9       boxdtg(260)

      logical           ltonov (16)
      logical           rankt (26, 16)
      logical           segact (1000)
      logical           boxvis(260)
      logical           trackn

      common /trkdbc/   trackn
      common /actmrk/   trklst, mrkcnt, actmrk, curseg,
     +                  boxdtg, boxvis
      common /maptoo/   ltypov, ltonov, rankt
      common /numrcs/   numrcs
      common /segact/   segact
      common /tarbou/   tnewst, toldst
      common /tfadez/   tfaddx, tfadtm
      common /tkoset/   tkoset
      common /trkndx/   trkndx

      data lctrak /3/

      if (trackn) print *,'enter pltoff: tfaddx=',tfaddx

      ltonov(lctrak) = .false.

      if (tfaddx .ne. 0) then
         curpos = tnewst
```

```
10      continue
        if (segact(trkndx(curpos))) then
           call jvisbl (trkndx(curpos)+tkoset, 0)
        end if
        if (curpos .eq. tfaddx) then
           go to 20
        else
           curpos = curpos - 1
           if (curpos .eq. 0) then
              curpos = numrcs
           end if
        end if
        go to 10
      end if

   20 continue

c     make invisible the segments which
c     display the boxes around the current points
c     for each track.    (jit)

      do 30 i = 1,mrkcnt
        call jvisbl(curseg(i),0)
   30 continue
c
      if (trackn) print *,'exit pltoff: tfaddx = ',tfaddx

      return
      end


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     PLTOVP
C
C FUNCTIONAL DESCRIPTION:        .
C
C CALLED BY:                     DOVERL, FOVERL
C
C PROGRAMMER:                    DATE OF LAST CHANGE    REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine pltovp (xrnm,ovfnam,lenovf)

c     this subroutine plots overlay data on the current map

      character linsym
      logical interr
      common /interr/ interr
      character*80 placen
      integer*4 lat,lon
      integer*4 marknm
      character nsi,ewi
      character*(*) ovfnam
      character*105 string
      character*16 platlon
      character*72 amptxt(4)
      integer ampcnt
      logical eliflg
      common /inpoly/inpoly
      common/ampprm/ampseg
      data lunnam/9/

c      print *,'pltovp -- enter  ovfnam ',ovfnam(1:lenovf)
      eliflg = .false.
      ampcnt = 0
      open(unit=lunnam,file=ovfnam(1:lenovf),err = 186,
     + status = 'old')

C ----- Make sure all commands are sent to device
      CALL FLUSHB

      rewind(lunnam)
  100 continue
```

```
           read(lunnam,10100,err = 182,end=190) linsym,string
10100      format(a1,a105)
c           PRINT 10101,LINSYM,STRING(1:70)
c10101      format(1x,a1,a70)
           if (linsym.eq.'c'.or.linsym.eq.'C') then
c              ignore comment lines
           else if(linsym .eq. 'a' .or. linsym .eq. 'A') then
               if(ampcnt .lt. 4) then
                   ampcnt  = ampcnt + 1
                   amptxt(ampcnt)(1:72) = string(2:73)
               endif
           else
               read(string,10110,err = 182,end=190)
     +         lat,nsi,lon,ewi,marknm,rsize,placen
10110          format(1x,i6,a1,i7,a1,i3,f5.0,1x,a80)

            call plotov (lat,nsi,lon,ewi,marknm,
     +         rsize,placen,linsym)
               if(linsym .eq. 'e' .or. linsym .eq. 'E') then
                      eliflg = .true.
                      call readel(string,platlon)
                      if(ampcnt .lt. 4) then
                          ampcnt = ampcnt + 1
                          amptxt(ampcnt)=
     +                          platlon(1:8)//'  '//platlon(9:16)
                      endif
               endif
           endif
           go to 100
  181  continue
           print*,'read error on overlay name file'
           go to 200
  182  continue
           print*,'decode error on overlay file'
           go to 200
  186  continue
           print*,'open error on overlay file ',ovfnam(1:lenovf)
           go to 200
  190  continue
c
c**** the following loop was added dec '86 to put amplification data
c**** in a separate area...LMA
       if (ampcnt .ge. 1) then
           call jrclos
           call drwamp(amptxt,ampcnt)
       endif
200    continue
       close (unit=lunnam)
c       print*,'pltovp -- exit  ampcnt',ampcnt
       return
       end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PLTSUP
C
C FUNCTIONAL DESCRIPTION:       .
C
C CALLED BY:                    TRKCON
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

      subroutine pltsup
c
c     suppress plots on screen by purging the seg
c     associated with that track.
c

      logical abort
      logical endlst
      logical found
```

```
      integer chkndx
      integer chkseg
      integer ibuttn
      integer lctrak
      integer pickid
      integer segnam

      logical spprsd(1000)
      common /spprsd/ spprsd
      logical segact(1000)
      common /segact/ segact
      integer qfb(26)
      integer qmb(4)
      common /butons/ qfb,qmb
      integer ltypov (16)
      logical ltonov (16)
      logical rankt (26, 16)
      common /maptoo/ ltypov, ltonov, rankt
      integer tkoset
      common /tkoset/ tkoset
      integer trkndx(1000)
      common /trkndx/ trkndx
      integer tfaddx
      integer tfadtm
      common /tfadez/ tfaddx, tfadtm
      character*160  trkrec (1000)
      common /trkrec/ trkrec
      integer tnewst
      integer toldst
      common /tarbou/ tnewst, toldst
      integer numrcs
      common /numrcs/ numrcs

      data lctrak  /3/

      if (.not. ltonov(lctrak)) then
         go to 1000
      end if

c
c      ask user to pick a track for suppression
c
      abort = .false.
 100  if (abort) goto 200
         if (tnewst .ne. 0) then
             call mesg(1238)
             call pick(ibuttn, segnam, pickid)
             if (ibuttn .ne. 8 .and. ibuttn .ne. qfb(26)) then
                 chkndx = tfaddx - 1
                 if (tfaddx .eq. 0) then
                    tfaddx = numrcs
                 end if
                 found = .false.
                 endlst = .false.
c
c                search list until a segment match is found
c                or the end of the list is reached
c
 150             if (found .or. endlst) goto 175
                     chkndx = mod(chkndx,numrcs) + 1
                     chkseg = trkndx(chkndx) + tkoset
                     if (chkseg .eq. segnam) then
                         found = .true.
                     else
                         if (chkndx .eq. tnewst) then
                              endlst = .true.
                         endif
                     endif
                 goto 150
 175             continue
c
c                if match is found, then purge that track from the display
c
                 if (found) then
                     call supbox(trkrec(trkndx(chkndx)))
                     call jpurge(chkseg)
```

```
c
c    turn invisible the box around that plot, and set the
c    boolean flag for this box in boxvis array. (jit)
c

c
c                       show that track is suppressed so that
c                       when tracking is turned from off to on,
c                       this guy won't come back up.
c
                        spprsd(trkndx(chkndx)) = .true.
                        segact(trkndx(chkndx)) = .false.
                  endif
               else
                  abort = .true.
               endif
            else
               abort = .true.
            endif
        goto 100
 200    continue

 1000 continue

        return
        end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        PLTUNS
C
C FUNCTIONAL DESCRIPTION:
C
C CALLED BY:                        TRKCON
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-
        subroutine pltuns

c this routine displays all currently visible tracks (all tracks within
c current fade time)
c programmer: avw

        integer           curpos
        integer           lctrak
        integer           ltypov (16)
        integer           numrcs
        integer           segnam
        integer           tfaddx
        integer           tfadtm
        integer           tkoset
        integer           tnewst
        integer           toldst
        integer           trkndx (1000)

        character*9       tfddtg
        character*160     trkrec (1000)

        logical           ltonov (16)
        logical           rankt (26, 16)
        logical           segact (1000)
        logical           spprsd (1000)
        logical           trackn

        common /trkdbc/   trackn
        common /maptoo/   ltypov, ltonov, rankt
        common /numrcs/   numrcs
        common /segact/   segact
        common /spprsd/   spprsd
        common /tarbou/   tnewst, toldst
        common /tfadez/   tfaddx, tfadtm
        common /tfddtg/   tfddtg
        common /tkoset/   tkoset
        common /trkndx/   trkndx
        common /trkrec/   trkrec
```

```
      character*2 actmrk(260)
      integer*4 mrkcnt
      integer*4 trklst(260)
      integer*4 curseg(260)
      character*9 boxdtg(260)
      logical boxvis(260)
      common /actmrk/ trklst,mrkcnt,actmrk,curseg,
     +                boxdtg,boxvis

      data lctrak       /3/

      if (trackn) print *,'enter pltuns: tfaddx = ',tfaddx

      if (.not. ltonov(lctrak)) then
         go to 30
      end if
      ltonov(lctrak) = .true.
      if (tfaddx .eq. 0) then
         call mesg (1236)
         call paws
         return
      end if

      do 40 i = 1, mrkcnt
         if (boxdtg(i) .ge. tfddtg) then
c             print *, 'i / boxdtg(i) are', i, boxdtg(i)
c             print *, 'curseg(i) is ', curseg(i)
            boxvis(i) = .true.
         endif
   40 continue

      curpos = tfaddx
   10 continue
      if (segact(trkndx(curpos))) then
         call jvisbl (trkndx(curpos)+tkoset, 1)
      else
         segnam = trkndx(curpos) + tkoset
         call seghnd (segnam, trkrec(trkndx(curpos)))
         segact(trkndx(curpos)) = .true.
         spprsd(trkndx(curpos)) = .false.
      end if
      if (curpos .eq. tnewst) then
         go to 20
      else
         curpos = mod (curpos, numrcs) + 1
         go to 10
      end if

   20 continue
   30 continue
c
c   make all boxes visible again if they are within the
c   fade time.
c
c       print *, 'tfddtg is ', tfddtg

      if (trackn) print *,'exit pltuns: tfaddx = ',tfaddx

      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                          PMAINMN
C
C FUNCTIONAL DESCRIPTION:              .
C
C CALLED BY:                          FMAIN
C
C PROGRAMMER:                         DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-
```

```
      subroutine pmainmn
      return
      end

C++++++++++++++++++++++++++++++++++++++++++++++++++++++++++++++++++|+++++++
C* UNIT NAME:                    popst
C*
C* FUNCTIONAL DESCRIPTION:
C*
C*       This subroutine pops a menu number off a stack.
C*
C* INPUT FILES/PARAMETERS:
C*
C*     Global Variables
C*
C*       qmloc            integer; contains the current location in the
C*                                 stack
C*       qnextm           integer; contains the number of the next menu
C*                                 to be displayed
C*       qstack     integer array; contains menu numbers of previous
C*                                 menus displayed
C*
C* OUTPUT FILES/PARAMETERS:
C*
C*       values in global variables above, in particular the new value
C*       placed in the variable qnextm
C*
C* RESTRICTIONS:
C*
C*      The value in the variable qmloc must not be less than the
C*      minimum array size of the array qstack.
C*
C* SUBROUTINES CALLED:
C*
C*       mesg             subroutine; places an appropriate message
C*                                    in the communications area
C*
C* CALLED BY:                    MHAND
C*
C* LOCAL VARIABLES:
C*
C*       no local variables
C*
C* ABNORMAL RETURN CONDITIONS:
C*
C*      A system error will occur if the value in the variable qmloc is
C*      below the minimum array size of the array qstack.
C*
C* LOCATION:
C*
C*       /u2/vcn/a21proto/popst
C*
C* PROGRAMMER:               DATE OF LAST CHANGE:    REASON FOR CHANGE:
C*
C* VCNewton                    15 August 1983          initial entry
C*
C-*-*-*-*-*-*-*-*-*-*-*-*-*-*-*-*-*-*-*-*-*-*-*-*-*-*-*-*-*-*-*-*-*-*|*-*-*-*-

      Subroutine POPST

C     This subroutine pops a menu number off a stack.

C        (**Declare common blocks and common block variables**)
         Integer qmloc,qnextm,qstack(10)
C        (**The next 2 lines are coded so the variable qnextm can be**)
C        (**used in this routine, all other variables in the next 2 **)
C        (**lines of code are not used                              **)
         Logical qcancl,qext2m,qretrn,qstmnu
         Common /b1/ qcancl,qext2m,qretrn,qstmnu,qnextm
         Common /b2/ qstack
         Common /b4/ qmloc
C        (**Pop the stack if qmloc is not below the minimum array size*)
c        print*,'POPST -- enter   qmloc = ',qmloc
```

```
         If (qmloc .ge. 1) Then
C           (**Set qnextm to the next menu to be displayed**)
            qnextm=qstack(qmloc)
C           (**Simulate popping an item off a stack**)
            qmloc=qmloc - 1
         Else
C           (**When qmloc is too low **)
C           (**Execute system error process**)
            Call MESG(210)
            call paws
C           Exit process storing variables and keeping the current
C           screen for later debugging
         ENDIF
      End


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PROCOV
C
C FUNCTIONAL DESCRIPTION:       .
C
C CALLED BY:                    FDFPRO
C
C PROGRAMMER:                   DATE OF LAST CHANGE    REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine procov (mparms,ierror,ovfnam,lenovf)
c
c       this subroutine calculates the geographic limits of the current
c       overlay data file
c
        character linsym
        character ch
        logical interr
        common /interr/ interr
        character*80 placen
        character*(*) ovfnam
        integer*4 lat,lon
        integer*4 marker
        character nsi,ewi
        real mparms(4)
        logical frstim
        character*105 string
        data lunnam/16/
c
        ierror = 0
        frstim = .true.
        open(unit=lunnam,file=ovfnam(1:lenovf),err = 186,
     +  status = 'old')
c
c       print*,'procov -- enter '
        rewind(lunnam)
  100   continue
            call chint (interr,ch)
            if (interr) go to 190
            read(lunnam,10100,err = 182,end=190) linsym,string
10100       format(a1,a105)
c           print*,'procov : ',linsym,string
c           *** ignore comment lines ***
            if (linsym.eq.'c'.or.linsym.eq.'C') go to 100
            read(string,10110,err = 182,end=190)
     +      lat,nsi,lon,ewi,marker,rsize,placen
10110       format(1x,i6,a1,i7,a1,i3,f5.0,1x,a80)
c           insure this is not a blank line
            if (nsi.ne.' ') then

                call lltor (lat,lon,nsi,ewi,plat,plon)

                if (frstim) then
                    frstim = .false.
                    ierror = 0
                    rminla = plat
                    rmaxla = plat
```

```
                  rminlo = plon
                  rmaxlo = plon
              else

                  if (plat.lt.rminla) then
                      rminla = plat
                  else if (plat.gt.rmaxla) then
                      rmaxla = plat
                  endif

                  if (plon.lt.rminlo) then
                      rminlo = plon
                  else if (plon.gt.rmaxlo) then
                      rmaxlo = plon
                  endif

              endif

          endif
          go to 100

  181   continue
          print*,'read error on overlay name file'
          ierror = 2
          go to 190

  182   continue
          print*,'decode error on overlay file'
          ierror = 3
          go to 190

  186   continue
          print*,'open error on overlay file ',ovfnam(1:lenovf)
          ierror = 4

  190   continue

        close (unit=lunnam)
        mparms(1) = rminla
        mparms(2) = rmaxla
        mparms(3) = rminlo
        mparms(4) = rmaxlo
c       print*,'pltovp -- exit',mparms,ierror
c
        return
        end

C+*+*+*+*+*+*+*+*+*+*+*+*+*+*+*+*+*+*+*+*+*+*+*+*+*+*+*+*+*+*+*+*+*+*+*+*+|*+*+*+*+
C UNIT NAME: PROCPO
C
C FUNCTIONAL DESCRIPTION:  DISPLAYS THE NEXT POINT.
C
C INPUT FILES/PARAMETERS:
C
C        NEWSEQ              LOGICAL    INDICATES IF POINT IS PART OF NEW
C                                       SEQUENCE OF POINTS.
C        NEWONS              LOGICAL    INDICATES WHETHER POINT IS ON SCREEN.
C        X                   REAL       X COORDINATE.
C        Y                   REAL       Y COORDINATE.
C
C GLOBAL VARIABLES : NONE.
C
C OUTPUT FILES/PARAMETERS:  NONE.
C
C SUBROUTINES/FUNCTIONS CALLED :
C
C        FPOSIT              POSITIONS POINT X,Y.
C        FDRAWV              DRAWS VECTOR TO X,Y.
C
C CALLED BY:                   GRDLAT, GRDLON
C
C LOCAL VARIABLES: NONE.
C
C RESTRICTIONS: NONE.
```

```
C
C ABNORMAL RETURN CONDITIONS:   NONE.
C
C LOCATION:                     /a21/gjf/MAPSRC.FTN
C
C PROGRAMMER:                   DATE OF LAST CHANGE    REASON FOR CHANGE
C
C     DAVE NATION                                      ORIGINAL CODE.
C     JERRY FENERTY                                    DOCUMENT AND MODIFY
C                                                      FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE PROCPO (NEWSEQ,NEWONS,X,Y)

C     THIS SUBROUTINE DISPLAYS THE NEXT POINT

      LOGICAL NEWSEQ,NEWONS

      IF (NEWSEQ) THEN

          NEWSEQ=.FALSE.
          CALL FPOSIT(X,Y)

      ELSE

          CALL FDRAWV(X,Y)

      ENDIF

      RETURN
      END

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                  prompt
c
c  Functional Description:     Subroutine to display a message and get
c                               user keyboard input.
c
c  Input Files/Parameters:     N/A
c
c  Output Files/Parameters:    N/A
c
c  Subroutines/Functions Called:
c      mesg                    displays messages in the communica-
c                               tions area
c      keybd                   gets user's keyboard input (max of 80 chars)
c
c
c  Called By:                  FANNOT, FCHSCA, FOVERL, FSHOWA, GETCMD
C                              LLCENT, RESCON, SAVDIS, SUBCHK
C                              WRITEX, FDFPRO
c
c  Local Variables:
c      maxlen                integer   maximum length of input wanted
c                                        (80 or less characters)
c      actlen                integer   actual length of input recieved
c      msgno                 integer   number of message to be displayed
c      input                 character string of user's keyboard input
c
c  Restrictions: Maximum of 80 characters for string input
c
c  Abnormal Return Conditions:  N/A
c
c  Location:   /a21/dave
c
c  Programmer          Date of Last Change       Reason for Change
c     bam               October 27, 1983
c     dab               September 20, 1984        Apollo modification
c  L McCleary           Jan 1988                sep amp & sys - prompt
c
c  Work still to be done:
c
```

```
C-*-*-*-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine prompt(msgno,input,maxlen,actlen)
c
c       prompt the user with a message and wait for a response from keyboard
c

        integer qdsdev,qpydev,qecho,qlecho
        common /device/ qdsdev,qpydev,qecho,qlecho

        common/comwdo/qcxmn,qcymn,qcxmx,qcymx
        real      qcxmn,qcymn,qcxmx,qcymx


        character *(*) input
        integer msgno,maxlen,actlen
        logical sys
        common /sysdbc/ sys
c
        if (sys) print*,'prompt -- enter ',msgno,maxlen
        call mesg(msgno)
c --- added by Steve Pierce to force input not to echo over
c     message as requested by Pam. 7/18/85
        call comwin
        call comvpt
c        call jconwv(qcxmn+1.,qcymx - 5.,0.,vx,vy)
        call jconwv(qcxmn+1., 1.5, 0., vx,vy)
        call jpecho (qdsdev,4,qpydev,vx,vy)
c ----
        call keybs(maxlen,input,actlen)
        if (sys) then
            if (actlen.gt.0) print*,'    ',input(1:actlen)
            print*,'prompt -- exit ',actlen
        endif
c
        return
        end
C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                         PRTMEN
C
C FUNCTIONAL DESCRIPTION:            HANDLES MENU CHOICES FOR HARDCOPY PRINTOUT
C                                    OF FULL SCREEN OR PRESENT DISPLAYS
C
C INPUT FILES/PARAMETERS:
C
C
C OUTPUT FILES/PARAMETERS:           NONE
C
C SUBROUTINES/FUNCTIONS CALLED
C       HILITE              MENU CHOICE HILIGHTER
C       JVPORT              DRAWS NEW VIEWPORT
C       DRAWM               DRAWS MENU
C       JWINDO              CREATES NEW VIEWPORT PARAMETERS
C       MPICK               SUBROUTINE FOR PICKING MENU CHOICES
C       PRINTR              PRINTOUT CREATION/EXECUTION
C       MESG                MESSAGE DISPLAYER
C
C CALLED BY:                      CHECK
C
C VARIABLES:
C
C        PRTCHOI            TWO ELEMENT ARRAY, FIRST FOR SCREEN DISPLAY
C                                INDICATION, VALUES ARE:
C                               1 - FOR PRESENT DISPLAY
C                               2 - FOR FULL SCREEN
C                            SECOND FOR PRINTER TYPE, VALUES ARE:
C                               3 - FOR DOT MATRIX
C                               4 - FOR LASER
C                               5 - FOR INK JET
C                               6 TO 8 - FOR CALCOMP PLOTS
C
C RESTRICTIONS:          APOLLO  DEPENDENT SUBROUTINE
C
```

```
C     WRITTEN FOR THE CURRENT DEVICE DRIVER OF THE ACT II PRINTER
C     IF CHANGES TO DEVICE DRIVER WILL NEED TO CHANGE SOME PARAMETERS
C     BEING PASSED TO INTCOL AND/OR EXECOM
C
C ABNORMAL RETURN CONDITIONS:   N/A
C
C
C PROGRAMMER:                   DATE OF LAST CHANGE     REASON FOR CHANGE
C
C     RKDISBR                         14/04/87            INITIAL ENTRY
C
C-*-*-*-*-*-*-*-*-*-*-*-*-*-*-*-*-*-*-*-*-*-*-*-*-*-*-*-*-*-*-*-*-*-*-*-*-*|*-*-*-*-
C
        subroutine prtmen

c        print menu segment

        integer ibuttn,ichoic
        common /commvp/ xllmvp,yllmvp,xurmvp,yurmvp
        integer prtchoi(2),hilchoi(2)
        common /prtchoi/ prtchoi
        integer mtable(42),lentab

        common/b1/qcancl,qext2m,qretrn,qstmnu,qnextm
        integer qnextm
        logical qcancl,qext2m,qretrn,qstmnu,error,rflag
        common/b6/qcrmnu
        integer qcrmnu,pmenu,pmsg
        common /pmenu/ pmenu,pmsg
        common /isegn/ isegn
        common /msgold/ msgold,msgonm

        data mtable/0,0,0,0,1,1,0,2,0,0,0,0,3,0,4,0,5,0,0,0,6,0,7,0,8,
     +            0,0,0,9,0,0,0,0,0,0,0,0,0,0,0,0,0/

        data lentab/38/
        data hilchoi/1,3/
        data prtchoi/1,3/
        rflag = .false.

        if(qcrmnu.ne.324) then
           pmenu = qcrmnu
           pmsg = msgonm
        endif

c ---   check for previous menu being either the restore display or
c       save display.
c       if so, then the viewport most be cleared of the saved files text
        if (pmenu.eq.20 .or. pmenu.eq.21)
     +     call jvisbl(isegn,0)

        call drawm(324,ierror)

        call jvport (xllmvp,xurmvp,yllmvp,yurmvp)
        call jwindo (0.,17.,1.,43.)

        call hilite (.false.,9,1,lentab,mtable)
        call hilite (.true.,(hilchoi(1)),1,lentab,mtable)
        call hilite (.true.,(hilchoi(2)),1,lentab,mtable)

        ichoic = 1

  5     if(ibuttn.eq.8.or.ichoic.eq.9.or.
     +      (ibuttn.eq.77.and.qext2m)) goto 6
           call mesg(613)
           call mpick (ichoic,324,ibuttn)

           if(ibuttn.eq.1) then

              if(ichoic.eq.1.or.ichoic.eq.2) then
                 prtchoi(1) = ichoic
              endif
              if(ichoic.ge.3.and.ichoic.le.8) then
                 prtchoi(2) = ichoic
              endif
```

```
         if(ichoic.eq.9) then
            call hilite (.true.,9,1,lentab,mtable)
            call printr
         endif


         if(prtchoi(2).eq.6.or.prtchoi(2).eq.7.or.prtchoi(2).eq.8)
     +      prtchoi(1) = 2

         if(prtchoi(1).ne.hilchoi(1)) then
            call hilite (.false.,(hilchoi(1)),1,lentab,mtable)
            call hilite (.true.,(prtchoi(1)),1,lentab,mtable)
            hilchoi(1) = prtchoi(1)
         endif
         if(prtchoi(2).ne.hilchoi(2)) then
            call hilite (.false.,(hilchoi(2)),1,lentab,mtable)
            call hilite (.true.,(prtchoi(2)),1,lentab,mtable)
            hilchoi(2) = prtchoi(2)
         endif

      else
c ---      CHECK FOR A RECURSIVE CHOICE OF 'PRINT' IN THE KEY AREA
         if(ibuttn.ne.80) then
            call check(ibuttn,qcrmnu,error,rflag)
         endif

      endif

      goto 5
    6 continue

c      print*,' choice - ',prtchoi(1),prtchoi(2),ibuttn

      if(ibuttn.eq.8.or.ichoic.eq.9) then
         call jvport (xllmvp,xurmvp,yllmvp,yurmvp)
         call jwindo (0.,17.,1.,43.)
         call drawm(pmenu,ierror)
      endif

      qretrn = .false.

      return
      end


C+*+*+*+*+*+*+*+*+*+*+*+*+*+*+*+*+*+*+*+*+*+*+*+*+*+*+*+*+*+*+*+*+*+*|*+*+*+*+
C* UNIT NAME:                        pushst
C*
C* FUNCTIONAL DESCRIPTION:
C*
C*      This subroutine places a menu number on a stack.
C*
C* INPUT FILES/PARAMETERS:
C*
C*      Global Variables
C*
C*        qcrmnu           integer; contains the current menu number
C*        qmxst            integer; contains the size of the qstack array
C*        qmloc            integer; contains the current location in the
C*                                  qstack array
C*        qstack    integer array; contains menu numbers of previous
C*                                  menus displayed
C*
C*
C* OUTPUT FILES/PARAMETERS:
C*
C*        values in the global variables described above, in particular
C*        the menu value placed on the stack
C*
C* RESTRICTIONS:
C*
C*       The value in the variable qmloc cannot exceed the maximum array
C*       size.
C*
```

```
C* SUBROUTINES CALLED:
C*
C*       mesg            subroutine; places an appropriate message
C*                                   in the communications area
C*
C* CALLED BY:                      MHAND
C*
C* LOCAL VARIABLES:
C*
C*       no local variables
C*
C* ABNORMAL RETURN CONDITIONS:
C*
C*      A system error will occur when the value in the variable qmloc
C*      is going to exceed the maximum size of the array qstack.
C*
C* LOCATION:
C*
C*       /u2/vcn/a21proto/pushst
C*
C* PROGRAMMER:               DATE OF LAST CHANGE:    REASON FOR CHANGE:
C*
C*  VCNewton                    15 August 1983          initial entry
C*
C-*-*-*-*-*-*-*-*-*-*-*-*-*-*-*-*-*-*-*-*-*-*-*-*-*-*-*-*-*-*-*-*-*-*-*|*-*-*-*-

      Subroutine PUSHST

C     This subroutine places a menu number on a stack.

C         (**Declare common blocks and common block variables**)
          Integer qcrmnu,qmxst,qmloc,qstack(10)
          Common /b2/ qstack
          Common /b4/ qmloc
          Common /b6/ qcrmnu
          Common /b7/ qmxst
C         (**Insure qmloc is not going to exceed max array size**)
          If (qmloc .lt. qmxst) then
C            (**Simulate pushing an item on a stack**)
             qmloc=qmloc + 1
             qstack(qmloc)=qcrmnu
          Else
C            (**Execute system error process**)
             Call MESG(209)
             call paws
C            EXIT PROCESS STORING VARIABLES AND KEEPING THE CURRENT
C            SCREEN FOR LATER DEBUGGING
          Endif
      End


C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                     putamp
c
c  Functional Description:
c       writes up to 4 lines of info into amp area
c
c  Input Files/Parameters:
c
c  Output Files/Parameters: N/A
c
c  Subroutines/Functions Called:
c
c  Called By:                     DRWAMP
c
c  Local Variables: N/A
c
c  Restrictions: N/A
c
c  Abnormal Return Conditions:  N/A
c
c  Location:
c
c  Programmer       Date of Last Change     Reason for Change
```

```
C  L. McCleary     Jan 1988                    separate amp & sys - putamp
c
C-*-*-*-*-*-*-*-*-*-*-*-*-*-*-*-*-*-*-*-*-*-*-*-*-*-*-*-*-*-*-*-*-*-*-*|*-*-*-*-
c
      subroutine putamp(amptxt,ampcnt)
c
c  this subroutine writes up to 4 lines of data into amp area
c
      character*72 amptxt(4),line
      integer ampcnt,ampseg
      integer tmpcnt
c      character * 40 fixdat
      real x,y
      real yincr

      common /compic/xllpic,yllpic,xurpic,yurpic,ibcpic,iocpic
      common/ampprm/ampseg

c      print*,'putamp -- enter-amptxt',amptxt
c
c      fixdat = ' '
      x = xllpic + 1.
c      yincr = (yurpic - yllpic)/(ampcnt+1) + .05
      yincr = 1.
      y= yurpic - (2*yincr)
      do 110 tmpcnt = 2,ampcnt
           line = amptxt(tmpcnt)
           call lngth(line,72,length)
           CALL JMOVE(x,y)
           CALL J1STRG(line(1:length))
           y = y - yincr
           if (y.lt.0.01) y = 0.01
 110  continue
c      print*,'putamp - exit'
      return
      end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     PUTARC
C
C FUNCTIONAL DESCRIPTION:        .
C
C CALLED BY:                     APARCS
C
C PROGRAMMER:                    DATE OF LAST CHANGE    REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        subroutine putarc(a0,a1,a2,centrx,centry,rad)

c       This routine uses the parameters passed to draw one
c         arc.
c    VARIABLES:
c       a0,a1,a2- angles of the arc
c       centrx,centry- center point of arc
c       rad- radius of arc
c   PROGRAMMER:  Nancy Detrich, A215, March, 1984
C------  MODIFIED BY A692 FOR COMPLETION


        real a0,a1,a2,centrx,centry,rad

        if (((a0.le.a2).and.(a2.le.a1)).or.((a1.le.a2).and.
     +           (a2.le.a0))) then
          call jarc (centrx, centry,0.0, rad, 0, a1, a0)
        else
          if (a0.lt.a1)then
            call jarc(centrx,centry,0.0,rad,0,a1,a0+360)
          else
            call jarc(centrx,centry,0.0,rad,0,a1+360,a0)
          endif
        endif
        return
        end
```

```
C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PUTWRD
C
C FUNCTIONAL DESCRIPTION:       .
C
C CALLED BY:                    CALCPR, DECDET, DECSCA, ERASES, INCDET,
C                               INCSCA, INQSTA, MAJORS, MINORS,
C                               SCENTE, SETSCA, SPROJE, SSCALE
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine putwrd
c
c     this subroutine goes back to the previous command word
c     *** note - this can be used only once in its current form ***
c
      logical eol,eoc
      common /comnds/ lenl,indxw,lenw,eol,eoc
      common /oldwrd/ indxwo,lenwo
c
c     print*,'putwrd -- enter',indxw,lenw
      indxw = indxwo
      lenw = lenwo
c     print*,'putwrd -- exit',indxw,lenw
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                   rbound

c  Functional Description:
c       this subroutine reads screen boundary parameters
c
c  Input Files/Parameters:

c  Output Files/Parameters: N/A

c  Subroutines/Functions Called:

c  Called By:                   FMAIN, RESCON

c  Local Variables: N/A

c  Restrictions: N/A

c  Abnormal Return Conditions:  N/A

c  Location:       /a21/dave

c  Programmer        Date of Last Change        Reason for Change
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine rbound (len,name)

c     this subroutine reads screen boundary parameters

      common /overly/ overtb
      logical overtb(16)
      character*16 chastr
      character*(*) name
      character*50 filenm
      common /comscr/btbscr(4)
      common /commen/btbmen(4),ibcmen,iocmen,incmen
      common /comleg/btbleg(4),ibcleg,iocleg
      common /combox/btbbox(4),ibcbox,iocbox
      common /comsys/btbsys(4),ibcsys,iocsys
      common /comgra/btbgra(4),ibcgra,iocgra
      common /comkey/btbkey(4),ibckey,iockey
      common /comamp/btbamp(4),ibcamp,iocamp
```

```
        common /comwor/btbwor(4),ibcwor,iocwor
        logical areaon(16)
        common /areaon/ areaon
        logical sys
        common /sysdbc/ sys
        data ifl/9/,irdwr/0/

        if (sys) print*,'Enter rbound ',len,name
        filenm = name(1:len) // '.bou'
        call openit (filenm,len+4,ifl,irdwr,ierror)
        if (ierror.ne.0) then
            call openit ('default.bou',11,ifl,irdwr,ierror)
        endif
        if (ierror.eq.0) then
            call readre (ifl,btbscr,4,ierror)
            call readre (ifl,btbmen,4,ierror)
            call readre (ifl,btbleg,4,ierror)
            call readre (ifl,btbsys,4,ierror)
            call readre (ifl,btbgra,4,ierror)
            call readre (ifl,btbkey,4,ierror)
            call readre (ifl,btbamp,4,ierror)
            call readre (ifl,btbwor,4,ierror)
            call readch (ifl,chastr,lench,ierror)
            call asclog(areaon,16,chastr)
            close (ifl)
            call calgvp
        else
            print*,'rbound -- Problem reading parameter file ',
     +      name(1:len),len
        endif
        do 110 i=1,4
            btbbox(i) = btbleg(i)
  110   continue

        return
        end
C+*+*+*+*+*+*+*+*+*+*+*+*+*+*+*+*+*+*+*+*+*+*+*+*+*+*+*+*+*+*+*+*+*|*+*+*+*+
C UNIT NAME:                    RCOLOR
C
C FUNCTIONAL DESCRIPTION:       .
C
C CALLED BY:                    FMAIN, RESCON
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*|*-*-*-*-

        subroutine rcolor (len,name)

c       this subroutine reads color values and loads the color table

        character*(*) name
        character*50 filenm
        dimension iclval (6)
        integer coltab(256)
        integer qdsdev,qpydev,qecho,qlecho
        common /device/ qdsdev,qpydev,qecho,qlecho
        common /coltab/ coltab
        equivalence (index,iclval(1)),(istrt,iclval(2)),
     +  (ihue,iclval(3)),(isatur,iclval(4)),(light,iclval(5)),
     +  (icnsec,iclval(6))
        data ifl/9/,irdwr/0/

c       print*,'Enter rcolor ',len,name
        filenm = name(1:len) // '.col'
        ierror = 0
c       set up the default value
        do 10 i = 0,255
            coltab(i+1) = 3
 10     continue
        call openit (filenm,len+4,ifl,irdwr,ierror)
        if (ierror.ne.0) then
            call openit ('default.col',11,ifl,0,ierror)
        endif
```

```
      if (ierror.eq.0) then
          REWIND ifl
 160      continue
              call readin (ifl,iclval,6,ierror)
c  Map the proper values into the coltab array this array is
c  later used by xcolor to call jcolor with the proper color

              do 162 indx = 1,icnsec
                 coltab(istrt+indx) = index + indx - 1
 162          continue

c             print*,' rcolor -- ',iclval,ierror
              if (ierror.ne.0) go to 170
              hue = ihue
              satur = isatur
              rlight = light
              isatur = satur/100.*32767.
              light = rlight/100.*32767.
c             print*,'calling jcotbl :',istrt,ihue,isatur,light,
c    +                 index,qdsdev

c consec  consecutive locations are loaded
c into the color table
              do 165 indx=index,index + icnsec - 1
                 call jcotbl (qdsdev,1,indx,ihue,isatur,light)
                 call hlssav (indx,hue,rlight,satur)
 165          continue
              go to 160
 170      continue
          call closit (ifl)
      else
          print*,'Error on color file read'
c         call derror(30,'Problem reading color paramet.',.true.,5,ch)
      endif
      return
      end

C+++++++++++++++++++++++++++++++++++++++++++++++++++++++++++++++++|+++++++
c  UNIT NAME:                 rconfg

c  Functional Description:
c       this subroutine reads system configuration parameters
c
c  Input Files/Parameters:

c  Output Files/Parameters: N/A

c  Subroutines/Functions Called:

c  Called By: fmain

c  Local Variables: N/A

c  Restrictions: N/A

c  Abnormal Return Conditions:  N/A

c  Location:      /a21/dave

c  Programmer        Date of Last Change       Reason for Change
c  L McCleary        Jan 1988               sep amp & sys - rconfg
C
C-*-*-*-*-*-*-*-*-*-*-*-*-*-*-*-*-*-*-*-*-*-*-*-*-*-*-*-*-*-*-*-*-*-*|*-*-*-*-

      subroutine rconfg (len,name)

c     this subroutine reads system configuration parameters

      character*(*) name
      character*50 filenm
      integer fntab(17)
      common /fntab/ fntab
```

```
      logical lton(16),dotem
      integer ipgrid(4),ltyptb(16)
      common /map/ XRNM,XC,YC,LEVEL,CLAT,CLON,XRAD,YRAD,ITPROJ,
     +     IRES,LTYPTB,LUNDAT,LUNIND,LUNLIN,LTON,IPGRID,DOTEM,
     +     ORHALT
      integer detail(6)
      common /detail/ detail
      logical sys
      common /sysdbc/ sys
      common /scratr/qbox,qbkgrd
      integer qbox,qbkgrd
      common /combox/xllbox,yllbox,xurbox,yurbox,ibcbox,iocbox
      common /commen/xllmen,yllmen,xurmen,yurmen,ibcmen,iocmen,incmen
      common /comleg/xllleg,yllleg,xurleg,yurleg,ibcleg,iocleg
      common /comsys/xllsys,yllsys,xursys,yursys,ibcsys,iocsys
      common /comgra/xllgra,yllgra,xurgra,yurgra,ibcgra,iocgra
      common /comkey/xllkey,yllkey,xurkey,yurkey,ibckey,iockey
      common /compic/xllpic,yllpic,xurpic,yurpic,ibcpic,iocpic
      common /comamp/xllamp,yllamp,xuramp,yuramp,ibcamp,iocamp
      integer scrcol(2)
      data ifl/9/,irdwr/0/

      if (sys) print*,'Enter rconfg ',len,name
      filenm = name(1:len) // '.cfg'
      call openit (filenm,len+4,ifl,irdwr,ierror)
      if (ierror.ne.0) then
          call openit ('default.cfg',11,ifl,0,ierror)
      endif
      if (ierror.eq.0) then
          call readin (ifl,ltyptb,16,ierror)
          if (ierror.ne.0) print*,'Error reading line types',ltyptb
          call readin (ifl,fntab,17,ierror)
          if (ierror.ne.0) print*,'Error reading fntab',fntab
          do 100 i=1,6
             detail(i) = 0
100       continue
          do 110 i=1,17
              if(fntab(i).eq.1) then
                   detail(1) = 1
              else if(fntab(i).eq.2) then
                   detail(2) = 1
              else if(fntab(i).eq.3) then
                   detail(3) = 1
              else if(fntab(i).eq.4) then
                   detail(4) = 1
              else if(fntab(i).eq.5) then
                   detail(5) = 1
              else if(fntab(i).eq.6) then
                   detail(6) = 1
              endif
110       continue
          call readin(ifl,scrcol,2,ierror)
          if (ierror.ne.0) print *,'RCONFG error reading scrcol',scrcol
          qbox = scrcol(1)
          iocbox = scrcol(1)
          iocmen = scrcol(1)
          iocleg = scrcol(1)
          iocsys = scrcol(1)
          iocgra = scrcol(1)
          iockey = scrcol(1)
          iocpic = scrcol(1)
          iocamp = scrcol(1)
          qbkgrd = scrcol(2)
          ibcbox = scrcol(2)
          ibcmen = scrcol(2)
          ibcleg = scrcol(2)
          ibcsys = scrcol(2)
          ibcgra = scrcol(2)
          ibckey = scrcol(2)
          ibcpic = scrcol(2)
          ibcamp = scrcol(2)
          call closit (ifl)
      else
```

```
         print*,'Error in configuration file'
c        call derror(30,'Problem reading configur. file',.true.,5,ch)
      endif

      return
      end

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                  readch

c  Functional Description:
c       this subroutine reads from ifl in character format
c
c  Input Files/Parameters:

c  Output Files/Parameters: N/A

c  Subroutines/Functions Called:

c  Called By:                  LOADIC, RBOUND, RPARAM, RPATHS, RSAVPR

c  Local Variables: N/A

c  Restrictions: N/A

c  Abnormal Return Conditions:  N/A

c  Location:      /a21/dave

c  Programmer        Date of Last Change       Reason for Change

C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine readch (ifl,charar,lenr,ierror)

c     this subroutine reads from ifl in character format

      character*(*) charar
      ierror = 0
      maxlen = len(charar)
      if (maxlen.gt.100.or.maxlen.le.0) then
         print*,'readch -- invalid length of character string '
     +   ,maxlen,'  ',charar
         maxlen = 100
      endif
      read(ifl,*,end=199,err=199) charar (1:maxlen)
      call length (charar,maxlen,lenr)
      go to 200
 199     continue
         ierror = 2
c        call derror(30,'Problem reading parameter     ',.true.,5,ch)
 200  continue
c     print*,'Readch --  : ',lenr,ierror,charar(1:lenr),maxlen

      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                  READEL
C
C FUNCTIONAL DESCRIPTION:     .
C
C CALLED BY:                  PLTOVP, READML
C
C PROGRAMMER:                 DATE OF LAST CHANGE    REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

     subroutine readel(string,flatlon)
c
c  this routine reads the overlay or df file for an ellipse line and returns
c  its associated values for printing
c
```

```
      character * 105 string
      character*16 flatlon

c      print*,'readel -- enter'
      read(string,120,err = 200)flatlon
120   format(a16)
      goto 225
200   print*,'error in reading ellipse line in readel'
225   continue
c      print*,'readel -- exit-lat/lon:',flatlon
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       READEM
C
C FUNCTIONAL DESCRIPTION:          .
C
C CALLED BY:                       GETARC, GETCIR, GETPTS
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine readem(ifl,iarray,len,ierror)

c       this subroutine reads from ifl in integer format (I3)
c    VARIABLES:
c       ifl- logical unit number of the file to be accessed
c       iarray- array holding record just read in
c       len- number of positions to be read in
c       ierror- integer flag set if error during read
c   PROGRAMMER:  Nancy Detrich, A215, March, 1984


        integer iarray(*)

        ierror = 0
        read(ifl,1100,end=199,err=199) (iarray(i),i=1,len)
 1100   format(100i3)
        go to 200
 199        continue
            ierror = 2
 200    continue
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                      readin

c  Functional Description:
c       this subroutine reads from ifl in integer format (I5)
c
c  Input Files/Parameters:

c  Output Files/Parameters: N/A

c  Subroutines/Functions Called:

c  Called By:                      BSTMAP, RCOLOR, RCONFG, RPARAM, RSAVPR

c  Local Variables: N/A

c  Restrictions: N/A

c  Abnormal Return Conditions:  N/A

c  Location:      /a21/dave

c  Programmer         Date of Last Change        Reason for Change

C-*-*-*-*-*-*-*-*-*-*-*-*-*-*-*-*-*-*-*-*-*-*-*-*-*-*-*-*-*-*-*-*-*-*-*-*-*|*-*-*-*-
```

```
        subroutine readin (ifl,iarray,len,ierror)

c       this subroutine reads from ifl in integer format (I5)

        integer iarray(*)

        ierror = 0
        read(ifl,*,end=198,err=199) (iarray(i),i=1,len)
c       read(ifl,1100,end=198,err=199) (iarray(i),i=1,len)
c1100   format(<len>i5)
        go to 200
  198       continue
            ierror = 1
            go to 200
  199       continue
            ierror = 2
c           call derror(30,'Problem reading parameter     ',.true.,5,ch)
  200   continue
c       print*,'Readin -- iarray,len,ierror : ',(iarray(i),i=1,len),len
c    +      ,ierror

        return
        end

C++++++++++++++++++++++++++++++++++++++++++++++++++++++++++++++++++++|*+*+*+*+
C UNIT NAME:                         READML
C
C FUNCTIONAL DESCRIPTION:
C
C CALLED BY:
C
C PROGRAMMER:                         DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

      subroutine readml(string, exit)

c  this routine interprets the string of characters read from check_mail or
c  check_mail_cond.  The interpretation of the string is based on the value
c  of the first field, "type".

      character * 1024 string
      logical exit
      character * 1  type
      character * 13 msgnum
      character * 5  source
      character * 5  dest
      character * 1  input
      character * 1  action
      character * 3  length
      character * 995 data
      character * 120 buffer
      logical eliflag
      integer ilen,dlen
      integer*2 numb
      character * 80 mbxfil
      character*16 flatlon,blatlon(30)
      character * 120 fixdat
      integer lctrak
      integer ierror
      character linsym
      character*6 filedf
      character*105 text
      integer lcover, lcdf
      integer*4 lenovf
      character*80 ovfnam
      common /ovfnam/ ovfnam
      common /lenovf/ lenovf
      character*12 mapcho
      integer mflen
      common /mapcho/mapcho,mflen
      logical mdraw,ovdraw
      common /mapdat/ mdraw,ovdraw
```

```
      integer trakfd
      logical BEGTRK
      common /TRACK/ trakfd,BEGTRK
      logical mailfl(6)
      integer prtchoi(2)
      common /prtchoi/ prtchoi
      common/mlflag/mailfl
      logical mrkll
      common/mrkll/mrkll
c     map parameters
      logical lton(16),dotem
      integer ipgrid(4),ltyptb(16)
      common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
      data lcover /1/
      data lctrak /3/
      data lcdf   /2/
      data lunnam /19/
      data lundef /30/
      data trakfd /90/
      data filedf /'df.dat'/
      data mailfl /6*.false./

      exit = .false.
      mdraw = .true.
      eliflag = .false.
      read(string,100,err=200) type
100   format(a1)
      if(type .eq. 'D') then
           read(string,110,err=200) msgnum,source,dest,
     +                    input,action,length,data
110        format(1x,a13,a5,a5,a1,a1,a3,a995)
           ilen = (ichar(length(1:1))-48) * 100
           ilen = ilen + (ichar(length(2:2))-48) * 10
           ilen = ilen + (ichar(length(3:3))-48)
c
c******------------------------------------------------------------------
c          actions are as follows:
c            A:  Plot df or overlay data
c            B:  Begin interactive NSAgraph session
c            C:  Plot and print df data
c            D:  Display best stored map for a given lat/lon and mark that pt.
c            E:  Process ffix and display df data
c            F:  Track overlay data from an input file on a fixed map
c******------------------------------------------------------------------

           if(action .eq. 'A' .or. action .eq. 'C' .or.
     +        action .eq. 'E') then
               if(input .eq. 'F') then
                   mbxfil = data
                   dlen = len(mbxfil)
                   if (dlen .gt. 0) then

c                        -----------------------------------
c                        open the file sent in MBX message
c                        -----------------------------------

c
c---------if raw df data, process the ffix using nsagraph ffix routine,
c---------then put up map
c
                         if(action .eq. 'E') then
                             call procdf (dlen,mbxfil,ierror)
c
c--------------procdf puts processed data into 'df.dat' for display
c--------------let mbxfil eq 'df.dat' inorder to extract the ellipse fix
c
                              ilen = 6
                              mbxfil(1:ilen) = 'df.dat'
                         endif
                         open(unit=lunnam,file=mbxfil,
     +                   err = 200,status = 'old')
```

```
c                      ------------------------------------
c                      read each line of ov file to pull out fix pt.
c                      ------------------------------------

                       numb=1
 120                   continue
                            read(lunnam,121,end=122,err=200)
    +                             linsym,text
 121                        format(a1,a105)

c--------------check for ellipse line -- if more than one ellipse is in file
c--------------then revert to world map by sending bstmap 0/0 for lat/lon.

                            if (linsym.eq.'e'.or.linsym.eq.'E')then
                                  if(eliflag) then
                                      flatlon = '0000000n0000000e'
                                      goto 122
                                  else
                                      call readel(text,flatlon)
                                  endif
                                  eliflag = .true.
                            elseif
    +                       (linsym.eq.'b'.or.linsym.eq.'B')then
                                  call readel(text,blatlon(numb))
                                  numb=numb+1
                            endif
                            goto 120
 122                   continue
                       numb=numb-1
c                      ---------------------------------------------------
c                      calc and put up best stored map to display this FFIX
c                      ---------------------------------------------------
c
c-------------if no ellipse is found, revert to world map.
c
                       if(.not. eliflag) then
                            flatlon = '0000000n0000000e'
                       endif
                       call bstmap(flatlon,blatlon,numb,mapcho,mflen)
c                       call recall(mflen,mapcho)

c-------------if raw df data has been processed,(action E) procdf puts data
c-------------into 'df.dat' file
c-------------therfore, no transfer of data is necessary.  Otherwise...

                       if(action .ne. 'E') then
                           open(unit=lundef,file=filedf(1:6),
c     +                        err = 200,status = 'overwrite')
    +                          err = 200,status = 'old')

c       ---------------------------------------------------
c       read the df data from the sent input file and
c       write the df data into df.dat file
c       ---------------------------------------------------
                           REWIND lunnam
 125                       continue
                              read(lunnam,130,end=140) buffer
 130                          format(a120)
                              write(lundef,130) buffer
                              goto 125
140                        continue
                           close(unit=lundef)
                           close(unit=lunnam)
c     ---------------------------------------------------
c     move any co-located sites so that txt is readable on map
c     ---------------------------------------------------
                           call mvtext(filedf,6)
                       endif
c                 ------------------------------------------
c                 display df data on map and turn df ftr on
c                 ------------------------------------------
c                     call drwftr(lcdf)
                       if(action .eq. 'A') then
                            lton(lcover) = .true.
                            mailfl(2) = .true.
                       else if (action .eq. 'E') then
```

```
                        lton(lcdf) = .true.
                        mailfl(2) = .true.
                   else if(action .eq. 'C') then
                        lton(lcover) = .true.
                        mailfl(2) = .true.
                        mailfl(5) = .true.
c                        call mptxpr(mbxfil,ilen)
                        exit = .true.
                   endif
              endif
          else
              print*,'this input not avail ',input
          endif
    else if (action .eq. 'B' ) then
          print*,'interactive mode'
    else if (action .eq. 'D' .or. action .eq. 'F') then
          if(input .eq. 'M') then

c        ---------------------------------------------------------
c        display best saved map for requested pt and show pt w/ "*"
c        ---------------------------------------------------------

                if(action .eq. 'D') then
                  read(string,150,err=200) flatlon
150               format(29x,a16)
                  call bstmap(flatlon,blatlon,numb,mapcho,mflen)
                  fixdat = '* LAT/LON: '//flatlon
                  fixdat = ' '
                  mrkll = .true.
c                ---------------------------------------------------------
c                tracking data has been sent; plot this line of it on map
c                ---------------------------------------------------------
c       the tracking option has not been implemented because DFAC
c       has no requirement for this option any longer

                else if (action .eq. 'F') then
c ---- begin tracking ----
c                    if(BEGTRK) then
c                        call recall(7,'default')
c                        open(unit=trakfd,file='track.1',
c     +                  err = 200,status = 'overwrite')
c                        lton(lctrak) = .true.
c                        BEGTRK = .false.
c                    endif
c                    read(string,160,err=200) fixdat
c160                 format(29x,a120)
c                    call trakpt(fixdat,lton(lctrak))
                endif
           else
                print*,'this input not avail ',input
           endif
     else
           print*,'this action not avail. ',action
     endif
else
     print*,'this type not avail. ',type
endif
goto 210

200   print*,'error in opening mail string - in readml'

210   continue

      return
      end

C+*+*+*+*+*+*+*+*+*+*+*+*+*+*+*+*+*+*+*+*+*+*+*+*+*+*+*+*+*+*+*+*+*|*+*+*+*+
c  UNIT NAME:                        readre

c  Functional Description:
c       this subroutine reads from ifl in real format
c
c  Input Files/Parameters:
```

```
c  Output Files/Parameters: N/A

c  Subroutines/Functions Called:

c  Called By:                  BSTMAP, RBOUND, RPARAM

c  Local Variables: N/A

c  Restrictions: N/A

c  Abnormal Return Conditions:  N/A

c  Location:      /a21/dave

c  Programmer        Date of Last Change       Reason for Change
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine readre (ifl,rarray,len,ierror)

c       this subroutine reads from ifl in real format

        real rarray(*)

c       print*,'Enter readre ',len
        ierror = 0
        read(ifl,*,end=199,err=199) (rarray(i),i=1,len)
c       read(ifl,1100,end=199,err=199) (rarray(i),i=1,len)
c1100   format(4f12.5)
        go to 200
  199       continue
            ierror = 2
           print*,'Error on Readre read',len,rarray(1)
c           call derror(30,'Problem reading parameter     ',.true.,5,ch)
  200   continue
c       print*,'Readre -- rarray,len,ierror : ',(rarray(i),i=1,4),len,ierror
        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                  redraw
c
c  Functional Description:
c     redraw all retained segments on screen (using jframe)
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                  RPLSCN, SUBCHK
c
c  Local Variables: N/A
c
c  Restrictions: N/A
c
c  Abnormal Return Conditions:  N/A
c
c  Location:      /a21/dave
c
c  Programmer        Date of Last Change       Reason for Change
c  L McCleary        Jan 1988                  'BATCH' fix - redraw
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine redraw

c     redraw all retained segments on screen (using jframe)

      logical sys,batch
      common /sysdbc/ sys
      common /batdbc/ batch
```

```
      if (sys) print*,'redraw -- enter '
      if (batch) then
         call jenbat
         call jbgbat (0)
      else
         call jframe
      endif
      return
      end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     REDRCT
C
C FUNCTIONAL DESCRIPTION:        .
C
C CALLED BY:                     APRECT
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine redrct(xarray,yarray,start)

c       redraws a rectangle, given the top left, top right, bottom left,
c        and bottom right points in that order
c      VARIABLES:
c       start- the starting position in the array for that rectangle
c          (not implemented)
c       xarray/yarray- holds points for rectangles
c   PROGRAMMER: Nancy Detrich, A215, March, 1984


        integer start
        real xarray(*),yarray(*)

        call jmove(xarray(start),yarray(start))
        call jdraw(xarray(start+1),yarray(start+1))
        call jdraw(xarray(start+3),yarray(start+3))
        call jdraw(xarray(start+2),yarray(start+2))
        call jdraw(xarray(start),yarray(start))
        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     REDRLN
C
C FUNCTIONAL DESCRIPTION:        .
C
C CALLED BY:                     APLINE, APSMOO
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine redrln(xarray,yarray,numpts)

c       This routine draws a line connecting the points passed
c         in the arrays.
c      VARIABLES:
c        xarray/yarray- points to be used for line
c        numpts- number of points in the arrays
c   PROGRAMMER:  Nancy Detrich, A215, March, 1984


        real xarray(*),yarray(*)
        integer numpts

        call jmove (xarray(1),yarray(1))
        call jpoly (xarray(2),yarray(2),numpts-1)
c       do 100 i = 1,numpts-1
```

```
c         call jmove (xarray(i),yarray(i))
c         call jdraw (xarray(i+1),yarray(i+1))
c 100   continue
       return
       end


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   REDRMK
C
C FUNCTIONAL DESCRIPTION:      .
C
C CALLED BY:                   APMARK
C
C PROGRAMMER:                  DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

       subroutine redrmk (mkrtyp,count,xarray,yarray)

c      This routine draws markers at the points in the x and
c       yarray.
c       The marker displayed is controlled by the mkrtyp passed
c       which is used for the DI-3000 call--the normal markers
c       of DI-3000 are used.
c     VARIABLES:
c       xarray/yarray- coordinates for placing markers
c       mkrtyp- the DI-3000 marker to be displayed
c       count- number of markers to be displayed
c   PROGRAMMER:  Nancy Detrich, A215, March, 1984


       real xarray(*),yarray(*)
       integer mkrtyp,count

       call jcmark(mkrtyp)
       call jpmark (xarray,yarray,count)
c      do 70 i = 1,count
c        call jmark(xarray(i),yarray(i))
c  70  continue
       return
       end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   REINIP.
C
C FUNCTIONAL DESCRIPTION:      .
C
C CALLED BY:                   MHAND
C
C PROGRAMMER:                  DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

       subroutine reinip
c      reinitialize variables after returning to main menu if necessary
c      (If inipic is called, the map will be erased)

c      call inipic

       return
       end
C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   REMOVF
C
C FUNCTIONAL DESCRIPTION:      .
C
C CALLED BY:                   STATEC
C
C PROGRAMMER:                  DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-
```

```
      subroutine removf
c
c     this subroutine removes a feature from current map
c

      common /states/ nextst
      logical isfeat
      common /indpar/ indpro,indftr
      logical lton(16),dotem
      integer ipgrid(4),ltyptb(16)
      common /map/ XRNM,XC,YC,LEVEL,CLAT,CLON,XRAD,YRAD,ITPROJ,
     +    IRES,LTYPTB,LUNDAT,LUNIND,LUNLIN,LTON,IPGRID,DOTEM,
     +    ORHALT
      integer color

c      print*,'removf -- enter'
      call getwrd
      if (isfeat()) then
          if (LTON(indftr)) then
             color = LTYPTB(indftr)
             LTYPTB(indftr) = 24
             call drwftr(indftr)
             LTYPTB(indftr) = color
             LTON(indftr) = .false.
          endif
c         print*,'removf -- exit'
      endif
      nextst = 1
      return
      end

C+*+*+*+*+*+*+*+*+*+*+*+*+*+*+*+*+*+*+*+*+*+*+*+*+*+*+*+*+*+*+*+*+*|*+*+*+*+
c  UNIT NAME:                          rename
c
c  Functional Description:             Move one file into another.
c
c  Input Files/Parameters:
c     Parameters
c       Name    Type    Description
c       ----    ----    -----------
c       oldnam  ch*50   File to be renamed.
c       newnam  ch*50   New name to give file.
c
c  Output Files/Parameters:      N/A
c
c  Subroutines/Functions Called:
c       Name    Description
c       ----    -----------
c       copyfl  Copy old file to new file.
c
c
c  Called By:
c
c  Local Variables:              N/A
c
c  Restrictions:                 N/A
c
c  Abnormal Return Conditions:   N/A
c
c  Location:
c
c       Programmer      Date of Last Change     Reason for Change
c       ----------      -------------------     -----------------
c       sfw             8-Nov-1984              Restructuring and documentation.
c
c
c  Work still to be done:
c
C-*-*-*-*-*-*-*-*-*-*-*-*-*-*-*-*-*-*-*-*-*-*-*-*-*-*-*-*-*-*-*-*-*-*|*-*-*-*-

      subroutine rename( oldnam, newnam, ierr )
```

```
        integer ierr
        character *50 oldnam, newnam

c       Call copyit to make copy of original and delete then delete it.
        call copyfl( oldnam, newnam, 'delete', ierr )

        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     ROTPTS
C
C FUNCTIONAL DESCRIPTION:        .
C
C CALLED BY:                     APARCS, APCIRC, APFILL, APLINE,
C                                APMARK, APRECT, APSMOO
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine rotpts(xarray,yarray,npts)
C------  PROGRAMMED BY DIRK BUTSON OF A692 FOR COMPLETION

      real xarray(*),yarray(*)
      integer npts
      common /chgit/ mirflg,xscale,yscale,xoffst,yoffst,rotang
        real xscale,yscale,rotang
        integer xoffst,yoffst,mirflg

      if (rotang .ne. 0) then
         do 100 i = 1,npts
            x = xarray(i) * cos (rotang) + yarray(i) * sin (rotang)
            y = - xarray(i) * sin (rotang) + yarray(i) * cos (rotang)

            xarray(i) = x
            yarray(i) = y

clj ------- The following values used to offset the x and y
clj ------- positions are being used to prevent the rotation
clj ------- from changing the position of the symbol.

c             if (rotang.gt.0 .and. rotang.le.0.7854) then
c                xarray(i) = x
c                yarray(i) = y
c             elseif (rotang.gt.0.7854 .and. rotang.le.2.3562) then
c                xarray(i) = x
c                yarray(i) = y
c             elseif (rotang.gt.2.3562 .and. rotang.le.3.927) then
c                xarray(i) = x
c                yarray(i) = y
c             elseif (rotang.gt.3.927 .and. rotang.le.5.4978) then
c                xarray(i) = x
c                yarray(i) = y
c             else
c                xarray(i) = x
c                yarray(i) = y
c             endif
cmbb                xarray(i) = x - 45
cmbb                yarray(i) = y - 45
100      continue
      endif
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    rparam

c  Functional Description:
c       this subroutine reads map parameters
c
c  Input Files/Parameters:
```

```
c  Output Files/Parameters: N/A

c  Subroutines/Functions Called:

c  Called By:                     FMAIN, RECDIS, RESCON

c  Local Variables: N/A

c  Restrictions: N/A

c  Abnormal Return Conditions:  N/A

c  Location:       /a21/dave

c  Programmer          Date of Last Change       Reason for Change

C-*-*-*-*-*-*-*-*-*-*-*-*-*-*-*-*-*-*-*-*-*-*-*-*-*-*-*-*-*-*-*-*-*-*-*-*|*-*-*-*-

        subroutine rparam (lennam,name,dataon,ierror)

c       this subroutine reads map parameters

        character*6 curwdb
        common /curwdb/ curwdb
        common /lenwdb/ lenwdb
        common /tablet/ inpdev
        character*(*) name
        logical dataon
        character*50 filenm
        character*17 chastr
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        common /conic/ spll1,spll2,tranl,trank,tranr,tscale,pole,tilt
        common /oblm/ polat,polon,az,azlat,gamma,xshift
        dimension ltypov(16)
        logical ltonov(16),rankt(26,16)
        common /maptoo/ ltypov,ltonov,rankt
        CHARACTER NSI,EWI
        real retabl(4)
        integer intabl(17)
        character*50 classi
        common /classi/ classi
        common /lencla/ lencla
        logical overtb(16)
        common /overly/ overtb
        character*80 ovfnam
        common /ovfnam/ ovfnam
        common /lenovf/ lenovf
        logical sys
        common /sysdbc/ sys
        logical filply,opnply
        common / polycb / filply,opnply
        data iversn/7/
        DATA IDLA,IMLA,IDLO,ISLO/65,0,85,0/NSI,EWI/'N','E'/
c       convert minutes to radians by multiplying by CM2RAD
        DATA CM2RAD/2.908882087E-4/
        data ifl/9/,irdwr/0/

        if (sys)
     +  print*,'Enter rparam ',lennam,name,xrad,yrad,xc,yc

c
c       set up all overlay colors
c
        do 100 i = 1,16
            ltypov(i) = 152
100     continue
        CLAT=(IDLA*60+IMLA)*CM2RAD
        IF(NSI.EQ.'S') CLAT=-CLAT
        CLON=(IDLO*60+IMLO)*CM2RAD
```

```
      IF(EWI.EQ.'W') CLON=-CLON
      filenm = name(1:lennam) // '.prm'
      call openit (filenm,lennam+4,ifl,irdwr,ierror)
      if (ierror.ne.0) then
c         print*,'Error on open - using default'
          call openit ('default.prm',11,ifl,irdwr,ierror)
          if (ierror.ne.0) go to 150
      endif
      call readin (ifl,jversn,1,ierror)
      if (ierror.ne.0) then
c         print*,'rparam -- 1 ',jversn
          go to 150
      endif
      if(iversn.ne.jversn) then
c         print*,'using default ',iversn,jversn
          call openit ('default.prm',11,ifl,irdwr,ierror)
          if (ierror.ne.0) go to 150
          call readin (ifl,jversn,1,ierror)
          if (ierror.ne.0) go to 150
          if(jversn.ne.iversn) go to 150
      endif
      call readre (ifl,retabl,4,ierror)
      if (ierror.eq.0) then
          dxc = retabl(1)
          dyc = retabl(2)
          dxrad = retabl(3)
          dyrad = retabl(4)
      else
c         print*,'rparam -- 2 ',retabl
      endif
      call readre (ifl,retabl,4,ierror)
      if (ierror.eq.0) then
          xrnm = retabl(1)
          clat = retabl(2)
          clon = retabl(3)
          orhalt = retabl(4)
c         print*,'OMSGS - ',retabl,xrnm
      else
c         print*,'rparam -- 3 ',retabl
      endif
      call readin (ifl,intabl,7,ierror)
      if (ierror.eq.0) then
          do 120 i=1,4
              ipgrid(i) = intabl(i)
 120      continue
          level = intabl(5)
          itproj = intabl(6)
          ires = intabl(7)
      else
c         print*,'rparam -- 4 ',intabl
      endif
c     print*,'Rparam -- ready to read logicals'
      call readch (ifl,chastr,lenx,ierror)
c     if (ierror.ne.0) print*,'rparam ',ierror,chastr
      call asclog(lton,16,chastr(1:16))
      call asclog(dotem,1,chastr(17:17))
      call readch (ifl,curwdb,lenwdb,ierror)
c     if (ierror.ne.0) print*,'rparam ',ierror,chastr
      call readch (ifl,classi,lencla,ierror)
c     if (ierror.ne.0) print*,'rparam ',ierror,chastr
c     print*,'After read of text'
      call readch (ifl,chastr,lenx,ierror)
c     if (ierror.ne.0) print*,'rparam ',ierror,chastr
      call asclog(overtb,16,chastr)
      filply = overtb(5)
      call readch (ifl,ovfnam,lenovf,ierror)
c     if (ierror.ne.0) print*,'rparam ',ierror,chastr
      if (ierror.ne.0.or.lenovf.le.0) then
          lenovf = 11
          ovfnam(1:lenovf) = 'overlay.dat'
      endif
c
```

```
c       Set default std parallel and tilt for old files and non conics.
        splll = clat
        spll2 = clat
        tilt = 0.0
        az = tilt
        azlat = 0.0
c
c       Read the record containing conic standard parallels and tilt.
        call readre (ifl,retabl,3,ierror)
        if (ierror.eq.0) then
c          Replace defaults for Lambert,Albers,Kavrasky,Oblique Mercator.
           if ((itproj.eq.8).or.(itproj.eq.9).or.(itproj.eq.12).or.
     +        (itproj.eq.14)) then
              splll = retabl(1)
              spll2 = retabl(2)
              tilt = retabl(3)
              az = tilt
           endif
c          Override EOF error we may have got from reading an old files.
           ierror = 0
        endif
c
        go to 155
  150       continue
            ierror = 2
            print*,'Error in parameter file'
c           call derror(30,'Problem reading parameter file',.true.,5,ch)
  155   continue
        call closit (ifl)
c       print*,'Ready to call chawdb',curwdb
        call chawdb (6,curwdb)
        if (overtb(9)) inpdev = 2
        CALL INITIA (XC,YC,CLAt,CLOn,XRAd,YRAd,ITPROj,IRES,XRNM,
     +  ORHALT)
        lev = level
        call chlevl (lev)
        if (sys)
     +  print*,'Rparam -- exit',lennam,name(1:lennam),xrad,yrad,xrnm
        return
        end

C+*+*+*+*+*+*+*+*+*+*+*+*+*+*+*+*+*+*+*+*+*+*+*+*+*+*+*+*+*+*+*+*+*|*+*+*+*+
c  UNIT NAME:                     rpaths

c  Functional Description:
c       read path names for parameter files and map data
c
c  Input Files/Parameters:

c  Output Files/Parameters: N/A

c  Subroutines/Functions Called:

c  Called By:                     FMAIN

c  Local Variables: N/A

c  Restrictions: N/A

c  Abnormal Return Conditions:  N/A

c  Location:      /a21/dave

c  Programmer         Date of Last Change       Reason for Change

C-*-*-*-*-*-*-*-*-*-*-*-*-*-*-*-*-*-*-*-*-*-*-*-*-*-*-*-*-*-*-*-*-*|*-*-*-*-

        subroutine rpaths (len,name,ierror)

c       read path names for parameter files and map data

        character*(*) name
```

```
      character*50 tmpstr
      character*50 defpth
      common /defpth/ defpth
      common /lendef/ lendef
      character*50 mapath
      common /mapath/ mapath
      common /lenmap/ lenmap
      character*50 menpth
      common /menpth/ menpth
      common /lenmen/ lenmen
      character*80 idebug
      common /idebug/ idebug
      data ifl/9/,irdwr/0/

      call openit (name,len,ifl,irdwr,ierror)
      call readch (ifl,tmpstr,lentmp,ierror)
      if (ierror.eq.0) then
          lendef = lentmp
          defpth = tmpstr
      else
          print*,'Default path not provided, using ',
     +    defpth(1:lendef),'.'
      endif
      call readch (ifl,tmpstr,lentmp,ierror)
      if (ierror.eq.0) then
          lenmap = lentmp
          mapath = tmpstr
      else
          print*,'Map data path not provided, using ',
     +    mapath(1:lenmap),'.'
      endif
      call readch (ifl,tmpstr,lentmp,ierror)
      if (ierror.eq.0) then
          idebug = tmpstr
      else
          idebug = ' '
      endif
      call readch (ifl,tmpstr,lentmp,ierror)
      if (ierror.eq.0) then
          lenmen = lentmp
          menpth = tmpstr
      else
          lenmen = lendef
          menpth = defpth
      endif
      call closit (ifl)
      if (index(idebug,'sys').ne.0)
     + print*,'rpaths -- ',lendef,'  ',defpth(1:lendef),lenmap,
     + '  ',mapath(1:lenmap)

      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   RPLSCN
C
C FUNCTIONAL DESCRIPTION:      RETURNS PICTURE BACK TO ORIGINAL
C                              VIEWPORT
C
C INPUT FILES/PARAMETERS:      NONE
C
C                    COMMON
C     VARIABLE       BLOCK         TYPE        DESCRIPTION
C
C      SXLLGP        SAVGVP        REAL     LOWER LEFT X OF ORIGINAL VIEWPORT
C      SYLLGP        SAVGVP        REAL     LOWER LEFT Y OF ORIGINAL VIEWPORT
C      SXURGP        SAVGVP        REAL     UPPER RIGHT X OF ORIGINAL VIEWPORT
C      SYURGP        SAVGVP        REAL     UPPER RIGHT Y OF ORIGINAL VIEWPORT
C      SAVMNU        SAVMNU        INTEGER  MENU NUMBER OF CURRENT MESSAGE
C                                           BEFORE SCREEN WAS ENLARGED
C      NSGFUL        ARSEG         INTEGER  SEGMENT NUMBER OF FULL SCREEN
C                                           BORDER
```

```
C      NSGMEN         ARSEG          INTEGER  SEGMENT NUMBER OF MENU BLOCK
C      NSGGRA         ARSEG          INTEGER  SEGMENT NUMBER OF GRAPHICS BLOCK
C      NSGSYS         ARSEG          INTEGER  SEGMENT NUMBER OF COMMUNICATIONS
C                                             BORDER
C      NSGKEY         NSGKEY         INTEGER  SEGMENT NUMBER OF FUNCTION KEY
C                                             BOX
C      NSGKTX         NSGKEY         INTEGER  SEGMENT NUMBER OF FUNCTION KEY
C                                             DESCRIPTION
C
C OUTPUT FILES/PARAMETERS:      NONE
C
C                             COMMON
C     VARIABLE                BLOCK          TYPE        DESCRIPTION
C
C      XLLGVP         COMGVP         REAL     LOWER LEFT X OF ORIGINAL VIEWPORT
C      YLLGVP         COMGVP         REAL     LOWER LEFT Y OF ORIGINAL VIEWPORT
C      XURGVP         COMGVP         REAL     UPPER RIGHT X OF ORIGINAL VIEWPORT
C      YURGVP         COMGVP         REAL     UPPER RIGHT Y OF ORIGINAL VIEWPORT
C
C SUBROUTINES/FUNCTIONS CALLED
C
C     INIPIC        INITIALIZE VARIABLES FOR DRAWING NEW PICTURE
C     DRAWM         DRAWS THE CURRENT MENU
C     JVISBL        DI-3000 ROUTINE TO  MAKE A SEGMENT VISIBLE OR INVISIBLE
C     MESG          INFORMS USER WITH A MESSAGE IN COMMUNICATION AREA
C     HLDF          RETRIEVES FILE FOR EDITTING (CURRENT PICTURE)
C
C CALLED BY:                  PRINTR
C
C LOCAL VARIABLES:
C
C     VARIABLE                  TYPE       DESCRIPTION
C
C      LOG                    LOGICAL      FLAG SET BY HLDF (NOT NEEDED)
C      IERROR                 INTEGER      STATUS SET BY DRAWM (NOT NEEDED)
C
C RESTRICTIONS:
C
C
C ABNORMAL RETURN CONDITIONS:   N/A
C
C
C PROGRAMMER:                   DATE OF LAST CHANGE     REASON FOR CHANGE
C
C     DABUTSON                     11/13/84              INITIAL ENTRY
C
C-*-*-*-*-*-*-*-*-*-*-*-*-*-*-*-*-*-*-*-*-*-*-*-*-*-*-*-*-*-*-*-*-*-*-*-*-*|*-*-*-*-
C
      SUBROUTINE RPLSCN
C
C REPLACE MAP BACK TO ORIGINAL SIZE
C
      COMMON /COMGVP/ XLLGVP,YLLGVP,XURGVP,YURGVP
      COMMON /SAVGVP/ SXLLGP,SYLLGP,SXURGP,SYURGP
      COMMON /ASPECT/ XASPEC,YASPEC,XVLOW,XVHIGH,YVLOW,YVHIGH
      COMMON /ARSEGS/ NSGMEN,NSGGRA,NSGSYS,NSGMSG,NSGMAP,NSGFUL

      COMMON/SEGNUM/QSEGNM
      INTEGER     QSEGNM

      COMMON /QPRINT/QPRINT
      LOGICAL QPRINT

      COMMON/CHANGE/QCHANG
      LOGICAL       QCHANG

      COMMON /SAVMNU/ SAVMNU
      INTEGER SAVMNU

      COMMON /NSGKEY/ NSGKEY,NSGKTX
      COMMON/FLNAME/QNAME,qdscrp
      CHARACTER *50 QNAME
      character*60 qdscrp
```

```
      INTEGER IERROR
      LOGICAL LOG
      LOGICAL QLTON(16),QDOTEM
      INTEGER QPGRID(4),QTYPTB(16)
      INTEGER QLEVEL,QITPRO,QIRES,QLUNDA,QLUNIN,QLUNLI
      COMMON /MAP/ QXRNM,QXC,QYC,QLEVEL,QCLAT,QCLON,QXRAD,QYRAD,
     +      QITPRO,
     +      QIRES,QTYPTB,QLUNDA,QLUNIN,QLUNLI,QLTON,QPGRID,QDOTEM,
     +      QORHAL

      common/typtmp/typtmp
      integer typtmp(16)
      common/oneflg/oneflg
      logical oneflg
      common/contrl/qclass
      logical       qclass
      logical       tmpcls

      tmpcls=qclass
      call eramap
      qclass=tmpcls
C
C ---- SET VIEWPORT BACK TO ORIGINAL VALUES
C
      XLLGVP = SXLLGP
      YLLGVP = SYLLGP
      XURGVP = SXURGP
      YURGVP = SYURGP
C
C ---- RESET ALL NEEDED VARIABLES FOR A PICTURE
C
      ONEFLG = .FALSE.
C
C ---- REDRAW ORIGINAL MENU TURN ON ALL BOXES SURROUNDING EACH
C      AREA
C
      CALL DRAWM(SAVMNU,IERROR)
      CALL JVISBL(NSGFUL,0)
clj - Charlie added the following line to erase
clj - any filled areas which did not disappear
clj - with the call to inipic.
      call redraw
      CALL JVISBL(NSGMEN,1)
      CALL JVISBL(NSGGRA,1)
      CALL JVISBL(NSGSYS,1)
      CALL JVISBL(NSGKEY,1)
      CALL JVISBL(NSGKTX,1)
      CALL MESG(574)
C
C ---- REDRAW HLDF
C
      CALL HLDF(2,18,1,1,LOG)
clj -------
      call dspfln ( qname )
clj -------
      RETURN
      END

C+*+*+*+*+*+*+*+*+*+*+*+*+*+*+*+*+*+*+*+*+*+*+*+*+*+*+*+*+*+*+*+*+*|*+*+*+*+
c  UNIT NAME:                         rsavpr
c
c  Functional Description:
c       read save file parameters
c
c  Input Files/Parameters:
c
c  Output Files/Parameters: N/A
c
c  Subroutines/Functions Called:
c
c  Called By:                         FMAIN
c
c  Local Variables: N/A
```

```
c
c  Restrictions: N/A
c
c  Abnormal Return Conditions:  N/A
c
c  Location:      /a21/dave
c
c  Programmer         Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine rsavpr (len,name)

c       read save file parameters

        character*(*) name
        character*80 savdes(20),filenm
        common /savdes/ savdes
        common /maxsav/ maxsav,limsav
        data ifl/9/,irdwr/0/

        filenm = name(1:len) // '.des'
        call openit (filenm,len+4,ifl,irdwr,ierror)
        if (ierror.ne.0) then
            print*,'Error on save descriptor open - trying default'
            call openit ('default.des',11,ifl,irdwr,ierror)
            if (ierror.ne.0) go to 150
        endif
        call readin (ifl,maxsav,1,ierror)
        if (ierror.ne.0) go to 150
        if (maxsav.gt.limsav) maxsav = limsav
        if (maxsav.lt.0) maxsav = 0
        if (maxsav.gt.0) then
            do 110 i=1,maxsav
                call readch (ifl,savdes(i),lenx,ierror)
                if (ierror.ne.0) go to 150
  110       continue
        endif
  150   continue
        call closit (ifl)

        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      ARCOS
C
C FUNCTIONAL DESCRIPTION:         .
C
C CALLED BY:                      BPE, CONFID
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine arcos (c)
c
c     Dan L. Pratt replaced the IBM arcos, arsin calls with these routines
c     on 16 May 1981 for use on UNIX systems without the functions.
c
        real c
        real*4 x
        real*4 pi
        x   = c
        pi  = 4.0 * atan(1.0)
        pi  = 3.14159
c
        if (c .eq. 0.0) x = pi/2.
        if (c .lt. 0.0) x = atan(sqrt(1.0 - x*x)/x) + pi
        if (c .gt. 0.0) x = atan(sqrt(1.0 - x*x)/x)
        c = x
        return
        end
```

```
C+*+*+*+*+*+*+*+*+*+*+*+*+*+*+*+*+*+*+*+*+*+*+*+*+*+*+*+*+*+*+*+*+*+*|*+*+*+*+
C UNIT NAME:                    ARSIN
C
C FUNCTIONAL DESCRIPTION:       .
C
C CALLED BY:                    CONFID
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        subroutine arsin (c)
c
        real c
        real*4 x, y, z
        real*4 neg
        real*4 pi
        x   = c
        pi  = 4.0 * atan(1.0)
        pi  = 3.14159
        neg = 1.0
c
        if (x .lt. 0.0) then
             x = -x
             neg = -1.0

        end if
c
        z = 1.0 - x*x
        if (z .eq. 0.0) return
        y = sqrt(1.0/z)
        x = neg * atan(x * y)
        if (x .eq. 1.0) then
             x = neg * pi/2.
        end if
        c = x
        return
        end


C+*+*+*+*+*+*+*+*+*+*+*+*+*+*+*+*+*+*+*+*+*+*+*+*+*+*+*+*+*+*+*+*+*+*|*+*+*+*+
C UNIT NAME:                    BPE
C
C FUNCTIONAL DESCRIPTION:       .
C
C CALLED BY:                    EXH, SEQ
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

       subroutine bpe(iter)
c
       real nxsx(50),nxsy(50),nxsz(50)
       real invar(50)
       integer save(50)
       common nbr,k,ires,nst,wbrf,invar,cost(999),
     1 ista(50),sing(999),cosg(999),stax(999),stay(999),staz(999),
     2 brnx(50),brny(50),brnz(50),il(50),save,swt(50),
     3 nxsx,nxsy,nxsz,wt(50),c11,c22,c33,c13,c12,c23,
     4 tlat,tlon,sma,smi,orien,area,tx,ty,tz,e1,e2,e3,chisq(30),dtr
c
c
      do 100 kk=1,iter
          c11= 0.
          c22= 0.
          c33= 0.
          c12= 0.
          c13= 0.
          c23= 0.
          do 6 i = 1, k
              j = il(i)
              c11 = c11 + wt(j) * brnx(j)**2
              c22 = c22 + wt(j) * brny(j)**2
```

```
            c33 = c33 + wt(j) * brnz(j)**2
            c12 = c12 + wt(j) * brnx(j) * brny(j)
            c13 = c13 + wt(j) * brnx(j) * brnz(j)
            c23 = c23 + wt(j) * brny(j) * brnz(j)
    6     continue
c
ccccc
          call eigen(c11,c22,c33,c12,c13,c23,e1,e2,e3,tx,ty,tz)
c
c         need antipode?
c
          ict = 0
          do 10 i = 1, k
              j = il(i)
              if (0. .le. tx*nxsx(j)+ty*nxsy(j)+tz*nxsz(j)) ict = ict+1
   10     continue
          if (k .le. 2*ict) go to 11
          tx = -tx
          ty = -ty
          tz = -tz
   11     continue
c
c
          do 20 i= 1,k
              j = il(i)
              l = ista(j)
              tdots = tx*stax(l) + ty*stay(l) + tz*staz(l)
              if (tdots .gt.  .99999) tdots =  .99999
              if (tdots .lt. -.99999) tdots = -.99999
c
c             insert range weighting function here
c
              tdots1 = tdots
              call arcos(tdots1)
c
              rge   = 34.44 * tdots1
              if (rge .lt. 10.) go to 137
              rfn   = .285714 + rge * .0714256
              go to 138
  137         rfn   = 3. - rge * (.402 - rge * .0204)
  138         wt(j) = invar(j) / (rfn**2 * (1. - tdots**2))
   20     continue
c
c
  100 continue
      wbrf = e1
      if (k .eq. ict) return
      if (0 .eq. ict) return
      wbrf = 1000.
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        CNVRT
C
C FUNCTIONAL DESCRIPTION:           .
C
C CALLED BY:                        DOFIX
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine cnvrt(degr, ideg, imin, isec, idir,
     1                 degr2, jdeg, jmin, jsec, jdir)
c
      character in,ie,iw,is,idir,jdir
      data in,ie,iw,is /'n','e','w','s'/
      deg  = abs(degr)
      ideg = deg
      imin = (deg - ideg) * 60.
```

```
      isec = (deg - ideg - float(imin)/60.)*3600.
      if (degr .lt. 0.) go to 1
      idir = in
      go to 2
    1 idir = is
    2 deg  = abs(degr2)
      jdeg = deg
      jmin = (deg -jdeg) * 60.
      jsec = (deg -jdeg - float(jmin)/60.) * 3600.
      if (degr2 .lt. 0) go to 4
      jdir = iw
      go to 3
    4 jdir = ie
    3 return
      end

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    CONFID
C
C FUNCTIONAL DESCRIPTION:       .
C
C CALLED BY:                    EXH, SEQ
C
C PROGRAMMER:                   DATE OF LAST CHANGE    REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine confid
c
      real nxsx(50),nxsy(50),nxsz(50)
      real invar(50)
      integer save(50)
      common nbr,k,ires,nst,wbrf,invar,cost(999),
     1 ista(50),sing(999),cosg(999),stax(999),stay(999),staz(999),
     2 brnx(50),brny(50),brnz(50),il(50),save,swt(50),
     3 nxsx,nxsy,nxsz,wt(50),c11,c22,c33,c13,c12,c23,
     4 tlat,tlon,sma,smi,orien,area,tx,ty,tz,e1,e2,e3,chisq(30),dtr
c
      real*4 pi
c     fact = earth radius * sqrt(-2 ln (1-p))
      pi  = 4.0 * atan(1.0)
      pi = 3.14159
      data fact /7384./
c
      tlat = tz
      call arsin(tlat)
      tlat = tlat/dtr
      if (abs(tx) .le. 1.e-6) go to 10
      tlon = atan (ty/tx)/dtr
      if (tx .le. 0.)     tlon = tlon + 180.
      if (tlon .gt. 180.) tlon = tlon - 360.
      go to 15
10    tlon = 90.
      if (ty .le. 0.) tlon = -90.
   15 continue
      c11 = 0.
      c22 = 0.
      c33 = 0.
      c12 = 0.
      c13 = 0.
      c23 = 0.
      do 30 i=1,k
ccccc     j = ista(il(i))
          itemp = il(i)
          j   = ista(itemp)
          bx  = stay(j) * tz - staz(j) * ty
          by  = staz(j) * tx - stax(j) * tz
          bz  = stax(j) * ty - stay(j) * tx
ccccc     cof = wt(il(i))/(bx**2 + by**2 + bz**2)
          cof = wt(itemp)/(bx**2 + by**2 + bz**2)
          c11 = c11 + cof * bx**2
          c22 = c22 + cof * by**2
```

```
        c33 = c33 + cof * bz**2
        c12 = c12 + cof * bx * by
        c13 = c13 + cof * bx * bz
        c23 = c23 + cof * by * bz
   30 continue
      b = (c11 + c22 + c33)/2.
      c = c11 * (c22 + c33) + c22 * c33 - (c12**2 + c13**2 + c23**2)
      d = sqrt(b**2 - c)
      e2 = b - d
      e3 = b + d
      sma = fact/sqrt(e2)
      smi = fact/sqrt(e3)
c
      call evect(e2,c11,c22,c33,c12,c13,c23,x,y,z)
c
      if ((x * ty - y * tx) .gt. 0.) z = -z
      temp = z/sqrt(1. - tz**2)
      if (1. .ge. abs(temp)) go to 20
      orien = 0.
      go to 22
   20 continue
      call arcos(temp)
      orien = temp/dtr
   22 continue
      area = pi * sma * smi
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    DERROR
C
C FUNCTIONAL DESCRIPTION:       .
C
C CALLED BY:                    GETBRG, WRITER
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine derror

        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    DOFIX
C
C FUNCTIONAL DESCRIPTION:       .
C
C CALLED BY:                    PROCDF
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

c       FFIX software
c
      subroutine dofix(stanam,slat,slong,sigx,inst,inbr,brgid,brg,used,
     1 bpelat,bpelon,smajor,sminor,azimth,fixed)
c
c       This version of the venerable FFIX algorithm is modified to
c       run under FORTRAN 77, and to operate from the terminal,
c       one set of bearings at a time.
c
c       Remodified by Charlie James,T3331 (May 1982)
c       8/8/83 added fixed parameter D. Nation, R531
c
      integer fixed
      real nxsx(50),nxsy(50),nxsz(50)
      real invar(50),slat(999),slong(999),sigx(999),brg(30)
      integer save(50)
      logical used(30)
```

```
      character*2 stname(30),stanam(999),brgid(30)
      common nbr,k,ires,nst,wbrf,invar,cost(999),
     1 ista(50),sing(999),cosg(999),stax(999),stay(999),staz(999),
     2 brnx(50),brny(50),brnz(50),il(50),save,swt(50),
     3 nxsx,nxsy,nxsz,wt(50),c11,c22,c33,c13,c12,c23,
     4 tlat,tlon,sma,smi,orien,area,tx,ty,tz,e1,e2,e3,chisq(30),dtr
c
c       nbr     number of bearings in a DF flash set
c               this modified routine limits nbr to 50 (or less?)
c       k       number of bearings used in a fix (of set "nbr")
c       ires
c       nst     total number of DF stations in existence
c       wrbf
c       sname   DF station names (digraphs: see /u4/aea/appl/df/df.sites)
c       stname  DF station names (as read from the file "bearings")
c       invar   station location values?
c       cost    cos stn lat
c       ista    station nr from which df was taken
c       sing    sin stn lon
c       cosg    cos stn lon
c       stax    cost * cosg (cos stn lat * cos stn lon)
c       stay    cost * sing (cos stn lat * sin stn lon)
c       staz    sin stn lat
c       sigx    fudge factor (sigma?) assigned each DF station
c       brnx    cos brg * sin stn lon - sin brg * sin stn lat * cos stn lon
c       brny   -cos brg * cos stn lon - sin brg * sin stn lat * sin stn lon
c       brnz    sin brg * cos stn lat
c       il      ordinal nr of DF bearing in any series of bearings
c       save    (relates to save - those df bearings used?
c       swt
c       nxsx    brny * sin stn lat - brnz * cos stn lat * sin stn lon
c       nxsy    brnz * cos stn lat * cos stn lon - brnx * sin stn lat
c       nxsz    brnx * cos stn lat * sin stn lon - brny * cos stn lat *
c                                    cos stn lon
c       wt      weight assigned to each bearing
c       c11
c       c22
c       c33
c       c12
c       c13
c       c23
c       tlat    latitude from sub CONFID
c       tlon    longitude from sub CONFID
c       sma     semi-major axis (ellipse of confidence = eoc)
c       smi     semi-minor axis "eoc"
c       orien   orientation of "eoc"
c       area    area of "eoc"
c       tz
c       ty
c       tz
c       e1
c       e2
c       e3
c       chisq
c       dtr     .01745329 conversion factor degrees to radians
c
c
c
      real*4 pi
c     dimension sigx(50)
      dimension sint(50)
      dimension xhisq(30)
      equivalence (sint(1),staz(1))
      character unused, yesu, nofix, lat, lon
c     character*2 brgid
      data  unused/'u'/
      data    yesu/'y'/
      data   nofix/'n'/
c             Table of 20 % values
c
       data xhisq/1.642,3.219, 4.642, 5.989, 7.289, 8.558, 9.803,
     1   11.030,12.242,13.442,14.631,15.812,16.985,18.151,19.311,
     2   20.465,21.615,22.760,23.900,25.038,26.171,27.301,28.429,
```

```
     3    29.553,30.675,31.795,32.912,34.027,35.139,36.250/
c
      nst = inst
      nbr = inbr

      pi  = 4.0 * atan(1.0)
      pi = 3.14159
      dtr = .01745329
c
c       iflsh is the numerical set number of a single flash series.
c
      iflsh = 0
      do 101 ii = 1, 30
          chisq(ii) = xhisq(ii)
101   continue
c
c       first get the number of stations;
c       access the data and build values
c
c
      do 20 i = 1, nst
c
c              calculate inverse station variance here
c
          cosg(i) = cos(slong(i))
          sing(i) = sin(slong(i))
          cost(i) = cos(slat(i))
          staz(i) = sin(slat(i))
          stax(i) = cost(i) * cosg(i)
          stay(i) = cost(i) * sing(i)
   20 continue
c
      iflsh = iflsh + 1
c
c       This is now flash sequence number "iflsh", which has "nbr"
c       bearings in it.
c
      do 40 j = 1, nbr
          if (nbr .le. 0) go to 975
c
c         read the DF station ID, and the bearing from that station
c
          stname(j) = brgid(j)

          brg(j)  = brg(j) * dtr
c
          do 38 i = 1, nst
c             validate the site name (digraph)
              if (brgid(j) .eq. stanam(i)) go to 39
   38     continue
c
c
c       bearing nr. "j" taken from station "i"
c
39        continue
c
c        ... bearing number j came from station number i ...
          ista(j) = i
c
c       ... the invariance of bearing is a function of the station ...
          invar(j) =  1./(dtr * sigx(i))**2
c
          cbrg    = cos(brg(j))
          sbrg    = sin(brg(j))
c
c         bearing plane normal vector
c
c            cos brg * sin stn lon - sin brg * sin stn lat * cos stn lon
          brnx(j) = cbrg * sing(i) - sbrg * sint(i) * cosg(i)
c
c           -cos brg * cos stn lon - sin brg * sin stn lat * sin stn lon
          brny(j) =-cbrg * cosg(i) - sbrg * sint(i) * sing(i)
c
```

```
c          sin brg * cos stn lat
         brnz(j) = sbrg * cost(i)
c
c          brny * sin stn lat - brnz * cos stn lat * sin stn lon
         nxsx(j) = brny(j) * staz(i) - brnz(j) * stay(i)
c
c          brnz * cos stn lat * cos stn lon - brnx * sin stn lat
         nxsy(j) = brnz(j) * stax(i) - brnx(j) * staz(i)
c
c          brnx * cos stn lat * sin stn lon - brny * cos stn lat * cos stn
         nxsz(j) = brnx(j) * stay(i) - brny(j) * stax(i)
c
   40    continue
c
c     do an exhaustive test if few bearings
c
      if (nbr .le. 10) go to 50
      call seq
      go to 60
c
   50 k = nbr
      call exh

c
60    continue
      if (ires .ne. 1)  go to 800
      if (sma .gt. 999) go to 800
      nrej   = nbr - k
      tlon   = -tlon
      ratio  = smi/sma
      radius = sma * (.29294*(ratio**2)-.063163*ratio+.76996)
c
c     tlat, tlon, lat and lon are returned from subr CONFID
c     convert to integer and print ...
c
      call cnvrt(tlat,lado,lamo,laso,lat,tlon,lodo,lomo,loso,lon)
c
      bpelat = lado + (lamo + laso/60.)/60.
      bpelon = lodo + (lomo + loso/60.)/60.
      bpelat = bpelat * dtr
      bpelon = bpelon * dtr
      if(.not.(lat .eq. 's')) go to 62
         bpelat = -bpelat
   62 continue
      if(.not.(lon .eq. 'w')) go to 64
         bpelon = -bpelon
   64 continue
      smajor = sma
      sminor = smi
      azimth = orien

      j = 1
      do 81 i=1,nbr
c        if (i.ne.1) go to 80
c        write (3,341) iflsh
c 341    format (/,/,'NBR: ',i3).
c  80    continue
         if (i.eq.il(j)) go to 82
c        write (3,342) i,stname(i)
c 342    format (1x,'Did not use bearing ',i3,' from station ',a2)
         used(i) = .false.
         go to 81
   82    continue
c        write (3,343) i,stname(i)
c 343    format (1x,'Used bearing ',i3,' from station ',a2)
         used(i) = .true.
         j = j + 1
         if (j .gt. k) go to 84
   81 continue
      go to 975
   84 continue
      i = i + 1
      if (i .gt. nbr) go to 975
      do 85 j=i,nbr
```

```
c        write (3,342) j,stname(j)
         used(j) = .false.
   85 continue
      go to 975
c
  800 ires = 2
c     WILL SET THE NO-FIX FLAG HERE
c
975   continue

      fixed = ires

      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    EIGEN
C
C FUNCTIONAL DESCRIPTION:       .
C
C CALLED BY:                    BPE
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine eigen(d11,d22,d33,d12,d13,d23,e1,e2,e3,tx,ty,tz)
c
      c11 = d11
      c22 = d22
      c33 = d33
      c12 = d12
      c13 = d13
      c23 = d23
c
      b = c11 + c22 + c33
      c = c11 *(c22 + c33) + c22  * c33 - (c12**2 + c23**2 + c13**2)
      a = c12/c11
      d = c11 *(c22 - c12*a) * (c33 - c13*c13/c11 - ((c23 - c13*a)**2)
     1        /(c22 - c12*a))
      if (d .gt. 0.) go to 13
      e1 = 0.
      return
c
   13 continue
      x = 0.
c
c       What's going on here?  the first time, anyway??
c
      do 10 i = 1, 10
          fx = x**3 - b*x**2  + c*x - d
          fp = 3*x**2 - 2*b*x + c
          xn = x - fx/fp
          if (xn .eq. 0.) go to 12
          if (abs((xn-x)/xn) .lt. .0001) go to 12
          x = xn
   10 continue
c
c
   12 e1 = xn
      call evect(e1,d11,d22,d33,d12,d13,d23,tx,ty,tz)
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    EVECT
C
C FUNCTIONAL DESCRIPTION:       .
C
C CALLED BY:                    CONFID, EIGEN
C
```

```
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine evect(el,c11,c22,c33,c12,c13,c23,tx,ty,tz)
c
      d1 = (c11 - el) * (c22 - el) - c12**2
      if (abs(d1) .le. .0001) go to 10
      x = c13 * (el - c22) + c12 * c23
      y = (el - c11) * c23 + c13 * c12
      z = d1
      go to 50
   10 d2 = (c11 - el) * (c33 - el) - c13**2
      if (abs(d2) .le. .0001) go to 20
      x = (el - c33) * c12 + c13 * c23
      y = d2
      z = (el - c11) * c23 + c13 * c12
      go to 50
   20 x = (c22  - el) * (c33 - el) - c23**2
      y = (el - c33) * c12 + c23 * c13
      z = (el - c22) * c13 + c23 * c12
   50 temp = sqrt(x**2 + y**2 + z**2)
      tx = x/temp
      ty = y/temp
      tz = z/temp
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      EXH
C
C FUNCTIONAL DESCRIPTION:         .
C
C CALLED BY:                      DOFIX
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine exh
c
c       SUBROUTINE EXH - EXHAUSTIVE
c
      real nxsx(50),nxsy(50),nxsz(50)
      real invar(50)
      integer save(50)
      common nbr,k,ires,nst,wbrf,invar,cost(999),
     1 ista(50),sing(999),cosg(999),stax(999),stay(999),staz(999),
     2 brnx(50),brny(50),brnz(50),il(50),save,swt(50),
     3 nxsx,nxsy,nxsz,wt(50),c11,c22,c33,c13,c12,c23,
     4 tlat,tlon,sma,smi,orien,area,tx,ty,tz,e1,e2,e3,chisq(30),dtr
c
      dimension klim(10)
      data klim/3, 3, 3, 3, 3, 3, 4, 4, 5, 5/
   10 continue

      do 15 i = 1, k
          il(i) = i
   15 continue
      rej = 1000.
c
c     is station unique?
c
20    continue
      itemp = il(1)
      is = ista(itemp)
ccccc is = ista(il(1))
c
      do 21 i = 2,k
ccccc      if(is .ne. ista(il(i))) go to 25
           itemp = il(i)
           if (is .ne. ista(itemp)) go to 25
```

```
   21 continue
      go to 40
c
c     set initial weights and call bpe
   25 continue
      do 26 i=1,k
           itemp = il(i)
           wt(itemp) = invar(itemp)
ccccc      wt(il(i)) = invar(il(i))
   26 continue
      call bpe(2)
cccc  is bearing set better than previous best?
  800 continue
      if (wbrf .ge. rej) go to 40
c     save this case
      do 30 i = 1, k
          itemp      = il(i)
          save(i)    = itemp
          swt(itemp) = wt(itemp)
ccccc     swt(il(i)) = wt(il(i))
   30 continue
      rej = wbrf
c     find next combination
c
   40 i = k
c
c     (Do While, check after doing...)
c
   41 continue
      if (il(i) .lt. nbr - k + i) go to 45
      if (i .le. 1) go to 50
      i = i - 1
      go to 41
c
   45 j = i
c
   46 continue
      il(i) = il(j) + 1
      if (i .ge. k) go to 20
      j = i
      i = i + 1
      go to 46
c
c     all combinations complete
c
   50 wbrf = rej
      if (wbrf .lt. chisq(k-2)) go to 60
c c
c     try smaller k
c
      if (k .le. klim(nbr)) go to 90
      k = k - 1
      go to 10
c
c     output results
c
   60 continue
c
      do 61 i = 1, k
           itemp = save(i)
           il(i) = itemp
           wt(itemp)   = swt(itemp)
ccccc      wt(il(i))   = swt(il(i))
   61 continue
c
      call bpe(1)
      ires = 1
      call confid
      go to 999
c
   90 ires = 2
999   continue
      return
      end
```

```
C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     FDFPRO
C
C FUNCTIONAL DESCRIPTION:        .
C
C CALLED BY:                     GEOCON
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine fdfpro

c       process/display df menu function

        character * 80 retstr
        real parms(4)
        logical qmapup
        common /mapup/qmapup
c       map parameters
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        dimension ltypov(16)
        logical ltonov(16),rankt(26,16)
        common /maptoo/ ltypov,ltonov,rankt

        data lcdf/22/

c       print*,'enter fdfpro'
        irchar = 25
        call prompt(1208,retstr,25,irchar)
        if (irchar.gt.0) then
            call mesg (1209)
            ierror = 0
            call procdf (irchar,retstr,ierror)
            if(ierror .eq. 0) then
                ltonov(lcdf-20) = .true.
                if ( .not. qmapup)  then
                    call procov (parms,ierror,'df.dat',6)
                    if (ierror.eq.0) then
c
c***                        calculate map parmameters
c***                        then draw map and df overlays
c
                        call calmap (parms)
                        call drwmap
                    else
                        call mesg (1211)
                        call paws
                    endif
                else
                    call mesg (1210)
                    call drawf(lcdf)
                endif
            else
                call mesg(1211)
                call paws
            endif .
        endif
        return
        end

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     GETBRG
C
C FUNCTIONAL DESCRIPTION:        .
C
C CALLED BY:                     PROCDF
```

```
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine getbrg(extflg,lunit)

c     This subroutine reads a set of bearings.  It uses the
c     bearing ID (a digraph) to get the latitude and longitude
c     from the site table.

c     "nst" is the number of stations (sites)
      common /sytdat/ slat(999),slong(999),sigx(999),nst
      character*2 sname
      common /snam/ sname(999)

c     "nbr" is the number of bearings in this set
      logical used
      common /brguse/ used(30)
      common /brgdat/ brglat(30),brglon(30),brg(30),nbr
      character*2 brgid(30)
      common /brgid/ brgid
      character*2 waste
      character*1 ch

      logical extflg,found,pause

      extflg = .true.

c ----- The following statement is the target of the abnormal
c ----- exit caused by finding an illegal bearing ID.

   10 continue
      read (lunit,20,end=300,err=300) nbr
   20 format (1x,i3)

      if (nbr.le.0) go to 300

      do 200 i=1,nbr
         read (lunit,50,end=300,err=300) brgid(i),brg(i)
   50    format (1x,a2,f5.1)
         found = .false.
         do 100 j=1,nst
            if (brgid(i).eq.sname(j)) then
               brglat(i) = slat(j)
               brglon(i) = slong(j)
               found = .true.
c --------------- ABNORMAL EXIT FROM DO-LOOP
               go to 150
            endif
  100    continue
  150    continue

         if(.not.(found)) then
c           Read rest of bearings for this set.
            do 180 k=i+1,nbr
               read (lunit,170,end=300,err=300) waste
  170          format (a2)
  180       continue
            extflg = .true.
            pause = .true.
            call derror (18,'ILLEGAL BEARING ID',pause,idelay,ch)
c ----------- ABNORMAL EXIT FROM DO-LOOP
            go to 10
         endif

  200 continue
      extflg = .false.

  300 continue

      return
      end
```

```
C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    GETSYT
C
C FUNCTIONAL DESCRIPTION:       .
C
C CALLED BY:                    PROCDF
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine getsyt(filnam,last,iunit)

c       This subroutine reads the site file, converts site locations
c       to radians, and stores the values in a table of the common
c       area.
c
c       "nst" is the number of stations (sites)
        common /sytdat/ slat(999),slong(999),sigx(999),nst
        character*2 sname
        common /snam/ sname(999)

        character*50 filnam
        character nsind
        character ewind
        data dtr/.01745329/

        open (unit=iunit,file=filnam(1:last),status='old',err=200)
        rewind (iunit)

        read (iunit,20) nst
   20   format (i3)
        do 100 i=1,nst
           read (iunit,40) sname(i),lad,lam,las,nsind,lod,lom,los,
     +                     ewind,sigx(i)
   40      format (a2,1x,i3,2i2,a1,i3,2i2,a1,f5.2)
           slat(i) = lad + (lam + las/60.)/60.
           slong(i) = lod + (lom + los/60.)/60.
           slat(i) = slat(i) * dtr
cccc       slong(i) = - slong(i) * dtr
           slong(i) = slong(i) * dtr
           if (nsind .eq. 'S' .or. nsind .eq. 's') then
               slat(i) = -slat(i)
           endif
           if (ewind .eq. 'W' .or. ewind .eq. 'w') then
               slong(i) = -slong(i)
           endif
  100   continue

        close (iunit)
        goto 300

  200   call mesg(1211)

  300   return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PROCDF
C
C FUNCTIONAL DESCRIPTION:       .
C
C CALLED BY:                    READML, FDFPRO
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine procdf (brglen,brgfil,ierror)
c
c       this subroutine processes a df bearing file
c
```

```
      character*2 sname
      common /snam/ sname(999)
      character*2 brgid(30)
      common /brgid/ brgid
      character*50 mapath
      common /mapath/ mapath
      common /lenmap/ lenmap
      character*50 defpth
      common /defpth/ defpth
      common /lendef/ lendef
      logical used
      integer ierror
      common /brguse/ used(30)
      common /brgdat/ brglat(30),brglon(30),brg(30),nbr
      common /sytdat/ slat(999),slong(999),sigx(999),nst

      logical extflg
      integer brglen
      integer sytlen
      integer fixed
      integer iunit
      integer dunit
      integer munit
c ----- brgfil = name of bearings file
      character*50 brgfil

c ----- sytfil = name of df sites file
      character*50 sytfil
      character*120 buffer

c ----- iunit = unitid for df sites file
c ----- lunit = unitid for bearings file
      data iunit /8/
      data munit /9/
      data lunit /10/
      data dunit /20/
      data irdwr/0/

      ierror = 0
      sytfil = mapath(1:lenmap) // 'df.sit'
      sytlen =  lenmap + 6
      call getsyt (sytfil,sytlen,iunit)
      open(unit=lunit,file= brgfil(1:brglen), err=253, status='old')

      extflg = .true.
      call getbrg (extflg,lunit)

   50 continue
      if (extflg) go to 200
         call dofix(sname,slat,slong,sigx,nst,nbr,brgid,brg,used,
     1   bpelat,bpelon,sma,smi,azimth,fixed)
         call writer(fixed,bpelat,bpelon,sma,smi,azimth)
         extflg = .true.
         call getbrg(extflg,lunit)
         go to 50
  200 continue
      call closit (lunit)

      open(unit=munit,file= 'df.inp', err=253, status='old')
      rewind(munit)

      open(unit=dunit,file= 'df.dat',err = 250,status='unknown')

c     ---------------------------------------------------
c     read the df data from the sent input file and
c     write the df data into df.dat file
c     ---------------------------------------------------
 125  continue
             read(munit,130,end=140,err=251) buffer
 130         format(a120)
             write(dunit,130,err=252) buffer
             goto 125
 140  continue
```

```
      call closit(dunit)
      call closit(lunit)
      call closit(munit)
c     ---------------------------------------------------------
c     move any co-located sites so that txt is readable on map
c     ---------------------------------------------------------
      call mvtext('df.dat',6)

      goto 300
250   print*,'error opening df.dat in procdf'
      ierror = 1
      goto 300
251   print*,'error reading df.inp in procdf'
      ierror = 1
      goto 300
252   print*,'error writing df.dat in procdf'
      ierror = 1
      goto 300
253   print*,'error opening df.inp in procdf'
      ierror = 1
300   continue

      return
      end

C+*+*+*+*+*+*+*+*+*+*+*+*+*+*+*+*+*+*+*+*+*+*+*+*+*+*+*+*+*+*+*+*+*|*+*+*+*+
C UNIT NAME:                    RTODI
C
C FUNCTIONAL DESCRIPTION:       .
C
C CALLED BY:                    WRITER
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*|*-*-*-*-

      integer function rtodi (rads)

c     RTODI converts radians to deg, min, sec in integer
c     format (dddmmss).

      integer deg,min,sec
      real    rads,degree,dtr

      data    dtr /0.01745329/

      degree = abs(rads) / dtr
      deg    = int(degree)
      min    = int((degree - deg) * 60.0)
      sec    = int((((degree - deg) * 60.0) - min) * 60.0)
      rtodi  = (deg * 10000) + (min * 100) + sec

      return
      end

C+*+*+*+*+*+*+*+*+*+*+*+*+*+*+*+*+*+*+*+*+*+*+*+*+*+*+*+*+*+*+*+*+*|*+*+*+*+
C UNIT NAME:                    SEQ
C
C FUNCTIONAL DESCRIPTION:       .
C
C CALLED BY:                    DOFIX
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*|*-*-*-*-

      subroutine seq
c
      real nxsx(50),nxsy(50),nxsz(50)
      real invar(50)
```

```
      integer save(50)
      common nbr,k,ires,nst,wbrf,invar,cost(999),
     1 ista(50),sing(999),cosg(999),stax(999),stay(999),staz(999),
     2 brnx(50),brny(50),brnz(50),il(50),save,swt(50),
     3 nxsx,nxsy,nxsz,wt(50),c11,c22,c33,c13,c12,c23,
     4 tlat,tlon,sma,smi,orien,area,tx,ty,tz,e1,e2,e3,chisq(30),dtr
c
      k = nbr
c
       do 15 i = 1, k
           il(i) = i
15     continue
c
       do 20 i = 1, k
           itemp     = il(i)
           jtemp     = ista(itemp)
           wt(itemp) = invar(jtemp)
ccccc      wt(i)     = invar(ista(il(i)))
20     continue
c
   21 continue
      call bpe(2)
c
c     test results
c
      m = k - 2
      if (k .ge. 33) go to 25
c
      if (wbrf .lt. chisq(m)) go to 50
      go to 26
   25 rm=m
      xchi = sqrt(2.0*wbrf) - sqrt(2.0*rm-1.)
      if (xchi .lt. 0.842) go to 50
   26 continue
c
c     not acceptable - find bearing to remove
c
      if (k .le. (nbr+1)/2.) go to 900
      emax = 0.
      do 30 i = 1, k
          ib = il(i)
          x  = wt(ib)*  (brnx(ib)*tx + brny(ib)*ty + brnz(ib)*tz)**2
          if   (0. .lt. nxsx(ib)*tx + nxsy(ib)*ty + nxsz(ib)*tz)
     +    go to 60
          x  =  2 * wt(ib) - x
60        continue
          if (x .le. emax) go to 30
          emax = x
          is = i
   30 continue
      k = k - 1
c
      do 35 i = is, k
          il(i) = il(i+1)
   35 continue
c
c     is station unique
c
ccccc il = ista(il(1))
      itemp = il(1)
      il    = ista(itemp)
c
      do 40 i = 2, k
          itemp = il(i)
          if (ista(itemp) .ne. il) go to 21
ccccc     if (ista(il(i)) .ne. il) go to 21
   40 continue
c
c     no fix
c
  900 ires = 2
      go to 999
   50 continue
      call bpe(1)
```

```
      ires=1
      call confid
  999 return
      end


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    WRITER
C
C FUNCTIONAL DESCRIPTION:       .
C
C CALLED BY:                    PROCDF
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine writer (fixed,bpelat,bpelon,sma,smi,azimth)

c     Writer writes to an intermediate file 'DF.dat', that contains
c     DF information.  The info. includes bearing site info. and
c     ellipse info. about a specific target.  The info. about each
c     bearing site (up to 999) contains; position (lat/lon),
c     direction of bearing, and a digraph code for each site.
c     The info. about the ellipse for the target area contains;
c     the best point estimate (lat/lon), length of the major and
c     minor axis, and the azimth.
c
c     NOTE:
c         Routine openit, closit, and derror have been
c         commented out.  Also, fortran statements open and
c         close have been inserted.  All this was done
c         inorder to test WRITER.
c
        logical used
        common /brguse/ used(30)
        common /brgdat/ brglat(30),brglon(30),brg(30),nbr
        character*2 brgid(30)
        common /brgid/ brgid
      character*1 dirctn(2)
      integer     fixed,iarray(2),rtodi
      real        rarray(3),size,dtr

      data munit /9/
      data size  /1.0/
      data dtr   /0.01745329/

c
c-----open file and check for any errors
c
      call openit ('df.inp',6,munit,0,ierror)
      if (ierror .ne. 0) go to 20
      rewind (munit)
c
c-----write info. to the file for each site
c
      do 10 index = 1,nbr,1
         if (brglat(index) .le. 0) then
            dirctn(1) = 's'
         else
            dirctn(1) = 'n'
         endif

         if (brglon(index) .le. 0) then
            dirctn(2) = 'w'
         else
            dirctn(2) = 'e'
         endif

         iarray(1) = rtodi(brglat(index))
         iarray(2) = rtodi(brglon(index))
         rarray(1) = abs(brg(index)) / dtr
```

```
         call writfl (munit,'b',iarray,dirctn,1,size,rarray,
     +                brgid(index),used(index))
10    continue
c
c-----write info. about ellipse
c
      if (fixed .eq. 1) then
         if (bpelat .le. 0) then
            dirctn(1) = 's'
         else
            dirctn(1) = 'n'
         endif

         if (bpelon .le. 0) then
            dirctn(2) = 'w'
         else
            dirctn(2) = 'e'
         endif

         iarray(1) = rtodi(bpelat)
         iarray(2) = rtodi(bpelon)
         rarray(1) = sma
         rarray(2) = smi
         rarray(3) = azimth

         call writfl (munit,'e',iarray,dirctn,2,size,rarray,'  ',
     +   used)
      endif

      go to 30

 20   call derror (30,'Problem opening DF.inp file   ',.true.,5,ch)
      call closit (munit)
30    continue

      return
      end

C+++++++++++++++++++++++++++++++++++++++++++++++++++++++++++++++++|+++++++
C UNIT NAME:                      WRITFL
C
C FUNCTIONAL DESCRIPTION:         .
C
C CALLED BY:                      WRITER
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*|*-*-*-*-

      subroutine writfl (unitno,rectyp,coord,dirctn,
     +                   marker,size,ellpse,sitid,used)

c     Writfl writes bearing site and ellipse info. to the file
c     'DF.dat'.  Bearing site and ellipse info. can be distinguished
c     by the first character in the first field of each record.
c     I.e. a 'b' for bearing site and an 'e' for an ellipse.
c     Also included in each record is a marker id and marker size.

      character*1 rectyp,dirctn(2)
      character*2 sitid
      integer     unitno,marker,coord(2)
      real        size,ellpse(3)
      logical used
      integer iused

c
c-----check for the type of record and
c-----write info. to the file
c
      if (rectyp .eq. 'b') then
         if(used) then
               iused = 1
         else
```

```
            iused = 0
         endif
         write(unit=unitno,fmt=1000) 'b',coord(1),dirctn(1),coord(2),
     +                               dirctn(2),marker,size,ellpse(1),
     +                               iused,sitid
1000     format(a1,1x,i6,a1,i7,a1,i3,f5.1,1x,f7.2,1x,i1,1x,a2)
      else if (rectyp .eq. 'e') then
         write(unit=unitno,fmt=1010) 'e',coord(1),dirctn(1),coord(2),
     +                               dirctn(2),marker,size,ellpse(1),
     +                               ellpse(2),ellpse(3),' '
1010     format(a1,1x,i6,a1,i7,a1,i3,f5.1,1x,3f8.2,1x,a56)
      endif

      return
      end
C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    DETCON
c
c  Functional Description:
c       this subroutine causes the feature detail level menu to appear
c
c  Input Files/Parameters:
c
c  Output Files/Parameters:
c
c  Subroutines/Functions Called:
c      check                      checks the value of the button re-
c                                 turned from a pick or locate
c      hilite                     highlights menu choices by drawing
c                                 a box around them
c      mpick                      routine to pick from the menu
c
c  Called By:                     SUBCAL
c
c  Local Variables:
c
c  Restrictions:
c
c  Abnormal Return Conditions:
c
c  Location:
c
c  Programmer          Date of Last Change        Reason for Change
c  C.S. Lamb           Jan 1988                  jclear logic - detcon
c
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine detcon

c       this subroutine causes the feature detail level menu to appear

        Integer qnextm,HLTAB(29)
        Logical qcancl,qext2m,qretrn,qstmnu
        Common /b1/ qcancl,qext2m,qretrn,qstmnu,qnextm
        logical sys
        common /sysdbc/ sys
        logical qexitg
        Common /b5/ qexitg
        logical error,rflag
c       map parameters
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        INTEGER QLEVL(16)
        COMMON /LEVLS/ QLEVL
        dimension ltypov(16)
        logical ltonov(16),rankt(26,16)
        common /maptoo/ ltypov,ltonov,rankt
        data IHLLEN/29/
        data HLTAB/0,0,0,0,0,0,0,0,0,0,0,10,0,1,0,2,0,3,0,4,0,5,
     +          0,6,0,7,0,8,0,9/
```

```
c
c 0 None
c 1 Major Feat.
c 2
c 3
c 4
c 5
c 6
c 7
c 8
c 9 Minor Feat.
c
        rflag = .false.
        qcancl = .false.
        qext2m = .false.
        qretrn = .false.
        qstmnu = .false.
        if (level.gt.9) then
            ix = 9
        else if (level.eq.0) then
            ix = 10
        else
            ix = level
        endif
c        call hilite(.true.,ix,1,IHLLEN,HLTAB)
        mysegn = 6
 100    continue
c**** CSL erase 10/87
            call hilite(.true.,ix,1,IHLLEN,HLTAB)
            call menupr
            call mpick(ichoic,mysegn,ibuttn)
            if (ichoic.ge.1.and.ichoic.le.10) then
                call hilite(.false.,ix,1,IHLLEN,HLTAB)
                call hilite(.true.,ichoic,1,IHLLEN,HLTAB)
                ix = ichoic
                if (ichoic.eq.9) then
                    level = 26
                else if (ichoice.eq.10) then
                    level = 0
                else
                    level = ichoic
                endif
                do 130 i=1,16
                    qlevl (i) = level
  130           continue
                call chlevl(level)
            else
                call check(ibuttn,mysegn,error,rflag)
            endif
            if (sys)
     +      print*,'detcon--ibuttn mysegn error',ibuttn,mysegn,error,rflag
        if(.not.rflag) go to 100
c

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                   FTRCON
c
c  Functional Description:
c       this subroutine processes the map feature menu
c
c  Input Files/Parameters:
c
c  Output Files/Parameters:
c
c  Subroutines/Functions Called:
c
c  Called By:                   SUBCAL
c
c  Local Variables:
c
```

```
c  Restrictions:
c
c  Abnormal Return Conditions:
c
c  Location:
c
c  Programmer         Date of Last Change        Reason for Change
c
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine ftrcon

c       this subroutine processes the map feature menu

        integer qnextm,HLTAB(33)
        logical qcancl,qext2m,qretrn,qstmnu
        common /b1/ qcancl,qext2m,qretrn,qstmnu,qnextm
        logical sys
        common /sysdbc/ sys
        logical error,rflag
        logical issegm
        integer i
c       map parameters
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        integer SEGNO,FIRSEG
        common /SEGNO/ SEGNO,FIRSEG
        logical overtb(16)
        common /overly/overtb
        dimension ltypov(16)
        logical ltonov(16),rankt(26,16)
        common /maptoo/ ltypov,ltonov,rankt
        integer ichoic
        logical qmapup
        common /mapup/qmapup
        logical filply,opnply
        common / polycb / filply,opnply
c
c       commons for grids
c
        COMMON/NEWGRD/ NEWGRD,FIRST
        LOGICAL NEWGRD,FIRST
        COMMON/GRIDS/QSW,QGTYPE,QGCOLR,QXINC,QYINC
        REAL   QXINC(3),QYINC(3)
        LOGICAL   QSW(3)
        INTEGER   QGCOLR(3),QGTYPE(3)
        COMMON /GRDSEG/ LLSEG,UTMSEG,GAUSEG
        INTEGER LLSEG,UTMSEG,GAUSEG
        logical bitmod
        common /bitmod/ bitmod

        data IHLLEN/33/
        data HLTAB/0,0,0,0,1,1,0,2,2,0,3,3,0,4,0,5,0,6,0,7,
     +           0,8,0,9,0,10,0,12,0,16,16,0,17/
c
c     Map Features
c    1 Coastlines,
c     islands/lakes
c    2 Political
c       boundaries
c    3 Internal
c       boundaries
c    4 Rivers
c    5 Railroads
c    6 Roads
c    7 Cities
c    8 Earth fill
c    9 Water fill
c   10 Area names
c   12 MD
```

```
c   16 Lat/lon
c       grid lines
c   17 Land fill
c   (A Alter color)
c
        rflag = .false.
        qcancl = .false.
        qext2m = .false.
        qretrn = .false.
        qstmnu = .false.
 100    continue
        do 110 i= 1,16
             if(lton(i))
     +       call hilite(.true.,i,1,IHLLEN,HLTAB)
 110    continue
c
c       hilite for Land fill
c
        if (overtb(5)) call hilite (.true.,i,1,IHLLEN,HLTAB)
        mysegn = 3
        call mpick(ichoic,mysegn,ibuttn)
        if (sys) then
           print*,'ftrcon - ichoic= ',ichoic,llseg,firseg
        endif
        if (ichoic.ge.1.and.ichoic.le.16) then

            segno = firseg + ichoic

              if (lton(ichoic)) then
                call hilite(.false.,ichoic,1,IHLLEN,HLTAB)
                lton(ichoic) = .false.
                if (.not.bitmod.and.issegm(segno))
     +            call jvisbl (segno, 0)
              else
                call hilite(.true.,ichoic,1,IHLLEN,HLTAB)
                lton(ichoic) = .true.
                if (issegm(segno)) then
                   call jvisbl(segno,1)
                else
                  do 120 i= 1,26
c                     set up rank table
                    if (i .le. LEVEL) then
                       rankt(i,ichoic)=.true.
                    else
                       rankt(i,ichoic)=.false.
                    endif
 120              continue

c          make sure  double line rivers are added if necessary
                if ((ichoic.eq.4).and.(LEVEL.ge.1)) then
                  rankt(5,4) = .true.
                endif

c       turn on indefinite political boundaries
                if ((ichoic.eq.2).and.(LEVEL.ge.1)) rankt(2,2) = .true.

c               "cannot earth fill while map is present"

                  if ( ichoic .eq. 8 .and. qmapup) then
                    call mesg(1231)
                    call paws
                  else
                    if (sys) then
                       print*,'calling drawf ichoic= ',ichoic
                    endif
                    call drawf (ichoic)
                  endif
                endif
                call menupr
              endif
        else if (ichoic .eq. 17) then
              if (overtb(5)) then
                  call hilite(.false.,ichoic,1,IHLLEN,HLTAB)
                  overtb(5) = .false.
```

```
                filply = .false.
            else
                call hilite(.true.,ichoic,1,IHLLEN,HLTAB)
                overtb(5) = .true.
                filply = .true.
            endif
            call menupr
      else
            call check(ibuttn,mysegn,error,rflag)
      endif
      if (sys)
     + print*,'ftrcon--ibuttn mysegn error',ibuttn,mysegn,error,rflag
      if(.not.rflag) go to 100

      return
      end

C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                       GEOCON
c
c  Functional Description:
c       this subroutine processes the alter display submenu
c
c  Input Files/Parameters:
c
c  Output Files/Parameters:
c
c  Subroutines/Functions Called:
c      mesg                         displays messages in the communica-
c                                    tions area
c
c  Called By:                       SUBCAL
c
c  Local Variables:
c
c  Restrictions:
c
c  Abnormal Return Conditions:
c
c  Location:
c
c  Programmer         Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*|*-*-*-*-

      subroutine geocon

c     this subroutine processes the alter display submenu

      Integer qnextm,HLTAB(34)
      Logical qcancl,qext2m,qretrn,qstmnu
      Common /b1/ qcancl,qext2m,qretrn,qstmnu,qnextm
      logical qexitg
      Common /b5/ qexitg
      logical sys
      common /sysdbc/ sys
      character*50 defpth
      common /defpth/ defpth
      common /lendef/ lendef
      character*10 savenm(10)
      integer lsavnm(10)
      common /savenm/ savenm,lsavnm
      logical error,rflag

      data IHLLEN/34/
      data HLTAB/0,0,0,0,1,1,0,2,0,3,0,4,0,5,5,0,6,6,0,7,0,8,8,
     +          0,9,9,0,10,10,0,11,11,11,0/
      data isavnm/0/,nsavnm/10/,savenm/10*'          '/,lsavnm/10*0/

c         Geographic
c           Functions
c         1 Change Width and
c           center point
```

```
c          2 Erase map
c          3 Box area
c          4 Draw Current Map
c          5 Annotate on
c            screen
c          6 Distance/Az.
c            between pnts
c          7 Show area
c          8 Display
c            overlay data
c          9 Process/
c            Display DF
c         10 Color area
c            fill

      rflag = .false.
      qcancl = .false.
      qext2m = .false.
      qretrn = .false.
      qstmnu = .false.
 100  continue
      mysegn = 2
      call mpick(ichoic,mysegn,ibuttn)
      if (sys)
     + print*,'geocon--ichoic mysegn ibuttn',ichoic,mysegn,ibuttn
      if (ichoic.ge.1.and.ichoic.le.10) then
          call hilite(.true.,ichoic,1,IHLLEN,HLTAB)
      endif
          if (ichoic.eq.1) then
              call fchsca
              call menupr
          else if (ichoic.eq.2) then
              call eramap
              call menupr
          else if (ichoic.eq.3) then
              call boxare
              call menupr
          else if (ichoic.eq.4) then
              call drwmap
              call menupr
          else if (ichoic.eq.5) then
              call fannot
              call menupr
          else if (ichoic.eq.6) then
              call distan
c             call paws
              call menupr
          else if (ichoic.eq.7) then
              call fshowa
              call menupr
          else if (ichoic.eq.8) then
              call foverl
              call menupr
          else if (ichoic.eq.9) then
              call fdfpro
              call menupr
          else if (ichoic.eq.10) then
              call fcfill
              call soverl
              call menupr
          else
              call check(ibuttn,mysegn,error,rflag)
          endif
      if (ichoic.ge.1.and.ichoic.le.12) then
          call hilite(.false.,ichoic,1,IHLLEN,HLTAB)
      endif
      if (sys)
     + print*,'geocon--ibuttn mysegn error',ibuttn,mysegn,error,rflag
      if(.not.rflag) go to 100
c
      return
      end
```

```
C+*+*+*+*+*+*+*+*+*+*+*+*+*+*+*+*+*+*+*+*+*+*+*+*+*+*+*+*+*+*+*+*+*+*+|*+*+*+*+
C UNIT NAME:                    MMCON
C
C FUNCTIONAL DESCRIPTION:        .
C
C CALLED BY:                    SUBCAL
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-|*-*-*-*-

      subroutine mmcon

c     this subroutine processes the main menu selections

      Integer qnextm
      Logical qcancl,qext2m,qretrn,qstmnu
      Common /b1/ qcancl,qext2m,qretrn,qstmnu,qnextm
      logical qexitg
      Common /b5/ qexitg
      common /commen/ xllmen,yllmen,xurmen,yurmen,ibcmen,iocmen,incmen
      common /comgra/xllgra,yllgra,xurgra,yurgra,ibcgra,iocgra
      common /commvp/ xllmvp,yllmvp,xurmvp,yurmvp
      character*50 defpth
      common /defpth/ defpth
      common /lendef/ lendef
      logical error,rflag
      logical sys
      common /sysdbc/ sys
      data maxmen/199/

c     main menu level
      rflag = .false.
      qcancl = .false.
      qext2m = .false.
      qretrn = .false.
      qstmnu = .true.
      qnextm = 1
      call menupr
  100 continue
          mysegn = 1
          call mpick (ichoic,mysegn,ibuttn)
          if (sys)
     +    print*,'mmcon-- ichoic mysegn ibuttn',ichoic,mysegn,ibuttn
          if (ichoic.eq.1) then
c             Geographic functions
              qnextm = 2
              rflag = .true.
          else if (ichoic.eq.2) then
c             Map Features
              qnextm = 3
              rflag = .true.
          else if (ichoic.eq.3) then
c             Map Overlay
              qnextm = 4
              rflag = .true.
          else if (ichoic.eq.4) then
c             Map Projection
              qnextm = 5
              rflag = .true.
          else if (ichoic.eq.5) then
c             Level of Detail
              qnextm = 6
              rflag = .true.
          else if (ichoic.eq.6) then
c             Map Data Base resolution
              qnextm = 7
              rflag = .true.
          else if (ichoic.eq.7) then
c             Save/Restore menu
              qnextm = 8
              rflag = .true.
```

```
          else if (ichoic.eq.8) then
c             Tracking menu
              qnextm = 9
              rflag = .true.
c             print*,'Tracking menu called'
          else if (ichoic.eq.9) then
c             save display
              QNEXTM = 021
              RFLAG = .TRUE.
          else if (ichoic.eq.10) then
c             recall display
              QNEXTM = 020
              RFLAG = .TRUE.
          else
              call check(ibuttn,mysegn,error,rflag)
          endif
      if (.not.(qexitg.or.(qnextm.ne.1))) go to 100

      return
      end


C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    ovrcon
c
c  Functional Description:
c       process map overlay feature menu
c
c  Input Files/Parameters:
c
c  Output Files/Parameters: N/A
c
c  Subroutines/Functions Called:
c
c  Called By: subcal
c
c  Local Variables: N/A
c
c  Restrictions: N/A
c
c  Abnormal Return Conditions:  N/A
c
c  Location:
c
c  Programmer       Date of Last Change      Reason for Change
C  L. McCleary      Jan 1988                separate amp & sys - ovrcon
C  T. WESCOTT       JUL 1988                RANGE RINGS - OVRCON
C  L. McCleary      Mar 1989                SATEL. COV. - OVRCON
c
C-*-*-*-*-*-*-*-*-*-*-*-*-*-*-*-*-*-*-*-*-*-*-*-*-*-*-*-*-*-*-*-*-*-*-*|*-*-*-*-
c
       subroutine ovrcon

c      this subroutine processes the map overlay feature menu

       common/clindx/qmjidx,qarray
       integer qmjidx
       logical qarray(6)

       common /commen/ xllmen,yllmen,xurmen,yurmen,ibcmen,iocmen,incmen
       common /comgvp/ xllgvp,yllgvp,xurgvp,yurgvp
       common /commvp/ xllmvp,yllmvp,xurmvp,yurmvp
       common /comgra/ xllgra,yllgra,xurgra,yurgra,ibcgra,iocgra
       Integer qnextm,HLTAB(20)
       Logical qcancl,qext2m,qretrn,qstmnu
       Common /b1/ qcancl,qext2m,qretrn,qstmnu,qnextm
       logical qexitg
       Common /b5/ qexitg
       logical error,rflag
       logical sys
       common /sysdbc/ sys
       logical overly (16)
       common /overly/ overly
```

```
      INTEGER SEGNO,FIRSEG
      COMMON /SEGNO/ SEGNO,FIRSEG
      integer sclseg,clsseg
      common /lnseg/ sclseg,clsseg
c      integer rrgseg
c      common /rrgseg/ rrgseg,rrlat,rrlon,rrincr
      integer ovseg, dfseg
      common /OVSEGS/ ovseg, dfseg
      integer dseg
      logical bitmod
      common /bitmod/ bitmod
      common/ampprm/ampseg
      integer ampseg

c**   map parameters
      integer ovix
      dimension ltypov(16)
      logical ltonov(16),rankt(26,16)
      common /maptoo/ ltypov,ltonov,rankt
      logical lton(16),dotem
      integer ipgrid(4),ltyptb(16)
      common /map/ XRNM,XC,YC,LEVEL,CLAT,CLON,XRAD,YRAD,ITPROJ,
     +    IRES,LTYPTB,LUNDAT,LUNIND,LUNLIN,LTON,IPGRID,DOTEM,
     +    ORHALT
      data IHLLEN/20/
      data HLTAB/0,0,0,0,1,0,2,0,3,0,4,0,5,0,6,0,0,0,0,0/
c
c   Map Overlay
c      Features
c   1 Overlay data = ltonov(1)
c   2 DF data      = ltonov(2)
c   3 Scale Line   = overly(2)
c   4 Classificat. = overly(4)
c   5 Range rings  = overly(5)
c   6 Satel. cov.  = overly(6)
c

c      print*,'ovrcon ampseg --- ',ampseg
c
      rflag = .false.
      qcancl = .false.
      qext2m = .false.
      qretrn = .false.
      qstmnu = .false.

clj --- The classification on/off flag is now "qmjidx".
clj --- When qmjidx equals 1, there is no classification.
      if (qmjidx.ne.1) then
          overly(4) = .true.
      else
          call hilite(.false.,4,1,IHLLEN,HLTAB)
          overly(4) = .false.
      endif

ctw---  Range rings not yet stored in parameter file and
ctw---  properly recovered.  overly(5) may be random.
c        if (rrgseg.le.0) overly(5) = .false.

c       Satellite coverage not yet stored in parameter file and
c       properly recovered.  overly(6) may be random.
c        if (scvseg.le.0) overly(6) = .false.

 100    continue
        if(ltonov(1))
     +          call hilite(.true.,1,1,IHLLEN,HLTAB)
        if(ltonov(2))
     +          call hilite(.true.,2,1,IHLLEN,HLTAB)
        if (overly(2))
     +          call hilite(.true.,3,1,IHLLEN,HLTAB)
        if (overly(4))
     +          call hilite(.true.,4,1,IHLLEN,HLTAB)
c        if (overly(5))
c     +          call hilite(.true.,5,1,IHLLEN,HLTAB)
```

```
c        if (overly(6))
c     +           call hilite(.true.,6,1,IHLLEN,HLTAB)
       mysegn = 4
       call mpick(ichoic,mysegn,ibuttn)
       if (ichoic.eq.1.or.ichoic.eq.2) then
               if (ichoic.eq.1) ix = 21
               if (ichoic.eq.2) ix = 22
c**
c**            check for display overlay data.
c**            if so, use ltonov instead of lton.
c**
               segno = firseg + ix
c**
c**            set dseg to seg# of overlay (ovix=1) or df (ovix=2)
c**
               ovix = ix - 20
               if(ovix .eq. 1) then
                   dseg = ovseg
               else
                   dseg = dfseg
               endif
               if(ltonov(ovix)) then
                   ltonov(ovix) = .false.
                   call hilite(.false.,ichoic,1,IHLLEN,HLTAB)
                   call jvisbl (dseg, 0)
C                   if(ovix .eq. 1)then
C                       call jpurge(ampseg)
C                   endif
                   if(ovix .eq. 2)then
                       call drwamp(' ',0)
                   endif
               else
                   ltonov(ovix) = .true.
                   call hilite(.true.,ichoic,1,IHLLEN,HLTAB)
c ***              Remove interrogation of segment because when map is changed,
c                  the segment is no longer displayed.  The feature is always
c                  displayed when this feature is selected now.
c                  if (issegm(dseg)) then
c                      call jvisbl (dseg, 1)
c                  else
                       call drawf(ix)
c                  endif
               endif
               call menupr
       else if (ichoic.eq.3) then
               if (overly(2)) then
                   overly(2) = .false.
                   call hilite(.false.,ichoic,1,IHLLEN,HLTAB)
                   call jvisbl(sclseg,0)
               else
                   overly(2) = .true.
                   call hilite(.true.,ichoic,1,IHLLEN,HLTAB)
                   call mapovr
               endif
               call menupr
       else if (ichoic.eq.4) then
c ------------- Classification menu
               QNEXTM = 019
               QSTMNU = .TRUE.
               RFLAG = .TRUE.
       else if (ichoic.eq.5) then
c                if (overly(5)) then
c                    overly(5) = .false.
c                    call hilite(.false.,ichoic,1,IHLLEN,HLTAB)
c                    call jvisbl(rrgseg,0)
c                else
                   overly(5) = .true.
                   call hilite(.true.,ichoic,1,IHLLEN,HLTAB)
                   call ranger
                   call hilite(.false.,ichoic,1,IHLLEN,HLTAB)
c                endif
               call menupr
```

```
      else if (ichoic.eq.6) then
              overly(6) = .true.
              call hilite(.true.,ichoic,1,IHLLEN,HLTAB)
              call satcov
              call hilite(.false.,ichoic,1,IHLLEN,HLTAB)
              call menupr
      else
              call check(ibuttn,mysegn,error,rflag)
      endif
      if (sys)
     + print*,'ovrcon--ibuttn mysegn error',ibuttn,mysegn,error,rflag
      if(.not.rflag) go to 100
c
      return
      end


C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                 PROCON
c
c  Functional Description:
c       this subroutine processes the map projection menu
c
c  Input Files/Parameters:
c
c  Output Files/Parameters:
c
c  Subroutines/Functions Called:
c      check                      checks the value of the button re-
c                                 turned from a pick or locate
c      hilite                     highlights menu choices by drawing
c                                 a box around them
c      mpick                      routine to pick from the menu
c      eramap                     erases the map area
c
c  Called By:                     SUBCAL
c
c  Local Variables:
c
c  Restrictions:
c
c  Abnormal Return Conditions:
c
c  Location:
c
c  Programmer                Date of Last Change       Reason for Change
c    Tom Wescott (NOSC)      Mar 7, 88                 Expanded menu.
C-*-*-*-*-*-*-*-*-*-*-*-*-*-*-*-*-*-*-*-*-*-*-*-*-*-*-*-*-*-*-*-*-*-*-*|*-*-*-*-

      subroutine procon

c     this subroutine processes the map projection menu

      parameter (ITEMS=19)
      Integer qnextm,HLTAB(2*ITEMS+2)
      Logical qcancl,qext2m,qretrn,qstmnu
      Common /b1/ qcancl,qext2m,qretrn,qstmnu,qnextm
      logical sys
      common /sysdbc/ sys
      logical qexitg
      Common /b5/ qexitg
      character*50 defpth
      common /defpth/ defpth
      common /lendef/ lendef
      logical error,rflag
c     map parameters

      logical lton(16),dotem
      integer ipgrid(4),ltyptb(16)
      common /map/ XRNM,XC,YC,LEVEL,CLAT,CLON,XRAD,YRAD,ITPROJ,
     +    IRES,LTYPTB,LUNDAT,LUNIND,LUNLIN,LTON,IPGRID,DOTEM,
     +    ORHALT
      data HLTAB/0,0,0,9,0,10,0,11,0,6,0,1,0,12,0,8,0,7,0,13,0,14,0,
     + 4,0,5,0,15,0,16,0,18,0,19,0,17,0,2,0,3/
```

```
c
c      menu call parameters for menu,legend,system area, graphics area
c      lower left x,y, upper right x,y, background and outline color indexs
c
c   Map Projection Menu:
C          ITEM#    PROJECTION           ITPROJ
C           (1)  Albers Equal-area         9
C           (2)  Azimuthal Equal-area     10
C           (3)  Azimuthal Equidistant    11
C           (4)  Equirectangular           6
C           (5)  Gnomonic                  1
C           (6)  Kavraisky IV             12
C           (7)  Lambert Conformal         8
C           (8)  Mercator                  7
C           (9)  Miller                   13
C          (10)  Oblique Mercator         14
C          (11)  Orthographic              4
C          (12)  Perspective               5
C          (13)  Polar Stereographic      15
C          (14)  Polyconic                16
C          (15)  Sinusoidal               18
C          (16)  Stereographic            19
C          (17)  UTM                      17
C          (18)  Ortho. Equatorial         2
C          (19)  Ortho. Polar              3
C
      IHLLEN = 2*ITEMS+2
      rflag = .false.
      qcancl = .false.
      qext2m = .false.
      qretrn = .false.
      qstmnu = .false.
 100  continue
          call menupr
          mysegn = 5
          call hilite(.true.,itproj,1,IHLLEN,HLTAB)
          call mpick(ichoic,mysegn,ibuttn)
          if (ichoic.ge.1.and.ichoic.le.ITEMS) then
              if(itproj.ne.ichoic) then
                      call hilite(.false.,itproj,1,IHLLEN,HLTAB)
                      itproj = ichoic
                      call hilite(.true.,ichoic,1,IHLLEN,HLTAB)
                      call drwmap
              endif
          else
              call check(ibuttn,mysegn,error,rflag)
          endif
          if (sys)
     +    print*,'procon--ibuttn mysegn error',ibuttn,mysegn,error,rflag
      if(.not.rflag) go to 100
c
      return
      end


C+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    recdis
c
c  Functional Description:
c       recall display menu controller
c
c  Input Files/Parameters:
c
c  Output Files/Parameters: N/A
c
c  Subroutines/Functions Called:
c
c  Called By: subcal
c
c  Local Variables: N/A
c
c  Restrictions: N/A
c
c  Abnormal Return Conditions:  N/A
```

```
c
c  Location:
c
c  Programmer      Date of Last Change     Reason for Change
C  L. McCleary     Jan 1988               delete call eramap - recdis
c  S. Lamb         Feb 1988               detec chg - recdis
c  S. Lamb         Aug 1988               allow DrawMap sel - recdis
c
C-*-*-*-*-*-*-*-*-*-*-*-*-*-*-*-*-*-*-*-*-*-*-*-*-*-*-*-*-*-*-*-*-*-*-*|*-*-*-*-
c
      subroutine recdis

c     recall display menu controller

      integer istats(19)
      common /commen/xllmen,yllmen,xurmen,yurmen,ibcmen,iocmen,incmen
      Integer qnextm,HLTAB(21)
      Logical qcancl,qext2m,qretrn,qstmnu
      Common /b1/ qcancl,qext2m,qretrn,qstmnu,qnextm
      logical error,rflag
      logical sys
      common /sysdbc/ sys
      logical bitmod
      common /bitmod/ bitmod
      character*80 filen
      character*80 savdes(20),line
      common /savdes/ savdes
      common /maxsav/ maxsav,limsav
      logical qmapup
      common /mapup/qmapup
      character*50 defpth
      common /defpth/ defpth
      common /lendef/ lendef
      common /txtsz/ txtsiz
      character*20 savcha
      common /isegn/ isegn

      data savcha/'123456789abcdefghijk'/
      data IHLLEN/21/
      data HLTAB/0,1,2,3,4,5,6,7,8,9,10,11,12,13,14,15,
     +  16,17,18,19,20/

c
c    RECALL DISPLAY
c     1
c     2
c     3
c     4
c     5
c     6
c     7
c     8
c     9
c    10
c    11
c    12
c    13
c    14
c    15
c    16
c    17
c    18
c    19
c    20
c
      rflag = .false.
      qcancl = .false.
      qext2m = .false.
      qretrn = .false.
      qstmnu = .false.

 100  continue
      mysegn = 20
      call menvpt
```

```
        call menwin
        call getseg (isegn)
        call jropen (isegn)
        x = xllmen + 2.
        do 110 i=1,maxsav
            call jpkid (i)
            call jcolor (24)
            y = yurmen - 2. - i * 2.
            call jmove (x,y)
            if (sys) print*,'recdis -- ',i,x,y,savdes(i)
            call xsize (1.,1.)
            line = savdes(i)
            call jlstrg (line(1:20))
110     continue
        call jrclos
        call jdetec(isegn, 1)
        call mesg (1245)
        call npick(ichoic,mysegn,ibuttn,isegn)
        if (ichoic.ge.1.and.ichoic.le.maxsav) then
            filen = defpth(1:lendef) // 'save'
     +      // savcha(ichoic:ichoic)
            lenfn = lendef + 5
            if (sys) print*,'recdis -- ',filen(1:lenfn),lenfn
            call rparam (lenfn,filen,.true.,ierror)
            if (ierror .eq. 0) then
                call mesg(1221)
c                call eramap
                call enall
                if (bitmod) then
                    call recdat (filen,lenfn)
                    call mapper (.false.)
                    CALL MAPOVR
                else
                    call drwmap
                endif
                qmapup = .true.
            else
                call mesg(1230)
                call paws
                call jpurge (isegn)
            endif
        else
            call check(ibuttn,mysegn,error,rflag)
            call jisgmt(isegn,istats)
c               --purge seg if not alrdy deleted due to oper selec
            if (istats(1).ne.0) call jpurge (isegn)
        endif
        if(.not.rflag) go to 100
c
        return
        end


C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                     rescon
c
c  Functional Description:
c       process save/restore menu
c
c  Input Files/Parameters:
c
c  Output Files/Parameters: N/A
c
c  Subroutines/Functions Called:
c
c  Called By: subcal
c
c  Local Variables: N/A
c
c  Restrictions: N/A
c
c  Abnormal Return Conditions:  N/A
c
c  Location:
```

```
c
c  Programmer       Date of Last Change      Reason for Change
C  L. McCleary      Jan 1988                 fix call setcol - rescon
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine rescon

c       this subroutine processes the save/restore selections

        common /tablet/ inpdev
        common /commvp/ xllmvp,yllmvp,xurmvp,yurmvp
        common/scratr/qbox,qbkgrd
        integer     qbox,qbkgrd
        character*50 chatmp
        character*50 defpth
        common /defpth/ defpth
        common /lendef/ lendef
        Integer qnextm,HLTAB(35)
        Logical qcancl,qext2m,qretrn,qstmnu
        Common /b1/ qcancl,qext2m,qretrn,qstmnu,qnextm
        logical error,rflag
        logical qexitg
        Common /b5/ qexitg
        character * 25 retstr
        real hlscol(3,0:255)
        common /hlscol/ hlscol
        integer menclr
        integer mencol
        logical sys
        common /sysdbc/ sys

c       map parameters
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        logical qmapup
        common /mapup/qmapup
        logical bitmod
        common /bitmod/ bitmod
        data IHLLEN/35/
        data HLTAB/0,0,0,0,0,1,1,0,2,2,0,0,0,0,0,0,3,0,4,0,5,
     +       0,0,0,0,0,0,6,0,7,0,8,0,9,0,0/
        data MENCLR /10/
        data MENCOL /8/

c       menu call parameters for menu,legend,system area, graphics area
c       lower left x,y, upper right x,y, background and outline color indexs
c    Save/Restore
c      parameters
c    1 Save
c        display
c    2 Restore
c        display
c    Set to system
c      defaults
c    3 Colors
c    4 Map params.
c    5 Boundaries
c     Set to user
c       values
c    6 Colors
c    7 Map params.
c    8 Boundaries
c    9 Alter color
c    0 Save colors

        rflag = .false.
        qcancl = .false.
        qext2m = .false.
        qretrn = .false.
        qstmnu = .false.
```

```
      mysegn = 8
 100  continue
          call menupr
          call mpick(ichoic,mysegn,ibuttn)
          if (ichoic .ge. 1 .and. ichoic .le. 9) then
              call hilite(.true.,ichoic,1,IHLLEN,HLTAB)
          endif
          if (ichoic.eq.1) then
c             save display
              call prompt(1219,retstr,25,irchar)
              if (irchar.gt.0) then
                  call mesg (1220)
                  call sparam (irchar,retstr,.true.,ierror)
                  if (bitmod) call savdat (retstr,irchar)
              endif
          else if (ichoic.eq.2) then
c             recall display
              call prompt (1208,retstr,25,irchar)
              if (irchar.gt.0) then
                  call mesg (1221)
                  call rparam (irchar,retstr,.true.,ierror)
                  if (ierror .eq. 0) then
c****CSL*not needed since drwmap calls eramap*
c                      call eramap
                      if (bitmod) then
                          call recdat (retstr,irchar)
                      else
                          call drwmap
                      endif
                      qmapup = .true.
                  else
                      call mesg(1230)
                      call paws
                  endif
              endif
          else if (ichoic.eq.3) then
              call mesg (1222)
              chatmp = defpth(1:lendef) // 'default'
              call rcolor (lendef+7,chatmp)
          else if (ichoic.eq.4) then
              call mesg (1223)
              chatmp = defpth(1:lendef) // 'default'
              call rparam (lendef+7,chatmp,.false.,ierror)
              call eramap
          else if (ichoic.eq.5) then
c             call mesg (1224)
              chatmp = defpth(1:lendef) // 'default'
              call rbound (lendef+7,chatmp,.false.)
          else if (ichoic.eq.6) then
              call prompt (1208,retstr,25,irchar)
              if (irchar.gt.0) then
                  call mesg (1222)
                  call rcolor (irchar,retstr)
              endif
          else if (ichoic.eq.7) then
              call prompt (1208,retstr,25,irchar)
              if (irchar.gt.0) then
                  call mesg (1223)
                  call rparam (irchar,retstr,.false.,ierror)
                  call eramap
              endif
          else if (ichoic.eq.8) then
              call prompt (1208,retstr,25,irchar)
              if (irchar.gt.0) then
                  call rbound (irchar,retstr,.false.)
              endif
          else if (ichoic.eq.9) then
              call prompt (1225,retstr,25,irchar)
              if (irchar.le.0) go to 155
              read (retstr(1:irchar),1200,err=150) icol
 1200         format(i3)
              if (sys) print*,'Color index selected: ',icol
              if (icol.ge.0.and.icol.le.255) then
                  call mesg (1226)
```

```
c**                 clearing menu area
                    call drawm (MENCLR,ierror)
                    call jvport (xllmvp,xurmvp,yllmvp,yurmvp)
                    call enall
c                    call setcol (icol,8,248,22,qbkgrd,qbox,
                    call setcol (icol,6,248,22,qbkgrd,qbox,
     +              hlscol(1,icol))
c                    call boxclr
                    call soverl
c**                 bring back save/restore menu
                    call drawm (MENCOL,ierror)
                endif
                go to 155
  150               continue
                    call mesg(1227)
                    if (sys)
     +              print*,'Error on color index conversion',icol,
     +              irchar,'  ',retstr(1:irchar)
                    call paws
  155           continue
c             else if (ichoic.eq.10) then
c                 call prompt(1208,retstr,25,irchar)
c                 if (irchar.gt.0) then
c                     call mesg (1228)
c                     call scolor (retstr,irchar)
c                 endif
            else
                call check(ibuttn,mysegn,error,rflag)
            endif
        call hilite(.false.,ichoic,1,IHLLEN,HLTAB)
        if(.not.rflag) go to 100

        return
        end

C+*+*+*+*+*+*+*+*+*+*+*+*+*+*+*+*+*+*+*+*+*+*+*+*+*+*+*+*+*+*+*+*+*+*|*+*+*+*+
c  UNIT NAME:                 RSLCON
c
c  Functional Description:
c       this subroutine causes map database resolution menu to appear
c
c  Input Files/Parameters:
c
c  Output Files/Parameters:
c
c  Subroutines/Functions Called:
c      check                      checks the value of the button re-
c                                 turned from a pick or locate
c      hilite                     highlights menu choices by drawing
c                                 a box around them
c      mpick                      routine to pick from the menu
c
c  Called By:                     SUBCAL
c
c  Local Variables:
c
c  Restrictions:
c
c  Abnormal Return Conditions:
c
c  Location:
c
c  Programmer         Date of Last Change       Reason for Change
c  C.S.Lamb           Jan 1988                jclear logic - rslcon
c
C-*-*-*-*-*-*-*-*-*-*-*-*-*-*-*-*-*-*-*-*-*-*-*-*-*-*-*-*-*-*-*-*-*-*|*-*-*-*-

        subroutine rslcon

c       this subroutine causes map database resolution menu to appear

        Integer qnextm,HLTAB(30)
        Logical qcancl,qext2m,qretrn,qstmnu
```

```
      Common /b1/ qcancl,qext2m,qretrn,qstmnu,qnextm
      logical sys
      common /sysdbc/ sys
      logical qexitg
      Common /b5/ qexitg
      logical error,rflag
c     map parameters
      logical lton(16),dotem
      integer ipgrid(4),ltyptb(16)
      common /map/ XRNM,XC,YC,LEVEL,CLAT,CLON,XRAD,YRAD,ITPROJ,
     +    IRES,LTYPTB,LUNDAT,LUNIND,LUNLIN,LTON,IPGRID,DOTEM,
     +    ORHALT
      character*6 curwdb
      common /curwdb/ curwdb
      logical quickd
      common /quickd/ quickd
      integer fntab(17)
      common /fntab/ fntab
      character suffix(6)
      character*6 wdb
      integer itrtab (6)
      integer is

      data IHLLEN/30/
      data HLTAB/0,0,0,0,0,0,0,0,1,0,2,0,3,0,4,0,5,0,6,
     +           0,0,0,0,0,0,0,0,7,0,8/
      data itrtab/1,5,8,11,14,17/
      data suffix/'a','b','c','d','e','f'/
c      1 Most detail
c      2
c      3
c      4
c      5
c      6 Least detail
c
c        Quickdraw
c
c           On
c           Off
c
      rflag = .false.
      qcancl = .false.
      qext2m = .false.
      qretrn = .false.
      qstmnu = .false.
      do 110 ix = 1,6
          if(curwdb(6:6).eq.suffix(ix)) is = ix
  110 continue

c      if (quickd) then
c        call hilite (.true.,7,1,IHLLEN,HLTAB)
c      else
c        call hilite (.true.,8,1,IHLLEN,HLTAB)
c      endif

c      call hilite (.true.,is,1,IHLLEN,HLTAB)

      mysegn = 7
  100 continue
          if (quickd) then
            call hilite (.true.,7,1,IHLLEN,HLTAB)
          else
            call hilite (.true.,8,1,IHLLEN,HLTAB)
          endif
          call hilite (.true.,is,1,IHLLEN,HLTAB)
          call menupr
          call mpick(ichoic,mysegn,ibuttn)
          if (ichoic.ge.1.and.ichoic.le.6) then
              call hilite(.false.,is,1,IHLLEN,HLTAB)
              call hilite(.true.,ichoic,1,IHLLEN,HLTAB)
c             translate input # to only those wdbii versions available
c             set up both quickdraw and regular wdbii level
              is = fntab (itrtab(ichoic))
              wdb = 'wdbii' // suffix(is)
```

```
                 if (wdb.ne.curwdb) then
                     curwdb = wdb
                     call chawdb (6,curwdb)
                 endif
             else if ( (ichoic.eq.7) .and. (.not.quickd) ) then

c    turn on quickdraw

                     call hilite (.false.,8,1,IHLLEN,HLTAB)
                     call hilite (.true.,7,1,IHLLEN,HLTAB)
                     quickd = .true.
                     call hilite (.false.,is,1,IHLLEN,HLTAB)
                     is = is + 2
                     if (is .gt. 6) is = 6
                     wdb = 'wdbii' // suffix(is)
                     if (wdb.ne.curwdb) then
                       curwdb = wdb
                       call chawdb (6,curwdb)
                     endif
                     call hilite (.true.,is,1,IHLLEN,HLTAB)
             else if ( (ichoic.eq.8) .and. (quickd) ) then

c    turn off quickdraw

                     call hilite (.false.,7,1,IHLLEN,HLTAB)
                     call hilite (.true.,8,1,IHLLEN,HLTAB)
                     quickd = .false.
                     call hilite (.false.,is,1,IHLLEN,HLTAB)
                     is = is - 2
                     if (is .lt. 1) is = 1
                     wdb = 'wdbii' // suffix(is)
                     if (wdb.ne.curwdb) then
                       curwdb = wdb
                       call chawdb (6,curwdb)
                     endif
                     call hilite (.true.,is,1,IHLLEN,HLTAB)
             else
                 call check(ibuttn,mysegn,error,rflag)
             endif
             if (sys)
     +       print*,'rslcon--ibuttn mysegn error',ibuttn,mysegn,rflag
        if(.not.rflag) go to 100
c
        return
        end


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      SAVDIS
C
C FUNCTIONAL DESCRIPTION:         .
C
C CALLED BY:                      SUBCAL
C
C PROGRAMMER:                     DATE OF LAST CHANGE    REASON FOR CHANGE
c  S. Lamb                    Feb 1988                 detec chg - savdis
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine savdis

c       save display menu controller

        common /commen/xllmen,yllmen,xurmen,yurmen,ibcmen,iocmen,incmen
        Integer qnextm,HLTAB(21)
        Logical qcancl,qext2m,qretrn,qstmnu
        Common /bl/ qcancl,qext2m,qretrn,qstmnu,qnextm
        logical error,rflag
        logical sys
        common /sysdbc/ sys
        logical bitmod
        common /bitmod/ bitmod
        character*80 filen,line
        character*80 savdes(20)
```

```
      common /savdes/ savdes
      common /maxsav/ maxsav,limsav
      character * 80 retstr
      character*50 defpth
      common /defpth/ defpth
      common /lendef/ lendef
      common /txtsz/ txtsiz
      character*20 savcha
      common /isegn/ isegn

      data savcha/'123456789abcdefghijk'/
      data IHLLEN/21/
      data HLTAB/0,1,2,3,4,5,6,7,8,9,10,11,12,13,14,15,
     + 16,17,18,19,20/

c     SAVE DISPLAY
c     1
c     2
c     3
c     4
c     5
c     6
c     7
c     8
c     9
c    10
c    11
c    12
c    13
c    14
c    15
c    16
c    17
c    18
c    19
c    20

      if (sys) print*,'savdis -- ',maxsav,limsav,'  ',savdes(1)
      rflag = .false.
      qcancl = .false.
      qext2m = .false.
      qretrn = .false.
      qstmnu = .false.

      mysegn = 21
      call menvpt
      call menwin
      call getseg (isegn)
      call jropen (isegn)
      x = xllmen + 2.
      do 110 i=1,maxsav
          call jpkid (i)
          call jcolor (24)
          y = yurmen - 2. - i * 2.
          call jmove (x,y)
          if (sys) print*,'recdis -- ',i,x,y,savdes(i)
          call xsize (1.,1.)
          line = savdes(i)
          call jlstrg (line(1:20))
 110  continue
      call jrclos
      call jdetec(isegn, 1)
 100  continue
      call mesg (1245)
      call npick(ichoic,mysegn,ibuttn,isegn)
      if (ichoic.ge.1.and.ichoic.le.maxsav) then
          call prompt(1219,retstr,25,irchar)
          if (irchar.gt.0) then
              savdes(ichoic) = '                    '
              savdes(ichoic) = retstr(1:irchar)
          endif
          filen = defpth(1:lendef) // 'save'
     +        // savcha(ichoic:ichoic)
          lenfn = lendef + 5
```

```
          if (sys) print*,'savdis -- ',filen(1:lenfn),lenfn
          call mesg(1220)
          call sparam (lenfn,filen,.true.,ierror)
          if (bitmod) call savdat (filen,lenfn)
          qretrn = .true.
          rflag = .true.
      else
          call check(ibuttn,mysegn,error,rflag)
      endif
      if(.not.rflag) go to 100
      call jpurge (isegn)

      return
      end


C+*+*+*+*+*+*+*+*+*+*+*+*+*+*+*+*+*+*+*+*+*+*+*+*+*+*+*+*+*+*+*+*+*+*|*+*+*+*+
C UNIT NAME:                    TRKCON
C
C FUNCTIONAL DESCRIPTION:       :
C
C CALLED BY:                    SUBCAL
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*|*-*-*-*-

      subroutine trkcon

c     this subroutine processes the tracking menu selection

      logical error
      logical rflag
      integer ichoic
      integer lctrak
      integer mysegn
      integer ibuttn
      integer line
      integer lpp
      integer secnds
      real xarray(2)
      real yarray(2)

      logical lton(16), dotem
      integer ipgrid(4)
      integer ltyptb(16)
      integer HLTAB(22)
      common /map/ XRNM,XC,YC,LEVEL,CLAT,CLON,XRAD,YRAD,ITPROJ,
     +    IRES,LTYPTB,LUNDAT,LUNIND,LUNLIN,LTON,IPGRID,DOTEM,
     +    ORHALT
      integer ltypov(16)
      common /gphwdo/xllgeo,yllgeo,xurgeo,yurgeo

      logical ltonov(16),rankt(26,16)
      common /maptoo/ ltypov,ltonov,rankt

      data secnds /0/
      data IHLLEN /22/
      data HLTAB
     +        /0,0,0,0,0,0,1,0,2,0,0,3,0,4,0,5,0,6,0,7,0,8/

c     Tracking Menu
c        TRACKING
c     1     ON
c     2     OFF
c     3 Plot Suppress
c     4 Plot UnSuppress
c     5 Set Fade Time
c     6 Replay Tracks
c     7 Interrogate
c     8 Display Text
c <<<<   9 Time window  >>>>> omitted
```

```
      lctrak = 3
      if (ltonov(lctrak)) then
          line = 1
      else
          line = 2
      endif
      call hilite(.true.,line,1,IHLLEN,HLTAB)

      mysegn = 9
 100  continue
          call menupr

c         choose which line on the menu to hilite

          call mpick(ichoic,mysegn,ibuttn)
          if (ichoic.ge.1.and.ichoic.le.8) then
              if (ichoic .eq. 1 .and. .not. ltonov(lctrak)) then
                  call hilite(.false.,2,1,IHLLEN,HLTAB)
                  call hilite(.true.,ichoic,1,IHLLEN,HLTAB)
                  call ploton
              else if (ichoic .eq. 2 .and. ltonov(lctrak)) then
                  call hilite(.false.,1,1,IHLLEN,HLTAB)
                  call hilite(.true.,ichoic,1,IHLLEN,HLTAB)
                  call pltoff
              else if (ichoic .eq. 3) then
                  call hilite(.true.,ichoic,1,IHLLEN,HLTAB)
                  call pltsup
              else if (ichoic .eq. 4) then
                  call hilite(.true.,ichoic,1,IHLLEN,HLTAB)
                  call pltuns
              else if (ichoic .eq. 5) then
                  call hilite(.true.,ichoic,1,IHLLEN,HLTAB)
                  call setfad
              else if (ichoic .eq. 6) then
                  call hilite(.true.,ichoic,1,IHLLEN,HLTAB)
                  call replay(secnds)
              else if (ichoic .eq. 7) then
                  call hilite(.true.,ichoic,1,IHLLEN,HLTAB)
                  call tquery
              else if (ichoic .eq. 8) then
                  call hilite(.true.,ichoic,1,IHLLEN,HLTAB)

c                 set up extent of page for text display
c                 put parms in for lower left/upper right
c                 and lines per page.

                  xarray(1) = xllgeo + 1.0
                  xarray(2) = xurgeo - 1.0
                  yarray(1) = yllgeo + 1.0
                  yarray(2) = yurgeo - 1.0
c                  lpp = 36
                  lpp = 33
                 call writex(xarray,yarray,lpp)
              endif

cccc              else if (ichoic .eq. 9) then
cccc                  call hilite(.true.,ichoic,1,IHLLEN,HLTAB)
cccc                  call timwin
              if (ichoic .gt. 2) then
                  call hilite(.false.,ichoic,1,IHLLEN,HLTAB)
              endif
          else
              call check(ibuttn,mysegn,error,rflag)
          endif
      if(.not.rflag) go to 100
c     print*,'exit trkcon'
      return
      end
C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: BOXARE
C
C FUNCTIONAL DESCRIPTION:  THIS SUBROUTINE DOES THE BOX AREA CALCUALTIONS
C
C INPUT FILES/PARAMETERS:
```

```
C
C GLOBAL VARIABLES :
C
C OUTPUT FILES/PARAMETERS:  NONE.
C
C SUBROUTINES/FUNCTIONS CALLED : NONE.
C
C CALLED BY:                    GEOCON
C
C LOCAL VARIABLES:
C
C RESTRICTIONS: NONE.
C
C ABNORMAL RETURN CONDITIONS:   NONE.
C
C LOCATION:
C
C PROGRAMMER:                   DATE OF LAST CHANGE     REASON FOR CHANGE
C
C     DAVE NATION                                       ORIGINAL CODE.
C     JERRY FENERTY                                     DOCUMENTATION AND MO
C                                                       FOR A21 PROTOTYPE.
C     Tom Wescott (NOSC)        7/88                    xrnmnw from arc dist.
C
C-*-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE BOXARE

C       THIS SUBROUTINE DOES THE BOX AREA CALCUALTIONS

C       MAP PARAMETERS
        LOGICAL LTON(16),DOTEM
        INTEGER IPGRID(4),LTYPTB(16)
        COMMON /MAP/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT

        integer qdsdev,qpydev,qecho,qlecho
        common /device/ qdsdev,qpydev,qecho,qlecho

        LOGICAL INVALI
        COMMON /INVALI/ INVALI

        LOGICAL map
        common /mapdbc/ map

        LOGICAL vax
        common /vaxdbc/ vax

        INTEGER QCRMNU
        COMMON /B6/ QCRMNU

        INTEGER QFB(26),QMB(4)
        COMMON /BUTONS/ QFB,QMB

        LOGICAL QPREV
        COMMON /PREV/ QPREV

        common /pie/ pie,tpie,pio2,pio4

        COMMON /B1/ QCANCL,QEXT2M,QRETRN,QSTMNU,QNEXTM
        INTEGER QNEXTM
        LOGICAL QCANCL,QEXT2M,QRETRN,QSTMNU

        LOGICAL VALID,ERROR,RFLAG

        ERROR = .FALSE.
        RFLAG = .FALSE.
        MYSEGN = QCRMNU

c       CONVERT MINUTES TO RADIANS BY MULTIPLYING BY CM2RAD
        DATA CM2RAD/2.908882087E-4/
c
        CLA = CLAT
        CLO = CLON
```

```
 20   CONTINUE
      CALL MESG(275)
      CALL GRAVPT
      CALL GEOWIN
      cursbx = 0.
      cursby = 0.
      call jconwv (cursbx,cursby,0.,vx,vy)
      call jpecho (1,2,1,vx,vy)
      CALL LOCGEO (IBUT,X,Y,VALID)
      cursbx = x
      cursby = y
      IF (IBUT.NE.QMB(1)) THEN
          CALL CHECK(IBUT,MYSEGN,ERROR,RFLAG)
          IF (ERROR) THEN
              CALL MESG(2)
              CALL PAWS
          ENDIF
          IF (RFLAG) GOTO 66
          GOTO 20
      ENDIF
      IF (map)
     + PRINT*,'IN BOXARE FIRST POINT IS ',VALID
      IF (VALID) GOTO 35
      CALL MESG(288)
      CALL PAWS
      GOTO 20

 35   CONTINUE
      CALL MESG(276)
      CALL GRAVPT
      CALL GEOWIN
      call jconwv (cursbx,cursby,0.,vx,vy)
      call jpecho (1,2,1,vx,vy)
c     --save echo type; set for Rectangle (except for vax)
      ijkl = qlecho
      qlecho = 6
      if (vax) qlecho = 2
      CALL LOCGEO (IBUT,X2,Y2,VALID)
      qlecho = ijkl
      IF (IBUT.NE.QMB(1)) THEN
          CALL CHECK(IBUT,MYSEGN,ERROR,RFLAG)
          IF (ERROR) THEN
              CALL MESG(2)
              CALL PAWS
          ENDIF
          IF (RFLAG) GOTO 66
          GOTO 35
      ENDIF

      IF (map)
     + PRINT*,'IN BOXARE SECOND POINT IS ',VALID
      IF (VALID) GOTO 45
      CALL MESG(288)
      CALL PAWS
      GOTO 35

 45   CONTINUE
      YC = (Y+Y2)/2.
      XC = (X+X2)/2.
c
      CALL INITIA(XC,YC,CLAT,CLON,XRAD,YRAD,ITPROJ,IRES,XRNM,
     +            ORHALT)
      CALL XYTOLL(XC,YC,CLAT,CLON)

      IF (INVALI) THEN
          IF (map)
     +     PRINT*,'BOXARE CONVERSION OF CENTER POINT IS NOT POSSIBLE'
          CALL MESG(288)
          CALL PAWS
          CLAT=CLA
          CLON=CLO
          GOTO 20
      ENDIF
```

```
ctfw    CALL XYTOLL(X,YC,CLA2,CLO2)
        call xytoll(x,y,cla2,clo2)

        IF (INVALI) THEN
            IF (map)
     +       PRINT*,'BOXARE CONVERSION OF SECOND POINT IS NOT POSSIBLE'
            CALL MESG(288)
            CALL PAWS
            CLAT=CLA
            CLON=CLO
            GOTO 20
        ENDIF
ctfw    XRNMNW = ABS(CLON-CLO2)/CM2RAD
ctfw
ctfw    Set map radius to arc distance of box semi-major axis.
        call ll2da(clat,clon,cla2,clo2,rdist,az,range,bering)
        xdist = abs(rdist*sin(az))
        ydist = abs(rdist*cos(az))
        dist = amax1(xdist,ydist)
        xrnmnw = dist/cm2rad
ctfw
        CALL CHSCAL (XRNMNW)
        QPREV = .TRUE.

        CALL UPDTMP

 66     CONTINUE
        QRETRN = .FALSE.
        RETURN
        END


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    DISTAN
C
C FUNCTIONAL DESCRIPTION:       .
C
C CALLED BY:                    GEOCON
C
C PROGRAMMER:                   DATE OF LAST CHANGE     REASON FOR CHANGE
C Tom Wescott (NOSC)            Mar 89                  improve accuracy
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine distan

c       calculate the distance between two points and display

        COMMON /PIE/ PIE,TPIE,PIO2,PIO4
        COMMON /ER/ ER,ERD
        REAL*8 ERD
c       map parameters
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        logical valid
        common /comsys/ xllsys,yllsys,xursys,yursys,ibcsys,iocsys
        COMMON /RADE/RADE
        common /comgvp/ xllgvp,yllgvp,xurgvp,yurgvp
        common /ctext/ igrtxt,isytxt,iantxt
        character*80 line,blanks
        character*72 amptxt(4)
        integer qdsdev,qpydev,qecho,qlecho
        common /device/ qdsdev,qpydev,qecho,qlecho
        INTEGER QFB(26),QMB(4)
        COMMON /BUTONS/ QFB,QMB
        COMMON /B1/ QCANCL,QEXT2M,QRETRN,QSTMNU,QNEXTM
        INTEGER QNEXTM
        LOGICAL QCANCL,QEXT2M,QRETRN,QSTMNU
        LOGICAL ERROR,RFLAG
        common/llseg/llsgmt,llfrst
        integer llsgmt
        logical llfrst
```

```
      integer dstsg1,dstsg2,dstsg3
      logical dstfst
      common/mrkseg/dstsg1,dstsg2,dstsg3,dstfst

      data cdg2ml/69./, cml2km/1.60934/, cnm2mi/1.1508/
      data blanks/'                                  '/
      data x1,y1 / 0.,0. /
C
C THE FOLLOWING TWO DATA STATEMENTS WERE USED TO ADD THE DISPLAY OF
C DISTANCE/AZ BEARING TO SCREEN
C
      data ernm /3440.34/
      data steps /60/

      valid = .true.

      ERROR = .FALSE.
      RFLAG = .FALSE.
      MYSEGN = QCRMNU
      isytxt = 16
 10   call mesg (1201)
      call jvport (xllgvp,xurgvp,yllgvp,yurgvp)
      call jwindo (-xrad,xrad,-yrad,yrad)
      call jconwv (x1,y1,0.,vx,vy)
      call jpecho (1,2,1,vx,vy)
      call locgeo (ibutn,x1,y1,valid)
c
      IF (IBUTN.NE.QMB(1)) THEN
          CALL CHECK(IBUTN,MYSEGN,ERROR,RFLAG)
          IF (ERROR) THEN
              CALL MESG(2)
              CALL PAWS
          ENDIF
          IF (RFLAG) GOTO 66
          GOTO 10
      ENDIF
c
      if (.not. valid) then
        call mesg(288)
        call paws
        goto 10
      endif
      IF(.NOT. DSTFST)THEN
           CALL JPURGE(DSTSG1)
           CALL JPURGE(DSTSG2)
           CALL JPURGE(DSTSG3)
      ELSE
          CALL GETSEG(DSTSG1)
          CALL GETSEG(DSTSG2)
          CALL GETSEG(DSTSG3)
          DSTFST = .FALSE.
      END IF
      IF(.NOT. LLFRST)THEN
           CALL JPURGE(LLSGMT)
c ----- updated 7/31/87 CSL
           llfrst = .true.
      END IF
      CALL JROPEN(dstsg1)
      CALL JCMARK(4)
      CALL XCOLOR(32)
      CALL jmark (x1,y1)
      CALL JRCLOS
c
      CALL XYTOLL(X1,Y1,plat,plon)
 20   call mesg (1202)
      call jvport (xllgvp,xurgvp,yllgvp,yurgvp)
      call jwindo (-xrad,xrad,-yrad,yrad)
      call jconwv (x1,y1,0.,vx,vy)
      call jpecho (1,2,1,vx,vy)
c     --save echo type; set for Rubberband line
      ijkl = qlecho
      qlecho = 2
      call locgeo (ibutn,x2,y2,valid)
      qlecho = ijkl
```

```
c
      IF (IBUTN.NE.QMB(1)) THEN
          CALL CHECK(IBUTN,MYSEGN,ERROR,RFLAG)
          IF (ERROR) THEN
              CALL MESG(2)
              CALL PAWS
          ENDIF
          IF (RFLAG) THEN
c     -- purge the segment containing first marker
             CALL JPURGE(DSTSG1)
c     -- open & close segs so purges (upon reentry) don't fail
             CALL JROPEN(DSTSG1)
             CALL JRCLOS
             CALL JROPEN(DSTSG2)
             CALL JRCLOS
             CALL JROPEN(DSTSG3)
             CALL JRCLOS
             GOTO 66
          ELSE
             GOTO 20
          ENDIF
      ENDIF
      if (.not. valid) then
        call mesg(288)
        call paws
        goto 20
      endif
      CALL JROPEN(dstsg2)
      CALL JCMARK(4)
      CALL XCOLOR(32)
      CALL JMARK(X2,Y2)
      CALL JRCLOS
c
      CALL XYTOLL(X2,Y2,plat2,plon2)
C
      call ll2da(plat,plon,plat2,plon2,dist,az,range,bering)
      degazi = bering
      rnmiles = range
      rmiles = rnmiles * cnm2mi
      rkilom = rmiles * cml2km
C
C   FOLLOWING CHANGES (ADDITON OF NEXT 8 LINES) WERE NECESSARY TO DISPLAY
C   THE DISTANCE/AZIMUTH BEARING ARC BETWEEN THE TWO POINTS (RPSMITH 11/87)
C
      RINC = XRNM / (ERNM * STEPS)
      AZMTH = DEGAZI / RADE
      RANGE = DIST / RADE
      CALL JROPEN (dstsg3)
      CALL XCOLOR (32)
      iacc = 1
      call plotgc (plat,plon,AZMTH,RANGE,RINC,itproj,iacc)
      CALL JRCLOS
      line = ' '
      line = ' '
      line(1:8) = 'Points: '
      iegeo = 0
      call formt (plat,plon,iegeo,line(9:24))
      iegeo = 0
      call formt (plat2,plon2,iegeo,line(28:43))
      line(25:27) = ' - '
      amptxt(1) = line
      line = ' '
      write(line(1:8),1100) rnmiles
 1100 format(f8.2)
      line(10:13) = 'NM  '
      write(line(14:22),1100) rmiles
      line(24:27) = 'MI  '
      write(line(28:36),1100) rkilom
      line(38:39) = 'KM'
      amptxt(2) = line
      line = ' '
      write(line(1:8),1100) degazi
      line(10:25) = 'Degrees azimuth'
      amptxt(3) = line
```

```
      call clrcom
      call drwamp (amptxt,3)

 66   CONTINUE
      QRETRN = .FALSE.
      return
      end

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   FCHAZU
C
C FUNCTIONAL DESCRIPTION:      Updates azimuth of central great circle for
C                              oblique conics.
C INPUT FILES/PARAMETERS:
C
C GLOBAL VARIABLES:            None.
C
C OUTPUT FILES/PARAMETERS:     az    -  Azumuth, degrees.
C                              azlat -  Latitude where azimuth specified.
C
C SUBROUTINES CALLED:          None.
C
C CALLED BY:                    FCHSCA
C
C LOCAL VARIABLES:             None.
C
C RESTRICTIONS:                None.
C
C ABNORMAL RETURN CONDITIONS:  None.
C
C PROGRAMMER:                  DATE OF LAST CHANGE     REASON FOR CHANGE
C     Tom Wescott (NOSC)       May 88                  Original entry.
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine fchazu
c
      character*25 retstr
      character*1 str(25)
      equivalence (retstr,str)
      character chr
      common /center/ clat,clon,cclat,sclat
      common /proj/itproj,wmrad,xoffs,yoffs,scalr,notlst
      common /oblm/ polat,polon,az,azlat,gamma,xshift
      parameter(D2R = 3.14159/180.0)
      logical chazsp
      common /chazsp/ chazsp
c
c
*-------------------------------------------------------------------------|--+
* Itproj:  1  2  3  4  5  6  7  8  9 10 11 12 13 14 15 16 17 18 19 20 21  |
*-------------------------------------------------------------------------+
*          g  o  o  o  p  e  m  l  a  a  a  k  m  o  p  p  u  s  s        |
*          n  r  r  r  e  q  e  a  l  z  z  a  i  b  o  o  t  i  t        |
*          o  e  p  t  r  r  r  m  b  e  e  v  l  l  s  l  m  n  e        |
*          m  q  o  h  s  e  c  c  r  a  d  r  l  m  t  y  z  u  r        |
*-------------------------------------------------------------------------+
      goto(1,01,01,01,01,01,01,01,01,01,01,01,01,02,01,01,01,01,01
     +    )itproj
c
c     Case 1:  Map is not oblique, set default azumuth for next map.
 1       continue
         az = 0.0
         azlat = 0.0
         go to 99
c
c     Case 2:  Map is oblique, Allow user to override last values.
 2       continue
c        Prompt user for great circle azimuth.
         call prompt(1212,retstr,25,irchar)
         if (irchar.gt.0) then
            call ascint (retstr,iazu,irchar,ierror)
            if(ierror.eq.0) then
```

```
                chazsp = .true.
                az = iazu*D2R
c               Prompt for latitude of azimuth specification.
                call prompt(1213,retstr,25,irchar)
                if (irchar.gt.0) then
                   isign = +1
                   chr = str(irchar)
                   if (chr .eq. 'N' .or. chr .eq. 'n') then
                      irchar = irchar - 1
                   elseif (chr .eq. 'S' .or. chr .eq. 's') then
                      isign = -1
                      irchar = irchar - 1
                   endif
                endif
                if (irchar.gt.0) then
                   call ascint (retstr,iazl,irchar,ierror)
                   if (ierror.eq.0) then
                      azlat = isign*iazl*D2R
                   else
                      azlat = clat
                   endif
                endif
             endif
          endif
c
c         Use Law of Sines to verify that the specified great circle reaches
c         to map center latitude.  If not, alert user to the situation.
          sinAZC = sin(Az)*cos(azlat)/cos(clat)
          if (abs(sinAZC).gt.1.0) call mesg(1214)
c
          go to 99
c
 99       continue
c      End Cases
c
       return
       end


C+++++++++++++++++++++++++++++++++++++++++++++++++++++++++++++++++++|++++++++
C UNIT NAME:                    FCHSCA
C
C FUNCTIONAL DESCRIPTION:       .
C
C CALLED BY:                    GEOCON
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*|*-*-*-*-

        subroutine fchsca

c       change scale and center point function

        character * 25 retstr
        logical rflag

        common /const/ maxval,rmpv,c,r,ernm
        LOGICAL QLTON(16),QDOTEM
        INTEGER QPGRID(4),QTYPTB(16)
        INTEGER QLEVEL,QITPRO,QIRES,QLUNDA,QLUNIN,QLUNLI
        COMMON /MAP/ QXRNM,QXC,QYC,QLEVEL,QCLAT,QCLON,QXRAD,QYRAD,
     +     QITPRO,
     +     QIRES,QTYPTB,QLUNDA,QLUNIN,QLUNLI,QLTON,QPGRID,QDOTEM,
     +     QORHAL
        logical chazsp
        common /chazsp/ chazsp
c
c
c               Change scale value and center point
                CALL PROMPT(1204,retstr,25,irchar)
                call offst (rflag)
                if (irchar.gt.0) then
                    call ascint (retstr,ixr,irchar,ierror)
```

```
                    if(ixr.gt.0.and.ierror.eq.0) then
                        if (qitpro .ne. 5) then
c                          User input is viewport width in nm.
                           xrnmnw = ixr/2
                        else
c                          Interpret user input as perspective altitude,
c                          and calculate corresponding viewport width.
                           qorhal = ixr
                           ah = asin(ernm/(qorhal+ernm))
                           er = asin(1.0) - ah
                           xrnmnw = er*ernm
                        endif
                        call chscal (xrnmnw)
                    endif
                endif
c
                chazsp = .false.
c               Update conic std parallels.
                call fchspl
c               Update oblique conic tilt angle.
                call fchazu
c
                if (.not.rflag.or.irchar.gt.0.or.chazsp) then
                   call drwmap
                endif

        return
        end

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      FCHSPL
C
C FUNCTIONAL DESCRIPTION:         Updates conic standard parallels
C                                 to map center or to user input.
C
C INPUT FILES/PARAMETERS:         ispl -  User input, degrees.
C
C GLOBAL VARIABLES:               None.
C
C OUTPUT FILES/PARAMETERS:        spll1,spll2  - Standard parallels, radians.
C
C SUBROUTINES CALLED:             None.
C
C CALLED BY:                       FCHSCA
C
C LOCAL VARIABLES:                None.
C
C RESTRICTIONS:                   None.
C
C ABNORMAL RETURN CONDITIONS:     None.
C
C PROGRAMMER:                     DATE OF LAST CHANGE      REASON FOR CHANGE
C     Tom Wescott (NOSC)          Dec 88                   Original entry.
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine fchspl
c
      character*25 retstr
      character*1 str(25)
      equivalence (retstr,str)
      character chr
      common /center/ clat,clon,cclat,sclat
      common /proj/itproj,wmrad,xoffs,yoffs,scalr,notlst
      common /conic/ spll1,spll2,tranl,trank,tranr,tscale,pole,tilt
      logical chazsp
      common /chazsp/ chazsp
c
c
*-----------------------------------------------------------------------|--+
* Itproj:  1  2  3  4  5  6  7  8  9 10 11 12 13 14 15 16 17 18 19 20 21  |
*--------------------------------------------------------------------------+
*          g  o  o  o  p  e  m  l  a  a  a  k  m  o  p  p  u  s  s        |
*          n  r  r  e  q  e  a  l  z  z  a  i  b  o  o  t  i  t           |
```

```
*         o e p t r r r m b e e v l l s l m n e           |
*         m q o h s e c c r a d r l m t y z u r           |
*-----------------------------------------------------------------------+
      goto(1,01,01,01,01,01,01,02,02,01,01,02,01,01,01,01,01,01,01
     +    )itproj
c
c     Case 1:  Map is not a conic, prepare default parallels for next conic.
 1        continue
          splll = clat
          spll2 = splll
          go to 99
c
c     Case 2:  Map is a conic, Allow user to override last values.
 2        continue
          d2r = 3.14159/180.
c
c         Prompt user for first parallel.
          call prompt(1248,retstr,25,irchar)
          if (irchar.gt.0) then
             isign = +1
             chr = str(irchar)
             if (chr .eq. 'N' .or. chr .eq. 'n') then
                irchar = irchar - 1
             elseif (chr .eq. 'S' .or. chr .eq. 's') then
                isign = -1
                irchar = irchar - 1
             endif
          endif
          if (irchar.gt.0) then
             call ascint (retstr,ispl,irchar,ierror)
             if(ierror.eq.0) then
                chazsp = .true.
                splll = isign*ispl*d2r
c
c               Set new default 2nd parallel and prompt again.
                spll2 = splll
                call prompt(1249,retstr,25,irchar)
                if (irchar.gt.0) then
                   isign = +1
                   chr = str(irchar)
                   if (chr .eq. 'N' .or. chr .eq. 'n') then
                      irchar = irchar - 1
                   elseif (chr .eq. 'S'.or. chr .eq. 's') then
                      isign = -1
                      irchar = irchar - 1
                   endif
                endif
                if (irchar.gt.0) then
                   call ascint (retstr,ispl,irchar,ierror)
                   if (ierror.eq.0) then
                      spll2 = isign*ispl*d2r
                   endif
                endif
             endif
          endif
          go to 99
c
 99       continue
c     End Cases
c
      return
      end


C++++++++++++++++++++++++++++++++++++++++++++++++++++++++++++++|+++++++
C UNIT NAME:                        LLCENT
C
C FUNCTIONAL DESCRIPTION:           .
C
C CALLED BY:                        OFFST
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*|*-*-*-*-
```

```
      subroutine llcent (rflag)

c     this subroutine prompts for a new center of the map in
c     lat/lon format (jit)

      integer         err
      integer         qires
      integer         qitpro
      integer         qlevel
      integer         qlunda
      integer         qlunin
      integer         qlunli
      integer         qpgrid(4)
      integer         qtyptb(16)

      real            lat
      real            lon

      character*50    strng

      logical         qlton(16)
      logical         qdotem
      logical         rflag

      common /map/ qxrnm, qxc, qyc, qlevel, qclat, qclon,
     +             qxrad, qyrad, qitpro, qires, qtyptb, qlunda,
     +             qlunin, qlunli, qlton, qpgrid, qdotem, qorhal

   10 continue
      call prompt(1243, strng, 50, len)

c     if there is a value and not just <ret>

      if (len .gt. 0) then
         call tocaps(strng,len)
         call lltord(strng(1:len), len, lat, lon, err)
         if (err .gt. 0) then
             call mesg(1244)
             call paws
             goto 10
         endif

c        change map parameters to new center coordinates

         qclat = lat
         qclon = lon
c         call updtmp
      else
          rflag = .true.
      endif

      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME: LLSHOW
C
C FUNCTIONAL DESCRIPTION:  LLSHOW IS RESPONSIBLE FOR PRINTING THE LATITUDE
C                          AND LONGITUDE OF A POINT ON THE MAP
C                          IN THE COMMUNICATIONS AREA.
C
C INPUT FILES/PARAMETERS:  NONE.
C
C GLOBAL VARIABLES :
C
C       QFB(26)                INTEGER      FUNCTION BUTTON VALUES
C       QMAPUP                 LOGICAL      INDICATES WHETHER MAP IS CURRENTLY
C                                           DISPLAYED.
C       INVALI                 LOGICAL      INDICATES IF POINT CHOSEN WAS
C                                           CONVERTED FROM X,Y TO LAT/LONG.
C
```

```
C OUTPUT FILES/PARAMETERS:  NONE.
C
C SUBROUTINES/FUNCTIONS CALLED : MESG
C
C        MESG                PRINTS MESSAGE IN COMMUNICATIONS AREA.
C        PAWS                PAUSES TILL USER INPUT.
C        GEOWIN              SETS GEOGRAPHIC WINDOW.
C        GRAVPT              SETS GEOGRAPHIC VIEWPORT.
C        LOCGEO              RETURNS WORLD COORDINATES OF POINT PICKED
C                            BY THE USER. (GEOGRAPHIC AREA)
C        XYTOLL              CONVERTS X,Y TO LAT/LONG.
C        FORMT               FORMATS RADIANS INTO LAT/LONG STRING.
C        MESSAG              PRINTS CHARACTER STRING IN COMMUNICATIONS
C                            AREA.
C
C CALLED BY: CHECK.
C
C LOCAL VARIABLES:
C
C      XLAT                  REAL         LATITUDE OF POINT.
C      XLON                  REAL         LONGITUDE OF POINT.
C      GEOSTR                CHARACTER*20 LAT/LONG STRING RETURNED FROM FORMT.
C      STRING                CHARACTER*80 MESSAGE TO BE PRINTED IN
C                                              COMMUNICATIONS AREA.
C      VALID                 LOGICAL      INDICATES WHETHER POINT CHOSEN IS
C                                              IN MAP AREA.
C      IEGEO                 INTEGER      ERROR CONDITION FROM FORMT.
C
C RESTRICTIONS: NONE.
C
C ABNORMAL RETURN CONDITIONS:   NONE.
C
C LOCATION:                     /u1/a21/gjf/LLSHOW.FTN
C
C PROGRAMMER:                   DATE OF LAST CHANGE     REASON FOR CHANGE
C
C    GJFenerty
c  L McCleary                   1987           call jpecho - llshow
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE LLSHOW

C  SUBROUTINE TO DETERMINE THE LAT/LONG COORDINATES OF A POINT ON
C  THE MAP.

      INTEGER QFB(26),QMB(4)
      COMMON /BUTONS/ QFB,QMB

      LOGICAL QMAPUP
      COMMON /MAPUP/ QMAPUP

      LOGICAL INVALI
      COMMON /INVALI/ INVALI

      INTEGER QCRMNU
      COMMON /B6/ QCRMNU

      COMMON /B1/ QCANCL,QEXT2M,QRETRN,QSTMNU,QNEXTM
      INTEGER QNEXTM
      LOGICAL QCANCL,QEXT2M,QRETRN,QSTMNU
      common/llseg/llsgmt,llfrst
      integer llsgmt
      logical llfrst
      integer dstsg1,dstsg2,dstsg3
      logical dstfst
      common/mrkseg/dstsg1,dstsg2,dstsg3,dstfst

      REAL XLAT,XLON
      CHARACTER*20 GEOSTR
      CHARACTER*80 STRING
      LOGICAL VALID,ERROR,RFLAG
      INTEGER IEGEO
```

```
      data x,y /0.,0./

      MYSEGN = QCRMNU
      RFLAG = .FALSE.
      ERROR = .FALSE.

      STRING(1:80) = ' '
      GEOSTR = ' '
      IEGEO = 0
      STRING(1:29) = 'The LAT/LONG coordinates are '
44    CONTINUE
      CALL MESG(297)
      CALL GEOWIN
      CALL GRAVPT
      call jconwv (x,y,0.,vx,vy)
      call jpecho (1,2,1,vx,vy)
      CALL LOCGEO (IBUT,X,Y,VALID)

C     ** IF LEAVE BUTTON EXIT SUBROUTINE           **
C     ** IF PICK IS INVALID, PRINT ERROR MESSAGE **
C     ** AND ALLOW USER TO REPICK POINT.           **

      IF (IBUT.NE.QMB(1)) THEN
          CALL CHECK(IBUT,MYSEGN,ERROR,RFLAG)
          IF (ERROR) THEN
              CALL MESG(2)
              CALL PAWS
          ENDIF
          IF (RFLAG) GOTO 66
          GOTO 44
      ENDIF

      IF (VALID) GOTO 38
      CALL MESG(288)
      CALL PAWS
      GOTO 44

38    CONTINUE
      CALL GEOWIN
      CALL GRAVPT

C CONVERT X,Y TO LAT/LONG (RADIANS) THEN TO DDMMSS TYPE CHARACTER STRING.

      CALL XYTOLL(X,Y,XLAT,XLON)

      IF (.NOT.INVALI) THEN
          IF(.NOT. DSTFST)THEN
             CALL JPURGE(DSTSG1)
             CALL JPURGE(DSTSG2)
             CALL JPURGE(DSTSG3)
c ----- updated 7/31/87 CSL                                - llshow
             dstfst = .true.
          END IF
          IF(LLFRST)THEN
              CALL GETSEG(LLSGMT)
              LLFRST = .FALSE.
          ELSE
              CALL JPURGE(LLSGMT)
          END IF
          CALL JROPEN(LLSGMT)
          CALL JCMARK(4)
          CALL XCOLOR(104)
          CALL JMARK(X,Y)
          CALL JRCLOS

          CALL FORMT (XLAT,XLON,IEGEO,GEOSTR)

C IF THERE ARE NO CONVERSION ERRORS PRINT CHARACTER STRING.

          IF (IEGEO.EQ.0) THEN

              STRING(30:50) = GEOSTR
              CALL MESSAG(STRING,50,1)
```

```
              CALL JOPEN
              CALL JCMARK(4)
              CALL XCOLOR(104)
              CALL JMARK(X,Y)
              CALL JCLOSE

          ELSE

c            PRINT*,'ERROR IN LLIMIT',IEGEO,GEOSTR
             CALL MESG(288)
             CALL PAWS

          ENDIF

      ELSE

          CALL MESG(288)
          CALL PAWS

      ENDIF

 66   CONTINUE

      QRETRN = .FALSE.

      RETURN
      END

C+*+*+*+*+*+*+*+*+*+*+*+*+*+*+*+*+*+*+*+*+*+*+*+*+*+*+*+*+*+*+*+*+*|*+*+*+*+
C UNIT NAME: OFFST
C
C FUNCTIONAL DESCRIPTION:  OFFSETS CENTER POINT OF MAP.
C
C INPUT FILES/PARAMETERS:  NONE.
C
C GLOBAL VARIABLES :
C
C       QFB                   INTEGER(26) FUNCTION BUTTON VALUES.
C       INVALI                LOGICAL     INDICATES WHETHER CONVERSION
C                                         WAS INVALID.
C       QXC                   REAL        X CENTER OF MAP (WORLD COORD.).
C       QYC                   REAL        Y CENTER OF MAP (WORLD COORD.).
C       QCLAT                 REAL        LATITUDE AT CENTER (RADIANS).
C       QCLON                 REAL        LONGITUDE AT CENTER (RADIANS).
C       QXRAD                 REAL        WIDTH OF HALF OF VIEWPORT.
C       QYRAD                 REAL        HEIGTH OF HALF OF VIEWPORT.
C       QITPRO                INTEGER     CURRENT PROJECTION.
C       QIRES                 REAL        RESOLUTION.
C       QXRNM                 REAL        RADIUS OF MAP (NAUTICAL MILES).
C       QORHAL                REAL        ALTITUDE FOR PERSPECTIVE PROJECTIO
C
C
C OUTPUT FILES/PARAMETERS:  NONE.
C
C SUBROUTINES/FUNCTIONS CALLED :
C
C       GRAVPT                SETS GEOGRAPHY VIEWPORT.
C       GEOWIN                SETS GEOGRAPHY WINDOW.
C       MESG                  PUTS MESSAGE IN COMMUNICATIONS AREA.
C       PAWS                  CAUSES PAUSE IN PROGRAM.
C       LOCGEO                PERFORMS LOCATE IN GEOGRAPHIC AREA.
C       RDRAW                 REDRAWS MAP.
C       XYTOLL                CONVERTS X,Y TO LAT,LONG.
C       INITIA                INITIALIZES MAP PARAMETERS.
C
C CALLED BY:                    FCHSCA
C
C LOCAL VARIABLES:
C
C       VALID                 LOGICAL     INDICATES IF LOCATE WAS LEGAL.
C       IBUT                  INTEGER     BUTTON USED TO TRIGGER LOCATE.
C       X                     REAL        X COORDINATE OF LOCATE.
```

```
C        Y                    REAL         Y COORDINATE OF LOCATE.
C
C RESTRICTIONS: NONE.
C
C ABNORMAL RETURN CONDITIONS:   NONE.
C
C LOCATION:                     /a21/gjf/MAPSRC.FTN
C
C PROGRAMMER:                   DATE OF LAST CHANGE    REASON FOR CHANGE
C
C     DAVE NATION                                      ORIGINAL CODE.
C     JERRY FENERTY                                    DOCUMENT AND MODIFY
C                                                      FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE OFFST (rflag)

C       ALLOWS THE OPERATOR TO OFFSET THE CENTER POINT OF A MAP (not redrawn

C       MAP PARAMETERS

        LOGICAL QLTON(16),QDOTEM
        INTEGER QPGRID(4),QTYPTB(16)
        INTEGER QLEVEL,QITPRO,QIRES,QLUNDA,QLUNIN,QLUNLI

        COMMON /MAP/ QXRNM,QXC,QYC,QLEVEL,QCLAT,QCLON,QXRAD,QYRAD,
     +      QITPRO,
     +      QIRES,QTYPTB,QLUNDA,QLUNIN,QLUNLI,QLTON,QPGRID,QDOTEM,
     +      QORHAL
        LOGICAL INVALI
        COMMON /INVALI/ INVALI

        INTEGER QFB(26),QMB(4)
        COMMON /BUTONS/ QFB,QMB
        integer qdsdev,qpydev,qecho,qlecho
        common /device/ qdsdev,qpydev,qecho,qlecho
        COMMON /B1/ QCANCL,QEXT2M,QRETRN,QSTMNU,QNEXTM
        INTEGER QNEXTM
        LOGICAL QCANCL,QEXT2M,QRETRN,QSTMNU

        INTEGER QCRMNU
        COMMON /B6/ QCRMNU

        LOGICAL QPREV
        COMMON /PREV/ QPREV

        LOGICAL VALID,RFLAG,ERROR

        data curscx,curscy / 0.,0. /

        ierror = 0
        RFLAG = .FALSE.
        ERROR = .FALSE.
        MYSEGN = QCRMNU

        CLA=QCLAT
        CLO=QCLON

  20    CALL MESG(274)
        CALL GRAVPT
        CALL GEOWIN
        call jconwv (curscx,curscy,0.,vx,vy)
        call jpecho (1,2,1,vx,vy)
        ijkl = qlecho
c       --save echo type; set for Rubberband line
        qlecho = 2
        CALL LOCGEO (IBUT,X,Y,VALID)
        qlecho = ijkl
        IF (IBUT.NE.QMB(1)) THEN
            CALL CHECK(IBUT,MYSEGN,ERROR,RFLAG)
            IF (ERROR) THEN
                CALL MESG(2)
                CALL PAWS
```

```
          ENDIF
c
c         If <F8> is pressed, then go on to center by lat/lon
c         selection.  Would exit from there.
c
          IF (RFLAG) THEN
             rflag = .false.
             CALL LLCENT (rflag)
             GOTO 66
          ENDIF
          GOTO 20
       ENDIF
       IF (VALID) GOTO 35
       CALL MESG(288)
       CALL PAWS
       GOTO 20

 35    continue
c 35   CALL INITIA(QXC,QYC,QCLAT,QCLON,QXRAD,QYRAD,QITPRO,QIRES,QXRNM,
c    +            QORHAL)
       CALL XYTOLL(X,Y,QCLAT,QCLON)

       IF (INVALI) THEN

c           PRINT*,'CONVERSION OF NEW CENTER POINT IS
c    +  NOT NOW POSSIBLE'
          QCLAT=CLA
          QCLON=CLO
          CALL MESG(288)
          CALL PAWS
          GOTO 20

       ELSE

         QPREV = .TRUE.

       ENDIF

 66    CONTINUE
       QRETRN = .FALSE.
       RETURN
       END

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   RANGER
C
C FUNCTIONAL DESCRIPTION:      MMI for range rings/radials about selected point.
C
C INPUT FILES/PARAMETERS:      User input position, range, #rings, #lines
C
C GLOBAL VARIABLES:            None.
C
C OUTPUT FILES/PARAMETERS:     Graphic segment.
C
C SUBROUTINES CALLED:
C
C CALLED BY:                   ovrcon
C
C LOCAL VARIABLES:
C
C RESTRICTIONS:                Currently does not redraw like other overlays
C                              as ring data are not saved in parameter file.
C
C PROGRAMMER:                  DATE OF LAST CHANGE      REASON FOR CHANGE
C     Tom Wescott (NOSC)       Jul 88                   Original entry.
C     L. McCleary (NOSC)       Mar 89                   Modify MMI
C
C-*-*-*-*-*-*-*-*-*-*-*-*-*-*-*-*-*-*-*-*-*-*-*-*-*-*-*-*-*-*-*-*-*-*-*|*-*-*-*-
c
      subroutine ranger
c
      INTEGER QFB(26),QMB(4)
      COMMON /BUTONS/ QFB,QMB
```

```
      logical valid
      logical rflag, error
      character * 25 retstr
      character * 50 strng
      common /ctext/ igrtxt,isytxt,iantxt
      integer rrgseg
      common /rrgseg/ rrgseg
      data rrgseg /0/
      data ixrnm / 100 /
      data nrings,nlines / 5,8 /

      rflag = .false.
      error = .false.

      rrx = 0.
      rry = 0.
c
c     Get center point for range rings.
c
   10 continue
      call mesg(10)
      call gravpt
      call geowin
      call getseg(rrgseg)
      call jconwv(rrx,rry,0.,vx,vy)
      call jpecho(1,2,1,vx,vy)
      call locgeo(ibutn,rrx,rry,valid)
      IF (IBUTN.NE.QMB(1)) THEN
          CALL CHECK(IBUTN,rrgseg,ERROR,RFLAG)
          IF (ERROR) THEN
              CALL MESG(2)
              CALL PAWS
          ENDIF
          IF (RFLAG) THEN
              rflag = .false.
              call prompt(11, strng, 50, len)
              if (len .gt. 0) then
                  call tocaps(strng,len)
                  call lltord(strng(1:len), len, rrlat, rrlon, llerr)
                  if (llerr .gt. 0) then
                      call mesg(1244)
                      call paws
                      goto 10
                  endif
              else
                  rflag = .true.
                  go to 900
              endif
              GOTO 16
          ENDIF
          GOTO 10
      ENDIF

      IF (.not.VALID) then
          CALL MESG(288)
          CALL PAWS
          GOTO 10
      endif

      call xytoll(rrx,rry,rrlat,rrlon)
c
c     Specify range incr, nrings, nlines
c
   16 continue
      call prompt(16,retstr,25,irchar)
      if (irchar.gt.0) then
         call ascint (retstr,ixrnm,irchar,ierror)
         if (ixrnm.le.0.or.ierror.ne.0) then
            call mesg(19)
            call paws
            go to 16
         endif
      endif
c
```

```
   17 continue
      call prompt(17,retstr,25,irchar)
      if (irchar.gt.0) then
         call ascint (retstr,nrings,irchar,ierror)
         if (nrings.lt.0.or.ierror.ne.0) then
            call mesg(19)
            call paws
            go to 17
         endif
      endif
c
   18 continue
      call prompt(18,retstr,25,irchar)
      if (irchar.gt.0) then
         call ascint (retstr,nlines,irchar,ierror)
         if (nlines.lt.0.or.ierror.ne.0) then
            call mesg(19)
            call paws
            go to 18
         endif
      endif

      call gravpt
      call geowin
      call jropen(rrgseg)
      call xcolor (igrtxt)
c
      call rngrin (rrlon,rrlat,ixrnm,nrings,nlines)

      call jrclos
c
c     allow another ring to be drawn
      goto 10
c
 900  continue
c
      return
      end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     SATCOV
C
C FUNCTIONAL DESCRIPTION:        Draws satellite coverage area.
C
C INPUT FILES/PARAMETERS:        User input position, altitude,
C                                field of view, look angle from nadir,
C                                azimuth of look angle
C
C GLOBAL VARIABLES:              None.
C
C OUTPUT FILES/PARAMETERS:       Graphic segment.
C
C SUBROUTINES CALLED:            ftprnt
C
C CALLED BY:                     ovrcon
C
C LOCAL VARIABLES:
C
C RESTRICTIONS:                  Currently does not redraw like other overlays
C                                as data are not saved in parameter file.
C
C PROGRAMMER:                    DATE OF LAST CHANGE      REASON FOR CHANGE
C     L. McCleary (NOSC)         Mar 89                   Original entry.
C
C-*-*-*-*-*-*-*-*-*-*-*-*-*-*-*-*-*-*-*-*-*-*-*-*-*-*-*-*-*-*-*-*-*-*-*|*-*-*-*-
c
      subroutine satcov
c
      INTEGER QFB(26),QMB(4)
      COMMON /BUTONS/ QFB,QMB
      logical valid
      logical rflag, error
      character * 25 retstr
```

```
      character * 50 strng
      common /ctext/ igrtxt,isytxt,iantxt
      parameter(D2R = 3.14159/180.0)
      integer scvseg
      common /scvseg/ scvseg
      character*72 amptxt(3)
      data scvseg /0/
      data rotang /0.0/
      data ialt /22300/
      data iafovd /90/
      data itiltd /0/
      data iazid  /0/
      rflag = .false.
      error = .false.

      scx = 0.
      scy = 0.
c
c     Get center point for satellite coverage.
c
   10 continue
      call mesg(10)
      call gravpt
      call geowin
      call getseg(scvseg)
      call jconwv(scx,scy,0.,vx,vy)
      call jpecho(1,2,1,vx,vy)
      call locgeo(ibutn,scx,scy,valid)
      IF (IBUTN.NE.QMB(1)) THEN
           CALL CHECK(IBUTN,scvseg,ERROR,RFLAG)
           IF (ERROR) THEN
                CALL MESG(2)
                CALL PAWS
           ENDIF
           IF (RFLAG) THEN
                rflag = .false.
                call prompt(11, strng, 50, len)
                if (len .gt. 0) then
                     call tocaps(strng,len)
                     call lltord(strng(1:len), len, scvlat, scvlon, llerr)
                     if (llerr .gt. 0) then
                           call mesg(1244)
                           call paws
                           goto 10
                     endif
                else
                     rflag = .true.
                     go to 900
                endif
                GOTO 12
           ENDIF
           GOTO 10
      ENDIF

      IF (.not.VALID) then
          CALL MESG(288)
          CALL PAWS
          GOTO 10
      endif

      call xytoll(scx,scy,scvlat,scvlon)
c
c     Specify alt, afov, tilt, azi
c
   12 continue
      call prompt(12,retstr,25,irchar)
      if (irchar.gt.0) then
         call ascint (retstr,itemp,irchar,ierror)
         if (itemp.le.0.or.ierror.ne.0) then
            call mesg(19)
            call paws
            go to 12
         else
            ialt = itemp
```

```
         endif
      endif
      alt = ialt
c
   13 continue
      call prompt(13,retstr,25,irchar)
      if (irchar.gt.0) then
         call ascint (retstr,itemp,irchar,ierror)
         if (itemp.le.0.or.ierror.ne.0) then
            call mesg(19)
            call paws
            go to 13
         else
            iafovd = itemp
         endif
      endif
      afov = iafovd * d2r
c
   14 continue
      call prompt(14,retstr,25,irchar)
      if (irchar.gt.0) then
         call ascint (retstr,itemp,irchar,ierror)
         if (itemp.lt.0.or.ierror.ne.0) then
            call mesg(19)
            call paws
            go to 14
         else
            itiltd = itemp
         endif
      endif
      tilt = itiltd * d2r
c
   15 continue
      call prompt(15,retstr,25,irchar)
      if (irchar.gt.0) then
         call ascint (retstr,itemp,irchar,ierror)
         if (ierror.ne.0) then
            call mesg(19)
            call paws
            go to 15
         else
            iazid = itemp
         endif
      endif
      azi = iazid * d2r
c
      amptxt(1) = 'Satellite location: '
      call formt(scvlat,scvlon,0,amptxt(1)(21:))
      write(amptxt(2),22) ialt
 22   format ('Altitude:',I8,' nm.')
      write(amptxt(2)(35:),23) iafovd
 23   format ('Field of view:',I4,' deg.')
      write(amptxt(3),24) itiltd
 24   format ('Look angle from nadir:',I4,' deg.')
      write(amptxt(3)(35:),25) iazid
 25   format ('Azimuth of look angle:',I4,' deg.')
      call drwamp (amptxt,3)
c
      call gravpt
      call geowin
      call jropen(scvseg)
      call xcolor (igrtxt)
c
      XTIE = 0.0
      YTIE = 0.0
      rotang = rotang + .6
      DX = cos(rotang)
      DY = sin(rotang)
      DIST = 5.0
      CALL FTPRNT(scvlon,scvlat,alt,afov,tilt,azi,XTIE,YTIE,DX,DY,DIST)
      call jrclos
c
c     allow another ftprnt
      goto 10
```

```
c
 900  continue
c
      return
      end
C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    BL2LL
C
C FUNCTIONAL DESCRIPTION:       Transforms polyline from stereographic
C                               breakline coordinates back to lon,lat.
C
C INPUT FILES/PARAMETERS:       xin,yin       - Polyline in stereographic XY.
C
C GLOBAL VARIABLES:             blclon,blclat - Center of ster. projection.
C
C OUTPUT FILES/PARAMETERS:      plon,plat     - Output polyline in (lon,lat).
C
C SUBROUTINES CALLED:           xpster
C
C CALLED BY:                    blplgn, blplin
C
C LOCAL VARIABLES:
C
C RESTRICTIONS:                 None.
C
C ABNORMAL RETURN CONDITIONS:   None.
C
C PROGRAMMER:                   DATE OF LAST CHANGE     REASON FOR CHANGE
C     Tom Wescott (NOSC)        Jan 88                  Original entry.
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine BL2LL(xin,yin,nin,plon,plat)
c
      real   xin(*),yin(*), plon(*),plat(*)
      common /center/clat,clon,cclat,sclat
      real ax(3),ay(3),bx(3),by(3),alon(3),alat(3),blon(3),blat(3)
      common /break/ blclat,blclon,ax,ay,bx,by,alon,alat,blon,blat
c
c     Save current map center.
      zclat = clat
      zclon = clon
      zcclat = cclat
      zsclat = sclat
c
c     Set center temporarily to the breakline midpoint.
      clon = blclon
      clat = blclat
      cclat = cos(clat)
      sclat = sin(clat)
c
      do 100 i = 1, nin
         call xpster(xin(i),yin(i),plon(i),plat(i))
 100  continue
c
c     Restore map center common.
      clat = zclat
      clon = zclon
      cclat = zcclat
      sclat = zsclat
c
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    BL2XY
C
C FUNCTIONAL DESCRIPTION:       Transforms polyline to a temporary stereo-
C                               graphic projection where breakline clipping
C                               will be performed.
C
C INPUT FILES/PARAMETERS:       plon,plat  - Input polyline in (lon,lat).
```

```
C
C GLOBAL VARIABLES:            blclat,blclon  - Center of stereog. projection.
C
C OUTPUT FILES/PARAMETERS:     xout,yout  - Polyline in stereographic (X,Y).
C
C SUBROUTINES CALLED:          pxster
C
C CALLED BY:                   blchk, blplin, blplgn
C
C LOCAL VARIABLES:
C
C RESTRICTIONS:                none.
C
C ABNORMAL RETURN CONDITIONS:  none.
C
C PROGRAMMER:                  DATE OF LAST CHANGE     REASON FOR CHANGE
C     Tom Wescott (NOSC)       Jan 88                  Original entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine BL2XY(plon,plat,nin,xout,yout)
c
      real   plon(*),plat(*),xout(*),yout(*)
      common /center/clat,clon,cclat,sclat
      real ax(3),ay(3),bx(3),by(3),alon(3),alat(3),blon(3),blat(3)
      common /break/ blclat,blclon,ax,ay,bx,by,alon,alat,blon,blat
c
c     Save current map center.
      zclat = clat
      zclon = clon
      zcclat = cclat
      zsclat = sclat
c
c     Set center temporarily to the breakline midpoint.
      clon = blclon
      clat = blclat
      cclat = cos(clat)
      sclat = sin(clat)
c
      call pxster(plon,plat,nin,xout,yout,nout)
c
c     Restore map center common.
      clat = zclat
      clon = zclon
      cclat = zcclat
      sclat = zsclat
c
      return
      end


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   BLCHK
C
C FUNCTIONAL DESCRIPTION:      Detects intersection of conic breakline
C                              with a geographic bounding rectangle.
C
C INPUT FILES/PARAMETERS:      alimit(4)    - Geo. rectangle limit array.
C
C GLOBAL VARIABLES:            ax(1),ay(1)  - Breakline line segment start.
C                              bx(1),by(1)  -    "      "      "    end.
C
C OUTPUT FILES/PARAMETERS:     noclip = .false. with intersection.
C
C SUBROUTINES CALLED:          bl2xy.
C
C CALLED BY:                    DMAPII
C
C LOCAL VARIABLES:             s1           - Sign + for left half plane.
C                              dX, dY, D    - Coefficients of breakline in
C                                             form:    dY*x - dX*y + D = 0
C
C RESTRICTIONS:                Geo. rectangle must span less than pi lon.
C
```

```
C ABNORMAL RETURN CONDITIONS:  none.
C
C PROGRAMMER:                   DATE OF LAST CHANGE     REASON FOR CHANGE
C     Tom Wescott  (NOSC)       Jan 88                  Original entry.
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine BLCHK(noclip,alimit)
c
      real alimit(4)
      logical noclip
      common /pie/ pie,tpie,pio2,pio4
      real ax(3),ay(3),bx(3),by(3),alon(3),alat(3),blon(3),blat(3)
      common /break/ blclat,blclon,ax,ay,bx,by,alon,alat,blon,blat
c
c     Note: Geographic rectangle sides may be curved in a coordinate
c     system where breakline is straight.  Test at least 3 pts per side.
      parameter (NPOINTS = 3)
      real rla(NPOINTS*4),rlo(NPOINTS*4),x(NPOINTS*4),y(NPOINTS*4)
c
cccc
c     Get N,S,E,W sides of rectangle from WDBII limit array.
      rsout = alimit(1)
      rnort = alimit(2)
      rmnlo = alimit(3)
      rmxlo = alimit(4)
      Dlo = rmxlo - rmnlo
      if (Dlo.gt.pie) then
c        Limit array spans the dateline. Convert to continuous coords.
         reast = rmnlo + tpie
         rwest = rmxlo
      else
         reast = rmxlo
         rwest = rmnlo
      endif
c
c     Load polyline arrays with test points spaced along rectangle border.
      kount = 0
      xincr = (reast-rwest)/(NPOINTS-1)
      yincr = (rnort-rsout)/(NPOINTS-1)
c
      rlon = rwest - xincr
      do 210 icol = 1, NPOINTS
         kount = kount + 1
         rla(kount) = rnort
         rlon = rlon + xincr
         rl = rlon
         if (rl.gt.pie) rl = rl - tpie
         rlo(kount) = rl
 210  continue
c
      rlat = rnort
      do 220 irow = 1, NPOINTS-1
         kount = kount + 1
         rlat = rlat - yincr
         rla(kount) = rlat
         rlo(kount) = reast
 220  continue
c
      rlon = reast
      do 240 icol = 1, NPOINTS-1
         kount = kount + 1
         rla(kount) = rsout
         rlon = rlon - xincr
         rl = rlon
         if (rl.gt.pie) rl = rl - tpie
         rlo(kount) = rl
 240  continue
c
      rlat = rsout
      do 260 irow = 1, NPOINTS-1
         kount = kount + 1
         rlat = rlat + yincr
         rla(kount) = rlat
```

```
          rlo(kount) = rwest
 260   continue
c
c
c      Convert test points to breakline coordinate system (x,y).
       call bl2xy(rlo,rla,kount,x,y)
c
c      Compute breakline (also half plane) general form coefficients
c      from directed line segment  (ax(1),ay(1)) to (bx(1),by(1)).
       dY = ay(1) - by(1)
       dX = ax(1) - bx(1)
       D  = ax(1)*by(1) - ay(1)*bx(1)
       d2far = 10.0 * amax1(abs(dX),abs(dY))
c
c      Check polyline segments to find out if any cross the breakline.
       noclip = .true.
       s1 = dY*x(1) - dX*y(1) + D
       do 500 i = 2, kount
          s2 = dY*x(i) - dX*y(i) + D
          if ((s1*s2) .lt. 0.0) then
c            Great circle of the breakline was crossed by the polyline segment.
c            Now test for breakline crossing the line of the segment.
             ddy = y(i-1) - y(i)
             ddx = x(i-1) - x(i)
c            Skip test for segments passing near the breakline antipode.
             if((abs(ddx).lt.d2far).and.(abs(ddy).lt.d2far)) then
                dd = x(i-1)*y(i) - y(i-1)*x(i)
                s3 = ddy*ax(1) - ddx*ay(1) + dd
                s4 = ddy*bx(1) - ddx*by(1) + dd
                if (s3*s4 .lt. 0.0) then
                   noclip = .false.
                   RETURN
                endif
             endif
          endif
          s1 = s2
 500   continue
c
       return
       end


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    BLHATC
C
C FUNCTIONAL DESCRIPTION:       Draws a hatch pattern inside a polygon that
C                               might be clipped by the breakline of a map
C                               or contain potentially singular points.
C
C INPUT FILES/PARAMETERS:       rla(),rlo() - Input polygon coords.
C                               nin         - Number of input points.
C                               xtie,ytie   - Tie point for hatch pattern.
C                               dx,dy       - direction vector for hatch lines.
C                               dist        - hatch line spacing (display units)
C
C GLOBAL VARIABLES:             ax(2),ay(2) - Left hemisphere clip line start.
C                               bx(2),by(2) -    "      "      "     "  end.
C                               ax(3),ay(3) - Rght hemisphere clip line start.
C
C OUTPUT FILES/PARAMETERS:      Hatched polygon interior.
C
C SUBROUTINES CALLED:           bl2ll, bl2xy, cliplg, hatch, llplxy
C
C CALLED BY:                    ftprnt
C
C LOCAL VARIABLES:              inxt     - linking list for input polygon.
C                               nxt      - linking list for clipped polygon.
C                               outply   - pointers to clipped polygon segments.
C
C RESTRICTIONS:                 Blset must have been called to set up breakline.
C
C ABNORMAL RETURN CONDITIONS:   None.
C
C PROGRAMMER:                   DATE OF LAST CHANGE     REASON FOR CHANGE
```

```
C     Tom Wescott (NOSC)       Oct 88                    Original entry.
C
C-*-*-*-*-*-*-*-*-*-*-*-*-*-*-*-*-*-*-*-*-*-*-*-*-*-*-*-*-*-*-*-*-*-*-*|*-*-*-*-
C     not in 3.0
      subroutine blhatc(rlo,rla,nin,xtie,ytie,dx,dy,dist)
C
      real ax(3),ay(3),bx(3),by(3),alon(3),alat(3),blon(3),blat(3)
      common /break/ blclat,blclon,ax,ay,bx,by,alon,alat,blon,blat
      parameter(NPONBL=13)
      real rlo(*),rla(*)
C
      include   'carmaxdim.inc'
C
      real xx(IDIM),yy(IDIM)
      real x(IDIM),y(IDIM),u(IDIM),v(IDIM)
      integer iinxt(IDIM), inxt(IDIM), nxt(IDIM)
      integer outply(MXPLYS)
C
C
C     Convert input (lon,lat) to breakline coordinate system.
      call bl2xy(rlo,rla,nin,xx,yy)
C
C     Get breakline length.
      dxp2p = ax(1) - bx(1)
      dyp2p = ay(1) - by(1)
      dp2p = sqrt(dxp2p**2 + dyp2p**2)
      toofar = .05*dp2p
C
C     Close the polygon if necessary.
      if ((xx(nin).ne.xx(1)).or.(yy(nin).ne.yy(1))) then
         n = nin + 1
         xx(n) = xx(1)
         yy(n) = yy(1)
      else
         n = nin
      endif
C
C     Initialize vertex linking list.
      do 120 i = 1, n-1
         iinxt(i) = i+1
 120  continue
      iinxt(n) = 1
      ist = 1
C
C     Force singular points outside linked list version of the polygon.
      call blsing(rlo,rla,n,xx,yy,nout,iinxt,ist)
      n = nout
      if (n.gt.MAXV) write(*,*)'BLHATC... array larger than ',MAXV
C
      do 300 ihemi = 1,2
         ln4clp = ihemi + 1
         cax = ax(ln4clp)
         cay = ay(ln4clp)
         cbx = bx(ln4clp)
         cby = by(ln4clp)
C
C        Reset initial vertex linking list.
         do 150 i = 1, n
            inxt(i) = iinxt(i)
 150     continue
         ist = 1
         mrk = n
C
C        Perform line clip.
         call cliplg(cax,cay,cbx,cby,xx,yy,ist,inxt,mrk,outply,nxt)
         dcx = cbx - cax
         dcy = cby - cay
C
         kountp = 0
C        While (clipped polygon segments remain) Do.
 201        if (outply(kountp+1).eq.0) go to 220
            kountp = kountp + 1
C
C           Get the first vertex from linked list.
```

```
            k = 1
            ivrt = outply(kountp)
            u(k) = xx(ivrt)
            v(k) = yy(ivrt)
            ivrt = nxt(ivrt)
            iclose = ivrt
            do 210 knt = 2, MAXV
               uknt = xx(ivrt)
               vknt = yy(ivrt)
C
C              Check polyline segment length in breakline coord system.
               dxx = (uknt-u(k))
               dyy = (vknt-v(k))
               dxxyy = amax1(abs(dxx),abs(dyy))
C
               if((dxxyy.gt.toofar).and.(abs(dxx*dcy-dyy*dcx).lt..0001))
     +            then
C                 If polyline segment is long and parallel to clipline,
C                 add intermediate points tacking it to a great circle.
                  xxincr = dxx/(NPONBL-1)
                  yyincr = dyy/(NPONBL-1)
                  kstart = k
                  do 204 i = 1, NPONBL-2
                     k = k + 1
                     u(k) = u(kstart) + xxincr*i
                     v(k) = v(kstart) + yyincr*i
 204              continue
               endif
C              Append the next point from output from clip.
               k = k + 1
               u(k) = uknt
               v(k) = vknt
C
               ivrt = nxt(ivrt)
               if (ivrt.eq.iclose) go to 211
 210        continue
 211        continue
            kountv = k

            call bl2ll(u,v,kountv,u,v)
            call llplxy(u,v,kountv,x,y,nout)
CD           ROTANG = ROTANG + .6
CD           DX = DX*COS(ROTANG)
CD           DY = DY*SIN(ROTANG)
            if (nout.gt.2) call hatch(x,y,nout,xtie,ytie,dx,dy,dist)
            go to 201
C
C        End While.
 220     continue
C
 300  continue
C
      return
      end


C+*+*+*+*+*+*+*+*+*+*+*+*+*+*+*+*+*+*+*+*+*+*+*+*+*+*+*+*+*+*+*+*+*+*+|*+*+*+*+
C UNIT NAME:                      BLPLGN
C
C FUNCTIONAL DESCRIPTION:         Does an area fill (no outline) for the inside of
C                                 a polygon that might require clipping by a map
C                                 breakline or contain potentially singular points.
C
C INPUT FILES/PARAMETERS:         rla(),rlo() - Input polygon coords.
C                                 nin         - Number of input points.
C
C GLOBAL VARIABLES:               ax(2),ay(2) - Left hemisphere clip line start.
C                                 bx(2),by(2) -    "      "      "    "  end.
C                                 ax(3),ay(3) - Rght hemisphere clip line start.
C
C OUTPUT FILES/PARAMETERS:        Filled polygon interior.
C
C SUBROUTINES CALLED:             bl2ll, bl2xy, cliplg, ,jpolg2, llplxy
C
```

```
C CALLED BY:                       flsply
C
C LOCAL VARIABLES:                 inxt     - linking list for input polygon.
C                                  nxt      - linking list for clipped polygon.
C                                  outply   - pointers to clipped polygon segments.
C
C RESTRICTIONS:                    Blset must have been called to set up breakline.
C
C ABNORMAL RETURN CONDITIONS:      None.
C
C PROGRAMMER:                      DATE OF LAST CHANGE     REASON FOR CHANGE
C     Tom Wescott (NOSC)           Feb 88                  Original entry.
C      "     "                     Mar 89                  Multiple output polygons.
C
C-*-*-*-*-*-*-*-*-*-*-*-*-*-*-*-*-*-*-*-*-*-*-*-*-*-*-*-*-*-*-*-*-*-*-*-*-*|*-*-*-*-
      subroutine blplgn(rlo,rla,nin)
C
      real ax(3),ay(3),bx(3),by(3),alon(3),alat(3),blon(3),blat(3)
      common /break/ blclat,blclon,ax,ay,bx,by,alon,alat,blon,blat
      parameter(NPONBL=13)
      real rlo(*),rla(*)
C
      include   'carmaxdim.inc'
C
      real xx(IDIM),yy(IDIM)
      real x(IDIM),y(IDIM),u(IDIM),v(IDIM)
      integer iinxt(IDIM), inxt(IDIM), nxt(IDIM)
      integer outply(MXPLYS)
C
C
C     Convert input (lon,lat) to breakline coordinate system.
      call bl2xy(rlo,rla,nin,xx,yy)
C
C     Get breakline length.
      dxp2p = ax(1) - bx(1)
      dyp2p = ay(1) - by(1)
      dp2p = sqrt(dxp2p**2 + dyp2p**2)
      toofar = .05*dp2p
C
C     Close the polygon if necessary.
      if ((xx(nin).ne.xx(1)).or.(yy(nin).ne.yy(1))) then
         n = nin + 1
         xx(n) = xx(1)
         yy(n) = yy(1)
      else
         n = nin
      endif
C
C     Initialize vertex linking list.
      do 120 i = 1, n-1
         iinxt(i) = i+1
 120  continue
      iinxt(n) = 1
      ist = 1
C
C     Force singular points outside linked list version of the polygon.
      call blsing(rlo,rla,n,xx,yy,nout,iinxt,ist)
      n = nout
      if (n.gt.MAXV) write(*,*)'BLPLGN... array larger than ',MAXV
C
      do 300 ihemi = 1,2
         ln4clp = ihemi + 1
         cax = ax(ln4clp)
         cay = ay(ln4clp)
         cbx = bx(ln4clp)
         cby = by(ln4clp)
C
C        Reset initial vertex linking list.
         do 150 i = 1, n
            inxt(i) = iinxt(i)
 150     continue
         ist = 1
         mrk = n
C
```

```
C        Perform line clip.
         call cliplg(cax,cay,cbx,cby,xx,yy,ist,inxt,mrk,outply,nxt)
         dcx = cbx - cax
         dcy = cby - cay
C
         kountp = 0
C        While (clipped polygon segments remain) Do.
 201        if (outply(kountp+1).eq.0) go to 220
            kountp = kountp + 1
C
C           Get the first vertex from linked list.
            k = 1
            ivrt = outply(kountp)
            u(k) = xx(ivrt)
            v(k) = yy(ivrt)
            ivrt = nxt(ivrt)
            iclose = ivrt
            do 210 knt = 2, MAXV
               uknt = xx(ivrt)
               vknt = yy(ivrt)
C
C              Check polyline segment length in breakline coord system.
               dxx = (uknt-u(k))
               dyy = (vknt-v(k))
               dxxyy = amax1(abs(dxx),abs(dyy))
C
               if((dxxyy.gt.toofar).and.(abs(dxx*dcy-dyy*dcx).lt..0001))
     +            then
C                 If polyline segment is long and parallel to clipline,
C                 add intermediate points tacking it to a great circle.
                  xxincr = dxx/(NPONBL-1)
                  yyincr = dyy/(NPONBL-1)
                  kstart = k
                  do 204 i = 1, NPONBL-2
                     k = k + 1
                     u(k) = u(kstart) + xxincr*i
                     v(k) = v(kstart) + yyincr*i
 204              continue
               endif
C              Append the next point from output from clip.
               k = k + 1
               u(k) = uknt
               v(k) = vknt
C
               ivrt = nxt(ivrt)
               if (ivrt.eq.iclose) go to 211
 210        continue
 211        continue
            kountv = k

            call bl2ll(u,v,kountv,u,v)
            call llplxy(u,v,kountv,x,y,nout)
            noedge = 1
            if (nout.gt.2) call jpolg2(x,y,nout,noedge)
            go to 201
C
C        End While.
 220     continue
C
 300  continue
C
      return
      end


C+*+*+*+*+*+*+*+*+*+*+*+*+*+*+*+*+*+*+*+*+*+*+*+*+*+*+*+*+*+*+*+*|*+*+*+*+
C UNIT NAME:                   BLPLIN
C
C FUNCTIONAL DESCRIPTION:      Draws a polyline across a map area
C                              containing a conic breakline.
C
C INPUT FILES/PARAMETERS:      rlo(n),rla(n)- Input polyline arrays in LL.
C                              n            - Number of input points.
C
```

```
C                             Line segments in breakline coordinate system:
C                             ax(1),ay(1)  - Break line segment start.
C                             bx(1),by(1)  -   "     "     "    end.
C                             ax(2),ay(2)  - Left hemisphere clip line start.
C                             ax(3),ay(3)  - Rght hemisphere clip line start.
C
C GLOBAL VARIABLES:           none.
C
C OUTPUT FILES/PARAMETERS:    This subroutine has graphic output only.
C                             Polyline is broken into sections that do not
C                             cross the breakline, and each of the sections
C                             is drawn on the map.  Pen lifted for invalids.
C
C SUBROUTINES CALLED:         none.
C
C CALLED BY:                  flsply,plotov,plotit,rngrin
C
C LOCAL VARIABLES:            x(n),y(n)    - Polyline in breakline coords.
C                             xmap,ymap    - Output point map position.
C                             s1,s2...     - Sign of sN tells half plane.
C                             dX, dY, D    - Coefficients of clip line in
C                                            form:    dY*x - dX*y + D = 0
C                             ddx,ddy,dd   - Coefs of polyline segment.
C                             far          - Traps segments near BL antipode.
C
C RESTRICTIONS:               none.
C
C ABNORMAL RETURN CONDITIONS: none.
C
C PROGRAMMER:                 DATE OF LAST CHANGE     REASON FOR CHANGE
C     Tom Wescott (NOSC)      Dec 87                  Original entry.
C
C-*-*-*-*-*-*-*-*-*-*-*-*-*-*-*-*-*-*-*-*-*-*-*-*-*-*-*-*-*-*-*-*-*-*-*-*|*-*-*-*-
c
      subroutine blplin(rlo,rla,n)
c
      real ax(3),ay(3),bx(3),by(3),alon(3),alat(3),blon(3),blat(3)
      common /break/ blclat,blclon,ax,ay,bx,by,alon,alat,blon,blat
      logical invali, invprv, pen
      common /invali/ invali
c
      include   'carmaxdim.inc'
c
      real rlo(*),rla(*)
      real x(IDIM),y(IDIM)
c
c
      if (n.gt.MAXV) write(*,*)'BLPLIN... array larger than ',MAXV
c
c     Convert input (lon,lat) to breakline coordinate system.
      call bl2xy(rlo,rla,n,x,y)
c
c     Calculate radius of breakline hemisphere.
      radius = sqrt((bx(1))**2.0 + (by(1))**2.0)
      far = 10.0*radius
c
c
      do 500 l = 2,3
c        Compute clip line (also half plane) general form coefficients
c        from directed line segment  (ax,ay) to (bx,by).
         dY = ay(l) - by(l)
         dX = ax(l) - bx(l)
         D  = ax(l)*by(l) - ay(l)*bx(l)
c
c        Process the first point.
         s1 = dY*x(1) - dX*y(1) + D
         call llplxy(rlo(1),rla(1),1,xmap,ymap,nout)
         call jmove(xmap,ymap)
c
         if (n.gt.1) then
            do 100 i = 2, n
               s2 = dY*x(i) - dX*y(i) + D
               if ((s1.lt.0.0).and.(s2.lt.0.0)) then
c                 Output nothing.
```

```
                else
                   invprv = invali
                   call llplxy(rlo(i),rla(i),1,xmap,ymap,nout)
                   pen = .true.
                   if ((invali).or.(invprv)) pen = .false.
c
                   if ((s1.ge.0.0).and.(s2.ge.0.0)) then
c                     Output line from point i-1 to point i.
                      if (pen) call jdraw(xmap,ymap)
                      if (.not.pen) call jmove(xmap,ymap)
                   else
c                     Find intersection of polyline segment with clip line.
                      ddy = y(i-1) - y(i)
                      ddx = x(i-1) - x(i)
                      dd = x(i-1)*y(i) - y(i-1)*x(i)
                      xa = -(ddx*D-dX*dd)
                      ya = -(ddy*D-dY*dd)
                      wa = -(ddy*dX -dY*ddx)
                      xintr = xa/wa
                      yintr = ya/wa
                      call bl2ll(xintr,yintr,1,rlon,rlat)
                      call llplxy(rlon,rlat,1,xmintr,ymintr,nvalid)
c
                      dmax = amax1(abs(x(i-1)),abs(y(i-1))
     +                ,abs(x(i)),abs(y(i)))
                      if (dmax.gt.far) then
c                        Polyline segment is near the breakline antipode where
c                        clip is unreqd and can be inaccurate.  Output line.
                         call llplxy(rlo(i-1),rla(i-1),1,xprv,yprv,nout)
                         call jmove(xprv,yprv)
                         if (invali) pen = .false.
                         if (pen) call jdraw(xmap,ymap)
                         if (.not.pen) call jmove(xmap,ymap)
                      else
                         if (s1.lt.0.0) then
c                           Output line from intersection point to point i.
                            call jmove(xmintr,ymintr)
                            if (pen) call jdraw(xmap,ymap)
                            if (.not.pen) call jmove(xmap,ymap)
                         else
c                           Output line from point i-1 to intersection point.
                            if (pen) call jdraw(xmintr,ymintr)
                            if (.not.pen) call jmove(xmintr,ymintr)
                         endif
                      endif
                   endif
                endif
                s1 = s2
 100         continue
          endif
 500  continue
c
      return
      end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     BLSET
C
C FUNCTIONAL DESCRIPTION:        (1)  Locates end points of conic breakline.
C                                (2)  Sets a transformation to a special ster-
C                                eographic projection where the breakline is
C                                straight, distortion is minimal, and coordinates
C                                have no nearby discontinuity, so that breakline
C                                clipping can easily be applied.
C
C INPUT FILES/PARAMETERS:        clat,clon  - Map center point.
C
C GLOBAL VARIABLES:              None.
C
C OUTPUT FILES/PARAMETERS:       nobrl                      - No breakline flag.
C                                blclon,blclat              - Breakline midpoint
C                                blaz                       - Azimuth at midpiont.
C                                ax(1),ay(1),bx(1),by(1) - Breakline end points.
```

```
C                                    ax(2),ay(2),bx(2),by(2) - Left clip line.
C                                    ax(3),ay(3),bx(3),by(3) - Right clip line.
C
C SUBROUTINES CALLED:                da2ll, bl2xy
C
C CALLED BY:                         DMAPII
C
C LOCAL VARIABLES:                   EPSLON  - Angular separation of clip lines.
C                                    HILAT   - Slightly less than pi over two.
C
C RESTRICTIONS:                      Breakline assumed to be a great semicircle.
C
C ABNORMAL RETURN CONDITIONS:        None.
C
C PROGRAMMER:                        DATE OF LAST CHANGE     REASON FOR CHANGE
C     Tom Wescott (NOSC)             Jan 88                  Original entry.
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine BLSET(nobrl)
c
      common /pie/ pie,tpie,pio2,pio4
      common /center/clat,clon,cclat,sclat
      common /proj/ itproj,wmrad,xoffs,yoffs,scalr,notlst
      real alon(3),alat(3),blon(3),blat(3),ax(3),ay(3),bx(3),by(3)
      common /break/ blclat,blclon,ax,ay,bx,by,alon,alat,blon,blat
      common /utmz/ zone,cmerid,aaxis,baxis,e2,ep2,ap,bp,cp,dp,ep
      common /oblm/ polat,polon,az,azlat,gamma,xshift
      logical nobrl
CC      REAL DBGX(1300), DBGY(1300), DBGLO(1300), DBGLA(1300)
c
      parameter (HILAT = 3.13/2.0)
      parameter (EPSLON = 1.0E-5)
c     NOTE:  HILAT and EPSLON are used to position the end points of
c            clipping lines.  If you space these lines too closely,
c            acccuracy limits will cause vector wrap around.
c            1.56, 1.0E-5 seem to work for 32 bit arithmetic.
c
c
      nobrl = .false.
c     Locate breakline midpoint and azimuth.
*-----------------------------------------------------------------------|--+
* Itproj:  1  2  3  4  5  6  7  8  9 10 11 12 13 14 15 16 17 18 19 20 21  |
*-------------------------------------------------------------------------+
*          g  o  o  o  p  e  m  l  a  a  a  k  m  o  p  p  u  s  s       |
*          n  r  r  r  e  q  e  a  l  z  z  a  i  b  o  o  t  i  t       |
*          o  e  p  t  r  r  r  m  b  e  e  v  l  l  s  l  m  n  e       |
*          m  q  o  h  s  e  c  c  r  a  d  r  l  m  t  y  z  u  r       |
*-------------------------------------------------------------------------+
      goto(1,01,01,01,01,02,02,02,02,05,05,02,02,04,01,02,03,02,01
     +    )itproj
c
c        Case 1:  There is no breakline.
 1          continue
            nobrl = .true.
c           Proceed to case 2 for dummy values.
c
c        Case 2:  Upright Conics etc.
 2          continue
c           Breakline is meridian opposite center, midpoint at equator.
            blclat = 0.0
            blclon = clon - sign(pie,clon)
            blaz = 0.0
            go to 99
c
c        Case 3:  Universal Transverse Mercator.
 3          continue
c           Breakline is equator, midpoint is opposite central meridian.
            blclat = 0.0
            blclon = cmerid - sign(pie,cmerid)
            blaz = pio2
            go to 99
c
c        Case 4:  Oblique cylindricals.
```

```
 4          continue
c           Breakline midpoint is at the antipode.
            blclat = -clat
            blclon = clon - sign(pie,clon)
c           Breakline azimuth is direction to new pole.
            call ll2da(blclat,blclon,polat,polon,pdst,blaz,range,bering)
            go to 99
c
c        Case 5:  Azimuthals displaying the whole world.
 5          continue
c           Obviously azimuthals do not have a breakline, but we can use
c           one to insure rigorous processing of antipodal polygons.
c           Breakline midpoint is at the antipode.
            blclat = -clat
            blclon = clon - sign(pie,clon)
c           Breakline azimuth is not important.
            blaz = 0.0
            go to 99
c
 99      continue
c     End Cases.
c
c     Locate end points of the breakline in lat,lon.
      aznort = blaz
      azsout = aznort - sign(pie,aznort)
      call da2ll(blclat,blclon,pio2,aznort,alat(1),alon(1))
      call da2ll(blclat,blclon,pio2,azsout,blat(1),blon(1))
c
c     Locate end points of the clip line for left hemisphere.
      azsw = azsout + EPSLON
      call da2ll(blclat,blclon,HILAT,azsw,alat(2),alon(2))
      aznw = aznort - EPSLON
      call da2ll(blclat,blclon,HILAT,aznw,blat(2),blon(2))
c
c     Locate end points of the clip line for right hemisphere.
      azne = aznort + EPSLON
      call da2ll(blclat,blclon,HILAT,azne,alat(3),alon(3))
      azse = azsout - EPSLON
      call da2ll(blclat,blclon,HILAT,azse,blat(3),blon(3))
c
c     Transform all end points to breakline coordinate system.
      call bl2xy(alon,alat,3,ax,ay)
      call bl2xy(blon,blat,3,bx,by)
c
CCccc   DEBUG ... Draw clip lines as calculated piecewise in BL coords.
CCcc       call jcolor(22)
CC         npts = 180
CC         do 690 line = 2,3
CC            xincr = (bx(line)-ax(line))/npts
CC            yincr = (by(line)-ay(line))/npts
CC            do 610 n = 1, npts
CC               dbgx(n) = ax(line) + n*xincr
CC               dbgy(n) = ay(line) + n*yincr
CC 610        continue
CC            call bl2ll(dbgx,dbgy,npts,dbglo,dbgla)
CC            call llplxy(dbglo,dbgla,npts,dbgx,dbgy,nout)
CC            call jmove(dbgx,dbgy)
CC            call jpoly(dbgx,dbgy,nout)
CC 690     continue
CCccc   ...DEBUG
CC
      return
      end

C+*+*+*+*+*+*+*+*+*+*+*+*+*+*+*+*+*+*+*+*+*+*+*+*+*+*+*+*+*+*+*+*+*|*+*+*+*+
C UNIT NAME:                     BLSING
C
C FUNCTIONAL DESCRIPTION:        Excludes potentially singular points from the
C                                interior of spherical polygon by inserting small
C                                keyhole shaped areas which cut them out.
C                                When outlining the polygon, use original verts.
C                                When filling the polygon, include the insertions.
C
```

```
C INPUT FILES/PARAMETERS:        rlo(),rla() - Input polygon (lon,lat).
C                                xx(),yy()   - Input polygon (breakline coords).
C                                nin         - Number of input points.
C                                list()      - pointers linking xx,yy verticies.
C
C GLOBAL VARIABLES:              ax(2),ay(2) - Left hemisphere clip line start.
C                                bx(2),by(2) -    "      "       "     "  end.
C                                ax(3),ay(3) - Rght hemisphere clip line start.
C
C OUTPUT FILES/PARAMETERS:       xx(),yy()   - Input vtx list, new verts appended.
C                                nout        - Number of output verticies.
C                                list()      - Revised linkage.
C
C SUBROUTINES CALLED:            bl2xy, bl2ll, spgtst
C
C CALLED BY:                     blplgn, blhatc
C
C RESTRICTIONS:                  Blset must have been called to set up breakline.
C
C ABNORMAL RETURN CONDITIONS:    None.
C
C PROGRAMMER:                    DATE OF LAST CHANGE     REASON FOR CHANGE
C     Tom Wescott (NOSC)         Oct 88                  Original entry.
C
C-*-*-*-*-*-*-*-*-*-*-*-*-*-*-*-*-*-*-*-*-*-*-*-*-*-*-*-*-*-*-*-*-*-*-*-*|*-*-*-*-
C     not in 3.0
      subroutine blsing(rlo,rla,nin,xx,yy,nout,list,lstart)
C
      real ax(3),ay(3),bx(3),by(3),alon(3),alat(3),blon(3),blat(3)
      common /break/ blclat,blclon,ax,ay,bx,by,alon,alat,blon,blat
      real pxx(4),pyy(4)
      common /center/ clat,clon,cclat,sclat
      common /pie/ pie,tpie,pio2,pio4
      parameter (R2D = 180./3.14159)
      parameter (NCIRCL = 31)
      real rlo(*),rla(*), xx(*),yy(*)
      integer list(*)

      logical inside
C
      nout = nin
C
C     For polygons that intersect the breakline and must be clipped, there
C     are four troublesome points which, if enclosed, can cause problems.
C     1), 2)  The breakline ends (e.g. poles unplottable in many projections)
C         3)  The map center (edge of the world in breakline coord system)
C         4)  The antipode of center (unplottable in azimuthal projections)
C     If any of these lie inside the polygon, cut a keyhole to exclude them.
C
C     Set up an array containing these points in breakline coordinate system.
      pxx(1) = ax(1)
      pyy(1) = ay(1)
      pxx(2) = bx(1)
      pyy(2) = by(1)
      pxx(3) = 0.0
      pyy(3) = 0.0
C     Antipode is undefined, use center point for reference.
      pxx(4) = 0.0
      pyy(4) = 0.0
C
      do 190 ntrble = 1, 4
C        Find (lon,lat) of these points.
         if (ntrble .eq. 3) then
C           Set up to test antipode of map center (which is breakline center).
            trblon = blclon
            trblat = blclat
         else if (ntrble.eq.4) then
C           Set up to test map center (the antipode of breakline system center).
            trblon = blclon - sign(pie,blclon)
            trblat = - blclat
         else
            call bl2ll(pxx(ntrble),pyy(ntrble),1,trblon,trblat)
         endif
C
```

```
C        See if troublesome point lies inside the polygon.
C        TBD:  A bounding rectangle screen would make this test faster.
         call spgtst(rlo,rla,nin,trblon,trblat,inside,area)
         if (inside) then
C
C           Use vertex mapping nearest the troublesome point for keyhole start.
C           We need the linkage pointer from this vertex to the next in line.
            dmin = 1.0E9
            do 166 iv = 1, nin
               call llplxy(rlo(iv),rla(iv),1,vx,vy,nvout)
               dist = sqrt((pxx(ntrble)-vx)**2 + (pyy(ntrble)-vy)**2)
               if (dist.lt.dmin) then
                  dmin = dist
                  nearvt = iv
                  p2next = list(iv)
               endif
               key = nearvt
 166        continue

CD           WRITE(*,*)'BLSING... troublesome pt inside polygon',ntrble
CD           WRITE(*,*)'          ...',trblon*R2D,trblat*R2D,'near ',nearvt
CD           CALL LLPLXY(TRBLON*.999,TRBLAT*.999,1,XXX,YYY,IDUM)
CD           CALL JCMARK(3)                   ! MARK KEYHOLE CIRCLE WITH "*"
CD           CALL JMARK(XXX,YYY)

CD           CALL BL2LL(XX(KEY),YY(KEY),1,KEYLO,KEYLA)
CD           CALL LLPLXY(KEYLO,KEYLA,1,KEYX,KEYY,IDUM)
CD           CALL JCMARK(4)                   ! MARK KEYHOLE START/END WITH "0"
CD           CALL JMARK(KEYX,KEYY)

CD           IF (NTRBLE.EQ.2) THEN
CD              WRITE(*,*) ' BLSING...  south pole in plg.'
CD              DO 334 IPI = 1, NIN
CD              WRITE (*,*)'    south polar polygon  ',rlo(ipi),rla(ipi)
CD334           CONTINUE
CD           ENDIF
C
C           Use interpole distance to set radius for keyhole circle.
            dxp2p = ax(1) - bx(1)
            dyp2p = ay(1) - by(1)
            dp2p = sqrt(dxp2p*dxp2p+dyp2p*dyp2p)
            r = .005*dp2p
C           Or, a very large circle which excludes breakline center antipode.
            if (ntrble .eq. 4) r = 1.0E+4
            theta0 = atan2(dyp2p,dxp2p)
C
C           Make a circle around the trouble point in the direction
C           (cw/ccw) opposite to vertex order in the original polygon.
C           New verticies are appended to (xx,yy).
            do 140 i = 1, NCIRCL
               theta = theta0 + (i-1)*tpie/(NCIRCL-1)
               theta = sign(theta,area)
C
C              Note that when the map center is inside a polygon, the
C              direction of traversal in breakline coords is reversed!
               if (ntrble .eq. 4) theta = -theta
C
               if (i.eq.1) then
C                 Link from keyhole start.
                  list(nearvt) = nout + 1
               else
C                 Continue with keyhole.
                  list(nout) = nout + 1
               endif

               nout = nout + 1
               xx(nout) = pxx(ntrble) + r*cos(theta)
               yy(nout) = pyy(ntrble) + r*sin(theta)
CD              CALL BL2LL(XX(NOUT),YY(NOUT),1,KEYLO,KEYLA)
CD              CALL LLPLXY(KEYLO,KEYLA,1,KEYX,KEYY,IDUM)
CD              CALL JCMARK(5)                ! MARK KEYHOLE PATH WITH "X"
CD              CALL JMARK(KEYX,KEYY)
 140        continue
C
```

```
C           Add line from circle back to where we left the original polygon.
            list(nout) = nout + 1
            nout = nout + 1
            xx(nout) = xx(key)
            yy(nout) = yy(key)
            list(nout) = p2next
C
CD           CALL BL2LL(XX(NOUT),YY(NOUT),1,KEYLO,KEYLA)
CD           CALL LLPLXY(KEYLO,KEYLA,1,KEYX,KEYY,IDUM)
CD           CALL JCMARK(5)              ! MARK KEYHOLE START/END WITH "X"
CD           CALL JMARK(KEYX,KEYY)
C
          endif
 190  continue
C
CD      WRITE(*,*) ' BLSING linkage'
CD      DO 2111 j= 1, nout, 10
CD         WRITE(*,9211) (k, list(k),k=j,j+9)
CD9211     FORMAT(' ',10(I3,')',I3,' '))
CD2111 CONTINUE
      return
      end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       CK4ALL
C
C FUNCTIONAL DESCRIPTION:          Checks for all of a geographic area bounding
C                                  rectangle (BR) being visible in the viewport.
C
C INPUT FILES/PARAMETERS:          alimit(4) - geographic area BR.
C
C GLOBAL VARIABLES:                vpnort,vpsout,vpeast,vpwest - viewport BR
C
C OUTPUT FILES/PARAMETERS:         allon
C
C SUBROUTINES CALLED:              lltoxy, clipxy
C
C CALLED BY:                       DMAPII
C
C RESTRICTIONS:                    Geo area rectangle delta lon < pi.
C
C ABNORMAL RETURN CONDITIONS:      None.
C
C PROGRAMMER:                      DATE OF LAST CHANGE      REASON FOR CHANGE
C     Tom Wescott   (NOSC)         11/87                    Original entry.
C
C-*-*-*-*-*-*-*-*-*-*-*-*-*-*-*-*-*-*-*-*-*-*-*-*-*-*-*-*-*-*-*-*-*-*-*|*-*-*-*-

      subroutine ck4all(allon,alimit)
c
      common /viewbr/ vpnort,vpsout,vpeast,vpwest
      logical invali, allon, ison
      common /invali/ invali
      common /pie/ pie,tpie,pio2,pio4
      real  alimit(4)
c
c     To handle case when one side of the viewport arcs through one
c     side of the area rectangle, test at least three pts per side..
      parameter (NPOINTS = 3)
c
cccc
c     Get N,S,E,W sides of rectangle from WDBII limit array.
      rsout = alimit(1)
      rnort = alimit(2)
      rwest = alimit(3)
      reast = alimit(4)
      Dlo = reast - rwest
      if (Dlo.gt.pie) then
         tmp = reast
         reast = rwest
         rwest = tmp
      endif
c
```

```
      allon = .false.
      xincr = (reast-rwest)/(NPOINTS-1)
c
      rlon = rwest - xincr
      do 300 icol = 1, NPOINTS
         rlon = rlon + xincr
         if ((icol.eq.1).or.(icol.eq.NPOINTS)) then
            yincr = (rnort-rsout)/(NPOINTS-1)
            npts = NPOINTS
         else
            yincr = rnort - rsout
            npts = 2
         endif
c
         tlat = rsout - yincr
         do 200 irow = 1, npts
            tlat = tlat + yincr
            rlat = tlat
c
c           Nudge any test points off possibly invalid poles.
            if (abs(rlat).ge.pio2) rlat = rlat - sign(.001,rlat)
c
            call lltoxy(rlat,rlon,x,y)
            if (invali) then
               GO TO 900
            else
               call clipxy(x,y,ison)
               if (.not. ison) GO TO 900
            endif
 200     continue
 300  continue
      allon = .true.
c
 900  return
      end


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     CK4ANY
C
C FUNCTIONAL DESCRIPTION:        Checks for intersection of a geographic
C                                area with the viewport by comparing bounding
C                                rectangles (BR) in lon,lat.  If rectangles
C                                intersect, visibility is checked.
C
C INPUT FILES/PARAMETERS:        alimit(4) - geographic area BR.
C
C GLOBAL VARIABLES:              vpnort,vpsout,vpeast,vpwest - viewport BR
C
C OUTPUT FILES/PARAMETERS:       someon
C
C SUBROUTINES/FUNCTIONS:         lltoxy, clipxy
C
C CALLED BY:                      DMAPII, LLGRID
C
C RESTRICTIONS:                  Geo rectangle delta lon must be less than pi.
C
C ABNORMAL RETURN CONDITIONS:    None.
C
C PROGRAMMER:                    DATE OF LAST CHANGE     REASON FOR CHANGE
C     Tom Wescott   (NOSC)       11/87                   Original entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine ck4any(someon,alimit)
c
      common /viewp/ xrad,yrad,ixnp,iynp,xc,yc
      common /viewbr/ vpnort,vpsout,vpeast,vpwest
      common /pie/ pie,tpie,pio2,pio4
      logical invali, someon, ison
      common /invali/ invali
c
      real  alimit(4)
c
```

```
c     To handle case where one side of the viewport arcs through one
c     side of the area rectangle, test at least three pts per side..
      parameter (NPOINTS = 5)
c
c
c     Get N,S,E,W sides of geo rectangle from WDBII limit array
c     as viewed from side of earth containing the rectangle.
      rsout = alimit(1)
      rnort = alimit(2)
      rmnlo = alimit(3)
      rmxlo = alimit(4)
      Dlo = rmxlo - rmnlo
      if (Dlo.gt.pie) then
c        Limit array spans the dateline.  Convert to continuous coords.
         reast = rmnlo + tpie
         rwest = rmxlo
      else
         reast = rmxlo
         rwest = rmnlo
      endif
c
      someon = .false.
c
c     Speedy return if geographic area N-S does not overlap viewport BR.
      if ((rnort.gt.vpsout) .and. (rsout.lt.vpnort)) then
c
c        We can identify intersection of area with viewport by testing
c        visibility of all points (approximated by NPOINT) along the
c        rectangle sides and making sure any totally invisible rectangle
c        does not surround the viewport.
c
c        Trim large rectangles to viewport size prior to testing
c        to insure all test points dont miss the viewport.
         if (rnort.gt.vpnort) rnort = vpnort + .0001
         if (rsout.lt.vpsout) rsout = vpsout - .0001
c
         nclipt = 0
         ixt = 0
         iyt = 0
         xincr = (reast-rwest)/(NPOINTS-1)
         yincr = (rnort-rsout)/(NPOINTS-1)
c
         rlon = rwest - xincr
         do 300 icol = 1,NPOINTS
            rlon = rlon + xincr
            rl = rlon
            if (rl.gt.pie) rl = rl - tpie
            tlat = rsout - yincr
            do 200 irow = 1,NPOINTS
               tlat = tlat + yincr
               rlat = tlat
c
c              Nudge any test points off possibly invalid poles.
               if (abs(rlat).ge.pio2) rlat = rlat - sign(.001,rlat)
c
               call lltoxy(rlat,rl,x,y)
               if (.not. invali) then
                  call clipxy(x,y,ison)
                  if (ison) then
                     someon = .true.
                     RETURN
                  else
c                    Totalize viewport space sector containing clipped corner.
                     if (((icol.eq.1).or.(icol.eq.NPOINTS)).and.
     +                  ((irow.eq.1).or.(irow.eq.NPOINTS))) then
                        nclipt = nclipt + 1
                        ixt = ixt + ixnp
                        iyt = iyt + iynp
                     endif
                  endif
               endif
  200       continue
  300    continue
c
c        Set someon to true if rectangle corners straddle the viewport.
```

```
         if (nclipt.eq.4) then
            if (((ixt.eq.0).and.(abs(iyt).ne.4)) .or.
     +         ((iyt.eq.0).and.(abs(ixt).ne.4))) then
c              Insure rectangle is not on back side of earth.
               if (abs(reast).gt.pie) reast = reast - sign(tpie,reast)
               if (eastl(reast,rwest) .eq. reast)  someon = .true.
            endif
         endif
c
      endif
c
      return
      end


C++++++++++++++++++++++++++++++++++++++++++++++++++++++++++++++++++++++|++++++++
C UNIT NAME:                        CLIP2L
C
C FUNCTIONAL DESCRIPTION:           Clips a polygon by a line.  Output points
C                                   will lie in the half plane to the left of
C                                   a specified directed line segment.
C
C INPUT FILES/PARAMETERS:           x(n), y(n) - Input polygon coords.
C                                   n          - Number of input points.
C                                   ax,ay      - Directed line segment start.
C                                   bx,by      -    "       "      "    end.
C
C GLOBAL VARIABLES:                 none.
C
C OUTPUT FILES/PARAMETERS:          u(m), v(m) - Clipped polygon coords.
C                                   m          - Number of output points.
C
C SUBROUTINES/FUNCTIONS CALLED:   none.
C
C CALLED BY:                      BLPLGN
C
C LOCAL VARIABLES:                  s1, s2      - Sign of sN tells half plane.
C                                   dX, dY, D   - Coefficients of clip line in
C                                                 form:    dY*x - dX*y + D = 0
C                                   ddx,ddy,dd  - Coefs of polyline segment.
C
C RESTRICTIONS:                     Don't use single buffer for input & output.
C
C ABNORMAL RETURN CONDITIONS:       none.
C
C REFERENCE:                        Sutherland & Hodgeman    CACM 1974
C
C PROGRAMMER:                     DATE OF LAST CHANGE     REASON FOR CHANGE
C     Tom Wescott (NOSC)          Dec 87                  Original entry.
C
C-*-*-*-*-*-*-*-*-*-*-*-*-*-*-*-*-*-*-*-*-*-*-*-*-*-*-*-*-*-*-*-*-*-*-*|*-*-*-*-
C
      subroutine clip2l(ax,ay,bx,by,x,y,n,u,v,m)
c
      include   'carmaxdim.inc'
c
      dimension x(*),y(*), u(*),v(*)
c
c     Compute clip line (also half plane) general form coefficients
c     from directed line segment  (ax,ay) to (bx,by).
      dY = ay - by
      dX = ax - bx
      D  = ax*by - ay*bx
c
      m = 0
c     Process the first point.
      s1 = dY*x(1) - dX*y(1) + D
      if (s1.ge.0.0) then
         m = m + 1
         u(m) = x(1)
         v(m) = y(1)
      endif
c
      if (n.gt.1) then
```

```
         do 100 i = 2, n
c
            if (m.ge.MAXV) then
               write(*,*)' CLIP2L... array exceeded ',MAXV
               STOP
            endif
c
            s2 = dY*x(i) - dX*y(i) + D
            if ((s1.lt.0.0).and.(s2.lt.0.0)) then
c              Output nothing.
            else
               if ((s1.ge.0.0).and.(s2.ge.0.0)) then
c                 Output line from point i-1 to point i.
                  m = m + 1
                  u(m) = x(i)
                  v(m) = y(i)
               else
c                 Find intersection of polyline segment with clip line.
                  ddy = y(i-1) - y(i)
                  ddx = x(i-1) - x(i)
                  dd = x(i-1)*y(i) - y(i-1)*x(i)
                  xa = -(ddx*D-dX*dd)
                  ya = -(ddy*D-dY*dd)
                  wa = -(ddy*dX -dY*ddx)
c                 Note:  wa cannot be 0.0 here, divide check unnecessary.
                  xintr = xa/wa
                  yintr = ya/wa
c
                  if (s1.lt.0.0) then
c                    Output line from intersection point to point i.
                     m = m + 1
                     u(m) = xintr
                     v(m) = yintr
                     m = m + 1
                     u(m) = x(i)
                     v(m) = y(i)
                  else
c                    Output line from point i-1 to intersection point.
                     m = m + 1
                     u(m) = xintr
                     v(m) = yintr
                  endif
c
               endif
            endif
            s1 = s2
 100     continue
      endif
c
      return
      end


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   CLIPLG
C
C FUNCTIONAL DESCRIPTION:      Clips a polygon by a line.  Output points
C                              will lie in the half plane to the left of
C                              a specified directed line segment.
C
C INPUT FILES/PARAMETERS:      ax,ay         - Directed line segment start.
C                              bx,by         -    "      "      "   end.
C                              Closed polygon in linked list form:
C                                x(n), y(n) - Vertex coordinate arrays.
C                                inply      - Pointer to polygon start in x,y.
C                                iptr(n)    - Ptr. array to vertex (n+1). Plgn
C                                              (terminated by repeat of 1stvrt).
C                                m          - End of data marker in x,y.
C
C GLOBAL VARIABLES:            None.
C
C OUTPUT FILES/PARAMETERS:     Multiple polygons in linked list form:
C                                outply(k)  - List of starting ptrs. for k
```

```
C                                        polygons.  (terminated with a 0)
C                          nxt(m+j)    - Pointer array to vertex (n+1).
C                          m           - Updated end of data marker.
C
C SUBROUTINES CALLED:      None.
C
C CALLED BY:               blhatc, blplgn, jpolg2
C
C LOCAL VARIABLES:         j           - # of intersections with clip line.
C                          xi,yi       - Current point in input polyline.
C                          xprv,yprv   - Previous point.
C                          s1, s2      - Sign of sN tells half plane.
C                          dX, dY, D   - Coefficients of clip line in
C                                        form:    dY*x - dX*y + D = 0
C                          ddx,ddy,dd  - Coefs of polyline segment.
C
C RESTRICTIONS:            None.
C
C ABNORMAL RETURN CONDITIONS:  None.
C
C PROGRAMMER:              DATE OF LAST CHANGE     REASON FOR CHANGE
C     Tom Wescott (NOSC)   Aug 88                  Original entry.
C
C-*-*-*-*-*-*-*-*-*-*-*-*-*-*-*-*-*-*-*-*-*-*-*-*-*-*-*-*-*-*-*-*-*-*-*-*|*-*-*-*-
C
      subroutine cliplg(ax,ay,bx,by,x,y,inply,iptr,m,outply,nxt)
c
      real x(*),y(*)
      integer iptr(*), nxt(*)
c
      include   'carmaxdim.inc'
c
      integer list(2*MXPLYS), outply(MXPLYS)
c
c     Compute clip line (also half plane) general form coefficients
c     from directed line segment  (ax,ay) to (bx,by).
      dY = ay - by
      dX = ax - bx
      D  = ax*by - ay*bx
c
c     Initialize counters, and set up loop with previous point.
      nin = 0
      j = 0
      lstptr = inply
      xprv = x(lstptr)
      yprv = y(lstptr)
      s1 = dY*xprv - dX*yprv + D
      inptr = lstptr
c
c     Do Until (input polygon has closed)
 101     inptr = iptr(inptr)
         nin = nin + 1
         if ((nin.gt.idim).or.(inptr.gt.idim).or.(inptr.lt.1)) then
            Write(*,*)'CLIPLG...  bad input polygon linkage'
            STOP
         endif
         xi = x(inptr)
         yi = y(inptr)
c
         s2 = dY*xi - dX*yi + D
CC       if ((s1.lt.0.0).and.(s2.lt.0.0)) then
         if ((s1.le.0.0).and.(s2.le.0.0)) then
c           Output nothing.
         else
            if ((s1.ge.0.0).and.(s2.ge.0.0)) then
c              Output line from previous point to point i.
               nxt(lstptr) = inptr
            else
c              Find intersection of polyline segment with clip line.
               ddy = yprv - yi
               ddx = xprv - xi
               dd = xprv*yi - yprv*xi
               xa = -(ddx*D-dX*dd)
               ya = -(ddy*D-dY*dd)
```

```
            wa = -(ddy*dX -dY*ddx)
            xintr = xa/wa
            yintr = ya/wa
c           Append intersection pt to input polyline list.
            j = j + 1
            if (j+m.gt.idim)
     +         write(*,*)' CLIPLG... vertex limit exceeded ',idim
            list(j) = m+j
            x(m+j) = xintr
            y(m+j) = yintr
c
            if (s1.lt.0.0) then
c              Output line from intersection point to point i.
               nxt(m+j) = inptr
            else
c              Output line from previous point to intersection point.
               nxt(lstptr) = m+j
c              Flag link from intersection with a zero.  Will fix it later.
               nxt(m+j) = 0
            endif
         endif
      endif
      s1 = s2
      xprv = xi
      yprv = yi
      lstptr = inptr
      if (inptr.ne.inply) go to 101
c     End do.
c
      if (j.eq.0) then
c        Input lies entirely to one side of the clip line.
         outply(1) = 0
         outply(2) = 0
         if (s1.ge.0) outply(1) = inply
      else
c
c        Sort the list of intersections by position along the clip line.
         do 290 i = 1, j-1
            do 280 k = i+1, j
               if (abs(dX).gt.abs(dY)) then
                  if (x(list(i)).lt.x(list(k))) then
                     itemp = list(i)
                     list(i) = list(k)
                     list(k) = itemp
                  endif
               else
                  if (y(list(i)).lt.y(list(k))) then
                     itemp = list(i)
                     list(i) = list(k)
                     list(k) = itemp
                  endif
               endif
 280        continue
 290     continue
c
c        Bad input recovery:  If each pair of intersections do not contain
c        one nxt=0, we have cut thru two parts of an internally reflexed
c        polygon.  Reorder intersections for least objectionable linkage.
         do 298  i = 1, j-1, 2
            if (((nxt(list(i)).ne.0).and.(nxt(list(i+1)).ne.0)).or.
     +          ((nxt(list(i)).eq.0).and.(nxt(list(i+1)).eq.0))) then
CD             WRITE(*,*)'CLIPLG...reflex',nxt(list(i)),nxt(list(i+1))
c              Swap 2nd element of this bad pair with next linkable.
               ibad = nxt(list(i+1))
               do 295 k = i+2, j
                  itry = nxt(list(k))
                  if (((ibad.ne.0).and.(itry.eq.0)).or.
     +                ((ibad.eq.0).and.(itry.ne.0))) then
                     itemp = list(k)
                     list(k) = list(i+1)
                     list(i+1) = itemp
                     go to 296
                  endif
 295           continue
```

```
 296             continue
              endif
 298      continue
c
c         Close polygons by linking alternate pairs of intersections.
          do 300 intr = 1, j-1, 2
             iaddr1 = list(intr)
             iaddr2 = list(intr+1)
             if (nxt(iaddr1).eq.0) nxt(iaddr1) = iaddr2
             if (nxt(iaddr2).eq.0) nxt(iaddr2) = iaddr1
 300      continue
c
c         Make a list of possible start points for output polygons.
          do 410 i = 1, j/2
             outply(i) = list(i*2)
 410      continue
          outply(j/2+1) = 0
c
c         Traverse that list to identify start points and delete extras.
          kountp = 0
          nxtplg = outply(1)
c         While (more polygons) do
 420         if (nxtplg.eq.0) go to 490
             kountp = kountp + 1
             if (kountp.gt.MXPLYS) then
                write(*,*)'CLIPLG... output exceeded max # of polygons'
                STOP
             endif
             istvrt = nxt(nxtplg)
             nxtvrt = nxt(istvrt)
             kountv = 1
c            While (polygon not closed) do
 430            if (nxtvrt.eq.istvrt) go to 480
c               Check remainder of polygon list for a duplicate entry.
                do 460 k = kountp+1, j/2
                   if (outply(k).eq.nxtvrt) then
c                     Delete duplicate polygon from start points list.
                      do 450 kk = k, j/2
                         outply(kk) = outply(kk+1)
 450                  continue
                   endif
 460            continue
                nxtvrt = nxt(nxtvrt)
                kountv = kountv + 1
                go to 430
 480         continue
             nxtplg = outply(kountp+1)
             go to 420
 490      continue
       endif
c
c      Reset end of data marker.
       m = m+j
c
       return
       end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME: CLIPXY
C
C FUNCTIONAL DESCRIPTION:  CLIPS POINT X,Y AGAINST VIEWPORT.
C
C INPUT FILES/PARAMETERS:
C
C         NEWONS                 LOGICAL     INDICATES WHETHER POINT IS ON SCREEN.
C         X                      REAL        X COORDINATE.
C         Y                      REAL        Y COORDINATE.
C
C GLOBAL VARIABLES : NONE.
C
C OUTPUT FILES/PARAMETERS:  NONE.
C
```

```
C SUBROUTINES/FUNCTIONS CALLED :
C
C        FPOSIT                  POSITIONS POINT X,Y.
C        FDRAWV                  DRAWS VECTOR TO X,Y.
C
C CALLED BY:                      BSTMAP, CHECKA, CHECKB, FILLPT, GRDLAT,
C                                 GRDLON, LIMITS, LLINXY, PLOTOV,
C                                 PLTCIT, PLTNAM
C
C LOCAL VARIABLES: NONE.
C
C RESTRICTIONS: NONE.
C
C ABNORMAL RETURN CONDITIONS:    NONE.
C
C LOCATION:                       /a21/gjf/MAPSRC.FTN
C
C PROGRAMMER:                     DATE OF LAST CHANGE     REASON FOR CHANGE
C
C     DAVE NATION                                         ORIGINAL CODE.
C     JERRY FENERTY                                       DOCUMENT AND MODIFY
C                                                         FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE CLIPXY (X,Y,NEWONS)

      LOGICAL NEWONS
      COMMON /VIEWP/ XRAD,YRAD,IXNP,IYNP,XC,YC

      NEWONS=.FALSE.
          IXNP=0
          IYNP=0
          IF (X.GT.XRAD) IXNP=1
          IF (X.LT.-XRAD) IXNP=-1
          IF (Y.GT.YRAD) IYNP=1
          IF (Y.LT.-YRAD) IYNP=-1
          IF (IXNP.EQ.0.AND.IYNP.EQ.0) NEWONS=.TRUE.

      RETURN
      END


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      D2OUTL
C
C FUNCTIONAL DESCRIPTION:         Draw (fill) map outline.
C
C INPUT FILES/PARAMETERS:         None.
C
C GLOBAL VARIABLES:               clat,clon       - Map center.
C                                 xrad,yrad       - Viewport limits.
C                                 alat(),alon()   - Conic clip line ends.
C                                 blat(),blon()
C
C OUTPUT FILES/PARAMETERS:        Whole earth polygon filled with ocean color.
C
C SUBROUTINES CALLED:             llplxy, xytoll
C
C CALLED BY:                      DMAPII
C
C LOCAL VARIABLES:                None.
C
C RESTRICTIONS:                   None.
C
C ABNORMAL RETURN CONDITIONS:     None.
C
C PROGRAMMER:                     DATE OF LAST CHANGE     REASON FOR CHANGE
C     DAVE NATION                                         Original droutl.
C     Tom Wescott   (NOSC)        11/87                   Generalized.
C
C-*-*-*-*-*-*-*-*-*-*-*-*-*-*-*-*-*-*-*-*-*-*-*-*-*-*-*-*-*-*-*-*-*-*-*-*-*|*-*-*-*-
```

```
      subroutine D2OUTL
c
      common /center/ clat,clon,cclat,sclat
      common /viewp/ xrad,yrad,ixnp,iynp,xc,yc
      common /pie/ pie,tpie,pio2,pio4
      common /comgra/xllgra,yllgra,xurgra,yurgra,ibcgra,iocgra,incgra
      logical invali,notlst
      common /invali/ invali
      common /proj/ itproj,wmrad,xoffs,yoffs,scalr,notlst
      real ax(3),ay(3),bx(3),by(3),alon(3),alat(3),blon(3),blat(3)
      common /break/ blclat,blclon,ax,ay,bx,by,alon,alat,blon,blat
      parameter (NLOOPS = 9)
      parameter (NPOINTS = 37)
      real plon(5*NPOINTS),plat(5*NPOINTS),x(5*NPOINTS),y(5*NPOINTS)
c
c
c     Set interior and edge style for outline polygon.
      call jpintr(1)
      call jpedge(1)
c
c----------------------------------------------------------------|--+
c Itproj:  1  2  3  4  5  6  7  8  9 10 11 12 13 14 15 16 17 18 19 20 21  |
c-------------------------------------------------------------------+
c          g  o  o  o  p  e  m  l  a  a  a  k  m  o  p  p  u  s  s       |
c          n  r  r  r  e  q  e  a  l  z  z  a  i  b  o  o  t  i  t       |
c          o  e  p  t  r  r  r  m  b  e  e  v  l  l  s  l  m  n  e       |
c          m  q  o  h  s  e  c  c  r  a  d  r  l  m  t  y  z  u  r       |
c-------------------------------------------------------------------+
      goto(3,02,02,03,03,05,05,04,04,03,03,04,05,05,02,04,01,04,03
     +    )itproj
c
c       Case #1  For omitting the outline.  Fill entire display.
 01        continue
           call jrect(-xrad,-yrad,xrad,yrad)
           go to 900
c
c       Case #2  For azimuthal projections with offset centers.
 02        continue
              if ((itproj.eq.3).or.(itproj.eq.15)) then
c                For polar stereographic or polar orthographic.
                 polat = sign(pio2,clat)
                 call llplxy(0.0,polat,1,xcntr,ycntr,idummy)
              elseif (itproj.eq.2) then
c                For equatorial orthographic.
                 call llplxy(clon,0.0,1,xcntr,ycntr,idummy)
              endif
c             Jump to general azimuthal process for circle draw.
              go to 302
c
c       Case #3  For general azimuthal projections.
 03        continue
           call llplxy(clon,clat,1,xcntr,ycntr,idummy)
c
c          Set line segment between proj. center and pt. outside viewport.
 302       xearth = xcntr
           yearth = ycntr
           xspace = -xrad*sign(1.1,xearth)
           yspace = -yrad*sign(1.1,yearth)
c
c          Locate possible intersection of map edge with line segment.
           do 304 itest = 1, NLOOPS
              xedge = (xspace+xearth)*0.5
              yedge = (yspace+yearth)*0.5
              call xytoll(xedge,yedge,rlat,rlon)
              if (invali) then
                 xspace = xedge
                 yspace = yedge
              else
                 xearth = xedge
                 yearth = yedge
              endif
 304       continue
c
c          Draw circle with radius slightly larger than map.
```

```
      rad = sqrt((xcntr-xedge)**2.+(ycntr-yedge)**2.) + 0.5
      call jcircl(xcntr,ycntr,0.,rad,0)
      go to 900
c
c    Case #4 For conics, etc. with pole to pole breakline opposite center.
 04   continue
c
c     Get geographic limits of the map from clip line ends.
      rnort = alat(3)
      rsout = alat(2)
      reast = alon(3)
      rwest = alon(2)
c
c     Translate longitude limits to continuous scale where  W < E.
      breakl = clon - sign(pie,clon)
      treast = reast
      trwest = rwest
      if (treast.lt.breakl) treast = treast + tpie
      if (trwest.lt.breakl) trwest = trwest + tpie
c
c     Draw a polygon around the curved figure defined by map limits.
      stepla = (rnort-rsout)/(NPOINTS-1)
      steplo = (treast-trwest)/(NPOINTS-1)
      j = 1
      do 402 i = 0, NPOINTS-1
         plon(j) = reast
         plat(j) = rnort - i*stepla
         j = j + 1
 402  continue
      do 404 i = 1, NPOINTS-1
         plon(j) = treast - i*steplo
         if (plon(j).gt.pie) plon(j) = plon(j) - tpie
         plat(j) = rsout
         j = j + 1
 404  continue
      do 406 i = 1, NPOINTS-1
         plon(j) = rwest
         plat(j) = rsout + i*stepla
         j = j + 1
 406  continue
      do 408 i = 1, NPOINTS-1
         plon(j) = trwest + i*steplo
         if (plon(j).gt.pie) plon(j) = plon(j) - tpie
         plat(j) = rnort
         j = j + 1
 408  continue
      call llplxy(plon,plat,j-1,x,y,nout)
c
      xmax = 10.0*xrad
      ymax = 10.0*yrad
      do 410 k = 1,nout
         if (abs(x(k)).gt.xmax) x(k) = sign(xmax,x(k))
         if (abs(y(k)).gt.ymax) y(k) = sign(ymax,y(k))
 410  continue
      call jpolgn(x,y,nout)
      go to 900
c
c    Case #5  For cylindricals, including obliques.
 05   continue
c     Get rectanglular limits of the map from clip line ends.
      plon(1) = alon(2)
      plat(1) = alat(2)
      plon(2) = blon(2)
      plat(2) = blat(2)
      plon(3) = alon(3)
      plat(3) = alat(3)
      plon(4) = blon(3)
      plat(4) = blat(3)
      plon(5) = plon(1)
      plat(5) = plat(1)
      call llplxy(plon,plat,5,x,y,nout)
      xmax = 10.0*xrad
      ymax = 10.0*yrad
      do 510 k = 1,nout
```

```
            if (abs(x(k)).gt.xmax) x(k) = sign(xmax,x(k))
            if (abs(y(k)).gt.ymax) y(k) = sign(ymax,y(k))
 510      continue
          call jpolgn(x,y,nout)
          go to 900
c
c     End cases.
 900  continue
c
c     Draw a box around graphics area to overwrite background color.
      call xcolor (iocgra)
      call jmove (xrad,yrad)
      call jdraw (xrad,-yrad)
      call jdraw (-xrad,-yrad)
      call jdraw (-xrad,yrad)
      call jdraw (xrad,yrad)
c
      return
      end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       DA2LL
C
C FUNCTIONAL DESCRIPTION:          Converts distance and azimuth from
C                                  any point to lat, lon.
C
C INPUT FILES/PARAMETERS:          slat,slon  - Start point coords.
C                                  dist       - Arc distance.
C                                  az         - Azimuth.
C
C GLOBAL VARIABLES:                pie, pio2
C
C OUTPUT FILES/PARAMETERS:         tlat,tlon  - Target point coords.
C
C SUBROUTINES CALLED:              None.
C
C CALLED BY:                       BLSET, LL2GC, PXOBLM, XPSTER
C
C LOCAL VARIABLES:                 S,T,D       - Sides of polar triangle.
C
C RESTRICTIONS:                    None.
C
C ABNORMAL RETURN CONDITIONS:      Az from poles assumed cw from prime meridian.
C
C PROGRAMMER:                      DATE OF LAST CHANGE     REASON FOR CHANGE
C     Dave Nation                                          Original DATOLL
C     Tom Wescott (NOSC)           Dec 87                  Robust version.
C
C-*-*-*-*-*-*-*-*-*-*-*-*-*-*-*-*-*-*-*-*-*-*-*-*-*-*-*-*-*-*-*-*-*-*-*|*-*-*-*-
      subroutine DA2LL(slat,slon,dist,az,tlat,tlon)
c
      common /pie/ pie,tpie,pio2,pio4
c
      cosT = sin(slat)
      sinT = cos(slat)
      cosD = cos(dist)
      sinD = sin(dist)
c
c     Law of Cosines for polar distance of target point.
      cosS = cosT*cosD + sinT*sinD*cos(az)
      if (abs(cosS).gt.1.0)  cosS = sign(1.0,cosS)
      S = acos(cosS)
      tlat = pio2 - S
c
c     Calculate polar angle.
      sinS = sin(S)
      sinAz = sin(az)
      if ((abs(slat).lt.pio2).and.(abs(tlat).lt.pio2)) then
         denom = sinS*sinT
         dnumr = cosD - cosS*cosT
         cosDlo = dnumr/denom
c
```

```
         if (abs(cosDlo) .lt. 0.900) then
c           Law of Cosines works well for most polar angles.
            Dlo = sign(acos(cosDlo),sinAz)
         else
c           Law of Sines is more accurate when Dlo near 0 or pi.
            sinDlo = sinD*sinAz/sinS
            if (abs(sinDlo).gt.1.0)  sinDlo = sign(1.0,sinDlo)
            Dlo = asin(sinDlo)
            if (dnumr.lt.0.0)  Dlo = sign(pie,Dlo) - Dlo
         endif
      else
         if(sinS.eq.0.0) then
c           Target point is a pole.
            Dlo = 0.0
         else
c           Start point is a pole, assume caller has defined az from prime M.
            Dlo = - slon - az*cosT
         endif
      endif
c
      tlon = slon + Dlo
      if (abs(tlon).gt.pie) tlon = tlon - sign(tpie,tlon)
c
      return
      end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME: distaz
C
C FUNCTIONAL DESCRIPTION:  Compute distance and azimuth between 2 points
C
C INPUT FILES/PARAMETERS:
C              L1, L2  - Latitude of first and second points in radians.
C              DLo     - Longitude difference between points in radians.
C
C GLOBAL VARIABLES :
C              common /center/
C              common /pie/
C
C OUTPUT FILES/PARAMETERS:
C              dist    - Arc length between points in degrees.
C              az      - Azimuth of second point in radians.
C                        Note... convention is cw positive.
C
C SUBROUTINES/FUNCTIONS CALLED :
C
C CALLED BY:                      NO LONGER USED BY CARICATURE
C
C LOCAL VARIABLES: NONE.
C
C RESTRICTIONS: NONE.
C
C ABNORMAL RETURN CONDITIONS:   NONE.
C
C LOCATION:
C
C PROGRAMMER:                     DATE OF LAST CHANGE     REASON FOR CHANGE
C
C     DAVE NATION                                         ORIGINAL CODE.
C     JERRY FENERTY                                       DOCUMENT AND MODIFY
C                                                         FOR A21 PROTOTYPE.
C     Tom Wescott (NOSC)          Jan 86              Change to single precision
c     Tom Wescott                 1987                fix cosER - distaz
C
C-*-*-*-*-*-*-*-*-*-*-*-*-*-*-*-*-*-*-*-*-*-*-*-*-*-*-*-*-*-*-*-*-*-*-*|*-*-*-*-

        SUBROUTINE DISTAZ (L1,DLo,L2,DIST,AZ)

c
      real L1, L2
      common /pi/ pie,tpie,pio2,pio4
      common /rade/ rade
```

```
      real*8 erd
      common /er/ er,erd
c
c
      sinL1 = sin(L1)
      cosL1 = cos(L1)
      sinL2 = sin(L2)
      cosL2 = cos(L2)
      cosDLo = cos(DLo)
c
c     Use cosine rule for sides to compute arc distance.
      cosER = sinL1*sinL2+cosL1*cosL2*cosDLo
      cosER = amax1(cosER,-1.0)
      cosER = amin1(cosER,1.0)
      er = acos(cosER)
c     Convert arc distance into degrees.
      dist = er * rade

cTemp Set erd for the remaining double precision routines.
      erd = er
c
      sinER = sin(er)
      sercl1 = sinER*cosL1
      if (sercl1 .eq. 0.0) then
c        Points are on same meridian, avoid zero divide.
         if (L2.gt.L1) then
            az = pie
         else
            az = 0.
         endif
      else
c        Use cosine rule again to compute azimuth.
         cosAZ = (sinL2-cosER*sinL1)/sercl1
         cosAz = amax1(cosAz,-1.0)
         cosAz = amin1(cosAz,1.0)
         az = acos(cosAZ)
      endif
c
c     Make azimuth clockwise positive.
      if (Dlo .lt. 0.0) az = tpie - az
c
      return
      end


C+*+*+*+*+*+*+*+*+*+*+*+*+*+*+*+*+*+*+*+*+*+*+*+*+*+*+*+*+*+*+*+*+*+*+*+*+*|*+*+*+*+
* UNIT NAME: DMAPII
*
* FUNCTIONAL DESCRIPTION:  READS WDBII AND DRAWS MAP.
*
* INPUT FILES/PARAMETERS:
*
*       XRNM    HORIZONTAL RADIUS (X DIRECTION) IN NAUTICAL MILES
*               OF THE DISPLAY VIEWPORT.  THIS IS 1/2 OF THE VIEWPORT WIDTH.
*               (ONE NAUTICAL MILE ROUGHLY EQUATES TO 1 MINUTE LATITUDE)
*       XCN     SCREEN COORDINATES OF THE CENTER OF THE MAP IN THE X DIRECTI
*       YCN     SAME AS ABOVE IN THE Y DIRECTION.
*       LEVEL   LEVELS OF DETAIL (CORRESPONDS TO LINE RANKING VALUES WITHIN
*               CATEGORIES OF WDBII DATA) RANGE IS BETWEEN 1 - LEAST DETAILE
*               AND 15 - MOST DETAILED
*       CLA     LATITUDE OF MAP AT CENTER OF SCREEN IN RADIANS
*               (NORTH IS POSITIVE, SOUTH NEGATIVE)
*       CLO     LONGITUDE OF MAP AT CENTER OF SCREEN IN RADIANS
*               (EAST IS POSITIVE, WEST NEGATIVE)
*       XRA     HALF OF WIDTH OF VIEWPORT IN SCREEN COORDINATES
*       YRA     HALF OF HEIGHT OF VIEWPORT IN SCREEN COORDINATES
*       ITPRO   NUMERIC VALUE REPRESENTING TYPE OF PROJECTION
*                       1 - GNOMONIC
*                       2 - ORTHOGRAPHIC EQUATORIAL
*                       3 - ORTHOGRAPHIC POLAR
*                       4 - ORTHOGRAPHIC (OBLIQUE)
*                       5 - PERSPECTIVE
*                       6 - EQUIRECTANGULAR
*                       7 - MERCATOR
```

```
*                    8 - LAMBERT CONFORMAL
*       IRES    MINIMUM RESOLUTION OF LINES IN SCREEN COORDINATES
*               A LINE WILL NOT BE DRAWN UNLESS IT IS IRES UNITS LONG
*               (UNLESS IT IS THE LAST VECTOR IN A STRING)
*       LTYPTB  THIS IS A TABLE OF 16 VARIABLES CONTAINING AN INTEGER
*               VALUE REPRESENTING LINE TYPE FOR THE WDBII LINE
*               CATEGORIES.  THE CATEGORIES ARE AS FOLLOWS:
*                    1       COASTLINES, ISLANDS, LAKES
*                    2       POLITICAL BOUNDARIES
*                    3       INTERNAL POLITICAL BOUNDARIES
*                    4       RIVERS
*                    5       RAILROADS
*                    6       ROADS
*                    7       CITY NAMES
*                    8       OUTLINE OF EARTH (ORTHOGRAPHIC PROJECTIONS)
*                    9       WATER FILL
*                   10       COUNTRY NAMES
*                   11
*                   12       MILITARY DISTRICTS
*                   13
*                   14
*                   15       SCALES
*                   16       GRIDS
*               THE VALUE REPRESENTS A VALUE RELATED TO THE HARDWARE
*               GRAPHICS DEVICE (COLOR, PLANE OR INTENSITY FOR RASTER SYSTEM
*               LINE TEXTURE FOR STORAGE TUBES)
*       LUNDAT  LOGICAL UNIT NUMBER FOR WDBII DATA FILE
*       LUNIND  LOGICAL UNIT NUMBER FOR WDBII INDEX FILE (REPRESENTS LINES)
*       LUNLIN  LOGICAL UNIT NUMBER FOR WDBII LINE INDEX FILE
*       LTON    TABLE OF 16 LOGICAL VALUES.  DETERMINES WHETHER THE
*               LINE TYPES REFERENCED BY LTYPTB ARE TO BE DISPLAYED
*       IPGRID  LAT/LON GRID DISPLAY PARAMETERS:
*               A FOUR VALUE INTEGER ARRAY CONSISTING OF THE FOLLOWING
*               1 - LATSTP - THE # OF MINUTES BETWEEN DISPLAYED LATITUDE LIN
*               2 - LONSTP - AS ABOVE WITH LONGITUDE
*               3 - LATINC - THE # OF MINUTES BETWEEN LINE SEGMENTS IN THE
*                       LINES REPRESENTING LATITUDE (RESOLUTION OF THE LINE)
*               4 - LONINC - AS ABOVE WITH LONGITUDE
*       DOTEM   A LOGICAL VALUE INDICATING TO USE DOTS TO REPRESENT LINES
*               OF LATITUDE AND LONGITUDE IF TRUE.
*       ORHALT  ALTITUDE FOR PERSPECTIVE
*       LTYPOV  THIS IS A TABLE OF 16 VARIABLES CONTAINING AN INTEGER
*               VALUE REPRESENTING LINE TYPE FOR OVERLAY FEATURES.
*       LTONOV  TABLE OF 16 LOGICAL VALUES.  DETERMINES WHETHER THE
*               LINE TYPES REFERENCED BY LTYPOV ARE TO BE DISPLAYED.
*       RANKT   RANK TABLE  -- LOGICAL TABLE OF UP TO 26 RANKS FOR EACH
*               OF THE 16 MAP LINE TYPES.
*
* GLOBAL VARIABLES :
*
*       INTERR       INTERR  LOGICAL     FLAG TO INDICATE IF MAP
*                                        DRAWING IS TO BE INTERRUPTED.
*       INVALI       INVALI  LOGICAL     INDICATES VALIDITY OF XYTOLL
*                                        AND LLTOXY CONVERSIONS.
*       LTYPS        LTYPS   INTEGER     CURRENT LINE TYPE.
*       ISEMAX       ISEMAX  INTEGER
*       XRAD         VIEWP   REAL        HALF OF VIEPORT WIDTH.
*       YRAD         VIEWP   REAL        HALF OF VIEWPORT HIEGHT
*       KB           TERMIN  INTEGER     WRITE UNIT NUMBER.
*       ICRT         TERMAIN INTEGER     READ UNIT NUMBER.
*       IGNOMN       PROJT   INTEGER     GNOMONIC PROJECTION.
*       IORTEQ       PROJT   INTEGER     ORTHOGRAPHIC EQUATORIAL PROJECTION.
*       IORTPO       PROJT   INTEGER     ORTHOGRAPHIC POLAR PROJECTION.
*       IORTHO       PROJT   INTEGER     ORTHOGRAPHIC PROJECTION.
*       IPERSP       PROJT   INTEGER     PERSPECTIVE PROJECTION.
*       IEQREC       PROJT2  INTEGER     EQUIRECTANGULAR PROJECTION.
*       IMERCA       PROJT2  INTEGER     MERCATOR PROJECTION.
*       ILAMCN       PROJT2  INTEGER     LAMBERT CONFORMAL PROJECTION.
*       ICNTGP       COUNTS  INTEGER
*       ICNTDV       COUNTS  INTEGER
*       PIE          PIE     REAL        3.14 ...
*       TPIE         PIE     REAL        TWO * PIE.
*       PIO2         PIE     REAL        PIE / 2.
```

```
*       PIO4        PIE     REAL        PIE / 4.
*       FILPLY      POLYCB  LOGICAL     WHETHER OR NOT POLYGON FILL HAS BEEN
*                                  SELECTED FROM MENU.
*       OPNPLY      POLYCB  LOGICAL     WHETHER OR NOT POLYGON FILL FILE
*                                  HAS OPENED PROPERLY.
*
* OUTPUT FILES/PARAMETERS:  NONE.
*
* SUBROUTINES/FUNCTIONS CALLED :
*
*       INITIA          INITIALIZE MAP PARAMETERS.
*       LIMITS          CALCULATE THE GEOGRAPHIC LIMITS.
*       MAPMSG          PRINTS MESSAGE INDICATING WHICH FEATURE
*                       IS BEING DRAWN.
*       GLTYPE          SETS COLOR TYPE AND OPENS NEXT SEGMENT.
*       DROUTL          DRAWS OUTLINE  OF EARTH.
*       FLUSHB          FLUSHES GRAPHIC BUFFER.
*       CHINT           CHECKS FOR INTERRUPT.
*       CHECKA          CHECKS RECTANGULAR AREA FOR INTERSECTION
*                       WITH VIEWPORT.
*       CHECKM          CHECKS RECTANGULAR AREA FOR INTERSECTION
*                       WITH VIEWPORT (MERCATOR & EQUIRECTANGULAR).
*       GTLIN           GETS LINE RECORD FROM WDBII.
*       GETPOI          GETS A POINT FROM WDBII.
*       GETLND          GETS A LINE INDEX RECORD
*       INVTES          CHECKS INVISIBILITY OF A POINT.
*       INVTS2          CHECKS MERCATOR AND EQUIRECTANGULAR FOR LINES
*                       TO BE CLIPPED AT LEFT AND RIGHT OF SCREEN.
*       LLTOXY          CONVERTS LAT/LONG TO X,Y.
*       CLIPXY          CLIPS X,Y AGAINST VIEPORT.
*       PROCPO          POSITIONS POINT X,Y.
*       GETSEG          RETURNS NEXT SEGMENT NUMBER.
*       FILLPT          SEED FILL AT POINT X,Y.
*       FILLIT          PERFORMS SEED FILL AT X,Y IF X,Y IS ON SCREEN.
*       GRID            DRAWS LAT/LONG, UTM OR GAUSS GRID.
*       SCLRET          DRAWS MAP SCALES.
*       NAMLIM          PLOTS NAMES ON MAP.
*
* CALLED BY:                     MAPPER
*
* LOCAL VARIABLES:
*
*       MAXCAT                INTEGER     MAXIMUM CATEGORY VALUE.
*       LCGRID                INTEGER     GRID FEATURE NUMBER.
*       LCOUTL                INTEGER     EARTH OUTLINE FEATURE NUMBER.
*       LCFILL                INTEGER     FILL FEATURE NUMBER.
*       LCNAME                INTEGER     NAMES FEATURE NUMBER.
*       LCCITY                INTEGER     CITY NAMES FEATURE NUMBER.
*       LSCALE                INTEGER     SCALES FEATURE NUMBER
*       LCWTR                 INTEGER     WATER FILL FEATURE NUMBER
*       EOF                   LOGICAL     END OF FILE FLAG.
*       ERF                   LOGICAL     END OF FILE FOR WDBII DATA
*                                         FILE.
*       SETINV                LOGICAL     WHETHER OR NOT TO CHECK LINES
*                                         AND/OR POINTS FOR VISIBILITY
*                                         ON SPHERE.
*       CHINV                 LOGICAL     SAME AS SETINV.
*       SOMEON                LOGICAL     INDICATES THAT AT LEAST ONE POINT
*                                         CHECKED IS ON THE SCREEN.
*       ALLON                 LOGICAL     INDICATES ALL POINTS ARE ON SCREEN
*       ISINV                 LOGICAL     INDICATES IF POINT WAS
*                                         INVISIBLE.
*       ISGOOD                LOGICAL     WHETHER OR NOT TWO POINTS SHOULD
*                               BE CONNECTED (MERC. & EQUIREC.).
*       DOFILL                LOGICAL     WHETHER OR NOT POLYGON FILL
*                               WILL BE EXECUTED.
*       NEWONS                LOGICAL     INDICATES IF NEW POINT IS
*                                         INVISIBLE.
*       NEWSEQ                LOGICAL     INDICATES IF POINT IS PART
*                                         OF NEW SEQUENCE OF POINTS
*                                         OR PART OF PREVIOUS LINE.
*       SEGCDE                INTEGER     0 - NORMAL FILL
*                                         1 - INTERIOR SEGMENT FILL
*       LINCDE                INTEGER     NULL   - DEFAULT
```

```
*                                      CONCAT - CONCATENATE LINES
*                                      TPL    - 2 PT. LINE
*                                               (SHOULD NOT OCCUR)
*                                      SLP    - SINGLE LINE POLYGON
*                                      EOP    - END OF POLYGON
*                                               (MULTIPLE LINES)
*                                      EOS    - END OF STRING OF LINES
*                                               (MULTIPLE LINES PLUS
*                                               POLYGON FILL FILE DATA).
*
* RESTRICTIONS: NONE.
*
* ABNORMAL RETURN CONDITIONS:   NONE.
*
* LOCATION:                     /gl/dmapii.ftn
*
* PROGRAMMER:                   DATE OF LAST CHANGE     REASON FOR CHANGE
*
*     DANation                                            Original code
*     GJFenerty
*     DAN BERKICH -SAIC-       OCTOBER 1986            POLYGON FILL
*     for L MCCLEARY -NOSC-
*
C-*-*-*-*-*-*-*-*-*-*-*-*-*-*-*-*-*-*-*-*-*-*-*-*-*-*-*-*-*-*-*-*-*-*-*|*-*-*-*-

      SUBROUTINE DMAPII (XRNM,XCN,YCN,LEVEL,CLA,CLO,XRA,YRA,ITPRO,
     +        IRES,LTYPTB,LUNDAT,LUNIND,LUNLIN,LTON,IPGRID,DOTEM,
     +        ORHALT,ltypov,ltonov,rankt)

      INTEGER LEVEL(16)
      logical select
      LOGICAL EOF,ERF,CHINV,SETINV,SOMEON,allon,ISINV
      LOGICAL LTON(16)
      LOGICAL DOTEM
      logical rankt(26,16)
      logical ltonov(16)
      dimension ltypov(16)

      DIMENSION ALIMIT(4),LTYPTB(16),IPGRID(4)

      CHARACTER*1 CH
      logical savchi
      LOGICAL INTERR
      COMMON /INTERR/ INTERR
      COMMON /LTYPS/ LTYPS
      COMMON /ISEMAX/ ISEMAX
      COMMON /VIEWP/ XRAD,YRAD,IXNP,IYNP,XC,YC
      COMMON /TERMIN/ KB,ICRT
      COMMON /PROJT/ IGNOMN,IORTEQ,IORTPO,IORTHO,IPERSP
      COMMON /PROJT2/ IEQREC,IMERCA,ILAMCN
      COMMON /COUNTS/ ICNTGP,ICNTDV,icntpl
      COMMON /PIE/ PIE,TPIE,PIO2,PIO4
      common/scratr/qbox,qbkgrd
      integer     qbox,qbkgrd
      LOGICAL INVALI
      COMMON /INVALI/ INVALI

      COMMON /LWDBII/ NLINDE,LENLIN,icntli

      logical map,vax,count
      common /mapdbc/ map
      common /vaxdbc/ vax
      common /cntdbc/ count
      logical bitmod
      common /bitmod/ bitmod
      common /viewbr/ vpnort,vpsout,vpeast,vpwest
      INTEGER SEGNO,FIRSEG
      COMMON /SEGNO/ SEGNO,FIRSEG
      integer boxseg
      integer oldlca
      common /gmcom/ oldlca,irnk

      EQUIVALENCE (RMINLA,ALIMIT(1)),(RMAXLA,ALIMIT(2))
      EQUIVALENCE (RMINLO,ALIMIT(3)),(RMAXLO,ALIMIT(4))
```

```
       logical filply,opnply
       common /polycb/ filply,opnply
       LOGICAL isgood,DOFILL,savfil
       common /dofill/DOFILL
       real maxx,maxx2
       common /maxx/ maxx,maxx2
       INTEGER   pntblk,POICNT,LINBLK

       integer pblack
       INTEGER null,concat,tpl,slp,eop,eos
       PARAMETER (Null   = 0)
       PARAMETER (CONCAT = 1)
       PARAMETER (TPL    = 2)
       PARAMETER (SLP    = 5)
       PARAMETER (EOP    = 6)
       PARAMETER (EOS    = 7)
       PARAMETER (PBLACK = 0)
       integer   lincde
       integer*2 segcde
       INTEGER   iprojection
       COMMON   /con001/ iprojection

       DATA MAXCAT/16/
       DATA ISEMAX/15/
       DATA LCCIL/1/
       DATA LCGRID/16/,LCOUTL/8/,ICRT/5/,KB/6/,LCNAME/10/
       DATA LCCITY/7/,LSCALE/15/,LCWTR/9/

c      placement in overlay values for polygon fill

C       DATA LCFILL/5/

       iprojection = itpro
       DOFILL = (filply.and.opnply)
       INTERR = .FALSE.
       if (map) then
          print*,' ********** IN DMAPII ************'
          print*,
     1     'XRNM,XCN,YCN,LEVEL,CLA,CLO,XRA,YRA,ITPRO,LTYPTB,LTON'
          print*,XRNM,XCN,YCN,LEVEL,CLA,CLO,XRA,YRA,ITPRO,
     1          LTYPTB,LTON
       endif

C      MAKE SURE THE NEXT COLOR IS SET IN GLTYPE
       LTYPS = -1

C      DO SOME LIMITING ON THE NAUTICAL MILE RADIUS VALUE
       IF (XRNM.LT..1) XRNM = .1
       IF (XRNM.GT.30000.) XRNM = 30000.

       XRAD = XRA
       YRAD = YRA

       CALL INITIA (XCN,YCN,CLA,CLO,XRA,YRA,ITPRO,IRES,XRNM,ORHALT)
       ICNTGP=0
       ICNTDV=0
       icntpl=0
c
c      Determine NSEW geographic limits of viewport's bounding rectangle.
       call limit2
c
c      Set up the breakline for conics.
       call blset(setinv)
c
C      DRAW OUTLINE OF EARTH
       IF (LTON(LCOUTL)) THEN
           if (DOFILL) then
             LTYPE=LTYPTB(lcwtr)
         CALL GLTYPE(LTYPE,lcwtr)
       else
         ltype=ltyptb(LCOUTL)
         CALL GLTYPE(LTYPE,lcoutl)
       endif
```

```
C           POLYGON COLOR = CURRENT LINE COLOR
            CALL XPIDEX (LTYPE,0)
            call d2outl
c
            CALL FLUSHB
            if (bitmod) then
              call jclose
              call jopen
            else
              CALL JRCLOS
              CALL JPURGE(FIRSEG)
              CALL JROPEN(FIRSEG)
            endif
            CALL XPIDEX (qbox,0)
            CALL JPINTR (0)
            CALL JPEDGE (1)
            CALL XCOLOR(qbox)
            CALL JRECT (-XRAD,-YRAD,XRAD,YRAD)
        ENDIF
c
C ----- REMOVE WHEN USING C I/O ROUTINES
        if (vax) then
c          no need for rewind
        else
           rewind lunlin
        endif

        EOF=.FALSE.
c       initializing variable icntli so that getlnd starts at the beginning
c       of the file after an interrupt
        ICNTLI=0
        ICGLIN=0
        INVALI=.FALSE.
        CALL lltoxy(cla,clo+pie,maxx,y1)
        maxx = abs(maxx)
        lastcat = 0
        oldlca = -1
c   ------------------  Top of Segment Loop  -----------------------
C       LOOP THROUGH SECTIONS IN FILE
        nseg = 0
  810   CONTINUE

          CHINV=SETINV
          CALL getlnd (lunlin,icglin,lblk,loffs,nlines,lcateg,
     +                 rminla,rmaxla,rminlo,rmaxlo,eof)
          IF (EOF) GO TO 890
          nseg = nseg + 1

          DOFILL = (filply.and.opnply)
C  don't  READ TO END OF FILE IF INTERRUPTED WITHOUT DRAWING
          CALL CHINT (INTERR,CH)
          IF (INTERR) GO TO 969
          IF (LCATEG.GE.1.AND.LCATEG.LE.MAXCAT.AND.
     +    ((LTON(LCATEG)).or.
     +     ((LCATEG.EQ.1).and.(DOFILL)))) then
          IF (LCATEG.GT.1) DOFILL = .FALSE.
            if (lcateg.ne.oldlca) then
                LTYPE=LTYPTB(LCATEG)
                CALL GLTYPE(LTYPE,lcateg)
                if (level(lcateg).lt.1) level(lcateg) = 1
                ICNTDV=0
                oldlca = lcateg
            endif
          segcde = 0
          IF (DOFILL) CALL rdseg(icglin,linblk,lincnt,
     +                  segcde,rminla,rminlo,rmaxla,rmaxlo,ierror)

c         Check segment for intersection with viewport.
          call ck4any(someon,alimit)
          if (someon)  call ck4all(allon,alimit)
c
          savchi = chinv
          IF (SOMEON) then
```

```
          IF (lastcat.NE.lcateg) then
            lastcat = lcateg
            if (opnply) then
              maxrank = 0
              if ((lcateg.eq.5.).or.(lcateg.eq.6)) then
                i = 9
              else if (lcateg.eq.11) then
                i = 26
              else
                i = 15
              endif
              do 100 irnk = 1,i
                if (rankt(irnk,lcateg)) maxrank = irnk
 100          continue
            endif
          endif
c
          if (.not.chinv) then
c            Conic breakline is possible, segment may need clipping.
             call blchk(isgood,alimit)
          else
             isgood = .true.
          endif
c
          IF (segcde.EQ.1) THEN
c           Segment is interior to shoreline.  Use add file for background.
            if (lton(LCCIL)) then
              CALL jcolor(ltyptb(lccil))
            else
              CALL jcolor(ltyptb(lcoutl))
            endif
            CALL jpidex(ltyptb(lcoutl),0)
c
            CALL intpoi(isgood)
            CALL mrkpoi
            CALL rdline(linblk,pntblk,poicnt,
     +           rsmnla,rsmnlo,rsmxla,rsmxlo,lblkoff,ierror)
            call sveadd(pntblk,poicnt)
            call flsply(EOS,lton,isgood)
          ENDIF
          CALL intpoi(isgood)
c
c ------------------------------------------------------------------
c         T o p   o f   L i n e   L o o p
c
             DO 880 J=1,NLINES
                 savfil = dofill
                 chinv = savchi
                 CALL CHINT (INTERR,CH)
                 IF (INTERR) GO TO 969
                 lblksav = lblk
                 loffsav = loffs
                 CALL gtlin(lunind,lblk,loffs,iblk,ioffs,
     +                      npoint,irnk,
     +                      rminla,rmaxla,rminlo,rmaxlo,ios)
               IF (lcateg.ne.1) THEN
                  lincde = 0
               ELSE
                  IF (DOFILL) THEN
                    lincde = irnk/2**8
                  ELSE
                    lincde = 0
                  ENDIF
                  irnk = MOD(irnk,2**8)
                  IF (mod(irnk,100).GT.15) THEN
                      ityp = irnk/16
                      irnk  = mod(irnk,16)
                  ELSE
                      ITYP = irnk/100
                      irnk  = mod(irnk,100)
                  ENDIF
                  if (irnk.eq.8) then
c                    Avoid trying to fill reefs.
                     dofill = .false.
```

```
            endif

            IF (ityp.EQ.2) THEN
               if (lton(LCCIL)) then
                 call jcolor (ltyptb(lccil))
               else if (lton(lcoutl)) then
                 CALL jcolor(ltyptb(lcwtr))
               else
                 call jcolor(qbkgrd)
               endif
               if (lton(lcoutl)) then
                  CALL jpidex(ltyptb(lcwtr),1)
               else
                  call jpidex(qbkgrd,1)
               endif
            ELSE
               if (dofill) then
                  if (lton(LCCIL)) then
                    CALL jcolor(ltyptb(lccil))
                  else
                    CALL jcolor(ltyptb(lcoutl))
                  endif
               else
                  CALL jcolor(ltyptb(lccil))
               endif
                  CALL jpidex(ltyptb(lcoutl),0)
            ENDIF
         ENDIF
        IF ((lincde.EQ.eos)
     +         .AND.DOFILL) THEN
         CALL rdline(linblk,pntblk,poicnt,
     +           rminla,rminlo,rmaxla,rmaxlo,lblkoff,ierror)
             IF (pntblk.ne.0) THEN
c                 Make sure that the line in the polygon fill file
c                 is a mate to the WDB line.
              IF (lblkoff/2**8.ne.lblksav.or.
     +                  mod(lblkoff,2**8).ne.loffsav) THEN
             PRINT *,
     +       'Polygon fill line DOES NOT match WDB line...'
                    print *,icglin
 821  format(x,'WDB blk/off =',i5,'/',i2,' CHG blk/off =',i5,'/',i2)
             PRINT 821,lblksav,loffsav
     1        ,lblkoff/2**8,mod(lblkoff,2**8)
c               do not append points
                poicnt = 0
              ENDIF
           ENDIF
        ENDIF


c         ****** use combination of digits of rrr and rds rank
          if (lcateg.eq.5.or.lcateg.eq.6) irnk = irnk/10
          if ((opnply).and.(irnk.gt.maxrank)) goto 882
          select = rankt(irnk,lcateg)
          IF (select) then

c           Polyline visibility check.
            if (.not.allon) call ck4any(someon,alimit)

            IF (SOMEON.or.(dofill.and.
     +      (lincde.eq.CONCAT.or.lincde.ge.EOP))) then
C              NEWSEQ=.TRUE.
               PNTCNT=0
               ERF=.FALSE.
               ISINV=.FALSE.
               ipcnt = 0
c
c        ---------------------------------------------------
c          T o p   o f   P o i n t s   L o o p
c
c              Concatenate WDBII polyline to polyline buffers.
               DO 860 K=1,NPOINT
                 CALL getpoi(lundat,iblk,ioffs,plat,plon,erf)
```

```
                    IF (ERF) GO TO 865
                    CALL svepoi(plon,plat)
 860              CONTINUE
c
               IF (lincde.EQ.EOS)
     +         THEN
c                 Concatenate ADD FILE polyline to polyline buffers.
                  CALL mrkpoi
                  call sveadd(pntblk,poicnt)
               ENDIF
c
c        B o t t o m   o f   P o i n t s   L o o p
c        ------------------------------------------------
c
               IF (lincde.NE.concat) THEN
c                 Process the completed polygon.
                  CALL flsply(lincde,lton,isgood)
                  CALL intpoi(isgood)
               ENDIF
 865                 CONTINUE
                   endif
             endif
             dofill = savfil
 880       CONTINUE
 882       CONTINUE
c
c        B o t t o m  o f   L i n e   L o o p
c ------------------------------------------------------------------------
c
          endif
        endif
c       check the size of the current retained segment and create a new on
c        call chksiz
      GO TO 810
 890  CONTINUE

      if ((count) .and. icntdr.gt.0) then
          print*,'dmapii -- moves, draws, polylines : ',icntgp,
     +    icntdv,icntpl,' (',icntmv,icntdr,')'
      endif

      CALL FLUSHB

      call areafl

      if(lton(lcwtr)) then
         ltype = ltyptb(lcwtr)
         call gltype(ltype,lcwtr)
         call fillit(ltype,xrnm,level(lcwtr))
      endif
      if(lton(lcname)) then
         ltype = ltyptb(lcname)
         call gltype(ltype,lcname)
         call namlim('namlim.dat',10,lton,xrnm)
      endif
      if(lton(lccity)) then
         ltype = ltyptb(lccity)
         call gltype(ltype,lccity)
         call pltcit(xrnm,'cities.dat',10)
      endif
      if (lton(lcgrid)) then
         ltype=ltyptb(lcgrid)
         call gltype(ltype,lcgrid)
c
c        The grid drawing routines still use numeric vs spatial limits:
         vmaxla = vpnort
         vminla = vpsout
         vmaxlo = vpeast
         vminlo = vpwest
         if (vmaxlo.lt.vminlo) then
            vmaxlo = +pie
            vminlo = -pie
         endif
```

```
          call dgrid(ipgrid,vmaxla,vminla,vmaxlo,vminlo,dotem,itpro)
       endif
 969   CONTINUE

       if (interr) then
           call flushb
       endif

C      PATCH EDGES

       if (dofill) then
c                                put box in its own segment
         if (.not.bitmod) then
          call jrclos
          call getseg(boxseg)
          call jropen(boxseg)
         endif
         CALL xcolor(qbox)
         CALL jmove(-xrad,-yrad)
         CALL jdraw(-xrad,yrad)
         CALL jdraw(xrad,yrad)
         CALL jdraw(xrad,-yrad)
         CALL jdraw(-xrad,-yrad)
         CALL jupdat
       endif

        RETURN
        END

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        east1
C
C FUNCTIONAL DESCRIPTION:           Finds the eastmost of two longitudes
C                                   as viewed from map center
C
C INPUT FILES/PARAMETERS:           rlon1,rlon2 - Two longitudes.
C
C GLOBAL VARIABLES:                 clon        - Map center longitude
C
C OUTPUT FILES/PARAMETERS:          east1       - The eastmost.
C
C SUBROUTINES/FUNCTIONS CALLED:  None.
C
C CALLED BY:                        CK4ANY
C
C LOCAL VARIABLES:                  Breakl     - Conic break line longitude.
C                                   r1, r2     - Conditionally offset rlon1,rlon2.
C
C RESTRICTIONS:                     None.
C
C ABNORMAL RETURN CONDITIONS:       None.
C
C LOCATION:
C
C PROGRAMMER:                       DATE OF LAST CHANGE     REASON FOR CHANGE
C
C     Tom Wescott  (NOSC)           11/87                   Original entry.
C
C-*-*-*-*-*-*-*-*-*-*-*-*-*-*-*-*-*-*-*-*-*-*-*-*-*-*-*-*-*-*-*-*-*-*-*|*-*-*-*-
c
      function east1(rlon1,rlon2)
c
      common/center/ clat,clon,cclat,sclat
      common/pie/ pie,tpie,pio2,pio4
c
      breakl = clon - sign(pie,clon)
c
      r1 = rlon1
      r2 = rlon2
      if (r1 .lt. breakl) r1 = rlon1 + tpie
      if (r2 .lt. breakl) r2 = rlon2 + tpie
c
      if (r1 .lt. r2) then
```

```
         east1 = rlon2
      else
         east1 = rlon1
      endif
c
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   FTPRNT
C
C FUNCTIONAL DESCRIPTION:      Cross hatches the footprint (instantaneous
C                              viewing area) for an aerial platform.
C
C INPUT FILES/PARAMETERS:      plo,pla     - Platform (lon,lat).
C                              alt         - Platform altitude, nm.
C                              afov        - Angular field of view, radians.
C                              tilt        - Look angle from nadir, radians.
C                              azi         - Azimuth of look angle, radians.
C                              x0,y0       - Point justifying the hatch.
C                              dx,dy       - Hatch line direction vector.
C                              dist        - Distance between hatch lines.
C
C GLOBAL VARIABLES:            None.
C
C OUTPUT FILES/PARAMETERS:     Array of line segments forming hatch pattern.
C
C SUBROUTINES CALLED:          blplin, blhatc, da2ll
C
C CALLED BY:                   satcov
C
C LOCAL VARIABLES:             plo(),pla()- Polyline in geographic coords.
C                              EARTHR     - Earth radius, nm
C
C RESTRICTIONS:                None.
C
C PROGRAMMER:                  DATE OF LAST CHANGE     REASON FOR CHANGE
C     Tom Wescott (NOSC)       Oct 88                  Original entry.
C
C-*-*-*-*-*-*-*-*-*-*-*-*-*-*-*-*-*-*-*-*-*-*-*-*-*-*-*-*-*-*-*-*-*-*-*-*|*-*-*-*-
C     not in 3.0
      subroutine ftprnt(plo,pla,alt,afov,tilt,azi,x0,y0,dx,dy,dist)
C
      parameter (NPTS=61, IDIM=10*NPTS)
      real rlo(2*NPTS),rla(2*NPTS), ulo(IDIM),ula(IDIM)
      common /pie/ pie,tpie,pio2,pio4
      logical invali
      common /invali/ invali
      parameter (EARTHR = 3440.1)
C
C
C     Find horizon - platform - center of earth angle.
      pc = EARTHR + alt
      hpc = asin(EARTHR/pc)
C
C     To calculate tilt and azimuth angles for any ray from the platform,
C     consider a sphere of radius alt tangent to the earth at nadir.
C     Get spherical (pseudolat,azimuth) coords of viewing cone center line.
      cphi = tilt - pio2
      ctheta = azi
      razmax = 0.0
      razmin = 0.0
C
C     Does viewing cone miss the earth?
      halfov = afov/2.0
      if (hpc .lt. (tilt-halfov)) RETURN
C
C     Generate closed polyline for the projected cone rays.
      do 100 i = 1, NPTS
         azz = i*tpie/(NPTS-1.)
C
C        Get tilt and azimuth for the ray at angle azz around the cone.
         call da2ll(cphi,ctheta,halfov,azz,phi,theta)
```

```
C        Convert pseudolat to tilt angle from nadir.
         rtilt = pio2 + phi
         razmth = theta
C
C        Truncate polyline radially at the horizon.
         rtilt = amin1(rtilt,hpc)

C        Law of Sines calculates arc from nadir to intersection with earth.
         sinEXT = amin1(1.0,pc*sin(rtilt)/EARTHR)
         arc = asin(sinEXT) - rtilt
C
         call da2ll(pla,plo,arc,razmth,rla(i),rlo(i))
C
 100  continue
C
C
C     Condition polyline for uniform pt spacing in current projection.
      call ll2gc(rlo,rla,npts,IDIM,ulo,ula,nout)
C
C     Area outline is an option.
      call blplin(ulo,ula,nout)
C
C     Fill area viewed with a hatch pattern.
      call blhatc(ulo,ula,nout,x0,y0,dx,dy,dist)
C
C     Mark sub-platform point if view is oblique.
      if ((tilt.gt.0.0).and.(.not.invali)) then
         call llplxy(plo,pla,1,px,py,idummy)
         call jcmark(2)
         call jmark(px,py)
      endif
C
      return
      end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    HATCH
C
C FUNCTIONAL DESCRIPTION:       Cross hatches a polygon by parallel lines.
C
C INPUT FILES/PARAMETERS:       x(n), y(n) - Vertex coordinate arrays.
C                               n          - Number of verticies.
C                               xtie,ytie  - Point justifying the hatch.
C                               dX,dY      - Hatch line direction vector.
C                               dist       - Distance between hatch lines.
C
C GLOBAL VARIABLES:             None.
C
C OUTPUT FILES/PARAMETERS:      Array of line segments forming hatch pattern.
C
C SUBROUTINES CALLED:           jdraw, jmove
C
C CALLED BY:                    blhatc
C
C LOCAL VARIABLES:              xi,yi        - Current point in input polyline.
C                               s1, s2       - Sign of sN tells half plane.
C                               dX, dY, D    - Coefficients of hatch line in
C                                              form:    dY*x - dX*y + D = 0
C                               ddx,ddy,dd   - Coefs of polyline segment.
C
C RESTRICTIONS:                 None.
C
C PROGRAMMER:                   DATE OF LAST CHANGE     REASON FOR CHANGE
C     Tom Wescott (NOSC)        Oct 88                  Original entry.
C
C-*-*-*-*-*-*-*-*-*-*-*-*-*-*-*-*-*-*-*-*-*-*-*-*-*-*-*-*-*-*-*-*-*-*-*|*-*-*-*-
C
      subroutine hatch(x,y,nin,xtie,ytie,dX,dY,dist)
      dimension x(*),y(*)
c
      include   'carmaxdim.inc'
c
      dimension xout(MAXV),yout(MAXV)
```

```
c
c     Insure that we are dealing with a closed polygon.
      if ((x(nin).ne.x(1)).or.(y(nin).ne.y(1))) then
         n = nin + 1
         x(n) = x(1)
         y(n) = y(1)
      else
         n = nin
      endif
c
c     Bracket coefficient D for hatch lines that intersect the polygon.
      Dmin = dX*y(1) - dY*x(1)
      Dmax = dmin
      do 100 i = 2, n
         D = dX*y(i) - dY*x(i)
         Dmin = amin1(Dmin,D)
         Dmax = amax1(Dmax,D)
 100  continue
      Dtie = dX*ytie - dY*xtie
c
c     Construct a distance vector s perpendicular to hatch vector.
      dmod = sqrt(dX*dX+dY*dY)
      sx = -dist/dmod*dY
      sy = +dist/dmod*dX
c
c     Vector q = tie + ks will locate base for hatch lines.  k = kmin...kmax.
      kmin = (Dmin-Dtie)/(dist*dmod)
      kmax = (Dmax-Dtie)/(dist*dmod)
c
      do 400 k = kmin, kmax
         nintr = 0
         qx = xtie + k*sx
         qy = ytie + k*sy
         D = dX*qy - dY*qx
c
c        Process the first point.
         s1 = dY*x(1) - dX*y(1) + D
c
         if (n.gt.1) then
            do 200 i = 2, n
               s2 = dY*x(i) - dX*y(i) + D
               if ((s1.le.0.0).and.(s2.le.0.0)) then
c                 Do nothing.
               else if ((s1.gt.0.0).and.(s2.gt.0.0)) then
c                 Do nothing.
               else
c                 Find intersection of polyline segment with hatch line.
                  ddy = y(i-1) - y(i)
                  ddx = x(i-1) - x(i)
                  dd = x(i-1)*y(i) - y(i-1)*x(i)
                  xa = -(ddx*D-dX*dd)
                  ya = -(ddy*D-dY*dd)
                  wa = -(ddy*dX-dY*ddx)
                  nintr = nintr + 1
c                 if (nintr.ge.MAXV) return
                  xout(nintr) = xa/wa
                  yout(nintr) = ya/wa
               endif
               s1 = s2
 200        continue
         endif
c
c        Sort the list of intersections by position along the hatch line.
         if (nintr.gt.1) then
            do 290 ii = 1, nintr-1
               do 280 kk = ii+1, nintr
                  if (abs(dX).gt.abs(dY)) then
                     if (xout(ii).lt.xout(kk)) then
                        temp = xout(ii)
                        xout(ii) = xout(kk)
                        xout(kk) = temp
                        temp = yout(ii)
                        yout(ii) = yout(kk)
                        yout(kk) = temp
```

```
               endif
            else
               if (yout(ii).lt.yout(kk)) then
                  temp = xout(ii)
                  xout(ii) = xout(kk)
                  xout(kk) = temp
                  temp = yout(ii)
                  yout(ii) = yout(kk)
                  yout(kk) = temp
               endif
            endif
 280        continue
 290     continue
      endif
c     Draw lines between adjacent pairs of intersections.
      if (nintr.gt.1) then
         do 500 i = 1, nintr-1, 2
            call jmove(xout(i),yout(i))
            call jdraw(xout(i+1),yout(i+1))
 500     continue
      endif
 400  continue
c
      return
      end

C+*+*+*+*+*+*+*+*+*+*+*+*+*+*+*+*+*+*+*+*+*+*+*+*+*+*+*+*+*+*+*+*+*|*+*+*+*+
C UNIT NAME: initia
C
C FUNCTIONAL DESCRIPTION: Initialize variables for dmapii
C
C INPUT FILES/PARAMETERS:
C
C GLOBAL VARIABLES : NONE.
C
C OUTPUT FILES/PARAMETERS:  NONE.
C
C SUBROUTINES/FUNCTIONS CALLED :
C
C CALLED BY:                    BOXARE, BSTMAP, DMAPII, MAPPER, RPARAM
C
C LOCAL VARIABLES: NONE.
C
C RESTRICTIONS: NONE.
C
C ABNORMAL RETURN CONDITIONS:   NONE.
C
C LOCATION:
C
C PROGRAMMER:                      DATE OF LAST CHANGE    REASON FOR CHANGE
C
C     DAVE NATION                                        ORIGINAL CODE.
C     JERRY FENERTY                                      DOCUMENTATION AND MODIFI
C                                                        FOR A21 PROTOTYPE.
C     Tom Wescott  (NOSC)          10/87                 Partial cleanup.
C
C-*-*-*-*-*-*-*-*-*-*-*-*-*-*-*-*-*-*-*-*-*-*-*-*-*-*-*-*-*-*-*-*-*|*-*-*-*-

        SUBROUTINE INITIA (XCN,YCN,CLA,CLO,XRA,YRA,ITPRO,IRES,XRNM,
     +  ORHAL)

C       Initialize variables for dmapii

c        COMMON /PROJT/ IGNOMN,IORTEQ,IORTPO,IORTHO,IPERSP
c        COMMON /PROJT2/ IEQREC,IMERCA,ILAMCN
        COMMON /PIE/ PIE,TPIE,PIO2,PIO4
        LOGICAL SAVEXY
        COMMON /STMSGS/ XPREV,YPREV,IRESSQ,XSAV,YSAV,SAVEXY
        COMMON /CONST/ MAXVAL,RMPV,C,R,ERNM
        COMMON /CENTER/ CLAT,CLON,CCLAT,SCLAT
        COMMON /VIEWP/ XRAD,YRAD,IXNP,IYNP,XC,YC
        LOGICAL OLDONS,OLDINV
```

```
      COMMON /OLDXY/ XOLD,YOLD,IXOP,IYOP,OLDONS,OLDINV
      COMMON /ECCEN/ ECCEN,EC2
      COMMON /RADE/RADE
      logical not1st
      common /proj/ itproj,wmrad,xoffs,yoffs,scalr,not1st
      common /conic/ spll1,spll2,tranl,trank,tranr,tscale,pole,tilt
      LOGICAL NEWONS,NEWSEQ
      logical map
      common /mapdbc/ map

      if (map)
     + print*,'initia -- enter ',xcn,ycn,cla,clo,xra,yra,itpro,ires,
     + xrnm,orhal
c     limit xrnm to >= 1.0
      if (xrnm.lt.1.0) xrnm = 1.0

      EC2=ECCEN**2
      RMPV=1.0E-7
      MAXVAL=27000
      SAVEXY=.FALSE.
      OLDONS=.FALSE.
      NEWONS=.FALSE.
      NEWSEQ=.FALSE.
      ITPROJ=ITPRO
      CLAT=CLA
      CLON=CLO
      XRAD=XRA
      YRAD=YRA
      XC=XCN
      YC=YCN
      R1=XRAD
      R2=XRNM
      WMRAD=R1*ERNM/R2
      IRESSQ=IRES**2
      SCLAT=SIN(CLAT)
      CCLAT=COS(CLAT)
      RXRNM=XRNM*C
      R=XRAD*COS(RXRNM)/SIN(RXRNM)
      XOFFS=0
      YOFFS=0
c
c     Make an initial call to calculate and store projection constants.
      not1st = .false.
      call lltoxy(clat,clon,x,y)
c
c     Translate map center point to display center.
      XOFFS = -X
      YOFFS = -Y
c
      if (map)
     + print*,'initia -- exit ',wmrad,r,maxval,rmpv,itproj

      RETURN
      END


C+*+*+*+*+*+*+*+*+*+*+*+*+*+*+*+*+*+*+*+*+*+*+*+*+*+*+*+*+*+*+*+*+*+|*+*+*+*+
C UNIT NAME:                          INVTES
C
C FUNCTIONAL DESCRIPTION:             CHECKS POINT FOR INVISIBILITY
C
C       NOTE:  Usefullness of invtes reduced in caricature 3.0 or later. Where
C              invisibility, independant of projection, is checked by calling
C              lltoxy with the point in question, then looking at the invali
C              flag in common /invali/.  It will be set to .true. for any
C              point lying over the viewing horizon.   TFW.
C
C                        COMMON
C      VARIABLE          BLOCK          TYPE          DESCRIPTION
C
C GLOBAL VARIABLES:
C
C     CCLAT              CENTER         REAL          COSINE OF CLAT
C     CLAT               CENTER         REAL          LATITUDE
```

```
C     CLON           CENTER       REAL         LONGITUDE
C     ER             ER           REAL
C     IGNOMN         PROJT        INTEGER      GNEMONIC PROJECTION
C     INVALI         INVALI       LOGICAL      CHECKS FOR INVALID COORDS
C     IORTEQ         PROJT        INTEGER      ORTHO. EQUATORIAL PROJECTION
C     IORTPO         PROJT        INTEGER      ORTHO. POLAR PROJECTION
C     IORTHO         PROJT        INTEGER      OBLIQUE PROJECTION
C     IPERSP         PROJT        INTEGER      PERSPECTIVE PROJECTION
C     ITPROJ         PROJ         INTEGER      CURRENT PROJECTION
C     PIE            PIE          REAL         THE CONSTANT (22/7)
C     TPIE           PIE          REAL         PIE * 2
C
C INPUT FILES/PARAMETERS:
C
C     VARIABLE                  TYPE           DESCRIPTION
C
C     PLAT                      REAL            LATITUDE IN RADIANS
C     PLON                      REAL            LONGITUDE IN RADIANS
C
C OUTPUT FILES/PARAMETERS:     NONE
C     ISINV                     LOGICAL        FLAG OF INVISIBILITY
C
C SUBROUTINES/FUNCTIONS CALLED:  NONE.
C
C CALLED BY:                      CHECKA, CHECKM, DMAPII, FILLIT, GRDLAT,
C                                 GRDLON, HILPLT, LIMITS, LLINXY
C                                 PLOTOV, PLTCIT, PLTDAT, PLTNAM
C
C LOCAL VARIABLES: NONE
C
C ABNORMAL RETURN CONDITIONS:  N/A
C
C PROGRAMMER:                   DATE OF LAST CHANGE    REASON FOR CHANGE
C
C GJFENERTY                                              INTIAL ENTRY
C Tom Wescott  (NOSC)        10/87                       Change perspective
C
C-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE INVTES (PLAT,PLON,ISINV)

C    THIS SUBROUTINE TESTS A POINT FOR INVISIBILITY (ON OPPOSITE HEMISPHERE
C          OF EARTH FROM CENTER POINT OF PROJECTION)
C              (USING THE LAW OF COSINES)

      LOGICAL ISINV
      COMMON /PROJT/ IGNOMN,IORTEQ,IORTPO,IORTHO,IPERSP
      COMMON /PROJT2/ IEQREC,IMERCA,ILAMCN
      COMMON /PIE/ PIE,TPIE,PIO2,PIO4
      COMMON /CONST/ MAXVAL,RMPV,C,R,ERNM
      COMMON /CENTER/ CLAT,CLON,CCLAT,SCLAT
      logical invali,not1st
      common /invali/ invali
      common /proj/ itproj,wmrad,xoffs,yoffs,scalr,not1st
      REAL*8 ERD
      COMMON /ER/ ER,ERD

      ISINV=.FALSE.

      IF (ITPROJ.EQ.IORTEQ) THEN

         DLON=PLON-CLON
         IF (ABS(DLON).GT.PIE) DLON=DLON-SIGN(TPIE,DLON)
         IF (ABS(DLON).GT.PIO2) ISINV=.TRUE.

      ELSE IF (ITPROJ.EQ.IORTPO) THEN

         IF ((CLAT.LT.0..AND.PLAT.GT.0.).OR.(CLAT.GE.0..AND.PLAT
     +       .LT.0.))ISINV=.TRUE.

      ELSE IF (ITPROJ.EQ.IGNOMN.OR.ITPROJ.EQ.IORTHO) THEN

         R1=SCLAT*SIN(PLAT)+CCLAT*COS(PLAT)*COS(PLON-CLON)
         GCD=ACOS(R1)
```

```
         IF (GCD.GT.PIE) GCD=TPIE-GCD
         IF (GCD.LT.-PIE) GCD=-TPIE-GCD
         IF (ABS(GCD).GT.PIO2) ISINV=.TRUE.

      ELSE IF (ITPROJ.EQ.IPERSP) THEN

C        Over the horizon points are returned from lltoxy invalid.
         call lltoxy(plat,plon,x,y)
         isinv = invali

      ENDIF

      RETURN
      END

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   jpolg2
C
C FUNCTIONAL DESCRIPTION:      This subroutine is used to overcome limits
C                              on the # of verticies for filled polygons
C                              in some display systems.  It disects limit
C                              exceeding polygons into smaller contiguous
C                              sections as required before filling.
C
C INPUT FILES/PARAMETERS:      x(n), y(n) - Vertex coordinate arrays.
C                              n          - Number of verticies.
C                              jedge      - 0 plots edge, 1 omits edge.
C
C GLOBAL VARIABLES:            MXVOUT     - Max number of output verticies.
C                              IDIM       - Max array size.
C                              MXPLYS     - Max number of reduced polygons
C
C OUTPUT FILES/PARAMETERS:     Multiple polygons are drawn via jpolgn.
C
C SUBROUTINES CALLED:          jpedge, jpolgn, cliplg
C
C CALLED BY:                   blplgn
C
C LOCAL VARIABLES:             Linked list form of closed input polygon.
C                                iptr(n)    - Pointer array to vertex (n+1).
C                                marker     - End of data marker in x,y.
C                              Multiple output polygons in linked list form:
C                                outplg(k)  - Starting ptrs. for k polygons.
C                                nxt()      - Pointer array to vertex (n+1).
C
C RESTRICTIONS:                None.
C
C ABNORMAL RETURN CONDITIONS:  None.
C
C PROGRAMMER:                  DATE OF LAST CHANGE     REASON FOR CHANGE
C     Tom Wescott (NOSC)       Aug 88                  Original entry.
C
C-*-*-*-*-*-*-*-*-*-*-*-*-*-*-*-*-*-*-*-*-*-*-*-*-*-*-*-*-*-*-*-*-*-*-*-*-*-*|*-*-*-*-
      subroutine jpolg2(x,y,nin,jedge)
c
      dimension x(*),y(*)
c
      include   'carmaxdim.inc'
c
      dimension xx(IDIM),yy(IDIM)
      integer iptr(IDIM), nxt(IDIM)
      integer  outplg(MXPLYS),outmp(MXPLYS)
c
      if (nin.le.MXVOUT) then
         call jpedge(jedge)
         call jpolgn(x,y,nin)
      else
c        Temporarily turn the edge off.
         call jpedge(1)
c
c        Close polygon if necessary.
         if ((x(nin).ne.x(1)).or.(y(nin).ne.y(1))) then
            n = nin + 1
```

```
         x(n) = x(1)
         y(n) = y(1)
      else
         n = nin
      endif
c
c       Init output list linking to next input vertex.
        do 100 i = 1, n-1
           nxt(i) = i+1
 100    continue
        nxt(n) = 1
        marker = n
c
c       Initialize array of output polygon start points.
        outplg(1) = 1
        iend = 1
        outplg(2) = 0
c
        iplg = 1
c       While (more polygons in output list) do
 201       if (outplg(iplg) .eq. 0) go to 290
c          Temp save the new polygon from the output array.  Get stats.
           istvrt = outplg(iplg)
           ymax = y(istvrt)
           ymin = y(istvrt)
           ivrt = istvrt
           kount = 0
c          Do Until (polygon traversed)
 220          continue
              kount = kount + 1
              if ((kount.gt.IDIM).or.(ivrt.lt.1).or.(ivrt.gt.IDIM))
     +           write(*,*)'JPOLG2... bad polygon linkage '
c
c             Convert linked list polygon into polyline format.
              xx(kount) = x(ivrt)
              yy(kount) = y(ivrt)
              ymax = amax1(ymax,y(ivrt))
              ymin = amin1(ymin,y(ivrt))
c
c             Save polygon linkage prior to alteration by clipping.
              ivrt = nxt(ivrt)
              iptr(ivrt) = nxt(ivrt)
              if (ivrt.ne.istvrt) go to 220
c          End do.
c
           if (kount.le.MXVOUT) then
c             Send current polygon to ordinary drawing process.
              call jpolgn(xx,yy,kount)
           else
c             Bisect current polygon and append sections to outplg list.
              ymid = (ymax+ymin)/2.0
              ax = 1.0
              ay = ymid
              bx = -1.0
              by = ymid
c
              call cliplg(ax,ay,bx,by,x,y,istvrt,iptr,
     +                    marker,outmp,nxt)
c
c             Catenate output polygons onto output list.
              ii = 1
c             While (output polygons remain) do
 291             if (outmp(ii).eq.0) go to 292
                 iend = iend + 1
                 outplg(iend) = outmp(ii)
                 ii = ii + 1
                 go to 291
c             End while.
 292          continue
              outplg(iend+1) = 0
c
              call cliplg(bx,by,ax,ay,x,y,istvrt,iptr,
     +                    marker,outmp,nxt)
```

```
c
               ii = 1
c              While (output polygons remain) do
 293              if (outmp(ii).eq.0) go to 294
                  iend = iend + 1
                  outplg(iend) = outmp(ii)
                  ii = ii + 1
                  go to 293
c              End while.
 294           continue
               outplg(iend+1) = 0
            endif
c
            iplg = iplg + 1
            go to 201
c        End While.
 290     continue
c
c        Draw the polygon outline?
         call jpedge(jedge)
         if (jedge.ne.1) call jpolgn(x,y,nin)
      endif
c
      return
      end


C+*+*+*+*+*+*+*+*+*+*+*+*+*+*+*+*+*+*+*+*+*+*+*+*+*+*+*+*+*+*+*+*+*+*|*+*+*+*+
C UNIT NAME:                  LIMIT2
C
C FUNCTIONAL DESCRIPTION:     Finds the viewport's bounding rectangle
C                             in a rectilinear lon,lat grid.
C
C INPUT FILES/PARAMETERS:     none.
C
C GLOBAL VARIABLES :          clat,clon       - Map center
C                             xrad,yrad       - Viewport half widths
C
C OUTPUT FILES/PARAMETERS:    common/viewBR/ - Lon,lat Coordinates of the
C                             vpnort,vpsout    bounding rectangle for that
C                             vpeast,vpwest    portion of the world within
C                                              the viewport.  Limits are
C                                              spatial (not numeric) and can
C                                              straddle the int'l date line.
C
C SUBROUTINES CALLED :        xytoll, lltoxy, clipxy
C
C CALLED BY:                  DMAPII
C
C LOCAL VARIABLES:            NPOINTS         - Parameter specifying the # of
C                                               points on each viewport side
C                                               to search for lon,lat extrema.
C                             NLOOPS          - Parameter determining accuracy
C                                               of horizon location.
C RESTRICTIONS:               None.  Works with all well behaved projections
C
C ABNORMAL RETURN CONDITIONS: None.
C
C PROGRAMMER:              DATE OF LAST CHANGE       REASON FOR CHANGE
C     Tom Wescott   (NOSC)    10/87                  original entry
C
C-*-*-*-*-*-*-*-*-*-*-*-*-*-*-*-*-*-*-*-*-*-*-*-*-*-*-*-*-*-*-*-*-*-*-*|*-*-*-*-

        subroutine limit2
c
        common /viewp/ xrad,yrad,ixnp,iynp,xc,yc
        common /viewBR/ vpnort,vpsout,vpeast,vpwest
        common /pie/ pie,tpie,pio2,pio4
        common /center/ clat,clon,cclat,sclat
        logical nponsc, sponsc
        logical invali
        common /invali/ invali
c
c       Set No. of points to be tested on each viewport side.
```

```
c       (use an odd integer >= 3 to handle graticle concavities.
        parameter(NPOINTS=3)
c
c       Set accuracy level of binary search for the horizon.
        parameter (NLOOPS=9)
c
        if ((abs(clat).gt.pio2).or.(abs(clon).gt.pie).or.(xrad.le.0.))
     +     write(*,*) ' Bad map parameters found in LIMIT2'
c
c       Store break line (longitude at edge of conic projections).
        breakl = clon  - sign(pie,clon)
c
        vpnort = -pio2
        vpsout = +pio2
        vpeast = -pie
        vpwest = tpie+tpie
c
c       Find bounding rectangle by checking (lon,lat) at regular
c       intervals along the viewport frame or along the map edge.
        yincr = (yrad+yrad)/(NPOINTS-1)
c
        do 300 y = -yrad, yrad, yincr
           if (abs(y) .eq. yrad) then
              xincr = (xrad+xrad)/(NPOINTS-1)
           else
              xincr = xrad+xrad
           endif
c
           do 200 x = -xrad, xrad, xincr
              call xytoll(x,y,rlat,rlon)
              if (invali) then
c                This point on the viewport frame lies off the earth.  Locate
c                map edge (lon,lat) by searching along line from map center.
c                Use last pt on map to calculate minimum bounding coords.
                 call lltoxy(clat,clon,xearth,yearth)
                 xspace = x
                 yspace = y
                 do 100 itest = 1, NLOOPS
                    xtest = (xspace+xearth)*0.5
                    ytest = (yspace+yearth)*0.5
                    call xytoll(xtest,ytest,rrlat,rrlon)
                    if (invali) then
                       xspace = xtest
                       yspace = ytest
                    else
                       xearth = xtest
                       yearth = ytest
                       rlat = rrlat
                       rlon = rrlon
                    endif
 100             continue
c
              endif
c
c             Update bounds in conditionally biased lon. where west < east.
              if (rlon .lt. breakl) rlon = rlon + tpie
              vpnort = amax1(vpnort,rlat)
              vpsout = amin1(vpsout,rlat)
              vpeast = amax1(vpeast,rlon)
              vpwest = amin1(vpwest,rlon)
  200      continue
  300   continue

c       Convert to unbiased longitude.
        if (abs(vpeast).gt.pie) vpeast = vpeast - sign(tpie,vpeast)
        if (abs(vpwest).gt.pie) vpwest = vpwest - sign(tpie,vpwest)
c
c       Check for presence of poles inside the viewport.
        call lltoxy(pio2,0.0,x,y)
        call clipxy(x,y,nponsc)
        if (invali) nponsc = .false.
        call lltoxy(-pio2,0.0,x,y)
        call clipxy(x,y,sponsc)
```

```
      if (invali) sponsc = .false.
c
      if ((nponsc).or.(sponsc)) then
c        Open limits to include area around poles.
         vpwest = breakl
         vpeast = breakl - .00001
         if (nponsc) then
            vpnort = +pio2
         endif
         if (sponsc) then
            vpsout = -pio2
         endif
      endif
c
      R2D = 180./PIE
c      WRITE (*,9010) vpnort*R2D,vpsout*R2D,vpeast*R2D,vpwest*R2D
c 9010  FORMAT(' LIMIT2... Bounding (N,S,E,W) = ',4(1X,F7.1),/)
c
      return
      end


C+*+*+*+*+*+*+*+*+*+*+*+*+*+*+*+*+*+*+*+*+*+*+*+*+*+*+*+*+*+*+*+*+*|*+*+*+*+
C UNIT NAME:                       LL2DA
C
C FUNCTIONAL DESCRIPTION:          Converts geographic location (lat,lon)
C                                  into distance azimuth from any point.
C
C INPUT FILES/PARAMETERS:          slat,slon  - Start point coords.
C                                  tlat,tlon  - Target point coords.
C
C OUTPUT FILES/PARAMETERS:         dist       - Arc distance in radians.
C                                  az         - Azimuth in radians, -pi to pi.
C                                  range      - Approx. distance, nautical miles.
C                                  bering     - Azimuth in degrees, 0 to 360.
C
C LOCAL VARIABLES:                 S,T,D      - Sides of polar triangle.
C
C ABNORMAL RETURN CONDITIONS:      1) Az from poles defined cw from prime meridian.
C                                  2) When dist=0,pi  returned az is meaningless.
C
C PROGRAMMER:                      DATE OF LAST CHANGE     REASON FOR CHANGE
C     Tom Wescott (NOSC)           Dec 87                  Original entry.
C         "                        Feb 89                  Improved accuracy.
C
C-*-*-*-*-*-*-*-*-*-*-*-*-*-*-*-*-*-*-*-*-*-*-*-*-*-*-*-*-*-*-*-*-*|*-*-*-*-
      subroutine LL2DA(slat,slon,tlat,tlon,dist,az,range,bering)
C
      common /pie/ pie,tpie,pio2,pio4
      parameter (CCLOSE = .9999)
C
      Dlo = tlon - slon
      if (abs(Dlo).gt.pie) Dlo = Dlo - sign(tpie,Dlo)
      sinT = cos(slat)
      cosT = sin(slat)
      sinS = cos(tlat)
      cosS = sin(tlat)
C
C     Law of Cosines for arc distance between points.
      cosD = cosT*cosS + sinT*sinS*cos(Dlo)
      if (cosD.lt.CCLOSE) then
         dist = acos(amax1(cosD,-1.0))
      else
C        Plane geometry approximation better for very close targets.
         dist = sqrt((tlat-slat)**2. + (Dlo*sinS)**2.)

      endif
C
C     Using both Law of Cosines and Sines insures accurate azimuths.
      az = - tlon*cosT
      sinD = sin(dist)
      denom = sinD*sinT
      if ((denom.ne.0.0).and.(abs(cosT).ne.1.0)) then
         cosAz = (cosS-cosD*cosT)/denom
```

```
         sinAz = sinS*sin(Dlo)/sinD
         if ((sinAZ.ne.0.).or.(cosAZ.ne.0.))  az = atan2(sinAz,cosAz)
      endif
C
C     Also output range and bearing.
      r2d = 180.0/pie
      range = dist*R2D*60.0
      bering = az*R2D
      if (bering.lt.0.0) bering = 360.0 + bering
C
      return
      end


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       LL2GC
C
C FUNCTIONAL DESCRIPTION:          Conditions a Lon,lat polyline by inserting
C                                  equidistant points so that the segments
C                                  smoothly follow great circles in the current
C                                  map projection.
C
C INPUT FILES/PARAMETERS:          plat,plon - Input polyline
C                                  nin       - # of input points.
C                                  maxpts    - output array size limit.
C
C GLOBAL VARIABLES:                None.
C
C OUTPUT FILES/PARAMETERS:         gclon,gclat - output polyline.
C                                  nout        - # of output points.
C
C SUBROUTINES CALLED:              ll2da, da2ll, llplxy
C
C CALLED BY:                       plotit, plotov, ftprnt, ranger
C
C LOCAL VARIABLES:                 DSTMAX,MIN - Limits for output segment length.
C                                  distxy     - Display distance between input pts.
C
C RESTRICTIONS:                    None.
C
C PROGRAMMER:                      DATE OF LAST CHANGE      REASON FOR CHANGE
C     Tom Wescott (NOSC)           Dec 87                   Original entry.
C      "      "                    Apr 89                   Improve pt spacing.
C
C-*-*-*-*-*-*-*-*-*-*-*-*-*-*-*-*-*-*-*-*-*-*-*-*-*-*-*-*-*-*-*-*-*-*-*-*-*|*-*-*-*-
      subroutine LL2GC(plon,plat,nin,maxpts,gclon,gclat,nout)
C
C     Set screen units per inch of display.

      parameter (SUNITS=400., SINCHS=15.0, UPERI=SUNITS/SINCHS)
C     Set max segment length to about .25" on the display, min to .01".
      parameter (DSTMAX=0.25*UPERI, DSTMIN=0.01*UPERI)
      parameter(EPSLON=.001)
      parameter(ARCMAX=.05)
      real plon(*),plat(*),gclon(*),gclat(*),lon1,lat1,lon2,lat2
      logical invali, offsc1, offsc2
      common /invali/ invali
C
      nout = 1
      nover = 0
      lon1 = plon(1)
      lat1 = plat(1)
      call llplxy(lon1,lat1,1,x1,y1,nout)
      gclon(1) = lon1
      gclat(1) = lat1
      if (nin.lt.2) RETURN
C
      do 200 n = 2, nin
         lon2 = plon(n)
         lat2 = plat(n)
         offsc2 = .false.
         call llplxy(lon2,lat2,1,x2,y2,idummy)
         if (invali) offsc2 = .true.
```

```
C
C        Test for point 2 being off screen.
         if (amax1(abs(x2),abs(y2)).gt.SUNITS) offsc2 = .true.
C
C        Init intermediate point to  pt 1.
         tlat = lat1
         tlon = lon1
         dstold = SUNITS
C
C        While (distance to pt2 too big) do
 101        continue
            offsc1 = .false.
            call llplxy(tlon,tlat,1,tx,ty,idummy)
            if (invali) offsc1 = .true.
            if (amax1(abs(tx),abs(ty)).gt.SUNITS) offsc1 = .true.
C
            distxy = sqrt((x2-tx)**2 + (y2-ty)**2)
            if (distxy .le. DSTMAX) go to 190
C
            call ll2da(tlat,tlon,lat2,lon2,arc,az,range,bering)
            if (offsc1.and.offsc2) then
C              Off the map.  Don't waste time adding too many points.
C              Calculate nadd from a maximum arc distance parameter.
               nadd =  int(arc/ARCMAX)
               if (nadd .eq. 0) go to 190
            else
C              Estimate nadd based on xy distance to next point,
               nadd = max0(1, int(distxy/DSTMAX))
CDEBUG
CD              CALL JCMARK(3)    ! asterisk
C
               if (distxy.gt.dstold) then

C                 We are approaching a discontinuity or distorted area where
C                 distxy increases as points are added.  A better estimate for
C                 nadd can be made from differential arc dist between pts.

                  call da2ll(tlat,tlon,EPSLON*arc,az,elat,elon)
                  call llplxy(elon,elat,1,ex,ey,idummy)
                  dxy = sqrt((tx-ex)**2 + (ty-ey)**2)
                  nadd = max0(1, int(dxy/(DSTMAX*EPSLON)))
CDEBUG
CD                 CALL JCMARK(4)
               endif
            endif
C
C           Calculate next add point on great circle between t and pt 2.
            dincr = arc/(nadd+1)
            call da2ll(tlat,tlon,dincr,az,tlat,tlon)
CDEBUG
CD           CALL LLPLXY(TLON,TLAT,1,XX,YY,IDUMMY)
CD           CALL JMARK(XX,YY)
C
            if (nout .le. maxpts-2) then
               nout = nout + 1
               gclat(nout) = tlat
               gclon(nout) = tlon
            else
               nover = nover + 1
               kount = maxpts + nover
               write(*,*)'LL2GC... Output array overflow ',kount
               write(*,*)' xx,yy,arc,nadd = ',xx,yy,arc,nadd
            endif
C
            dstold = distxy
            go to 101
C        End while.
 190     continue
C
         if ((distxy.ge.DSTMIN).or.(n.eq.nin)) then
C           Output segment end point and update next segment start point.
            nout = nout + 1
            gclat(nout) = lat2
            gclon(nout) = lon2
```

```
            lon1 = lon2
            lat1 = lat2
            x1 = x2
            y1 = y2
         else
C           Skip output and update for extremely short segments
         endif
 200  continue
C
      return
      end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   LLPLXY
C
C FUNCTIONAL DESCRIPTION:      Converts geographic polyline to display coords.
C
C          PROJECTION            ITPROJ     PROPERTY    COVERAGE    APPL.
C                                           c e e a s   w h o s l   p t n a
C                                           o q q z p   o e c e o   r o a r
C                                           n u u i e   r m e a c   e p v e
C                                           f i i m c   l i a / a   s o / a
C                                           o a d u i   d s n r l   e g t
C                                           r r i t a     p / e     n r r m
C                                           m e s h l     h c g     t a a e
C                                           a a t a       e o i     a p c a
C                                           l       l     r n o     t h k s
C                                                         e t n     n c   u
C    (1)  Albers Equal-area           9       .                 .     .     .
C    (2)  Azimuthal Equal-area       10       .   .     . . .       .     .
C    (3)  Azimuthal Equidistant      11         . .     . . .       .
C    (4)  Equirectangular             6         .       . . . .     .
C    (5)  Gnomonic                    1           .         .           .
C    (6)  Kavraisky IV               12             .   . . .       .
C    (7)  Lambert Conformal           8     .             . . .     .   .
C    (8)  Mercator                    7     .           . . . .     .   .
C    (9)  Miller                     13             .   .           .
C   (10)  Oblique Mercator           14     .       .   . . .       . . .
C   (11)  Orthographic                4           .       . . .     .
C   (12)  Perspective                 5           .       . . .     .
C   (13)  Polar Stereographic        15     .     .       . . .     .   .
C   (14)  Polyconic                  16             .         .       .
C   (15)  Sinusoidal                 18       .         . . .       .     .
C   (16)  Stereographic              19     .     .       . . .     .   .
C   (17)  Ortho. Equatorial           2           .       .         .
C   (18)  Ortho. Polar                3           .       .         .
C   (19)  Univ. Transverse Mercator  17     .           . . . .     .   .
C
C
C INPUT FILES/PARAMETERS:      plon(), plat() - input polyline arrays
C                              nin            - number of input points
C
C GLOBAL VARIABLES:            itproj         - projection identification no.
C
C OUTPUT FILES/PARAMETERS:     x(),y()        - output polyline arrays
C                              nout           - number of output points
C                              invali         - flag for last input point
C
C SUBROUTINES CALLED:          px????  All (lon,lat) to (x,y) transformations.
C
C CALLED BY:                   BLPLGN, BLPLIN, D2OUTL, FLSPLY, LLTOXY, rngrin
C
C LOCAL VARIABLES:             None.
C
C RESTRICTIONS:                None.
C
C ABNORMAL RETURN CONDITIONS:  PX??? error convention:  If a point cannot be
C                              sensibly mapped or lies over the horizon:
C                              1.  Point is omitted from output polyline.
C                              2.  Invalid flag set if point is a singlton.
```

```
C
C PROGRAMMER:                       DATE OF LAST CHANGE     REASON FOR CHANGE
C     Dave Nation                                           Original lltoxy
C     Tom Wescott   (NOSC)          Mar 88                  Polyline version.
C
C-*-*-*-*-*-*-*-*-*-*-*-*-*-*-*-*-*-*-*-*-*-*-*-*-*-*-*-*-*-*-*-*-*-*-*|*-*-*-*-

      subroutine LLPLXY(plon,plat,nin,x,y,nout)
c
      logical invali,notlst
      common /invali/ invali
      common /proj/ itproj,wmrad,xoffs,yoffs,scalr,notlst
      real plon(*), plat(*), x(*), y(*)
c
c
*-------------------------------------------------------------------------|--+
* Itproj:  1  2  3  4  5  6  7  8  9 10 11 12 13 14 15 16 17 18 19 20 21  |
*----------------------------------------------------------------------------+
*          g  o  o  o  p  e  m  l  a  a  a  k  m  o  p  p  u  s  s        |
*          n  r  r  r  e  q  e  a  l  z  z  a  i  b  o  o  t  i  t        |
*          o  e  p  t  r  r  r  m  b  e  e  v  l  l  s  l  m  n  e        |
*          m  q  o  h  s  e  c  c  r  a  d  r  l  m  t  y  z  u  r        |
*----------------------------------------------------------------------------+
      goto(1,02,03,04,05,06,07,08,09,10,11,12,13,14,15,16,17,18,19
     +    )itproj
c
c            Proj. #0  Bad input trap.
             write(*,*)' LLPLXY... Bad projection ID#.'
             go to 900
c
c            Proj. #1  Gnomonic
  1          call pxgnom(plon,plat,nin,x,y,nout)
             go to 900
c
c            Proj. #2  Orthographic Equatorial
  2          call pxoreq(plon,plat,nin,x,y,nout)
             go to 900
c
c            Proj. #3  Orthographic Polar
  3          call pxorpo(plon,plat,nin,x,y,nout)
             go to 900
c
c            Proj. #4  Orthographic
  4          call pxorth(plon,plat,nin,x,y,nout)
             go to 900
c
c            Proj. #5  Perspective
  5          call pxpers(plon,plat,nin,x,y,nout)
             go to 900
c
c            Proj. #6  Equirectangular
  6          call pxeqre(plon,plat,nin,x,y,nout)
             go to 900
c
c            Proj. #7  Mercator
  7          call pxmerc(plon,plat,nin,x,y,nout)
             go to 900
c
c            Proj. #8  Lambert Conformal
  8          call pxlamc(plon,plat,nin,x,y,nout)
             go to 900
c
c            Proj. #9  Albers Equal-area Conic.
  9          call pxalbr(plon,plat,nin,x,y,nout)
             go to 900
c
c            Proj. #10  Azimuthal Equal-area
 10          call pxazea(plon,plat,nin,x,y,nout)
             go to 900
c
c            Proj. #11  Azimuthal Equidistant
 11          call pxazed(plon,plat,nin,x,y,nout)
             go to 900
```

```
c
c             Proj. #12  Kavraisky IV
 12           call pxkavr(plon,plat,nin,x,y,nout)
              go to 900
c
c             Proj. #13  Miller
 13           call pxmill(plon,plat,nin,x,y,nout)
              go to 900
c
c             Proj. #14 Oblique Mercator
 14           call pxoblm(plon,plat,nin,x,y,nout)
              go to 900
c
c             Proj. #15  Polar Stereographic
 15           call pxpost(plon,plat,nin,x,y,nout)
              go to 900
c
c             Proj. #16  Polyconic
 16           call pxpoly(plon,plat,nin,x,y,nout)
              go to 900
c
c             Proj. #17  Universal Transverse Mercator
 17           call pxutmz(plon,plat,nin,x,y,nout)
              go to 900
c
c             Proj. #18  Sinusoidal
 18           call pxsinu(plon,plat,nin,x,y,nout)
              go to 900
c
c             Proj. #19  Stereographic
 19           call pxster(plon,plat,nin,x,y,nout)
              go to 900
c
c     End cases.
 900  continue
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    LLTOXY
C
C FUNCTIONAL DESCRIPTION:       Converts a (lon,lat) point to display (x,y).
C                               This subroutine has been functionally
C                               replaced by LLPLXY.  Its call remains for
C                               compatibility.
C
C INPUT FILES/PARAMETERS:       plon, plat     - input point
C
C GLOBAL VARIABLES:             None.
C
C OUTPUT FILES/PARAMETERS:      x,y            -  output point
C                               invali         -  flag for bad input point
C
C SUBROUTINES CALLED:           llplxy         -  Polyline conversion.
C
C CALLED BY:                     BSTMAP, CHECKA, CHECKB, CHECKM, CURBOX
C                                DMAPII, DROUTL, FDRAWV, FILLPT
C                                GRDLAT, GRDLON, HILPLT, INITIA, LIMITS
C                                LLINXY, PLOTOV, PLTCIT, PLTNAM
C
C LOCAL VARIABLES:              None.
C
C RESTRICTIONS:                 None.
C
C ABNORMAL RETURN CONDITIONS:   Invalid flag set for input points which
C                               are over the horizon or can't be computed.
C
C LOCATION:
C
C PROGRAMMER:                 DATE OF LAST CHANGE      REASON FOR CHANGE
C     DAVE NATION                                      ORIGINAL CODE.
C     JERRY FENERTY                                    DOCUMENTATION AND MO
```

```
C                                                              FOR A21 PROTOTYPE.
C     Tom Wescott   (NOSC)     Jan 87                          optimization, add invali
C
C-*-*-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine lltoxy(plat,plon,x,y)
c
      nin = 1
      call llplxy(plon,plat,nin,x,y,nout)
c
      return
      end


C+*+*+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      NRELIM
C
C FUNCTIONAL DESCRIPTION:
C          This subroutine solves a set of linear equations and gives an LU
C          decomposition of the coefficient matrix.  The Gauss elimination
C          method is used, with partial pivoting.  Multiple right hand sides
C          are permitted, they should be supplied as columns that augment
C          the coefficient matrix.
C
C REFERENCE:                      APPLIED NUMERICAL ANALYSIS  Gerald & Wheatly 1985
C
C INPUT FILES/PARAMETERS:
C                                 ab    - Coefficient matrix augmented with
C                                         R.H.S. vectors.
C                                 n     - Number of equations.
C                                 np    - No. of columns in the augmented matrix.
C                                 ndim  - First dimension of matrix ab.
C
C GLOBAL VARIABLES:               None.
C
C OUTPUT FILES/PARAMETERS:        The solution vector(s) are returned in the
C                                 augmentation columns of ab.
C
C SUBROUTINES CALLED:             None.
C
C LOCAL VARIABLES:
C
C RESTRICTIONS:                   None.
C
C ABNORMAL RETURN CONDITIONS:     None.
C
C PROGRAMMER:                     DATE OF LAST CHANGE     REASON FOR CHANGE
C     Tom Wescott (NOSC)          Dec 87                  Original entry.
C
C-*-*-*-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine nrelim(ab,n,np,ndim)
c
      real ab(ndim,np)
      integer n,np,ndim
      real save,ratio,value
      integer nml,ipvt,ipl,j,nvbl,l,kcol,jcol,jrow
c
cccc
c     Begin the reduction.
      nml = n - 1
      do 35 i = 1, nml
c
c        Find the row number of the pivot row.  We will then
c        interchange rows to put the pivot element on the diagonal.
         ipvt = i
         ipl = i + 1
         do 10 j = ipl, n
            if (abs(ab(ipvt,i)) .lt. abs(ab(j,i))) ipvt = j
 10      continue
c
c        Check for a near singular matrix.
         if (abs(ab(ipvt,i)) .lt. 1.0 E-6) then
```

```
CC          write(*,100)
 100        format(' NRELIM... Gauss elimination solution not feasable')
            return
         endif
c
c        Now interchange, except if the pivot element is already on
c        the diagonal, don't need to.
         if (ipvt .ne. i) then
            do 20 jcol = 1, np
               save = ab(i, jcol)
               ab(i,jcol) = ab(ipvt,jcol)
               ab(ipvt,jcol) = save
 20         continue
         endif
c
c        Now reduce all elements below the diagonal in the ith row.
c        Check first to see if a zero is already present.  If so, we
c        can skip the reduction on that row.
         do 32 jrow = ip1, n
            if (ab(jrow,i) .eq. 0) go to 32
            ratio = ab(jrow,i) / ab(i,i)
            ab(jrow,i) = ratio
            do 30 kcol = ip1, np
               ab(jrow,kcol) = ab(jrow,kcol) - ratio*ab(i,kcol)
 30         continue
 32      continue
 35   continue
c
c     We still need to check ab(n,n) for size.
      if (abs(ab(n,n)) .lt. 1.0E-6) then
CC          write(*,100)
         return
      endif
c
c     Back substitute.
      np1 = n + 1
      do 50 kcol = np1, np
         ab(n,kcol) = ab(n,kcol) / ab(n,n)
         do 45 j = 2, n
            nvbl = np1 - j
            l = nvbl + 1
            value = ab(nvbl,kcol)
            do 40 k = l, n
               value = value - ab(nvbl,k) * ab(k,kcol)
 40         continue
            ab(nvbl,kcol) = value / ab(nvbl,nvbl)
 45      continue
 50   continue
c
      return
      end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    NRFCN
C
C FUNCTIONAL DESCRIPTION:       Evaluates system equations for NRSYST.
C
C INPUT FILES/PARAMETERS:       x(n)  - Contains current guess for vector
C                                       (x1,x2...xN).  Should be preloaded with
C                                       an initial guess, and will ultimately
C                                       contain a nearby solution.
C
C GLOBAL VARIABLES:             None.
C
C OUTPUT FILES/PARAMETERS:      f(n)  - Functions evaluated at position x(n).
C
C SUBROUTINES CALLED:           None
C
C LOCAL VARIABLES:              None
C
C RESTRICTIONS:                 None.
C
```

```
C ABNORMAL RETURN CONDITIONS:  None.
C
C PROGRAMMER:                  DATE OF LAST CHANGE     REASON FOR CHANGE
C     Tom Wescott (NOSC)       Dec 87                  Original entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine nrfcn(x,f)
c
      real x(2), f(2)
      common /pie/ pie,tpie,pio2,pio4
      common /xymap/ projx,projy,xytol,ftol,delta
c
c     Convert longitude to normal domain.
      if(abs(x(1)) .gt. pie) x(1) = x(1) - sign(tpie,x(1))
c
c     Calculate iterated map position from current (lon,lat) guess.
      rlon = x(1)
      rlat = x(2)
      call lltoxy(rlat,rlon,calcx,calcy)
c
c     Set function values to distance between map position and input point.
      f(1) = calcx - projx
      f(2) = calcy - projy
c
c     Set sign of delta to insure next perturbation stays in Lat domain.
      delta = -sign(delta,x(2))
c
      return
      end


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                  NRSYST
C
C FUNCTIONAL DESCRIPTION:
C         This subroutine solves a system of n nonlinear equations by the
C         Newton Raphson-Method.  The partial derivatives of the functions
C         are estimated by difference quotients when a variable is
C         purturbed by an amount equal to delta.  (Delta is added).
C         This is done for each variable in the function.  Increments
C         to improve the estimates for the X-values are computed from
C         a system of equations using subroutine NRELIM.
C
C REFERENCE:  APPLIED NUMERICAL ANALYSIS  Gerald & Wheatly 1885
C         The reference algorithm has been modified to increase the prob-
C         ability of global convergence limiting the size of any correction,
C         and by making half sized corrections on every third iteration.
C
C INPUT FILES/PARAMETERS:
C         nrfcn - Subroutine that computes values of the functions.
C                 Must be declared external to the calling program.
C         n     - The number of equations.
C         maxit - Limit to the number of iterations that will be used.
C         x     - Array to hold the x-values. Initially this array holds
C                 the initial guesses.  It returns the final values.
C         f     - An array that holds values of the functions.
C         delta - A small value used to perturb the x values so partial
C                 derivatives can be computed by difference quotient.
C         xtol  - Tolerance value for change in x values to stop iter-
C                 ations.  When the largest change in any x meets xtol
C                 the subroutine terminates.
C         ftol  - Tolerance on the value of f to terminate.  When the
C                 largest f value is less than ftol, termination.
C         i     - Status variable.
C                 Calling with  i = 0  displays progress of the iteration.
C
C GLOBAL VARIABLES:            none.
C
C OUTPUT FILES/PARAMETERS:
C                       x(n)  - Final values of the iteration process.
C                       i     - Status variable indicates termination method.
C                        i = 1   - xtol was met
C                        i = 2   - ftol was met
```

```
C                             i = -1  - Maxit was exceeded, tolerances not met
C                             i = -2  - Very small pivot encountered in Gaussian
C                                       elimination step.  No results obtained.
C                             i = -3  - Bad n input.  Must be between 2 and 10.
C
C SUBROUTINES CALLED:           nrfcn, nrelim
C
C LOCAL VARIABLES:
C
C RESTRICTIONS:                 none.
C
C ABNORMAL RETURN CONDITIONS:   none.
C
C PROGRAMMER:                   DATE OF LAST CHANGE     REASON FOR CHANGE
C     Tom Wescott (NOSC)        Dec 87                  Original entry.
C
C-*-*-*-*-*-*-*-*-*-*-*-*-*-*-*-*-*-*-*-*-*-*-*-*-*-*-*-*-*-*-*-*-*-*-*|*-*-*-*-

      subroutine nrsyst(fcn,n,maxit,x,f,delta,xtol,ftol,i)
c
      real x(n), f(n), delta, xtol, ftol
      integer n, maxit, i
      real a(10,11), xsave(10), fsave(10)
      integer np, it, ivbl, itest, ifcn, irow, jcol
      real xmin(10), xmax(10), chgmax(10)
      common /domain/ xmin, xmax, chgmax
c
c     Check validity of value of n.
      if (n .lt. 2 .or. n .gt. 10) then
         i = -3
         write(*,1004) n
         return
      endif
c
c     Begin iterations - Get f values, then, save x values.
      np = n + 1
      do 100 it = 1, maxit
         call nrfcn(x,f)
         do 10 ivbl = 1, n
            xsave(ivbl) = x(ivbl)
 10      continue
c
c        Test f Values and save them.
         itest = 0
         do 20 ifcn = 1, n
            if (abs(f(ifcn)) .gt. ftol) itest = itest + 1
            fsave(ifcn) = f(ifcn)
 20      continue
         if (i .eq. 0) then
            write(*,1000) it, (x(ii)*180./3.14159,ii=1,n)
            write(*,1001) f
         endif
c
c        See if Ftol is met. If not continue, If so set i and return.
         if (itest .eq. 0) then
            if (i.eq.0) write(*,1005) it, F
            i = 2
            return
         endif
c
c        This double loop computes the partial derivatives of each
c        function for each variable and stores them in a coef array.
         do 50 jcol = 1, n
            x(jcol) = xsave(jcol) + delta
            call nrfcn(x,f)
            do 40 irow = 1, n
               a(irow,jcol) = (f(irow)-fsave(irow))/delta
 40         continue
c
c           Reset x values for the next column of partials.
            x(jcol) = xsave(jcol)
 50      continue
c
```

```
c        Now we put negative values as right hand sides and call nrelim.
         do 60 irow = 1, n
            a(irow,np) = -fsave(irow)
 60      continue
         call nrelim(a,n,np,10)
c
c        Be sure that the coefficient matrix is not to ill-conditioned.
         do 70 irow = 1, n

            if (abs(a(irow,irow)) .le. 1.0E-6) then
               if (i.eq.0) write(*,1003)
               i = -2
               return
            endif
 70      continue
c
c        Apply the corrections to the x values, and see if xtol is met.
         itest = 0
         do 80 ivbl = 1, n
c           Calculate maximum allowable correction.
            chg = a(ivbl,np)
            cmax = chgmax(ivbl)
            if (abs(chg) .gt. cmax)  chg = sign(cmax,chg)
c
c           Destablize possible oscillation with occasional half correction.
            if (mod(it,3) .eq. 0) chg = 0.5*chg

c           Apply correction and constrain x values to domain.
            x(ivbl) = xsave(ivbl) + chg
            x(ivbl) = amin1(x(ivbl),xmax(ivbl))
            x(ivbl) = amax1(x(ivbl),xmin(ivbl))
            if (abs(a(ivbl,np)) .gt. xtol) itest = itest + 1
 80      continue
c
c        If xtol is met, print the last values and return, else do
c        another iteration.
         if (itest .eq. 0) then
            if (i .eq. 0) write(*,1002)it,(x(ii)*180./3.14159,ii=1,n)
            i = 1
            return
         endif
 100  continue
c
c     We have done maxit iterations, set i = -1 and return.
      i = -1
      return
c
cccc
 1000 format(' nrsyst... After iteration ',i3,':'
     +       ,/,'  X(n) = ',10F13.5)
 1001 format  ('  F(n) = ',10F13.5)
 1002 format(/' nrsyst... After iteration ',I3,'    X values (meeting '
     +        ,'xtol) are: ',/,'  X(n) = ',10F13.5)
 1003 format(' nrsyst... Cannot solve system, matrix nearly singular.')
 1004 format(/' nrsyst... Number of equations passed in is invalid')
 1005 format(/' nrsyst... After iteration ',I3,'    F values (meeting '
     +        ,'ftol) are: ',/,'  F(n) = ',10F13.5)
c
      end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                 PINSPG
C
C FUNCTIONAL DESCRIPTION:   Test for point being inside the smaller of the
C                           two regions defined by a spherical polygon.
C
C INPUT FILES/PARAMETERS:   rlo, rla    - Vertex coordinate arrays.
C                           n           - Number of verticies.
C                           plo,pla     - Point to be tested.
C
C GLOBAL VARIABLES:                     - Multiples of pi.
C
C OUTPUT FILES/PARAMETERS:  pinspg      - Returned true if point is inside.
```

```
C                                             Internally reflex areas are true.
C                          area         - Area of smaller region, signed radians.
C
C SUBROUTINES CALLED:      ll2da.
C
C CALLED BY:               blhatc
C
C RESTRICTIONS:            None.
C
C PROGRAMMER:              DATE OF LAST CHANGE      REASON FOR CHANGE
C     Tom Wescott (NOSC)   Nov 88                   Original entry.
C
C-*-*-*-*-*-*-*-*-*-*-*-*-*-*-*-*-*-*-*-*-*-*-*-*-*-*-*-*-*-*-*-*-*-*-*|*-*-*-*-
      logical function pinspg(rlo,rla,nin,plo,pla,area)
c
      common /pie/ pie,tpie,pio2,pio4
      dimension rlo(*),rla(*)
c
c     Insure that we are dealing with a closed polygon.
      if ((rlo(nin).ne.rlo(1)).or.(rla(nin).ne.rla(1))) then
         n = nin + 1
         rlo(n) = rlo(1)
         rla(n) = rla(1)
      else
         n = nin
      endif
c
c     Get azimuth and its reciprocal from test point to first vertex.
      call ll2da(pla,plo,rla(1),rlo(1),d,azt2l,rng,bering)
      if (d .gt. 0.0001) then
         call ll2da(rla(1),rlo(1),pla,plo,d,azl2t,rng,bering)
      else
         azl2t = azt2l - sign(pie,azt2l)
      endif
c
      totang = 0.0
      totare = 0.0
      do 200 i = 2, n
c
c        Get azimuth and its reciprocal from test point to current vertex.
         call ll2da(pla,plo,rla(i),rlo(i),dist,azt2v,range,bering)
         if (d .gt. 0.0001) then
            call ll2da(rla(i),rlo(i),pla,plo,d,azv2t,rng,bering)
         else
            azv2t = azt2v - sign(pie,azt2t)
         endif
c        Sum angles about the test point.
         anglet = azt2v - azt2l
         if (abs(anglet).gt.pie) anglet = anglet - sign(tpie,anglet)
         totang = totang + anglet
c
c        Get azimuth and its reciprocal from current vertex to last vertex.
         call ll2da(rla(i),rlo(i),rla(i-1),rlo(i-1),d,azv2l,rng,bering)
         if (d .gt. 0.0001) then
            call ll2da(rla(i-1),rlo(i-1),rla(i),rlo(i),d,azl2v,rng,ber)
         else
            azl2v = azv2l - sign(pie,azvtl)
         endif

c        Calculate area of triangle tvl from its spherical excess.
         anglev = azv2l-azv2t
         if (abs(anglev).gt.pie) anglev = anglev - sign(tpie,anglev)
         anglel = azl2v-azl2t
         if (abs(anglel).gt.pie) anglel = anglel - sign(tpie,anglel)

         area = abs(anglet) + abs(anglev) + abs(anglel) - pie
         totare = totare + sign(area,anglet)
c
         azt2l = azt2v
         azl2t = azv2t
 200  continue
c
      area = totare
      pinspg = .true.
```

```
      if (abs(totang) .le. pie) pinspg = .false.
      if (abs(totare) .gt. tpie) then
         pinspg = .not.(pinspg)
         area = sign(tpie,area) - area
      endif
c
      return
      end


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                  PXALBR
C
C FUNCTIONAL DESCRIPTION:     ALBERS EQUAL AREA CONIC PROJECTION INTO X/Y
C                                     Elliptical earth model.
C
C INPUT FILES/PARAMETERS:     plon(), plat() - input polyline arrays
C                             nin            - number of input points
C
C GLOBAL VARIABLES:           clat,clon      - map center lat,lon
C                             pie,pio2       - multiples of pi
C                             eccen          - earth eccentricity
C                             wmrad          - earth radius, world units
C                             xoffs, yoffs   - display offset, world units
C
C OUTPUT FILES/PARAMETERS:    x(),y()        - output polyline arrays
C                             nout           - number of valid output points
C                             invali         - flag for last input point
C                             tranl          - transformation constant
C                             trank          -        "          "
C                             tranr          -        "          "
C                             trank2,const   -        "          "
C                             tscale         - trans. dependent scale factor
C                             pole           - latitude of near pole
C
C SUBROUTINES CALLED:         None.
C
C CALLED BY:                  llplxy
C
C LOCAL VARIABLES:
C
C RESTRICTIONS:               Initial call must be with:   notlst = .false.
C
C ABNORMAL RETURN CONDITIONS: Far pole is invalid.
C
C REFERENCE:                  CAM program documentation,  CIA 1986
C
C PROGRAMMER:                 DATE OF LAST CHANGE      REASON FOR CHANGE
C     Tom Wescott   (NOSC)    Feb 88                   Initial entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine PXALBR(plon,plat,nin,x,y,nout)
c
      common /pie/ pie,tpie,pio2,pio4
      common /eccen/ eccen,ec2
      common /eco2/ eco2
      logical invali,notlst
      common /invali/ invali
      common /proj/ itproj,wmrad,xoffs,yoffs,scalr,notlst
      common /conic/ splll,spll2,tranl,trank,tranr,tscale,pole,tilt
      common /albers/ dnom,trank2,const,sinB1
      common /center/clat,clon,cclat,sclat
      real plat(*), plon(*), x(*), y(*)
      parameter (SAFETY = .004)
      parameter (HILAT = 3.14159265/2.0-SAFETY)
c
c------------------- INITIALIZATION SECTION------------------------
      if (notlst) then
c        Skip calculation of map constants.
      else
         notlst = .true.
         ec2 = eccen*eccen
         eco2 = eccen/2.0
```

```
c
c       Condition standard parallels to avoid special angle singularities.
c       (This has a negligible effect on map geometry.)
        if (abs(spll1).gt.HILAT) spll1 = sign(HILAT,spll1)
        if (abs(spll2).gt.HILAT) spll2 = sign(HILAT,spll2)
        if (abs(abs(spll1)-abs(spll2)) .lt. SAFETY) then
           spll1 = spll1 - sign(SAFETY,spll1)
        endif
c
c       Compute Albers Conic transformation constants.
        spll0 = (spll1 + spll2)/2.0
        pole = sign(pio2,spll0)
        dnom = 1. + ec2*2./3. + ec2*ec2*3./5. + ec2*ec2*ec2*4./7.
c
        es02 = (eccen*sin(spll0))**2.0
        dnum = 1. + es02*2./3. + es02*es02*3./5. + es02*es02*es02*4./7.
        sinB0 = sin(spll0)*(dnum/dnom)
c
        es12 = (eccen*sin(spll1))**2.0
        dnum = 1. + es12*2./3. + es12*es12*3./5. + es12*es12*es12*4./7.
        sinB1 = sin(spll1)*(dnum/dnom)
c
        es22 = (eccen*sin(spll2))**2.0
        dnum = 1. + es22*2./3. + es22*es22*3./5. + es22*es22*es22*4./7.
        sinB2 = sin(spll2)*(dnum/dnom)
c
        c2 = wmrad*wmrad*(1.0-ec2)*
     +       (0.5/(1.0-ec2)+(.25/eccen)*alog((1.0+eccen)/(1.0-eccen)))
        t1 = (wmrad*cos(spll1))**2.0/(1.0-es12)
        t2 = (wmrad*cos(spll2))**2.0/(1.0-es22)
c
        tranl = (t1-t2)/(2.0*c2*(sinB2-sinB1))
        const = 2.0*c2/tranl
        trank = wmrad*cos(spll1)/(tranl*sqrt(1.0-es12))
        trank2 = trank*trank
        tranr = sqrt(trank2 + const*(sinB1-sinB0))
c
c       Compute a map dependant scale factor which normalizes a small
c       one nm E-W distance along a key latitude (clat) for any cone.
        scalat = clat
        if (abs(scalat).gt.HILAT) scalat = sign(HILAT,scalat)
        Dlo = .01745
        es2 = (eccen*sin(scalat))**2.0
        dnum = 1.+es2*2./3. + es2*es2*3./5. + es2*es2*es2*4./7.
        sinB = sin(scalat)*dnum/dnom
        rm = sqrt(trank2+const*(sinB1-sinB))
        deltax = rm * sin(tranl*Dlo)
        dxmap = Dlo*wmrad*cos(scalat)
        tscale = dxmap/deltax
        scalr = tscale
c
      endif
c
c------------------- COMPUTATIONAL SECTION-------------------------
      eterm = 1.0
      nout = 0
      do 100 n = 1, nin
c
         invali = .false.
         ptlat = plat(n)
         Dlo = plon(n) - clon
         if (abs(Dlo).gt.pie) Dlo = Dlo - sign(tpie,Dlo)
c
         if (ptlat.eq.-pole) then
            invali = .true.
         else
            if (eccen .ne. 0.0) then
               es2 = (eccen*sin(ptlat))**2.0
               dnum = 1.+es2*2./3. + es2*es2*3./5. + es2*es2*es2*4./7.
               eterm = dnum/dnom
            endif
c
            sinB = sin(ptlat)*eterm
            rm = sqrt(trank2+const*(sinB1-sinB))
```

```
            rx = rm*sin(tranl*Dlo)
            ry = tranr - rm*cos(tranl*Dlo)
c
c           Apply viewing transformation.
            nout = nout + 1
            x(nout) = rx*scalr + xoffs
            y(nout) = ry*scalr + yoffs
         endif
c
 100  continue
c
      return
      end


C+*+*+*+*+*+*+*+*+*+*+*+*+*+*+*+*+*+*+*+*+*+*+*+*+*+*+*+*+*+*+*+*+*+*+*+*+|*+*+*+*+
C UNIT NAME:                      PXAZEA
C
C FUNCTIONAL DESCRIPTION:           AZIMUTHAL EQUAL AREA INTO X/Y
C                                       Spherical earth model.
C
C INPUT FILES/PARAMETERS:         plon(), plat() - input polyline arrays
C                                 nin            - number of input points
C
C GLOBAL VARIABLES:               clat,clon      - map center lat,lon
C                                 cclat,sclat    - cos,sin of center lat
C                                 wmrad          - earth radius, world units
C                                 xoffs, yoffs   - display offset, world units
C
C OUTPUT FILES/PARAMETERS:        x(),y()        - output polyline arrays
C                                 nout           - number of valid output points
C                                 invali         - flag for last input point, true
C                                                  unless pt. very near antipode.
C SUBROUTINES CALLED:             None.
C
C CALLED BY:                      lltoxy, llplxy
C
C LOCAL VARIABLES:                er             - arc from center to point
C
C RESTRICTIONS:                   Declares antipode invalid.
C
C ABNORMAL RETURN CONDITIONS:     None.
C
C PROGRAMMER:                     DATE OF LAST CHANGE     REASON FOR CHANGE
C     Tom Wescott  (NOSC)         Jan 87                  Original entry.
C                                 OCT 88
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine pxazea(plon,plat,nin,x,y,nout)
c
        common /center/ clat,clon,cclat,sclat
        logical invali,notlst
        common /invali/ invali
        common /proj/ itproj,wmrad,xoffs,yoffs,scalr,notlst
        real plat(*), plon(*), x(*), y(*)
        parameter(COSHZN = -0.999999)
c
        if (notlst) then
c          Skip calculation of map constant.
        else
           notlst = .true.
           scalr = wmrad
        endif
c
        nout = 0
        do 100 i = 1, nin
c
           invali = .false.
           sinL1 = sin(plat(i))
           cosL1 = cos(plat(i))
           Dlo = plon(i) - clon
           sinDlo = sin(Dlo)
           cosDlo = cos(Dlo)
```

```
c
c         Calculate arc from map center to point (plon,plat).
          cosER = sclat*sinL1 + cclat*cosL1*cosDlo
          if (abs(cosER) .gt. 1.0) cosER = sign(1.0,cosER)
c
          if (cosER .lt. COSHZN) then
c            The point is beyond the defined map boundary.
             invali = .true.
             cosER = COSHZN
          endif
c
c         Calculate output point on plane of projection.
          er = acos(cosER)
          sinER = sin(er)
          if (sinER .eq. 0.0) then
c            Point is at the projection center.
             rx = 0.0
             ry = 0.0
          else
             const = 2.0*sin(er/2.0)/sinER
             rx = const*cosL1*sinDlo
             ry = const*(cclat*sinL1-sclat*cosL1*cosDlo)
          endif
c
c         Apply viewing transformation.
          nout = nout + 1
          x(nout) = rx*scalr - xoffs
          y(nout) = ry*scalr - yoffs
c
 100    continue
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PXAZED
C
C FUNCTIONAL DESCRIPTION:       AZIMUTHAL EQUIDISTANT PROJECTION INTO X/Y
C                                       Spherical earth model.
C
C INPUT FILES/PARAMETERS:       plon(), plat() - input polyline arrays
C                               nin            - number of input points
C
C GLOBAL VARIABLES:             clat,clon      - map center lat,lon
C                               cclat,sclat    - cos,sin of center lat
C                               wmrad          - earth radius, world units
C                               xoffs, yoffs   - display offset, world units
C
C OUTPUT FILES/PARAMETERS:      x(),y()        - output polyline arrays
C                               nout           - number of valid output points
C                               invali         - flag for last input point, true
C                                                unless point very near antipode.
C
C SUBROUTINES CALLED:           None.
C
C CALLED BY:                    lltoxy, llplxy
C
C LOCAL VARIABLES:              er             - arc from center to point
C
C RESTRICTIONS:                 None.
C
C ABNORMAL RETURN CONDITIONS:   None.
C
C PROGRAMMER:                   DATE OF LAST CHANGE     REASON FOR CHANGE
C     Tom Wescott  (NOSC)       Jan 87                  Original entry.
C                               OCT 88
C
C-*-*-*-*-*-*-*-*-*-*-*-*-*-*-*-*-*-*-*-*-*-*-*-*-*-*-*-*-*-*-*-*-*-*-*-*-*|*-*-*-*-
        subroutine pxazed(plon,plat,nin,x,y,nout)
c
        common /center/ clat,clon,cclat,sclat
        logical invali,notlst
        common /invali/ invali
```

```
      common /proj/ itproj,wmrad,xoffs,yoffs,scalr,notlst
      real plat(*), plon(*), x(*), y(*)
      parameter(COSHZN = -0.999999)
c
c
      if (notlst) then
c        Skip calculation of map constant.
      else
         notlst = .true.
         scalr = wmrad
      endif
c
      nout = 0
      do 100 i = 1, nin
c
         invali = .false.
         sinL1 = sin(plat(i))
         cosL1 = cos(plat(i))
         Dlo = plon(i) - clon
         sinDlo = sin(Dlo)
         cosDlo = cos(Dlo)
c
c        Calculate arc from map center to point (plon,plat).
         cosER = sclat*sinL1 + cclat*cosL1*cosDlo
         if (abs(cosER) .gt. 1.0) cosER = sign(1.0,cosER)
c
         if (cosER .lt. COSHZN) then
c           The point is outside valid map area.
            invali = .true.
            cosER = COSHZN
         endif
c
c        Calculate output point on plane of projection.
         er = acos(cosER)
         sinER = sin(er)
         if (sinER .eq. 0.0) then
c           Point is at the projection center.
            rx = 0.0
            ry = 0.0
         else
            const = er/sinER
            rx = const*cosL1*sinDlo
            ry = const*(cclat*sinL1-sclat*cosL1*cosDlo)
         endif
c
c        Apply viewing transformation.
         nout = nout + 1
         x(nout) = rx*scalr - xoffs
         y(nout) = ry*scalr - yoffs
c
100   continue
c
      return
      end


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PXEQRE
C
C FUNCTIONAL DESCRIPTION:          EQUIRECTANGULAR PROJECTION INTO X/Y
C                                     spherical earth model.
C
C INPUT FILES/PARAMETERS:       plon(), plat() - input polyline arrays
C                               nin            - number of input points
C
C GLOBAL VARIABLES:             clat,clon      - map center lat,lon
C                               cclat,sclat    - cos,sin of center lat
C                               pio2           - multiple of pi
C                               wmrad          - earth radius, world units
C                               xoffs, yoffs   - display offset, world units
C
C OUTPUT FILES/PARAMETERS:      x(),y()        - output polyline arrays
C                               nout           - number of valid output points
C                               invali         - flag for last input point
```

```
C
C SUBROUTINES CALLED:            None.
C
C CALLED BY:                     lltoxy, llplxy
C
C LOCAL VARIABLES:               None.
C
C RESTRICTIONS:                  None.
C
C ABNORMAL RETURN CONDITIONS:  Invalid flag set for pts. at poles.
C
C LOCATION:
C
C PROGRAMMER:                    DATE OF LAST CHANGE      REASON FOR CHANGE
C     DAVE NATION                                         ORIGINAL CODE.
C     JERRY FENERTY                                       DOCUMENTATION AND MO
C                                                         FOR A21 PROTOTYPE.
C     Tom Wescott   (NOSC)       Jan 87                   optimization, add invali
C
C-*-*-*-*-*-*-*-*-*-*-*-*-*-*-*-*-*-*-*-*-*-*-*-*-*-*-*-*-*-*-*-*-*-*-*|*-*-*-*-

      subroutine PXEQRE(plon,plat,nin,x,y,nout)
c
      common /center/ clat,clon,cclat,sclat
      common /pie/ pie,tpie,pio2,pio4
      logical invali,notlst
      common /invali/ invali
      common /proj/ itproj,wmrad,xoffs,yoffs,scalr,notlst
      real plat(*), plon(*), x(*), y(*)
c
c
      if (notlst) then
c        Skip calculation of scale factor.
      else
         notlst = .true.
         scalr = wmrad*cclat
CC       IF (INDEX(IDEBUG,'oldhldf') .ne. 0) scalr = wmrad
      endif
c
      nout = 0
      do 100 i = 1, nin
c
         invali = .false.
         if (abs(plat(i)).ge.pio2) then
c           The point lies on a pole.
            invali = .true.
         else
c           Calculate output point on cylinder of projection.
            rx = plon(i) - clon
            if (abs(rx).gt.pie) rx = rx - sign(tpie,rx)
c
            ry = plat(i) - clat
c
c           Apply viewing transformation.
            nout = nout + 1
            x(nout) = rx*scalr + xoffs
            y(nout) = ry*scalr + yoffs
         endif
c
 100  continue
c
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     PXGNOM
C
C FUNCTIONAL DESCRIPTION:           GNOMONIC PROJECTION INTO X/Y
C                                      Spherical earth model.
C
C INPUT FILES/PARAMETERS:        plon(), plat() - input polyline arrays
C                                nin            - number of input points
C
```

```
C GLOBAL VARIABLES:            clat,clon       - map center lat,lon
C                              cclat,sclat     - cos,sin of center lat
C                              wmrad           - earth radius, world units
C                              xoffs, yoffs    - display offset, world units
C
C OUTPUT FILES/PARAMETERS:     x(),y()         - output polyline arrays
C                              nout            - number of valid output points
C                              invali          - flag for last input point
C
C SUBROUTINES CALLED:          None.
C
C CALLED BY:                   lltoxy, llplxy
C
C LOCAL VARIABLES:             er              - arc from center to point
C
C RESTRICTIONS:                Declares points more than 80 degrees from
C                              the center invalid, and does not output them.
C
C ABNORMAL RETURN CONDITIONS:  None.
C
C PROGRAMMER:                DATE OF LAST CHANGE     REASON FOR CHANGE
C
C     DAVE NATION                                    ORIGINAL CODE.
C     JERRY FENERTY                                  DOCUMENTATION AND MO
C                                                    FOR A21 PROTOTYPE.
C     Tom Wescott  (NOSC)    Jan 87                  optimization, add invali
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine pxgnom(plon,plat,nin,x,y,nout)
c
        common /center/ clat,clon,cclat,sclat
        logical invali,notlst
        common /invali/ invali
        common /proj/ itproj,wmrad,xoffs,yoffs,scalr,notlst
        real plat(*), plon(*), x(*), y(*)
        parameter (COSHZN=0.17)
c
c
        if (notlst) then
c          Skip calculation of map constant.
        else
           notlst = .true.
           scalr = wmrad
        endif
c
        nout = 0
        do 100 i = 1, nin
c
           invali = .false.
           sinL1 = sin(plat(i))
           cosL1 = cos(plat(i))
           Dlo = plon(i)-clon
           sinDlo = sin(Dlo)
           cosDlo = cos(Dlo)
c
c          Calculate arc from map center to point (plon,plat).
           cosER = sclat*sinL1 + cclat*cosL1*cosDlo
c
           if (cosER .le. COSHZN) then
c             The point lies beyond the map limit.
              invali = .true.
           else
c             Calculate output point on plane of projection.
              const = 1.0/cosER
              rx = const*cosL1*sinDlo
              ry = const*(cclat*sinL1-sclat*cosL1*cosDlo)
c
c             Apply viewing transformation.
              nout = nout+1
              x(nout) = rx*scalr + xoffs
              y(nout) = ry*scalr + yoffs
           endif
```

```
c
 100    continue
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PXKAVR
C
C FUNCTIONAL DESCRIPTION:       KAVRAISKY IV  CONIC PROJECTION INTO X/Y
C                                       Spherical earth model.
C
C INPUT FILES/PARAMETERS:       plon(), plat() - input polyline arrays
C                               nin            - number of input points
C
C GLOBAL VARIABLES:             clat,clon      - map center lat,lon
C                               pie,pio2       - multiples of pi
C                               wmrad          - earth radius, world units
C                               xoffs, yoffs   - display offset, world units
C
C OUTPUT FILES/PARAMETERS:      x(),y()        - output polyline arrays
C                               nout           - number of valid output points
C                               tranl          - transformation constant
C                               trank          -        "          "
C                               tranr          -        "          "
C                               tscale         - trans. dependent scale factor
C
C SUBROUTINES CALLED:           None.
C
C CALLED BY:                    llplxy
C
C LOCAL VARIABLES:
C
C RESTRICTIONS:                 Initial call must be with:  notlst = .false.
C
C ABNORMAL RETURN CONDITIONS:   None.
C
C REFERENCE:                    CAM program documentation,  CIA 1986
C
C PROGRAMMER:                   DATE OF LAST CHANGE      REASON FOR CHANGE
C     Tom Wescott  (NOSC)       Feb 88                   Initial entry.
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine PXKAVR(plon,plat,nin,x,y,nout)
c
      common /pie/ pie,tpie,pio2,pio4
      logical invali,notlst
      common /invali/ invali
      common /proj/ itproj,wmrad,xoffs,yoffs,scalr,notlst
      common /conic/ spll1,spll2,tranl,trank,tranr,tscale,pole,tilt
      common /center/clat,clon,cclat,sclat
      real plat(*), plon(*), x(*), y(*)
      parameter (SAFETY = .004)
      parameter (HILAT = 3.14159265/2.0-SAFETY)
c
c------------------- INITIALIZATION SECTION------------------------
      if (notlst) then
c        Skip calculation of map constants.
      else
         notlst = .true.
c
c        Condition standard parallels to avoid special angle singularities.
c        (This has a negligible effect on map geometry.)
         if (abs(spll1).gt.HILAT) spll1 = sign(HILAT,spll1)
         if (abs(spll2).gt.HILAT) spll2 = sign(HILAT,spll2)
         if (abs(abs(spll1)-abs(spll2)) .lt. SAFETY) then
            spll1 = spll1 - sign(SAFETY,spll1)
         endif
c
c        Compute KAVRAISKY IV transformation constants.
```

```
         tranl = (cos(spll1)-cos(spll2))/(spll2-spll1)
         trank = ((cos(spll1)+cos(spll2))/tranl+spll1+spll2)*wmrad/2.
         tranr = trank-wmrad*clat
c
c        Compute a scale factor which normalizes a small one nautical
c        mile E-W distance along a key latitude (clat) for any cone.
         scalat = clat
         if (abs(scalat).gt.HILAT) scalat = sign(HILAT,scalat)
         Dlo = .01745
         rm = trank-wmrad*scalat
         deltax = rm*sin(tranl*Dlo)
         dxmap = Dlo*wmrad*cos(scalat)
         tscale = dxmap/deltax
         scalr = tscale
c
      endif
c
c------------------- COMPUTATIONAL SECTION-----------------------
      nout = 0
      do 100 n = 1, nin
c
         invali = .false.
         ptlat = plat(n)
         Dlo = plon(n) - clon
         if (abs(Dlo).gt.pie) Dlo = Dlo - sign(tpie,Dlo)
c
         rm = trank - wmrad*ptlat
         rx = rm*sin(tranl*Dlo)
         ry = tranr - rm*cos(tranl*Dlo)
c
c        Apply viewing transformation.
         nout = nout + 1
         x(nout) = rx*scalr + xoffs
         y(nout) = ry*scalr + yoffs
c
 100  continue
c
      return
      end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                  PXLAMC
C
C FUNCTIONAL DESCRIPTION:     LAMBERT CONFORMAL PROJECTION INTO X/Y
C                                   Elliptical earth model.
C
C INPUT FILES/PARAMETERS:     plon(), plat() - input polyline arrays
C                             nin            - number of input points
C
C GLOBAL VARIABLES:           clat,clon      - map center lat,lon
C                             pio4           - multiple of pi
C                             eccen          - earth eccentricity
C                             wmrad          - earth radius, world units
C                             xoffs, yoffs   - display offset, world units
C
C OUTPUT FILES/PARAMETERS:    x(),y()        - output polyline arrays
C                             nout           - number of valid output points
C                             invali         - flag for last input point
C                             pole            +.5 if cone over N, -.5 over S
C                             tranl          - transformation constant
C                             trank          -        "          "
C                             tranr          -        "          "
C                             tscale         - trans. dependent scale factor
C
C SUBROUTINES CALLED:         None.
C
C CALLED BY:                   llplxy
C
C LOCAL VARIABLES:
C
C RESTRICTIONS:               Initial call must be with:   notlst = .false.
C
C ABNORMAL RETURN CONDITIONS: Invalid returned for pts. near far pole.
```

```
C
C REFERENCE:                    CAM Program Documentation   CIA 1986
C
C PROGRAMMER:                   DATE OF LAST CHANGE       REASON FOR CHANGE
C      DAVE NATION                                        ORIGINAL CODE.
C      JERRY FENERTY                                      DOCUMENTATION AND MO
C      Tom Wescott   (NOSC)     Jan 87                    Added polyline loop.
C      Tom Wescott              Jul 87                    Use CIA CAM formulas.
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

      subroutine pxlamc(plon,plat,nin,x,y,nout)
c
      common /pie/ pie,tpie,pio2,pio4
      common /eccen/ eccen,ec2
      common /eco2/ eco2
      logical invali,not1st
      common /invali/ invali
      common /proj/ itproj,wmrad,xoffs,yoffs,scalr,not1st
      common /conic/ spll1,spll2,tranl,trank,tranr,tscale,pole,tilt
      common /center/clat,clon,cclat,sclat
      real plat(*), plon(*), x(*), y(*)
      parameter (SAFETY = .004)
      parameter (HILAT = 3.1415/2.0 )
      parameter (HHILAT = HILAT/2.0)
c
c------------------- INITIALIZATION SECTION-----------------------
      if (not1st) then
c        Skip calculation of map constants.
      else
         not1st = .true.
         ec2 = eccen*eccen
         eco2 = eccen/2.0
c
c        Condition standard parallels to avoid singularities.
c        (This has a negligible effect on map geometry.)
         if (spll1 .eq. 0.0) spll1 = SAFETY
         if (spll2 .eq. 0.0) spll2 = SAFETY
         if (abs(spll1).gt.HILAT) spll1 = sign(HILAT,spll1)
         if (abs(spll2).gt.HILAT) spll2 = sign(HILAT,spll2)
         if (spll1 .eq. -spll2) then
            spll1 = SAFETY
            spll2 = SAFETY
         endif
c
c        Compute Lambert Conformal Conic transformation constants.
         spll0 = (spll1 + spll2)/2.0
         pole = sign(0.5,spll0)
c
         esinl = eccen*sin(clat)
         eterm = ((1.0 + esinl)/(1.0 - esinl))**eco2
         tanZ02 = eterm*tan(pio4 - pole*abs(clat))
c
         esinl = eccen*sin(spll1)
         eterm = ((1.0 + esinl)/(1.0 - esinl))**eco2
         tanZ12 = eterm*tan(pio4 - pole*abs(spll1))
c
         esinl = eccen*sin(spll2)
         eterm = ((1.0 + esinl)/(1.0 - esinl))**eco2
         tanZ22 = eterm*tan(pio4 - pole*abs(spll2))
c
         r1 = wmrad/(sqrt(1.0 - ec2*sin(spll1)*sin(spll1)))
         r2 = wmrad/(sqrt(1.0 - ec2*sin(spll2)*sin(spll2)))
         denom = alog(tanZ12) - alog(tanZ22)
         if (denom .ne. 0.0) then
            sinPHI = alog(cos(spll1))-alog(cos(spll2))+alog(r1)-alog(r2)
            sinPHI = sinPHI/denom
         else
c           Avoid zero divide if parallels same.  Replace with limit.
            sinPHI = sin(spll1)
         endif
         tranl = abs(sinPHI)
c
         trank = 0.5*((r1*cos(spll1)/(tranl*tanZ12**tranl))
     +               +(r2*cos(spll2)/(tranl*tanZ22**tranl)))
```

```
c
          tranr = trank*(tanZ02**tranl)
c
c         Compute a map dependant scale factor which normalizes a small
c         one nm E-W distance along a key latitude (clat) for any cone.
          scalat = clat
          if (abs(scalat).gt.HILAT) scalat = sign(HILAT,scalat)
          Dlo = .01745
          tanZM2 = eterm*tan(pio4 - pole*scalat)
          rm = abs(trank*(tanZM2**tranl))
          deltax = rm * sin(tranl*abs(Dlo))
          if (pole*Dlo .lt. 0.0) deltax = - deltax
          dxmap = Dlo*wmrad*cos(scalat)
          tscale = dxmap/deltax
          scalr = tscale
c
      endif
c
c------------------- COMPUTATIONAL SECTION------------------------
      eterm = 1.0
      nout = 0
      do 100 n = 1, nin
c
         invali = .false.
         ptlat = plat(n)
         Dlo = plon(n) - clon
         if (abs(Dlo).gt.pie) Dlo = Dlo - sign(tpie,Dlo)
         absDlo = abs(Dlo)
c
         if ((abs(ptlat).gt.pio2).or.(pole*ptlat.le.-HHILAT)) then
            invali = .true.
         else
            if (eccen .ne. 0.0) then
               esinl = eccen * sin(ptlat)
               eterm = ((1.0 + esinl)/(1.0 - esinl))**eco2
            endif
c
            tanZM2 = eterm*tan(pio4 - pole*ptlat)
c
            rm = abs(trank*(tanZM2**tranl))
            rx = rm * sin(tranl*absDlo)
            if (pole*Dlo .lt. 0.0) rx = -rx
            ry = tranr - rm*cos(tranl*absDlo)
c
c           Apply viewing transformation.
            nout = nout + 1
            x(nout) = rx*scalr + xoffs
            y(nout) = ry*scalr + yoffs
         endif
c
 100  continue
c
      return
      end


C+*+*+*+*+*+*+*+*+*+*+*+*+*+*+*+*+*+*+*+*+*+*+*+*+*+*+*+*+*+*+*+*+*+*+|*+*+*+*+
C UNIT NAME:                      PXMERC
C
C FUNCTIONAL DESCRIPTION:            MERCATOR PROJECTION INTO X/Y
C                                       Elliptical earth model.
C
C INPUT FILES/PARAMETERS:         plon(), plat() - input polyline arrays
C                                 nin            - number of input points
C
C GLOBAL VARIABLES:               clat,clon      - map center lat,lon
C                                 cclat,sclat    - cos,sin of center lat
C                                 pio2,pio4      - multiples of pi
C                                 eccen          - earth eccentricity
C                                 wmrad          - earth radius, world units
C                                 xoffs, yoffs   - display offset, world units
C                                 scalr          - display scale factor
C
C OUTPUT FILES/PARAMETERS:        x(),y()        - output polyline arrays
C                                 nout           - number of valid output points
```

```
C                               invali        - flag for last input point
C
C SUBROUTINES CALLED:           None.
C
C CALLED BY:                    llplxy
C
C LOCAL VARIABLES:              None.
C
C RESTRICTIONS:                 None.
C
C ABNORMAL RETURN CONDITIONS:  Invalid flag set for pts at poles.
C
C PROGRAMMER:                   DATE OF LAST CHANGE     REASON FOR CHANGE
C     DAVE NATION                                       ORIGINAL CODE.
C     JERRY FENERTY                                     DOCUMENTATION AND MO
C                                                       FOR A21 PROTOTYPE.
C     Tom Wescott   (NOSC)      Jan 87                  optimization, add invali
C
C-*-*-*-*-*-*-*-*-*-*-*-*-*-*-*-*-*-*-*-*-*-*-*-*-*-*-*-*-*-*-*-*-*-*|*-*-*-*-

        subroutine PXMERC(plon,plat,nin,x,y,nout)
c
        common /center/ clat,clon,cclat,sclat
        common /pie/ pie,tpie,pio2,pio4
        common /eccen/ eccen,ec2
        logical invali,notlst
        common /invali/ invali
        common /proj/ itproj,wmrad,xoffs,yoffs,scalr,notlst
        real plat(*), plon(*), x(*), y(*)
        parameter (HILAT=3.13/2.0)
c
c
        if (notlst) then
c          Skip calculation of scale factor.
        else
           notlst = .true.
           scalr = wmrad*cos(clat)
        endif
c
        nout = 0
        do 100 i = 1, nin
c
           invali = .false.
           ptlat = plat(i)
c
           if (abs(ptlat).ge.HILAT) then
              if (abs(ptlat).ge.pio2) invali = .true.
              ptlat = sign(HILAT,ptlat)
           endif
c
c          Calculate output point on cylinder of projection.
           rx = plon(i) - clon
           if (abs(rx).gt.pie) rx = rx - sign(tpie,rx)
c
           ry = alog(tan(pio4+0.5*ptlat))
           if (eccen .ne. 0.0) then
c
              Add on eccentricity term.
              esinL = eccen*sin(ptlat)
              ry = ry + 0.5*eccen*alog((1.0-esinL)/(1.0+esinL))
           endif
           ry = ry - clat
c
c          Apply viewing transformation.
           nout = nout + 1
           x(nout) = rx*scalr + xoffs
           y(nout) = ry*scalr + yoffs
c
 100    continue
c
        return
        end
```

```
C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   PXMILL
C
C FUNCTIONAL DESCRIPTION:       MILLER CYLINDRICAL PROJECTION INTO X/Y
C                                     Spherical earth model.
C
C INPUT FILES/PARAMETERS:      plon(), plat() - input polyline arrays
C                              nin            - number of input points
C
C GLOBAL VARIABLES:            clat,clon      - map center lat,lon
C                              cclat,sclat    - cos,sin of center lat
C                              pio2,pio4      - multiples of pi
C                              wmrad          - earth radius, world units
C                              xoffs, yoffs   - display offset, world units
C
C OUTPUT FILES/PARAMETERS:     x(),y()        - output polyline arrays
C                              nout           - number of valid output points
C                              invali         - flag for last input point
C
C SUBROUTINES CALLED:          None.
C
C CALLED BY:                   llplxy
C
C LOCAL VARIABLES:             None.
C
C RESTRICTIONS:                None.
C
C ABNORMAL RETURN CONDITIONS:  Invalid flag set for pts at poles.
C
C PROGRAMMER:                  DATE OF LAST CHANGE     REASON FOR CHANGE
C     DAVE NATION                                      ORIGINAL CODE.
C     JERRY FENERTY                                    DOCUMENTATION AND MO
C                                                      FOR A21 PROTOTYPE.
C     Tom Wescott  (NOSC)      Jan 87                  optimization, add invali
C
C-*-*-*-*-*-*-*-*-*-*-*-*-*-*-*-*-*-*-*-*-*-*-*-*-*-*-*-*-*-*-*-*-*-*-*|*-*-*-*-

       subroutine PXMILL(plon,plat,nin,x,y,nout)
c
       common /center/ clat,clon,cclat,sclat
       common /pie/ pie,tpie,pio2,pio4
       logical invali,notlst
       common /invali/ invali
       common /proj/ itproj,wmrad,xoffs,yoffs,scalr,notlst
       real plat(*), plon(*), x(*), y(*)
c
c
       if (notlst) then
c         Skip calculation of map constant.
       else
          notlst = .true.
          scalr = wmrad*cclat
       endif
c
       nout = 0
       do 100 i = 1, nin
c
          invali = .false.
          ptlat = plat(i)
          ptlon = plon(i)
c
          if (abs(ptlat).ge.pio2) then
             invali = .true.
          else
c            Calculate output point on cylinder of projection.
             rx = ptlon - clon
             if (abs(rx).gt.pie) rx = rx - sign(tpie,rx)
c
             ry = 1.25 + alog(tan(pio4+0.4*ptlat))
             ry = ry - clat
c
c            Apply viewing transformation.
             nout = nout + 1
             x(nout) = rx*scalr + xoffs
             y(nout) = ry*scalr + yoffs
          endif
```

```
c
 100    continue
c
        return
        end


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PXOBLM
C
C FUNCTIONAL DESCRIPTION:       OBLIQUE MERCATOR PROJECTION INTO X/Y
C                                     Spherical earth model.
C
C INPUT FILES/PARAMETERS:       plon(), plat() - input polyline arrays
C                               nin            - number of input points
C
C GLOBAL VARIABLES:             clat,clon      - map center lat,lon
C                               cclat,sclat    - cos,sin of center lat
C                               wmrad          - earth radius, world units
C                               xoffs, yoffs   - display offset, world units
C                               az,azlat       - Gt. circle azimuth at azlat.
C                               tilt           - GT. circle azimuth at equator.
C
C OUTPUT FILES/PARAMETERS:      x(),y()        - output polyline arrays
C                               nout           - number of valid output points
C                               invali         - flag for last input point
C
C SUBROUTINES CALLED:           da2ll
C
C CALLED BY:                    lltoxy, llplxy
C
C LOCAL VARIABLES:              SINMAX         - sin of max angle from great c.
C
C RESTRICTIONS:                 Declares points beyond MAX from central great
C                               circle invalid, and truncates them there to work
C                               around polygon clipping problems near new poles.
C
C ABNORMAL RETURN CONDITIONS:   None.
C
C PROGRAMMER:                   DATE OF LAST CHANGE     REASON FOR CHANGE
C     Tom Wescott   (NOSC)      Apr 88                  original entry
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine PXOBLM(plon,plat,nin,x,y,nout)
c
      common /center/ clat,clon,cclat,sclat
      common /pie/ pie,tpie,pio2,pio4
      logical invali,notlst
      common /invali/ invali
      common /proj/ itproj,wmrad,xoffs,yoffs,scalr,notlst
      common /conic/ spll1,spll2,tranl,trank,tranr,tscale,pole,tilt
      common /oblm/ polat,polon,az,azlat,gamma,xshift
      real plat(*), plon(*), x(*), y(*)
      parameter (SINMAX=.99)
c
c----------------------- INITIALIZATION SECTION ----------------------------
      if (notlst) then
c        Skip calculation of constants.
      else
         notlst = .true.
c
c        Specify central great circle by lat,azimuth, and center pt.
c        Convert great circle azimuth to range  -pio2 < az < pio2.
         if (abs(az).gt.pie) az = az - sign(tpie,az)
         if (abs(az).gt.pio2) az = az - sign(pie,az)
c
c        Calculate north rotation angle for map center.
         sinB0 = sin(az)*cos(azlat)/cos(clat)
         if (abs(sinB0).gt.1.0) then
            sinB0 = sign(1.0,sinB0)
CCCC        WRITE(*,*)'PXOBLM... gt. circle doesnt go thru map center'
         endif
         b0 = asin(sinB0)
c        Resolve asin() ambiguity by larger side rule.
```

```
         if (pio2-azlat .gt. pio2-clat)  b0 = sign(1.0,b0)*(pie-abs(b0))
c        Redefine central great circle azimuth at map center point.
         az = b0
         azlat = clat
         azlon = clon

         gamma = asin(sinB0) - sign(pio2,b0)
         sinG = sin(gamma)
         cosG = cos(gamma)
c
c        Calculate equatorial tilt (azimuth of gt. circle at equator).
         blat = 0.0
         b = asin(sin(az)*cos(azlat)/cos(blat))
c        Resolve asin() ambiguity by larger side rule.
         if (pio2-azlat .gt. pio2-blat)  b = sign(1.0,b)*(pie-abs(b))
c
         a = az
         tilt = b
         if (azlat.lt.0.0)  tilt = sign(1.0,az)*(pie-abs(b))
c
c        Find longitude of gt. circle-equator intersection.
         if ((a.ne.b).or.(azlat.ne.0.0)) then
            Dlo = 2.*atan2(sin(azlat/2.),tan((a-b)/2.)*cos(azlat/2.))
         else
            Dlo = 0.0
         endif
c        Find nearest intersection, where sign of tilt is correct.
         if (Dlo.gt.pio2) Dlo = Dlo -sign(pie,Dlo)
         dnode = azlon + Dlo
         if (abs(dnode).gt.pie) dnode = dnode - sign(tpie,dnode)
c
c        Calculate lat,lon coordinates of positive new pole.
         az2new = tilt - sign(pio2,tilt)
         call da2ll(0.0,dnode,pio2,az2new,polat,polon)
         sinPL = sin(polat)
         cosPL = cos(polat)
c
c        Calculate x position (parallel to great circle) of center point.
         cplon = clon - polon
         xshift=atan2(sin(cplon)*cclat,
     +           cclat*sin(polat)*cos(cplon)-cos(polat)*sclat)
c
         scalr = wmrad
      endif
c
c------------------------- COMPUTATIONAL SECTION ----------------------------
      sinPl = sin(polat)
      cosPl = cos(polat)
      nout = 0
      do 100 i = 1, nin
c
         invali = .false.
         ptlon = plon(i)
c        Rotate points with respect to great. circle.
         ptlon = ptlon - polon
         cosLO = cos(ptlon)
         sinLO = sin(ptlon)
         sinLA = sin(plat(i))
         cosLA = cos(plat(i))
c
c        Calculate output point on cylinder of projection.
         sinfnc = sinLA*sinPL+cosLA*cosPL*cosLO
         if (abs(sinfnc) .gt. SINMAX) then
c           Point is too far from central great circle.  Truncate.
            invali =.true.
            sinfnc = sign(SINMAX,sinfnc)
         endif
c
         rx = atan2(sinLO*cosLA, cosLA*sinPL*cosLO-cosPL*sinLA)
         deltax = rx - xshift
         if (abs(deltax).gt.pie) rx = rx - sign(tpie,deltax)
c
         ry = 0.5*alog((1+sinfnc)/(1-sinfnc))
c
```

```
c        Apply north up viewing transformation.
         nout = nout + 1
         x(nout) = (+rx*cosG + ry*sinG)*scalr + xoffs
         y(nout) = (-rx*sinG + ry*cosG)*scalr + yoffs
c
 100  continue
c
      return
      end


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   PXOREQ
C
C FUNCTIONAL DESCRIPTION:      EQUATORIAL ORTHOGRAPHIC PROJECTION INTO X/Y
C                                      Spherical earth model.
C
C INPUT FILES/PARAMETERS:      plon(), plat() - input polyline arrays
C                              nin            - number of input points
C
C GLOBAL VARIABLES:            clat,clon      - map center lat,lon
C                              cclat,sclat    - cos,sin of center lat
C                              wmrad          - earth radius, world units
C                              xoffs, yoffs   - display offset, world units
C
C OUTPUT FILES/PARAMETERS:     x(),y()        - output polyline arrays
C                              nout           - number of valid output points
C                              invali         - flag for last input point
C
C SUBROUTINES CALLED:          None.
C
C CALLED BY:                   lltoxy, llplxy
C
C LOCAL VARIABLES:             er             - arc from center to point
C
C RESTRICTIONS:                None.
C
C ABNORMAL RETURN CONDITIONS:  Declares points over the horizon invalid
C                              and does not output them.
C
C PROGRAMMER:                  DATE OF LAST CHANGE     REASON FOR CHANGE
C     DAVE NATION                                      ORIGINAL CODE.
C     JERRY FENERTY                                    DOCUMENTATION AND MO
C                                                      FOR A21 PROTOTYPE.
C     Tom Wescott   (NOSC)     Jan 87                  optimization, add invali
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine PXOREQ(plon,plat,nin,x,y,nout)
c
        common /center/ clat,clon,cclat,sclat
        logical invali,not1st
        common /invali/ invali
        common /proj/ itproj,wmrad,xoffs,yoffs,scalr,not1st
        real plat(*), plon(*), x(*), y(*)
c
c
        if (not1st) then
c          Skip calculation of scaling constant.
        else
           not1st = .true.
           scalr = wmrad
        endif
c
        nout = 0
        do 100 i = 1, nin
c
           invali = .false.
           sinL1 = sin(plat(i))
           cosL1 = cos(plat(i))
           Dlo = plon(i) - clon
c
c          Calculate arc from equatorial center, to point (plon,plat).
           cosER = cosL1*cos(Dlo)
```

```
c
          if (cosER .lt. 0.0) then
c            The point lies over the horizon.
             invali = .true.
          else
c            Calculate output point on plane of projection.
             rx = cosL1*sin(Dlo)
             ry = sinL1
c
c            Apply viewing transformation.
             nout = nout + 1
             x(nout) = rx*scalr + xoffs
             y(nout) = ry*scalr + yoffs
          endif
c
 100    continue
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     PXORPO
C
C FUNCTIONAL DESCRIPTION:         POLAR ORTHOGRAPHIC PROJECTION INTO X/Y
C                                      Spherical earth model.
C
C INPUT FILES/PARAMETERS:        plon(), plat() - input polyline arrays
C                                nin            - number of input points
C
C GLOBAL VARIABLES:              clat,clon      - map center lat,lon
C                                cclat,sclat    - cos,sin of center lat
C                                wmrad          - earth radius, world units
C                                xoffs, yoffs   - display offset, world units
C
C OUTPUT FILES/PARAMETERS:       x(),y()        - output polyline arrays
C                                nout           - number of valid output points
C                                invali         - flag for last input point
C
C SUBROUTINES CALLED:            None.
C
C CALLED BY:                     lltoxy, llplxy
C
C LOCAL VARIABLES:               cosER          - cos of arc from cntr to point.
C                                spolat         - sin of pole latitude.
C
C RESTRICTIONS:                  None.
C
C ABNORMAL RETURN CONDITIONS:    Points < 90 from center are invalid.
C
C PROGRAMMER:                    DATE OF LAST CHANGE     REASON FOR CHANGE
C     DAVE NATION                                        ORIGINAL CODE.
C     JERRY FENERTY                                      DOCUMENTATION AND MO
C                                                        FOR A21 PROTOTYPE.
C     Tom Wescott   (NOSC)       Jan 87                  optimization, add invali
C
C-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine PXORPO(plon,plat,nin,x,y,nout)
c
        common /center/ clat,clon,cclat,sclat
        common /pie/ pie,tpie,pio2,pio4
        logical invali,notlst
        common /invali/ invali
        common /proj/ itproj,wmrad,xoffs,yoffs,scalr,notlst
        real plat(*), plon(*), x(*), y(*)
c
c
        if (notlst) then
c          Skip calculation of constants.
        else
           notlst = .true.
           scalr = wmrad
        endif
c
        nout = 0
```

```
      do 100 i = 1, nin
c
         invali = .false.
         sinL1 = sin(plat(i))
         cosL1 = cos(plat(i))
         Dlo = plon(i) - clon
         spolat = sign(1.0,clat)
c
c        Calculate arc from map center to point (plon,plat).
         cosER = spolat*sinL1
c
         if (cosER .lt. -0.0) then
c           The point lies over the horizon.
            invali = .true.
         else
c           Calculate output point on plane of projection.
            rx = cosL1*sin(Dlo)
            ry = spolat*(-cosL1*cos(Dlo))

c           Apply viewing transformation.
            nout = nout + 1
            x(nout) = rx*scalr + xoffs
            y(nout) = ry*scalr + yoffs
         endif
c
 100  continue
c
      return
      end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PXORTH
C
C FUNCTIONAL DESCRIPTION:         ORTHOGRAPHIC PROJECTION INTO X/Y
C                                    Spherical earth model.
C
C INPUT FILES/PARAMETERS:       plon(), plat() - input polyline arrays
C                               nin            - number of input points
C
C GLOBAL VARIABLES:             clat,clon      - map center lat,lon
C                               cclat,sclat    - cos,sin of center lat
C                               wmrad          - earth radius, world units
C                               xoffs, yoffs   - display offset, world units
C
C OUTPUT FILES/PARAMETERS:      x(),y()        - output polyline arrays
C                               nout           - number of valid output points
C                               invali         - flag for last input point
C
C SUBROUTINES CALLED:           None.
C
C CALLED BY:                    llplxy,lltoxy
C
C LOCAL VARIABLES:              er             - arc from center to point
C
C RESTRICTIONS:                 Declares points over the horizon invalid
C                               and does not output them.
C
C ABNORMAL RETURN CONDITIONS:   None.
C
C PROGRAMMER:                   DATE OF LAST CHANGE     REASON FOR CHANGE
C     DAVE NATION                                       ORIGINAL CODE.
C     JERRY FENERTY                                     DOCUMENTATION AND MO
C                                                       FOR A21 PROTOTYPE.
C     Tom Wescott   (NOSC)      Jan 87                  optimization, add invali
C
C-*-*-*-*-*-*-*-*-*-*-*-*-*-*-*-*-*-*-*-*-*-*-*-*-*-*-*-*-*-*-*-*-*-*-*|*-*-*-*-

      subroutine PXORTH(plon,plat,nin,x,y,nout)
c
      common /center/ clat,clon,cclat,sclat
      logical invali,not1st
      common /invali/ invali
      common /proj/ itproj,wmrad,xoffs,yoffs,scalr,not1st
      real plat(*), plon(*), x(*), y(*)
```

```
c
c
        if (notlst) then
c          Skip calculation of map constant.
        else
           notlst = .true.
           scalr = wmrad
        endif
c
        nout = 0
        do 100 i = 1, nin
c
           invali = .false.
           sinL1 = sin(plat(i))
           cosL1 = cos(plat(i))
           Dlo = plon(i)-clon
           sinDlo = sin(Dlo)
           cosDlo = cos(Dlo)
c
c          Calculate arc from map center to point (plon,plat).
           cosER = sclat*sinL1 + cclat*cosL1*cosDlo
c
           if (cosER .lt. 0.0) then
c             The point lies over the horizon.
              invali = .true.
           else
c             Calculate output point on plane of projection.
              rx = cosL1*sinDlo
              ry = cclat*sinL1 - sclat*cosL1*cosDlo
c
c             Apply viewing transformation.
              nout = nout+1
              x(nout) = rx*scalr + xoffs
              y(nout) = ry*scalr + yoffs
           endif
c
 100    continue
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    PXPERS
C
C FUNCTIONAL DESCRIPTION:       PERSPECTIVE PROJECTION INTO X/Y
C                                    Spherical earth model.
C
C INPUT FILES/PARAMETERS:       plon(), plat() - input polyline arrays
C                               nin            - number of input points
C
C GLOBAL VARIABLES:             clat,clon      - map center lat,lon
C                               cclat,sclat    - cos,sin of center lat
C                               xrnm           - map half width, nm
C                               wmrad          - earth radius, world units
C                               xrad           - screen radius, world units
C                               xoffs, yoffs   - display offset, world units
C
C OUTPUT FILES/PARAMETERS:      x(),y()        - output polyline arrays
C                               nout           - number of output points
C                               invali         - flag for last input point
C                               orhalt         - view point altitude, nm
C                               orhc           - earth center to viewpoint
C                               cosERM         - cos of max value for arc er
C                               radmax         - horizon dist. in proj. plane
C
C SUBROUTINES CALLED:           None.
C
C CALLED BY:                    lltoxy, llplxy
C
C LOCAL VARIABLES:              cosER          - cos of tangency to point arc.
C
C RESTRICTIONS:
C
```

```
C ABNORMAL RETURN CONDITIONS:  Declares points over the horizon invalid.
C                              and places output values on the horizon.
C LOCATION:
C
C PROGRAMMER:                  DATE OF LAST CHANGE   REASON FOR CHANGE
C     DAVE NATION                                    ORIGINAL CODE.
C     JERRY FENERTY                                  DOCUMENTATION AND MO
C                                                    FOR A21 PROTOTYPE.
C     Tom Wescott  (NOSC)      Jan 87                Optimization, add invali.
C     Tom Wescott              Jul 87                Clamp ivalids to horizon.
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine pxpers(plon,plat,nin,x,y,nout)
c
      common /center/ clat,clon,cclat,sclat
      common /pie/ pie,tpie,pio2,pio4
      common /viewp/ xrad,yrad,ixnp,iynp,xc,yc
      common /const/ maxval,rmpv,c,r,ernm
      logical invali,notlst
      common /invali/ invali
      common /proj/ itproj,wmrad,xoffs,yoffs,scalr,notlst
      common /pers/ orhalt,orhc,pconst,cosERM,radmax
      real plat(*), plon(*), x(*), y(*)
      parameter (ALTMAX = 99999.)
c
c
c--------------------- INITIALIZATION SECTION--------------------------
      if (notlst) then
c        Skip calculation of map constants.
      else
         notlst = .true.
c
c        Calculate view point altitude in nm based on wmrad.
         xrnm = ernm*xrad/wmrad
         ermax = xrnm/ernm
         if (ermax.ge.pio2) ermax = pio2 - .00001
         orhalt = ernm/cos(ermax) - ernm
         orhalt = amin1(orhalt,ALTMAX)
c
c        Calculate all map constants based on altitude.
c        Distance from view point to earth center in world units.
         worhal = orhalt*wmrad/ernm
         orhc = wmrad + worhal
         pconst = wmrad*(orhc+wmrad)
c
c        Cosine of center to horizon arc distance.
         cosERM = -wmrad/orhc
c
c        Radius of horizon circle on far side projection plane.
         ahmax = asin(wmrad/orhc)
         radmax = (orhc + wmrad)*(tan(ahmax))
c
c        Scale factor to view full world.
         if (yrad.lt.xrad) then
            scalr = yrad/radmax
         else
            scalr = xrad/radmax
         endif
      endif
c
c---------------------- COMPUTATION SECTION --------------------------
      nout = 0
      do 100 i = 1, nin
c
         invali = .false.
         sinL1 = sin(plat(i))
         cosL1 = cos(plat(i))
         Dlo = plon(i) - clon + pie
         sinDlo = sin(Dlo)
         cosDlo = cos(Dlo)
c
c        Calculate arc distance from center point to point (plon,plat).
         cosER = -sclat*sinL1 + cclat*cosL1*cosDlo
c
```

```
c           Calculate output point on plane of projection.
            const = pconst/(orhc+wmrad*cosER)
            rx = -const*cosL1*sinDlo
            ry = const*(cclat*sinL1+sclat*cosL1*cosDlo)
c
            if (cosER.Gt.cosERM) then
               invali = .true.
c
c              A radial clip is required to properly handle polygons
c              which cross the horizon.  For now, approximate this by
c              moving over the horizon points back to the horizon.
c              This will minimize thru the earth visibility, and
c              artifacts from otherwise unplotted invalid verticies.
c
               radius = sqrt(rx*rx + ry*ry)
               if (radius .ne. 0.0) then
                  rmult = radmax/radius
                  rx = rx*rmult
                  ry = ry*rmult
               else
                  go to 100
               endif
c
            endif
c
c           Apply viewing transformation.
            nout = nout + 1
            x(nout) = rx*scalr + xoffs
            y(nout) = ry*scalr + yoffs
c
 100     continue
c
         return
         end

C+*+*+*+*+*+*+*+*+*+*+*+*+*+*+*+*+*+*+*+*+*+*+*+*+*+*+*+*+*+*+*+*+*|*+*+*+*+
C UNIT NAME:                        PXPOLY
C
C FUNCTIONAL DESCRIPTION:              POLYCONIC PROJECTION INTO X/Y
C                                         Elliptical earth model.
C
C INPUT FILES/PARAMETERS:           plon(), plat() - input polyline arrays
C                                   nin            - number of input points
C
C GLOBAL VARIABLES:                 clat,clon      - map center lat,lon
C                                   wmrad          - earth radius, world units
C                                   xoffs, yoffs   - display offset, world units
C
C OUTPUT FILES/PARAMETERS:          x(),y()        - output polyline arrays
C                                   nout           - number of valid output points
C                                   invali         - flag for last input point
C                                   ap,bp,cp,dp,ep - transformation constants
C
C SUBROUTINES CALLED:               None.
C
C CALLED BY:                         llplxy
C
C LOCAL VARIABLES:                  aaxix          - major axis of spheriod, m
C                                   baxis          - minor axis, m
C
C RESTRICTIONS:                     Initial call must be with:   notlst = .false.
C
C ABNORMAL RETURN CONDITIONS:  Invalid returned for pts. near far pole.
C
C REFERENCE:                        CAM Program Documentation   CIA 1986
C
C PROGRAMMER:                       DATE OF LAST CHANGE     REASON FOR CHANGE
C     Tom Wescott                   Feb 88                  Original entry.
C
C-*-*-*-*-*-*-*-*-*-*-*-*-*-*-*-*-*-*-*-*-*-*-*-*-*-*-*-*-*-*-*-*-*-*|*-*-*-*-

      subroutine PXPOLY(plon,plat,nin,x,y,nout)
c
```

```
      common /pie/ pie,tpie,pio2,pio4
      logical invali,notlst
      common /invali/ invali
      common /proj/ itproj,wmrad,xoffs,yoffs,scalr,notlst
      common /poly/ ap,bp,cp,dp,ep,e2,aaxis,baxis
      common /center/clat,clon,cclat,sclat
      real plat(*), plon(*), x(*), y(*)
c
c-------------------- INITIALIZATION SECTION-------------------------
      if (notlst) then
c        Skip calculation of map constants.
      else
         notlst = .true.
c
c        From Int'l Astronomical Union figure of the earth (1968)
         aaxis = 1.00111887
         baxis = 0.99776226
c
         e2 = (aaxis**2.0-baxis**2.0)/(aaxis**2.0)
         an1 = (aaxis-baxis)/(aaxis+baxis)
         an2 = an1*an1
         an3 = an2*an1
         an4 = an3*an1
         an5 = an4*an1
c
         ap = aaxis*(1.0 - an1 + 5./4.*(an2-an3) + 81./64.*(an4-an5))
         bp = 3.0/2.0*aaxis*(an1 - an2 + 7./8.*(an3-an4) + 55./64.*an5)
         cp = 15./16.*aaxis*(an2 - an3 + 3./4.*(an4-an5))
         dp = 35./48.*aaxis*(an3 - an4 + 11./16.*an5)
         ep = 315./512.*aaxis*(an4 - an5)
c
         scalr = wmrad
      endif
c
c-------------------- COMPUTATIONAL SECTION------------------------
      nout = 0
      do 100 n = 1, nin
c
         invali = .false.
         ptlat = plat(n)
         absLat = abs(plat(n))
         delf = clon - plon(n)
         if (abs(delf).gt.pie) delf = delf - sign(tpie,delf)
         absDel = abs(delf)
         s = (ap*absLat-bp*sin(2.0*absLat)+cp*sin(4.*absLat)
     &         -dp*sin(6.*absLat) + ep*sin(8.*absLat))
         rh = aaxis/(1.0-e2*sin(2.0*absLat))
c
         if (ptlat.ne.0) then
            theta = absDel*sin(absLat)
            xl = rh*cos(absLat)/sin(absLat)
            ry = s + 2.0*xl*(sin(theta/2.0))**2.0
            rx = xl*sin(theta)
         else
            ry = 0.0
            rx = aaxis*absDel
         endif
c
c        Give proper signs to rx and ry.
         rx = -sign(rx,delf)
         ry = sign(ry,ptlat)
c
c        Apply viewing transformation.
         nout = nout + 1
         x(nout) = rx*scalr + xoffs
         y(nout) = ry*scalr + yoffs
c
  100 continue
c
      return
      end
```

```
C+*+*+*+*+*+*+*+*+*+*+*+*+*+*+*+*+*+*+*+*+*+*+*+*+*+*+*+*+*+*+*+*+*+*|*+*+*+*+
C UNIT NAME:                   PXPOST
C
C FUNCTIONAL DESCRIPTION:       POLAR STEREOGRAPHIC PROJECTION INTO X/Y
C                                      Elliptical earth model.
C
C INPUT FILES/PARAMETERS:      plon(), plat() - input polyline arrays
C                              nin            - number of input points
C
C GLOBAL VARIABLES:            clat,clon      - map center lat,lon
C                              wmrad          - earth radius, world units
C                              eccen          - earth eccentricity
C                              xoffs, yoffs   - display offset, world units
C
C OUTPUT FILES/PARAMETERS:     x(),y()        - output polyline arrays
C                              nout           - number of valid output points
C                              invali         - flag for last input point
C
C SUBROUTINES CALLED:          None.
C
C CALLED BY:                   lltoxy, llplxy
C
C LOCAL VARIABLES:             cosER          - cos of arc from cntr to point.
C                              spolat         - sin of near pole latitude.
C
C RESTRICTIONS:                None.
C
C ABNORMAL RETURN CONDITIONS:  Last points > 170 from center flagged invalid.
C
C PROGRAMMER:                  DATE OF LAST CHANGE     REASON FOR CHANGE
C     Tom Wescott  (NOSC)      Jan 87                  Initial entry.
C
C-*-*-*-*-*-*-*-*-*-*-*-*-*-*-*-*-*-*-*-*-*-*-*-*-*-*-*-*-*-*-*-*-*-*-*|*-*-*-*-

      subroutine PXPOST(plon,plat,nin,x,y,nout)
c
      common /center/ clat,clon,cclat,sclat
      logical invali,notlst
      common /invali/ invali
      common /proj/ itproj,wmrad,xoffs,yoffs,scalr,notlst
      real plat(*), plon(*), x(*), y(*)
      parameter (COSHZN = -0.985)
c
c
      if (notlst) then
c        Skip calculation of constants.
      else
         notlst = .true.
         scalr = wmrad
      endif
c
      efactr = 1.0
      nout = 0
      do 100 i = 1, nin
c
         invali = .false.
         sinL1 = sin(plat(i))
         cosL1 = cos(plat(i))
         Dlo = plon(i) - clon
         spolat = sign(1.0,clat)
c
c        Calculate arc from map center to point (plon,plat).
         cosER = spolat*sinL1
c
         if (cosER.le.COSHZN) then
            invali = .true.
         else
c           Calculate output point on plane of projection.
            if (eccen.ne.0.0) then
c              Calculate eccentricity factor.
               esinl = eccen*sinL1
               efactr = ((1.0-esinl)/(1.0+esinl))**(eccen/2.0)
            endif
            const = (2.0*efactr)/(1.0+cosER)
```

```
            rx = const*cosL1*sin(Dlo)
            ry = const*(-spolat*cosL1*cos(Dlo))
c
c           Apply viewing transformation.
            nout = nout + 1
            x(nout) = rx*scalr + xoffs
            y(nout) = ry*scalr + yoffs
         endif
c
 100  continue
c
      return
      end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      PXSINU
C
C FUNCTIONAL DESCRIPTION:             SINUSOIDAL PROJECTION INTO X/Y
C                                        spherical earth model.
C
C INPUT FILES/PARAMETERS:         plon(), plat() - input polyline arrays
C                                 nin            - number of input points
C
C GLOBAL VARIABLES:               clat,clon      - map center lat,lon
C                                 cclat,sclat    - cos,sin of center lat
C                                 pio2           - multiple of pi
C                                 wmrad          - earth radius, world units
C                                 xoffs, yoffs   - display offset, world units
C
C OUTPUT FILES/PARAMETERS:        x(),y()        - output polyline arrays
C                                 nout           - number of valid output points
C                                 invali         - flag for last input point
C
C SUBROUTINES CALLED:             None.
C
C CALLED BY:                      lltoxy, llplxy
C
C LOCAL VARIABLES:                None.
C
C RESTRICTIONS:                   None.
C
C ABNORMAL RETURN CONDITIONS:     Invalid flag set for pts. at poles.
C
C LOCATION:
C
C PROGRAMMER:                     DATE OF LAST CHANGE     REASON FOR CHANGE
C     Tom Wescott  (NOSC)         Jan 87                  Original entry
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine PXSINU(plon,plat,nin,x,y,nout)
c
      common /center/ clat,clon,cclat,sclat
      common /pie/ pie,tpie,pio2,pio4
      logical invali,notlst
      common /invali/ invali
      common /proj/ itproj,wmrad,xoffs,yoffs,scalr,notlst
      real plat(*), plon(*), x(*), y(*)
c
c

      if (notlst) then
c        Skip calculation of map constant.
      else
         notlst = .true.
         scalr = wmrad
      endif
c
      nout = 0
      do 100 i = 1, nin
c
         invali = .false.
         if (abs(plat(i)).gt.pio2) then
            invali = .true.
         else
```

```
            rx = plon(i) - clon
            if (abs(rx).gt.pie) rx = rx - sign(tpie,rx)
            rx = cos(plat(i))*rx
            ry = plat(i) - clat
c
c           Apply viewing transformation.
            nout = nout + 1
            x(nout) = rx*scalr - xoffs
            y(nout) = ry*scalr - yoffs
         endif
c
 100    continue
c
        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     PXSTER
C
C FUNCTIONAL DESCRIPTION:           STEREOGRAPHIC PROJECTION INTO X/Y
C                                         Spherical earth model.
C
C INPUT FILES/PARAMETERS:        plon(), plat() - input polyline arrays
C                                nin            - number of input points
C
C GLOBAL VARIABLES:              clat,clon      - map center lat,lon
C                                cclat,sclat    - cos,sin of center lat
C                                wmrad          - earth radius, world units
C                                xoffs, yoffs   - display offset, world units
C
C OUTPUT FILES/PARAMETERS:       x(),y()        - output polyline arrays
C                                nout           - number of valid output points
C                                invali         - flag for last input point
C
C SUBROUTINES CALLED:            none.
C
C CALLED BY:                     lltoxy, llplxy, blplgn, blplin
C
C LOCAL VARIABLES:               er             - arc from center to point
C
C RESTRICTIONS:                  None.  All input points are converted.
C
C ABNORMAL RETURN CONDITIONS:    Last points > 170 from center flagged invalid.
C                                Points very close to the antipode are nudged.
C LOCATION:
C
C PROGRAMMER:                    DATE OF LAST CHANGE     REASON FOR CHANGE
C     Tom Wescott   (NOSC)       Jan 87                  Initial entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine PXSTER(plon,plat,nin,x,y,nout)
c
        common /center/ clat,clon,cclat,sclat
        logical invali,notlst
        common /invali/ invali
        common /proj/ itproj,wmrad,xoffs,yoffs,scalr,notlst
        real plat(*), plon(*), x(*), y(*)
        parameter (COSHZN = -0.984)
        parameter (ANTIPO = -.999999)
c
c
        if (notlst) then
c          Skip calculation of map constant.
        else
           notlst = .true.
           scalr = wmrad
        endif
c
        nout = 0
        do 100 i = 1, nin
c
```

```
          invali = .false.
          sinL1 = sin(plat(i))
          cosL1 = cos(plat(i))
          Dlo = plon(i)-clon
          sinDlo = sin(Dlo)
          cosDlo = cos(Dlo)
c
c         Calculate arc from map center to point (plon,plat).
          cosER = sclat*sinL1 + cclat*cosL1*cosDlo
          if (cosER .le. COSHZN)  invali = .true.
c
c         Insure that all points can be calculated.
          cosER = amax1(cosER,ANTIPO)
c
c         Calculate output point on plane of projection.
          const = 2.0/(1.0+cosER)
          rx = const*cosL1*sinDlo
          ry = const*(cclat*sinL1-sclat*cosL1*cosDlo)
c
c         Apply viewing transformation.
          nout = nout + 1
          x(nout) = rx*scalr + xoffs
          y(nout) = ry*scalr + yoffs
c
 100    continue
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   PXUTMZ
C
C FUNCTIONAL DESCRIPTION:       UNIVERSAL TRANSVERSE MERCATOR INTO X/Y
C                                    Elliptical earth model.
C
C INPUT FILES/PARAMETERS:      plon(), plat() - input polyline arrays
C                              nin            - number of input points
C
C GLOBAL VARIABLES:            clat,clon      - map center lat,lon
C                              wmrad          - earth radius, world units
C                              xoffs, yoffs   - display offset, world units
C
C OUTPUT FILES/PARAMETERS:     x(),y()        - output polyline arrays
C                              nout           - number of valid output points
C                              invali         - flag for last input point
C                              ap,bp,cp,dp,ep - transformation constants
C
C SUBROUTINES CALLED:          None.
C
C CALLED BY:                    llplxy
C
C LOCAL VARIABLES:             aaxix         - major axis of spheriod, m
C                              baxis         - minor axis, m
C
C RESTRICTIONS:                None.
C
C ABNORMAL RETURN CONDITIONS:  Invalid returned for pts. at new poles.
C
C REFERENCE:                   CAM Program Documentation   CIA 1986
C
C PROGRAMMER:                  DATE OF LAST CHANGE     REASON FOR CHANGE
C     Tom Wescott              Feb 88                  Original entry.
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine PXUTMZ(plon,plat,nin,x,y,nout)
c
      common /pie/ pie,tpie,pio2,pio4
      logical invali,notlst
      common /invali/ invali
      common /proj/ itproj,wmrad,xoffs,yoffs,scalr,notlst
      common /utmz/ ap,bp,cp,dp,ep,e2,ep2,aaxis,baxis,cmerid,zone
      common /center/clat,clon,cclat,sclat
```

```
      real plat(*), plon(*), x(*), y(*)
      parameter (HILAT=1.5709)
c
c
c------------------- INITIALIZATION SECTION------------------------
      if (not1st) then
c        Skip calculation of map constants.
      else
         not1st = .true.
c
c        Calculate UTM zone and its central meridian.
         zwidth = tpie/60.0
         zone = 1.0 + int((clon+pie)/zwidth)
         cmerid = zwidth*(zone-0.5) - pie
c
c        From Int'l Astronomical Union figure of the earth (1968)
         aaxis = 1.00111887
         baxis = 0.99776226
c
         ep2 = (aaxis**2.0-baxis**2.0)/(baxis**2.0)
         e2 = (aaxis**2.0-baxis**2.0)/(aaxis**2.0)
         an1 = (aaxis-baxis)/(aaxis+baxis)
         an2 = an1*an1
         an3 = an2*an1
         an4 = an3*an1
         an5 = an4*an1
c
         ap = aaxis*(1.0 - an1 + 5./4.*(an2-an3) + 81./64.*(an4-an5))
         bp = 3.0/2.0*aaxis*(an1 - an2 + 7./8.*(an3-an4) + 55./64.*an5)
         cp = 15./16.*aaxis*(an2 - an3 + 3./4.*(an4-an5))
         dp = 35./48.*aaxis*(an3 - an4 + 11./16.*an5)
         ep = 315./512.*aaxis*(an4 - an5)
         zkphi = .9996
c
         scalr = wmrad
      endif
c
c------------------- COMPUTATIONAL SECTION------------------------
      nout = 0
      do 100 n = 1, nin
c
         invali = .false.
         delf = cmerid - plon(n)
         if (delf.gt.pie) delf = delf - sign(tpie,delf)
         absDel = abs(delf)
         ptlat = plat(n)
         absLat = abs(ptlat)
c
c        Exact position of poles is too hard to calculate by series.
         absLat = amin1(absLat,HILAT)
c
         if ((absLat.eq.0.0).and.(absDel.eq.pio2)) then
c           Point at a new pole is undefined.
            invali = .true.
         else if (absDel.gt.pio2*1.3) then
c           Problems exist near cmerid + 180.  Until they are resolved...
            invali = .true.
         else
            sinAl = sin(absLat)
            sinAl2 = sinAl*sinAl
            cosAl = cos(absLat)
            cosAl2 = cosAl*cosAl
            cosAl3 = cosAl*cosAl2
            cosAl4 = cosAl*cosAl3
            cosAl5 = cosAl*cosAl4
            tanAl2 = tan(absLat)**2.0
            tanAl4 = tanAl2*tanAl2
c
            s = zkphi*(ap*absLat-bp*sin(2.0*absLat)+cp*sin(4.*absLat)
     +          -dp*sin(6.*absLat)+ep*sin(8.*absLat))
c
            ve = aaxis/sqrt(1.0-e2*sinAl2)
c
            sr = ve/2.0*sinAl*cosAl*zkphi
```

```
c
            st = ve*sinAl*cosAl3*(5.0-tanAl2+9.0*
     +           ep2*cosAl2+4.0*ep2*ep2*cosAl4)*zkphi/24.0
c
            su = ve*cosAl*zkphi
c
            sv = ve/6.0*cosAl3*(1.0-tanAl2+ep2*cosAl2)*zkphi
c
            sa = absDel**6.0/720.0*ve*sinAl*cosAl5*(61.0-58.0*tanAl2
     +           +tanAl4+270.0*ep2*cosAl2-330.0*ep2*sinAl2)*zkphi
c
            sb = absDel**5.0/120.0*ve*cosAl5*(5.0-18.0*tanAl2+tanAl4
     +           +14.0*ep2*cosAl2-58.0*ep2*sinAl2)*zkphi
c
c
            rx = su*absDel + sv*absDel**3.0 + sb
            rx = -sign(rx,delf)
c
            ry = s + sr*absDel**2.0 + st*absDel**4.0 + sa
            ry = sign(ry,ptlat)
c
c           Apply viewing transformation.
            nout = nout + 1
            x(nout) = rx*scalr + xoffs
            y(nout) = ry*scalr + yoffs
         endif
c
 100  continue
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        PXVDGN
C
C FUNCTIONAL DESCRIPTION:             VAN DER GRINTEN I PROJECTION INTO X/Y
C                                        spherical earth model.
C
C INPUT FILES/PARAMETERS:           plon(), plat() - input polyline arrays
C                                   nin            - number of input points
C
C GLOBAL VARIABLES:                 clat,clon      - map center lat,lon
C                                   cclat,sclat    - cos,sin of center lat
C                                   pio2           - multiple of pi
C                                   wmrad          - earth radius, world units
C                                   xoffs, yoffs   - display offset, world units
C
C OUTPUT FILES/PARAMETERS:          x(),y()        - output polyline arrays
C                                   nout           - number of valid output points
C                                   invali         - flag for last input point
C
C SUBROUTINES CALLED:               None.
C
C CALLED BY:                        lltoxy, llplxy
C
C LOCAL VARIABLES:                  None.
C
C RESTRICTIONS:                     None.
C
C ABNORMAL RETURN CONDITIONS:       Invalid flag set for pts. at poles.
C
C REFERENCE:                        NOAA/USGS map projection package   version 1.0.2
C
C PROGRAMMER:                       DATE OF LAST CHANGE      REASON FOR CHANGE
C     Tom Wescott   (NOSC)          Jun 89                   Original entry
C
C-*-*-*-*-*-*-*-*-*-*-*-*-*-*-*-*-*-*-*-*-*-*-*-*-*-*-*-*-*-*-*-*-*-*-*-*-*-*|*-*-*-*-
c       not in 3.0, not yet used in 3.1
CTESTING       subroutine pxsinu(plon,plat,nin,x,y,nout)
        subroutine pxvdgn(plon,plat,nin,x,y,nout)
c
        common /center/ clat,clon,cclat,sclat
        common /pie/ pie,tpie,pio2,pio4
        logical invali,notlst
```

```
      common /invali/ invali
      common /proj/ itproj,wmrad,xoffs,yoffs,scalr,notlst
      real plat(*), plon(*), x(*), y(*)
      real lat,lon,m,m2
c
      parameter(SAFETY = 1.0E-5, EQTORL = 1.0E-2)
c
      if (notlst) then
c        Skip calculation of map constant.
      else
         notlst = .true.
         scalr = wmrad
      endif
c
      nout = 0
      do 100 i = 1, nin
c
         invali = .false.
         lat = plat(i)
         lon = plon(i) - clon
         if (abs(lon).gt.pie) lon = lon - sign(tpie,lon)

         if (abs(plat(i)).gt.pio2) then
            invali = .true.
         else
            theta = asin(abs(lat/pio2))
            if (abs(plat(i)).lt.EQTORL) then
c              Near equatorial case, use rectangular approximation.
               rx =  lon
               ry =  lat
            else if ((abs(lon).lt.SAFETY).or.
     +          ((pio2-abs(lat)).lt.SAFETY)) then
c              Central meridian case, use Tom's guess approximation.
               rx = lon * (cos(lat))**.33
               ry = pie  * sign(tan(0.5*theta),lat)
            else
c              Ordinary case.
               al = .5 * abs(pie/lon - lon/pie)
               a2 = al * al
               sinTHT = sin(theta)
               cosTHT = cos(theta)
               g = cosTHT/(sinTHT + cosTHT - 1.0)
               g2 = g * g
               m = g * (2.0/sinTHT - 1)
               m2 = m * m
               square = abs(a2*(g-m2)**2 - (m2+a2)*(g2-m2))
               con = pie * (al * (g-m2) + sqrt(square)) / (m2+a2)
               rx = sign(con,lon)
               con = abs(con/pie)
               square = abs(1.0 - con*con - 2.0*al*con)
               ry = sign(pie*sqrt(square),lat)
            endif
c
c           Apply viewing transformation.
            nout = nout + 1
            x(nout) = rx*scalr - xoffs
            y(nout) = ry*scalr - yoffs
         endif
c
 100  continue
c
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                   RNGRIN
C
C FUNCTIONAL DESCRIPTION:      Draws range rings/radials about selected point.
C
C INPUT FILES/PARAMETERS:      rrlon,rrlat - center lon,lat
C                              ixrnm       - range (radius) in nm
C                              nrings      - # rings
C                              nlines      - # radial lines
```

```
C
C GLOBAL VARIABLES:           None.
C
C OUTPUT FILES/PARAMETERS:    Graphic segment.
C
C SUBROUTINES CALLED:
C
C CALLED BY:                  ranger
C
C LOCAL VARIABLES:
C
C RESTRICTIONS:               Currently does not redraw like other overlays
C                             as ring data are not saved in parameter file.
C
C PROGRAMMER:                 DATE OF LAST CHANGE     REASON FOR CHANGE
C     Tom Wescott (NOSC)      Jul 88                  Original entry.
C     L. McCleary (NOSC)      Mar 89                  Seperate routine
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine  rngrin (rrlon,rrlat,ixrnm,nrings,nlines)

      logical first
      common /pie/ pie,tpie,pio2,pio4
      common /viewp/ xrad,yrad,ixnp,iynp,xc,yc

      parameter (MAXPTS = 361)
      real plon(MAXPTS),plat(MAXPTS)

      data rrincr/.01745329/

c     User input is in nm, convert to radians.
      rrincr = ixrnm*(1./60.)*(pie/180.)

c     Draw the range rings.
      rngmax = amin1(pie,nrings*rrincr)
      lastrr = rngmax/rrincr + 0.5
      do 500 irng = 1, lastrr
         rngrad = irng * rrincr
c
c        Test ring radius a few places and calculate central
c        angle that keeps cord to arc distance below map resolution.
         radius = 0.0
         do 200 itest = 0, 3
            tstaz = pio4*(itest) + .001
            call da2ll(rrlat,rrlon,rngrad,tstaz,rtlat,rtlon)
            call llplxy(rtlon,rtlat,1,rtx,rty,nout)
            tstrad = sqrt((rrx-rtx)**2.+(rry-rty)**2.)
            radius = amax1(tstrad,radius)
 200     continue
c
         resolu = .001*xrad
         arg = 1.0 - resolu/radius
         if (abs(arg).gt.1.0) arg = sign(1.0,arg)
         deltaz = acos(arg)
         deltaz = amax1(deltaz,tpie/360.)
         deltaz = amin1(deltaz,tpie/8.)
c
         npts = 1.0 + tpie/deltaz
         azincr = tpie/(npts-1)

         ipt = 1
         first = .true.
         do 400 i = 1, npts
            az = (i + 0.6) * azincr
            call da2ll(rrlat,rrlon,rngrad,az,plat(ipt),plon(ipt))
            dlo = abs(plon(ipt)-prevlo)
            if((dlo.gt.pie*.1).and.(dlo.lt.pie*1.9).and.
     +         (.not.first))then
c              Crossed near a pole where with several projections, higher point
c              density is reqd.   To avoid artifacts, process ring in sections.
               call blplin(plon,plat,ipt-1)
               plat(1) = plat(ipt)
               plon(1) = plon(ipt)
```

```
            ipt = 1
            first = .true.
         else
            first = .false.
         endif
         prevlo = plon(ipt)
         ipt = ipt + 1
         if (ipt.gt.maxpts) go to 401
 400     continue
 401     continue
         call blplin(plon,plat,ipt-1)
 500  continue
c
c     Draw a few polylines along lines of bearing.
      dincr = pie/90.0
      dincr = amin1(dincr,0.5*rrincr)
      rngmax = (nrings + 1) * rrincr - dincr
      rngmax = amin1(rngmax,pie)
      do 700 line = 1, nlines
         az = line * tpie/nlines
         npts = rngmax/dincr + 0.5
         ipt = 1
         first = .true.
         do 600 i = 1, npts
            dist = i * dincr
            call da2ll(rrlat,rrlon,dist,az,plat(ipt),plon(ipt))
            dlo = abs(plon(ipt)-prevlo)
            if((dlo.gt.pie*.1).and.(dlo.lt.pie*1.9).and.
     +         (.not.first))then
c              Crossed near a pole.  Process line of bearing in sections.
               call blplin(plon,plat,ipt-1)
               plat(1) = plat(ipt)
               plon(1) = plon(ipt)
               ipt = 1
               first = .true.
            else
               first = .false.
            endif
            prevlo = plon(ipt)
            ipt = ipt + 1
            if (ipt.gt.maxpts) go to 601
 600     continue
 601     continue
         call blplin(plon,plat,ipt-1)

 700  continue

      return
      end


C+*+*+*+*+*+*+*+*+*+*+*+*+*+*+*+*+*+*+*+*+*+*+*+*+*+*+*+*+*+*+*+*+*+*|*+*+*+*+
C UNIT NAME:                   SPGCVX
C
C FUNCTIONAL DESCRIPTION:   Test for convex property in spherical polygons.
C
C INPUT FILES/PARAMETERS:   plo, pla  - Vertex coordinate arrays, lon,lat.
C                           plen      - Number of verticies.
C
C OUTPUT FILES/PARAMETERS:  convex    - Returned true if polygon is convex.
C
C SUBROUTINES CALLED:       ll2da.
C
C RESTRICTIONS:             Polygons must span less than one hemisphere.
C
C PROGRAMMER:               DATE OF LAST CHANGE    REASON FOR CHANGE
C     Tom Wescott (NOSC)    Feb 89                 Original entry.
C
C-*-*-*-*-*-*-*-*-*-*-*-*-*-*-*-*-*-*-*-*-*-*-*-*-*-*-*-*-*-*-*-*-*-*-*|*-*-*-*-
c       not in 3.0, not yet used in 3.1
      subroutine spgcvx(plo,pla,plen,convex)
C
      common /pie/ pie,tpie,pio2,pio4
      integer plen
      real plo(plen),pla(plen)
      logical convex
```

```
C
C      pie = 2.0*acos(0.0)                                       !_TESTING
C      tpie = 2.0*pie                                            !_TESTING
      convex = .true.
      if (plen.le.3) return
      hemi = 0.0
C
      do 200 n = 1, plen
         i = n+1
         if (i.gt.plen) i = 1
C
C        Define hemispheres by great circle from vertex n to vertex i.
         call ll2da(pla(n),plo(n),pla(i),plo(i),dist,az1,rng,bear)
         if (dist.gt.0.0) then
C
            do 100 jj = i+1, i+plen-1
               j = jj
               if (j.gt.plen) j = j-plen
C
               call ll2da(pla(n),plo(n),pla(j),plo(j),dist,az2,rng,bear)
               if (dist.ne.0.0) then
                  azrel = az2 - az1
                  if (abs(azrel).gt.pie) azrel = azrel-sign(tpie,azrel)
                  if (azrel.ne.0.0) then
C
                     if (hemi.eq.0.0) then
C                       Init hemisphere by first point.
                        hemi = sign(1.0,azrel)
                     else
C                       Look for any point in opposite hemisphere.
                        hhemi = sign(1.0,azrel)
                        if (hhemi.ne.hemi) then
                           convex = .false.
                           RETURN
                        endif
                     endif
C
                  endif
               endif
 100        continue
         endif
 200  continue
C
      return
      end


C+*+*+*+*+*+*+*+*+*+*+*+*+*+*+*+*+*+*+*+*+*+*+*+*+*+*+*+*+*+*+*+*+*+*|*+*+*+*+
C UNIT NAME:                  SPGINT
C
C FUNCTIONAL DESCRIPTION:     Flags the intersection of two spherical polygons
C                             by looking for intersection between great circle
C                             segments of one polygon and those of the other.
C                             If none found, it checks for containment.
C
C INPUT FILES/PARAMETERS:     xlo(),yla()  - Polygon #1. (lon,lat), radians.
C                             ulo(),vla()  - Polygon #2.     "         "
C                             nvrt1,nvrt2  - Number of verticies in polygons.
C
C OUTPUT FILES/PARAMETERS:    isect        - .true. if intersection exists.
C
C SUBROUTINES CALLED:         ll2da, spgtst
C
C LOCAL VARIABLES:            H1,H2..      - Sign of Hn identifies half sphere
C                                            containing pt. n.   Half sphere is
C                                            defined (+/-) as (L/R) of a directed
C                                            great circle segment.
C RESTRICTIONS:               None.
C
C PROGRAMMER:                 DATE OF LAST CHANGE     REASON FOR CHANGE
C     Tom Wescott (NOSC)      Feb 89                  Original code.
C
C-*-*-*-*-*-*-*-*-*-*-*-*-*-*-*-*-*-*-*-*-*-*-*-*-*-*-*-*-*-*-*-*-*-*|*-*-*-*-
c       not in 3.0, not yet used in 3.1
      subroutine spgint(xlo,yla,nvrt1,ulo,vla,nvrt2,isect)
```

```
C
      real xlo(nvrt1),yla(nvrt1), ulo(nvrt2),vla(nvrt2)
      logical isect,inside
C
      pie = 2.0*acos(0.0)
      tpie = 2.0*pie
      isect = .true.
      H1 = 0.
C
      do 500 i = 1, nvrt1
         inxt = i + 1
         if (inxt.gt.nvrt1) inxt = 1
C
C        Azimuth (az0) of line segment i to inxt to defines half spheres.
         call ll2da(yla(i),xlo(i),yla(inxt),xlo(inxt),dist,az0,rng,bear)
C
C        Avoid processing of coincident sequential verticies.
         if (dist.le.0.0) go to 500
C
         do 400 j = 0, nvrt2
            jnxt = j + 1
            if (jnxt.gt.nvrt2) jnxt = 1
C
C           Find half sphere of the point jnxt of polygon 2.
            call ll2da(yla(i),xlo(i),vla(jnxt),ulo(jnxt),dst,azjnxt,r,b)
C
            if (dist.le.0.0) RETURN
            deltaz = azjnxt-az0
            if (abs(deltaz).gt.pie) deltaz = deltaz-sign(tpie,deltaz)
            H2 = sign(1.0,deltaz)
C
C           Did j to jnxt segment of polygon2 cross between half spheres?
            if ((H1.ne.H2).and.(jnxt.gt.1)) then
C
C              Intersection will be proven if segment of polygon 1 crosses
C              between half spheres defined by the segment of polygon 2.
               call ll2da(vla(j),ulo(j),vla(jnxt),ulo(jnxt),d,az20,r,b)
C
               call ll2da(vla(j),ulo(j),yla(i),xlo(i),d,az21,r,b)
               deltaz = az21-az20
               if (abs(deltaz).gt.pie) deltaz = deltaz-sign(tpie,deltaz)
               H21 = sign(1.0,deltaz)
C
               call ll2da(vla(j),ulo(j),yla(inxt),xlo(inxt),d,az22,r,b)
               deltaz = az22-az20
               if (abs(deltaz).gt.pie) deltaz = deltaz-sign(tpie,deltaz)
               H22 = sign(1.0,deltaz)

               if (H21.ne.H22) RETURN
            endif
C
            H1 = H2
 400     continue
C
 500  continue
C
C     If we haven't returned by now the polygon segments don't intersect.
C     Any polygon point inside the alternate polygon proves containment.
C
      call spgtst(xlo,yla,nvrt1,ulo(1),vla(1),inside,area)
      if (inside) RETURN
C
      call spgtst(ulo,vla,nvrt2,xlo(1),yla(1),inside,area)
      if (inside) RETURN
C
      isect = .false.
      return
      end


C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                SPGRAD
C
C FUNCTIONAL DESCRIPTION:   Uses iteration to find the radius and center point
C                           for minumum bounding circle of a spherical polygon.
```

```
C
C INPUT FILES/PARAMETERS:    plat,plon  - Polygon vertex arrays, radians.
C                            nvrts      - # of verticies
C
C OUTPUT FILES/PARAMETERS:   radius     - Containment arc, radians
C                            cla,clo    - lat,lon of center, radians
C
C SUBROUTINES CALLED:        ll2da, da2ll
C
C LOCAL VARIABLES:           CONVRG     - Parameter determining the speed and
C                                         accuracy of convergence.  Use .7 to .99
C RESTRICTIONS:              None.
C
C PROGRAMMER:                DATE OF LAST CHANGE     REASON FOR CHANGE
C     Tom Wescott (NOSC)     Feb 89                  Original code.
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-
c       not in 3.0, not yet used in 3.1
      subroutine spgrad(plon,plat,nvrts,radius,clo,cla)
C
      parameter (MAXIT = 1000)
      parameter (TOLER = .0001)
      parameter (CONVRG = .9)
      real plon(nvrts),plat(nvrts)
C
      clo = plon(1)
      cla = plat(1)
      do 300 iter = 1, MAXIT
         radius = 0.0
C        Find distance and azimuth to vertex farthest from center pt. guess.
         do 100 i = 1, nvrts
            call ll2da(cla,clo,plat(i),plon(i),dst,az,range,bering)
            if (dst.gt.radius) then
               radius = dst
               azim = az
            endif
 100     continue
C
C        Apply a correction in direction azim.
         prevlo = clo
         prevla = cla
         if (iter.eq.1) rjump = radius
         rjump = CONVRG*rjump
         call da2ll(prevla,prevlo,rjump,azim,cla,clo)
c
         if (rjump.lt.TOLER) go to 900
 300  continue
C
 900  continue
c
      return
      end


C++++++++++++++++++++++++++++++++++++++++++++++++++++++++++++++++++++++++++++|*+*+*+*+
C UNIT NAME:                SPGTST
C
C FUNCTIONAL DESCRIPTION:   Spherical polygon utility.
C                           1)  Tests for point being inside the smaller of the
C                               two regions defined by a spherical polygon.
C                           2)  Computes area of the smaller region.
C                           3)  Sign of area identifies direction of traversal
C                               (+cw/-ccw) about the smaller region.
C
C INPUT FILES/PARAMETERS:   vlo, vla  - Vertex coordinate arrays, lon,lat.
C                           n         - Number of verticies.
C                           plo,pla   - Point to be tested.
C
C GLOBAL VARIABLES:         None.
C
C OUTPUT FILES/PARAMETERS:  inside    - Returned true if point is inside.
C                                       (Internally reflexed areas are inside).
C                                       (border points inside smaller region).
C                           area      - Polygon area on unit sphere, radians.
```

```
C
C SUBROUTINES CALLED:       ll2da.
C
C RESTRICTIONS:             None.
C
C PROGRAMMER:               DATE OF LAST CHANGE     REASON FOR CHANGE
C     Tom Wescott (NOSC)    Feb 89                  Original entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-
c       not in 3.0
      subroutine spgtst(vlo,vla,n,plo,pla,inside,area)
C
      logical inside
      parameter (COINCI = 1.0E-5)
      dimension vlo(n),vla(n)

CD     write(*,*) 'SPGTST... test point lon,lat = ',plo,pla
CD     write(*,'(5(1X,F6.3))') (vlo(j),j=1,n)
CD     write(*,'(5(1X,F6.3))') (vla(j),j=1,n)
CD     write(*,*)
C
      pie = 2.0*acos(0.0)
      tpie = 2.0*pie
      totang = 0.0
      totare = 0.0
C
      do 200 lst = 0, n
         i = lst + 1
         if (i.gt.n) i = 1
C
C        Get azimuth and its reciprocal from test point to i-th vertex.
         call ll2da(pla,plo,vla(i),vlo(i),dist,azT2V,range,bering)
         call ll2da(vla(i),vlo(i),pla,plo,dist,azV2T,range,bering)
C        When points are coincident, must flip defined azimuth for reciprocal !
         if (dist.le.COINCI) azV2T = azT2V - sign(pie,azT2V)
C
         if (lst.gt.0) then
C           Totalize angle at test point angle between last and i-th verticies.
            angleT = azT2V - azT2L
            if (abs(angleT).gt.pie) angleT = angleT - sign(tpie,angleT)
            totang = totang + angleT
C
C           Get azimuth and its reciprocal from i-th vertex to last vertex.
            call ll2da(vla(i),vlo(i),vla(lst),vlo(lst),dist,azV2L,rng,b)
            call ll2da(vla(lst),vlo(lst),vla(i),vlo(i),dist,azL2V,rng,b)
            if (dist.le.COINCI) azL2V = azV2L - sign(pie,azV2L)
C
C           Calculate area of triangle TVL via its spherical excess.  Totalize.
            angleV = azV2L - azV2T
            if (abs(angleV).gt.pie) angleV = angleV - sign(tpie,angleV)
            angleL = azL2V - azL2T
            if (abs(angleL).gt.pie) angleL = angleL - sign(tpie,angleL)
            area = abs(angleT) + abs(angleV) + abs(angleL) - pie
            totare = totare + sign(area,angleT)
C
CD             WRITE(*,*)'AR,AN,TAR,TAN =',AREA,ANGLET,TOTARE,TOTANG
         endif
C
         azT2L = azT2V
         azL2T = azV2T
 200  continue
C
      area = totare
      inside = .true.
      if (abs(totang).lt.pie) inside = .false.
C
C     Reverse the results for polygons covering more than a half sphere.
      if (abs(totare).gt.tpie) then
         inside = .not.(inside)
         area = area - sign(4.0*pie,area)
      endif
C
CD     WRITE(*,*)'inside = ',inside,'  smaller area = ',area
      return
      end
```

```
C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    XPAZEA
C
C FUNCTIONAL DESCRIPTION:       (X,Y) TO (LON,LAT) FOR AZIMUTHAL EQUAL AREA
C                                   Spherical earth model.
C
C INPUT FILES/PARAMETERS:       x,y          - map coordinates.
C
C GLOBAL VARIABLES :            clon, clat   - map center.
C                               scalr        - Map scale factor.
C                               xoffs, yoffs - display offset, world units.
C
C OUTPUT FILES/PARAMETERS:      plat, plon   - geographic coordinates.
C                               invali       - Set true when pt. is off the
C                                              earth or at the antipode.
C
C SUBROUTINES CALLED:           da2ll
C
C CALLED BY:                    xytoll
C
C LOCAL VARIABLES:              az    - Azimuth of pt. x,y from map center.
C                               er    - Arc distance from map center to x,y.
C
C RESTRICTIONS:                 None.
C
C ABNORMAL RETURN CONDITIONS:   None.
C
C PROGRAMMER:                   DATE OF LAST CHANGE      REASON FOR CHANGE
C     Tom Wescott (NOSC)        Jan 87                   Initial entry.
C
C-*-*-*-*-*-*-*-*-*-*-*-*-*-*-*-*-*-*-*-*-*-*-*-*-*-*-*-*-*-*-*-*-*-*-*|*-*-*-*-
      subroutine xpazea(x,y,plon,plat)
c
      common /center/ clat,clon,cclat,sclat
      common /pie/ pie,tpie,poi2,pio4
      logical notlst,invali
      common /proj/ itproj,wmrad,xoffs,yoffs,scalr,notlst
      common /invali/ invali
c
c     Invert the viewing transformation.
      dx = (x-xoffs)/scalr
      dy = (y-yoffs)/scalr
c
c     Compute azimuth from map center.
      if ((dx.ne.0.0).or.(dy.ne.0.0)) az = atan2(dx,dy)
c
c     Compute arc distance from map center.
      ro2 = (sqrt(dx*dx+dy*dy))/2.0
      invali = .false.
      if (ro2.ge.1.0) then
c        Point is off the map.
         invali = .true.
      else
         er = 2.0*asin(ro2)
c        Convert to lat, lon
         call da2ll(clat,clon,er,az,plat,plon)
      endif
c
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    XPAZED
C
C FUNCTIONAL DESCRIPTION:       (X,Y) TO (LON,LAT) FOR AZIMUTHAL EQUIDISTANT
C                                   Spherical earth model.
C
C INPUT FILES/PARAMETERS:       x,y          - map coordinates.
C
C GLOBAL VARIABLES :            clon, clat   - map center.
C                               scalr        - Map scale factor.
C                               xoffs, yoffs - display offset, world units.
C
C OUTPUT FILES/PARAMETERS:      plat, plon   - geographic coordinates.
C                               invali       - Set true when pt. is off the
C                                              earth or at the antipode.
```

```
C
C SUBROUTINES CALLED:          da2ll
C
C CALLED BY:                   xytoll
C
C LOCAL VARIABLES:             az    - Azimuth of pt. x,y from map center.
C                              er    - Arc distance from map center to x,y.
C
C RESTRICTIONS:                None.
C
C ABNORMAL RETURN CONDITIONS:  None.
C
C PROGRAMMER:                  DATE OF LAST CHANGE        REASON FOR CHANGE
C     Tom Wescott (NOSC)       Jan 87                     Initial entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-
      subroutine xpazed(x,y,plon,plat)
c
      common /center/ clat,clon,cclat,sclat
      common /pie/ pie,tpie,poi2,pio4
      logical notlst,invali
      common /proj/ itproj,wmrad,xoffs,yoffs,scalr,notlst
      common /invali/ invali
c
c     Invert the viewing transformation.
      dx = (x-xoffs)/scalr
      dy = (y-yoffs)/scalr
c
c     Compute azimuth from map center.
      if ((dx.ne.0.0).or.(dy.ne.0.0)) az = atan2(dx,dy)
c
c     Compute arc distance from map center.
      er = sqrt(dx*dx+dy*dy)
c
      invali = .false.
      if (er .ge. pie) then
c        Point is off the map.
         invali = .true.
      else
c        Convert to lat, lon
         call da2ll(clat,clon,er,az,plat,plon)
      endif
c
      return
      end


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                 xpgenr
C
C FUNCTIONAL DESCRIPTION:    GENERIC CONVERSION OF (X,Y) TO (LON,LAT)
C                            Solves a 2x2 system of nonlinear mapping
C                            equations to convert xy to ll on any well
C                            behaved projection.
C
C INPUT FILES/PARAMETERS:    xmap, ymap      - point on a map
C
C GLOBAL VARIABLES:          clat,clon       - map center lat,lon
C
C OUTPUT FILES/PARAMETERS:   plon(), plat()  - geographic location of input point
C                            invali          - flag for bad input point
C
C SUBROUTINES CALLED:        nrsyst
C
C CALLED BY:                 xytoll
C
C LOCAL VARIABLES:           x(n)            - array of output coords.
C                            f(n)            - array of function values.
C                            XTOL            - iteration tolerance for ll
C                            FTOL            - tolerance for map position
C                            DELTA           - small dist for partial calc.
C                            MAXIT           - max # of iterations
C                            N               - number of eqtns in system
C                            i               - solution status & debug switch
```

```
C
C RESTRICTIONS:               Method will fail to locate a valid point if
C                             iteration wanders out of the range of the
C                             lltoxy functions (possible with gnomonic).
C
C
C ABNORMAL RETURN CONDITIONS:  invali = .true. if the method fails to converge.
C                              This happens when x,y is off the map.
C
C LOCATION:
C
C PROGRAMMER:                 DATE OF LAST CHANGE     REASON FOR CHANGE
C
C     Tom Wescott  (NOSC)     Aug 87                  Original entry
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine xpgenr(xmap,ymap,plon,plat)
c
      real x(2),f(2),delta,xtol,ftol
      integer maxit,n,i
      external nrfcn
      logical invali
      common /invali/ invali
      common /xymap/ projx,projy,xytol,ftol,delta
      common /center/ clat,clon,cclat,sclat
      common /pie/ pie,tpie,pio2,pio4
      real xmin(10),xmax(10),chgmax(10)
      common /domain/ xmin, xmax, chgmax
c
c     Set iteration tolerance for system solution, function values, and
c     the perturbation distance used to estimate partial derivatives.
      MAXIT = 30
      N = 2
      XTOL = .00005
      FTOL = .0001
      DELTA = 0.003
c
c     Set domain.  Allow Lon iteration to cross dateline or conic break.
      xmin(1) = clon - tpie
      xmax(1) = clon + tpie
c     Dont allow Lat to iterate quite all the way to a pole.
      xmin(2) = -pio2 + 0.4*FTOL
      xmax(2) = +pio2 - 0.4*FTOL
c     Restrict maximum change per iteration to avoid wild jumps.
      chgmax(1) = 0.025 * (xmax(1)-xmin(1))
      chgmax(2) = 0.100 * (xmax(2)-xmin(2))
c
c     Set status var for debug.  (i = 0 prints progress of iteration ).
      i = 10
c
 100  continue
      projx = xmap
      projy = ymap
      xytol = xtol
      invali = .false.
c
c     Set initial guess at map center.
      x(1) = clon
      x(2) = clat
      if (x(2) .lt. xmin(2)) x(2) = xmin(2)
      if (x(2) .gt. xmax(2)) x(2) = xmax(2)
c
c     Solve the system of nonlinear mapping equations.
      call nrsyst(nrfcn,N,MAXIT,x,f,DELTA,XTOL,FTOL,i)
c
      if (i .lt. 0) then
         invali = .true.
CC          write(*,*)'xpgenr... Solution invalid,  nrsyst status = ',i
      else
         plon = x(1)
         plat = x(2)
c        Insure solution coordinates are in the normal lon,lat range.
```

```
101       if((abs(plon) .gt. pie) .or. (abs(plat) .gt. pio2)) then
             if(abs(plon) .gt. pie) plon = plon - sign(tpie,plon)
             if(abs(plat) .gt. pio2) then
                plat = sign(pie,plat) - plat
                plon = plon - sign(pie,plon)
             endif
             go to 101
          endif
       endif
c
       return
       end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      XPGNOM
C
C FUNCTIONAL DESCRIPTION:         GNOMONIC PROJ.  (X,Y) TO (LON,LAT)
C                                       Spherical earth model
C
C INPUT FILES/PARAMETERS:         x,y             - map coordinates
C
C GLOBAL VARIABLES :              clat, clon      - map center
C                                 wmrad           - earth radius, world units
C                                 xoffs, yoffs    - display offset, world units
C
C OUTPUT FILES/PARAMETERS:        lat, lon        - geographic coordinates
C
C SUBROUTINES CALLED:             da2ll
C
C CALLED BY:                      bl2ll,xytoll
C
C LOCAL VARIABLES:                None.
C
C RESTRICTIONS:                   None.  All points converted.
C
C PROGRAMMER:                 DATE OF LAST CHANGE       REASON FOR CHANGE
C     Tom Wescott (NOSC)      Jan 87                    Initial entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine xpgnom(x,y,plon,plat)
c
        common /center/ clat,clon,cclat,sclat
        logical notlst
        common /proj/ itproj,wmrad,xoffs,yoffs,scalr,notlst
c
c       Invert the viewing transformation.
        dx = (x-xoffs)/scalr
        dy = (y-yoffs)/scalr
c
c       Compute azimuth from map center.
        if ((dx.ne.0.0).or.(dy.ne.0.0))  az = atan2(dx,dy)
c
c       Compute arc distance for gnomonic projection.
        r = sqrt(dx*dx+dy*dy)
        er = atan(r)
c
c       Convert to lat,lon.
        call da2ll(clat,clon,er,az,plat,plon)
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      XPSTER
C
C FUNCTIONAL DESCRIPTION:         STEREOGRAPHIC PROJ.  (X,Y) TO (LON,LAT)
C                                         Spherical earth model
C
C INPUT FILES/PARAMETERS:         x,y             - map coordinates
C
C GLOBAL VARIABLES :              clat, clon      - map center
```

```
C                                wmrad           - earth radius, world units
C                                xoffs, yoffs    - display offset, world units
C
C OUTPUT FILES/PARAMETERS:       lat, lon        - geographic coordinates
C
C SUBROUTINES CALLED:            da2ll
C
C CALLED BY:                     bl2ll,xytoll
C
C LOCAL VARIABLES:               None.
C
C RESTRICTIONS:                  None.  All points are converted.
C
C ABNORMAL RETURN CONDITIONS:    None.
C
C PROGRAMMER:                 DATE OF LAST CHANGE       REASON FOR CHANGE
C     Tom Wescott (NOSC)      Jan 87                    Initial entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine XPSTER(x,y,plon,plat)
c
      common /center/ clat,clon,cclat,sclat
      logical notlst
      common /proj/ itproj,wmrad,xoffs,yoffs,scalr,notlst
c
c     Invert the viewing transformation.
      dx = (x-xoffs)/scalr
      dy = (y-yoffs)/scalr
c
c     Compute azimuth from map center.
      if ((dx.ne.0.0).or.(dy.ne.0.0)) az = atan2(dx,dy)
c
c     Compute arc distance for stereographic projection.
      r = sqrt(dx*dx+dy*dy)
      er = 2.0*atan(r/2.0)
c
c     Convert to lat,lon.
      call da2ll(clat,clon,er,az,plat,plon)
c
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      XYTOLL
C
C FUNCTIONAL DESCRIPTION:         Convert screen location to geographic coords.
C
C INPUT FILES/PARAMETERS:         (x,y)       - Display coordinates.
C
C GLOBAL VARIABLES:               itproj      - Projection ID#.
C
C OUTPUT FILES/PARAMETERS:        (lon,lat)   - Geographic coordinates.
C                                 invali      - Flag for bad input.
C
C SUBROUTINES CALLED:             xp????      - Inverse mapping routines.
C
C CALLED BY:                      The multitudes.
C
C LOCAL VARIABLES:                None.
C
C RESTRICTIONS:                   None.
C
C ABNORMAL RETURN CONDITIONS:     Invalid set if input point is off the map.
C
C PROGRAMMER:                     DATE OF LAST CHANGE     REASON FOR CHANGE
C     DAVE NATION                                         ORIGINAL CODE.
C     Tom Wescott   (NOSC)        10/87                   Add generic capability.
C                                 OCT 88
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
    subroutine XYTOLL(x,y,plat,plon)
c
```

```
      common /pie/ pie,tpie,pio2,pio4
      logical invali,notlst
      common /invali/ invali
      common /proj/ itproj,wmrad,xoffs,yoffs,scalr,notlst
c
c
      invali = .false.
*------------------------------------------------------------------|--+
* Itproj:  1  2  3  4  5  6  7  8  9 10 11 12 13 14 15 16 17 18 19 20 21  |
*---------------------------------------------------------------------+
*          g  o  o  o  p  e  m  l  a  a  a  k  m  o  p  p  u  s  s       |
*          n  r  r  r  e  q  e  a  l  z  z  a  i  b  o  o  t  i  t       |
*          o  e  p  t  r  r  r  m  b  e  e  v  l  l  s  l  m  n  e       |
*          m  q  o  h  s  e  c  c  r  a  d  r  l  m  t  y  z  u  r       |
*---------------------------------------------------------------------+
      goto(1,99,99,99,99,99,99,99,99,10,11,99,99,99,99,99,99,99,19
     +    )itproj
c
c          Generic iterative method works for all well behaved projections.
 99        call xpgenr(x,y,plon,plat)
           go to 900
c
c          Proj. #1  Gnomonic
c          Explicit inverse avoids iteration problems in limited domain.
 1         call xpgnom(x,y,plon,plat)
           go to 900
c
c          Proj. #10  Azimuthal Equal Area
c          Has convergence problems.
 10        call xpazea(x,y,plon,plat)
           go to 900
c
c          Proj. #11  Azimuthal Equidistant
c          Has convergence problems.
 11        call xpazed(x,y,plon,plat)
           go to 900
c
c          Proj. #19  Stereographic
c          Explicit inverse required for efficient breakline clipping.
 19        call xpster(x,y,plon,plat)
           go to 900
c
 900   continue
c
       return
       end

C+*+*+*+*+*+*+*+*+*+*+*+*+*+*+*+*+*+*+*+*+*+*+*+*+*+*+*+*+*+*+*+*+*+*|*+*+*+*+*+
C UNIT NAME:                          carmaxdim.inc
C
C FUNCTIONAL DESCRIPTION:       INCLUDE FILE FOR MAX DIMENSIONS
C
C       MAXV    -       max vertices per polygon on input from data
C                       = 5000 for wdbiia-wdbiif
C                       = 1200 for wdbiib-wdbiif
C       MXVOUT  -       max vertices per polygon on output to device driver
C                       = 1200 on VAX DI-3000
C                       = 1000 on SUN DI-3000
C                       = 66 on SUNCORE vanilla version for Sun 3
C                       = 2000 on SUNCORE special version for Sun 3
C                       = 200 on SUNCORE vanilla version for Sun SPARC
C       MXPLYS  -       MAXV OR ?
C       IDIM    -       MAXV*2
C
C-*-*-*-*-*-*-*-*-*-*-*-*-*-*-*-*-*-*-*-*-*-*-*-*-*-*-*-*-*-*-*-*-*-*-*|*-*-*-*-
c
       integer          MAXV, MXVOUT, MXPLYS
       parameter        (MAXV = 1200)
       parameter        (MXVOUT = 200)
C      parameter        (MXVOUT = 66)
       parameter        (MXPLYS = MAXV)
c
       integer          IDIM
       parameter        (IDIM = MAXV*2)
```

```
C+*+*+*+*+*+*+*+*+*+*+*+*+*+*+*+*+*+*+*+*+*+*+*+*+*+*+*+*+*+*+*+*+*|*+*+*+*+
C UNIT NAME:                    SAVARC
C
C FUNCTIONAL DESCRIPTION:       .
C
C CALLED BY:                    APARCS
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*|*-*-*-*-

        subroutine savarc(xsave1,ysave1,xsave2,ysave2,xsave3,ysave3,
     +          arccnt,ifl)

c       This routine writes out the points needed to redraw arcs.
c         The three points along the arc that the user input are
c         written to the file, along with the number of arcs
c         that are being saved.
c         The opcode for the arcs is written in position 1
c         of the first line written out.
c         This routine is used by both the create and the conversion
c         routines of the Icon Editor.  When saving a newly-created
c         icon, the .icon file is written to.  When saving a
c         converted icon, the .conv file is written to.  This
c         is controlled by the ifl variable which is the logical
c         unit number of the file to be written to.
c     VARIABLES:
c         xsaveX/ysaveX- arrays holding the three points of each arc
c         fullfl- flag set when all positions of the record being
c           built for output have been filled
c         iarray- holds elements to be written
c         arccnt- number of arcs to be saved
c         maxlen- maximum number of positions allowed in record
c           (in this case, an 80-position record will hold 26
c            integers in I3 format)
c         icount- counter used to load arrays
c         ifl- logical unit number of the file to be accessed
c   PROGRAMMER:  Nancy Detrich, A215, March, 1984
C------  MODIFIED BY A692 FOR COMPLETION

        real xsave1(*),ysave1(*),xsave2(*)
        real ysave2(*),xsave3(*),ysave3(*)
        logical fullfl
        integer iarray(26),arccnt,ifl,maxlen,icount
        data maxlen/26/

c       only process if there are arcs to be saved
        if (arccnt .gt. 0 ) then
c         put op code for arcs in position 1
          iarray(1) = 8
c         number of arcs saved in position 2
          iarray(2) = arccnt
c         set counter ahead to start saving points
          icount = 3
          do 100 i = 1,arccnt
            fullfl = .false.
c           load the points of the each arc
            iarray(icount)   = INT(xsave1(i))
            iarray(icount+1) = INT(ysave1(i))
            iarray(icount+2) = INT(xsave2(i))
            iarray(icount+3) = INT(ysave2(i))
            iarray(icount+4) = INT(xsave3(i))
            iarray(icount+5) = INT(ysave3(i))
            icount = icount + 6
c           a record is full if the arc count is 4 or 8, so write
c                    out record and set full flag
            if (i .eq. 4 .or. i .eq.8) then
              call writit(ifl,iarray,icount-1,ierror)
              fullfl = .true.
              icount = 1
            endif
 100      continue

c         write out (last) record that is not full
          if (.not.fullfl) then
```

```
          call writit(ifl,iarray,icount-1,ierror)
        endif
      endif
      return
      end

C+*+*+*+*+*+*+*+*+*+*+*+*+*+*+*+*+*+*+*+*+*+*+*+*+*+*+*+*+*+*+*+*+*+*|*+*+*+*+
C UNIT NAME:                   SAVCIR
C
C FUNCTIONAL DESCRIPTION:      .
C
C CALLED BY:                   APCIRC
C
C PROGRAMMER:                  DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*|*-*-*-*-

      subroutine savcir(icode,numcir,radius,xcentr,ycentr,ifl)

c     This routine is passed the arrays holding the center coordinates
c     and radius.length of the circles to be written to the savefile.
c     The routine loads an array with the radius,x, and y center
c     point of each circle and writes out a record to the file when
c     26 values have been put into the array (78 positions of the
c     80-position record).
c   VARIABLES:
c     xcentr - array holding x center coordinate of circles
c     ycentr - array holding y center coordinate of circles
c     radius - array holding radius length of circles
c     icode - integer value (2) to be read and used by redraw routine
c     numcir - number of circles being saved off
c     fullfl - flag to indicate when 26 positions have been filled
c           in iarray meaning the record is ready to be written out
c     maxlen - indicates the length of iarray--dependent on the record
c           length of the file being written to
c     iarray - array to hold the record being built to be written out
c     icount - counter used to step through iarray
c     i - counter used to step through the arrays passed with points
c         and radius of circles
c     ifl - logical unit number associated with file to be
c         accessed
c   PROGRAMMER:  Nancy Detrich, A215, March, 1984

      real xcentr(*),ycentr(*),radius(*)
      integer icode,numcir
      integer maxlen,iarray(26),icount,i,ifl
      logical fullfl
      data maxlen/26/

c     only write out a record if at least 1 circle has been created
      if (numcir .gt. 0) then
        iarray(1) = icode
        iarray(2) = numcir
c       set counter ahead on first record because of icode and numcir
        icount = 3
c       load the iarray and write out a record when one is full
        do 100 i=1,numcir
          fullfl = .false.
          iarray(icount) = INT(radius(i) )
          iarray(icount+1) = INT(xcentr(i))
          iarray(icount+2) = INT(ycentr(i))
          icount = icount +3
c         a record is full when 8 or 16 points have been put into it, so
c            write it out
          if(MOD(i,8) .eq. 0) then
            call writit(ifl,iarray,maxlen,ierror)
            fullfl = .true.
c           reset counter to start in 1st position of iarray to fill
c             next record
            icount = 1
          endif
 100    continue
c       if fullfl is false here, means a partial record must be written
```

```
c             to the file
          if(.not.fullfl) then
            call writit(ifl,iarray,icount-1,ierror)
          endif
        endif
        return
        end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    SAVE
C
C FUNCTIONAL DESCRIPTION:       .
C
C CALLED BY:                    APFILL, APLINE, APMARK, APRECT, APSMOO
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-
        subroutine save(icode,numpts,xarray,yarray,ifl)

c       This routine calls the writit routine to write parameters
c         and points to the savefile.  An array of integers is
c         passed to writit and 12 x and y values may be written
c         in the first record, 13 on the second and 9 on the
c         third.
c         This routine is used by the create and convert routines
c         of the Icon Editor and the file to be written to is
c         controlled by the logical unit number, ifl.
c      VARIABLES:
c        xarray/yarray- points to be saved
c        numpts- number of points in each array
c        maxlen- maximum number of elements allowed to be written per
c         record
c        fullfl- flag set when a record is full
c        iarray- array loaded and sent to writit to be written to file
c        icode- the op code to be saved with the information
c              being saved
c   PROGRAMMER:  Nancy Detrich, A215, March, 1984

        real xarray(*),yarray(*)
        integer ifl,maxlen,icount
        logical  fullfl
c       array set to 26 because being written to 80 pos record in I3 format
        integer iarray(26),numpts,icode
        data  maxlen/26/

c         do not write a record if no points were passed
          if (numpts.gt.0) then
c           put op code in first position
            iarray(1) = icode
c           put number of points being written in position 2
            iarray(2) = numpts
c           set array value ahead on first record
            icount = 3
            do 100 i=1,numpts
c             truncate on entry into integer array
              fullfl=.false.
              iarray(icount) = INT(xarray(i))
              iarray(icount + 1) = INT(yarray(i))
              icount = icount + 2

c             a record is full if the points count is 12 or 25, so write
c               out record and set full flag
              if (i .eq. 12 .or. i .eq.25) then
                call writit(ifl,iarray,maxlen,ierror)
                fullfl = .true.
                icount = 1
              endif
 100        continue

c           write out record that is not full
            if (.not.fullfl) then
              call writit(ifl,iarray,icount-1,ierror)
```

```
            endif

          endif
          return
          end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                     saveco
c
c  Functional Description:
c       this subroutine saves the screen definition common areas
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                     FMAIN
c
c  Local Variables: N/A
c
c  Restrictions: N/A
c
c  Abnormal Return Conditions:  N/A
c
c  Location:      /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*|*-*-*-*-
c
        subroutine saveco
c
c       this subroutine saves the screen definition common areas
c
        common /aspect/ parvie(6)
        common /saveta/ savevi(6)
c
        do 110 i=1,6
            savevi(i) = parvie(i)
  110   continue
c
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      SAVEST
C
C FUNCTIONAL DESCRIPTION:
C
C CALLED BY:                      STATEC
C
C PROGRAMMER:                     DATE OF LAST CHANGE    REASON FOR CHANGE
c  S. Lamb               Feb 1988                 command fix - savest
C
C-*-*-*-*-*-*-*-*-*-*-*-*-*-*-*-*-*-*-*-*-*-*-*-*-*-*-*-*-*-*-*-*-*-*-*|*-*-*-*-
c
        subroutine savest
c
c       this subroutine is the save state interpreter (28)
c
        common /states/ nextst
        logical eol,eoc
        common /comnds/ lenl,indxw,lenw,eol,eoc
        logical wordis,iseoc
c
        initls = nextst
c       do until nextst not = initial state
  100   continue
            call getwrd
```

```
c ****  change all of this
            if (wordis('COMMAND').or.wordis('FILE').or.wordis(':'))
     +          then
c * ** *** **** ***** ****** ******* not understood / implem.
                nextst = 15
            else if (iseoc()) then
c               prompt for filename
                nextst = 1
            else
c               put word into filename
                nextst = 1
            endif
        if (nextst.eq.initls) go to 100
        if (lenfn.gt.0) then
c           open file using default path
c           if error, putwrd, msg
c           else cmdfil = .true.
        endif
c
        return
        end


C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        SAVTXT
C
C FUNCTIONAL DESCRIPTION:           .
C
C CALLED BY:                        APTEXT
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine savtxt(size,height,style,nchars,retstr,x,y,ifl)

c       this subroutine saves the necessary parameters to be used
c       by the redraw routine when the icon is requested.
c       The icode is set to 7 to indicate the records being written
c       pertain to text, and the size, height, style, number of characters
c       in the text string and the x and y positions of that text
c       string are output.  Any real variables are converted to integer
c       values before being output.
c       The actual character string is output on a separate line as
c       characters.
c    VARIABLES:
c      retstr- the text string to be displayed
c      nchars- number of characters in text string
c      x/y- coordinate for positioning text string
c      height- height of characters in text string
c      style- determines font setting
c      size- selection made from menu
c      icode -op code for text
c      ierror- integer flag set if error occurs during write
c   PROGRAMMER:  Nancy Detrich, A215, March, 1984

        character*80 retstr
        integer x,y
        integer height
        integer style,size,ifl,nchars,ix,iy,icode,ierror

        icode = 7
        ix = INT(x)
        iy = INT(y)
c       write the parameters needed for redrawing
        write (ifl,1100) icode,size,height,style,nchars,ix,iy
c       write the text string (character format)
        call writch(ifl,retstr,nchars,len,ierror)

 1100   format (15i3)
        return
        end
```

```
C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      SCENTE
C
C FUNCTIONAL DESCRIPTION:         .
C
C CALLED BY:                      STATEC
C
C PROGRAMMER:                     DATE OF LAST CHANGE     REASON FOR CHANGE
c  S. Lamb                  Feb 1988                    command fix - scente
C
C-*-*-*-*-*-*-*-*-*-*-*-*-*-*-*-*-*-*-*-*-*-*-*-*-*-*-*-*-*-*-*-*-*-*-*-*|*-*-*-*-
c
       subroutine scente
c
c      this subroutine is the center point state interpreter (18)
c
       common /states/ nextst
       logical wordis,iseoc
       logical iscoor
c
       initls = nextst
c      do until nextst not = initial state
 100   continue
           call getwrd
           if (wordis('POINT').or.wordis('TO')) then
c * ** *** **** ***** ****** ******* not understood / implem.
               nextst = 15
           else if (iscoor()) then
               nextst = 19
           else if (iseoc()) then
               nextst = 7
           else
               call putwrd
               nextst = 7
           endif
       if (nextst.eq.initls) go to 100
c
       return
       end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      SCLRET
C
C FUNCTIONAL DESCRIPTION:         .
C
C CALLED BY:                      DOVERL
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

       subroutine sclret
       return
       end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME: SCRDIA
C
C FUNCTIONAL DESCRIPTION:  SCRDIA IS RESPONSIBLE FOR PRINTING THE CURRENT
C                          MAP DIAMETER IN THE COMMUNICATIONS AREA.
C
C INPUT FILES/PARAMETERS:  NONE.
C
C GLOBAL VARIABLES :
C
C        QXRNM                REAL        RADIUS OF MAP. (NAUTICAL MILES)
C        QMAPUP               LOGICAL     INDICATES WHETHER MAP IS CURRENTLY
C                                         DISPLAYED.
C
C OUTPUT FILES/PARAMETERS:  NONE.
C
C SUBROUTINES/FUNCTIONS CALLED : MESG
C
C         MESSAG              PRINTS CHARACTER STRING IN COMMUNICATIONS
```

```
C                         AREA.
C
C CALLED BY:                 CHECK, MAPPER
C
C LOCAL VARIABLES:
C
C      DIAM                 CHARACTER*80 CHARACTER STRING HOLDING CURRENT
C                                        DIAMETER.
C
C RESTRICTIONS: NONE.
C
C ABNORMAL RETURN CONDITIONS:   NONE.
C
C LOCATION:                  /u1/a21/gjf/SCRDIA.FTN
C
C PROGRAMMER:                DATE OF LAST CHANGE     REASON FOR CHANGE
C
C     GJFenerty
C     Tom Wescott  (NOSC)     10/87                   Added map constnts
C
C-*-*-*-*-*-*-*-*-*-*-*-*-*-*-*-*-*-*-*-*-*-*-*-*-*-*-*-*-*-*-*-*-*-*|*-*-*-*-

      subroutine SCRDIA

C  SUBROUTINE TO CALCULATE AND DISPLAY THE CURRENT MAP DIAMETER IN
C  NAUTICAL MILES, KILOMETERS, MILES AND DEGREES.  USUALLY CALLED
C  FROM CHECK.

      LOGICAL QLTON(16),QDOTEM
      INTEGER QPGRID(4),QTYPTB(16)
      INTEGER QLEVEL,QITPRO,QIRES,QLUNDA,QLUNIN,QLUNLI
      REAL QXRNM,QXC,QYC,QCLAT,QCLON,QXRAD,QYRAD,QORHAL
      COMMON /MAP/ QXRNM,QXC,QYC,QLEVEL,QCLAT,QCLON,QXRAD,QYRAD,
     +    QITPRO,
     +    QIRES,QTYPTB,QLUNDA,QLUNIN,QLUNLI,QLTON,QPGRID,QDOTEM,
     +    QORHAL

      LOGICAL QMAPUP
      COMMON /MAPUP/ QMAPUP
      common /conic/ spll1,spll2,tranl,trank,tranr,tscale,pole,tilt
      common /pers/ orhalt,orhc,pconst,cosERM,radmax
      common /utmz/ ap,bp,cp,dp,ep,e2,ep2,aaxis,baxis,cmerid,zone

     CHARACTER*72 line,amptxt(4)


     CHARACTER*6 QCURWD
     COMMON /CURWDB/ QCURWD
     CHARACTER*15 MAPROJ(19)
     DATA MAPROJ /
    + 'Gnomonic       ', 'Equat. Ortho.  ', 'Polar Ortho.   ',
    + 'Orthographic   ', 'Perspective    ', 'Equirectangular',
    + 'Mercator       ', 'Lambert Conf.  ', 'Albers         ',
    + 'Az. Equal-area ', 'Az. Equidistant', 'Kavraisky IV   ',
    + 'Miller         ', 'Obliq. Mercator', 'Polar Stereo.  ',
    + 'Polyconic      ', 'UTM            ', 'Sinusoidal     ',
    + 'Stereographic  '/

      IF (QMAPUP) THEN

C     ** LOAD STRING DIAM WITH SCALE,CENTER POINT,WDBII,DETAIL,PROJ.
      IEGEO = 0
      line = ' '
      IXRNM = QXRNM * 2

      WRITE (line(1:18),101) IXRNM
 101    FORMAT('Width:',I5,' NM  ')
      IXRNM = QXRNM*1.15*2
      WRITE (line(19:28),102) IXRNM
 102    FORMAT(I5,' MI  ')
      IXRNM = QXRNM*1.852*2
      WRITE (line(29:37),103) IXRNM
 103    FORMAT(I6,' KM')
      amptxt(1) = line
```

```
      line = ' '
      WRITE (line(1:8),104)
104     FORMAT('Center: ')
      CALL FORMT (QCLAT,QCLON,IEGEO,line(9:24))
c
*-----------------------------------------------------------------|--+
* Itproj:  1  2  3  4  5  6  7  8  9 10 11 12 13 14 15 16 17 18 19 20 21  |
*---------------------------------------------------------------------+
*          g  o  o  o  p  e  m  l  a  a  a  k  m  o  p  p  u  s  s      |
*          n  r  r  r  e  q  e  a  l  z  z  a  i  b  o  o  t  i  t      |
*          o  e  p  t  r  r  r  m  b  e  e  v  l  l  s  l  m  n  e      |
*          m  q  o  h  s  e  c  c  r  a  d  r  l  m  t  y  z  u  r      |
*---------------------------------------------------------------------+
     goto(1,01,01,01,02,01,01,03,03,01,01,03,01,05,01,01,04,01,01
    +     )qitpro
c
c      Default case:  Maps without special constants.
 1          continue
            go to 99
c
c      Perspective case:  Display view point altitide.
 2          continue
            iorhal = int(orhalt + 0.5)
            write (line(28:50),1002) iorhal
 1002       format(1X,'Altitude: ',i5,' NM ')
            go to 99
c
c      Conics case:  Display standard parallels.
 3          continue
            ispll1 = anint(spll1*180./3.14159)
            ispll2 = anint(spll2*180./3.14159)
            write (line(28:55),1003) abs(ispll1),abs(ispll2)
 1003       format(1X,'Std parallels: ',I2,' ,',I2)
            if (spll1.ge.0.) line(46:46) = 'N'
            if (spll1.lt.0.) line(46:46) = 'S'
            if (spll2.ge.0.) line(50:50) = 'N'
            if (spll2.lt.0.) line(50:50) = 'S'
            go to 99
c
c      UTM case:  Display zone number.
 4          continue
            izone = zone
            write (line(28:50),1004) izone
 1004       format(1X,'Zone: ',i5)
            go to 99
c
c      Oblique case:  Display tilt angle:
 5          continue
            itilt = anint(tilt*180./3.14159)
            write (line(28:55),1005) itilt
 1005       format(1X,'Equatorial Tilt: ',I3,' deg.')
            go to 99
c
 99         continue
c      end cases
c
       amptxt(2) = line
       line = ' '
       WRITE (line(1:8),105) QCURWD
 105     FORMAT(A6,2X)
       WRITE (line(9:24),106) QLEVEL
 106     FORMAT('detail:',I3,6X)
       WRITE (line(28:55),107) MAPROJ(QITPRO)
 107     FORMAT(' Projection: ',A15)
       amptxt(3) = line
c       call clrcom
       call drwamp(amptxt,3)
       ELSE

         CALL MESG(294)
         CALL PAWS

       ENDIF

       RETURN
       END
```

```
C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     SEGHND
C
C FUNCTIONAL DESCRIPTION:        .
C
C CALLED BY:                     ADDTRK, CHGIND, PLOTON, PLTUNS, REPLAY
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine seghnd (segnr, data)

c this routine sets up the graphics window and viewport, opens the new
c segment, displays the data, closes the segment, and sets the
c detectability and visibility
c programmer: avw

        integer           segnr

        character*(160)   data
        logical trackn
        common /trkdbc/ trackn

        if (trackn) then
           print *, 'enter seghnd'
           print *, '   segnr = ', segnr
        end if

c set window and viewport

        call jrclos

        call gravpt
        call geowin

c open new retained segment

        call jropen (segnr)

c display the new data
c       print*,'in seghnd/seg#= ',segnr

        call pltdat (data)

c close segment

        call jrclos

c set detectability and visibility

        call jdetec (segnr, 1)
        call jvisbl (segnr, 1)

        if (trackn)  print *, 'exit seghnd'

        return
        end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: SEGMAP
C
C FUNCTIONAL DESCRIPTION:  SETS UP RETAINED SEGMENT NUMBERS FOR MAP.
C
C INPUT FILES/PARAMETERS:  NONE.
C
C GLOBAL VARIABLES :
C
C       FIRSEG       INTEGER      FIRST MAP SEGMENT NUMBER
C
C OUTPUT FILES/PARAMETERS:  NONE.
```

```
C
C SUBROUTINES/FUNCTIONS CALLED :
C
C       GETSEG         GETS NEXT SEGMENT NUMBER.
C
C CALLED BY:                    DRWMAP
C
C LOCAL VARIABLES: NONE.
C
C RESTRICTIONS: NONE.
C
C ABNORMAL RETURN CONDITIONS:   NONE.
C
C LOCATION:                     /u1/a21/gjf/cntrl.f
C
C PROGRAMMER:                   DATE OF LAST CHANGE     REASON FOR CHANGE
C
C     GJFenerty
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE SEGMAP

C  SETS SEGMENT NUMBERS FOR DRAWING MAP

      INTEGER SEGNO,FIRSEG
      COMMON /SEGNO/ SEGNO,FIRSEG
      INTEGER I

      CALL GETSEG(FIRSEG)
      DO 20 I=1,16
         CALL GETSEG(SEGNO)
 20   CONTINUE

      SEGNO = FIRSEG

      RETURN
      END

C+*+*+*+*+*+*+*+*+*+*+*+*+*+*+*+*+*+*+*+*+*+*+*+*+*+*+*+*+*+*+*+*+*+*+*+*+*|*+*+*+*+
c UNIT NAME:   setcol
c
c Purpose:
c subroutine to set map feature colors
c
c Access: call setcol
c
c Parameters:
c
c Returns: none
c
c Globals:
c
c Calls: arrow
c
c Called by:                    RESCON
c
c Author: Ellen Jenkins, R531, September 30, 1982
c
c Location: file: setcol.f
c           directory: /u3/dave/hlpd
c           archive: /u3/dave/archive/hlspsrc
c
c History:
c version date    who                  history or reason for change.
c   1   10/7/82   D. A. Nation         Rearranged arrow calls to save space
c   2   1/4/83    D. A. Nation         Function key F8 used for exit on Apollo
c       Jan 1988  L. McCleary          call jpecho - setcol
c       Jan 1988  L. McCleary          continuous hue - setcol
c
c
```

```
c
c        ____________________________________________________________________
c       |                                                            |           |
c       |    __________________________________________________      |           |
c       |   |                                                   |     |           |
c       |   |             Current Color Choice                  |     |           |
c       |   |___________________________________________________|     |           |
c       |                                  /\   ___/\                 |           |
c       | Text Example                    /  \/      \______          |           |
c       |                                                            |           |
c       |    __________________________________________________      |           |
c       |   |       |              |               |       |    |     |           |
c       |   |       | Color        | Pallette      |       |    |     |           |
c       |   |_______|______________|_______________|_______|    |     |           |
c       |                                                            |           |
c       |                                                            |           |
c       |                         Hue                                |           |
c       |                                                            |           |
c       |   _____________________________________________________    |           |
c       |                                                            |           |
c       |                      Saturation                            |           |
c       |                                                            |           |
c       |   _____________________________________________________    |           |
c       |                                                            |           |
c       |                                                            |           |
c       |                      Lightness                             |           |
c       |   _____________________________________________________    |           |
c       |                                                            |           |
c       |                                                            |           |
c       |                                                            |           |
c       -----------------------------------------------------------------------------
c
c
C-*-*-*-*-*-*-*-*-*-*-*-*-*-*-*-*-*-*-*-*-*-*-*-*-*-*-*-*-*-*-*-*-*-*-*|*-*-*-*-
c
      subroutine setcol (icolor,nhues,ishue,ifcol,ibcol,ioucol,hls)
c
c     this subroutine does the color selection graphics
c
      real hls(3)
      character*1 ch
      integer*2 ikey
      logical sys
      common /sysdbc/ sys
      integer qfb(26),qmb(4)
      common /butons/qfb,qmb
      data vx,vy /0.,0./
      data xlow,xhigh,ylow,yhigh/1.,100.,1.,100./

      if (sys)
     + print*,'enter setcol ',icolor,nhues,ishue,ifcol,
     + ibcol,ioucol,hls

      intcol = ifcol
      call jwindo (xlow,xhigh,ylow,yhigh)
      call jwclip (.true.)
      call jopen
c
c     clear given area with background color
c
      CALL XPIDEX (ibcol,0)
      CALL XCOLOR (ioucol)
      CALL JRECT (xlow,ylow,xhigh,yhigh)
c
c     draw initial display
c
      xrange = xhigh - xlow
      yrange = yhigh - ylow
      CALL XCOLOR (icolor)
      CALL XPIDEX (icolor,0)
      xlmarg = xlow + .05 * xrange
      xrmarg = xhigh - .05 * xrange
      xsrang = xrmarg - xlmarg
      xcentr = (xrmarg - xlmarg) / 2. + xlmarg
      yl = ylow + .85 * yrange
```

```
      y2 = yhigh - .05 * yrange
      CALL JRECT (xlmarg,y1,xrmarg,y2)
      call jupdat
      yfigur = yhigh - .25 * yrange
      call jmove (xlmarg, yfigur)
c      call jsize (xrange / 50., yrange / 40.)
      call jsize(5.0,2.5)
      call j1strg ('Text')
      call jmove (xlmarg, yfigur-.05*yrange)
      call j1strg ('Example')
      call jmove (xcentr, yfigur)
      call jrdraw (.2 * xrange, .05 * yrange)
      call jrdraw (.1 * xrange, -.1 * yrange)
      call jdraw (xrmarg, yfigur)
      yhues = ylow + .5 * yrange
      ysatur = ylow + .3 * yrange
      ylight = ylow + .1 * yrange
c      CALL XCOLOR (ifcol)
c      call jjust (2,1)
      space=(xrmarg-xlmarg)/nhues
      x1=xlmarg
      half = space/2.
      x2 = x1 + half
      do 50 kk=1,nhues
         numcol=(360/nhues)*(kk-1)
         mcolor=ishue+(kk-1)
         call jclose
c         print *,'mcolor,numcol',mcolor,numcol,x1,x2
         call jcotbl(1,1,mcolor,numcol,32767,16384)
         call jopen
         call xpidex(mcolor,0)
         call xcolor(mcolor)
         call jrect (x1,yhues+.10*yrange,x2,yhues)
         x1=x2
         x2=x1+space
 50   continue
      x2 = x2 - half
      call xpidex(ishue,0)
      call xcolor(ishue)
c         print *,'ishue ,numcol',ishue ,numcol,x1,x2
      call jrect (x1,yhues+.10*yrange,x2,yhues)
      call xcolor (ifcol)
      call jjust (2,1)
      call jmove (xcentr,yhues + .14 * yrange)
      call jsize(5.0,2.5)
      call j1strg ('Hue')
      call jmove (xlmarg,ysatur)
      call jdraw (xrmarg,ysatur)
      call jmove (xlmarg,ysatur + .01 * yrange)
      call jdraw (xlmarg,ysatur - .01 * yrange)
      call jmove (xcentr,ysatur + .05 * yrange)
      call j1strg ('Saturation')
      call jmove (xcentr,ysatur + .01 * yrange)
      call jdraw (xcentr,ysatur - .01 * yrange)
      call jmove (xrmarg,ysatur + .01 * yrange)
      call jdraw (xrmarg,ysatur - .01 * yrange)
      call jmove (xlmarg,ylight)
      call jdraw (xrmarg,ylight)
      call jmove (xlmarg,ylight + .01 * yrange)
      call jdraw (xlmarg,ylight - .01 * yrange)
      call jmove (xcentr,ylight + .05 * yrange)
      call j1strg ('Lightness')
      call jmove (xcentr,ylight + .01 * yrange)
      call jdraw (xcentr,ylight - .01 * yrange)
      call jmove (xrmarg,ylight + .01 * yrange)
      call jdraw (xrmarg,ylight - .01 * yrange)
      call jjust (1,1)
      call jmove (xlmarg,yhues + .10 * yrange)
      call j1strg ('0')
      call jjust (3,1)
      call jmove (xrmarg,yhues + .10 * yrange)
      call j1strg ('360')
      call jjust (1,1)
      call jmove (xlmarg,ysatur + .03 * yrange)
```

```
      call j1strg ('0')
      call jjust (3,1)
      call jmove (xrmarg,ysatur + .03 * yrange)
      call j1strg ('100')
      call jjust (1,1)
      call jmove (xlmarg,ylight + .03 * yrange)
      call j1strg ('0')
      call jjust (3,1)
      call jmove (xrmarg,ylight + .03 * yrange)
      call j1strg ('100')
      call jclose
      x1prev = xlmarg + ((hls(3)/100.)*xsrang)
      x2prev = xlmarg + ((hls(2)/100.)*xsrang)
      x3prev = xlmarg + ((hls(1)/360.)*xsrang)
      hue = hls(1)
      satur = hls(3)
      rlight = hls(2)
c          print 101,hue,satur,rlight
c  DAN1 call arrw (x3prev,yhues,intcol,xsrang,yrange,hue)
c  DAN1 call arrw (x1prev,ysatur,intcol,xsrang,yrange,satur)
c  DAN1 call arrw (x2prev,ylight,intcol,xsrang,yrange,rlight)
c       Loop until end ('E' key)
  100   continue
c  DAN1     addition
            call arrw (x3prev,yhues,intcol,xsrang,yrange,hue)
            call arrw (x1prev,ysatur,intcol,xsrang,yrange,satur)
            call arrw (x2prev,ylight,intcol,xsrang,yrange,rlight)
c  DAN1     end
            ihue = hue
            isatur = satur/100.*32767.
            light = rlight/100.*32767.
            call jcotbl (1,1,icolor,ihue,isatur,light)
c            print 101,hue,satur,rlight
c  101       format(' hue, sat, lit ',3f6.1)
            call jpecho (1,2,1,vx,vy)
            call jlocat (1,1,1,ik,vx,vy)
            ikey = ik
            ch = char(ikey)
c           print*,'setcol -- ikey, ch : ',ikey,'  ',ch
c           translate to world coord.
            call jconvw (vx,vy,x,y,z)
c DAN2
            if (ch.eq.'R'.or.ch.eq.'r'.or.ch.eq.'.'
     +      .or.ikey.eq.qmb(3)
     +      .or.ikey.eq.8) go to 190
c DAN2
c
c           process locator selection
c
            if (x.lt.xlmarg) x = xlmarg
            if (x.gt.xrmarg) x = xrmarg
            if (y.gt.(yhues-((yhues-ysatur)*.25))) then
               call arrw (x3prev,yhues,ibcol,xsrang,yrange,hue)
c               if (x.lt.(xlmarg + half)) then
c                  x = xlmarg
c                  hue = 0
c               else if (x.ge.(xrmarg-half)) then
c                  x = xrmarg
c                  hue = 360
c               else
c                  prtion=xsrang/nhues
c                  half = prtion/2.
c                  iratio = (x - xlmarg + half)/prtion
c                  ratio = iratio * prtion
c                  hue = (ratio) / xsrang * 360.
c                  x = xlmarg + iratio * prtion
c               endif
c  DAN1         call arrw (x,yhues,intcol,xsrang,yrange,hue)
               x3prev = x
               hue = (x - xlmarg) / xsrang * 360.
            else if (y.gt.(ysatur-((ysatur-ylight)*.25))) then
               call arrw (x1prev,ysatur,ibcol,xsrang,yrange,satur)
               x1prev = x
               satur = (x - xlmarg) / xsrang * 100.
```

```
c  DAN1        call arrw (x,ysatur,intcol,xsrang,yrange,satur)
            else
               call arrw (x2prev,ylight,ibcol,xsrang,yrange,rlight)
               x2prev = x
               rlight = (x - xlmarg) / xsrang * 100.
c  DAN1        call arrw (x,ylight,intcol,xsrang,yrange,rlight)
            endif
            go to 100
  190   continue
        hls(1) = hue
        hls(2) = rlight
        hls(3) = satur
        if (sys)  print*,'exit setcol'
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     SETCOR
C
C FUNCTIONAL DESCRIPTION:        .
C
C CALLED BY:                     STATEC
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine setcor
c
c       this subroutine is the set coordinates state interpreter (19)
c
        common /states/ nextst
c
c  **   set new coordinates
        nextst = 14
c
        return
        end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                     SETDBG
C
C FUNCTIONAL DESCRIPTION:        .
c  subroutine setdbg - sets up array of flags for the debugs
C
C CALLED BY:
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

       subroutine setdbg

       character*80 idebug
       common /idebug/ idebug
       logical map,rdkey,savkey,sys,noscal,vax,olhldf,aed,batch
       logical frame,square,noblnk,bxclr,txtsiz,metafl,nolabl,nologo
       logical nobitm,malbox,trackn,bit,mask,forma,plain,count
       logical timeot,fill,jsub,sr8,rel2,clr

       common /mapdbc/ map
       common /rkdbc/ rdkey
       common /svkdbc/ savkey
       common /sysdbc/ sys
       common /nsldbc/ noscal
       common /vaxdbc/ vax
       common /ohfdbc/ olhldf
       common /aeddbc/ aed
       common /batdbc/ batch
       common /frmdbc/ frame
       common /sqrdbc/ square
```

```
      common /nbldbc/ noblnk
      common /bxcdbc/ bxclr
      common /txsdbc/ txtsiz
      common /metdbc/ metafl
      common /nlbdbc/ nolabl
      common /nlgdbc/ nologo
      common /nbtdbc/ nobitm
      common /mlbdbc/ malbox
      common /trkdbc/ trackn
      common /bitdbc/ bit
      common /mskdbc/ mask
      common /fmadbc/ forma
      common /plndbc/ plain
      common /cntdbc/ count
      common /timdbc/ timeot
      common /fildbc/ fill
      common /jsbdbc/ jsub
      common /sr8dbc/ sr8
      common /rl2dbc/ rel2
      common /clrdbc/ clr

c     --convert the string to lower case (for reference consistency)
      call tolowr(idebug, len(idebug))

      if (index(idebug,'map').ne.0) then
         map = .true.
      else
         map = .false.
      endif

      if (index(idebug,'read_keys').ne.0) then
        rdkey =.true.
      else
        rdkey = .false.
      endif

      if (index(idebug,'save_keys').ne.0) then
        savkey = .true.
      else
        savkey = .false.
      endif

      if (index(idebug,'sys').ne.0) then
        sys = .true.
      else
        sys = .false.
      endif

      if (index(idebug,'noscal').ne.0) then
        noscal = .true.
      else
        noscal = .false.
      endif

      if (index(idebug,'vax').ne.0) then
        vax = .true.
      else
        vax = .false.
      endif

      if (index(idebug,'oldhldf').ne.0) then
        olhldf = .true.
      else
        olhldf = .false.
      endif

      if (index(idebug,'aed').ne.0) then
        aed = .true.
      else
        aed = .false.
      endif

      if (index(idebug,'batch').ne.0) then
        batch = .true.
```

```
      else
        batch = .false.
      endif

      if (index(idebug,'frame').ne.0) then
        frame = .true.
      else
        frame = .false.
      endif

      if (index(idebug,'square').ne.0) then
        square = .true.
      else
        square = .false.
      endif

      if (index(idebug,'noblanks').ne.0) then
         noblnk = .true.
      else
         noblnk = .false.
      endif

      if (index(idebug,'bxclr').ne.0) then
         bxclr = .true.
      else
         bxclr = .false.
      endif

      if (index(idebug,'txtsiz').ne.0) then
         txtsiz = .true.
      else
         txtsiz = .false.
      endif

    if (index(idebug,'metafile').ne.0) then
         metafl = .true.
      else
         metafl = .false.
      endif

      if (index(idebug,'nolables').ne.0) then
         nolabl = .true.
      else
         nolabl = .false.
      endif

      if (index(idebug,'nologo').ne.0) then
         nologo = .true.
      else
         nologo = .false.
      endif

      if (index(idebug,'nobitm').ne.0) then
         nobitm = .true.
      else
         nobitm = .false.
      endif

      if (index(idebug,'mailbox').ne.0) then
         malbox = .true.
      else
         malbox = .false.
      endif

      if (index(idebug,'tracking').ne.0) then
         trackn = .true.
      else
         trackn = .false.
      endif

      if (index(idebug,'bit').ne.0) then
         bit = .true.
      else
         bit = .false.
      endif
```

```
      if (index(idebug,'mask').ne.0) then
         mask = .true.
      else
         mask = .false.
      endif

      if (index(idebug,'forma').ne.0) then
         forma = .true.
      else
         forma = .false.
      endif

      if (index(idebug,'plain').ne.0) then
         plain = .true.
      else
         plain = .false.
      endif

      if (index(idebug,'count').ne.0) then
         count = .true.
      else
         count = .false.
      endif

      if (index(idebug,'timeout').ne.0) then
         timeot = .true.
      else
         timeot = .false.
      endif

      if (index(idebug,'fill').ne.0) then
         fill = .true.
      else
         fill = .false.
      endif

      if (index(idebug,'jsub').ne.0) then
         jsub = .true.
      else
         jsub = .false.
      endif

      if (index(idebug,'sr8').ne.0) then
         sr8 = .true.
      else
         sr8 = .false.
      endif

      if (index(idebug,'rel2').ne.0) then
         rel2 = .true.
      else
         rel2 = .false.
      endif

      if (index(idebug,'jclear').ne.0) then
         clr = .true.
      else
         clr = .false.
      endif

      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    SETFAD
C
C FUNCTIONAL DESCRIPTION:       .
C
C CALLED BY:                    TRKCON
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-
```

```
      subroutine setfad

c
c     this subroutine sets the fade time based upon users request
c     and then updates the screen to reflect the new fade time

      logical longer

      character*2 chmin
      character*2 chhour
      character*80 line
      character*5 newfad

      integer*4 error
      integer*4 hours
      integer*4 minute
      integer*4 icolcm
      integer*4 lctrak
      integer*4 temptm
      integer*4 txtseg

      integer tfaddx
      integer tfadtm
      common /tfadez/ tfaddx, tfadtm
      integer tnewst
      integer toldst
      common /tarbou/ tnewst, toldst
      integer ltypov(16)
      logical ltonov(16)
      logical rankt(26,16)
      logical trackn
      common /trkdbc/ trackn
      common /maptoo/ ltypov,ltonov,rankt
      real qcxmn
      real qcymn
      real qcxmx
      real qcymx
      common/comwdo/qcxmn,qcymn,qcxmx,qcymx
      character*9 tfddtg
      common /tfddtg/ tfddtg
      integer qdsdev,qpydev,qecho,qlecho
      common /device/ qdsdev,qpydev,qecho,qlecho

      data lctrak /3/
      data icolcm /16/

c     if tracking is not turned on, then cannot set the fade time.

c jit      if (.not. ltonov(lctrak)) then
c jit         call mesg(1247)
c jit         call paws
c jit         goto 300
c jit      endif

      if (trackn) then
         print *, 'enter setfad'
         print *, '   tfadtm = ', tfadtm
      end if

c     print out msg to user to enter new fade time
c
      call mesg(1235)
c
c     back up one row and print out msg to show current fade time
c
      call comvpt
      call comwin
      call getseg(txtseg)
      call jrclos
      call jropen (txtseg)

      hours = tfadtm / 60
      call cvitoc (hours,chhour)
      minute = mod(tfadtm,60)
```

```
       call cvitoc (minute,chmin)
       line(1:38) ='Current fade time in hh:mm format is: '
       line(39:43) = chhour // ':' // chmin
       call jmove(qcxmn + 1,qcymx - 1.3)
       call xsize (1.,1.)
       call xcolor (icolcm)
      call j1strg(line(1:43))
      call jrclos

c
c     get keyboard input
c
      error = 0
      call jkeybs(qdsdev,qpydev,qecho,5,newfad,ilen)
c
c     if user hit carriage return, then go to end of subroutine
c
      if (ilen .eq. 0) then
         call jpurge(txtseg)
         goto 300
      endif
c
c     convert fade time input of hh:mm input to integer minutes
c
      call convfad(newfad,temptm,ilen,error)
c
c     set longer flag true if new fade time is larger than old fade time
c     set longer false if new fade time is smaller than old fade time
c
      if (error .eq. 0) then
         if (temptm .ne. tfadtm) then
              if (temptm .lt. tfadtm) then
                   longer = .false.
              else if (temptm .gt. tfadtm) then
                   longer = .true.
              endif

c              if (trackn) then
c              end if

              tfadtm = temptm
c
c             if tnewst is 0 then no tracking data has been put on list,
c             else we know that at least 1 track has been processed.
c
              if (tnewst .ne. 0) then
c
c                reset the dtg
c
                 call fadchg(tfddtg)
c
c                jit: call routine to set boxes to invisible if faded.
c
                 call fadbox(tfddtg)
c
c                reset the fade index and display or erase tracks
c
                 call chgind(tfddtg,longer,tfaddx)

              endif
         endif
      endif
      goto 200
100   print*,'Error in fade time input'
200   continue
      call jpurge(txtseg)

300   continue

      if (trackn) print *, 'exit setfad'

      return
      end
```

```
C+++++++++++++++++++++++++++++++++++++++++++++++++++++++++++++++++++|*+*+*+*+
c  Unit Name : seticn
c
c  Functional Desription:   Sets scaling factor to make icons same
c                           size as in the construction area.
c
c  Global
c        qbxwmn,qbxwmx   Window coordinates of box area
c        qbywmn,qbywmx
c        xllbvp,yllbvp   Virtual coordinates of box area
c        xurbvp,yurbvp
c
c  Subroutines/functions called
c
c         JXXXX   Di-3000 Subroutines      See user's manual
c
c  Local
c     vx,vy,vz       window coordinates of current window
c     xl,yl,xh,yh    virtual coordinates of current viewport
c     dimvpt         minimum virtual distance of box
c                    (used for square area { if call bsqvpt is used} )
c     xscale         scaling factor to use if icon in box is to be
c                    same as icon in graphics area.
c     yscale         same as xscale
c
c  Programmer
c     Dirk Butson              8/13/85      Initial Entry
c
C-*-*-*-*-*-*-*-*-*-*-*-*-*-*-*-*-*-*-*-*-*-*-*-*-*-*-*-*-*-*-*-*-*-*|*-*-*-*-

      subroutine seticn(xscale,yscale)

      common /boxdim/ qbxwmn,qbxwmx,qbywmn,qbywmx
      real            qbxwmn,qbxwmx,qbywmn,qbywmx

      common /combvp/ xllbvp,yllbvp,xurbvp,yurbvp

      real vx(4),vy(4),vz(4)
      call jiwind(vx,vy,vz)
      call jconwv(vx(1),vy(1),vz(1),xl,yl)
      call jconwv(vx(3),vy(3),vz(3),xh,yh)
      dimvpt = amin1(xurbvp-xllbvp,yurbvp-yllbvp)
      xscale = ((vx(3) - vx(1))/(qbxwmx-qbxwmn)) /
     +         ((xh    - xl   )/(dimvpt))
      yscale = ((vy(3) - vy(1))/(qbywmx-qbywmn)) /
     +         ((yh    - yl   )/(dimvpt))
      return
      end


C+++++++++++++++++++++++++++++++++++++++++++++++++++++++++++++++++++|*+*+*+*+
C UNIT NAME:                       SETPRO
C
C FUNCTIONAL DESCRIPTION:          .
C
C CALLED BY:                       STATEC
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*|*-*-*-*-

      subroutine setpro
c
c     this subroutine is the set projection state interpreter (13)
c
      common /states/ nextst
      common /indpar/ indpro,indftr
c     map parameters
      logical lton(16),dotem
      integer ipgrid(4),ltyptb(16)
      common /map/ XRNM,XC,YC,LEVEL,CLAT,CLON,XRAD,YRAD,ITPROJ,
     +    IRES,LTYPTB,LUNDAT,LUNIND,LUNLIN,LTON,IPGRID,DOTEM,
     +    ORHALT
```

```
c
      itproj = indpro
      nextst = 14
c
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        SETSCA
C
C FUNCTIONAL DESCRIPTION:           .
C
C CALLED BY:                        STATEC
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine setsca
c
c     this subroutine is the set scale state interpreter (17)
c
      common /states/ nextst
      logical iseoc
      logical isnm,iskilo,ismile
c     map parameters
      logical lton(16),dotem
      integer ipgrid(4),ltyptb(16)
      common /map/ XRNM,XC,YC,LEVEL,CLAT,CLON,XRAD,YRAD,ITPROJ,
     +    IRES,LTYPTB,LUNDAT,LUNIND,LUNLIN,LTON,IPGRID,DOTEM,
     +    ORHALT
c
      initls = nextst
c     do until nextst not = initial state
  100 continue
          call getwrd
          if (iseoc().or.isnm()) then
c ***          set scale
               nextst = 14
          else if (iskilo()) then
c ***          convert number
c ***          set scale
               nextst = 14
          else if (ismile()) then
c ***          convert number
c ***          set scale
               nextst = 14
          else
c ***          set scale
               call putwrd
               nextst = 1
          endif
      if (nextst.eq.initls) go to 100
c
      return
      end

C+*+*+*+*+*+*+*+*+*+*+*+*+*+*+*+*+*+*+*+*+*+*+*+*+*+*+*+*+*+*+*+*+*+*+*|*+*+*+*+
C* UNIT NAME:                       setvar
C*
C* FUNCTIONAL DESCRIPTION:
C*
C*   Block data routine which initializes control variables to point
C* to the main menu (a block data routine is used in Fortran77 to
C* initialize large areas of common blocks).
C*
C*
C* INPUT FILES/PARAMETERS:
C*
C*      global variables described below
C*
```

```
C* OUTPUT FILES/PARAMETERS:
C*
C*     Global Variables
C*       qcancl          logical; cancel flag
C*       qext2m          logical; exit to main menu flag
C*       qretrn          logical; return to previous menu flag
C*       qstmnu          logical; flag to put current menu on the stack
C*       qmloc           integer; current location in the stack
C*       qnextm          integer; next menu to be displayed
C*       qcmpfl          logical; compass is present flag
C*
C* RESTRICTIONS:
C*
C*       not restricted
C*
C* SUBROUTINES CALLED:
C*
C*       no subroutines called
C*
C* CALLED BY:                   INIT, MHAND
C*
C* LOCAL VARIABLES:
C*
C*       no local variables
C*
C* ABNORMAL RETURN CONDITIONS:
C*
C*       no abnormal return conditions
C*
C* LOCATION:
C*
C*       /u2/vcn/a21proto/setvar
C*
C* PROGRAMMER:              DATE OF LAST CHANGE:    REASON FOR CHANGE:
C*
C*  VCNewton                    15 August 1983       initial entry
C*
C-*-*-*-*-*-*-*-*-*-*-*-*-*-*-*-*-*-*-*-*-*-*-*-*-*-*-*-*-*-*-*-*-*-*|*-*-*-*-

        subroutine setvar

C       Block data routine, initializes control variables to point to the
C       main menu

C        (**Declare common blocks and common block variables**)
         Integer qmloc,qnextm
         Logical qcancl,qext2m,qretrn,qstmnu
         Common /b1/ qcancl,qext2m,qretrn,qstmnu,qnextm
         Common /b4/ qmloc
         Common /comflg/qcmpfl
            Logical qcmpfl
c        print*,'Setvar -- enter'
C        (**Initialize control variables**)
         qcancl=.false.
         qext2m=.false.
         qretrn=.false.
         qstmnu=.false.
         qnextm=1
         qmloc=1
         qcmpfl = .false.
c        print*,'Setvar -- exit',qnextm
      End

C+*+*+*+*+*+*+*+*+*+*+*+*+*+*+*+*+*+*+*+*+*+*+*+*+*+*+*+*+*+*+*+*+*+*|*+*+*+*+
C UNIT NAME: sgn
C
C FUNCTIONAL DESCRIPTION:  Arithmetic signum function
C
C INPUT FILES/PARAMETERS:
C
C GLOBAL VARIABLES : NONE.
C
```

```
C OUTPUT FILES/PARAMETERS:  Returns true if x >= 0 (in ispos)
C
C SUBROUTINES/FUNCTIONS CALLED :
C
C CALLED BY:                      FDRAWV
C
C LOCAL VARIABLES: NONE.
C
C RESTRICTIONS: NONE.
C
C ABNORMAL RETURN CONDITIONS:    NONE.
C
C LOCATION:
C
C PROGRAMMER:                     DATE OF LAST CHANGE     REASON FOR CHANGE
C
C     Edward Swing                                        ORIGINAL CODE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine sgn(x,ispos)

        logical ispos

        if (x.ge.0.) then
            ispos = .true.
        else
            ispos = .false.
        endif

        return
        end


C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:          SHOVPT
c
c  Functional Description:
c       this subroutines sets the short menu area viewport
c
c  Input Files/Parameters:
c       xllmvp          REAL
c       xurmvp          REAL
c       yurmvp          REAL
c       yurbvp          REAL
c
c  Output Files/Parameters:        N/A
c
c  Subroutines/Functions Called:
c       Note: Subroutines preceded by a "j" are explained in the DI-3000 manual.
c
c  Called By:                      MAKSHO
c
c  Local Variables:   N/A
c
c  Restrictions:      N/A
c
c  Abnormal Return Conditions: N/A
c
c  Location:  /a21/dave
c
c  Programmer         Date of Last Change       Reason for Change
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
        subroutine shovpt
c
c       this subroutines sets the short menu area viewport
c
        common /commvp/ xllmvp,yllmvp,xurmvp,yurmvp
        common /combvp/ xllbvp,yllbvp,xurbvp,yurbvp
c
        call jvport (xllmvp,xurmvp,yurbvp,yurmvp)
c
        return
        end
```

```
C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: SHOWNM
C
C FUNCTIONAL DESCRIPTION:  FINDS AREA NAME AND RETURNS MAP PARAMETERS.
C
C INPUT FILES/PARAMETERS:
C
C        MSG                  CHAR*80     AREA NAME.
C        ISL                  INTEGER     LENGTH OF AREA NAME.
C
C GLOBAL VARIABLES :
C
C        QLUNNA               INTEGER     LOGICAL UNIT NUMBER FOR NAMES
C                                         FILE.
C
C OUTPUT FILES/PARAMETERS:
C
C        PARMS                INTEGER(4)  MINLAT,MAXLAT,MINLON,MAXLON.
C        FOUND                LOGICAL     INDICATES WHETHER AREA NAME WAS FOUND.
C
C SUBROUTINES/FUNCTIONS CALLED :
C
C        TOCAPS               CONVERTS LETTERS TO CAPITALS.
C
C CALLED BY:                    FSHOWA, ISAREA
C
C LOCAL VARIABLES:
C
C        CHATMP               CHAR*50     PATHNAME.
C
C RESTRICTIONS: NONE.
C
C ABNORMAL RETURN CONDITIONS:   NONE.
C
C LOCATION:                     /a21/gjf/MAPADD.FTN
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE SHOWNM (MSG,ISL,PARMS,FOUND,TYPEC)

C     THIS SUBROUTINE FINDS AN AREA NAME AND RETURNS MAP PARAMETERS

      REAL PARMS(4)

      INTEGER QKB,QICRT
      COMMON /TERMIN/ QKB,QICRT

      INTEGER QLUNNA
      COMMON /NMLIM/ QLUNNA,QAREAN,QAREAX

      CHARACTER*80 MSG
      CHARACTER*20 NAME
      CHARACTER*80 CHATMP
      CHARACTER TYPEC

      CHARACTER*50 QDFPTH
      common /mapath/ QDFPTH
      INTEGER QLENDF
      common /lenmap/ QLENDF
      INTEGER   isecs,imins
      REAL      c,cs
      COMMON    /c/ c,isecs,cs,imins

      LOGICAL FOUND
      DTORAD=C*60.
```

```
      CALL TOCAPS (MSG,ISL)
      if (qlendf.gt.0) then
          CHATMP = QDFPTH(1:QLENDF) // 'namlim.dat'
          lentmp = qlendf+10
      else
          chatmp = 'namlim.dat'
          lentmp = 10
      endif
      OPEN(UNIT=QLUNNA,FILE=CHATMP(1:lentmp),STATUS='OLD',
     + ERR=671)
      REWIND QLUNNA
      FOUND=.FALSE.

  100 CONTINUE

          READ(QLUNNA,1110,ERR=182,END=190) NAME(1:20),
     +    (PARMS(I),I=1,4),
     +    QCLAT,QCLON,QDLAT,QDLON,TYPEC
 1110     FORMAT(A20,2(F5.1,1X),6(F6.1,1X),A1)

          IF (NAME(1:ISL).EQ.MSG(1:ISL)) THEN

              FOUND=.TRUE.

              DO 150 I=1,4

                  IF (PARMS(I).GT.180.) PARMS(I)=PARMS(I)-360.
                  PARMS(I)=PARMS(I)*DTORAD

  150         CONTINUE

              GO TO 190

          ENDIF

          GO TO 100

  182 CONTINUE
c          PRINT*,'DECODE ERROR ON NAME LIMITS FILE'

  190 CONTINUE
      GO TO 699

  671 CONTINUE
c          PRINT*,'PLOT -- ERROR ON OPEN OF NAME LIMITS FILE'

  699 CONTINUE

C     MYCROFT CLOSE

      CLOSE(QLUNNA)

      RETURN
      END


C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                     SOVERL
c
c  Functional Description:        Utility to set write mask to the viewing
c                                 planes.  Sets mask for overlay planes.
c
c  Input Files/Parameters:        N/A
c
c  Output Files/Parameters:       N/A
c
c  Called By:                     CLRCOM, CLRFUL, CLRGRA, CLRVPT, DRWAMP,
C                                 FCFILL, GLTYPE, INIPIC, MAPPER
C                                 RESCON, GEOCON
c
c  Local Variables:
c    code        integer          escape code number
c    ilist       integer          array of integer parameters
```

```
c   ninteg     integer          number of integer parameters
c   nreal      integer          number of real paramenters
c   rlist      real             array of real parameters
c
c  Restrictions:                N/A
c
c  Subroutines/Functions Called:        N/A
c
c  Abnormal Return Conditions:          N/A
c
c  Location:                            /u1/a21/bap/sbakovr.f
c
c  Programmer: Brian A. Pelletier
c
C-*-*-*-*-*-*-*-*-*-*-*-*-*-*-*-*-*-*-*-*-*-*-*-*-*-*-*-*-*-*-*-*-*-*-*|*-*-*-*-

      SUBROUTINE SOVERL

c     set write mask to the viewing planes.  Sets mask for overlay planes.

        integer code, ninteg, nreal, ilist(1)
        real rlist(1)
        data code, ninteg, nreal/5127, 1, 0/
        data ilist(1)/248/
        call jescap(code, ninteg, nreal, ilist, rlist)
      return
      end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                   sparam

c  Functional Description:
c       this subroutine saves map parameters
c
c  Input Files/Parameters:

c  Output Files/Parameters: N/A

c  Subroutines/Functions Called:

c  Called By:                   RESCON, SAVDIS

c  Local Variables: N/A

c  Restrictions: N/A

c  Abnormal Return Conditions:  N/A

c  Location:       /a21/dave

c  Programmer          Date of Last Change        Reason for Change
c                                                 Original entry.
c  Tom Wescott  (NOSC)     11/87                  Add std parallels.
C
C-*-*-*-*-*-*-*-*-*-*-*-*-*-*-*-*-*-*-*-*-*-*-*-*-*-*-*-*-*-*-*-*-*-*-*|*-*-*-*-

        subroutine sparam (len,name,dataon,ierror)

c       this subroutine saves map parameters

        character*6 curwdb
        common /curwdb/ curwdb
        common /lenwdb/ lenwdb
        character*(*) name
        logical dataon
        character*50 filenm
        character*17 chastr
        logical lton(16),dotem
        integer ipgrid(4),ltyptb(16)
        common /map/ XRNM,XC,YC,LEVEL,CLAT,CLON,XRAD,YRAD,ITPROJ,
     +      IRES,LTYPTB,LUNDAT,LUNIND,LUNLIN,LTON,IPGRID,DOTEM,
     +      ORHALT
        common /conic/ spll1,spll2,tranl,trank,tranr,tscale,pole,tilt
```

```
      dimension ltypov(16)
      logical ltonov(16),rankt(26,16)
      common /maptoo/ ltypov,ltonov,rankt
      real retabl(4)
      integer intabl(17)
      character*50 classi
      common /classi/ classi
      common /lencla/ lencla
      common /overly/ overtb
      logical overtb(16)
      character*80 ovfnam
      common /ovfnam/ ovfnam
      common /lenovf/ lenovf
      logical filply,opnply
      common / polycb / filply,opnply
      data iversn/7/
      data ifl/9/,irdwr/1/

c     print*,'Enter sparam ',len,name
      filenm = name(1:len) // '.prm'
      call openit (filenm,len+4,ifl,irdwr,ierror)
      if (ierror.ne.0) go to 150
      call writin (ifl,iversn,1,ierror)
      retabl(1) = xc
      retabl(2) = yc
      retabl(3) = xrad
      retabl(4) = yrad
      call writre (ifl,retabl,4,ierror)
      retabl(1) = xrnm
      retabl(2) = clat
      retabl(3) = clon
      retabl(4) = orhalt
      call writre (ifl,retabl,4,ierror)
      do 120 i=1,4
          intabl(i) = ipgrid(i)
  120 continue
      intabl(5) = level
      intabl(6) = itproj
      intabl(7) = ires
      call writin (ifl,intabl,7,ierror)
      call logasc(lton,16,chastr(1:16))
      call logasc(dotem,1,chastr(17:17))
      call writch (ifl,chastr,17,ierror)
      call writch (ifl,curwdb,lenwdb,ierror)
      call writch (ifl,classi,lencla,ierror)
      overtb(5) = filply
      call logasc(overtb,16,chastr)
      call writch (ifl,chastr,16,ierror)
      call writch (ifl,ovfnam,lenovf,ierror)
c
c     Save the standard parallels.
      retabl(1) = splll
      retabl(2) = spll2
      retabl(3) = tilt
      call writre (ifl,retabl,3,ierror)
c
      go to 155
  150     continue
          ierror = 2
          print*,'Error in parameter file save'
c         call derror(30,'Problem saving parameter file ',.true.,5,ch)
  155 continue
      call closit (ifl)

      return
      end


C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                 SPCNWV
c
c  Functional Description:    SPCNWV is a special conversion routine
c                             for world-to-virtual conversions where
c                             the virtual value may be outside of the
```

```
c                           specified virtual space.  (This corrects
c                           errors which occurred by calling the
c                           routine JCONWV.)
c
c  Input Files/Parameters:
c    xpt       real        world x-value
c    ypt       real        world y-value
c
c  Output Files/Parameters:
c    xvpt      real        virtual x-value
c    yvpt      real        virtual y-value
c
c  Subroutines/Functions Called:
c    All subroutine names preceeded by a "j" are DI3000 subroutines.
c    For more information see the DI3000 Users Guide.
c
c  Called by:
c
c  Local Variables:
c    xllv      real        lower bound virtual x-value
c    xllw      real        lower bound world x-value
c    xurv      real        upper bound virtual x-value
c    xurw      real        upper bound world x-value
c    yllv      real        lower bound virtual y-value
c    yllw      real        lower bound world y-value
c    yurv      real        upper bound virtual y-value
c    yurw      real        upper bound world y-value
c
c  Restrictions: N/A
c
c  Abnormal Return Conditions: N/A
c
c  Location: N/A
c
c  Programmer: Alan V. Wenell
c
C-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine spcnwv (xpt, ypt, xvpt, yvpt)

      real           xllv
      real           xllw
      real           xpt
      real           xurv
      real           xurw
      real           xvpt
      real           yllv
      real           yllw
      real           ypt
      real           yurv
      real           yurw
      real           yvpt

c     print *, 'enter spcnwv'
c     print *, 'xpt, ypt = ', xpt, ypt

c ----- get current world parameters
      call j4rget (1, xllw, xurw, yllw, yurw)
c     print *, 'xllw, xurw, yllw, yurw: ', xllw, xurw, yllw, yurw

c ----- get current virtual parameters
      call j4rget (2, xllv, xurv, yllv, yurv)
c     print *, 'xllv, xurv, yllv, yurv: ', xllv, xurv, yllv, yurv

c ----- solve following equations for xvpt, yvpt:
c -----    (xvpt-xllv) / (xurv-xllv) = (xpt-xllw) / (xurw-xllw)
c -----    (yvpt-yllv) / (yurv-yllv) = (ypt-yllw) / (yurw-yllw)

      xvpt = (((xpt - xllw) * (xurv - xllv)) /
     +        (xurw - xllw)) + xllv

      yvpt = (((ypt - yllw) * (yurv - yllv)) /
     +        (yurw - yllw)) + yllv
```

```
c       print *, 'exit spcnwv'
c       print *, 'xvpt, yvpt = ', xvpt, yvpt

        return
        end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                  SPROJE
C
C FUNCTIONAL DESCRIPTION:     .
C
C CALLED BY:                  STATEC
C
C PROGRAMMER:                 DATE OF LAST CHANGE     REASON FOR CHANGE
c  S. Lamb              Feb 1988                     command fix - sproje
C
C-*-*-*-*-*-*-*-*-*-*-*-*-*-*-*-*-*-*-*-*-*-*-*-*-*-*-*-*-*-*-*-*-*-*-*|*-*-*-*-
c
        subroutine sproje
c
c       this subroutine is the projection state interpreter (12)
c
        common /states/ nextst
        logical isproj
        logical wordis,iseoc
c
        initls = nextst
c       do until nextst not = initial state
  100   continue
            call getwrd
            if (wordis('TO')) then
c * ** *** **** ***** ****** ******* not understood / implem.
                nextst = 15
            else if (iseoc()) then
                nextst = 5
            else if (isproj()) then
                nextst = 13
            else
                call putwrd
                nextst = 5
            endif
        if (nextst.eq.initls) go to 100
c
        return
        end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                  SSCALE
C
C FUNCTIONAL DESCRIPTION:     .
C
C CALLED BY:                  STATEC
C
C PROGRAMMER:                 DATE OF LAST CHANGE     REASON FOR CHANGE
c  S. Lamb              Feb 1988                     command fix - sscale
C
C-*-*-*-*-*-*-*-*-*-*-*-*-*-*-*-*-*-*-*-*-*-*-*-*-*-*-*-*-*-*-*-*-*-*-*|*-*-*-*-
c
        subroutine sscale
c
c       this subroutine is the scale state interpreter (16)
c
        common /states/ nextst
        logical wordis,iseoc
        logical isnumb
c
        initls = nextst
c       do until nextst not = initial state
  100   continue
            call getwrd
            if (wordis('TO')) then
```

```
c * ** *** **** ***** ****** ******* not understood / implem.
                nextst = 15
            else if (iseoc()) then
                nextst = 6
            else if (isnumb()) then
                nextst = 17
            else
                call putwrd
                nextst = 6
            endif
        if (nextst.eq.initls) go to 100
c
        return
        end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    STATEC
C
C FUNCTIONAL DESCRIPTION:       .
C
C CALLED BY:                    COMMND
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

        subroutine statec
c
c       this subroutine handles control of command states
c
        common /states/ nextst
c       print*,'statec -- enter'
        call getcmd

        nextst = 1
c       do until nextst = 0
  100   continue
c           print*,'statec -- next state is ',nextst
            if (nextst.eq.1) then
                                 call cmdmai
            else if (nextst.eq.2) then
                                 call drawst
            else if (nextst.eq.3) then
                                 call drcmap
            else if (nextst.eq.4) then
                                 call inqsta
            else if (nextst.eq.5) then
                                 call dispro
            else if (nextst.eq.6) then
                                 call dissca
            else if (nextst.eq.7) then
                                 call discen
            else if (nextst.eq.8) then
                                 call drawft
            else if (nextst.eq.9) then
                                 call majors
            else if (nextst.eq.10) then
                                 call minors
            else if (nextst.eq.11) then
                                 call calcpr
            else if (nextst.eq.12) then
                                 call sproje
            else if (nextst.eq.13) then
                                 call setpro
            else if (nextst.eq.14) then
                                 call erasem
            else if (nextst.eq.15) then
                                 call notund
            else if (nextst.eq.16) then
                                 call sscale
            else if (nextst.eq.17) then
                                 call setsca
            else if (nextst.eq.18) then
                                 call scente
```

```
            else if (nextst.eq.19) then
                                call setcor
            else if (nextst.eq.20) then
                                call areanf
            else if (nextst.eq.21) then
                                call incdet
            else if (nextst.eq.22) then
                                call decdet
            else if (nextst.eq.23) then
                                call incsca
            else if (nextst.eq.24) then
                                call decsca
            else if (nextst.eq.25) then
                                call erases
            else if (nextst.eq.26) then
                                call turnst

             else if (nextst.eq.27) then
                                call execut
             else if (nextst.eq.28) then
                                call savest
             else if (nextst.eq.29) then
                                call closes
             else if(nextst.eq.30) then
                                call removf
             else
                 print*,'statec -- nextst not known ',nextst
                 nextst = 1
             endif
         if (nextst.ne.0) go to 100
  190    continue
c        print*,'statec -- exit'
c
         return
         end

C++*+*+*+*+*+*+*+*+*+*+*+*+*+*+*+*+*+*+*+*+*+*+*+*+*+*+*+*+*+*+*+*+*+*|*+*+*+*+
C UNIT NAME:                       STORE
C
C FUNCTIONAL DESCRIPTION:          .
C
C CALLED BY:                       INTSCN, MHAND, SUBCHK
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

         subroutine store
         return
         end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       STOTXT
C
C FUNCTIONAL DESCRIPTION:          .
C
C CALLED BY:                       ANNOTA
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

         subroutine stotxt

c        stub subroutine
         return
         end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       STRIND
```

```
C
C FUNCTIONAL DESCRIPTION:       .
C
C CALLED BY:                    MHAND, SUBCHK
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine strind
        return
        end


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    SUBCAL
C
C FUNCTIONAL DESCRIPTION:       .
C
C CALLED BY:                    MHAND
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      Subroutine SUBCAL (menun,ierror)

C        (**Declare variables and common blocks**)

         Integer qcrmnu
         Common /b6/qcrmnu
         common /logseg/ nsglog
         logical logoon
         common /logoon/logoon
         logical sys
         common /sysdbc/ sys

         if (sys)
     +      print*,'subcal -- enter  menun qcrmnu : ',menun,qcrmnu
C        (**Draw menu**)
         mensav = qcrmnu
         call drawm (menun,ierror)
         if (ierror.eq.0) then
C           (**Execute appropriate menu controller**)
            if (qcrmnu.eq.1) then
               if (logoon) then
                 call jvisbl (nsglog,1)
                 call MMCON
                 call jvisbl (nsglog,0)
                 logoon = .false.
                 call jpurge (nsglog)
               else
                 call MMCON
               endif
            else if (qcrmnu.eq.2) then
               call GEOCON
            else if (qcrmnu.eq.3) then
               call FTRCON
            else if (qcrmnu.eq.4) then
               call OVRCON
            else if (qcrmnu.eq.5) then
               call PROCON
            else if (qcrmnu.eq.6) then
               call DETCON
            else if (qcrmnu.eq.7) then
               call RSLCON
            else if (qcrmnu.eq.8) then
               call RESCON
            else if (qcrmnu.eq.9) then
               call TRKCON
            else if (qcrmnu.eq.19) then
               call CLASS
               call mesg(1)
```

```
         else if (qcrmnu.eq.20) then
            call recdis
         else if (qcrmnu.eq.21) then
            call savdis
         else
            ierror = 3
            print*,'Missing menu controller for menu number ',qcrmnu
C           (**Else qcrmnu value is invalid, execute system**)
C           (**error routine                                **)
c           call MESG(1)
c           (**Set current menu back to previous menu**)
            qcrmnu = mensav
         endif
C        (**End case**)
      endif
      if (ierror.ne.0) then
         call mesg(ierror)
         call paws
      endif
      if (sys)
     +   print*,'subcal -- exit  ierror: ',ierror
      End

C+*+*+*+*+*+*+*+*+*+*+*+*+*+*+*+*+*+*+*+*+*+*+*+*+*+*+*+*+*+*+*+*+*+*+|*+*+*+*+
C UNIT NAME:                      subchk
C
C FUNCTIONAL DESCRIPTION:         Do essential check functions.
C
C INPUT FILES/PARAMETERS:
C     Menu control globals
C       qcancl       b1         logical  cancel flag
C       qext2m       b1         logical  exit to main menu flag
C       qretrn       b1         logical  return to previous action/menu
C
C     General globals
C       qfb          butons     integer  array of values for function buttons
C       qmb          butons     integer  array of values for the mouse buttons
C
C
C
C OUTPUT FILES/PARAMETERS:
C
C     error                     logical  true if an error is detected by
C                                        check
C     rflag                     logical  true if exiting the calling menu
C
C SUBROUTINES/FUNCTIONS CALLED
C
C     prompt                    displays a message on the screen and
C                               gets input from the user
C     redraw                    clear the screen and redraw it from segment
C                               storage
C     tmpstr                    temporary store the graphic
C
C
C CALLED BY:                      CHECK, HELP
C
C LOCAL VARIABLES:
C
C     ans                       char     answer returned from a prompt
C     button                    integer  button passed to check
C     cmenu                     integer  menu id of routine calling check
C     len                       integer  length of the answer returned
C                                        by a prompt
C
C RESTRICTIONS:
C
C
C ABNORMAL RETURN CONDITIONS:   n/a
C
C LOCATION:                     /u2/say/TEXT/source/check.f
C
```

```
C PROGRAMMER:                  DATE OF LAST CHANGE     REASON FOR CHANGE
C
C     SAYates                          10/27/83        initial entry
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine subchk (button,cmenu,error,rflag)

c     Do essential check functions

c*****definition and declaration of common blocks

      integer     qnextm
      logical     qcancl,qext2m,qretrn,qstmnu,qexitg
      common/b1/qcancl,qext2m,qretrn,qstmnu,qnextm
      common/b5/qexitg

      integer     qfb(26),qmb(4)
      common/butons/qfb,qmb

      common /msgold/ msgold,msgonm
      integer     qsegid,qpick
      logical     qmodfl
      common/picks/qsegid,qpick,qmodfl

c*****declaration of local variables

      integer     cmenu,button,len
      logical     rflag,error
      character*1 ans
      logical sys
      common /sysdbc/ sys

      if (sys) print*,'subchk -- enter ',button,cmenu

      qretrn = .false.
      rflag = .false.
      error = .false.


c*****beginning of routine

c*****leave
c      if((button .eq. qfb(26) .or. button .eq. qmb(2))
      if((button .eq. qfb(26) .or. button .eq. qmb(3))
     +      .and. cmenu .ne. 1) then
         qretrn = .true.
         rflag = .true.
c*****exit to main menu
      else if(button .eq. qfb(22)) then
         call prompt(4,ans,1,len)
         if(ans(1:1) .eq. 'y' .or. ans(1:1) .eq. 'Y') then
            qext2m = .true.
         endif
c*****temporary store
      else if(button .eq. qfb(25)) then
         call mesg(74)
         call store
         call strind
         if(qretrn) then
            rflag = .true.
         endif
         qretrn = .false.
c*****cancel
      else if(button .eq. qfb(21)) then
         call prompt(360,ans,1,len)
         if(ans .eq. 'y' .or. ans .eq. 'Y') then
            qcancl = .true.
         endif
c*****redraw
      else if(button .eq. qfb(20)) then
         call redraw
```

```
c*****exit graphics
      else if (button .eq. 95) then
         call prompt(4,ans,1,len)
         if(ans(1:1) .eq. 'y' .or. ans(1:1) .eq. 'Y') then
            qexitg = .true.
         else
            call menupr
         endif
      else
         error = .true.
      endif
      if (qcancl.or.qext2m.or.qexitg) rflag = .true.
      if (sys) print*,'subchk -- exit ',error,rflag
      return
      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      SUPBOX
C
C FUNCTIONAL DESCRIPTION:         .
C
C CALLED BY:                      PLTSUP
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine supbox(trec)

c     this subroutine is called to turn invisible a box around a plot which has
c     been suppressed. (jit)

      integer     tnum

      character*9 tbuf
      character*160 trec

      character*2 actmrk(260)
      integer*4 mrkcnt
      integer*4 trklst(260)
      integer*4 curseg(260)
      character*9 boxdtg(260)
      logical boxvis(260)

      common /actmrk/ trklst,mrkcnt,actmrk,curseg,
     +                boxdtg, boxvis

c     pull out the date time group from the record.

      read(trec,10) tnum,tbuf
   10 format(17x,i4,a9)

      do 20 i = 1,mrkcnt
         if (tnum .eq. trklst(i)) then
c           print *, 'trklst(i) is ', trklst(i)
c           print *, 'curseg(i) is ', curseg(i)
c           print *, ' '
            if (boxdtg(i) .eq. tbuf) then
               call jvisbl(curseg(i),0)
               boxvis(i) = .false.
            endif
         endif
   20 continue

      return

      end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      SYSNAM
C
```

```
C FUNCTIONAL DESCRIPTION:       RETURNS A PATHNAME FOR HLDF FILE WITHIN
C                               SYSTEM ADMINISTRATOR'S DIRECTORY
C
C INPUT PARAMETERS:
C
C   OLDNAM  -  CHAR*(*)  NAME OF HLDF FILE
C
C OUTPUT PARAMETERS:
C
C   NEWNAM  -  CHAR*(*)  COPY OF HLDF FILE BEING PRINTED IN SYSTEM
C                        ADMINISTRATOR'S DIRECTORY
C
C CALLED BY:
C
C   INTSCN - CHANGES VIEWPORT TO FULL SCREEN, REDRAWS PICTURE, SAVES FILE
C            IN SYSTEM ADMINISTRATOR'S DIRECTORY
C
C LOCAL VARIABLES:
C
C   I - INCREMENT THROUGH CHARACTER STRING OF NAMED HLDF FILE
C   LENGTH - THE MAXIMUM LENGTH TO INCREMENT THROUGH NAMED HLDF FILE
C
C RESTRICTIONS:
C
C   APOLLO DEPENDENT SUBROUTINE
C
C WRITTEN BY:
C
C    PROGRAMMER            DATE       REASON FOR CHANGE
C   DIRK BUTSON           850116        INITIAL ENTRY
C
C-*-*-*-*-*-*-*-*-*-*-*-*-*-*-*-*-*-*-*-*-*-*-*-*-*-*-*-*-*-*-*-*-*-*-*-*-*|*-*-*-*-
C
      SUBROUTINE SYSNAM(OLDNAM,NEWNAM)
C
C  RENAMES QNAME TO SAVE HLDF FILE IN SYSTEM ADMINISTRATOR'S DIRECTORY
C
      CHARACTER*(*) OLDNAM,NEWNAM
      INTEGER I,LENGTH

      NEWNAM(1:12) = '/A21/SYSTEM/'
      I = 1
      LENGTH = MIN ( LEN(NEWNAM)-12 , LEN(OLDNAM))
C ---- LOOP UNTIL END OF FILE NAME OR ALL OF SPACE FOR EITHER
C       CHARACTER STRING IS FILLED
   10 CONTINUE
      IF (I .LE. LENGTH .AND. OLDNAM(I:I) .NE. ' ') THEN
          NEWNAM((12+I):(12+I)) = OLDNAM(I:I)
          I = I+1
          GOTO 10
      ENDIF
      RETURN
      END


C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    TIMCHK
C
C FUNCTIONAL DESCRIPTION:        .
C
C CALLED BY:                    DATPOL
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine timchk
c
c     this subroutine checks if at least one minute has gone by
c     on the system clock since this routine was last called.
c     IF so, it fades out all tracks that are no longer in the fade time window
c

      logical click
```

```
      logical done
      character*9 curdtg
      character*9 olddtg

      character*160  trkrec (1000)
      common /trkrec/ trkrec
      integer trkndx (1000)
      common /trkndx/ trkndx
      integer tfaddx
      integer tfadtm
      common /tfadez/ tfaddx, tfadtm
      character*9 tfddtg
      common /tfddtg/ tfddtg
      integer numrcs
      common /numrcs/ numrcs
      integer tnewst
      integer toldst
      common /tarbou/ tnewst, toldst
      integer bgnpos
      integer endpos
      common /timpos/ bgnpos,endpos
      logical trackn
      common /trkdbc/ trackn

c
c      curdtg - current time from system clock
c      tfddtg - latest time that can be on the list to be displayed
c      olddtg - oldest time currently on the list being displayed
c      tfaddx - index to oldest non-faded track on the display list
c      click  - true if 1 min. has gone off clock since last check
c

c      check for a time click (one minute) gone by

       if (trackn)  print *, 'enter timchk'

c      if tfaddx is 0 then either no data on list or nothing visible

       if (tfaddx .ne. 0) then
          call chkclk(click,curdtg)
          if(click) then

c               function to compute cur. time - fade time
c               so that all tracks not in time range can
c               be set invisible.
c               tfddtg is globally used

                call fadtim(curdtg, tfddtg)
c
c               turn off all tracks that are later than lasdtg
c
                done = .false.
 100            if (done) goto 200
c                  get oldest dtg on current display list

                   olddtg(1:9) = trkrec(trkndx(tfaddx))(bgnpos:endpos)

c                  flag is true if first time is later than second

                   call cmptim(olddtg,tfddtg, done)

c                  when lasdtg is older than olddtg, we must
c                  make the track containing olddtg invisible

                   if (.not. done) then
                       if (trackn) then
                           print*,'timchk-- oldtime= ',olddtg
                           print*,'         fadtime= ',tfddtg
                           print *, '   tfaddx = ', tfaddx
                       end if

                       call makinv(tfaddx)
```

```
c
c***                jit: Check to see if point is most recent for that track.
c***                If it is, then delete box also.
c
                    call fadbox(tfddtg)
c
c                   check for end of circular list
c
                    if (tfaddx .eq. tnewst) then
                        done = .true.
                        tfaddx = 0
c
c                   check for nothing left on list, set tfaddx as flag
c
                    else
                        tfaddx = mod(tfaddx,numrcs) + 1
                    endif
               endif
           goto 100
 200       continue
       endif
    endif

    if (trackn)  print *, 'exit timchk'

    return
    end

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    TKINFO
C
C FUNCTIONAL DESCRIPTION:
C
C CALLED BY:                    FINDTK, TQUERY
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine tkinfo(chkndx,chkseg)

c
c     this subroutine prints info related to the track being interrogated
c     into the communications area
c
      character*160 line
      character*160 newlin
      character*7 lat
      character*8 lon

      integer button
      integer chkndx
      integer chkseg
      integer icolcm
      integer maxcol
      integer maxtxt
      integer tempseg
      integer trkcol

      integer latbeg,lonbeg,trkbeg,dtgbeg
      integer wrnbeg,pdgbeg,serbeg,repbeg
      integer fdibeg,altbeg,iffbeg,spdbeg
      integer latend,lonend,trkend,dtgend
      integer wrnend,pdgend,serend,repend
      integer fdiend,altend,iffend,spdend
      real qcxmn
      real qcymn
      real qcxmx
      real qcymx
      common/comwdo/qcxmn,qcymn,qcxmx,qcymx

      character*160  trkrec (1000)
      common /trkrec/ trkrec
```

```
      integer trkndx(1000)
      common /trkndx/ trkndx

      logical timout
      integer*2 time
      common /timout/ timout,time

      integer qdsdev,qpydev,qecho,qlecho
      common /device/ qdsdev,qpydev,qecho,qlecho
      logical boxon
      integer boxcur
      common /boxcur/ boxon,boxcur


      data latbeg,lonbeg,trkbeg,dtgbeg /3,10,18,22/
      data wrnbeg,pdgbeg,serbeg,repbeg /31,36,38,40/
      data fdibeg,altbeg,iffbeg,spdbeg /42,45,48,50/

      data latend,lonend,trkend,dtgend /9,17,21,30/
      data wrnend,pdgend,serend,repend /35,37,39,41/
      data fdiend,altend,iffend,spdend /44,47,49,52/
      data icolcm /16/
      data maxcol /53/
      data maxtxt /134/
      data trkcol /224/

      line = ' '
      line(1:maxtxt) = trkrec(trkndx(chkndx))(1:maxtxt)
      newlin = ' '
c
c***  add blanks to the text line between each field of data
c
      newlin(1:maxcol) = line(latbeg:latend)//' '//line(lonbeg:lonend)//'  '//
     +                   line(trkbeg:trkend)//' '//line(dtgbeg:dtgend)//' '//
     +                   line(wrnbeg:wrnend)//' '//line(pdgbeg:pdgend)//' '//
     +                   line(serbeg:serend)//' '//line(repbeg:repend)//' '//
     +                   line(fdibeg:fdiend)//' '//line(altbeg:altend)//' '//
     +                   line(iffbeg:iffend)//' '//line(spdbeg:spdend)
c
c     move to geographics area and
c     box the current plot that is being interrogated

      lat = line(latbeg:latend)
      lon = line(lonbeg:lonend)
      call gravpt
      call geowin
c
c***  boxon is set in fmain to false initially, to indicate
c***  that no box has ever been drawn around an interrogated
c***  track.  When the box is drawn for first time, get a
c***  segment# and use it every time for an interrogated plot.
c
      if (.not. boxon) then
            call getseg(boxcur)
            boxon = .true.
      endif

      call jropen(boxcur)
      call xcolor (trkcol)
      call hilplt(lat,lon)
      call jrclos
c
c***  move to communications area viewport,
c***  and put up text from track record.
c
      call comvpt
      call comwin
      call mesg(1203)
      call getseg(tempseg)

      call jropen(tempseg)
      call jmove(qcxmn + .6,qcymx - 1.3)
      call xsize (1.,1.)
      call xcolor (icolcm)
```

```
      call j1strg(newlin(1:maxcol))
      newlin(1:80) = line(maxcol+1:maxtxt)
      call jmove(qcxmn + .6,qcymx - 2.6)
      call j1strg(newlin(1:80))
      call jrclos
c
c***  wait for user to hit <f8> to continue
c
c***  set wait time to 360 so that data stays on screen for that long
c
      call buttn(button)
c
c***  set time back to 15 so that incoming tracking data gets checked
c***  every 15 seconds, as usual.
c
      call jpurge(boxcur)
      call jpurge(tempseg)
      call clrmsg


      return
      end

C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                     tocaps
c
c  Functional Description:
c       this subroutine converts a character string to all caps for letters
c
c  Input Files/Parameters:
c
c  Output Files/Parameters: N/A
c
c  Subroutines/Functions Called:
c      Note: Subroutines preceded by a "j" are explained in the DI-3000 manual.
c
c  Called By:                     GETCMD, LLCENT, PLTCIT, SHOWNM,
C                                 CLASS, OTHCLS
c
c  Local Variables: N/A
c
c  Restrictions: N/A
c
c  Abnormal Return Conditions:  N/A
c
c  Location:      /a21/dave
c
c  Programmer        Date of Last Change       Reason for Change
c
C-*-*-*-*-*-*-*-*-*-*-*-*-*-*-*-*-*-*-*-*-*-*-*-*-*-*-*-*-*-*-*-*-*-*-*|*-*-*-*-
c
        subroutine tocaps (char,len)
c
c       this subroutine converts a character string to all caps for letters
c
        character*(*) char
        character*1 ch1
        character*26 small,large
        data small/'abcdefghijklmnopqrstuvwxyz'/
        data large/'ABCDEFGHIJKLMNOPQRSTUVWXYZ'/
c
c       print*,'tocaps -- enter ',char(1:len),'    ',len
        do 110 i=1,len
            ch1 = char(i:i)
            indx = index(small,ch1)
            if (indx .ne. 0) then
                char(i:i) = large(indx:indx)
            endif
110   continue
c       print*,'tocaps -- exit  ',char(1:len),'    ',len
c
        return
        end
```

```
C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                       tolowr
c
c  Functional Description:
c       this subroutine converts a character string to all lower case
c
c  Called By:                       SETDBG
c
c  Programmer         Date of Last Change       Reason for Change
c
C-*-*-*-*-*-*-*-*-*-*-*-*-*-*-*-*-*-*-*-*-*-*-*-*-*-*-*-*-*-*-*-*-*-*-*|*-*-*-*-
c
        subroutine tolowr (char,len)
c
c       this subroutine converts a character string to all lower case
c
        character*(*) char
        character*1 ch1
        character*26 small,large
        data small/'abcdefghijklmnopqrstuvwxyz'/
        data large/'ABCDEFGHIJKLMNOPQRSTUVWXYZ'/
c
c       print*,'tolowr -- enter ',char(1:len),'   ',len
        do 110 i=1,len
            ch1 = char(i:i)
            indx = index(large,ch1)
            if (indx .ne. 0) then
                char(i:i) = small(indx:indx)
            endif
110   continue
c       print*,'tolowr -- exit  ',char(1:len),'   ',len
c
        return
        end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        TQUERY
C
C FUNCTIONAL DESCRIPTION:           .
C
C CALLED BY:                        TRKCON
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

      subroutine tquery

c
c     this subroutine allows user to interrogate a visible track
c     on the screen to retrieve more info on the track.
c
      logical abort
      logical endlst
      logical found

      integer chkndx
      integer chkseg
      integer pickid
      integer lctrak
      integer segnam

      integer qfb(26)
      integer qmb(4)
      common /butons/ qfb,qmb
      integer ltypov (16)
      logical ltonov (16)
      logical rankt (26, 16)
      common /maptoo/ ltypov, ltonov, rankt
      integer tkoset
      common /tkoset/ tkoset
      integer trkndx(1000)
      common /trkndx/ trkndx
```

```
      integer tfaddx
      integer tfadtm
      common /tfadez/ tfaddx, tfadtm
      integer tnewst
      integer toldst
      common /tarbou/ tnewst, toldst
      integer numrcs
      common /numrcs/ numrcs
      logical trackn
      common /trkdbc/ trackn

      data lctrak  /3/

c
c      if tracking  is on ... proceed with operations
c
       if (ltonov(lctrak)) then
c
c          ask user to pick a track for interrogation
c
           abort = .false.

           if (trackn) then
              print*,'tquery- tnewst/abort= ',tnewst,abort
           end if

 100       if (abort) goto 200
              if (tnewst .ne. 0) then
                  call mesg(1237)
                  call pick(ibuttn, segnam, pickid)
                  if (ibuttn .ne. 8 .and. ibuttn .ne. qfb(26)) then
                     if (trackn) then
                        print*,'in tquery-segnam/tfaddx/tnewst = ',
     +                        segnam,tfaddx,tnewst
                     end if
                     chkndx = mod(tfaddx,numrcs) - 1
                     found = .false.
                     endlst = .false.
c
c                    search list until a segment match is found
c                    or the end of the list is reached
c
 150                 if (found .or. endlst) goto 175
                         chkndx = mod(chkndx,numrcs) + 1
                         chkseg = trkndx(chkndx) + tkoset
                         if (chkseg .eq. segnam) then
                             found = .true.
                         else
                             if (chkndx .eq. tnewst) then
                                  endlst = .true.
                              endif
                         endif
                     goto 150
 175                 continue
c
c                    if match is found, then print information related
c                    to that particular track in the communications area
c
                     if (found) then
                         call tkinfo(chkndx,chkseg)
                     endif
                  else
                     abort = .true.
                  endif
              else
                  abort = .true.
              endif
          goto 100
 200      continue
      endif

      return
      end
```

```
C+*+*+*+*+*+*+*+*+*+*+*+*+*+*+*+*+*+*+*+*+*+*+*+*+*+*+*+*+*+*+*+*+*+*|*+*+*+*+
C UNIT NAME:                    TSTINI
C
C FUNCTIONAL DESCRIPTION:       .
C
C CALLED BY:                    INIT
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        subroutine tstini
c
c       (**Initialize variables for test of individual menus**)
c
        return
        end

C+*+*+*+*+*+*+*+*+*+*+*+*+*+*+*+*+*+*+*+*+*+*+*+*+*+*+*+*+*+*+*+*+*+*|*+*+*+*+
C UNIT NAME:                    TURNST
C
C FUNCTIONAL DESCRIPTION:       .
C
C CALLED BY:                    STATEC
C
C PROGRAMMER:                   DATE OF LAST CHANGE     REASON FOR CHANGE
c  S. Lamb                Feb 1988                 command fix - turnst
C
C-*-*-*-*-*-*-*-*-*-*-*-*-*-*-*-*-*-*-*-*-*-*-*-*-*-*-*-*-*-*-*-*-*-*-*|*-*-*-*-

        subroutine turnst
c
c       this subroutine is the 'turn' state interpreter (26)
c
        common /states/ nextst
        logical wordis,iseoc
c
        initls = nextst
c       do until nextst not = initial state
  100   continue
            call getwrd
            if (wordis('ON')) then
                nextst = 2
            else if (iseoc()) then
                nextst = 15
            else if (wordis('OFF')) then
                nextst = 25
            else
                nextst = 15
            endif
        if (nextst.eq.initls) go to 100
c
        return
        end

C+*+*+*+*+*+*+*+*+*+*+*+*+*+*+*+*+*+*+*+*+*+*+*+*+*+*+*+*+*+*+*+*+*+*|*+*+*+*+
C UNIT NAME:                    TXWRIT
C
C FUNCTIONAL DESCRIPTION:       .
C
C CALLED BY:                    WRITEX
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        subroutine txwrit(xarray,yarray,lpp,txline,lcnt)

c       this subroutine puts out textual information from a user
c       supplied input file.  The text overlays the graphics area and
c       is displayed in row order as 80 column records.
```

```
      character*80 txline(*)
      real xarray(2)
      real yarray(2)
      integer*4 boxseg
      integer*4 edgcol
      integer*4 txtseg
      integer*4 ibuttn
      integer*4 maxlen
      integer*4 lcnt
      integer*4 lpp
      integer*4 page
      integer*4 mysegn
      integer*4 nxtpag
c      integer*4 polcol
      integer*4 qbox,qbkgrd,qmcolr
      common/scratr/qbox,qbkgrd,qmcolr
      integer*4 prvpag
      logical rflag
      common/butons/qfb,qmb
      integer qfb(26),qmb(4)

c  jit nplane used to check for polygon fill.
      common /nplane/ nplane

      data edgcol /32/
c      data polcol /0/
      data maxlen /20/

      call geowin
      call gravpt

c     create new seg for filled polygon and
c     create new seg for text data

      call getseg(boxseg)
      call getseg(txtseg)
c      call jrclos

c     draw the rectangle to block out current
c     geographic data and move to first text position

      call jropen(boxseg)

c     this is a gold rectangle w/ background color of grey

      call xcolor(edgcol)
c      call jpidex(polcol,500)
      call jpidex(qbkgrd,500)
c  If on 4 plane node, then don't fill the polygon.
      if (nplane .ne. 4) then
         call jpintr(1)
      else
         call jpintr(0)
      endif

      call jrect(xarray(1)+.5,yarray(1)+.5,xarray(2)-.5,yarray(2)-.5)
      call jsize(1.,2.)
      call jjust(1,1)
      call jrclos

      nxtpag = qfb( 15 )
      prvpag = qfb( 16 )
      rflag = .false.
      page = 1
c     read each line in the file up to page limit or end of file
c     and display the text in the graphics area.

      call distxt(txtseg,txline,page,lpp,lcnt)

c     Initialize the constants 'next page' and 'previous page' to their
c     function buttn values.

 150  continue
         call mpick( ichoic, mysegn, ibuttn)
```

```
c         Check to see if one of the paging buttons has been picked.

          if ((ibuttn.eq.nxtpag).or.(ibuttn.eq.prvpag)) then

c             If a paging button has been picked but no paging can occur
c             because # of lines < lines per page, then inform user.

              if( lcnt .lt. lpp ) then
c                   "No previous/last page."
                    call mesg( 495 )
                    call paws
                    call clrmsg
                    call geowin
                    call gravpt


c             Else if 'ibuttn' = next page, then increment 'page'
c             and call 'distxt'.

              else if ( ibuttn.eq.nxtpag ) then
                   if ( page .lt. (int(lcnt / lpp)) + 1 ) then
                      page = page + 1
                      call jpurge(txtseg)
                          call redraw
                      call distxt(txtseg,txline,page,lpp,lcnt)

c                  If no more pages to scroll down, inform user.

                   else
c                     "This is the last page."
                       call mesg( 571 )
                       call paws
                       call clrmsg
                       call geowin
                       call gravpt
                   endif

c                  Else if 'ibuttn' = previous page, then decrement 'page'
c                  and call 'distxt'.

              else if ( ibuttn .eq. prvpag ) then
                   if ( page .gt. 1 ) then
                      page = page - 1
                      call jpurge(txtseg)
                          call redraw
                      call distxt(txtseg,txline,page,lpp,lcnt)

c                      If no more pages to scroll up, inform user.

                   else
c                     "This is the first page."
                       call mesg( 570 )
                       call paws
                       call clrmsg
                       call geowin
                       call gravpt
                   endif
              endif

c             Else, check for a system menu call.

          else
              call check( ibuttn, mysegn, error, rflag )
              if (rflag ) then
                  goto 180
              endif
          endif
          goto 150
180    continue
       call jpurge(txtseg)
       call jpurge(boxseg)
           call redraw

       return
       end
```

```
C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    UPDTMP
C
C FUNCTIONAL DESCRIPTION:       .
C
C CALLED BY:                    BOXARE, INTSCN, LLCENT
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        subroutine updtmp

c       substitute for CELEBRATION updtmp

        call drwmap

        return
        end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    VISCHK
C
C FUNCTIONAL DESCRIPTION:       .
C
C CALLED BY:                    NO LONGER USED BY CARICATURE
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

      subroutine vischk (length,vizibl,savef,newlat,newlon,longfl,
     1                   alat,alon,df,arc,itproj,icnt)

c     This subroutine divides the bearing into 10 parts of equal
c     length (i.e. if the bearing is to be drawn for 90 degrees,
c     one quarter of a great circle, then the bearing is divided
c     into segments of 9 degrees each).  It checks each of the 10
c     segments to see if any part of that segment is on the screen.
c
      real LNP,LNM,L0
      real minlat,maxlat,minlon,maxlon,length,newlat(30),newlon(30)
      real alimit(4),savef(30)
      integer icnt
      logical vizibl(30),longfl,chinv,allinv,someon
      common/constx/sazi,slat,cosazi,scazi,coslat,sinazi,cosi,
     1              sini,cosl0,cosf0,L0,lnp,lnm,f,f0
c     chinv = .true.

      do 200 i=1,icnt
         savef(i) = f
         call nextpt (longfl,alat,alon,df,arc,itproj)
         newlat(i) = alat
         newlon(i) = alon
         maxlat = alat
         maxlon = alon
         f = f + length/real(icnt)
         call nextpt (longfl,alat,alon,df,arc,itproj)
         if (maxlat .lt. alat) then
            minlat = maxlat
            maxlat = alat
         else
            minlat = alat
         endif
         if (maxlon .lt. alon) then
            minlon = maxlon
            maxlon = alon
         else
            minlon = alon
         endif

         alimit(1) = minlat
         alimit(2) = maxlat
```

```
         alimit(3) = minlon
         alimit(4) = maxlon

         chinv = .true.

         call checka(chinv,allinv,someon,alimit)

c        print*,'After checka -- chinv,allinv,someon,alimit : ',
c    +   chinv,allinv,someon,alimit

         if (someon) then
            vizibl(i) = .true.
         else
            vizibl(i) = .false.
         endif

  200 continue

      return
      end


C+*+*+*+*+*+*+*+*+*+*+*+*+*+*+*+*+*+*+*+*+*+*+*+*+*+*+*+*+*+*+*+*+*+*|*+*+*+*+
C UNIT NAME:                     WORDIS
C
C FUNCTIONAL DESCRIPTION:        .
C
C CALLED BY:                     21 subroutines
C
C PROGRAMMER:                    DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-

        logical function wordis (testwd)
c
c       this function compares the current word to a test word
c
        character*(*) testwd
        logical eol,eoc
        common /comnds/ lenl,indxw,lenw,eol,eoc
        character * 80 comlin
        common /comlin/ comlin
c
c       print*,'wordis -- enter ',testwd,lenw
        lent = len(testwd)
        if (lenw.gt.lent.or.lenw.le.0.or.
     +  comlin(indxw:indxw+lenw-1).ne.testwd(1:lenw)) then
            wordis = .false.
        else
            wordis = .true.
        endif
c       print*,'wordis -- exit ',wordis
c
        return
        end

C+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    writch

c  Functional Description:
c       this subroutine writes to ifl in character format

c
c  Input Files/Parameters:

c  Output Files/Parameters: N/A

c  Subroutines/Functions Called:

c  Called By:                    SAVTXT, SPARAM, WSAVPR

c  Local Variables: N/A

c  Restrictions: N/A
```

```
c  Abnormal Return Conditions:  N/A

c  Location:      /a21/dave

c  Programmer        Date of Last Change       Reason for Change
c  CS Lamb           1987             system dependent code - writch

C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine writch (ifl,charar,len,ierror)

c       this subroutine writes to ifl in character format

        character*(*) charar

        ierror = 0
C        write(ifl,*,err=199) '''',charar (1:len),''''
        write(ifl,1100,err=199) charar (1:len)
c ----- updated 7/31/87 CSL
C       USE THIS FORMAT FOR APOLLO, VAX, ...
c 1100   format(' ''', (a), '''')
C       USE THIS FORMAT FOR SUN
 1100   format("'", (a), "'")
c1100   format(a<len>)
        go to 200
 199        continue
            ierror = 2
c           call derror(30,'Problem writing parameter      ',.true.,5,ch)
 200    continue
c       print*,'writch -- charar,len,ierror : ',len,ierror

        return
        end


C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        WRITEX
C
C FUNCTIONAL DESCRIPTION:          .
C
C CALLED BY:                        TRKCON
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        subroutine writex(xarray,yarray,lpp)

        real xarray(2)
        real yarray(2)
        integer lpp
        character*20 filen
        character*80 txline(300)
        integer maxlen
        integer lunnum
        data lunnum /18/
        data maxlen /20/

c
c       prompt for file name to be read
c
        CALL PROMPT (1208,filen,MAXLEN,lenf)
        if (lenf .le. 0) then
           goto 400
        endif
        call clrmsg
c
c       open file and set graphics viewport
c
        open(unit=lunnum,file=filen(1:lenf),err=200,status='old')
        rewind(lunnum)
```

```
      lcnt = 0
      do 100 i= 1, 300
          txline(i) = ' '
          read(lunnum,10,err=110,end=110) txline(i)
 10       format(a80)
          lcnt = lcnt + 1
100   continue
110   close(lunnum)

      call txwrit(xarray,yarray,lpp,txline,lcnt)
      goto 400

200   print*,'could not open file for text output'
      goto 400
300   print*,'error in reading from text output file'

400   continue
      return
      end

C+*+*+*+*+*+*+*+*+*+*+*+*+*+*+*+*+*+*+*+*+*+*+*+*+*+*+*+*+*+*+*+*+*|*+*+*+*+
c  UNIT NAME:                    writin

c  Functional Description:
c       this subroutine writes to ifl in integer format (I5)
c
c  Input Files/Parameters:

c  Output Files/Parameters: N/A

c  Subroutines/Functions Called:

c  Called By:                    SPARAM, WSAVPR

c  Local Variables: N/A

c  Restrictions: N/A

c  Abnormal Return Conditions:  N/A

c  Location:      /a21/dave

c  Programmer        Date of Last Change      Reason for Change

C-*-*-*-*-*-*-*-*-*-*-*-*-*-*-*-*-*-*-*-*-*-*-*-*-*-*-*-*-*-*-*-*-*-*|*-*-*-*-

      subroutine writin (ifl,iarray,len,ierror)

c     this subroutine writes to ifl in integer format (I5)

      integer iarray(*)

      ierror = 0
      write(ifl,*,err=199) (iarray(i),i=1,len)
c     write(ifl,1100,err=199) (iarray(i),i=1,len)
c1100 format(<len>i5)
      go to 200
 199      continue
          ierror = 2
          print*,'Error on writin ',len,iarray(1)
c         call derror(30,'Problem writing parameter     ',.true.,5,ch)
 200  continue
c     print*,'writin -- iarray,len,ierror : ',(iarray(i),i=1,len),len,ierror

      return
      end

C+*+*+*+*+*+*+*+*+*+*+*+*+*+*+*+*+*+*+*+*+*+*+*+*+*+*+*+*+*+*+*+*+*|*+*+*+*+
C UNIT NAME:                    WRITIT
C
C FUNCTIONAL DESCRIPTION:
C
```

```
C CALLED BY:                    SAVARC, SAVCIR, SAVE
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine writit(ifl,iarray,len,ierror)

c       this routine writes a passed array to a file in I3 format
c     VARIABLES:
c       iarray- points to be written to file
c       ifl- logical unit number of the file to be accessed
c       ierror- integer flag set if error occurs during write


        integer iarray(*),ifl,ierror

c       initialize error to off
        ierror = 0

        write(ifl,1100,err=199) (iarray(i),i=1,len)
 1100   format(100i3)
        go to 200

  199   continue
          ierror = 2

 200   continue
       return
       end

C+*+*+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                   writre

c  Functional Description:
c       this subroutine writes to ifl in real format
c
c  Input Files/Parameters:

c  Output Files/Parameters: N/A

c  Subroutines/Functions Called:

c  Called By:                   SPARAM

c  Local Variables: N/A

c  Restrictions: N/A

c  Abnormal Return Conditions:  N/A

c  Location:      /a21/dave

c  Programmer         Date of Last Change       Reason for Change

C-*-*-*-*-*-*-*-*-*-*-*-*-*-*-*-*-*-*-*-*-*-*-*-*-*-*-*-*-*-*-*-*-*-*-*-*-*|*-*-*-*-

        subroutine writre (ifl,rarray,len,ierror)

c       this subroutine writes to ifl in real format

        real rarray(*)

c       print*,'Enter writre ',len
        ierror = 0
c       write(ifl,*,err=199) (rarray(i),i=1,len)
        write(ifl,1100,err=199) (rarray(i),i=1,len)
 1100   format(4f12.5)
        go to 200
  199       continue
            ierror = 2
            print*,'Error on writre ',len,rarray(1)
```

```
c          call derror(30,'Problem writing parameter     ',.true.,5,ch)
  200   continue
c       print*,'writre -- rarray,len,ierror : ',(rarray(i),i=1,4),len,ierror

        return
        end


C+*+*+*+*+*+*+*+*+*+*+*+*+*+*+*+*+*+*+*+*+*+*+*+*+*+*+*+*+*+*+*+*+*+*+*|*+*+*+*+
c  UNIT NAME:                    wsavpr
c
c  Functional Description:
c       write save file parameters
c
c  Input Files/Parameters:
c
c  Output Files/Parameters: N/A
c
c  Subroutines/Functions Called:
c
c  Called By:                    FMAIN
c
c  Local Variables: N/A
c
c  Restrictions: N/A
c
c  Abnormal Return Conditions:  N/A
c
c  Location:      /a21/dave
c
c  Programmer        Date of Last Change      Reason for Change
c
C-*-*-*-*-*-*-*-*-*-*-*-*-*-*-*-*-*-*-*-*-*-*-*-*-*-*-*-*-*-*-*-*-*-*-*-*|*-*-*-*-
c
        subroutine wsavpr (len,name)
c
c       write save file parameters
c
        character*(*) name
        character*80 savdes(20),filenm
        common /savdes/ savdes
        common /maxsav/ maxsav,limsav
        data ifl/9/,irdwr/0/
c
        filenm = name(1:len) // '.des'
        call openit (filenm,len+4,ifl,irdwr,ierror)
        if (ierror.ne.0) then
            print*,'Error on save descriptor open - using default'
            call openit ('default.des',11,ifl,irdwr,ierror)
            if (ierror.ne.0) go to 150
        endif
        call writin (ifl,maxsav,1,ierror)
        if (ierror.ne.0) go to 150
        if (maxsav.gt.0) then
            do 110 i=1,maxsav
                call writch (ifl,savdes(i),80,ierror)
                if (ierror.ne.0) go to 150
  110       continue
        endif
  150   continue
        call closit (ifl)
c
        return
        end


C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    XCOLOR
C
C FUNCTIONAL DESCRIPTION:       .
C
C CALLED BY:                    34 subroutines
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-
```

```
      subroutine xcolor(index)
      integer index,coltab(256)
      common /coltab/ coltab
      common/oneflg/oneflg
      logical oneflg

      if(oneflg)then
              call jcolor(1)
      else
              call jcolor(coltab(index+1))
      endif
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        XPIDEX
C
C FUNCTIONAL DESCRIPTION:            .
C
C CALLED BY:                        BOXCLR, CLRBVP, CLRVPT, DMAPII, DRICON
C                                   SETCOL
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine xpidex(index,inten)
      integer index,inten,coltab(256)
      common /coltab/ coltab
      call jpidex(coltab(index+1),inten)
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        XSIZE
C
C FUNCTIONAL DESCRIPTION:            .
C
C CALLED BY:                        CREATM, CRMESG, DISP5, MESGJF,
C                                   RECDIS, SAVDIS, SETFAD, TKINFO
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine xsize(x,y)
c
c     allows the system administrator to change the text size
c     of menus and messages
c
      common /txtsz/ txtsiz

      w = y * txtsiz
      z = x * txtsiz
      call jsize(z,w)
      return
      end
C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        FLSPLY
C
C FUNCTIONAL DESCRIPTION:           Processes a polygon which has been catenated
C                                   from WDBII file and appended with data from
C                                   the polygon fill file.  Polygons intersecting
C                                   a map breakline are clipped into sections.
C
C INPUT FILES/PARAMETERS:           code         - Tells how polygon was catenated.
C                                   lton(16)     - WDBII line types switched on.
C                                   noclip       - No conic breakline flag.
C
C GLOBAL VARIABLES:                 xplp,yplp    - Catenated polygon lon,lat coords.
```

```
C                             iplp       - Ptr to last point in WDB section.
C                             aplp       - Ptr to last point in ADD section.
C
C OUTPUT FILES/PARAMETERS:    Polygon is output to the display.
C
C SUBROUTINES CALLED:         llplxy,jpoly,jpolgn,blplin,blplgn
C
C CALLED BY:                   DMAPII
C
C LOCAL VARIABLES:
C
C RESTRICTIONS:               none.
C
C ABNORMAL RETURN CONDITIONS: none.
C
C PROGRAMMER:                 DATE OF LAST CHANGE     REASON FOR CHANGE
C     Tom Wescott (NOSC)      Dec 87                  Original entry.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      subroutine flsply(code,lton,noclip)

      logical lton(16), noclip
      integer code,null,concat,tpl,slp,eop,eos
      parameter (NULL   = 0)
      parameter (CONCAT = 1)
      parameter (TPL    = 2)
      parameter (SLP    = 5)
      parameter (EOP    = 6)
      parameter (EOS    = 7)

      include   'carmaxdim.inc'
c
c     Variables and Array for the Positive buffer
      integer   iplp,aplp
      real      xplp(IDIM),yplp(IDIM)
      common /bufptrp/ iplp,aplp
      common /bufaryp/ xplp,yplp
c
cccc
      if (code.eq.NULL.or.code.eq.TPL) then
c        This block of code is executed for two point lines or
c        lines which do not have line codes associated with them
c        (i.e. WDB files which have not been reordered using the
c              WDB_REORDER program).
c
         if (noclip) then
c           Transform the polygon.
            call llplxy(xplp,yplp,iplp,xplp,yplp,nout)
            iplp = nout
            if (iplp.gt.1) then
c              Draw the polygon outline.
               call jmove(xplp,yplp)
               call jpoly(xplp,yplp,iplp)
            endif
         else
c           Clip, transform, and draw the polygon outline.
            call blplin(xplp,yplp,iplp)
         endif
         call jupdat
c
      elseif (code.eq.SLP.or.code.eq.EOP) then
c        This block is executed for single and multiple line polygons
c
         if (noclip) then
c           Transform the polygon.
            call llplxy(xplp,yplp,iplp,xplp,yplp,nout)
            iplp = nout
            if (iplp.ge.3) then
c               Draw polygon with outline and fill.
                jedge = 0
                call jpolg2(xplp,yplp,iplp,jedge)
            endif
         else
```

```
c         Clip, transform, and draw polygon interior sections.
          call blplgn(xplp,yplp,iplp)
c         Clip, transform, and draw the polygon outline.
          call blplin(xplp,yplp,iplp)
        endif
        call jupdat
c
      elseif (code.eq.EOS) then
c       This block is executed when an End Of String code is encountered,
c       indicating fill file add points have been appended to the polyline.
c
        if (noclip) then
c         Transform the WDBII section.
          nin = iplp
          call llplxy(xplp,yplp,nin,xplp,yplp,nout)
          if (aplp.gt.iplp) then
c           Transform the appended section.
            nin = aplp - iplp
            j = iplp + 1
            k = nout + 1
            call llplxy(xplp(j),yplp(j),nin,xplp(k),yplp(k),nadd)
            aplp = nout + nadd
          endif
          iplp = nout
c
          maxplp = max0(iplp,aplp)
          if (maxplp.ge.3) then
c           Fill the appended polygon.
            jedge = 1
            call jpolg2(xplp,yplp,maxplp,jedge)
          endif
          if (lton(1) .and. iplp.ge.2) then
c           Draw outline for the WDBII section.
            call jmove(xplp,yplp)
            call jpoly(xplp,yplp,iplp)
          endif
c
        else
c         Clip, transform, and, fill the appended polygon.
          maxplp = max0(iplp,aplp)
          call blplgn(xplp,yplp,maxplp)
          if (lton(1) .and. iplp.ge.2) then
c           Clip, transform, and draw outline of the WDBII section.
            call blplin(xplp,yplp,iplp)
          endif
        endif
        call jupdat
      endif
c
      return
      end

C+*+*+*+*+*+*+*+*+*+*+*+*+*+*+*+*+*+*+*+*+*+*+*+*+*+*+*+*+*+*+*+*+*+*|*+*+*+*+
C UNIT NAME:                        FLSPOI
C
C FUNCTIONAL DESCRIPTION:
c -       This routine displays the positive and negative point buffers.
c -       If negative buffer (XPLN and YPLN) are only displayed for
c -       Mercator and Equirectangular projections.
C
C CALLED BY:                        NO LONGER USED BY CARICATURE
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*|*-*-*-*-
c
      subroutine flspoi(code,lton)

      INTEGER null,concat,tpl,slp,eop,eos
      PARAMETER (Null   = 0)
      PARAMETER (CONCAT = 1)
      PARAMETER (TPL    = 2)
      PARAMETER (SLP    = 5)
```

```
      PARAMETER (EOP    = 6)
      PARAMETER (EOS    = 7)

      LOGICAL lton(16)

      include   'carmaxdim.inc'
c
c     Variables and Array for the Positive buffer
      integer   iplp,aplp
      real      xplp(IDIM),yplp(IDIM)
      common /bufptrp/ iplp,aplp
      common /bufaryp/ xplp,yplp
c
c     Variables and Array for the Negative buffer
      integer   ipln,apln
      real      xpln(IDIM),ypln(IDIM)
      common /bufptrn/ ipln,apln
      common /bufaryn/ xpln,ypln

      INTEGER   code

      IF (code.EQ.null.OR.code.EQ.TPL) THEN
c
c        This block of code is executed for two point lines or
c        lines which do not have line codes associated with them
c        (i.e. WDB files which have not been reordered using the
c              WDB_REORDER program).
c
         IF (iplp.GT.1) THEN
            CALL jmove(xplp,yplp)
            CALL jpoly(xplp,yplp,iplp)
         ENDIF
         IF (ipln.GT.1) THEN
            CALL jmove(xpln,ypln)
            CALL jpoly(xpln,ypln,ipln)
         ENDIF
         CALL jupdat
      ELSEIF (code.EQ.SLP.OR.code.EQ.EOP) THEN
c
c        This block is executed for single and multiple line polygons
c

         IF (iplp.GE.3) THEN
             call jpedge(0)
             CALL jpolgn(xplp,yplp,iplp)
         ENDIF
         IF (ipln.GE.3) THEN
             call jpedge(0)
             CALL jpolgn(xpln,ypln,ipln)
         ENDIF
         CALL jupdat
      ELSEIF (code.EQ.EOS) THEN
c
c        This block is executed when an End Of String code is encountered.
c
         IF (aplp.GT.iplp.AND.aplp.GE.3) THEN
            call jpedge(1)
            CALL jpolgn(xplp,yplp,aplp)
         ENDIF
         if (lton(1) .and. iplp.GE.2) THEN
            CALL jmove(xplp,yplp)
            CALL jpoly(xplp,yplp,iplp)
         ENDIF
         CALL jupdat
         IF (apln.GT.ipln.AND.apln.GE.3) THEN
            call jpedge(1)
            CALL jpolgn(xpln,ypln,apln)
         ENDIF
         IF (lton(1) .and. ipln.GE.2) THEN
            CALL jmove(xpln,ypln)
            CALL jpoly(xpln,ypln,ipln)
         ENDIF
         CALL jupdat
      ENDIF
```

```
      RETURN
      END

C+*+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: GETLND
C
C FUNCTIONAL DESCRIPTION:  GETS A LINE INDEX RECORD.
C
C INPUT FILES/PARAMETERS:
C
C       LUNLIN                INTEGER     LOGICAL UNIT NUMBER FOR WDBII LINE
C                                         INDEX FILE.
C
C       LBLK                  INTEGER     BLOCK IN INDEX FILE WHERE LINES
C                                         ASSOCIATED WITH THIS AREA ARE STOR
C
C       LCATEG                INTEGER     CATEGORY OF LINES.
C       NLINES                INTEGER     NUMBER OF LINES.
C       RMINLA                REAL        MINIMUM LATITUDE.
C       RMAXLA                REAL        MAXIMUM LATITUDE.
C       RMINLO                REAL        MINIMUM LONGITUDE.
C       RMAXLO                REAL        MAXIMUM LONGITUDE.
C       LOFFS                 INTEGER     POINTS TO CURRENT LINE WITHIN CURR
C                                         LINE INDEX RECORD.
C
C       EOF                   LOGICAL     END OF FILE FLAG.
C       ICNTGE                INTEGER     CURRENT LINE INDEX RECORD
C                                         WITHIN CURRENT BLOCK.
C
C
C GLOBAL VARIABLES :
C
C       IMINS                 INTEGER     MINUTES IN 180 DEGREES.
C       C                     REAL        CONVERTS MINUTES TO RADIANS.
C       NLINDE                INTEGER     MAXIMUM NUMBER OF LINES IN LINE
C                                         INDEX RECORD.
C
C
C OUTPUT FILES/PARAMETERS:  NONE.
C
C SUBROUTINES/FUNCTIONS CALLED : NONE.
C
C CALLED BY: DMAPII.
C
C LOCAL VARIABLES: NONE.
C
C RESTRICTIONS: NONE.
C
C ABNORMAL RETURN CONDITIONS:   NONE.
C
C LOCATION:                     /gl
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C
C     DANIEL BERKICH (SAIC) NOSC                        Read both forms of
C                                                       Data base.
C
C
C-*-*-*-*-*-*-*-*-*-*-*-*-*-*-*-*-*-*-*-*-*-*-*-*-*-*-*-*-*-*-*-*-*-*-*-*-*-*-*|*-*-*-*-

        SUBROUTINE getlnd(lunlin,isblk,lblk,loffs,nlines,lcateg,
     +             rminla,rmaxla,rminlo,rmaxlo,eof)

      integer lunlin
      INTEGER   nlinde,lenlin,icntli
      COMMON    /lwdbii/ nlinde,lenlin,icntli
      INTEGER   isecs,imins
      REAL      c,cs
      COMMON    /c/ c,isecs,cs,imins
      INTEGER   ios
      INTEGER*2 segblk(8,32)
      common    /segblk/ segblk
      INTEGER   isblk
      INTEGER   sblk,soffs,lblk,loffs
      INTEGER   csblk,clblk,cpblk
      LOGICAL   va,eof
```

```
      common /inopen/ csblk,clblk,cpblk,va
      INTEGER*2 i2(2)
      INTEGER   i4
      EQUIVALENCE (i2,i4)
      INTEGER    two8
      PARAMETER (two8 = 2**8)
      REAL       rminla,rmaxla,rminlo,rmaxlo
      INTEGER    lcateg,nlines

      sblk = (isblk/nlinde) + 1
      soffs = mod(isblk,nlinde) + 1
      isblk = isblk + 1
      IF (csblk.NE.sblk) THEN
          csblk = sblk
          READ (lunlin,REC=sblk,IOSTAT=ios)
     +        segblk
        IF (ios.NE.0) THEN
          PRINT *,'GETSGM - Segment read error=',ios,'  Block=',sblk
          RETURN
        ENDIF
      ENDIF
700   CONTINUE

      IF (va) THEN
c        Version A format (long form)
         i2(1)   =  segblk(1,soffs)
         i2(2)   =  segblk(2,soffs)
         lblk    =  i4
         lcateg  =  segblk(3,soffs)/two8
         loffs   =  mod(segblk(3,soffs),two8)
         nlines  =  segblk(4,soffs)
         rminla = (segblk(5,soffs)-imins)*c
         rmaxla = (segblk(6,soffs)-imins)*c
         rminlo = (segblk(7,soffs)-imins)*c
         rmaxlo = (segblk(8,soffs)-imins)*c
      ELSE
c        Version S format (short form)
         lblk    =  segblk(1,soffs)
         lcateg  =  segblk(2,soffs)
         nlines  =  segblk(3,soffs)
         rminla = (segblk(4,soffs)-imins)*c
         rmaxla = (segblk(5,soffs)-imins)*c
         rminlo = (segblk(6,soffs)-imins)*c
         rmaxlo = (segblk(7,soffs)-imins)*c
         loffs   =  segblk(8,soffs)
      ENDIF

      IF (nlines.LT.1) eof = .true.

      RETURN
      END

C+++++++++++++++++++++++++++++++++++++++++++++++++++++++++++++++++++++|+++++++
C UNIT NAME:                      GETPLY
C
C FUNCTIONAL DESCRIPTION:         GETS A POLYLINE FROM WDBII FILE.
C
C INPUT FILES/PARAMETERS:
C
C       LUNDAT                    INTEGER      LOGICAL UNIT NUMBER FOR WDBII
C                                              DATA FILE.
C       PLAT                      REAL         LATITUDE OF POINT.
C       PLON                      REAL         LONGITUDE OF POINT.
C       IBLK                      INTEGER      CURRENT BLOCK OF DATA POINTS.
C       IOFFS                     INTEGER      CURRENT RECORD IN IBLK.
C       ERF                       INTEGER      ERROR CONDITION.
C
C GLOBAL VARIABLES :
C
C       ISECS                     INTEGER      MINUTES IN 180 DEGREES.
C       CS                        REAL         CONVERTS MINUTES TO RADIANS.
C       IRECDA                    INTEGER      RECORD INFO.
C       NDATAR                    INTEGER      NUMBER OF RECORDS IN BLOCK.
```

```
C        LENDAT                  INTEGER     NUMBER OF FIELDS IN EACH POINT REC
C        ICURPB                  INTEGER     CURRENT BLOCK IN DATA FILE WHERE P
C                                            ASSOCIATED WITH THIS AREA ARE STOR
C
C
C OUTPUT FILES/PARAMETERS:        NONE.
C
C SUBROUTINES/FUNCTIONS CALLED:   NONE.
C
C CALLED BY:                     NO LONGER USED BY CARICATURE
C
C LOCAL VARIABLES:                NONE.
C
C RESTRICTIONS: NONE.
C
C ABNORMAL RETURN CONDITIONS:     NONE.
C
C LOCATION:
C
C PROGRAMMER:              DATE OF LAST CHANGE         REASON FOR CHANGE
C     Tom Wescott                12/87               Extension of getpoi.
C
C-*-*-*-*-*-*-*-*-*-*-*-*-*-*-*-*-*-*-*-*-*-*-*-*-*-*-*-*-*-*-*-*-*-*-*-*|*-*-*-*-

      subroutine getply(lundat,pblk,poffs,npoint,lats,lons,ios)

      INTEGER   nlinde,lenlin,icntli
      COMMON    /lwdbii/ nlinde,lenlin,icntli
      INTEGER   nindex,lenind
      COMMON    /iwdbii/ nindex,lenind
      INTEGER   ndatar,lendat
      COMMON    /dwdbii/ ndatar,lendat
      INTEGER   isecs,imins
      REAL      c,cs
      COMMON    /c/ c,isecs,cs,imins
      INTEGER   lundat,ios
      INTEGER   poiblk(2,64)
      common    /poiblk/ poiblk
      INTEGER   pblk,poffs
      INTEGER   csblk,clblk,cpblk
      LOGICAL   va
      common /inopen/ csblk,clblk,cpblk,va
      INTEGER*2 i2(2)
      INTEGER   i4
      EQUIVALENCE (i2,i4)
      INTEGER    two8
      PARAMETER (two8 = 2**8)

      INTEGER   npoint
c
      INTEGER   plyblk(128), coffs
      REAL      lats(*), lons(*)
      INTEGER   ncoord, k

c
      coffs = poffs*lendat - 1
      ncoord = ndatar*lendat
      do 110 k = 1, npoint
         if (cpblk.ne.pblk) then
            read (lundat,rec=pblk,iostat=ios)
     +      plyblk
            cpblk = pblk
            if (ios.ne.0) then
               write(*)' GETPLY-read error=',ios,'Block=',pblk
               RETURN

            endif
         endif
         lats(k) = (plyblk(coffs)-isecs)*cs
         lons(k) = (plyblk(coffs+1)-isecs)*cs
         coffs = coffs + 2
         if (coffs.gt.ncoord) then
            pblk = pblk + 1
            coffs = 1
         endif
```

```
110   continue
      return
      end

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: GETPOI
C
C FUNCTIONAL DESCRIPTION:  GETS A POINT FROM WDBII FILE.
C
C INPUT FILES/PARAMETERS:
C
C       LUNDAT                  INTEGER     LOGICAL UNIT NUMBER FOR WDBII
C                                           DATA FILE.
C
C       PLAT                    REAL        LATITUDE OF POINT.
C       PLON                    REAL        LONGITUDE OF POINT.
C       IBLK                    INTEGER     CURRENT BLOCK OF DATA POINTS.
C       IOFFS                   INTEGER     CURRENT RECORD IN IBLK.
C       ERF                     INTEGER     ERROR CONDITION.
C
C GLOBAL VARIABLES :
C
C       ISECS                   INTEGER     MINUTES IN 180 DEGREES.
C       CS                      REAL        CONVERTS MINUTES TO RADIANS.
C       IRECDA                  INTEGER     RECORD INFO.
C       NDATAR                  INTEGER     NUMBER OF RECORDS IN BLOCK.
C       LENDAT                  INTEGER     NUMBER OF FIELDS IN EACH POINT REC
C       ICURPB                  INTEGER     CURRENT BLOCK IN DATA FILE WHERE P
C                                           ASSOCIATED WITH THIS AREA ARE STOR
C
C OUTPUT FILES/PARAMETERS:  NONE.
C
C SUBROUTINES/FUNCTIONS CALLED : NONE.
C
C CALLED BY: DMAPII.
C
C LOCAL VARIABLES: NONE.
C
C RESTRICTIONS: NONE.
C
C ABNORMAL RETURN CONDITIONS:   NONE.
C
C LOCATION:                     /a21/gjf/L3REA.FTN
C
C PROGRAMMER:                   DATE OF LAST CHANGE     REASON FOR CHANGE
C
C     DAVE NATION                                       ORIGINAL CODE.
C     JERRY FENERTY                                     DOCUMENT AND MODIFY
C                                                       FOR A21 PROTOTYPE.
C     DANIEL BERKICH (SAIC) NOSC                        Read both forms of
C                                                       Data base.
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE getpoi(lundat,pblk,poffs,plat,plon,ios)

      INTEGER   nlinde,lenlin,icntli
      COMMON    /lwdbii/ nlinde,lenlin,icntli
      INTEGER   nindex,lenind
      COMMON    /iwdbii/ nindex,lenind
      INTEGER   ndatar,lendat
      COMMON    /dwdbii/ ndatar,lendat
      INTEGER   isecs,imins
      REAL      c,cs
      COMMON    /c/ c,isecs,cs,imins
      INTEGER   lundat,ios
      INTEGER   poiblk(2,64)
      common    /poiblk/ poiblk
      INTEGER   pblk,poffs
      INTEGER   csblk,clblk,cpblk
      LOGICAL   va
      common /inopen/ csblk,clblk,cpblk,va
      INTEGER*2 i2(2)
      INTEGER   i4
```

```
      EQUIVALENCE (i2,i4)
      INTEGER    two8
      PARAMETER (two8 = 2**8)
      REAL       plat,plon

      IF (cpblk.NE.pblk) THEN
         READ (lundat,REC=pblk,IOSTAT=ios)
     +      poiblk
         cpblk = pblk
         IF (ios.NE.0) THEN
            print *,'GETPOI - Point read error=',ios,'  Block=',pblk
            RETURN
         ENDIF
      ENDIF
      plat  = (poiblk(1,poffs)-isecs)*cs
      plon  = (poiblk(2,poffs)-isecs)*cs
      poffs = poffs + 1
      IF (poffs.GT.ndatar) THEN
         pblk  = pblk + 1
         poffs = 1
      ENDIF

      RETURN
      END

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME: GTLIN
C
C FUNCTIONAL DESCRIPTION:  GETS A LINE.
C
C INPUT FILES/PARAMETERS:
C
C        LUNIND                 INTEGER     LOGICAL UNIT NUMBER FOR WDBII
C                                           INDEX FILE.
C
C        IBLK                   INTEGER     CURRENT BLOCK OF DATA POINTS.
C        IRNK                   INTEGER     RANK OF LINE.
C        NPOINT                 INTEGER     NUMBER OF POINTS IN LINE.
C        RMINLA                 REAL        MINIMUM LATITUDE.
C        RMAXLA                 REAL        MAXIMUM LATITUDE.
C        RMINLO                 REAL        MINIMUM LONGITUDE.
C        RMAXLO                 REAL        MAXIMUM LONGITUDE.
C        IOFFS                  INTEGER     CURRENT DATA POINT WITHIN IBLK.
C        LBLK                   INTEGER     BLOCK IN INDEX FILE WHERE LINES
C                                           ASSOCIATED WITH THIS AREA ARE STOR
C
C
C GLOBAL VARIABLES :
C
C        IMINS                  INTEGER     MINUTES IN 180 DEGREES.
C        C                      REAL        CONVERTS MINUTES TO RADIANS.
C        ICNTLI                 INTEGER     CURRENT LINE INDEX RECORD.
C        IRECIN                 INTEGER     RECORD INFO.
C        NINDEX                 INTEGER     MAXIMUM NUMBER OF LINES IN RECORD.
C        LENIND                 INTEGER     NUMBER OF FIELDS IN EACH LINE RECO
C        ICURLB                 INTEGER     CURRENT BLOCK IN INDEX FILE WHERE
C                                           ASSOCIATED WITH THIS AREA ARE STOR
C
C
C OUTPUT FILES/PARAMETERS:  NONE.
C
C SUBROUTINES/FUNCTIONS CALLED : NONE.
C
C CALLED BY: DMAPII.
C
C LOCAL VARIABLES: NONE.
C
C RESTRICTIONS: NONE.
C
C ABNORMAL RETURN CONDITIONS:   NONE.
C
C LOCATION:                     /gl
C
C PROGRAMMER:                   DATE OF LAST CHANGE     REASON FOR CHANGE
C
C     DAVE NATION                                       ORIGINAL CODE.
```

```
C     JERRY FENERTY                              DOCUMENT AND MODIFY
C                                                FOR A21 PROTOTYPE.
C     DANIEL BERKICH (SAIC) NOSC                 Read both forms of
C                                                Data base.
C
C
C-*-*-*-*-*-*-*-*-*-*-*-*-*-*-*-*-*-*-*-*-*-*-*-*-*-*-*-*-*-*-*-*-*-*-*-*-*|*-*-*-*-

      SUBROUTINE gtlin(lunind,lblk,loffs,pblk,poffs,npoint,irnk,
     +            rminla,rmaxla,rminlo,rmaxlo,ios)
      INTEGER nindex,lenind
      COMMON /iwdbii/ nindex,lenind
      INTEGER isecs,imins
      REAL    c,cs
      COMMON /c/ c,ISECS,CS,imins
      INTEGER   lunind,ios
      INTEGER*2 linblk(8,32)
      common    /linblk/ linblk
      INTEGER   lblk,loffs,pblk,poffs
      INTEGER   csblk,clblk,cpblk
      LOGICAL   va
      common /inopen/ csblk,clblk,cpblk,va
      INTEGER*2 i2(2)
      INTEGER   i4
      EQUIVALENCE (i2,i4)
      INTEGER    two8
      logical vax
      common /vaxdbc/ vax
      PARAMETER (two8 = 2**8)
      REAL      rminla,rmaxla,rminlo,rmaxlo
      INTEGER   npoint,irnk

      IF (clblk.NE.lblk) THEN
         READ (lunind,REC=lblk,IOSTAT=ios)
     +      linblk
         clblk = lblk
         IF (ios.NE.0) THEN
            PRINT *,'GETLIN - Line read error=',ios,'  Block=',lblk
            RETURN
         ENDIF
      ENDIF
      IF (va) THEN
C        Version A format (long form)
         if (vax) then
           i2(1)  =  linblk(1,loffs)
           i2(2)  =  mod(linblk(2,loffs),two8)
           pblk   =  i4
C        ---- Convert rank to short index form ----
           irnk   =  (linblk(2,loffs)/two8)*two8 +
     +                mod(linblk(3,loffs),two8)
         else
           i2(1)  =  mod(linblk(1,loffs),two8)
           i2(2)  =  linblk(2,loffs)
           pblk   =  i4
C        ---- Convert rank to short index form ----
           irnk   =  mod(linblk(3,loffs),two8)
         endif
         poffs  =  linblk(3,loffs)/two8
         npoint =  linblk(4,loffs)
         rminla = (linblk(5,loffs)-imins)*c
         rmaxla = (linblk(6,loffs)-imins)*c
         rminlo = (linblk(7,loffs)-imins)*c
         rmaxlo = (linblk(8,loffs)-imins)*c
      ELSE
C        Version S format (short form)
         pblk   =  linblk(1,loffs)
         irnk   =  linblk(2,loffs)
         npoint =  linblk(3,loffs)
         rminla = (linblk(4,loffs)-imins)*c
         rmaxla = (linblk(5,loffs)-imins)*c
         rminlo = (linblk(6,loffs)-imins)*c
         rmaxlo = (linblk(7,loffs)-imins)*c
         poffs  =  linblk(8,loffs)
      ENDIF
      loffs = loffs + 1
```

```
      IF (loffs.GT.nindex) THEN
         lblk  = lblk + 1
         loffs = 1
      ENDIF

      RETURN
      END

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       INTPOI
C
C FUNCTIONAL DESCRIPTION:
c -   Description: This routine intializes the point buffer indices.
C
C CALLED BY:                       DMAPII
C
C PROGRAMMER:                      DATE OF LAST CHANGE     REASON FOR CHANGE
C -   DAN BERKICH -SAIC-               OCTOBER 1986         POLYGON FILL
C
C-*-*-*-*-*-*-*-*-*-*-*-*-*-*-*-*-*-*-*-*-*-*-*-*-*-*-*-*-*-*-*-*-*-*-*-*|*-*-*-*-
c
        SUBROUTINE intpoi(isgood)

      include   'carmaxdim.inc'
c
c     Variables and Array for the Positive buffer
      integer   iplp,aplp
      real      xplp(IDIM),yplp(IDIM)
      common /bufptrp/ iplp,aplp
      common /bufaryp/ xplp,yplp
c
c     Variables and Array for the Negative buffer
      integer   ipln,apln
      real      xpln(IDIM),ypln(IDIM)
      common /bufptrn/ ipln,apln
      common /bufaryn/ xpln,ypln

      LOGICAL   isgood
      LOGICAL   posbuf

      REAL maxx,maxx2
      COMMON /maxx/ maxx,maxx2
      common /posbuf/posbuf
800   FORMAT(x,'Warning... Exceeded point buffer size of ',i4)

      iplp = 0
      ipln = 0
      aplp = 0
      apln = 0
      posbuf = isgood
      maxx2 = 2 * maxx

      RETURN
      END

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                       MRKPOI
C
C FUNCTIONAL DESCRIPTION:
c -   Description: This entry is for marking the begining of the change
c -                points in the positive and negative buffers.
C
C CALLED BY:                       DMAPII
C
C PROGRAMMER:                      DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-
c
      subroutine mrkpoi

      include   'carmaxdim.inc'
c
```

```
c     Variables and Array for the Positive buffer
      integer   iplp,aplp
      real      xplp(IDIM),yplp(IDIM)
      common /bufptrp/ iplp,aplp
      common /bufaryp/ xplp,yplp
c
c     Variables and Array for the Negative buffer
      integer   ipln,apln
      real      xpln(IDIM),ypln(IDIM)
      common /bufptrn/ ipln,apln
      common /bufaryn/ xpln,ypln

      aplp = iplp
      apln = ipln

      RETURN
      END

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                         RDLINE
C
C FUNCTIONAL DESCRIPTION:
c -   Description: read a line index record
c -
c -      LBLK -  index to line record, obtained initially from segemnt
c -              record and incremented after each read.
c -      PBLK -  index where first point exists in the point file.
c -      PCNT -  number of points for the line
C
C CALLED BY:                         DMAPII
C
C PROGRAMMER:                        DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
      SUBROUTINE rdline(line,ppblk,pcnt
     +                 ,rminlat,rminlon,rmaxlat,rmaxlon,lblkoff,ios)

      INTEGER  lunit
      PARAMETER (lunit = 68)

      INTEGER   ios
      INTEGER   lblk,ppblk,pcnt,lblkoff
      INTEGER   line,loffs
      INTEGER*2 i2(2)
      REAL      rminlat,rminlon,rmaxlat,rmaxlon
      INTEGER   i4
      EQUIVALENCE (i2,i4)

      INTEGER isecs,imins
      REAL    c,cs
      COMMON /c/ c,ISECS,CS,imins

      INTEGER   cpsblk,cplblk,cppblk
      COMMON /cpblks/ cpsblk,cplblk,cppblk,va

      INTEGER*2 clnblk(8,32)
      COMMON /clnblk/ clnblk

      INTEGER nindex,lenind
      COMMON /IWDBII/ NINDEX,LENIND

      ppblk = 0
      pcnt = 0

      IF (line.gt.0) THEN
        lblk = ((line-1)/nindex) + 1
        loffs = mod((line-1),nindex) + 1
        line = line + 1
        IF (cplblk.NE.lblk) THEN
           READ (lunit,REC=lblk,IOSTAT=ios)
     +        clnblk
           cplblk = lblk
```

```
         ENDIF
         ppblk    =  clnblk(1,loffs)
         pcnt     =  clnblk(2,loffs)
         rminlat = (clnblk(3,loffs)-imins)*c
         rminlon = (clnblk(4,loffs)-imins)*c
         rmaxlat = (clnblk(5,loffs)-imins)*c
         rmaxlon = (clnblk(6,loffs)-imins)*c
         i2(1)    =  clnblk(7,loffs)
         i2(2)    =  clnblk(8,loffs)
         lblkoff =  i4
       ENDIF
       RETURN
       END

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                         RDPNT
C
C FUNCTIONAL DESCRIPTION:
c -   Description: read a POINT record
c -             PBLK -  Point block for read,  obtained from line
c -                     record.  Incremented after read.
c -             RLAT -  latitude
c -             RLON -  longitude
C
C CALLED BY:                          DMAPII
C
C PROGRAMMER:                         DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*-*|*-*-*-*-
c
      SUBROUTINE rdpnt(point,rlat,rlon,ios)

      INTEGER   punit
      PARAMETER (punit = 67)

      INTEGER   ios
      INTEGER   point,pblk,poffs
      REAL      rlat,rlon

      INTEGER isecs,imins
      REAL    c,cs
      COMMON /c/  c,ISECS,CS,imins

      INTEGER   cpsblk,cplblk,cppblk
      COMMON /cpblks/ cpsblk,cplblk,cppblk,va

      INTEGER   cptblk(2,64)
      COMMON  /cptblk/ cptblk

      INTEGER ndatar,lendat
      COMMON /DWDBII/ NDATAR,LENDAT

      IF (point.gt.0) THEN
        pblk = ((point-1)/ndatar) + 1
        poffs = mod((point-1),ndatar) + 1
        point = point + 1
        IF (cppblk.NE.pblk) THEN
           READ (punit,REC=pblk,IOSTAT=ios)
     +        cptblk
           cppblk = pblk
        ENDIF
        rlat  =  (cptblk(1,poffs)-isecs)*cs
        rlon  =  (cptblk(2,poffs)-isecs)*cs
      ENDIF
      RETURN
      END

C+*+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                         RDSEG
C
C FUNCTIONAL DESCRIPTION:
c -   Description: read a segment record
```

```
c -     SEGMENT-index to segment record, incremented after each read.
c -     LBLK  - index where first line exists in the line file.
c -     LCODE - Code indicating whether or not to fill entire segment
C
C CALLED BY:                        DMAPII
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
      SUBROUTINE rdseg(segment,llblk,lcnt,lcode
     +                  ,rminlat,rminlon,rmaxlat,rmaxlon,ios)
c
c    start read
c
      INTEGER   sunit
      PARAMETER (sunit = 69)

      INTEGER   ios
      INTEGER   llblk,lcnt
      INTEGER*2 lcode
      INTEGER   segment,sblk,soffs
      REAL      rminlat,rminlon,rmaxlat,rmaxlon

      INTEGER isecs,imins
      REAL    c,cs
      COMMON /c/ c,ISECS,CS,imins

      INTEGER   cpsblk,cplblk,cppblk
      COMMON /cpblks/ cpsblk,cplblk,cppblk,va

      INTEGER*2 csgblk(8,32)
      COMMON /csgblk/csgblk

      INTEGER nlinde,lenlin
      COMMON /LWDBII/ NLINDE,LENLIN,icntli

      sblk = ((segment-1)/nlinde) + 1
      soffs = mod((segment-1),nlinde) + 1
      IF (cpsblk.NE.sblk) THEN
         cpsblk = sblk
         READ (sunit,REC=sblk,IOSTAT=ios)
     +         csgblk
      ENDIF

      llblk   =  csgblk(1,soffs)
      lcnt    =  csgblk(2,soffs)
      lcode   =  csgblk(3,soffs)
      rminlat = (csgblk(5,soffs)-imins)*c
      rminlon = (csgblk(6,soffs)-imins)*c
      rmaxlat = (csgblk(7,soffs)-imins)*c
      rmaxlon = (csgblk(8,soffs)-imins)*c

      RETURN
      END

C+*+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                        SAVCPT
C
C FUNCTIONAL DESCRIPTION:
c -        This routine is for saving points read from the change file.
c -        These are the points added to complete a polygon.
C
C CALLED BY:                        NO LONGER USED BY CARICATURE
C
C PROGRAMMER:                       DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine savcpt(xpl,ypl)

      real xpl,ypl
```

```
      include   'carmaxdim.inc'
c
c     Variables and Array for the Positive buffer
      integer   iplp,aplp
      real      xplp(IDIM),yplp(IDIM)
      common /bufptrp/ iplp,aplp
      common /bufaryp/ xplp,yplp
c
c     Variables and Array for the Negative buffer
      integer   ipln,apln
      real      xpln(IDIM),ypln(IDIM)
      common /bufptrn/ ipln,apln
      common /bufaryn/ xpln,ypln

      LOGICAL   posbuf

      REAL maxx,maxx2
      COMMON /maxx/ maxx,maxx2
      common /posbuf/posbuf

      IF (aplp.LT.IDIM) THEN
         aplp = aplp + 1
         yplp(aplp) = ypl
         IF (xpl.GE.0.OR.posbuf) THEN
            xplp(aplp) = xpl
         ELSE
            xplp(aplp) = amin1(maxx,maxx2 + xpl)
         ENDIF
         IF (.NOT.posbuf) THEN
            apln = apln + 1
            ypln(apln) = ypl
            IF (xpl.GE.0) THEN
               xpln(apln) = amax1(-maxx,-maxx2 + xpl)
            ELSE
               xpln(apln) = xpl
            ENDIF
         ENDIF
      ELSE
         PRINT 800,IDIM
      ENDIF

800   FORMAT(x,'Warning... Exceeded point buffer size of ',i4)

      RETURN
      END

C+*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                      SAVPOI
C
C FUNCTIONAL DESCRIPTION:
c -   This routine is for saving points read from the WDBIIx point file.
C
C CALLED BY:                      NO LONGER USED BY CARICATURE
C
C PROGRAMMER:                     DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*|*-*-*-*-
c
      subroutine savpoi(xpl,ypl)

      real xpl,ypl

      include   'carmaxdim.inc'
c
c     Variables and Array for the Positive buffer
      integer   iplp,aplp
      real      xplp(IDIM),yplp(IDIM)
      common /bufptrp/ iplp,aplp
      common /bufaryp/ xplp,yplp
c
c     Variables and Array for the Negative buffer
      integer   ipln,apln
      real      xpln(IDIM),ypln(IDIM)
```

```
      common /bufptrn/ ipln,apln
      common /bufaryn/ xpln,ypln

      LOGICAL   posbuf

      REAL maxx,maxx2
      COMMON /maxx/ maxx,maxx2
      common /posbuf/posbuf

      IF (iplp.LT.IDIM) THEN
        iplp = iplp + 1
        yplp(iplp) = ypl
        IF (xpl.GE.0.OR.posbuf) THEN
           xplp(iplp) = xpl
        ELSE
           xplp(iplp) = amin1(maxx,maxx2 + xpl)
        ENDIF
        IF (.NOT.posbuf) THEN
           ipln = ipln + 1
           ypln(ipln) = ypl
           IF (xpl.GE.0) THEN
              xpln(ipln) = amax1(-maxx,-maxx2 + xpl)
           ELSE
              xpln(ipln) = xpl
           ENDIF
        ENDIF
      ELSE
         PRINT 800,IDIM
      ENDIF

800   FORMAT(x,'Warning... Exceeded point buffer size of ',i4)

      RETURN
      END

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                         SVEADD
C
C FUNCTIONAL DESCRIPTION:            Reads points for the change file, and
C                                    appends them to the polyline buffer.
C                                    Appended segments forced to great circles.
C
C INPUT FILES/PARAMETERS:            pntblk,poicnt - location and # of add points.
C                                    xplp,yplp     - Polyline buffers
C                                    iplp,aplp     - ptrs to polyline section ends.
C
C OUTPUT FILES/PARAMETERS:           xplp,yplp,aplp  - Including appendix
C
C SUBROUTINES CALLED:                ll2gc
C
C CALLED BY:                         DMAPII
C
C PROGRAMMER:                        DATE OF LAST CHANGE      REASON FOR CHANGE
C    Tom Wescott   (NOSC)            Apr 89                   Replace svecpt
C-*-*-*-*-*-*-*-*-*-*-*-*-*-*-*-*-*-*-*-*-*-*-*-*-*-*-*-*-*-*-*-*-*-*-*-*|*-*-*-*-
c        not in 3.0
      subroutine sveadd(pntblk,poicnt)

      parameter (MAX=1000)
      real xtmp(MAX), ytmp(MAX)
      integer pntblk,poicnt
      logical append

      include   'carmaxdim.inc'
C
C     Variables and Array for the polyline buffer
      integer   iplp,aplp
      real      xplp(IDIM),yplp(IDIM)
      common /bufptrp/ iplp,aplp
      common /bufaryp/ xplp,yplp
C
      if (iplp.gt.0) then
C        This will be an appendix, get original end point.
```

```
         i = 1
         xtmp(i) = xplp(iplp)
         ytmp(i) = yplp(iplp)
         append = .true.
      else
C        Not an appendix, This will be the entire polygon.
         i = 0
         append = .false.
      endif
C
C     Get all verticies in the add polyline.
      if (poicnt.gt.0) then
         do 110 ii = 1, poicnt
            call rdpnt(pntblk,plat,plon,ios)
            i = i + 1
            ytmp(i) = plat
            xtmp(i) = plon
C           Truncate those damn add points near the south pole.
            ytmp(i) = amax1(ytmp(i),-1.55)
 110     continue
C
C        Insure polygon closure.
         if ((ytmp(i).ne.yplp(1)).or.(xtmp(i).ne.xplp(1))) then
            i = i + 1
            if (append) then
               ytmp(i) = yplp(1)
               xtmp(i) = xplp(1)
            else
               ytmp(i) = ytmp(1)
               xtmp(i) = xtmp(1)
            endif
         endif
C
C        Great circlize the added section of polygon.
         istout = max0(1,iplp)
         call ll2gc(xtmp,ytmp,i,MAX,xplp(istout),yplp(istout),nout)
         aplp = (istout-1) + nout
      endif
C
      return
      end

C+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                          SVECPT
C
C FUNCTIONAL DESCRIPTION:
c -        This routine is for saving points read from the change file.
c -        These are the points added to complete a polygon.
C
C CALLED BY:                          DMAPII
C
C PROGRAMMER:                         DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*|*-*-*-*-
c
      subroutine svecpt(xpl,ypl)

      real xpl,ypl

      include   'carmaxdim.inc'

c
c     Variables and Array for the Positive buffer
      integer   iplp,aplp
      real      xplp(IDIM),yplp(IDIM)
      common /bufptrp/ iplp,aplp
      common /bufaryp/ xplp,yplp

      IF (aplp.LT.IDIM) THEN
         aplp = aplp + 1
         yplp(aplp) = ypl
         xplp(aplp) = xpl
      ELSE
         PRINT 800,IDIM
      ENDIF
```

```
800   FORMAT(x,'Warning... Exceeded point buffer size of ',i4)

      RETURN
      END

C++*+*+*+*+*+*+*+*+*+*+*+*+*+*+*+*+*+*+*+*+*+*+*+*+*+*+*+*+*+*+*+*+*+*+*+*|*+*+*+*+
C UNIT NAME:                    SVEPOI
C
C FUNCTIONAL DESCRIPTION:
c -   This routine is for saving points read from the WDBIIx point file.
C
C CALLED BY:                    DMAPII
C
C PROGRAMMER:                   DATE OF LAST CHANGE     REASON FOR CHANGE
C
C-*-*-*-*-*-*-*-*-*-*-*-*-*-*-*-*-*-*-*-*-*-*-*-*-*-*-*-*-*-*-*-*-*-*-*-*-*|*-*-*-*-
c
      subroutine svepoi(xpl,ypl)

      real xpl,ypl

      include   'carmaxdim.inc'

c
c     Variables and Array for the Positive buffer
      integer   iplp,aplp
      real      xplp(IDIM),yplp(IDIM)
      common /bufptrp/ iplp,aplp
      common /bufaryp/ xplp,yplp
      IF (iplp.LT.IDIM) THEN
        iplp = iplp + 1
        yplp(iplp) = ypl
        xplp(iplp) = xpl
      ELSE
         PRINT 800,IDIM
      ENDIF

800   FORMAT(x,'Warning... Exceeded point buffer size of ',i4)
c
      RETURN
      END
```

INDEX TO CRITICAL SUBROUTINES REFERENCED IN THE CLAIMS

BL2LL — Vol 2, Section carmapmth.f, pp 1-2
Transforms a polyline from stereographic breakline coordinates back to (longitude.latitude).

BL2XY — Vol 2, Section carmapmth.f,pp 2-3
Transforms a polyline into a temporary stereographic projection where breakline clipping will be performed.

BLCHK — Vol 2, Section carmapmth.f, pp 3-5
Detects intersection of conic breakline with a geographic bounding rectangle.

BLHATC — Vol 2, Section carmapmth.f, pp 5-8
Draws a hatch pattern inside a polygon that might be clipped by the breakline of a map, or contain potentially singular points.

BLPLGN — Vol 2, Section carmapmth.f, pp 8-11
Does an area fill (no outline) for the inside of a polygon that might require clipping by a map breakline or contain potentially singular points.

BLPLIN — Vol 2, Section carmapmth.f, pp 11-13
Draws a polyline across a map area containing a conic breakline.

BLSET Vol 2, Section carmapmth.f, pp 13-16
Locates end points of conic breakline. Sets a transformation to a special stereographic projection where the breakline is straight. so that breakline clipping can easily be applied.

BLSING Vol 2, Section carmapmth.f, pp 16-19
Excludes potentially singular points from the interior of a spherical polygon.

CK4ALL Vol 2, Section carmapmth.f, pp 19-21
Checks for all of a geographic area bounding rectangle being visible in the viewport.

CK4ANY Vol 2, Section carmapmth.f, pp 21-23
Checks for intersection of a geographic area with the viewport by comparing bounding rectangles.

CLIP2L Vol 2, Section carmapmth.f, pp 23-25
Clips a polyline by a line.

CLIPLG Vol 2, Section carmapmth.f, pp 25-29
Clips a polygon by a line.

D2OUTL Vol 2, Section carmapmth.f, pp 30-34
Draw (fill) map outline.

DA2LL Vol 2, Section carmapmth.f, pp 34-35

Converts distance and asimuth from any point to latitude, longitude.

DMAPII Vol 2, Section carmapmth.f, pp 37-48
Reads World Data Bank II and draws map.

EAST1 Vol 2, Section carmapmth.f, pp 48-49
Determines the eastmost of two longitudes as viewed from the map center.

FTPRNT Vol 2, Section carmapmth.f, pp 49-51
Cross hatches the footprint (instantaneous viewing area) for an aerial platform.

JPOLG2 Vol 2, Section carmapmth.f, pp 57-60
Used to overcome limits on the number of verticies for filled polygons in some display systems.

LIMIT2 Vol 2, Section carmapmth.f, pp 60-63
Finds the viewport bounding rectangle.

LL2DA ':' Vol 2, Section carmapmth.f1 pp 63-64
Converts geographic location into distance and asimuth from any point.

LL2GC Vol 2, Section carmapmth.f, pp 64-66
Conditions a geographic polyline so that segments smoothly follow great circles.

LLPLXY Vol 2, Section carmapmth.f, pp 66-69
Converts a geographic polyline into display coordinates.

NRSY˜T Vol 2, Section carmapmth.f, pp 73-76
Solves a system of nonlinear equations by the Newton-Raphson method.

PINSPG Vol 2, Section carmapmth.f, pp 76-78
Tests a point for being inside the smaller of the two regions defined by a spherical polygon.

PXALBR Vol 2, Section carmapmth.f, pp 78-81

Geographic polyline to Albers Equal Area Conic projection.

PXAZEA Vol 2, Section carmapmth.f, pp 81-83
Geographic polyline to Azimuthal Equal Area projection.

PXAZED Vol 2, Section carmapmth.f, pp 83-84
Geographic polyline to Azimuthal Equidistant projection.

PXEQRE Vol 2, Section carmapmth.f, pp 84-86
Geographic polyline to Equirectangular projection.

PXGNOM Vol 2, Section carmapmth.f, pp 86-87
Geographic polyline to Gnomonic projection.

PXKAVR Vol 2, Section carmapmth.f, pp 87-89

Jan 26 10:10 1993 index.txt Page 3

Geographic polyline to Equidistant Conic projection.

PXLAMC Vol 2, Section carmapmth.f, pp 89-92
Geographic polyline to Lambert Conformal Conic projection.

PXMERC Vol 2, Section carmapmth.f, pp 92-94
Geographic polyline to Mercator projection.

PXMILL Vol 2, Section carmapmth.f, pp 94-95
Geographic polyline to Miller projection.

PXOBLM Vol 2, Section carmapmth.f, pp 95-98
Geographic polyline to Oblique Mercator projection.

PXORTH Vol 2, Section carmapmth.f, pp 101-103
Geographic polyline to Oblique Orthographic projection.

PXPERS Vol 2, Section carmapmth.f, pp 103-105
Geographic polyline to Oblique Perspective projection.

PXPOLY Vol 2, Section carmapmth.f, pp 105-107
Geographic polyline to Polyconic projection.

PXPOST Vol 2, Section carmapmth.f, pp 107-109
Geographic polyline to Polar Stereographic projection.

PXSI-NU° Vol 2, Section carmapmth.f, pp 109-110
Geographic polyline to Sinusoidal projection.

PXSTER Vol 2, Section carmapmth.f, pp 110-112
Geographic polyline to Oblique Stereographic projection.

PXUT˜Z Vol 2, Section carmapmth.f, pp 112-114
Geographic polyline to Universal Transverse Mercator projection.

PXVDGN Vol 2, Section carmapmth.f, pp 114-116
Geographic polyline to Van Per Grinten projection.

RNGRIN Vol 2, Section carmapmth.f, pp 116-119
Draws range rings, radials about a selected point.

SPGCVX Vol 2, Section carmapmth.f, pp 119-120
Tests for convex property in spherical polygons.

SPGINT Vol 2, Section carmapmth.f, pp 120-122
Flags the intersection of two spherical polygons.

SPGRAD Vol 2, Section carmapmth.f, pp 122-123
Finds minimum bounding circle of a spherical polygon.

SPGTST Vol 2, Section carmapmth.f, pp 123-124
Spherical polygon utility.

```
XPAZEA                  Vol 2, Section carmapmth.f,  pp 124-125
        Display point to geographic position for Azimuthal Equal
        Area.

XPAZED                  Vol 2, Section carmapmth.f,  pp 125-127
        Display  point  to  geographic  position  for  Azimuthal
        Equidistant.

XPGENR                  Vol 2, Section carmapmth.f,  pp 127-129
        Generic conversion of display point to geographic
        coordinates.  Works on any well behaved projection.

XPSTER                  Vol 2, Section carmapmth.f,  pp 130-131
        Map point to geographic position for Stereographic.

XYTOLL                  Vol 2, Section carmapmth.f,  pp 131-132
        Converts screen location to geographic coordinates.
```

We claim:

1. A method of selectively displaying areal and linear features having polygon fill of vector data for world maps and other display items by signal transformation of data representative of areal and linear features from which polygons can be extracted comprising:

feeding said data representative of areal and linear features from which closed polygons can be extracted to a computer;

establishing from said data representative of areal and linear features in said computer, display geographic coordinate relationships for display;

transforming from said data representative of areal and linear features in said computer, a greater circle polyline format for display;

selecting from said data representative of areal and linear features in said computer, background overlay features for display;

determining from said data representative of areal and linear features in said computer, spatial relationships between spherical polygons for display;

processing from said data representative of areal and linear features in said computer, to provide clipping and singularity removal at map interruption lines to allow the display of curved surface features in a flat plane;

clipping from said data representative of areal and linear features in said computer, polygons by lines so that portions thereof can be displayed as separate areas;

projecting from said data representative of areal and linear features in said computer, geographic coordinates onto a defined map display for the display thereof;

providing from said data representative of areal and linear features in said computer, inverse transformations to latitude/longitude which is the inverse of geographic to display coordinates for the display thereof; and displaying said signal transformations of said establishing, transforming, selecting, determining, processing, clipping, projecting and providing to enable choices of the displayed said signal transformations to allow a designation of said choices of the displayed said signal transformations thereby assuring said selectably displaying of said areal and linear features.

2. A method according to claim 1 in which the step of displaying includes the signal transformation of providing and the step of designating includes the choice of the displayed transformation of providing.

3. A method according to claim 2 in which said establishing geographic coordinates relationship is independent of specific projection and provides generic calculation of intersection between the map display and loxodrome bounded geographic sectors.

4. A method a according to claim 3 in which said transforming a great circle polyline format for display where individual line segments are defined as particular geographic curves is accomplished in a projection independent manner by adding points automatically as required by any specific projection to achieve accurate depiction of curved segments.

5. A method according to claim 4 in which said selecting background a overlay features for display is from a filled outline of the world, other areal features such as political districts and satellite footprints, and linear features such as vehicle paths and range rings.

6. A method according to claim 5 in which said determining spatial relationships between spherical polygons for display includes finding intersection, enclosure, longitudinal relationships, convex property, and minimum bounding small circle.

7. A method according to claim 6 in which said processing to provide clipping and singularity removal at the map interruption lies to allow the display of curved surface features in a flat plane is predetermined to avoid errors and anomalous behavior in any linear and filled areal features mapped from geographical coordinates onto a selective azimuthal, conical, and pseudocylindrical projection.

8. A method according to claim 7 in which said clipping polygons by lines so that portions thereof can be displayed as separate areas allows polygons of virtually any number of vertices to be subjected to said clipping and singularity handling to result that the sections of the input polygon are automatically subdivided as required to limit the maximum number of output vertices to a count compatible with the polygon fill capacity of a particular display device.

9. A method according to claim 8 in which said projecting geographical coordinates onto a defined map display applies to any azimuthal, conic, cylindrical, and pseudocylindrical projection including Albers Equal Area Conic, Azimuthal Equidistant, Azimuthal Equal Area, Equirectangular, Gnomonic, Equidistant Conic, Lambert Conformal Conic, Mercator, Miller, Oblique Mercantor, Orthographic, Equatorial Orthographic, Polar Orthographic, Perspective Polyconic, Polar Stereographic Sinusoidal, Stereographic and Universal Transverse Mercator.

10. A method according to claim 9 in which said providing inverse transformations to latitude/longitude which is the inverse of geographic to display coordinates requires input of a mathematical transformation defining a specific projection, some point on that specific projection and which solves the inverse by a generic method applicable to any azimuthal, conic, cylindrical and pseudocylinderical projection.

11. A method according to claim 1 in which said establishing display geographic coordinate relationships is independent of specific projection and provides generic calculation of intersection between the map display (viewport) and loxodrome bounded geographic sectors;

said transforming a great circle polyline format for display where individual line segments are defined as particular geographic curves is accomplished in a projection independent manner by adding points automatically as required by any specific projection to achieve accurate depiction of curved segments;

said selecting background and overlay features for display is from a filled outline of the world, other areal features such as political districts and satellite footprints, and linear features such as vehicle paths and range rings;

said determining spatial relationships between spherical polygons for display includes polygons for display includes finding intersection, enclosure, longitudinal relationships (most easterly), convex property, and minimum bonding small circle;

said processing to provide clipping and singularity removal at map interruption lines to allow the display of curved surface features in a flat plane is predetermined to avoid errors and anomalous behavior in any linear and filled areal features mapped from geographical coordinates onto a selective azimuthal, conical, and pseudocylindrical projection;

said clipping polygons by lines so that portions thereof can be displayed as separate areas allows polygons of virtually any number of vertices to be subjected to said clipping to result that the sections of the input polygon are automatically subdivided as required to limit the maximum number of output vertices to a count compatible with the polygon fill capacity of a particular display device;

said projecting geographical coordinates onto a defined map display applies to any azimuthal, conic, cylindrical, and pseudocylindrical projection including Albers Equal Area Conic, Azimuthal Equidistant, Azimthal Equal Area, Equirectangular, Gnomonic, Equidistant Conic, Lambert Conformal Conic, Mercaptor, Miller, Oblique Mercantor, Orthographic, Equatorial Orthographic, Polar Orthographic, Perspective Polyconic, Polar Stereographic Sinusoidal, Stereographic and Universal Transverse Mercator; and said providing inverse transformations to latitude/-longitude which is the inverse of geographic to display coordinates requires input of a mathematical transformation defining a specific projection, some point on that specific projection and which solves the inverse by a generic method and applicable to any azimuthal, conic, cylindrical and pseudocylinderical projection.

12. A method of selectively displaying areal and linear features having polygon fill of vector data for world maps and other display items by signal transformations of data representative of areal and linear features from which polygons and polylines can be extracted comprising:

feeding said data representative of areal and linear features from which closed polygons and polylines can be extracted to a computer;

establishing from said data representative of areal and linear features in said computer, geographic coordinate relationships for display and interrogation;

transforming from said data representative of areal and linear features in said computer, a great circle polyline format for display;

selecting from said data representative of areal and linear features in said computer, background and overlay features for display;

determining from said data representative of areal and linear features in said computer, spatial relationships between spherical and loxodrome polygons for display;

processing from said data representative of areal and linear features in said computer, to provide clipping and singularity removal at map interruption lines to allow the display of curved surface features on a plane;

clipping from said data representative of areal and linear features in said computer, polygons by lines and great circle lines so that portions thereof can be displayed as disjoint entities;

projecting from said data representative of areal and linear features in said computer, geographical coordinates onto a graphic device for the display thereof;

providing from graphic displays of said data representative of areal and linear features in said computer, inverse transformations from map plane coordinates to geographic coordinates for the display and spatial interrogation thereof; and displaying said signal transformations of said establishing, transforming, selecting, determining, processing, clipping, projecting and providing to enable choices of the displayed said signal transformations to allow a designation of said choices of the displayed said signal transformations thereby assuring said selectably displaying of said areal and linear features.

13. A method of selectively displaying areal and linear features having polygon fill of vector data for world maps and other display items by signal transformations of data representative of areal and linear features from which polygons and polylines can be extracted comprising:

feeding said data representative of areal and linear features from which closed polygons and polylines can be extracted to a computer;

establishing from said data representative of areal and linear features in said computer, geographic coordinate relationships for display and interrogation;

transforming from said data representative of areal and linear features in said computer, a great circle polyline format for display;

selecting from said data representative of areal and linear features in said computer, background overlay features for display;

determining from said data representative of areal and linear features in said computer, spatial relationships between spherical and loxodrome polygons for display;

processing from said data representative of areal and linear features in said computer, to provide clipping and singularity removal at map interruption lines to allow the display of curved surface features on a plane;

clipping from said data representative of areal and linear features in said computer, polygons by lines and great circle lines so that portions thereof can be displayed as disjoint entities;

projecting from said data representative of areal and linear features in said computer, geographical coordinates onto a graphic device for the display thereof;

providing from data mapped into a specific projection from said data representative of areal and linear features in said computer, inverse transformations from any location on a map from an input of a map location and an input of a transformation defining said specific projection that solves an inverse transformation by a generic method applicable to any azimuthal, conic, cylindrical, and pseudocylinderical projection; and displaying said signal transformations of said establishing, transforming, selecting, determining, processing, clipping, projecting and providing to enable choices of the displayed said signal transformations to allow a designation of said choices of the displayed said signal transformations thereby assuring said selectably displaying of said areal and linear features.

14. A method according to claim 12 in which said establishing geographic coordinate relationships is independent of specific projection and provides generic calculation of intersection between the map display (viewport) and loxodrome bounded geographic sectors.

15. A method according to claim 14 in which said transforming a great circle polyline format for display where individual line segments may be defined as particular geographic curves is accomplished in a projection independent manner by adding points automatically as required by any specific projection to achieve accurate depiction of the curved segments.

16. A method according to claim 15 in which said selecting background and overlay features for display is from a filled outline of the world, other areal features such as political districts and satellite footprints, and linear features such as vehicle paths and range rings.

17. A method according to claim 16 in which said determining spatial relationships between spherical polygons for display includes finding intersection, enclosure, longitudinal relationships (most easterly), convex property, and minimum bounding small circle.

18. A method according to claim 17 in which said processing to provide clipping and singularity removal at the map interruption lines to allow the display of curved surface features in a flat plane is predetermined to avoid errors and anomalous behavior in any linear and filled areal features mapped from geographical coordinates onto a selective azimuthal, conical, and pseudocylindrical projection.

19. A method according to claim 18 in which said clipping polygons by lines so that portions thereof can be displayed as separate areas allows polygons of virtually any number of vertices to be subjected to said clipping and singularity handling to result that the sections of the input polygon are automatically subdivided as required to limit the maximum number of output vertices to a count compatible with the polygon fill capacity of a particular display device.

20. A method according to claim 19 in which said projecting geographical coordinates onto a defined map display applies to any azimuthal, conic, cylindrical, and pseudocylindrical projection including Albers Equal Area Conic, Azimuthal Equidistant, Azimuthal Equal Area, Equirectangular, Gnomonic, Equidistant Conic, Lambert Conformal Conic, Mercaptor, Miller, Oblique Mercantor, Orthographic, Equatorial Orthographic, Polar Orthographic, Perspective Polyconic, Polar Stereographic Sinusoidal, Stereographic and Universal Transverse Mercaptor.

21. A method according to claim 20 in which said providing inverse transformations to latitude/longitude which is the inverse of geographic to display coordinates relies upon input of a mathematical transformation defining a specific projection, some point on the specific projection and which solves the inverse by a generic method applicable to any azimuthal, conic, cylindrical and pseudocylinderical projection.

* * * * *